US006341320B1

(12) United States Patent
Watts, Jr. et al.

(10) Patent No.: US 6,341,320 B1
(45) Date of Patent: Jan. 22, 2002

(54) COMPUTER DOCKING STATION WITH PCMCIA CARD SLOT

(75) Inventors: LaVaughn F. Watts, Jr., Temple; Gary Verdun; Randall E. Juenger, both of Belton; Tom Grimm, Temple, all of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 08/336,342

(22) Filed: Nov. 8, 1994

Related U.S. Application Data

(63) Continuation-in-part of application No. 08/151,225, filed on Nov. 12, 1993, now Pat. No. 5,477,415.

(51) Int. Cl.[7] ............................ G06F 13/00; G06F 1/16

(52) U.S. Cl. ........................................ 710/101; 361/686

(58) Field of Search ................. 395/281; 710/100–104; 361/679–686

(56) References Cited

U.S. PATENT DOCUMENTS 4,530,069 A * 7/1985 Desrochers ................. 395/822
4,769,764 A * 9/1988 Levanon ..................... 361/680
5,126,954 A * 6/1992 Morita ....................... 361/683
5,265,238 A * 11/1993 Canova, Jr. et al. ........ 395/500
5,313,596 A * 5/1994 Swindler et al. ............ 395/281
5,323,291 A * 6/1994 Boyle et al. ................ 361/686
5,396,602 A * 3/1995 Amini et al. ............... 395/293
5,477,415 A * 12/1995 Mitcham et al. ............ 361/686
5,522,089 A * 5/1996 Kikinis et al. .............. 395/893

* cited by examiner

*Primary Examiner*—Sumati Lefkowitz
(74) *Attorney, Agent, or Firm*—Ronald O. Neerings; Wade J. Brady, III; Frederick J. Telecky, Jr.

(57) ABSTRACT

The described embodiments of the present invention provide a computer docking station having connection means for coupling to an external monitor and an external keyboard, means for connecting the portable computer to the docking station, and at least one PCMCIA option card slot in the docking station. In a preferred embodiment, the computer docking station further includes a controller in the docking station to provide the necessary hardware interface between the PCMCIA cart slot and the portable computer and software means for providing the necessary driver support.

3 Claims, 71 Drawing Sheets

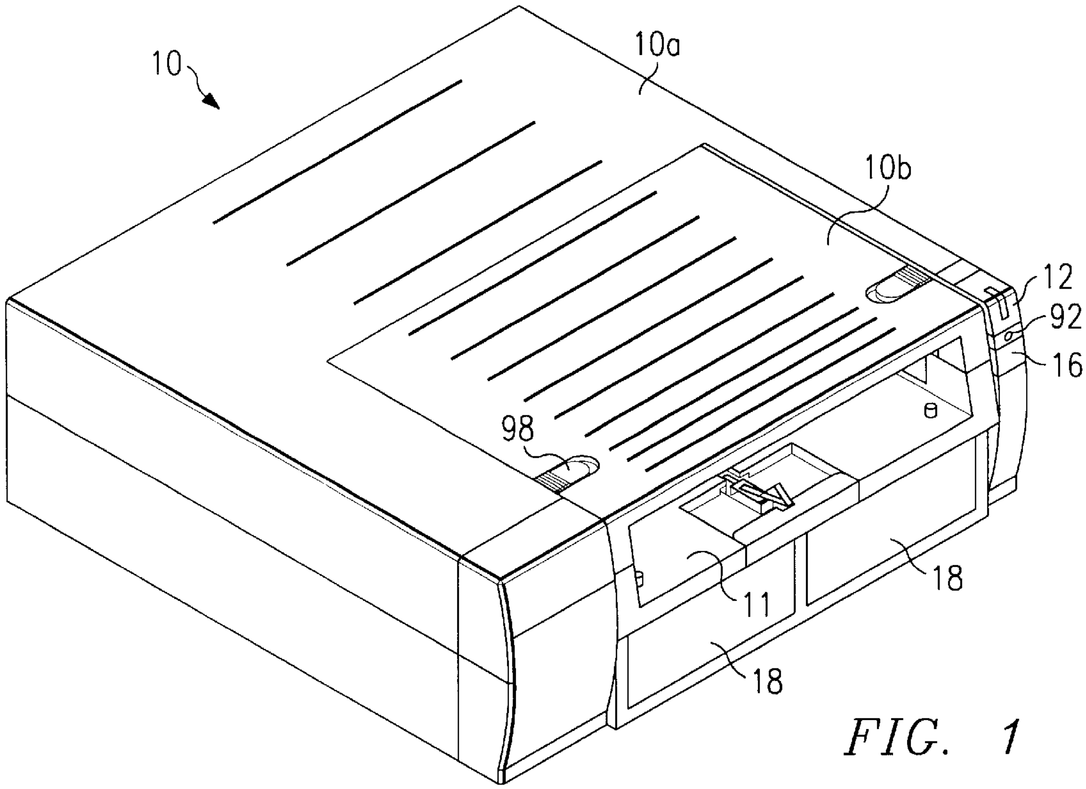
FIG. 1
FIG. 3
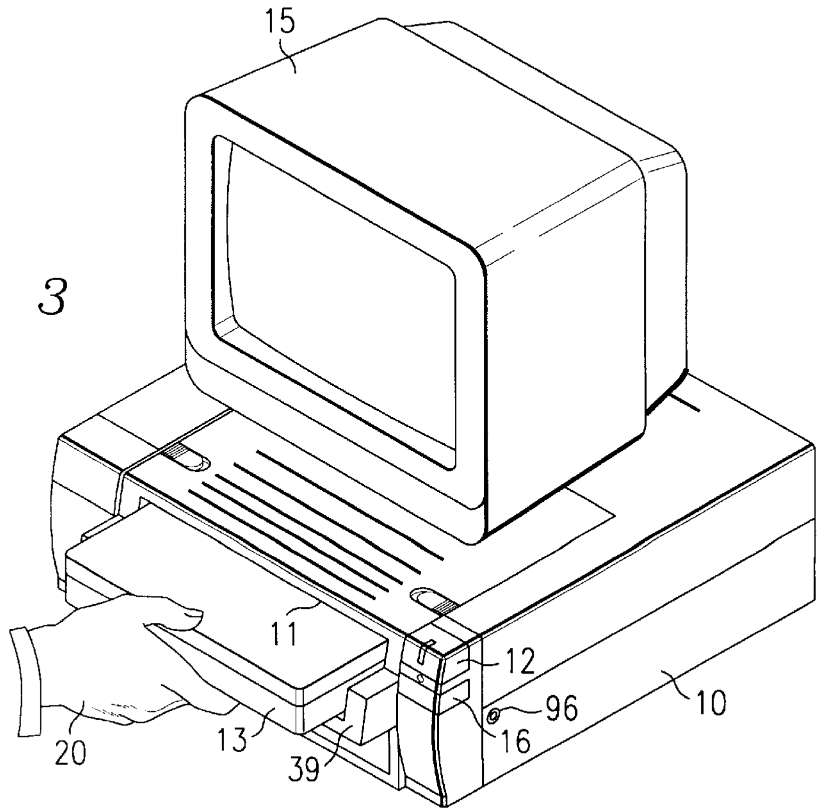

FIG. 11
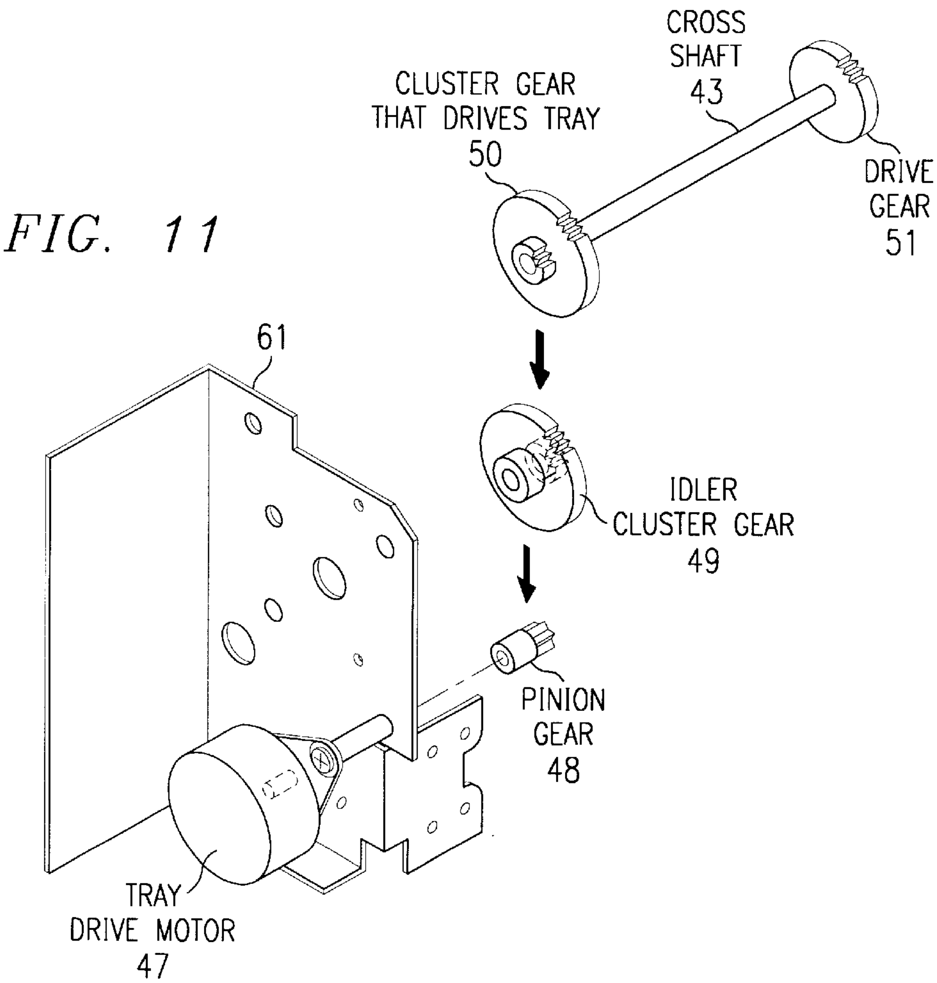
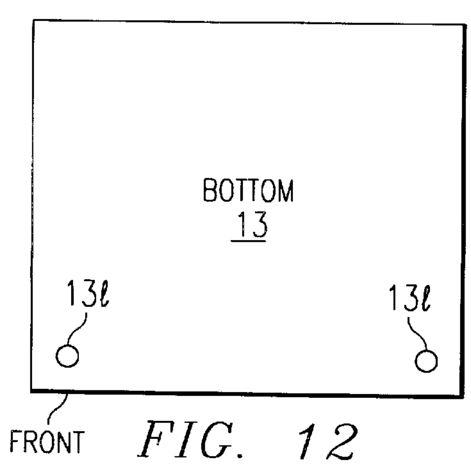
FIG. 12
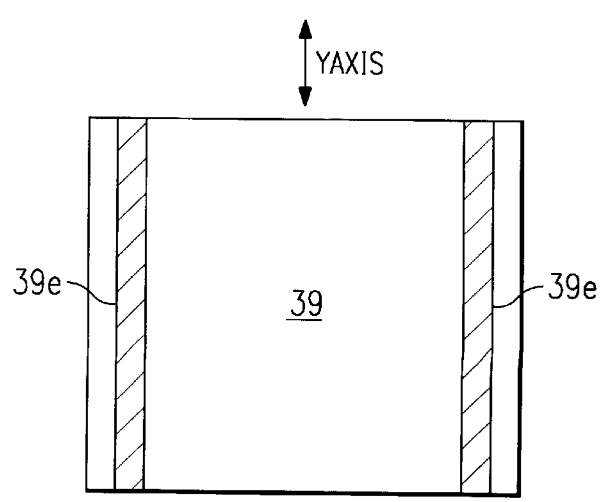
FIG. 13

ES: UNLESS OTHERWISE SPECIFIED:

1. ALL IC DEVICE TYPES ARE PREFIXED WITH SN74.
2. THE FOLLOWING PREFIX'S ARE ALWAY'S USED:
   T IS EQUAL TO "LS"
   AT IS EQUAL TO "ALS"
3. THE FOLLOWING PREFIX'S ARE USED ONLY WHEN INSUFFICIENT CHARACTERS ARE AVAILABLE:
   A IS EQUAL TO "ACT"
   B IS EQUAL TO "BCT"
   V IS EQUAL TO "AS"
   W IS EQUAL TO "AT" OR "ALS"
4. IC PACKAGE TYPE IS INDICATED BY THE FOLLOWING SUFFIX'S:

| | |
|---|---|
| DUAL-IN-LINE, PLASTIC | = "N" OR BLANK |
| DUAL-IN-LINE, PLASTIC (WIDE) | = NW |
| DUAL-IN-LINE, CERAMIC | = J |
| DUAL-IN-LINE, CERAMIC (WIDE) | = JD |
| CHIP CARRIER, PLASTIC | = F |
| CHIP CARRIER IN A S.M. SCKT | = FF |
| CHIP CARRIER IN A PGA SCKT | = FX |
| CHIP CARRIER, CERAMIC (RECT) | = FE |
| CHIP CARRIER, CERAMIC (SQUARE) | = FH |
| FLAT PACKAGE, CERAMIC | = U |
| FLAT PACKAGE, CERAMIC (WIDE) | = W |
| GRID ARRAY, PLASTIC | = X |
| GRID ARRAY, PLASTIC (LIF SCKT) | = XL |
| GRID ARRAY, PLASTIC (ZIF SCKT) | = XZ |
| GRID ARRAY, CERAMIC | = Y |
| GRID ARRAY, CERAMIC (LIF SCKT) | = YL |
| GRID ARRAY, CERAMIC (ZIF SCKT) | = YZ |
| SINGLE-IN-LINE | = E,L,M,G |
| "SOIC", PLASTIC | = D |
| "SOIC", PLASTIC (WIDE) | = DW |
| "SOJ", PLASTIC, J LEADS | = R |

5. VCC IS APPLIED TO PIN 8 OF ALL 8-PIN IC's, PIN 14 OF ALL 14-PIN IC's, PIN 16 OF ALL 16-PIN IC's, PIN 20 OF ALL 20-PIN IC's, ETC.
6. GROUND IS APPLIED TO PIN 4 OF ALL 8-PIN IC's, PIN 7 OF ALL 14-PIN IC's, PIN 8 OF ALL 16-PIN IC's, PIN 10 OF ALL 20-PIN IC's, ETC.

*FIG. 20A*

7. DEVICE TYPE, PIN NUMBERS, AND REFERENCE DESIGNATOR [LOCATION] OF GATES ARE SHOWN AS FOLLOWS:
00 AND 04 = DEVICE TYPES
1, 2, AND 3 = PIN NUMBERS
U01 AND U02 = REF. DESIGNATOR [LOCATION]
8. RESISTANCE VALUES ARE IN OHMS.
9. RESISTORS ARE 1/8 WATT, 5%.
10. CAPACITANCE VALUES ARE IN MICROFARADS.
11. CAPACITORS ARE 50V, 10%.
12. THIS COUPON WILL BE USED ON ALL COMMERICAL MULTILAYER BOARDS.
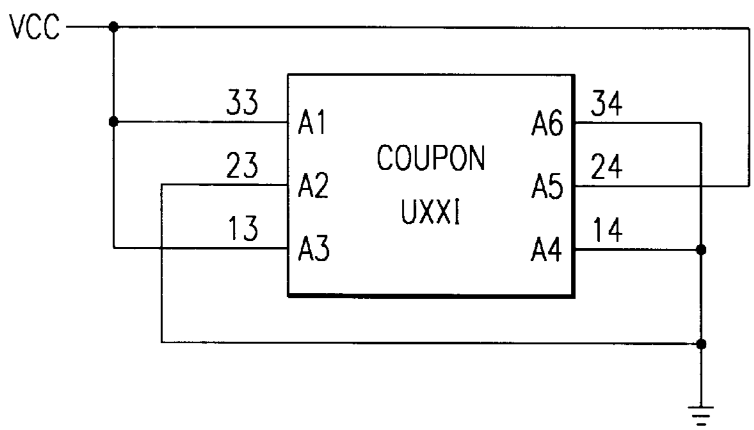
*FIG. 20B*

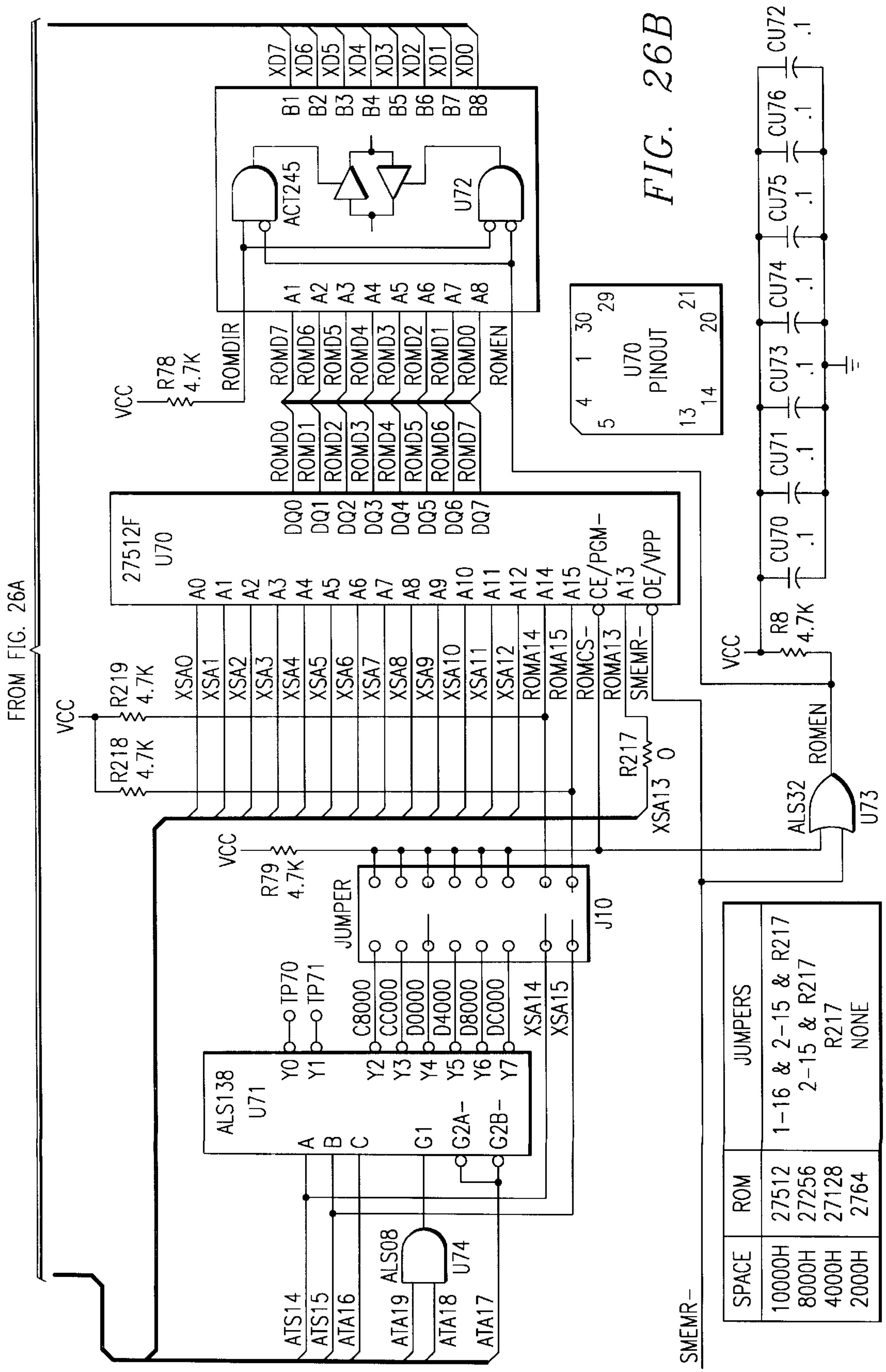
FIG. 26B
FROM FIG. 26A
27512F
U70
ACT245
U72
ALS138
U71
ALS32
U73
ALS08
U74
JUMPER
J10
U70 PINOUT
VCC
R78 4.7K
R219 4.7K
R218 4.7K
R217 0
R79 4.7K
R8 4.7K
ROMDIR
ROMEN
ROMD0 ROMD1 ROMD2 ROMD3 ROMD4 ROMD5 ROMD6 ROMD7
XD7 XD6 XD5 XD4 XD3 XD2 XD1 XD0
B1 B2 B3 B4 B5 B6 B7 B8
A1 A2 A3 A4 A5 A6 A7 A8
DQ0 DQ1 DQ2 DQ3 DQ4 DQ5 DQ6 DQ7
A0 A1 A2 A3 A4 A5 A6 A7 A8 A9 A10 A11 A12 A14 A15 CE/PGM- A13 OE/VPP
XSA0 XSA1 XSA2 XSA3 XSA4 XSA5 XSA6 XSA7 XSA8 XSA9 XSA10 XSA11 XSA12 ROMA14 ROMA15 ROMCS- ROMA13 SMEMR-
XSA13
XSA14 XSA15
C8000 CC000 D0000 D4000 D8000 DC000
TP70 TP71
Y0 Y1 Y2 Y3 Y4 Y5 Y6 Y7
A B C G1 G2A- G2B-
ATS14 ATS15 ATA16 ATA19 ATA18 ATA17
SMEMR-
CU70 .1 CU71 .1 CU73 .1 CU74 .1 CU75 .1 CU76 .1 CU72 .1
SPACE | ROM | JUMPERS
10000H | 27512 | 1-16 & 2-15 & R217
8000H | 27256 | 2-15 & R217
4000H | 27128 | R217
2000H | 2764 | NONE

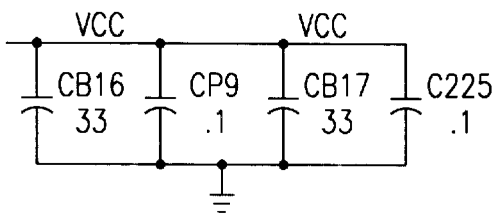
FIG. 35A
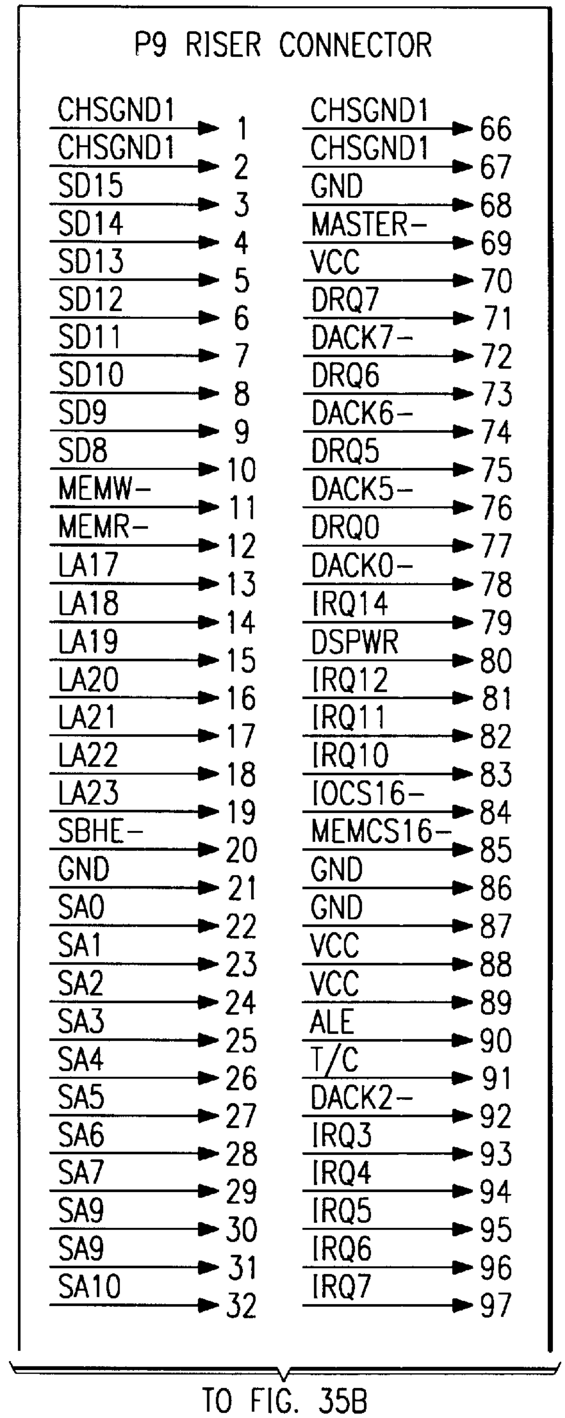
TO FIG. 35B

TravelMate DeskTop/MicroDock Setup Program
Version 1.00. Dec 1 1993

Page 1 of 3

DeskTop floppy 0 type: Disabled    SCSI hardware: On
DeskTop floppy 1 type: Disabled    SCSI BIOS: On
Swap floppy drives: No PCMCIA hardware: On
PCMCIA BIOS: On Game Port: On
QuickPort mouse: On Select the type of floppy drive installed (DeskTop only)

Esc=Exit F1=Help ↑↓ Field +/− Value PgUp/PgDn

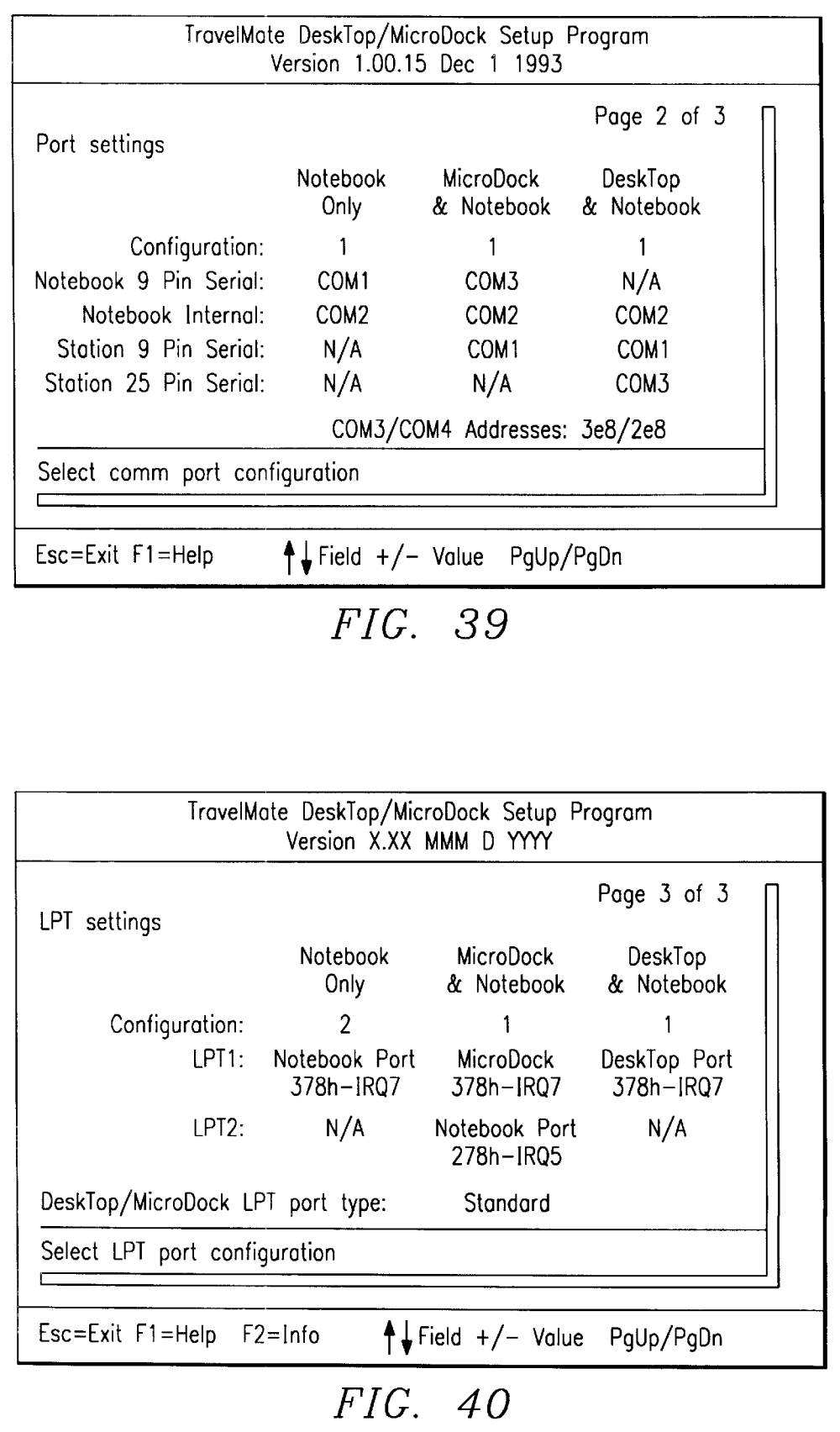

TravelMate DeskTop/MicroDock Setup Program
Version 1.00.15 Dec 1 1993

Page 2 of 3

Port settings

| | Notebook Only | MicroDock & Notebook | DeskTop & Notebook |
|---|---|---|---|
| Configuration: | 1 | 1 | 1 |
| Notebook 9 Pin Serial: | COM1 | COM3 | N/A |
| Notebook Internal: | COM2 | COM2 | COM2 |
| Station 9 Pin Serial: | N/A | COM1 | COM1 |
| Station 25 Pin Serial: | N/A | N/A | COM3 |

COM3/COM4 Addresses: 3e8/2e8

Select comm port configuration

Esc=Exit F1=Help ↑↓ Field +/- Value PgUp/PgDn

FIG. 39

TravelMate DeskTop/MicroDock Setup Program
Version X.XX MMM D YYYY

Page 3 of 3

LPT settings

| | Notebook Only | MicroDock & Notebook | DeskTop & Notebook |
|---|---|---|---|
| Configuration: | 2 | 1 | 1 |
| LPT1: | Notebook Port 378h-IRQ7 | MicroDock 378h-IRQ7 | DeskTop Port 378h-IRQ7 |
| LPT2: | N/A | Notebook Port 278h-IRQ5 | N/A |

DeskTop/MicroDock LPT port type: Standard

Select LPT port configuration

Esc=Exit F1=Help F2=Info ↑↓ Field +/- Value PgUp/PgDn

FIG. 40

*FIG. 50*
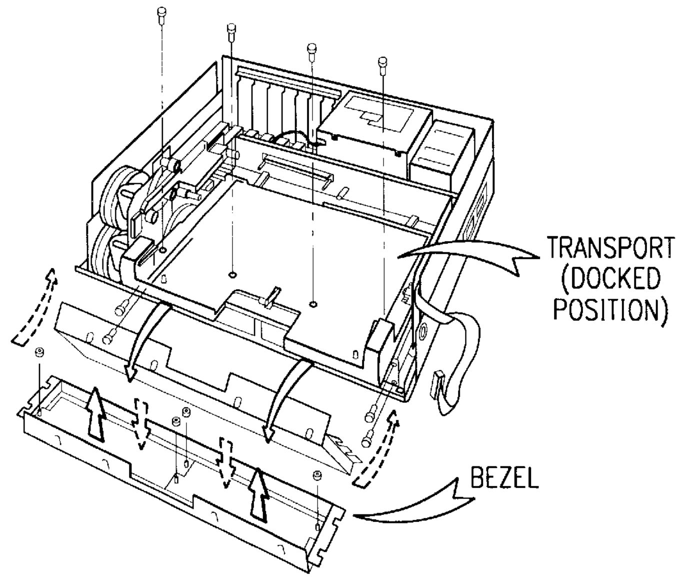
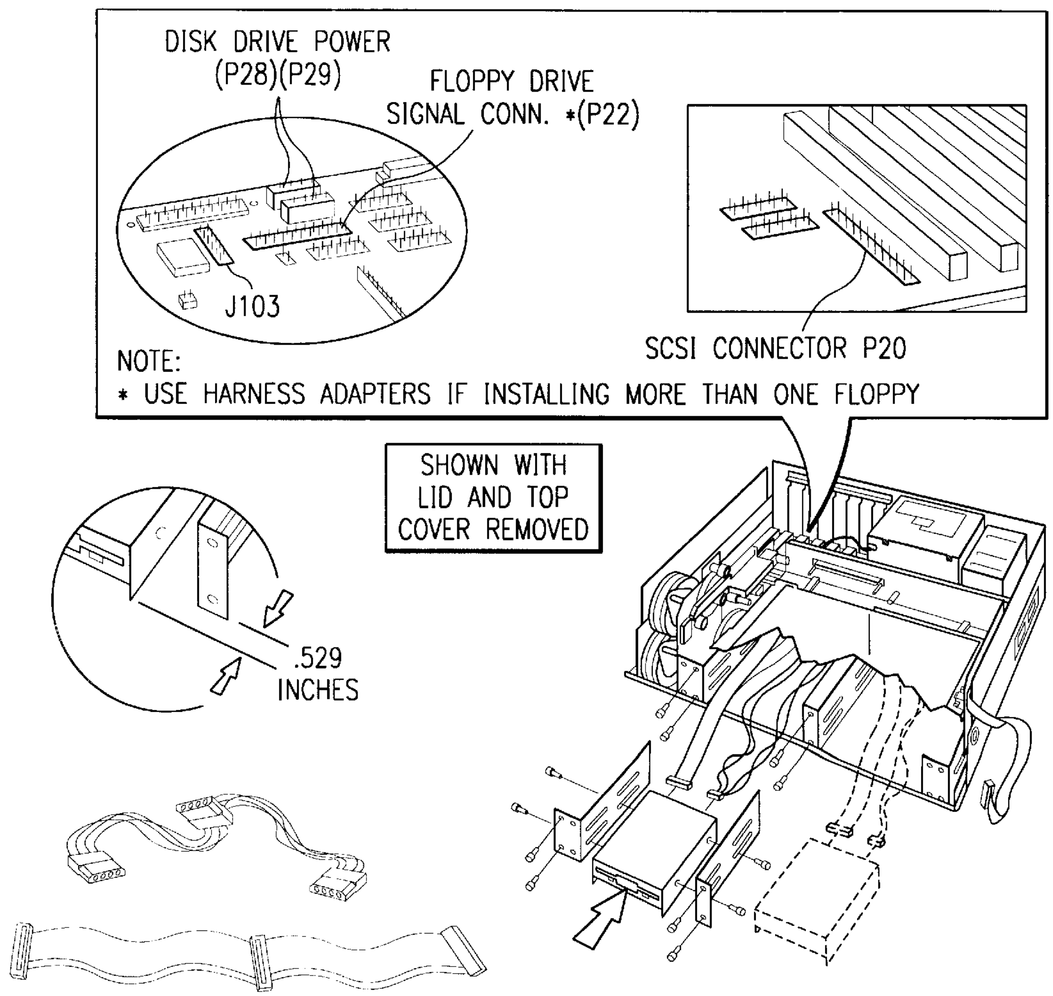
*FIG. 51*

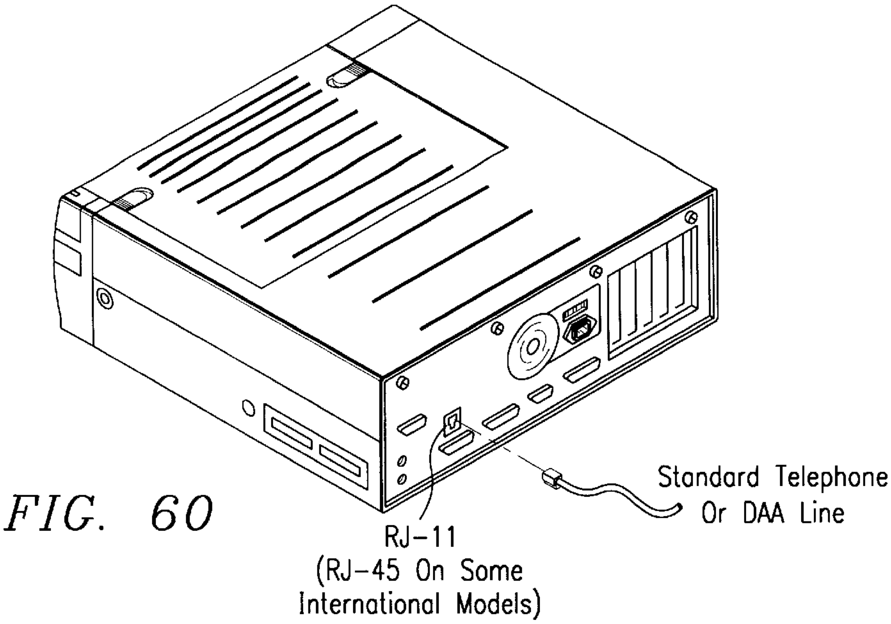

FIG. 60

| Pin | Signal Name |
|---|---|
| 1 | FG (Frame Ground) |
| 2 | $\overline{\text{TXD}}$ (Transmit Data) |
| 3 | $\overline{\text{RXD}}$ (Receive Data) |
| 4 | RTS (Request to Send) |
| 5 | CTS (Clear to Send) |
| 6 | DSR (Data Set Ready) |
| 7 | GND (Signal Ground) |
| 8 | DCD (Carrier Detect) |
| 20 | DTR (Data Terminal Ready) |
| 22 | RI (Ring Indicator) |

| Pin | Signal |
|---|---|
| 1 | DCD (Carrier Detect) |
| 2 | $\overline{\text{RXD}}$ (Receive Data) |
| 3 | $\overline{\text{TXD}}$ (Transmit Data) |
| 4 | DTR (Data Terminal Ready) |
| 5 | GND (Ground) |
| 6 | DSR (Data Set Ready) |
| 7 | RTS (Request to Send) |
| 8 | CTS (Clear to Send) |
| 9 | RI (Ring Indicator) |

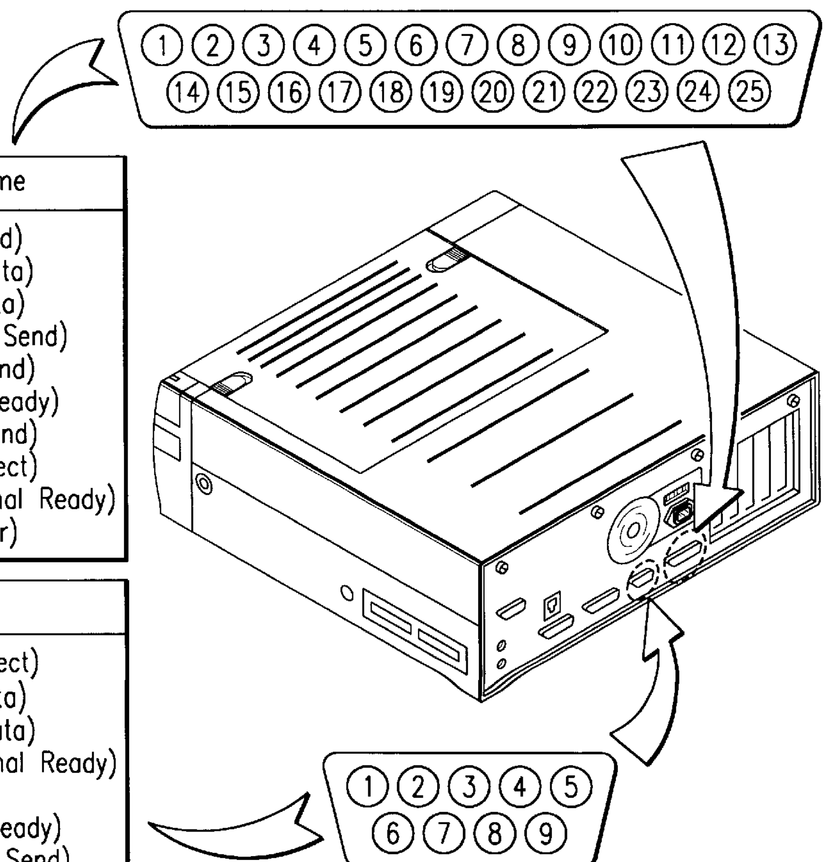

FIG. 61

| Pin | Signal |
|---|---|
| 1 | Strobe |
| 2 | Data Bit 0 |
| 3 | Data Bit 1 |
| 4 | Data Bit 2 |
| 5 | Data Bit 3 |
| 6 | Data Bit 4 |
| 7 | Data Bit 5 |
| 8 | Data Bit 6 |
| 9 | Data Bit 7 |
| 10 | Acknowledge* |
| 11 | Busy |
| 12 | Paper Out |
| 13 | Select |
| 14 | Auto Linefeed* |
| 15 | Error* |
| 16 | Intialize Printer* |
| 17 | Select In* |
| 18 | Ground |
| 19 | Ground |
| 20 | Ground |
| 21 | Ground |
| 22 | Ground |
| 23 | Ground |
| 24 | Ground |
| 25 | Ground |

NOTE: * Active Low

Game Port
Connector Pinouts

| Pin Number | Name |
|---|---|
| 1,8,9,15 | VCC |
| 2 | DC4 |
| 3 | TMRD |
| 4,5,12 | GND |
| 6 | TMRC |
| 7 | D5 |
| 10 | D6 |
| 11 | TMRB |
| 13 | TMRA |
| 14 | D7 |

COMPUTER DOCKING STATION WITH PCMCIA CARD SLOT

This application is a Continuation-in-Part of application Ser. No. 08/151,225 filed Nov. 12, 1993, now U.S. Pat. No. 5,477,415.

TECHNICAL FIELD OF THE INVENTION

This invention relates to computer docking station and more particularly to an computer docking station with at least one PCMCIA card slot.

BACKGROUND OF THE INVENTION

The growth in the use of Personal Computers marks the present age. Not only for the use in desktop computing but also the use of a portable notebook or laptop type computer when traveling. The use of the two computers, one for the desktop and one for traveling, has created a problem that when the traveler returns to the office the desktop or portable computer now has more recent data in it than did the office base computer. Also, when you leave to go on a trip the portable would be behind the desktop computer. Complex systems of lap-ink type cables and software haven't developed to speed up the exchange of information from the portable computer to the desktop or base computer. This also, however, results in a problem of trying to know just which computer had the latest and greatest data. The solution is the ability to simply have only a portable computer and use it as a base station with a means referred to as a "docking station" in which the portable computer is mounted to the base station which connects up to a real size keyboard and monitor and to a modem and LAN or local area network. One of the small problems that seems though lingering in that with all of the plugs, key/cable, LAN adapters, one could spend a good deal of time just tending to all the hardware to connect and disconnect. The docking station is an idea to simplify all of the hookups, but it still takes manipulation and task just to see if everything gets plugged in right and without bending one of the many pins. The current state-of-art docking stations have a buss pin at one end in which like a printed circuit card, the CPU is mounted and then manually the other elements are plugged in. This can be a concern with a relatively heavy portable computer and many tiny pins. What is really in need is some form of automatic docking station so that one need not be a hardware expert or have certain training and skill and adeptness and take time to hookup the monitor, the keyboard, the cables, and the LAN and check over before turning on the computer system are automatic systems that will automatically hookup correctly, self check and turn on while the user is attending to other activities is highly desirable when you're ready to leave or go on a trip.

It is highly desirable to have a docking station that also appropriately disconnects the portable computer in the manner of ejecting a tape from a VCR so the traveler is ready to go in an instant. It would be desirable to provide some way of automatic loading and unloading the laptop computer when one is ready for a trip. Many people who utilize computers do not consider themselves expert in the field of wiring or plugging in equipment. They simply want to put it in something and have it automatically loaded and when leaving to such a button and have the docking station deliver it free to travel.

SUMMARY OF THE INVENTION

The described embodiments of the present invention provide a computer docking station having connection means for coupling to an external monitor and an external keyboard, means for connecting the portable computer to the docking station, and at least one PCMCIA option card slot in the docking station.

In a preferred embodiment, the computer docking station further includes a controller in the docking station to provide the necessary hardware interface between the PCMCIA cart slot and the portable computer and software means for providing the necessary driver support.

DESCRIPTION OF THE DRAWINGS

FIG. 1 is a front perexecutive view sketch of the docking station in accordance with one embodiment of the present invention.

FIG. 3 is a sketch of the docking station of FIG. 1 receiving a portable computer.

FIG. 11 illustrates the tray drive train for the docking station of FIG. 1.

FIG. 12 is a bottom view of the personal computer illustrating the alignment pins.

FIG. 13 is a bottom view of the tray of FIG. 11 illustrating the drive racks for the trays.

FIGS. *20a*, *20b*, *21a*, *21b*, *21c*, *22a*, *22b*, *22c*, *23a*, *23b*, 24, *25a*, *25b*, *25c*, *26a*, *26b*, *27a*, *27b*, *28a*, *28b*, *28c*, *29a*,

29*b*, 29*c*, 30*a*, 30*b*, 31*a*, 31*b*, 32*a*, 32*b*, 32*c*, 32*d*, 33*a*, 33*b*, 33*c*, 33*d*, 34*a*, 34*b*, 34*c*, 35*a*, 35*b*, and 35*c* are electrical schematic diagrams for main board 94.

Figure 36:
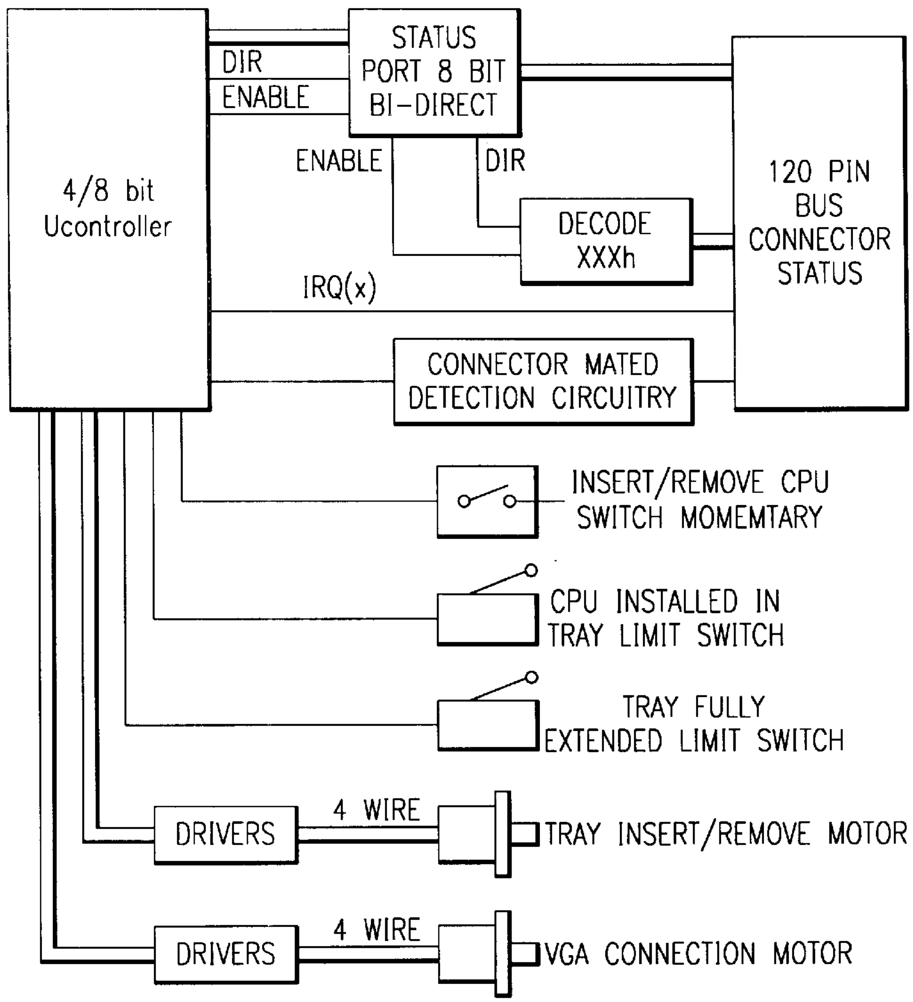
Figure 33A:
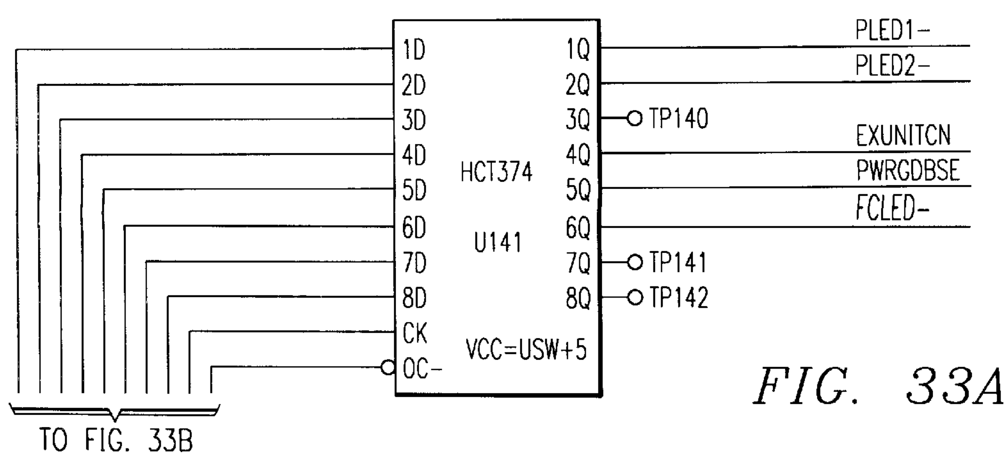
Figure 33B:
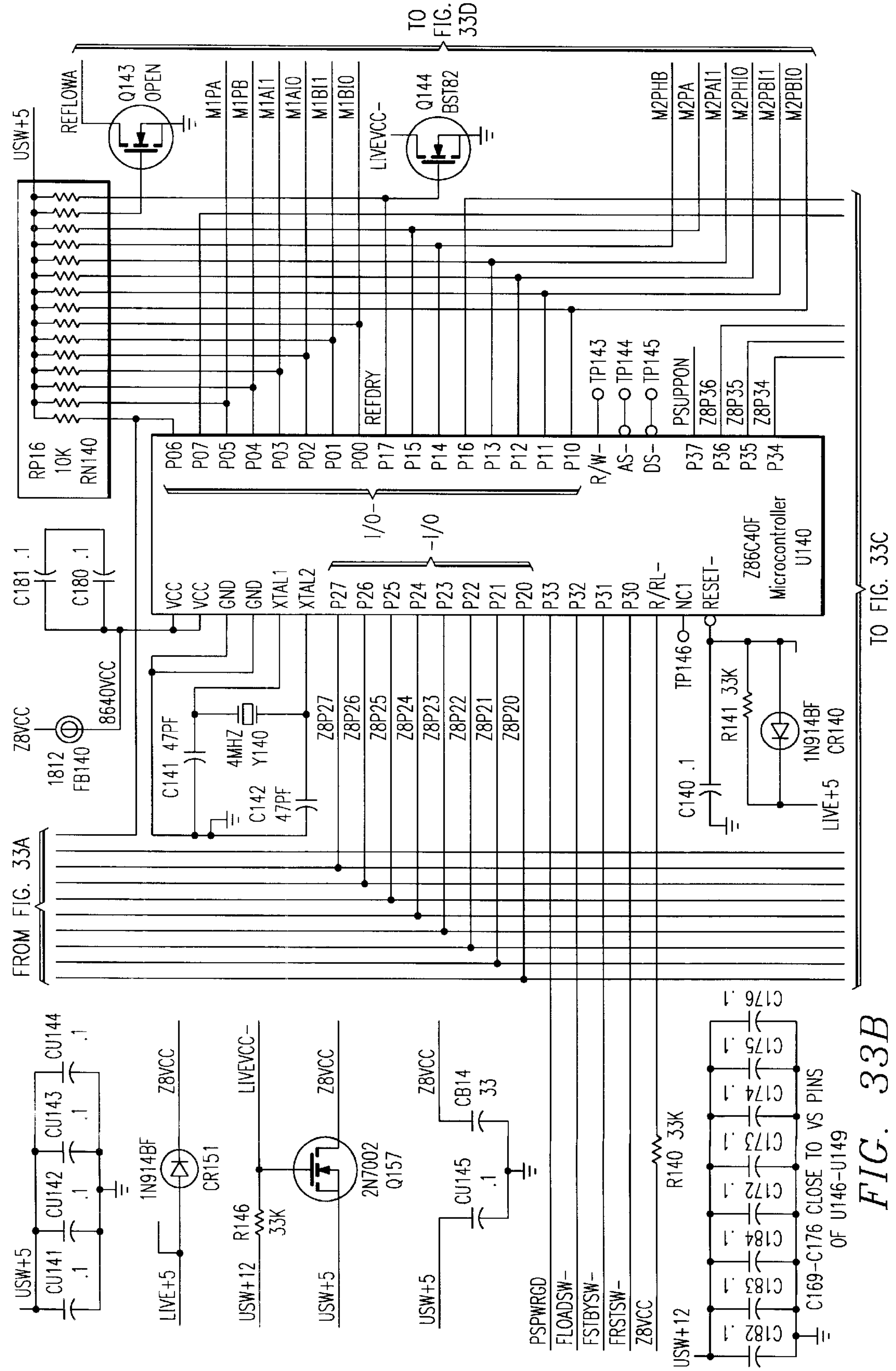
Figure 33C:
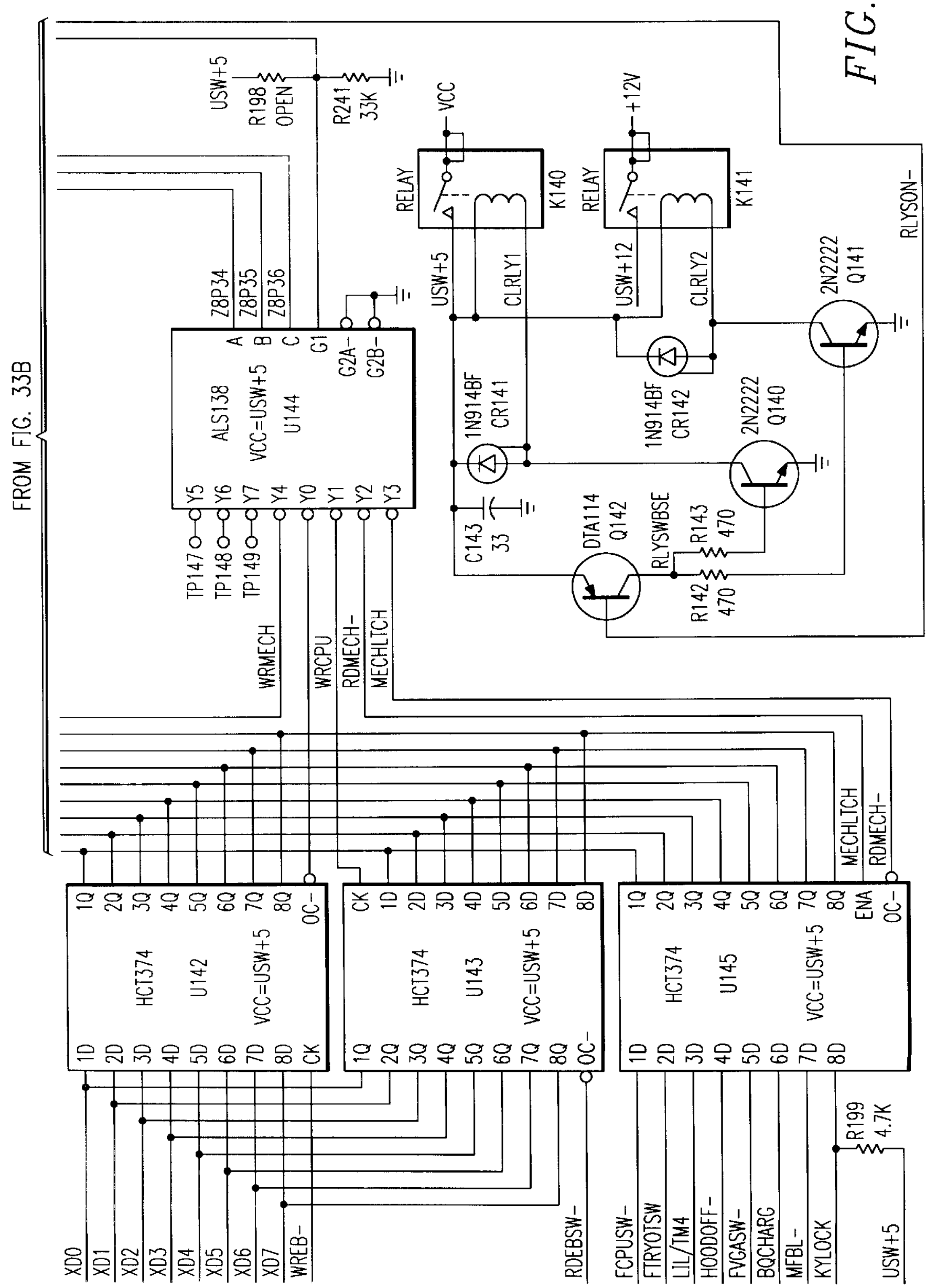
Figure 33D:
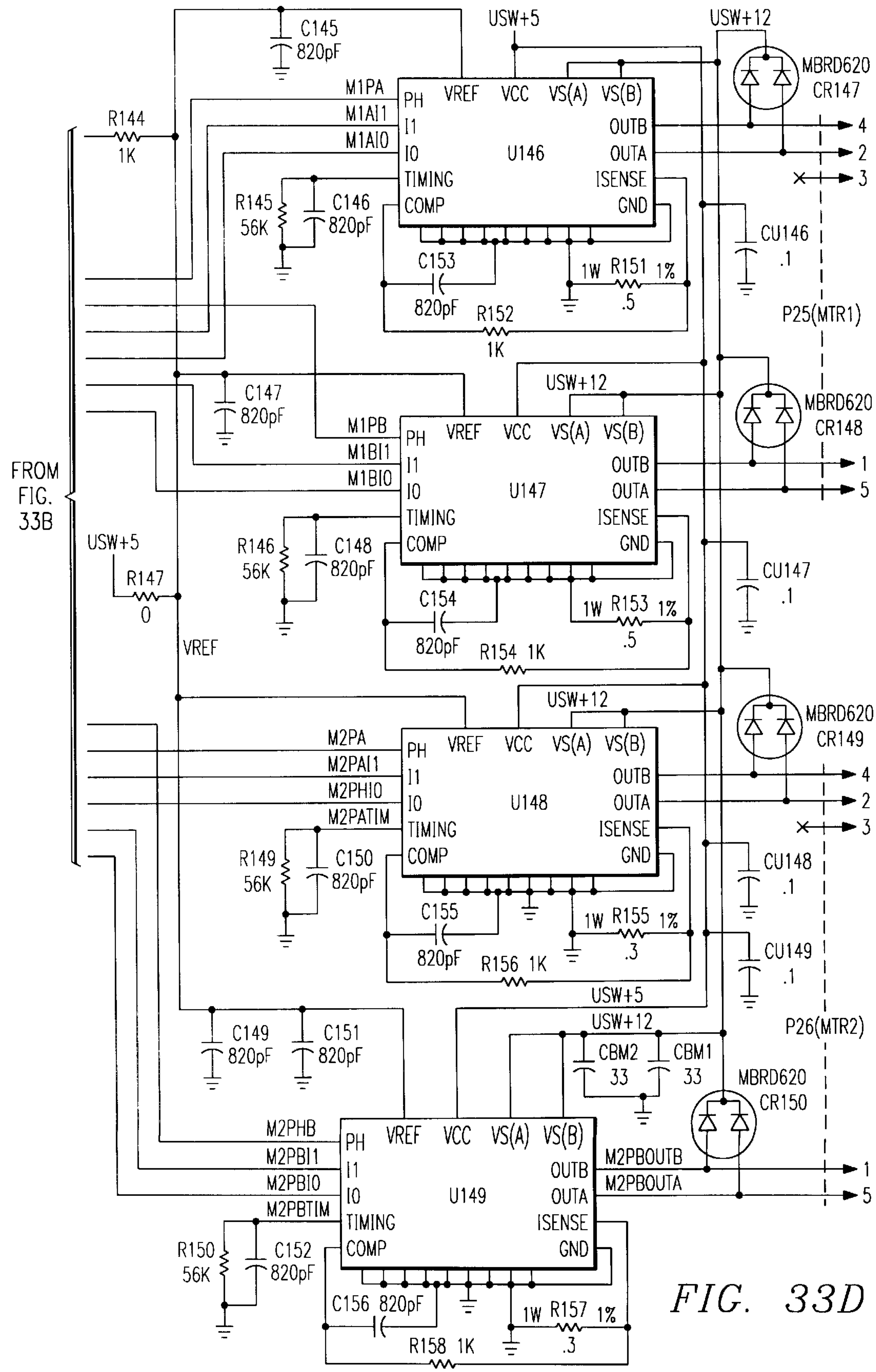
Figure 34A:
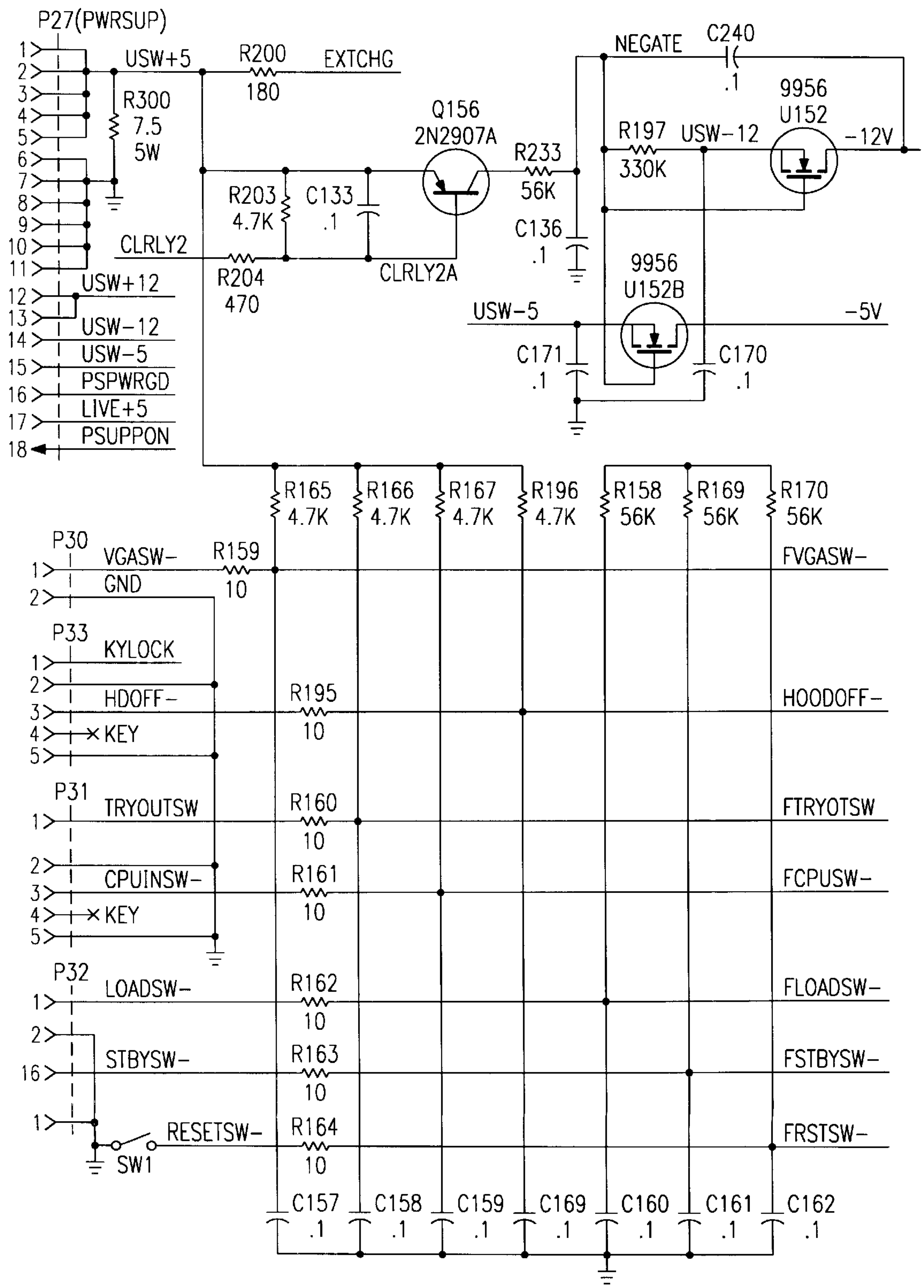
Figure 34B:
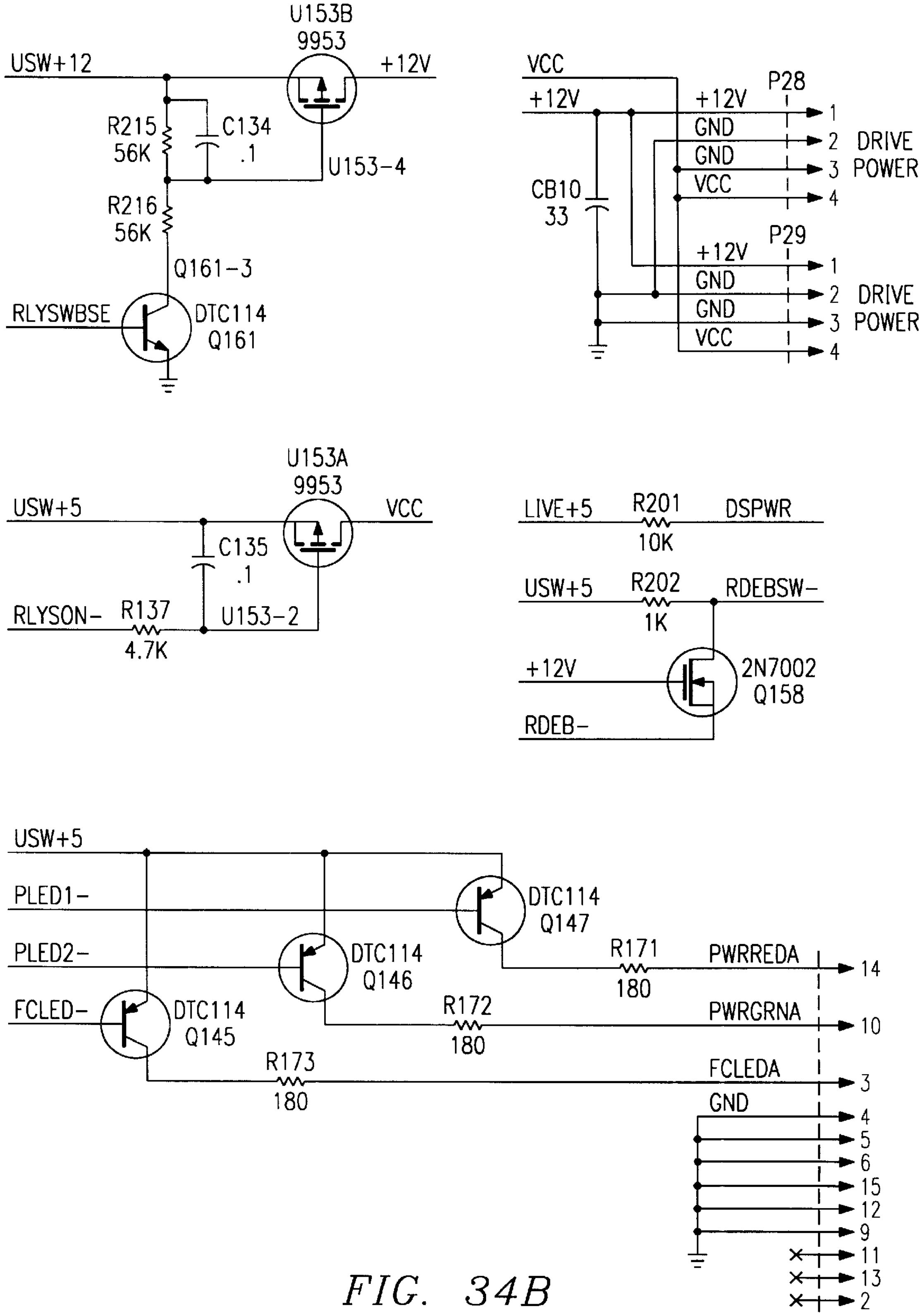
Figure 34C:
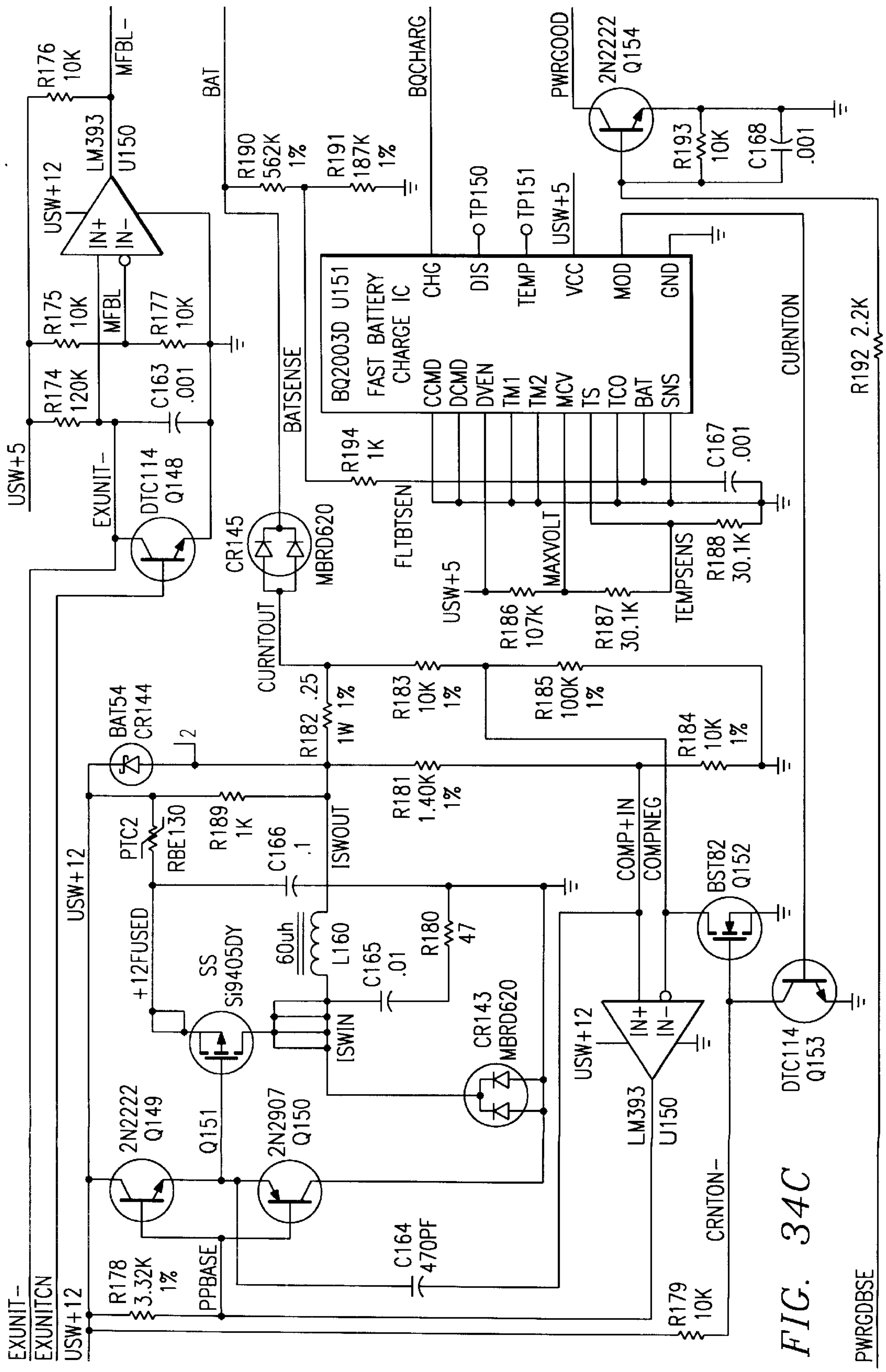
Figure 35B:
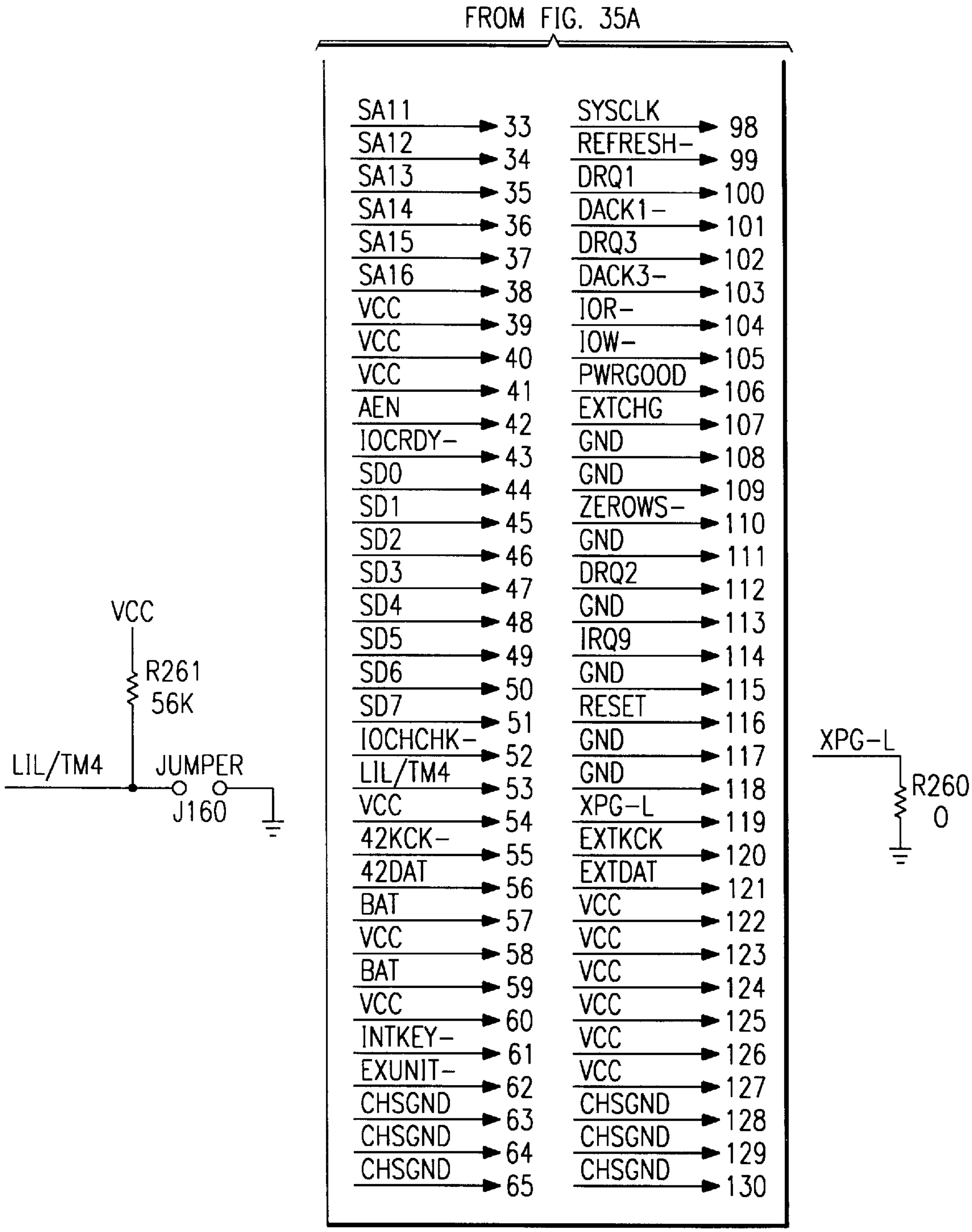
Figure 35C:
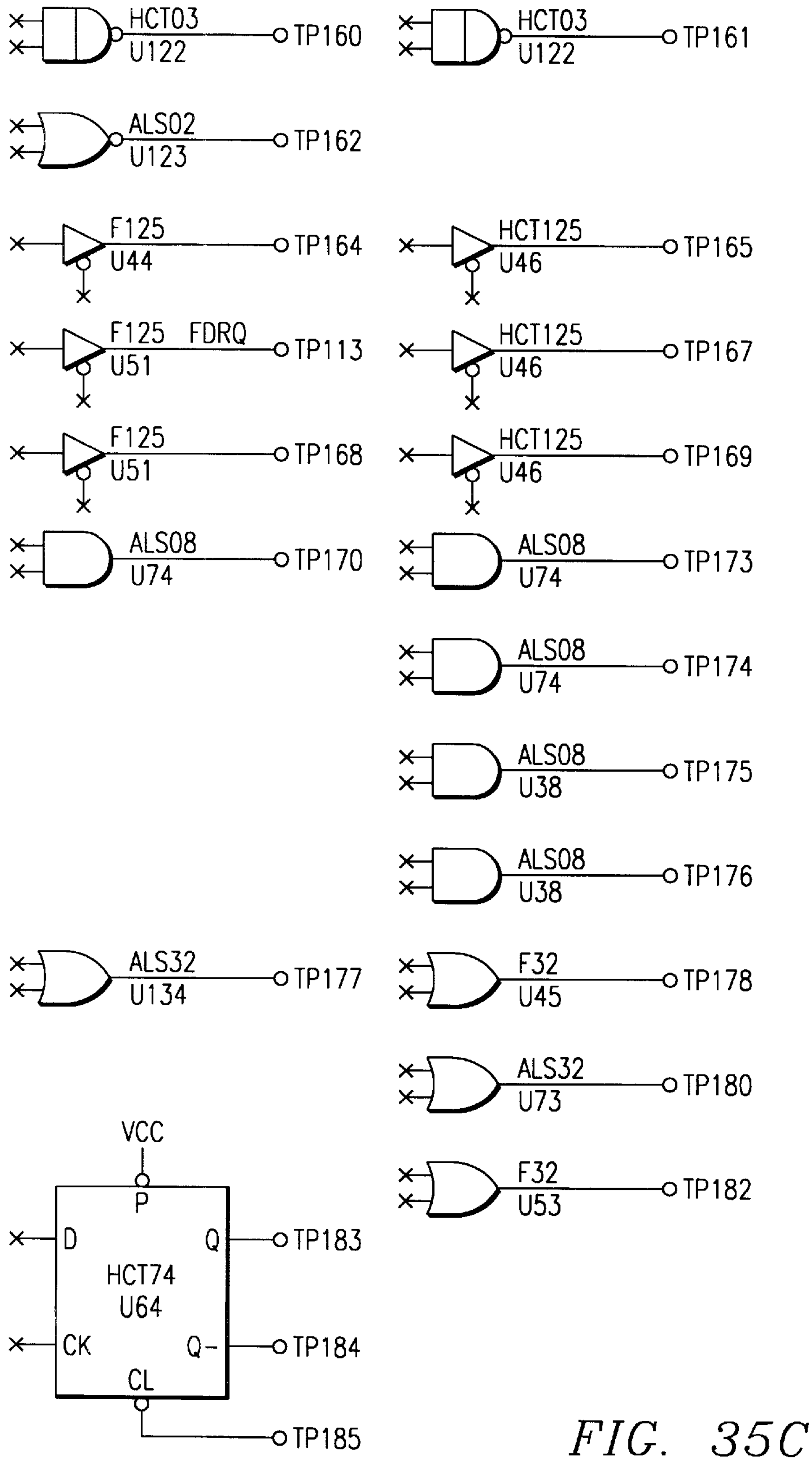

FIG. 36 is a block diagram of the main processing system of docking station 10.

Figures 37, 38:
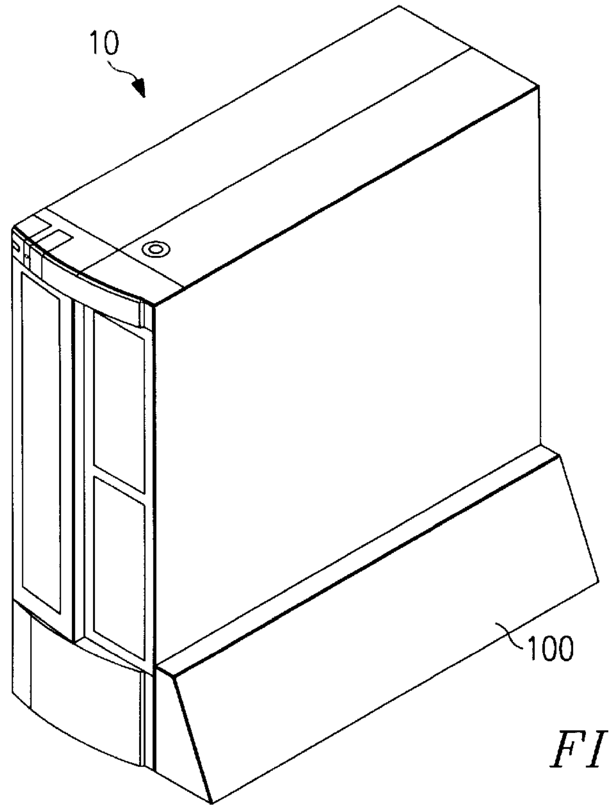

FIG. 37 is a sketch of the docking station of FIG. 1 being oriented in a vertical or "tower" position.

FIG. 38 illustrates SETDOCK main screen.

FIG. 39 illustrates SETDOCK second screen.

FIG. 40 illustrates SETDOCK third screen.

Figure 41:
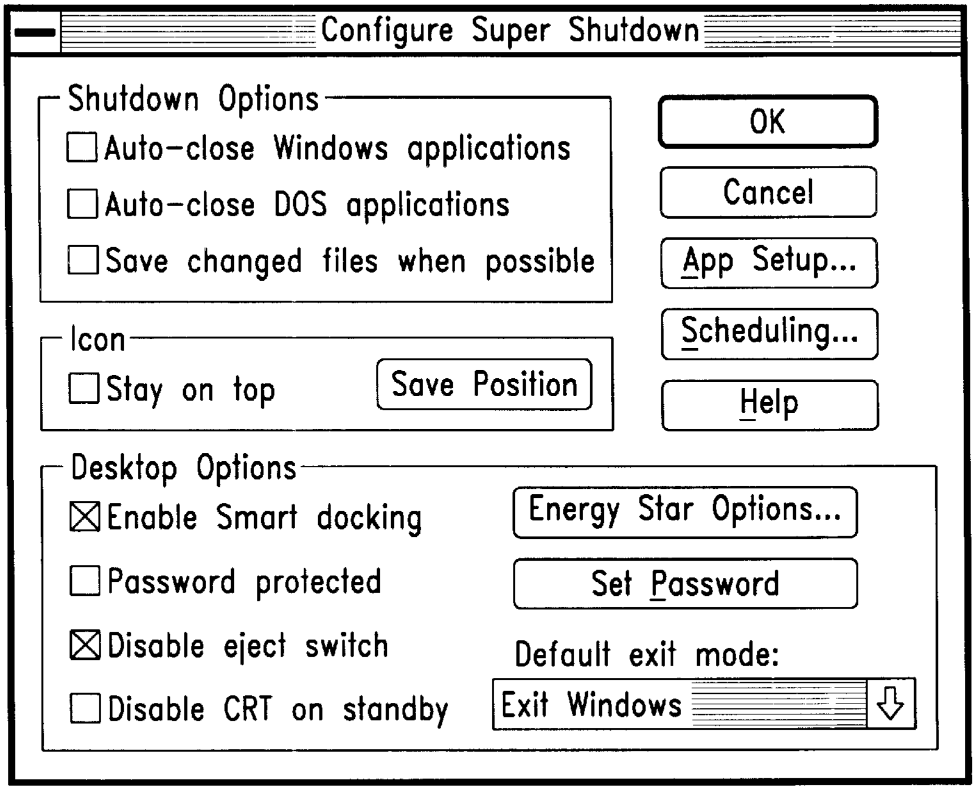

FIG. 41 illustrates Super Shutdown configuration menu.

Figure 42:
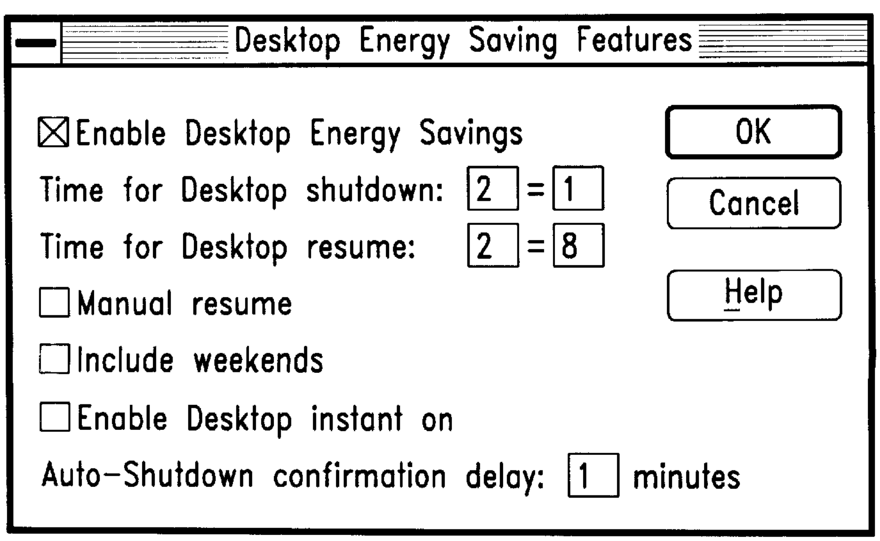

FIG. 42 illustrates DeskTop Energy Saving Features dialog box.

Figure 43:
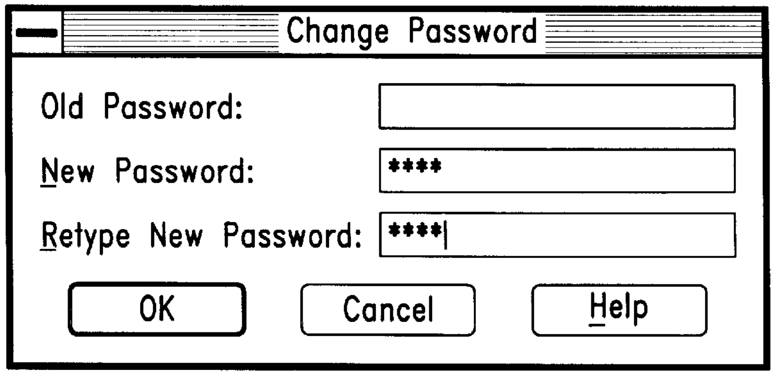

FIG. 43 illustrates Change Password dialog box.

Figure 44:
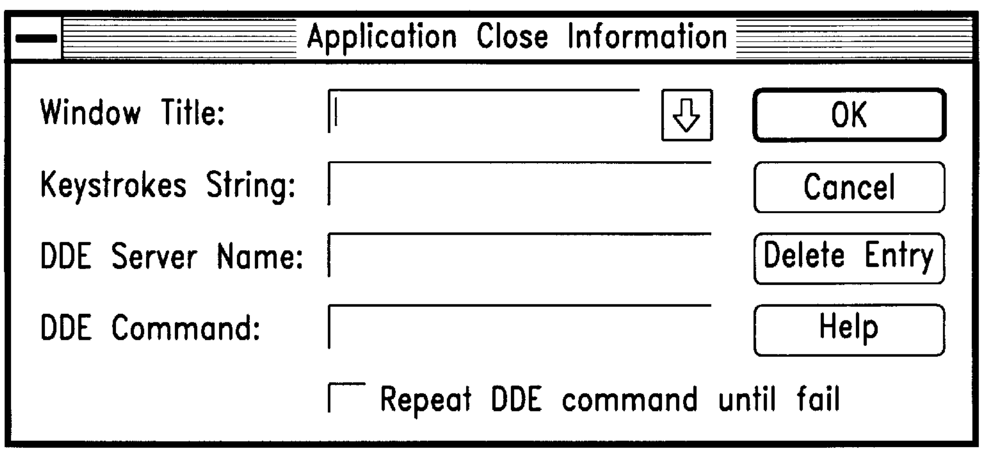

FIG. 44 illustrates Application DDE Information dialog box.

Figure 45:
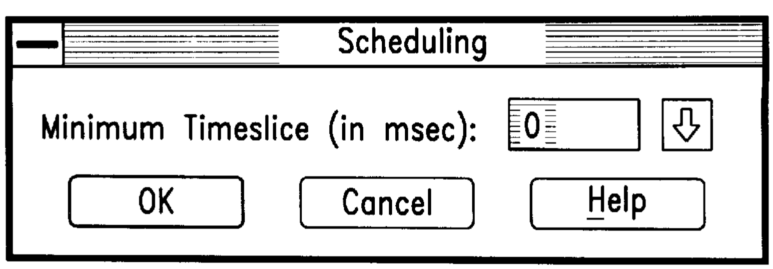

FIG. 45 illustrates Scheduling dialog box.

Figure 46:
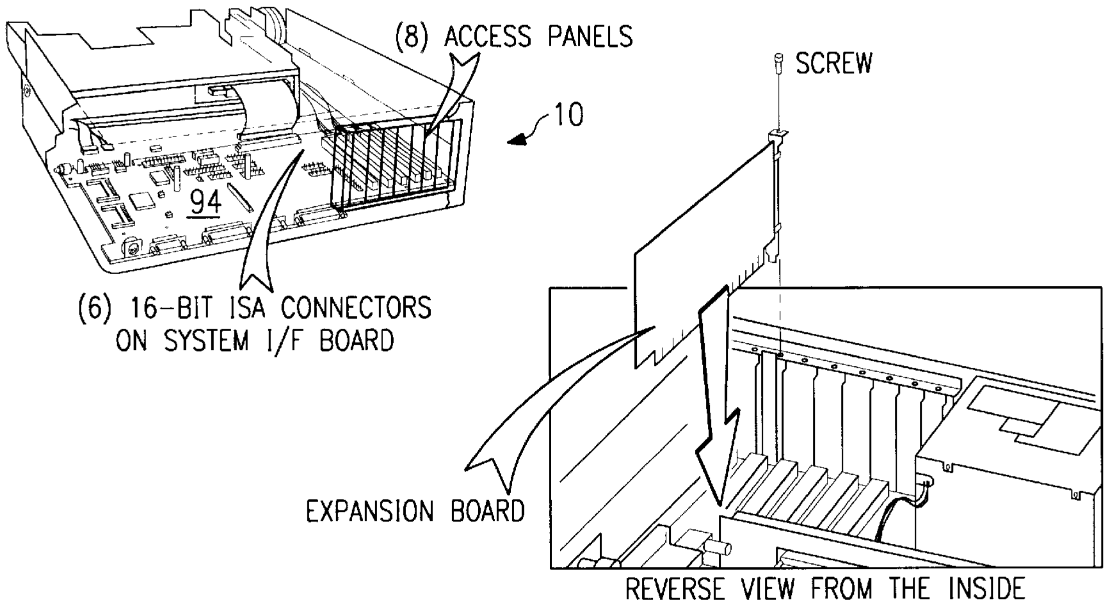

FIG. 46 illustrates internal connectors in the docking station that permit the installation of up to six industry standard (ISA or AT-type) Expansion Boards (network cards, video cards, internal Data/FAX Modem cards, etc.).

Figure 47:
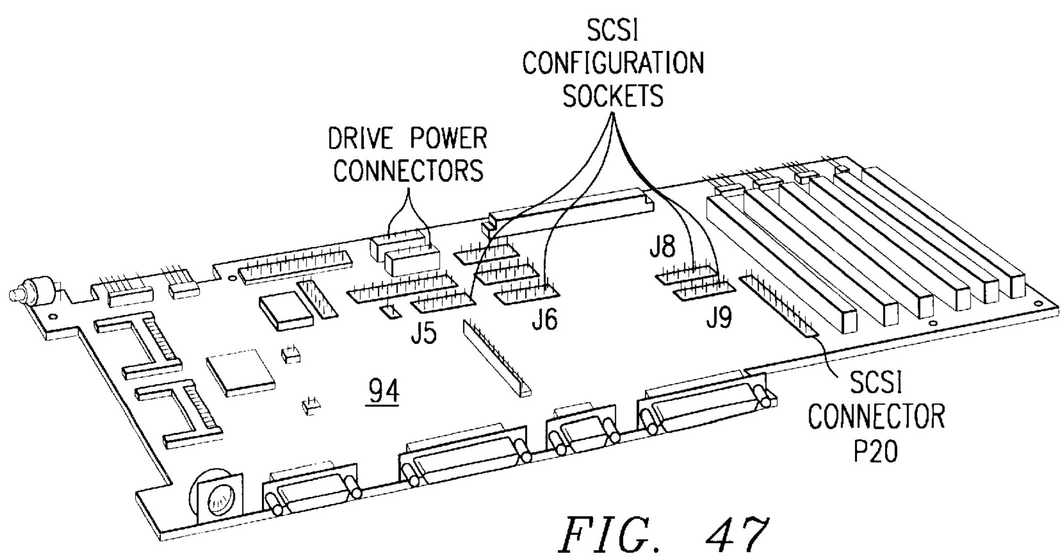

FIG. 47 illustrates built-in controllers and on-board signal/power connectors on the main board of the docking station that allow the installation of up to two internal SCSI Devices or a combination of up to seven internal/external SCSI devices.

Figure 48:
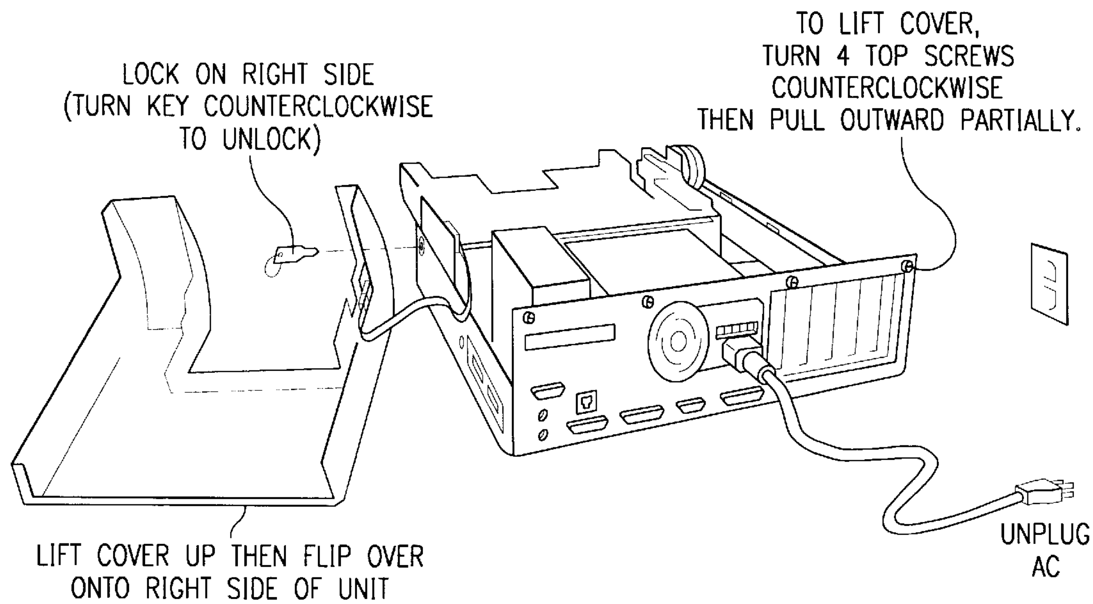

FIG. 48 illustrates the procedure for removing the top housing cover of the docking station.

Figure 49:
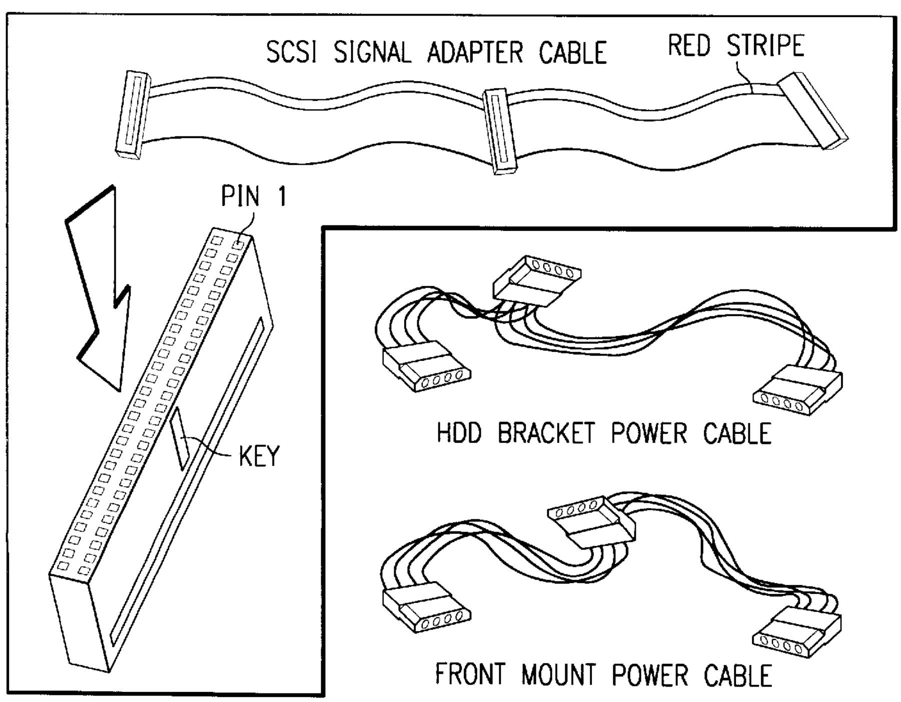

FIG. 49 illustrates mass storage device installation cables.

FIG. 50 illustrates removing the bezel.

FIG. 51 illustrates installing front mount devices.

Figure 52:
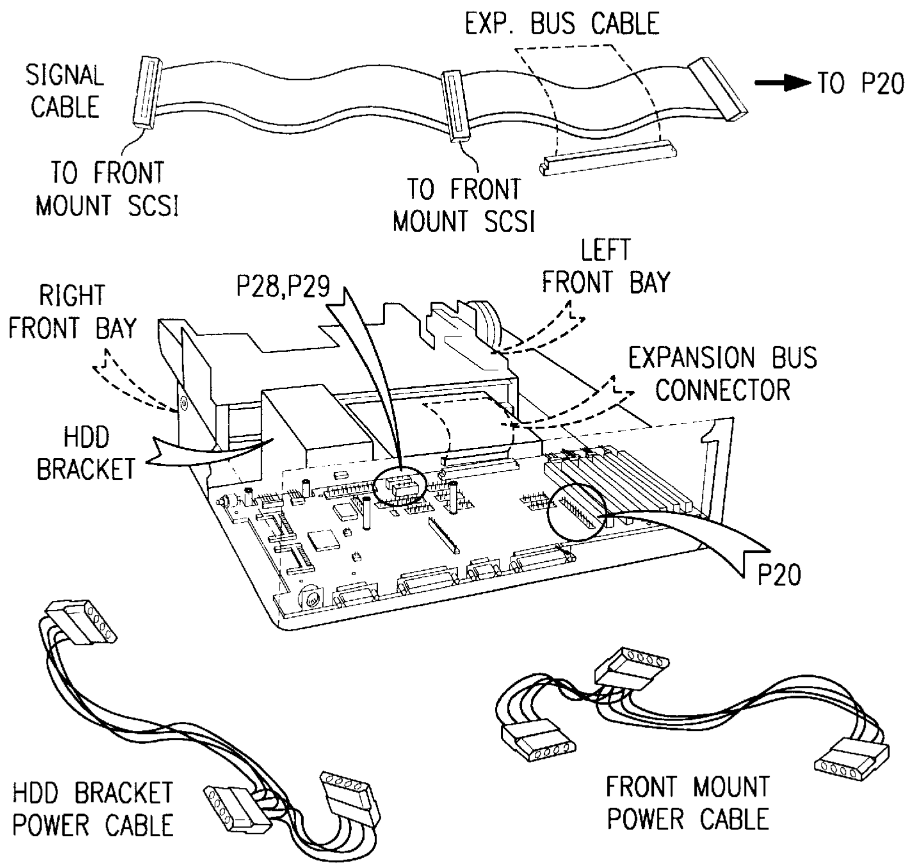

FIG. 52 illustrates install SCSI signal and power cables.

Figure 53:
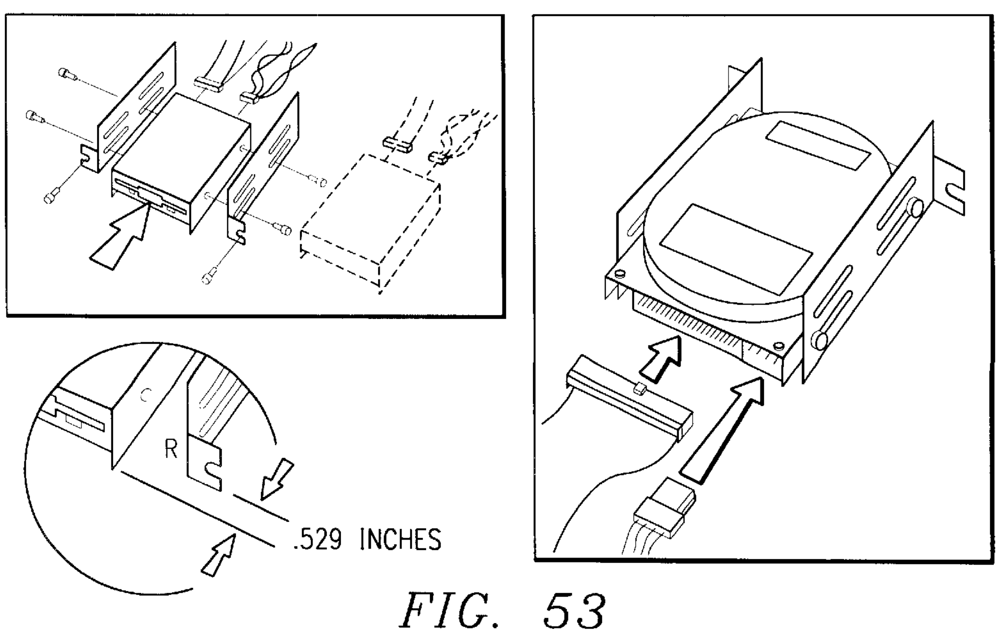

FIG. 53 illustrates attaching cables to drive.

Figure 54:
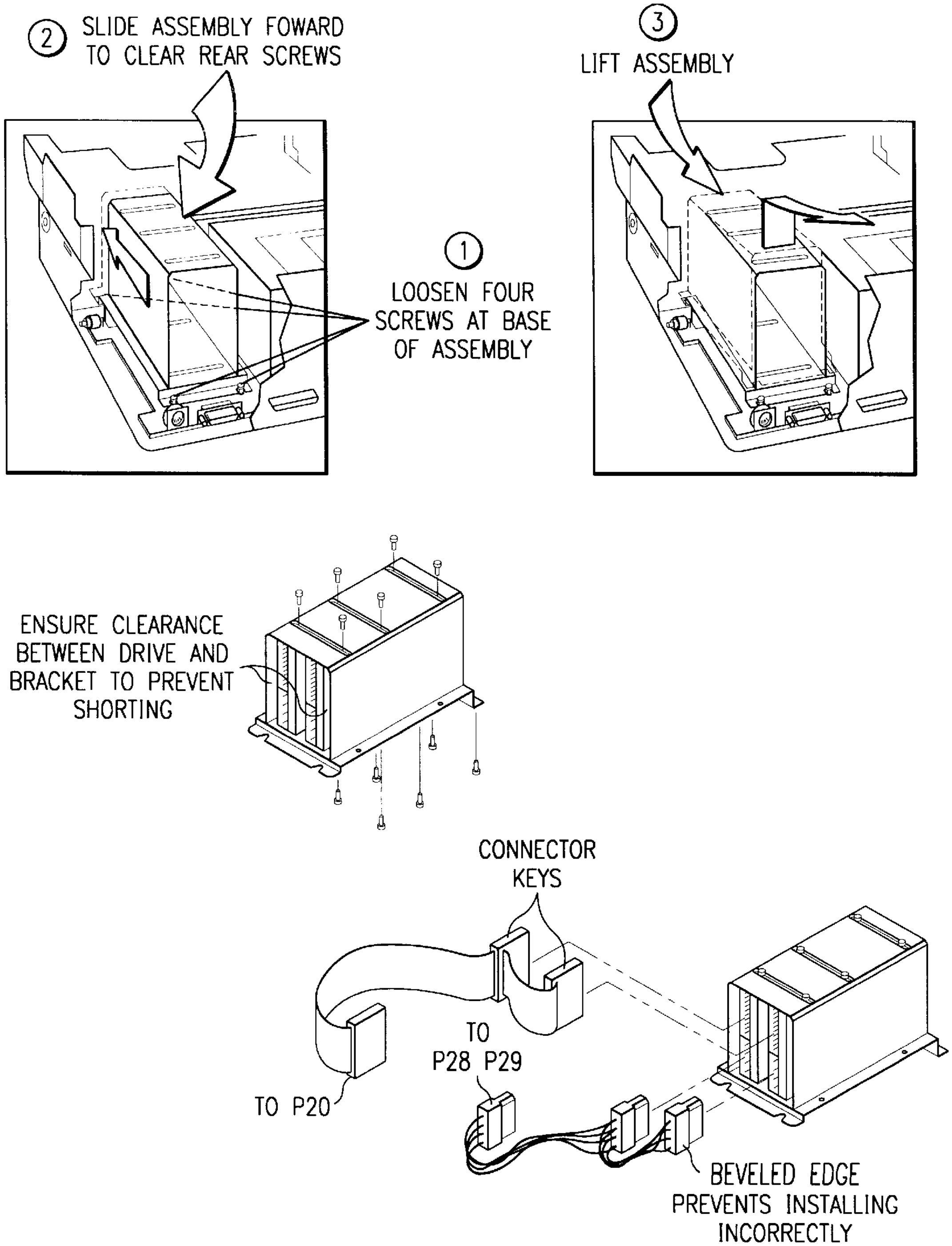

FIG. 54 illustrates installing internal hard drives.

Figure 55:
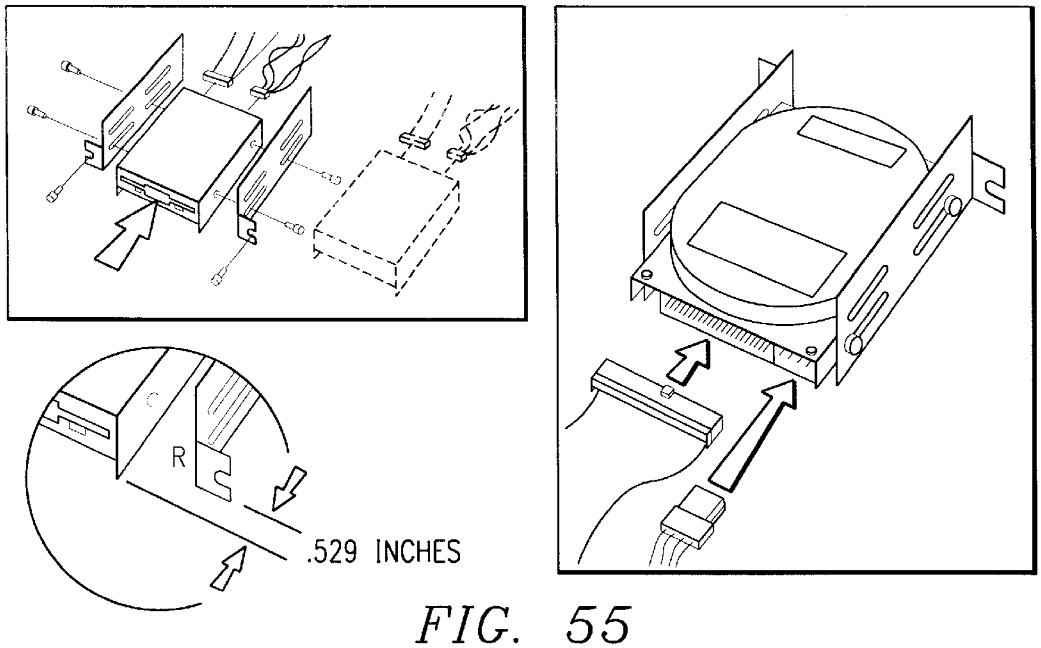

FIG. 55 illustrates installing front mounted SCSI devices.

Figure 56:
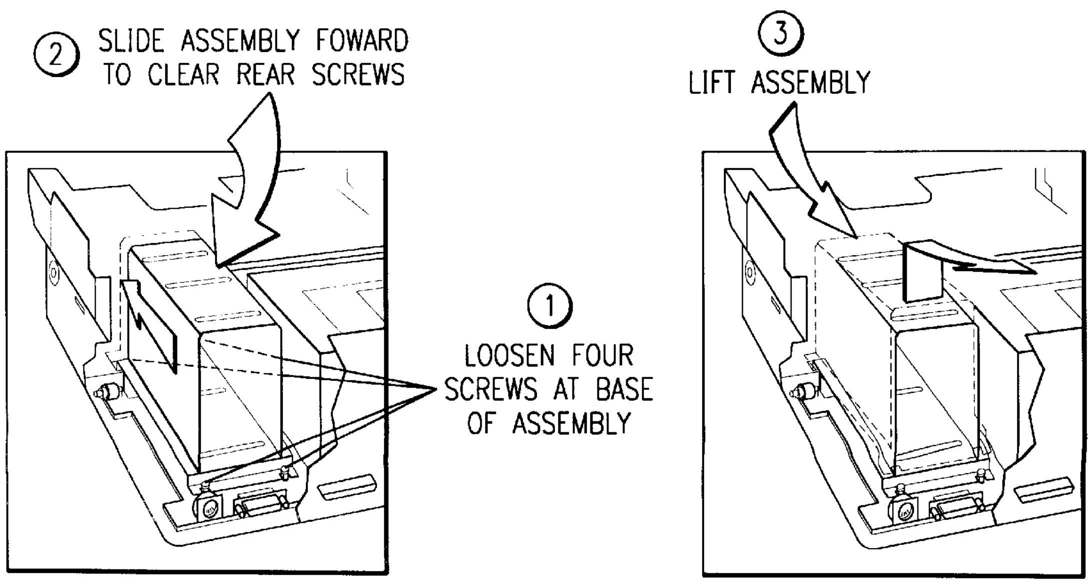

FIG. 56 illustrates removing the HDD bracket.

Figure 57:
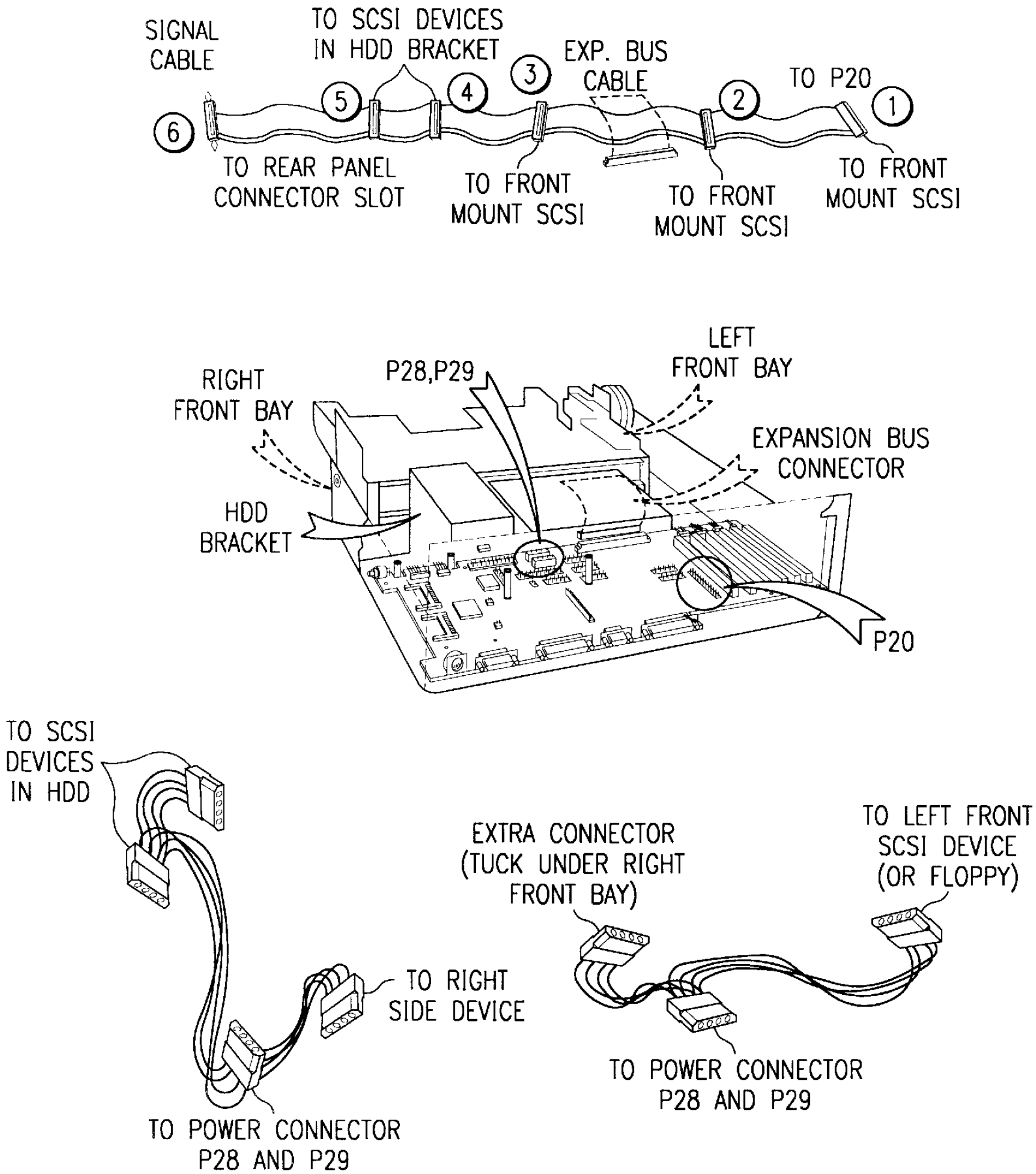

FIG. 57 illustrates routing of the 6-connector SCSI interface cable.

Figure 58:
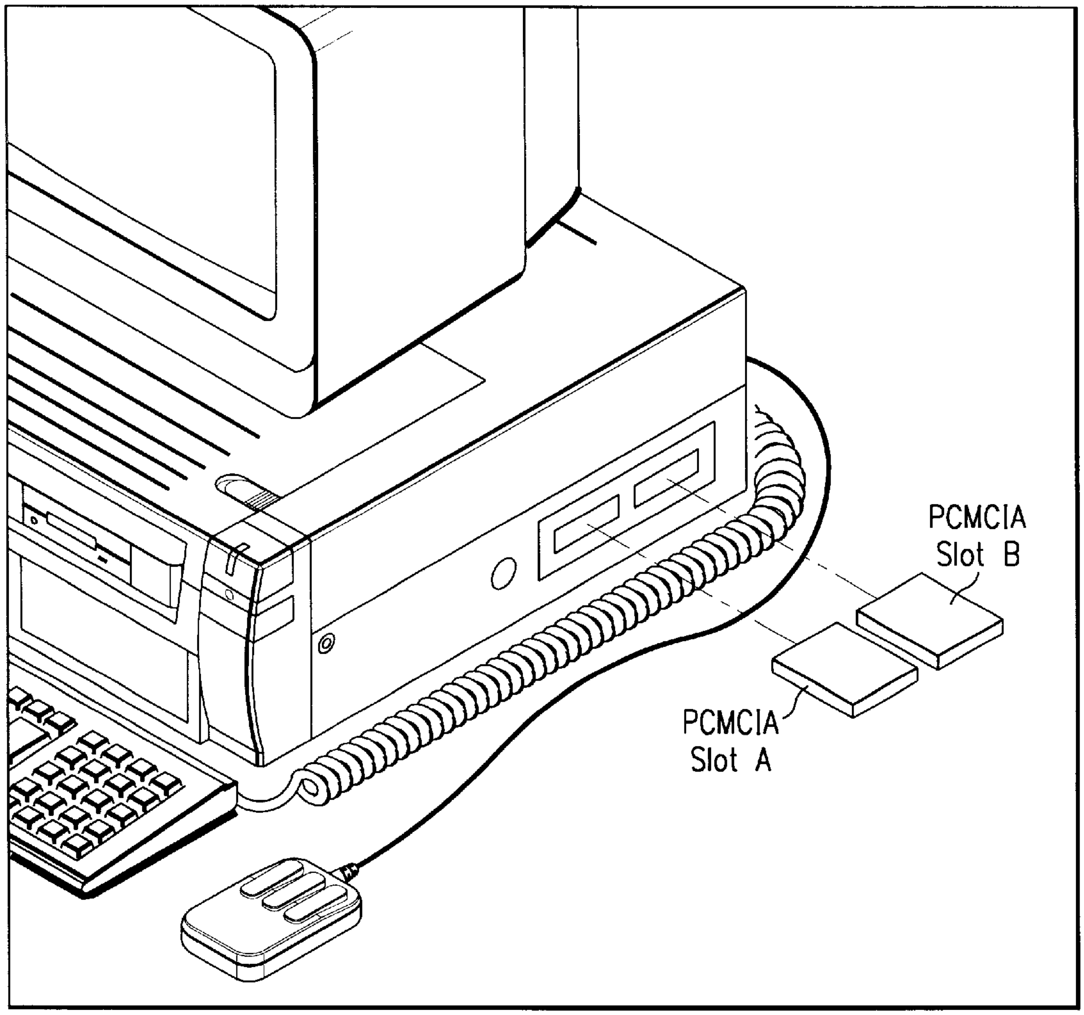

FIG. 58 illustrates installing PCMCIA card options.

Figure 59:
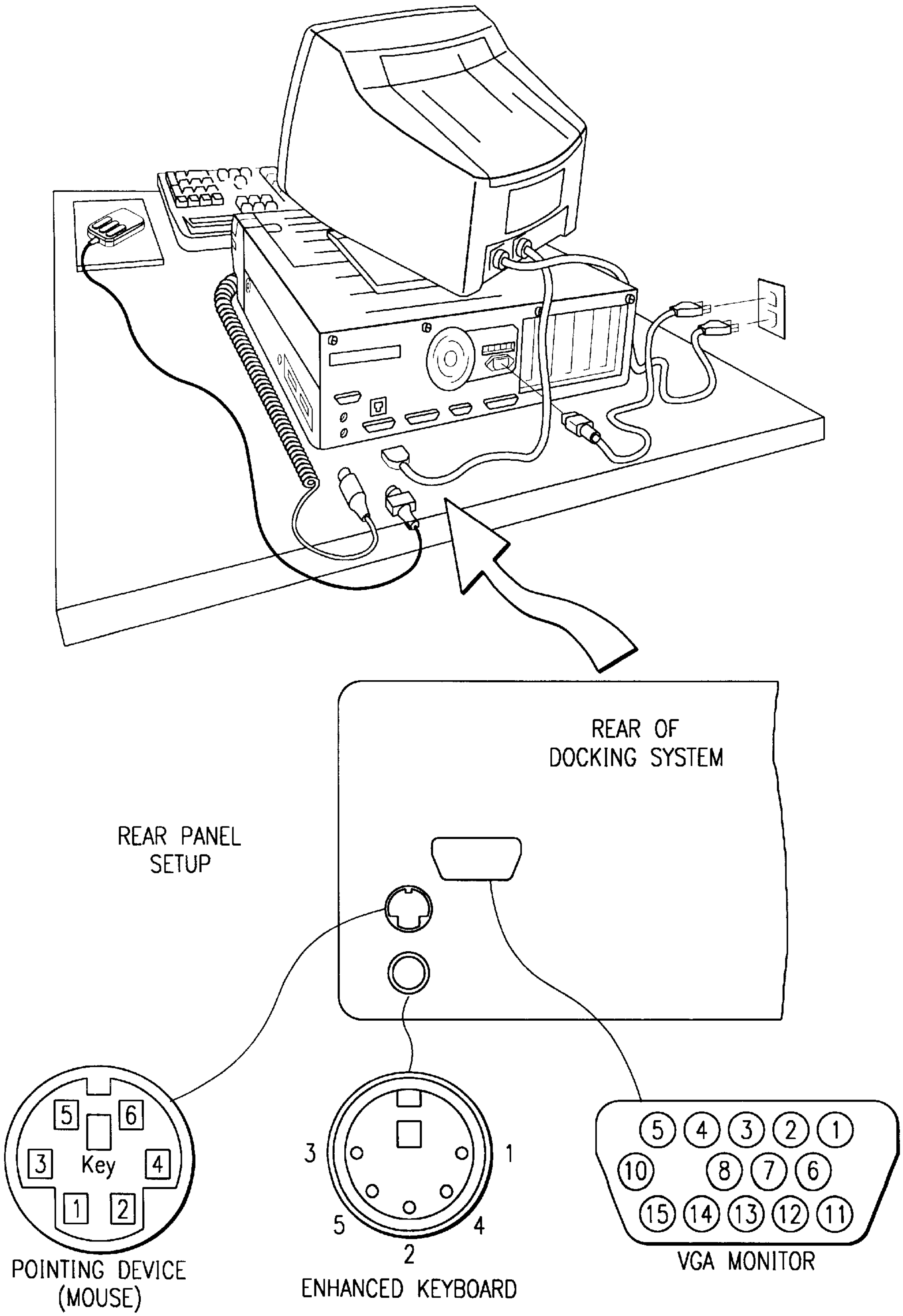

FIG. 59 illustrates installing a monitor, keyboard and mouse.

FIG. 60 illustrates modem telephone line connection.

FIG. 61 illustrates serial port connections.

Figure 62:
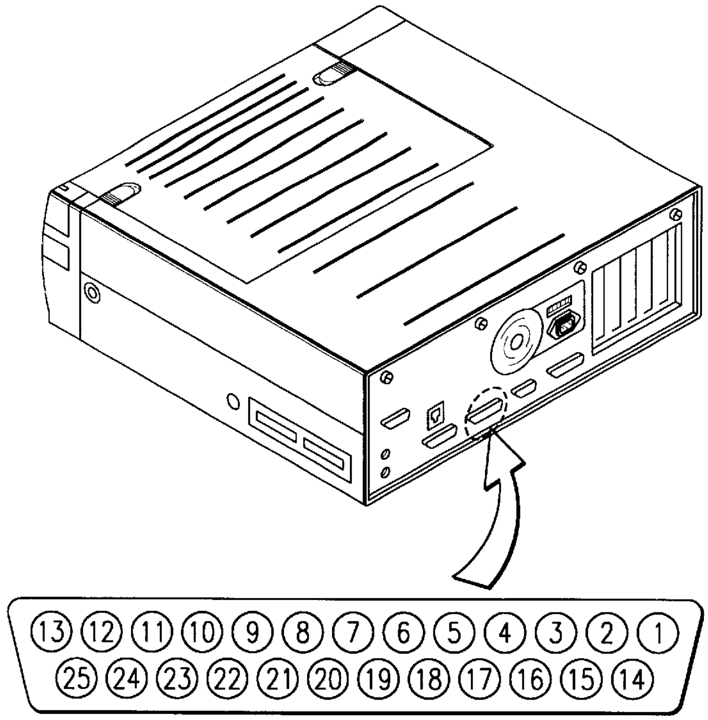

FIG. 62 illustrates a serial port connection.

Figure 63:
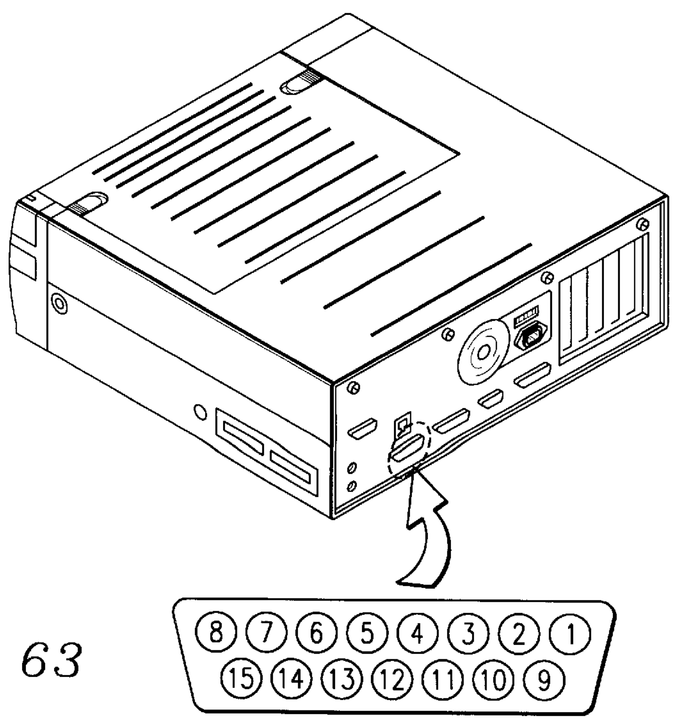

FIG. 63 illustrates attaching game port compatible devices.

Figure 65:
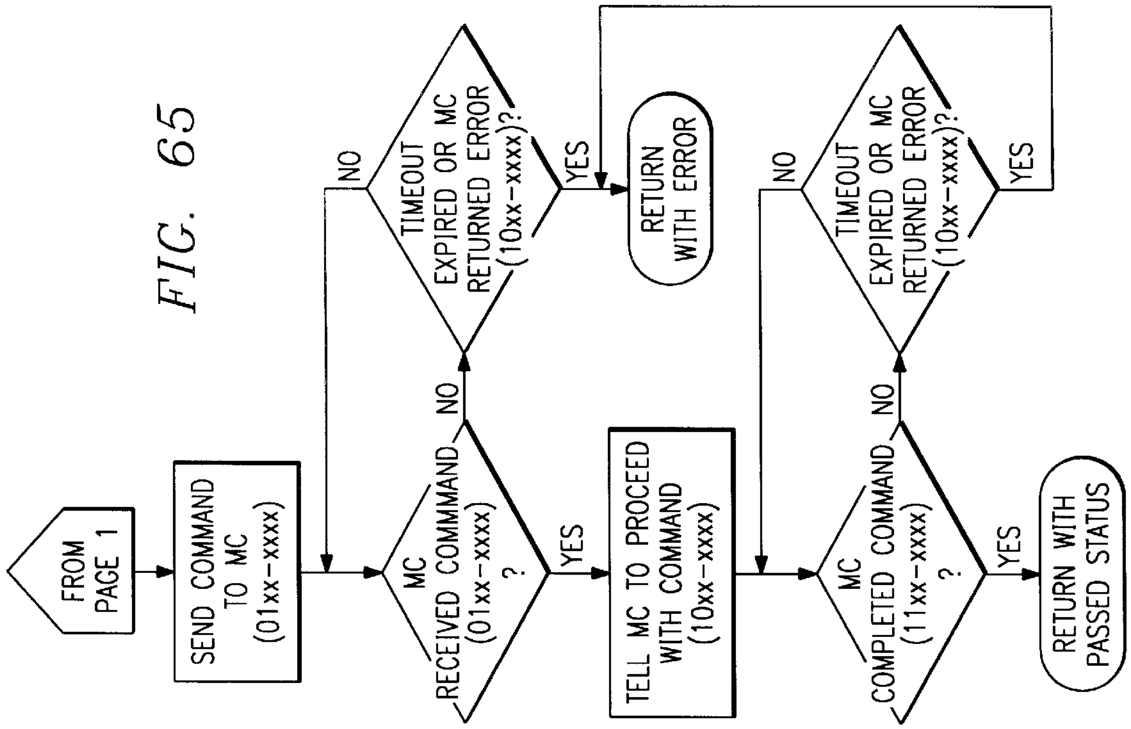
Figure 64:
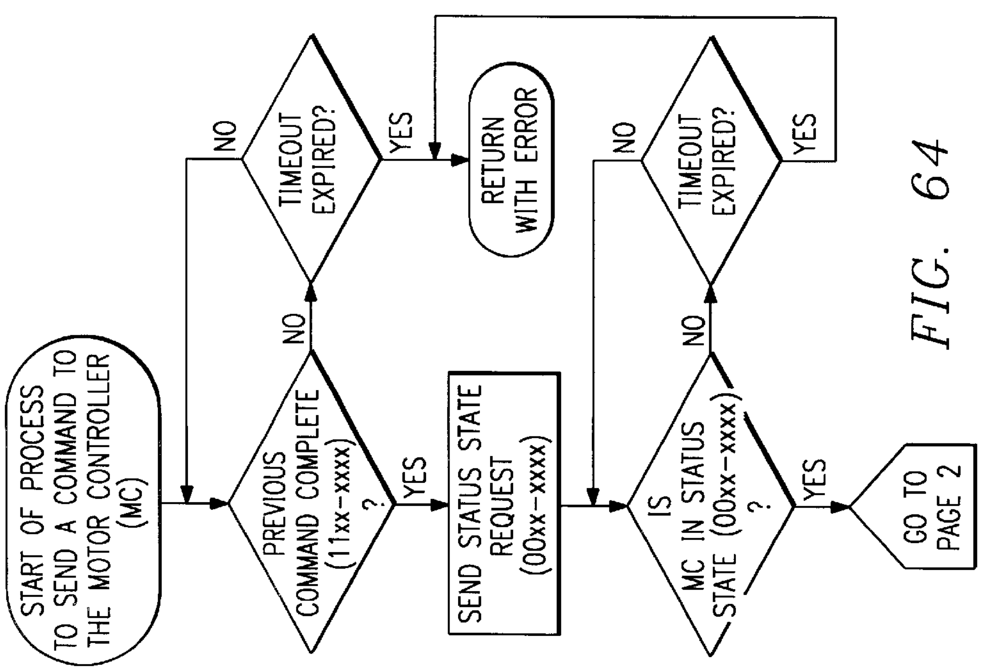

FIGS. 64 & 65 illustrate a flowchart of the portable computer's communication code for talking to the microprocessor in the docking station.

DETAILED DESCRIPTION OF THE INVENTION

Referring to FIG. 1 there is illustrated the docking station in accordance with the present invention. Docking station 10 includes a slot 11 for receiving a portable computer 13 shown in FIG. 2.

Figure 2:
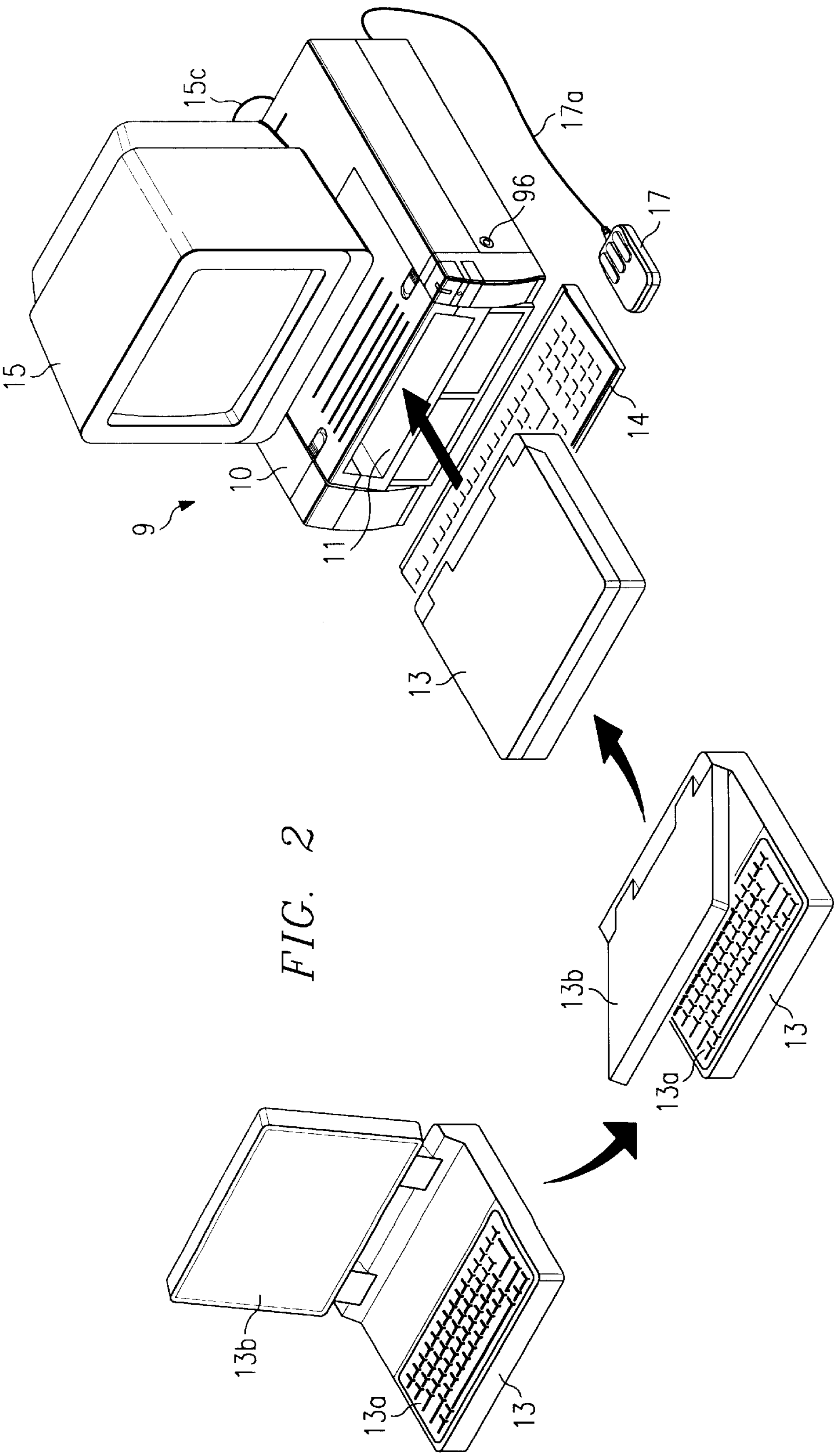
FIG. 2 is a sketch of a portable laptop computer being folded and applied to the docking station of FIG. 1 in accordance with the present invention.

FIG. 2 illustrates the progression of a portable laptop or notebook computer 13 from an open position to a partially folded position and after being folded is inserted into the opening or the slot 11 in the docking station 10. FIG. 2 further illustrates a docking station system 9 comprising portable computer 13 docked to docking station 10, a full size monitor 15, a mouse 17, a full size keyboard 14 and further may include, for example a LAN connection not shown, all connected to docking station 10. Portable computer 13 is powered down and loaded into docking station 10, as illustrated in FIG. 3. Plastic posts or pins 53 on the tray of docking station 10, illustrated in FIG. 10, fully insert into holes in the bottom of portable computer 13. A docking station user 20 depresses load/eject switch or button 16 and the portable computer 13 is driven by the docking station into its enabling position such that the portable computer is hooked up to the CRT display 15, a fullsize keyboard 14, power supply, a LAN network as well as any mouse connection, through its connections to docking station 10. User 20 may then depress standby/on power key and indicator 12 to turn power on to the docking station system 9.

Figure 4:
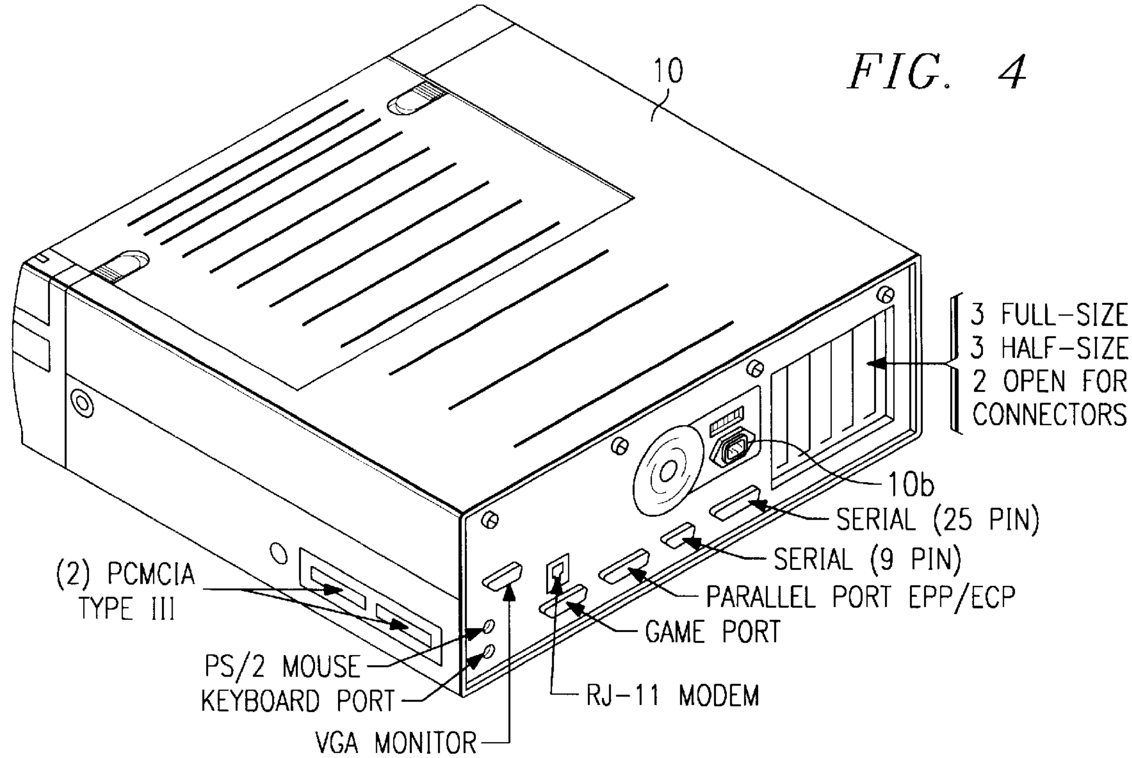
FIG. 4 is a rear view of the docking station of FIG. 1.

Referring again to FIG. 1, the top 10*a* of the base station 10 is used as a VGA monitor stand. There is the slot 11. There are below the slot 11 two drive bays 18 in which can be placed hard drives, either 3.5" or 5.25." These drive bays 18 may also be used for CD ROMs or tape backup devices. The bottom button 16 on the base station 10 can be used to load or eject the notebook or portable computer 13. There is also a battery charge indicator light 92 between load/eject switch 16 and standby/on power key and indicator 12, since the docking station, when docked to the portable computer, can be used to also charge the battery in the portable PC unit 13. There are also two PCMCIA type III card slots. The PCMCIA cards can be used to include Eithernet and Token ray operations. Referring to FIG. 4, there is illustrated a back view of the docking station 10 which shows places for connectors. There is a 25 pin 16550UART serial port and a 9 pin 16550UART serial port, a EPP/ECP parallel port, a port for the fullsize keyboard 14, a port for the mouse, a port for the VGA monitor next to the PCMCIA port and a power plug connector 10*b* to which a power cord is attached and plugged into a wall outlet. The portable may be, for example, a TravelMate 4000 Notebook computer made by Texas Instruments or may be one of the competition units made by Toshiba, IBM or Compaq.

Figure 5:
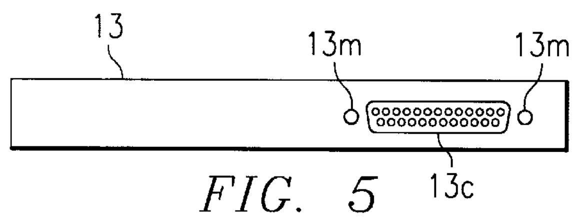
FIG. 5 is a rear view of the portable computer illustrating the sub-connector.
Figure 6:
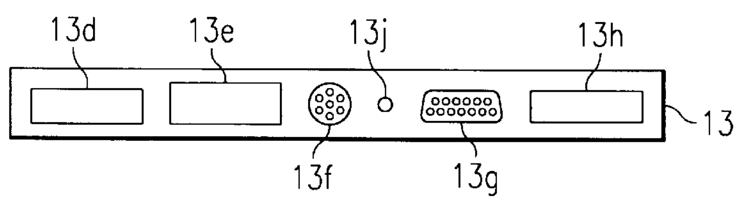
FIG. 6 is a left side view of the portable computer illustrating the connectors.

The portable computer 13, as illustrated in FIG. 2, includes a keyboard half 13*a* and a display half 13*b* in the cover. On the backed or hinged edge of the portable computer 13 there is a buss connector 13*c* as shown in FIG. 5 which is wired to the keyboard 13*a* and changeable power supply. As shown in FIG. 6 on the left side edge of the portable PC 13, there is a connector 13*d* for the serial buss, a connector 13*e* for a modem, a mouse connector 13*f*, a VGA connector 13*g* and a parallel port buss connector 13*h*. There is also an alignment pin hole 13*j*. On the right edge of the portable CPU13, there is a mouse connector 13*k* as shown in FIG. 3 to receive a mouse. The mouse connector is a connector pad such as used with the QUICK PORT connections of Texas Instruments TravelMates. As will be described in connection with the present invention, an automatic docking system will make the connections to the rear bus connector 13, to the modem connector 13*e*, to the VGA connector 13*g* and to the mouse connector 13*k* of the portable PC 13. The docking station 10 has internal wiring to couple the VGA input from the PC 13 connector 13*g* to the VG monitor output connector of the base station to which monitor 15 is connected by the cable 15*c* to couple the modem connector 13*e* to the modem output on the back of the base station 10, and to couple the mouse connector 13*k* output through the 15/2 mouse plug and mouse 17 via cable 17*a*.

Figure 8:
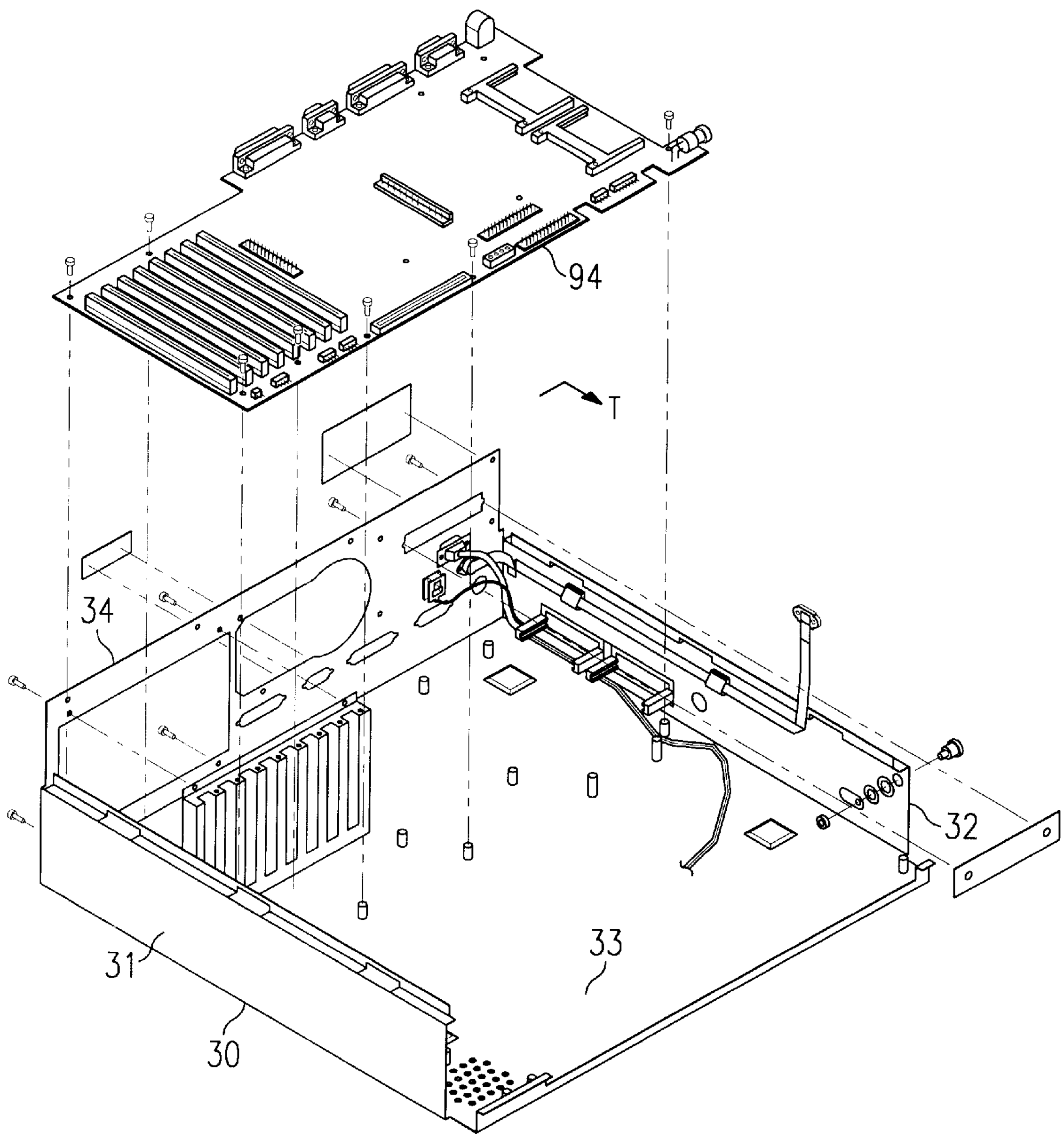
FIG. 8 is an exploded view of the docking station of FIG. 1 with the top cover, front cover, tray and associated parts removed.
Figure 9:
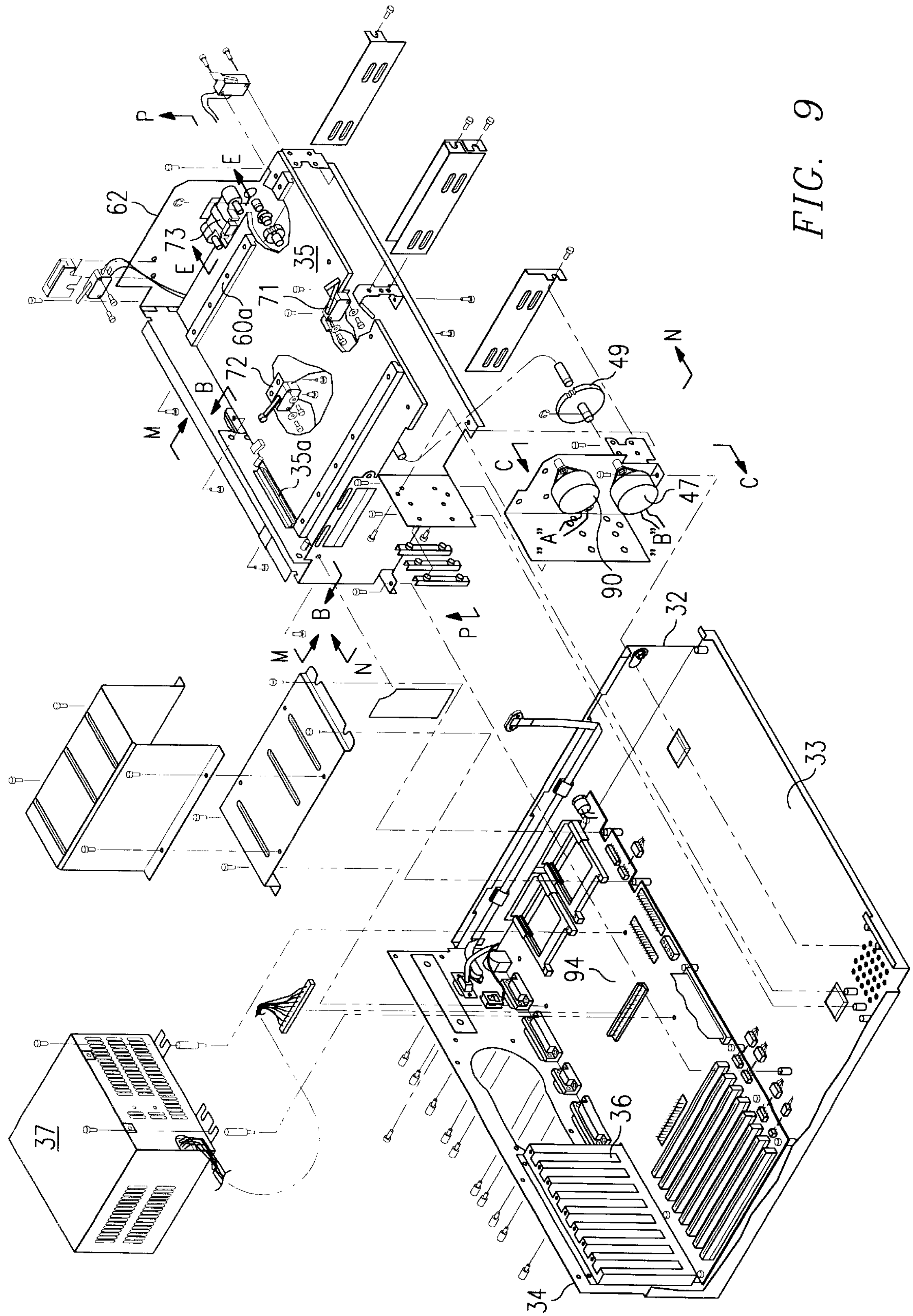
FIG. 9 is an exploded view of the docking station of FIG. 1 with the top cover and front cover removed.

FIG. 8 illustrates a partial view of the inside of the docking station 10, with the top housing cover 10*a* and front side wall removed, showing the housing 30 with the left side 31, right side 32, back side wall 34, bottom 33 and main board 94 removed from bottom 33. FIG. 9 illustrates a partial exploded view of the inside of docking station 10, showing main board 94 attached to bottom 33.

Figure 10:
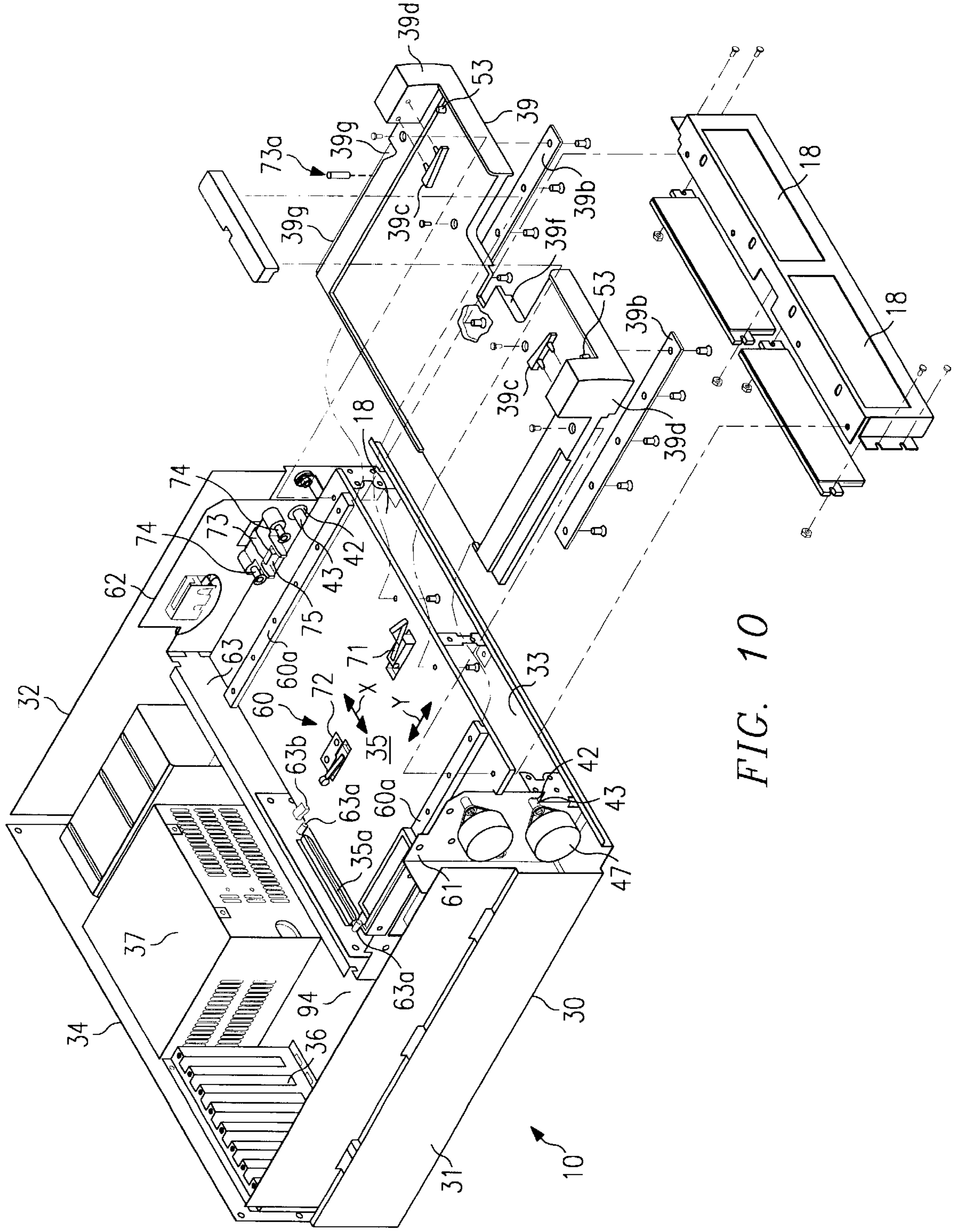
FIG. 10 is a partial exploded view of the docking station of FIG. 1 with the top cover and front cover removed.

Referring to FIG. 10 there is illustrated the docking unit 10, with the top housing cover 10*a* and front side wall removed, showing the housing 30 with the left side 31, right side 32, back side wall 34 and bottom 33. A tray section 35 in the housing is the active portion to load and unload the portable computer. Behind the tray section 35 there is a section 36 of expansion slots for full size and half size 16 bit 15A card slots expanded ports, power supply section 37 and other parts of the docking station. As stated previously in the space below the tray section, there are bays for putting the hard drives. The tray section 35 includes side walls 61 and 62, back wall 63 mounted to floor 33. A shelf 60 extends between side walls 61 and 62 and back wall 63. A cross shaft 43 extends from left side wall 61 to side 62. This cross shaft 43 is mounted in bearings 42 at the side wall 61 and 62. The system uses two motors. A first motor 47 is connected to the cross shaft 43 for driving a tray 39 in an out of the docking station 10.

As illustrated in FIG. 11, the motor 47 is mounted to a pinion gear 48 which in turn drives an idler cluster gear 49, which in turn drives cluster gear 50 at the drives tray and the cross shaft 43, that in turn drives the tray 39 via the drive gear 51. The tray 39 slides in the direction over shelf 60. The tray 39 includes pins or posts 53 that index or locate the computer 13 during the mating of the connectors. The bottom of the portable computer 13 includes holes 13*l* that match the pins 53 as shown in FIG. 12. The drive gears 50 and 51 on each end of the shaft 43 mate intimately with intrical racks 39*c* in the tray structure 50 at the bottom. As shown in FIG. 13 racks 39*a* that extend in the Y direction engage gears 50 and 51. The tray is confined to a linear motion via guides 39*b* on the tray 39 that slide under guides 60 a on the shelf. The guides are collinear with the rack access and normal to the cross shaft 43. There are cut outs in the shelf 60 such that the racks 39*a* at the bottom of the tray 39 will mate with the gears 50 and 51 at each end of the shaft 43. The tray 39 also has side guides 39 on side posts 39*d* which broad to a narrowing wedges illustrated at opposite ends at the front of the tray. Front and back switches 71 and 72 in openings in the shelf 60 and tray 39 aid in controlling the drive motor 47. The first presence of the portable computer 13 on the tray 39 is indicated by the closing by depression of the front switch 71 which extends through notch 39*f* in tray 39. When the tray reaches the position of switch 72, the drive motor 47 is slowed down and controlled to aid in connecting the bus connector 13*c* to a mating bus connector 35*a* in rear wall 63 by stepping the motor 47 so that the rear bus pins of the connector 13*c* match with the bus sockets of connector 35*a* of the docking station 10. At the rear wall 63 of the tray section 35, on either side of the bus pin connector 35*a*, there are pins 63 that are spring loaded and locked in the extended position that match with aligned holes 13*m* in the personal computer 13 on either of the bus connector 13*c*. As the computer 13 is driven by the tray 39, the pins 63*a* extend into these apertures 13*m*. A spring loaded extension 63*b* from the rear wall 63 when it touches the rear of the computer PC 13 releases the locked pins 63*a* and the drive motor 47 is stepped according to the position of the drive tray to make the rear connector 35*a* make to the bus pins 13*c* of the computer PC 13. Stop sensors aid in starting, running and stopping the drive chain motor 47 during the docking operation.

Figure 7:
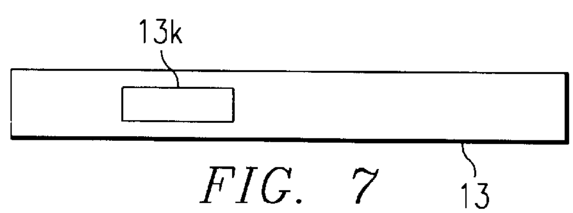
FIG. 7 is a right side view of the portable computer illustrating the mouse connector.

Also molded on the tray 39 is a cam edge 39*g* with a notch that extends in the X-axis direction toward the center of the tray 39. A spring mounted mouse connector mechanism 73 is mounted on the side wall 62 of the tray section 35. The mechanism 73 includes a cam follower or pin 73*a* that extends from spring mounted connector mechanism 73. The mechanism 73 is mounted along a pair of shafts 74, such that as the tray moves in the housing the cam follower 73*a* follows the edge 39*g* of the tray and when it reaches the portion of the X-axis notch that extends inwardly the spring operation of the connector mechanism to extend laterally and move the connector 75 for the mouse into the side of the computer PC 13 at connector 13*k* in FIG. 7.

Figure 14:
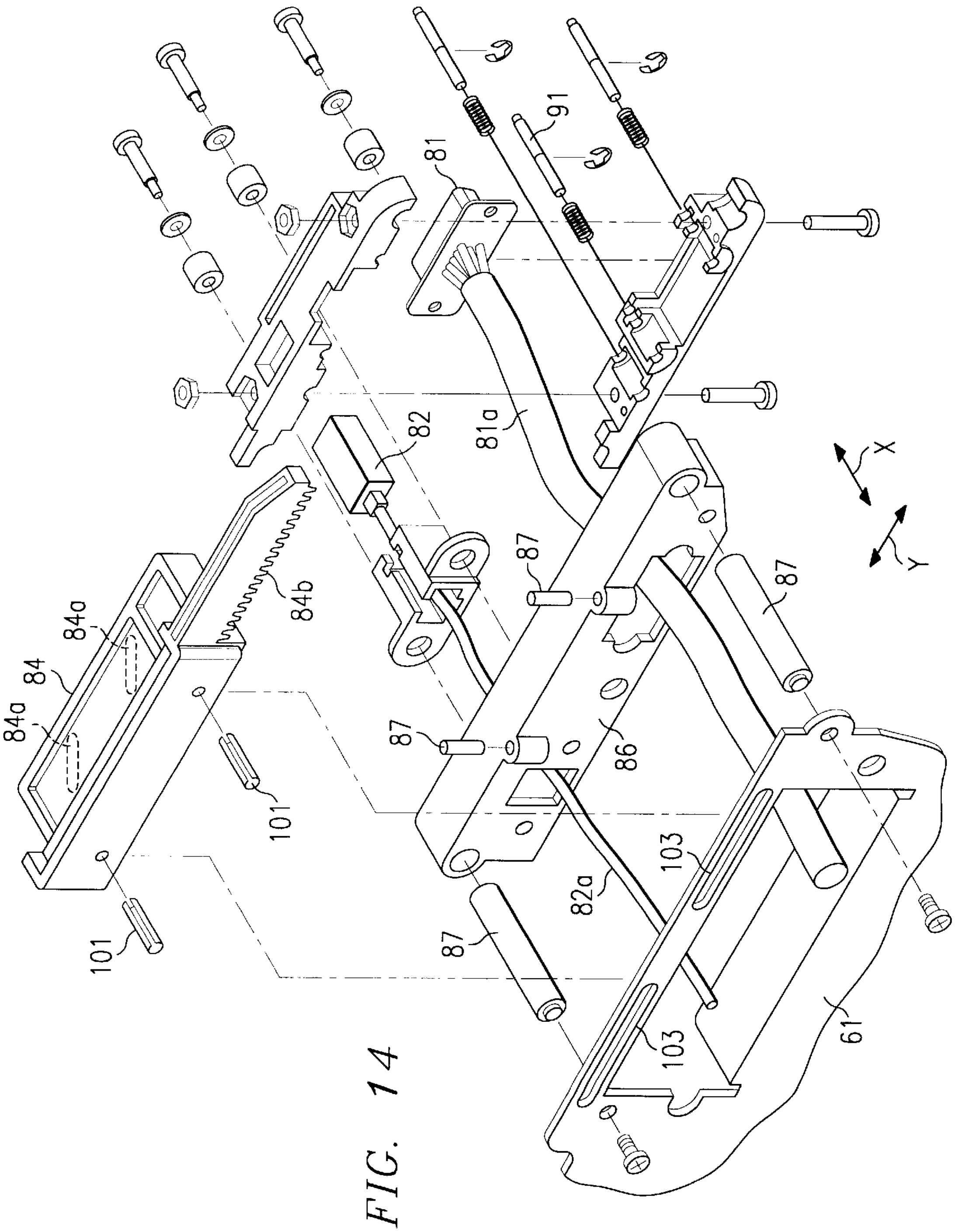
FIG. 14 is an exploded view of the X-axis drive connector mechanisms of the docking station of FIG. 1.
Figure 15:
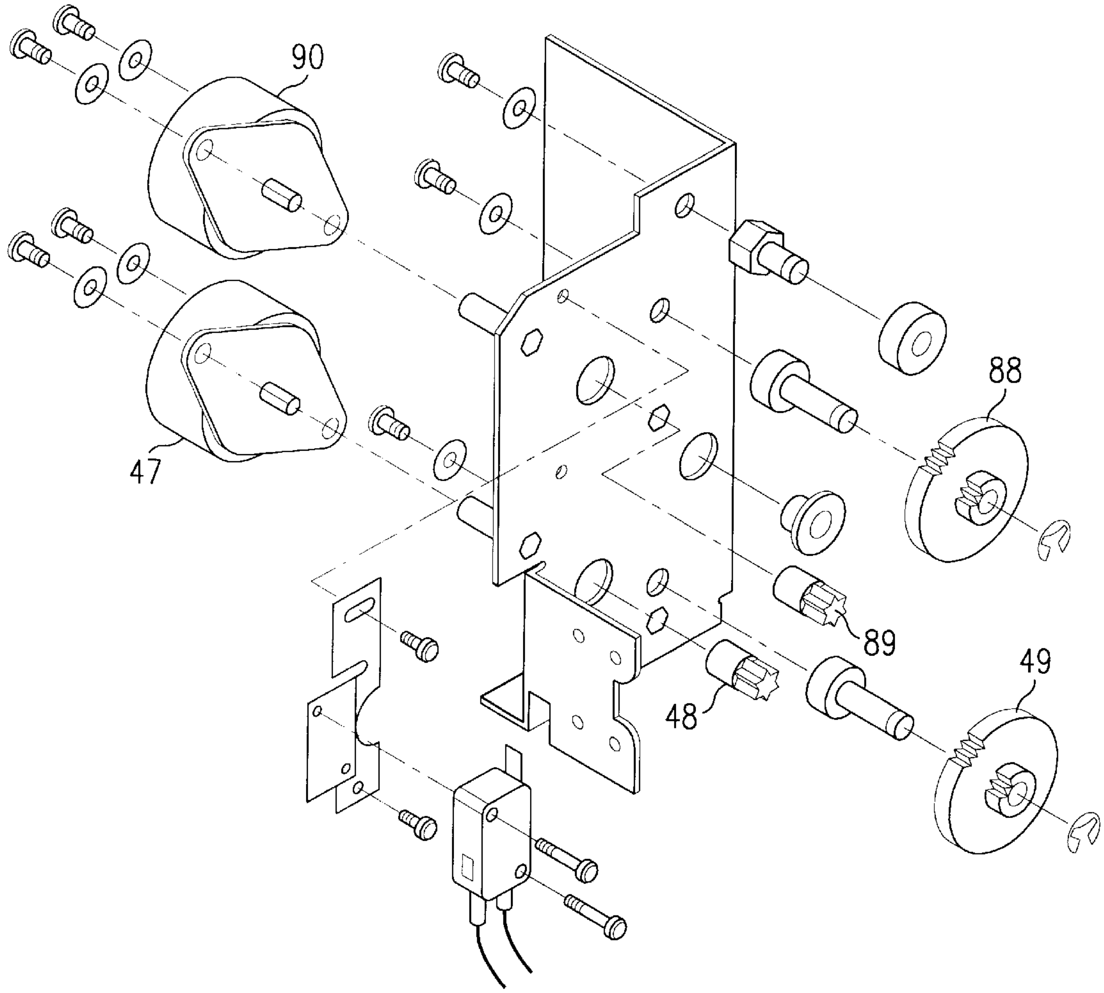
FIG. 15 is an exploded view of the drive motors and mounting of the docking station of FIG. 1.

In addition to a Y-axis drive, the docking station is equipped with a side or X-axis drive capability from which to make connections with many side connectors and in particular the connectors on the portable computing device 13. In particular these side connectors are the modem connector 13*e* and VGA connector 13*g* on the left side of the portable computing device 13. Referring to FIG. 14 horizontal moving connector holder 46 movable in the X-axis direction is mounted on two rods 87 which are rigidly attached to side wall 61 of section 35. The modem connector 82 and VGA connector 81 shown are mounted to the holder 16 and side with the holder 16. The cables 82*a* and 81*a* are coupled to the connector 82 and 81 at one end and to the modem and VGA connectors on the back and side of the station 10 as seen in FIG. 4. A rack cam slate 84 is mounted to this laterally moving holder via a pins 87 which slide in inclined slots or groves 84*a* mounted in the lower surface of the traversing rack/cam plate 24. The rack/cam plate includes at one end thereof a rack 84*b*. This rack/cam plate 84 is mated at rack 84*b* to a cluster gear 88, spur gear 89 which is driven by the second drive motor 9*u* as shown in FIG. 15. The result in linear motion from the rack cam plate 84 being the driven by the cluster gear 88 moves the cam plate 84 in the Y-axis direction also parallel to the tray 39 mechanism. The inclined slots 84*a* in the rack/cam plate 24 convert this via pins 87 to X-axis motion to move holder 86 to plug and unplug the side connectors 13*e* and 13*g* on a computer 13 spring loaded guide pin 91 is aligned with holder 13*j* in portable PC 13 shown in FIG. 6. Thus, this docking device automatically connects up, fully automatic, in biactual connector directions.

In operation, drive motor 47 first drives in the Y-axis direction to mate connector halves 35*a* and 13*c* with the rear connector and connector halves 13*k* and 74 and then following thereafter the other motor 90 is energized which then drives the side connectors 81 and 82. When the unit is to be disconnected and the computer is to be ejected, first the side access connectors 81 and 82 are pulled back and then the drive motor 47 drives the tray out with the computer 13. Where mating connectors are described one of the connectors is a connector half that is either male or female while the other connector is a mating connector half of female or male respectively.

To remove portable computer 13 from docking station 10, docking station user 20 depresses load/eject switch or button 16 or double click on the Super Shutdown ICON on the lower left-hand corner of windows (if programmed/setup appropriately). The internal motor-driven platforms and connector mating mechanisms disconnect all necessary cabling, and intelligent software automatically saves all open files (if enabled), closes all applications (if enabled) and ejects the portable computer much like a video tape is ejected from a video tape player. If the docking station is protected against unauthorized removal by an optional security switch 96, as illustrated in FIG. 2, the security switch must be unlocked (if previously locked) to enable the load/eject switch.

Figure 16:
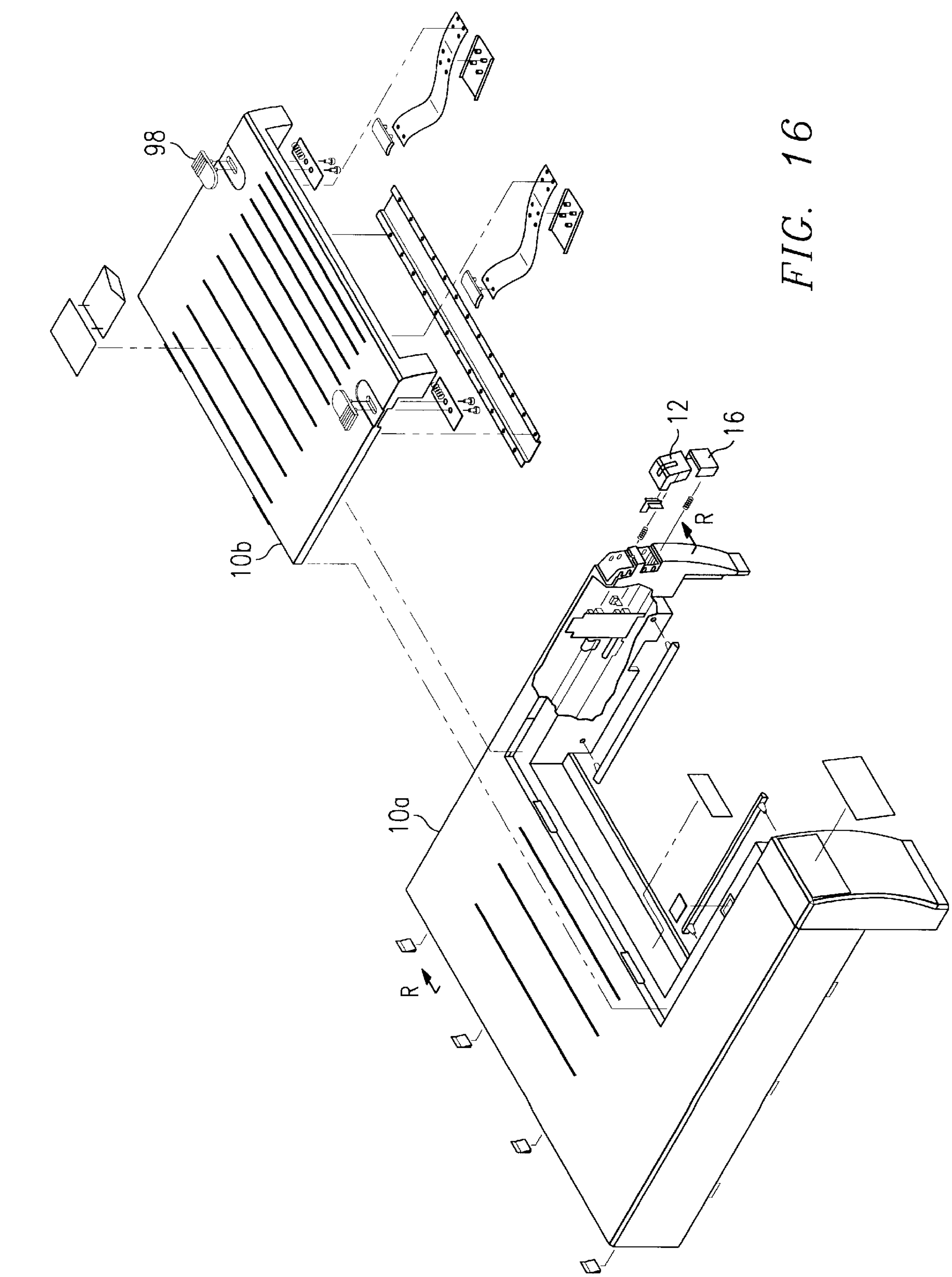
FIG. 16 is an exploded view of the top cover of the docking station of FIG. 1.
Figure 17:
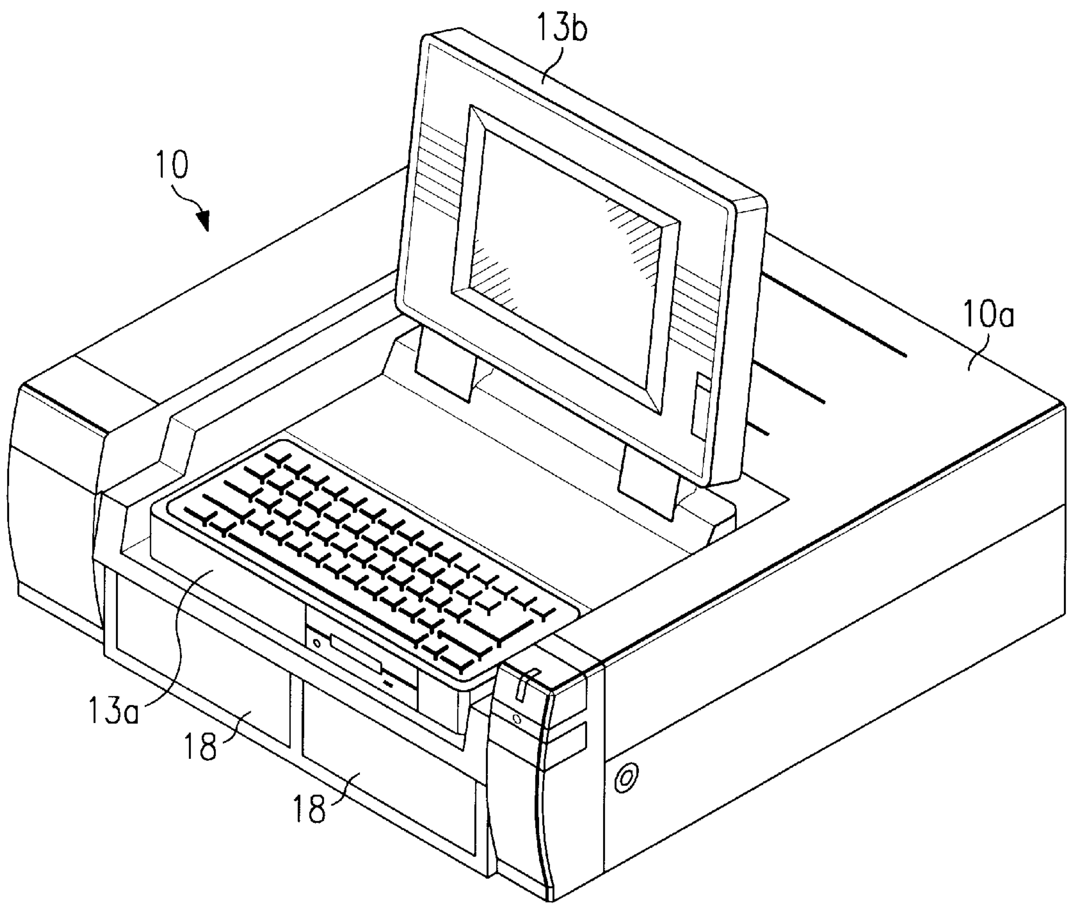
FIG. 17 is a front perexecutive view sketch of the docking station in accordance with another embodiment of the present invention.

With the docking station in a horizontal position, the portable computer can be opened to permit using the portable computer's internal display and keyboard (e.g. for running diagnostics). Power to docking station 10 is turned off by pressing standby/on power key and indicator 12 if at DOS or single clicking on Super Shutdown icon and selecting "Exit Windows and Suspend" (if enabled). Next, two top lid access slide latches 98 on the removable portion 10*b* of top housing cover 10*a,* illustrated in FIGS. 2 and 16, are slid inward. Removable portion 10*b* is removed from top housing cover 10*a* and set aside. Keyboard 14 and monitor 15 are then disconnected from the rear of the docking station. The portable computer may now be opened up, as illustrated in FIG. 17. Standby/on power key and indicator 12 is pressed to turn power on to the docking station system (the Standby/On LED should glow, green in the present case). There are no special configuration setups that need to be performed. The intelligence of the docking system will detect if a monitor is present and automatically display on the CRT. If no CRT is attached, the system defaults to the default setting configured in the portable computer setup program (LCD only, SIMUL or CRT). The portable keyboard and internal display are now ready for use.

Figure 18:
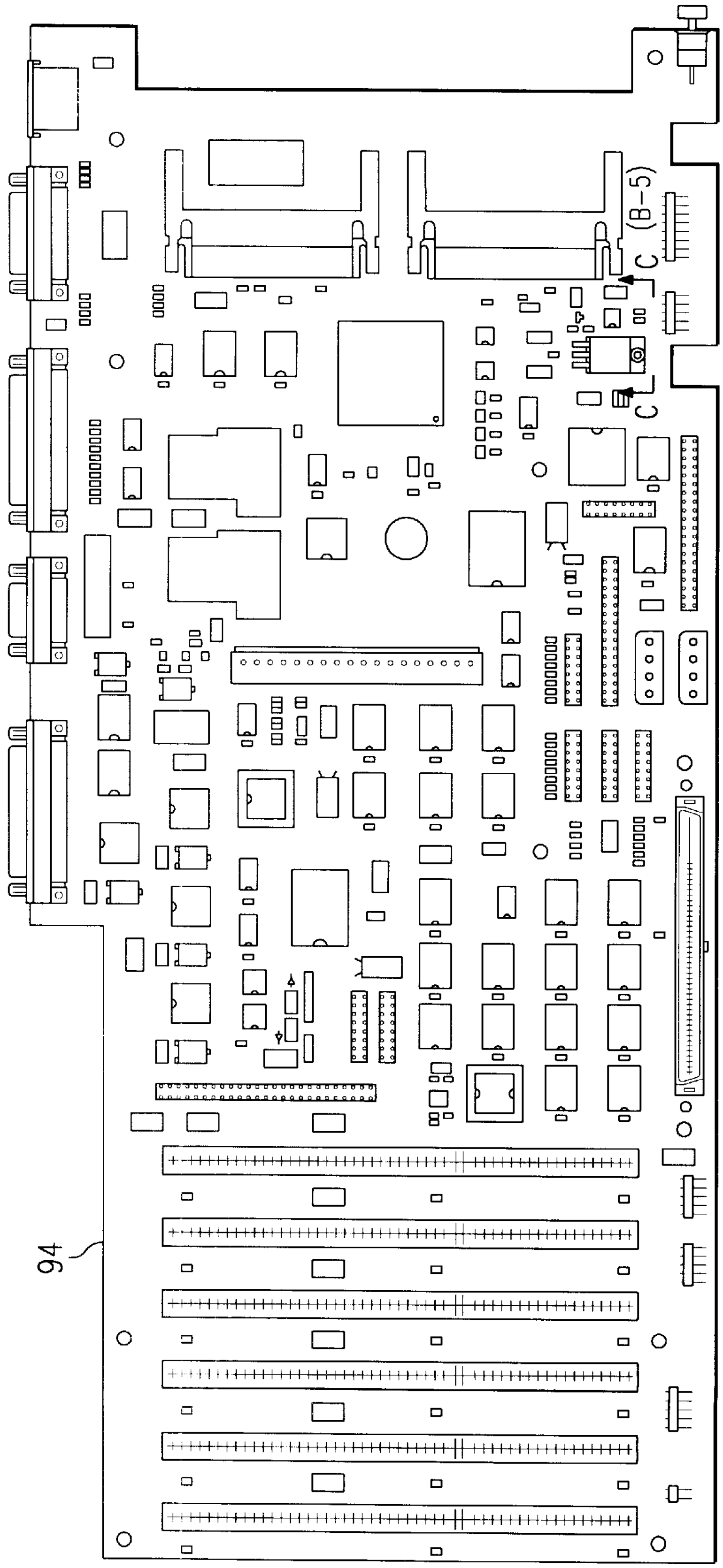
FIG. 18 is a top plan view of main board 94.
Figure 19:
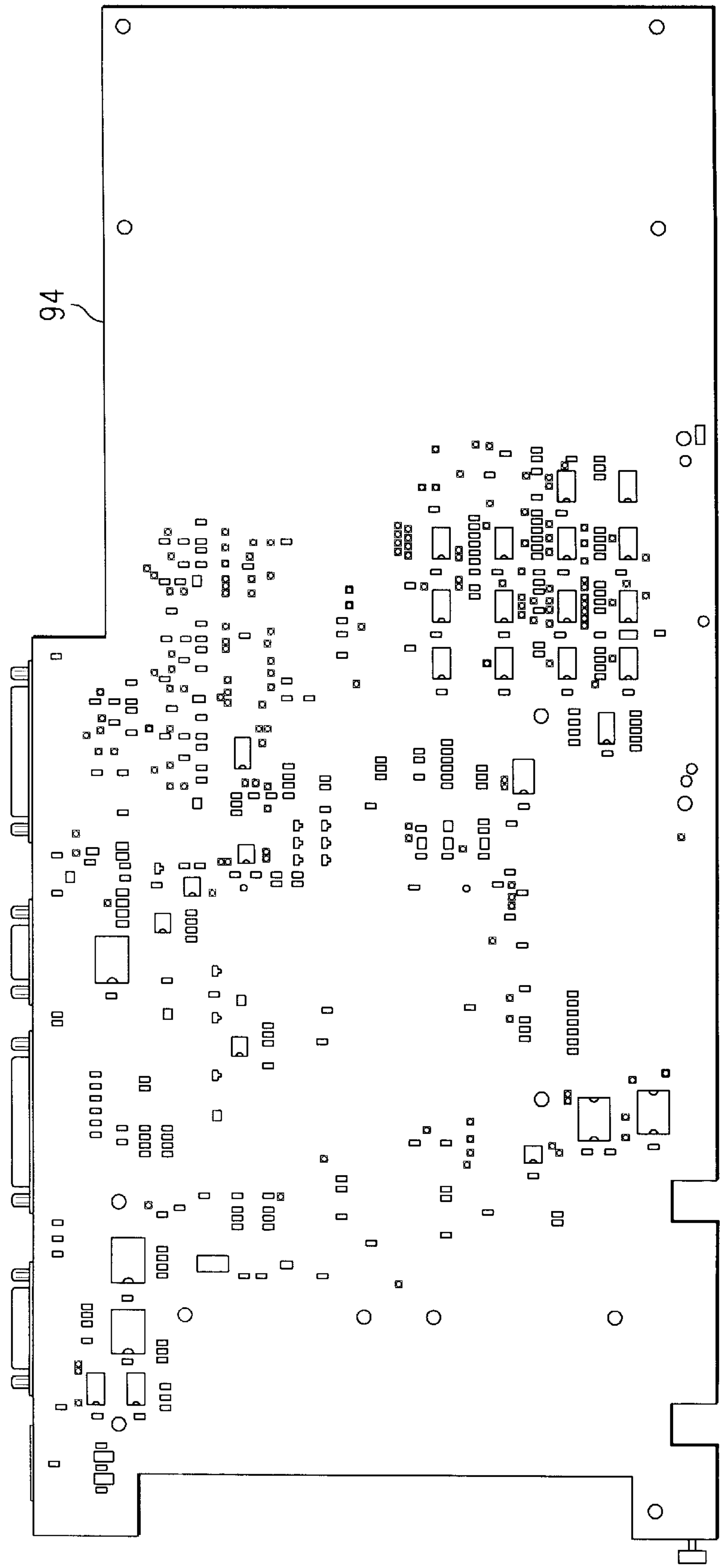
FIG. 19 is a bottom plan view of main board 94.
Figure 21A:
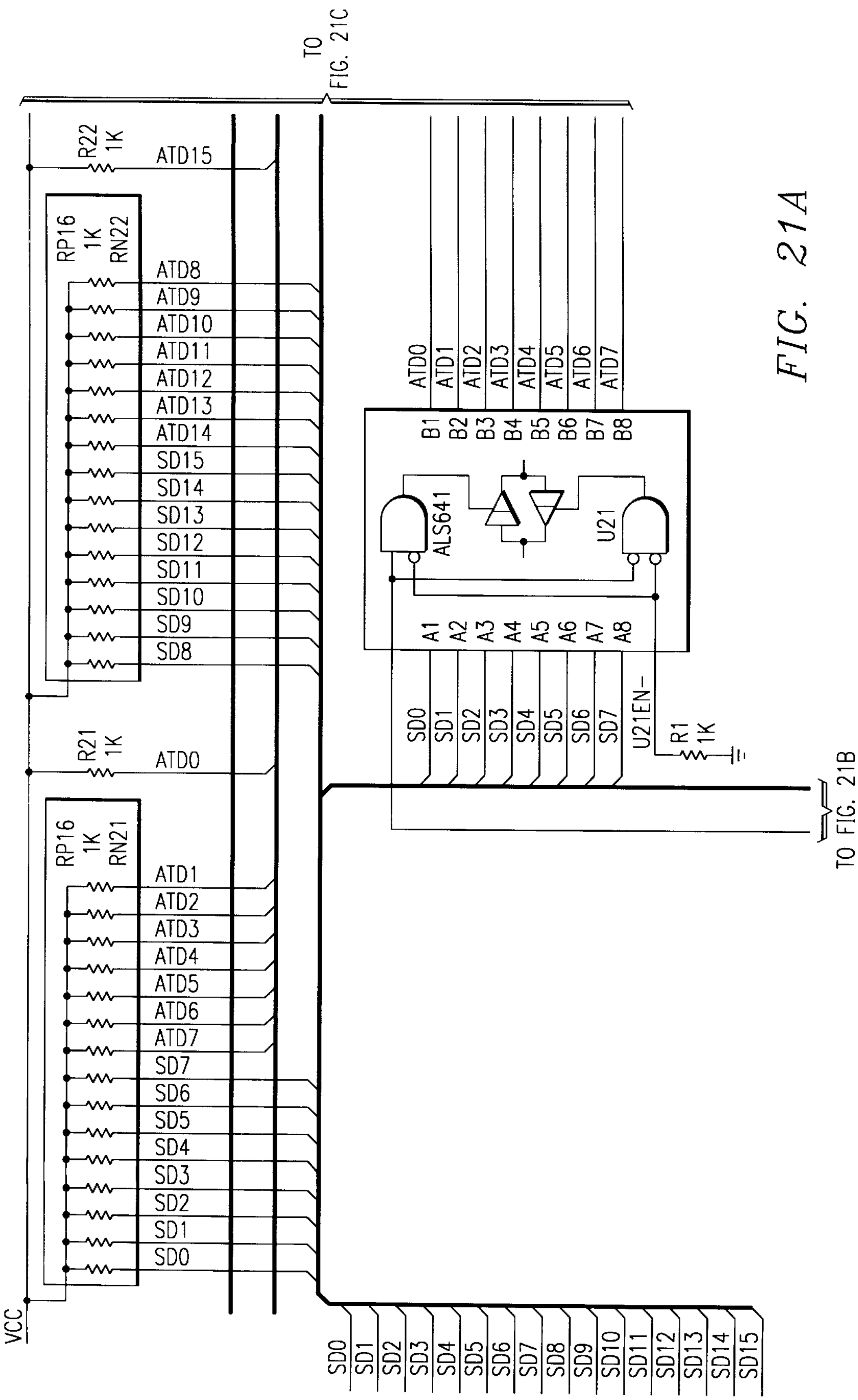
Figure 21B:
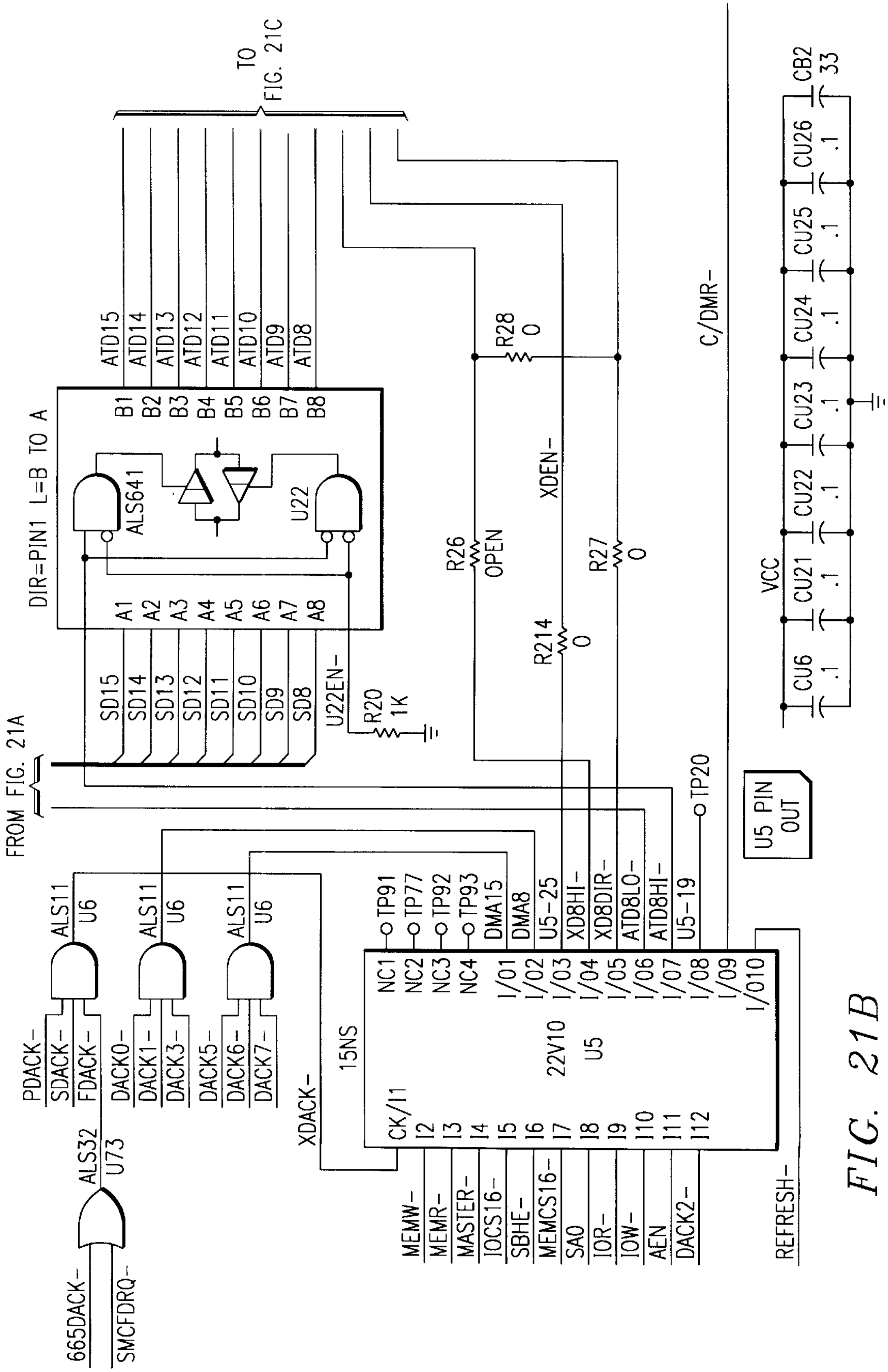
Figure 21C:
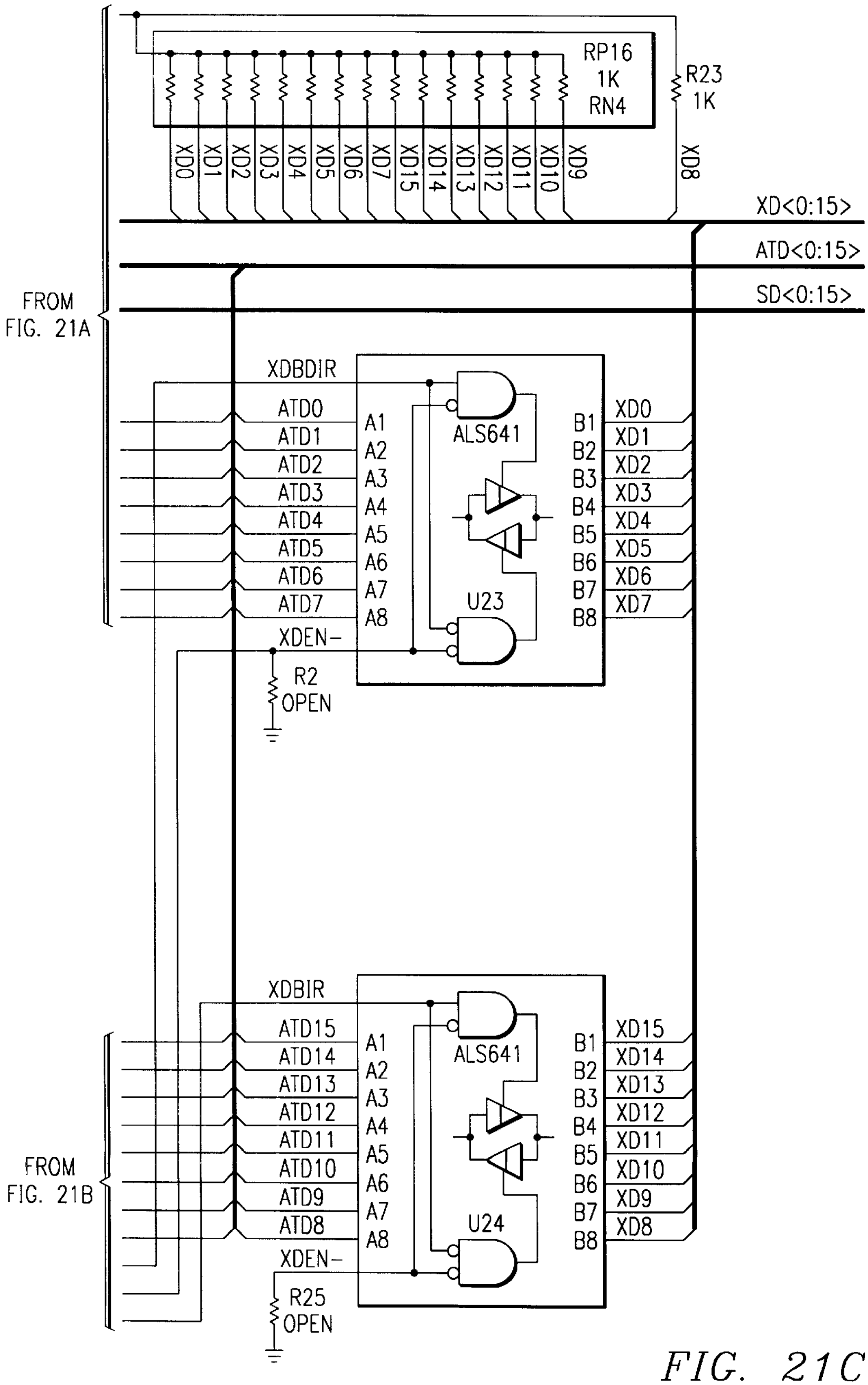
Figure 22A:
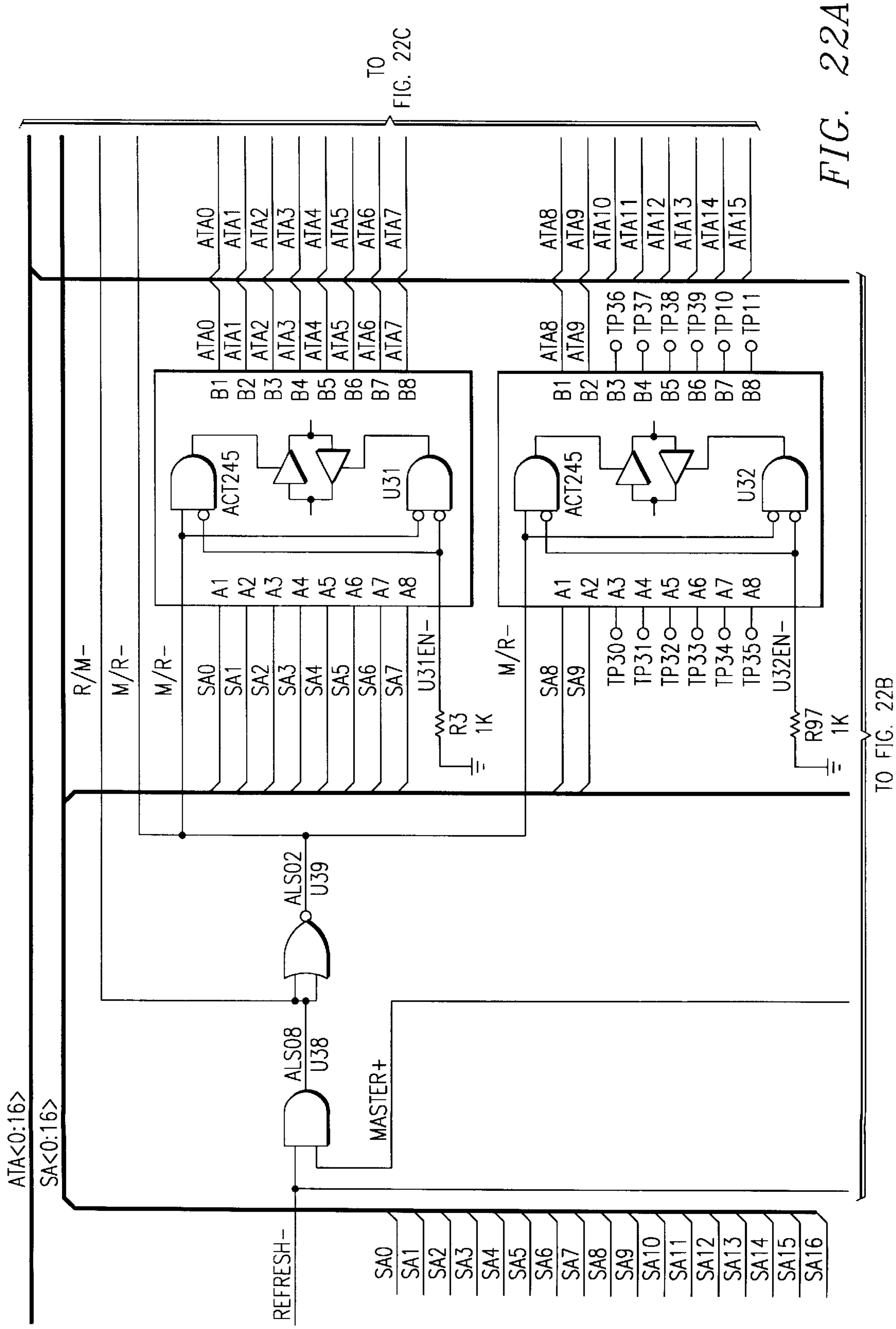
Figure 22B:
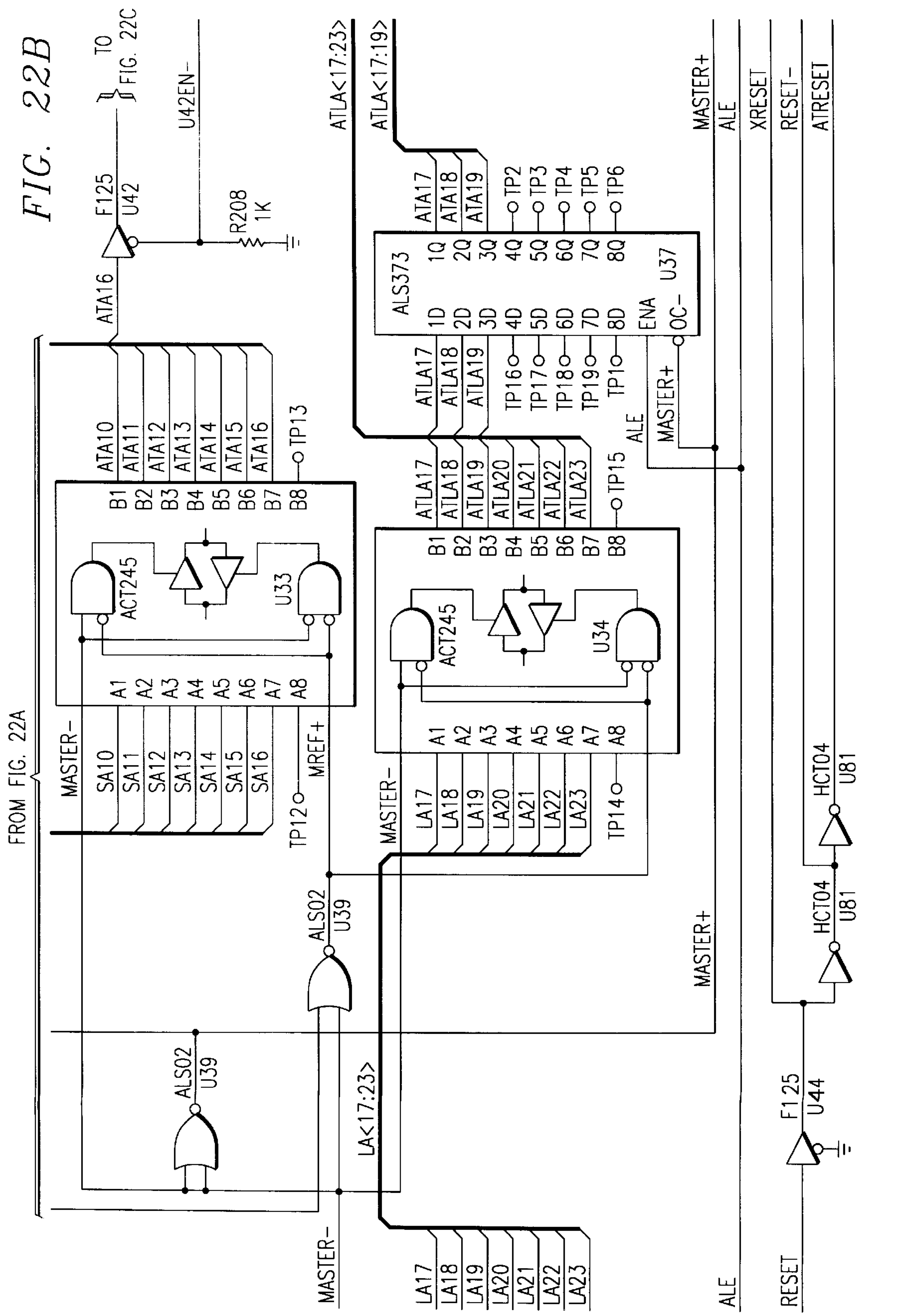
Figure 22C:
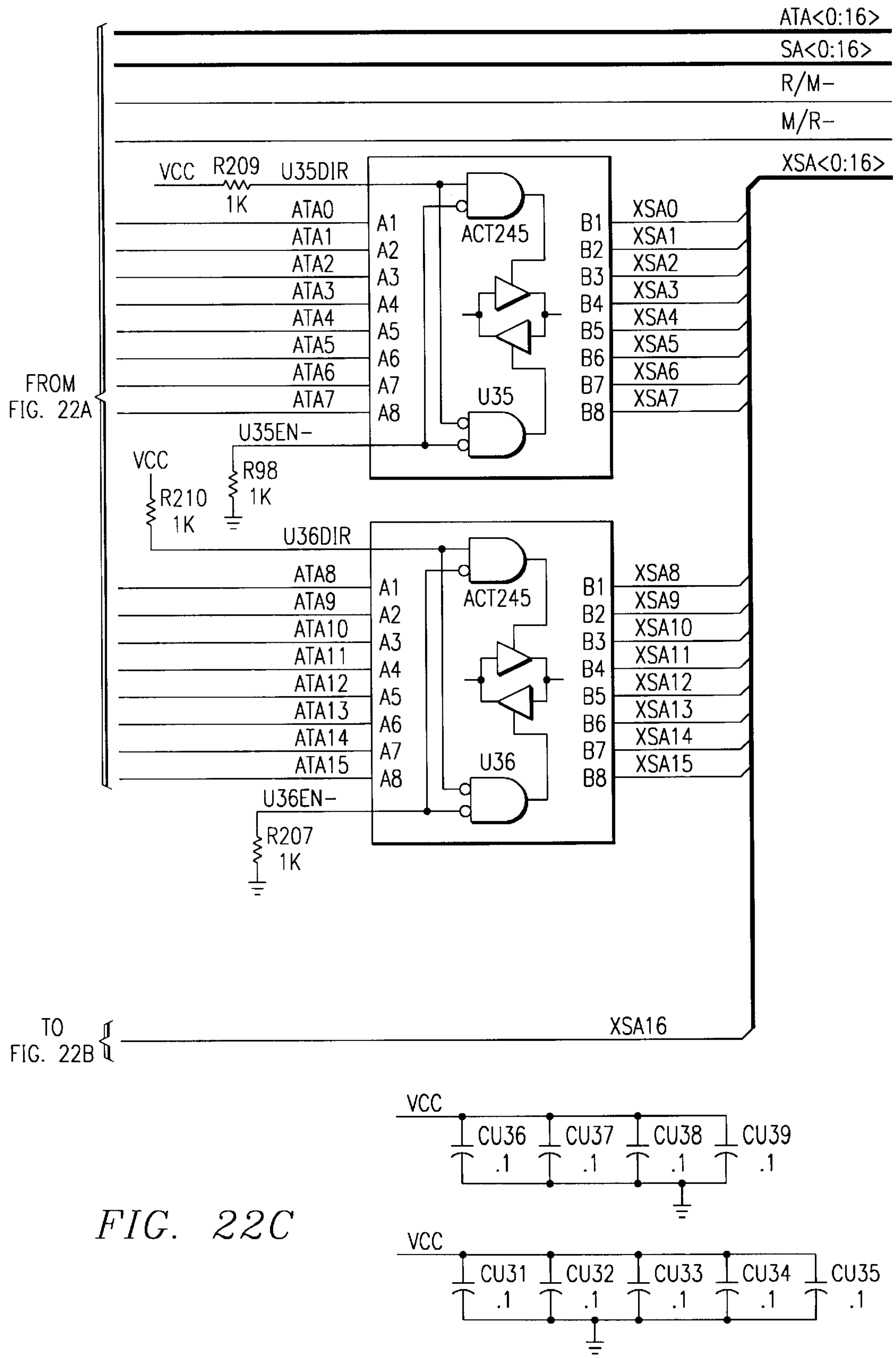
Figure 23A:
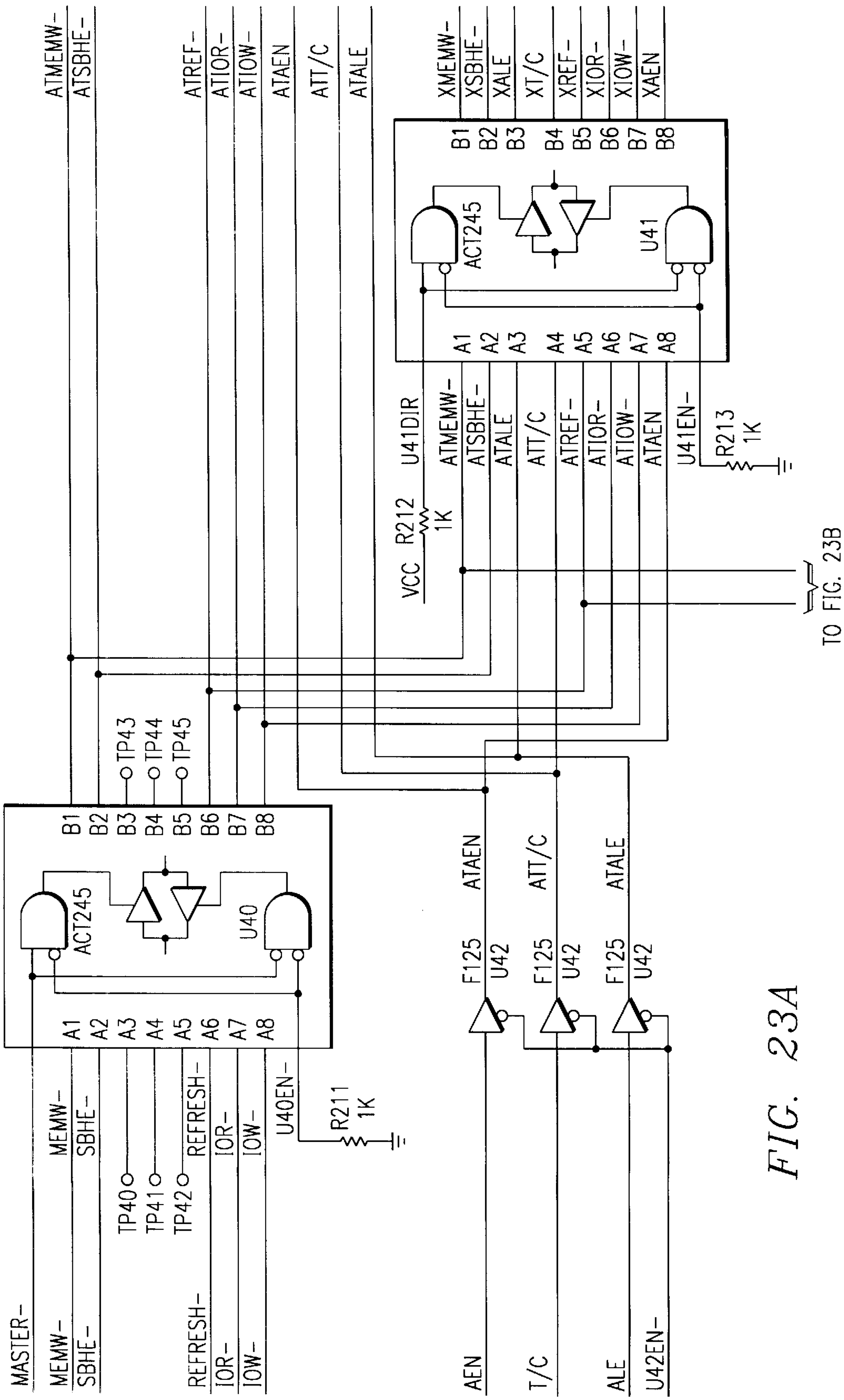
Figure 23B:
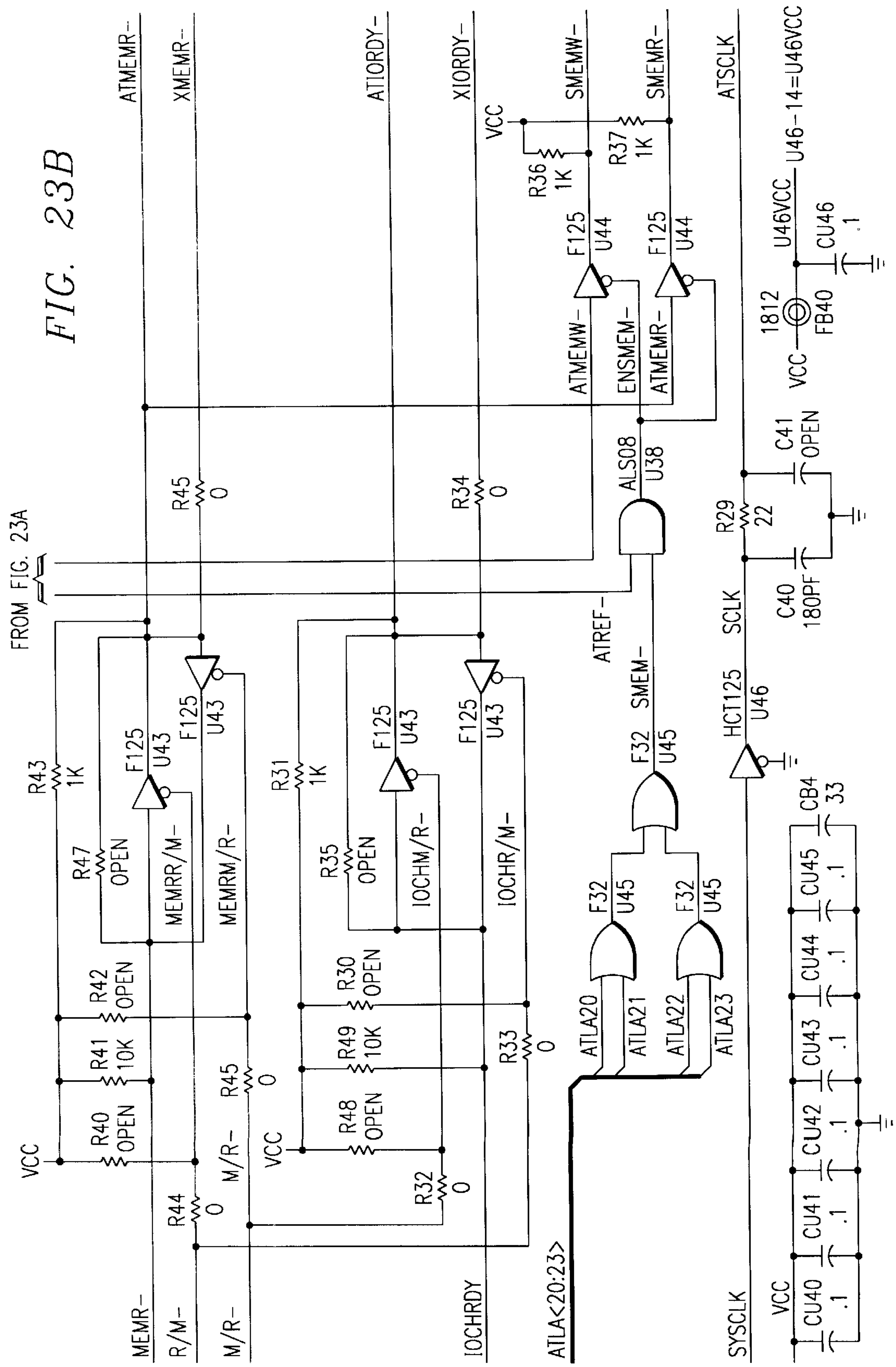
Figure 24:
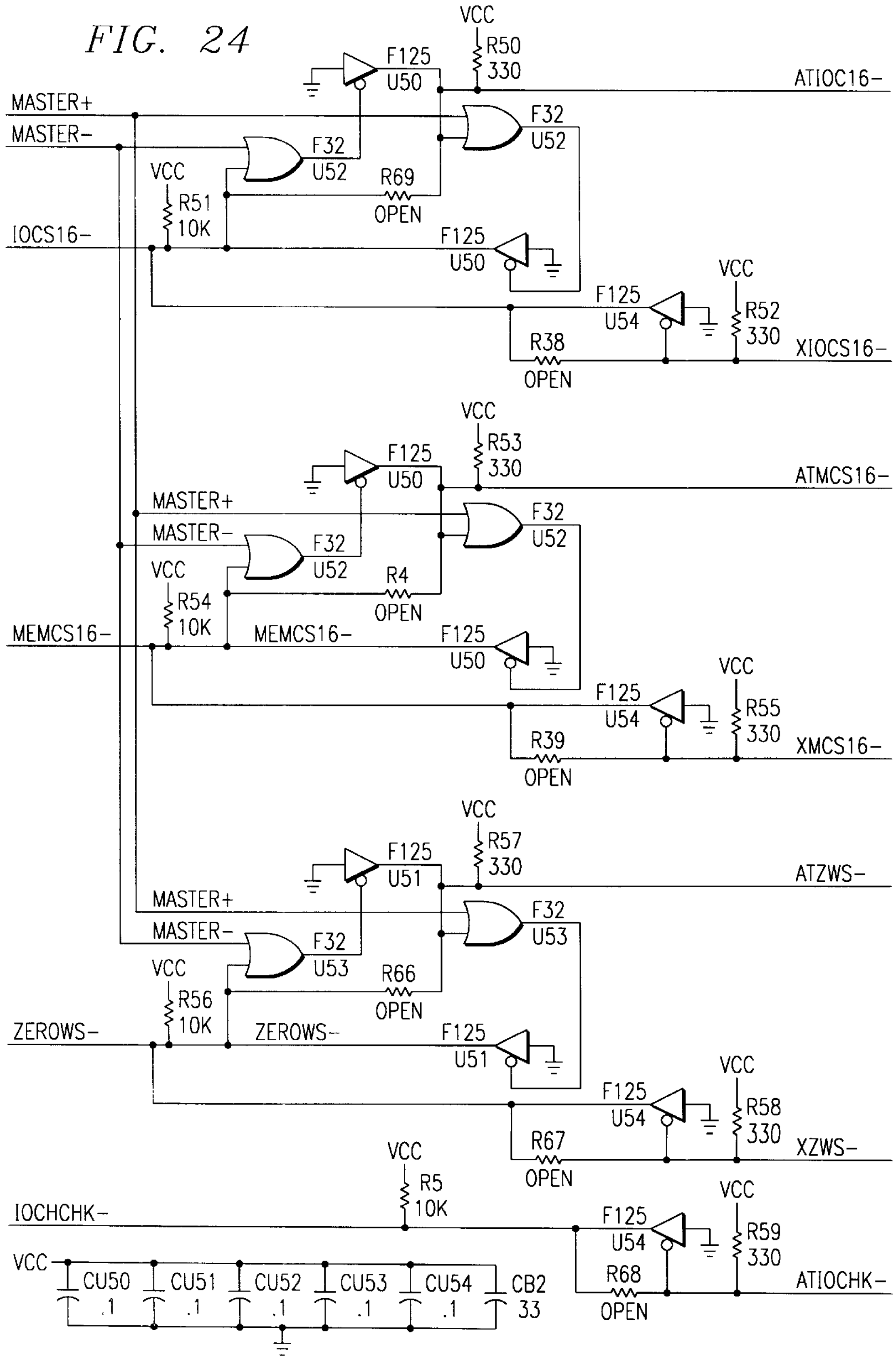
Figure 25A:
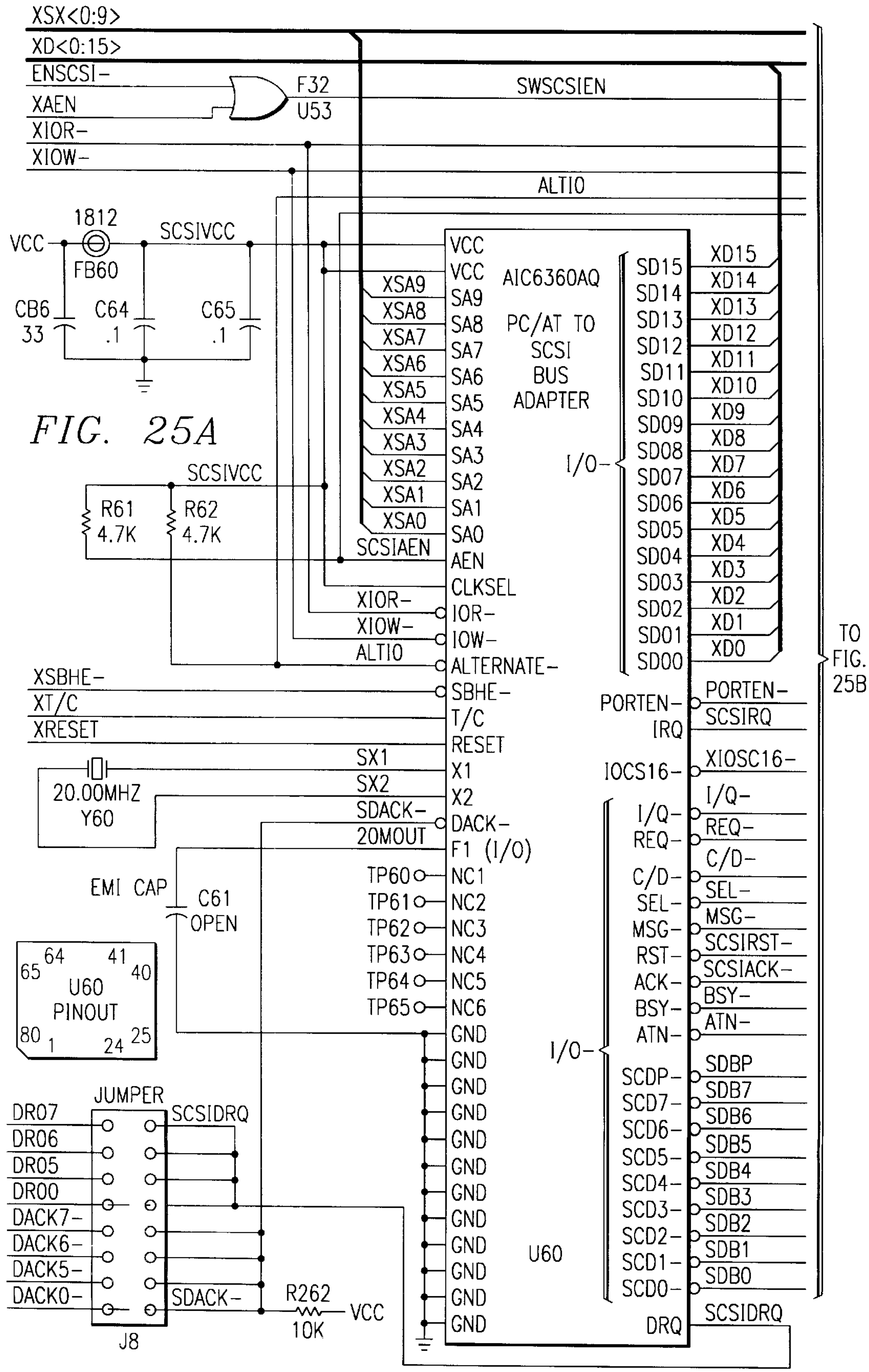
Figure 25B:
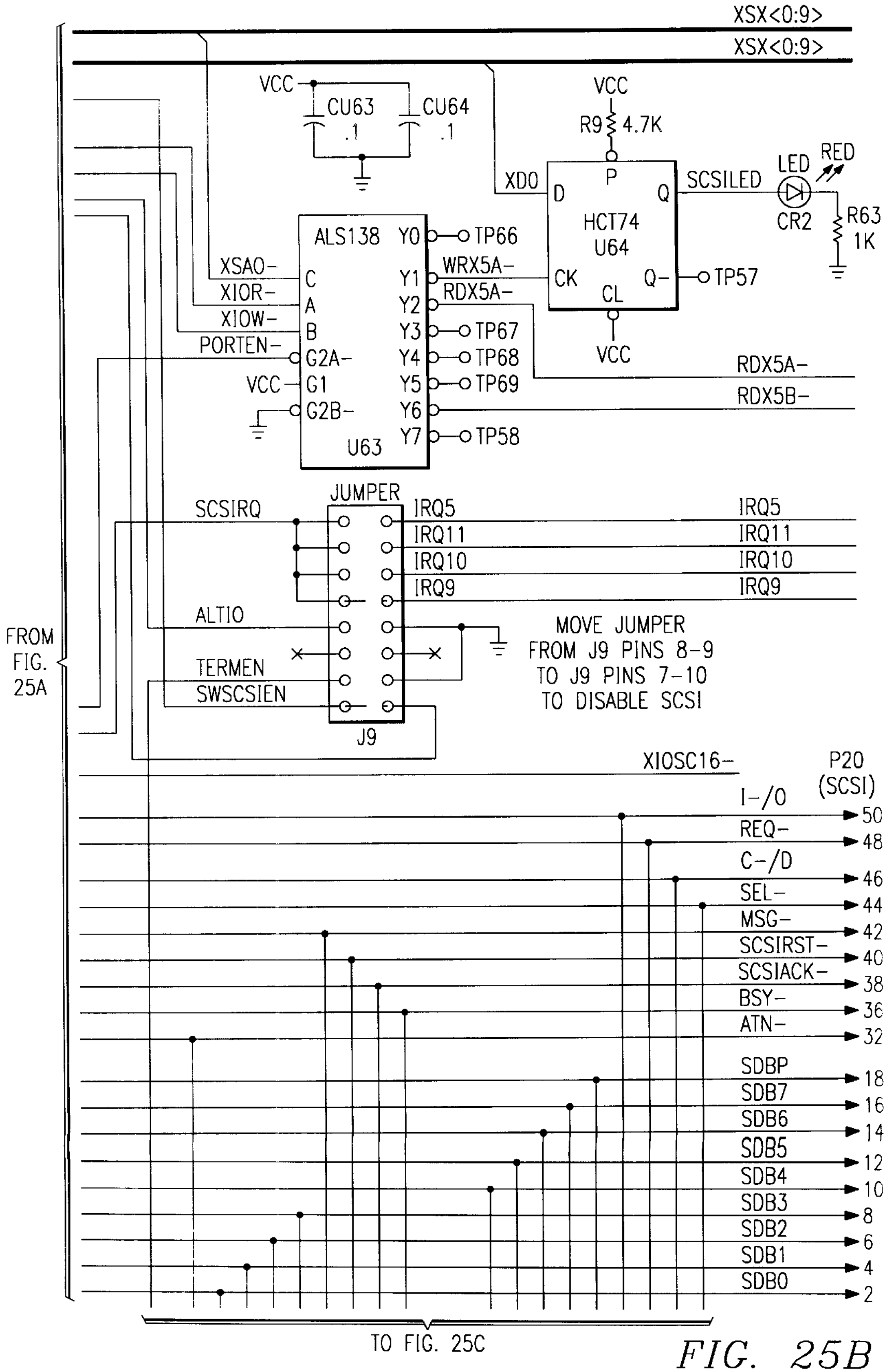
Figure 25C:
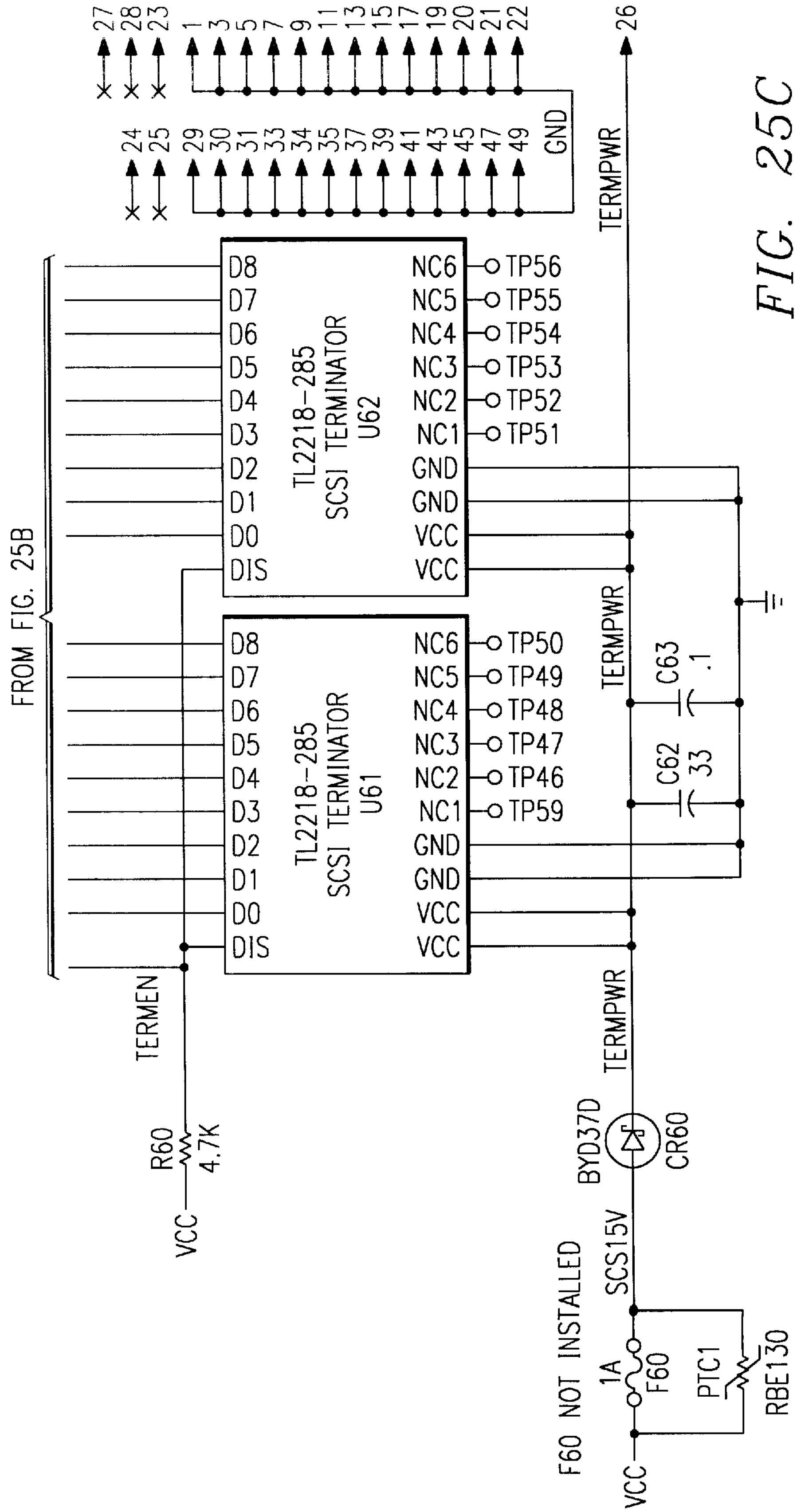
Figure 26A:
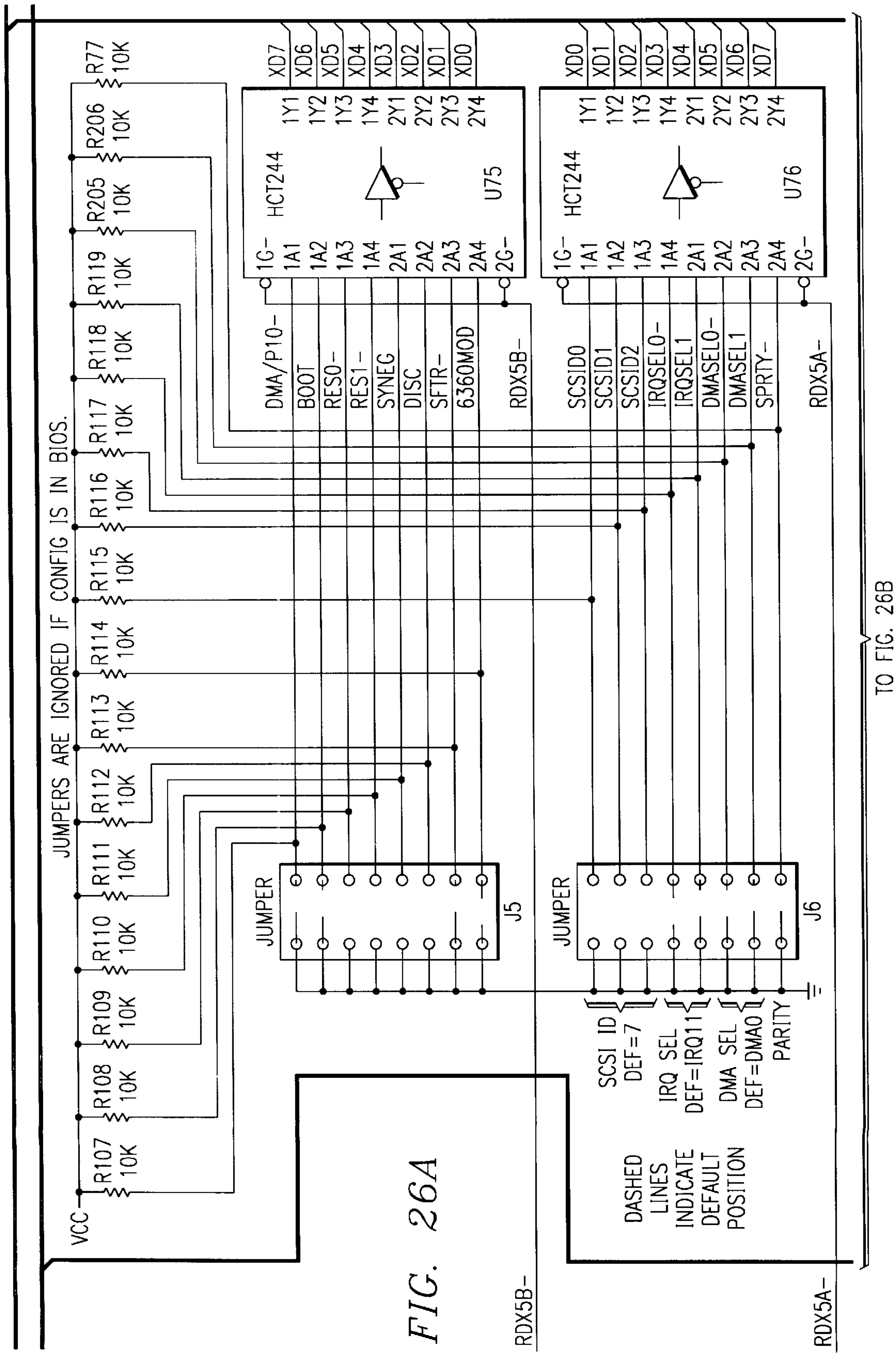
Figure 27A:
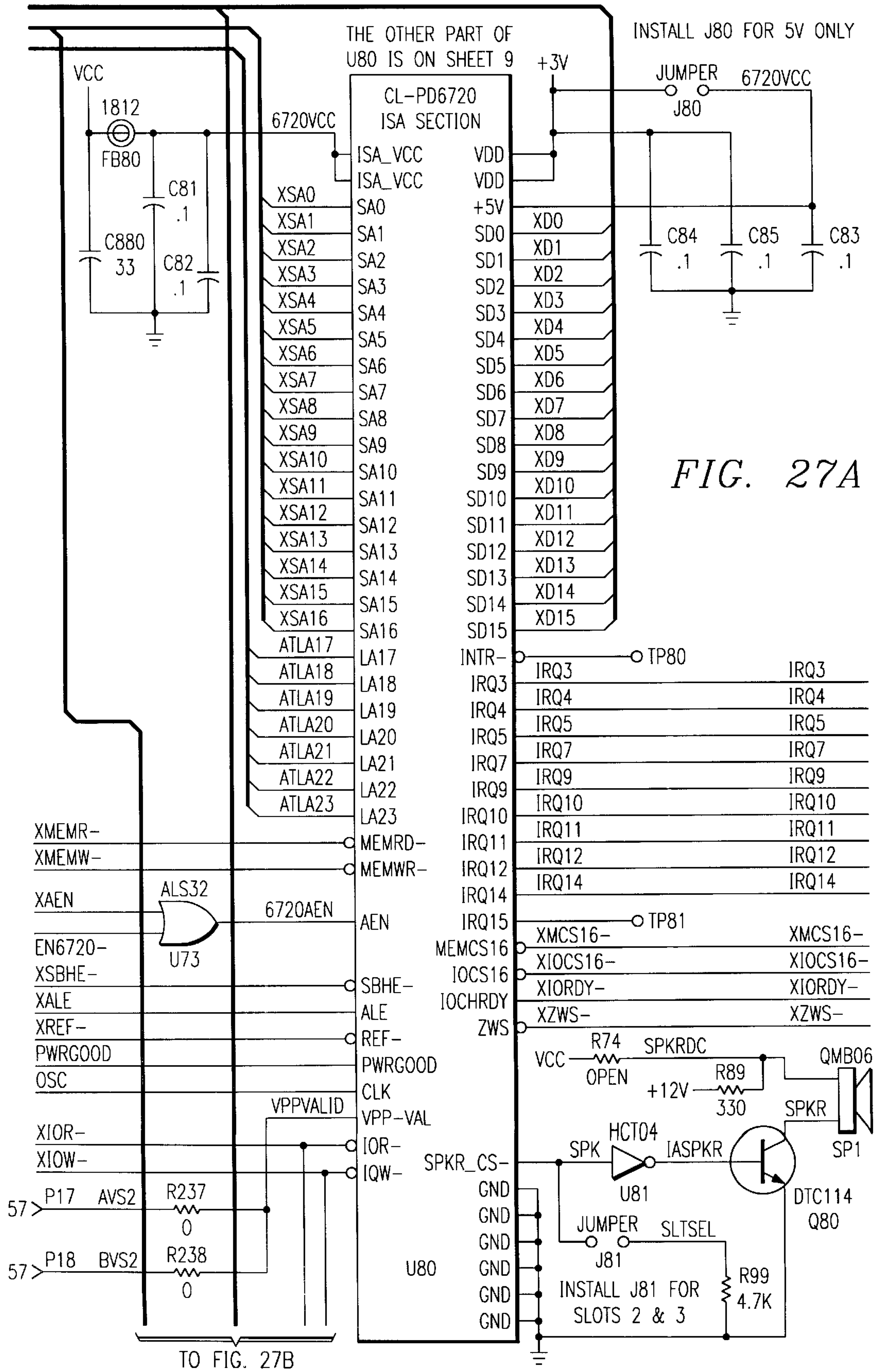
Figure 27B:
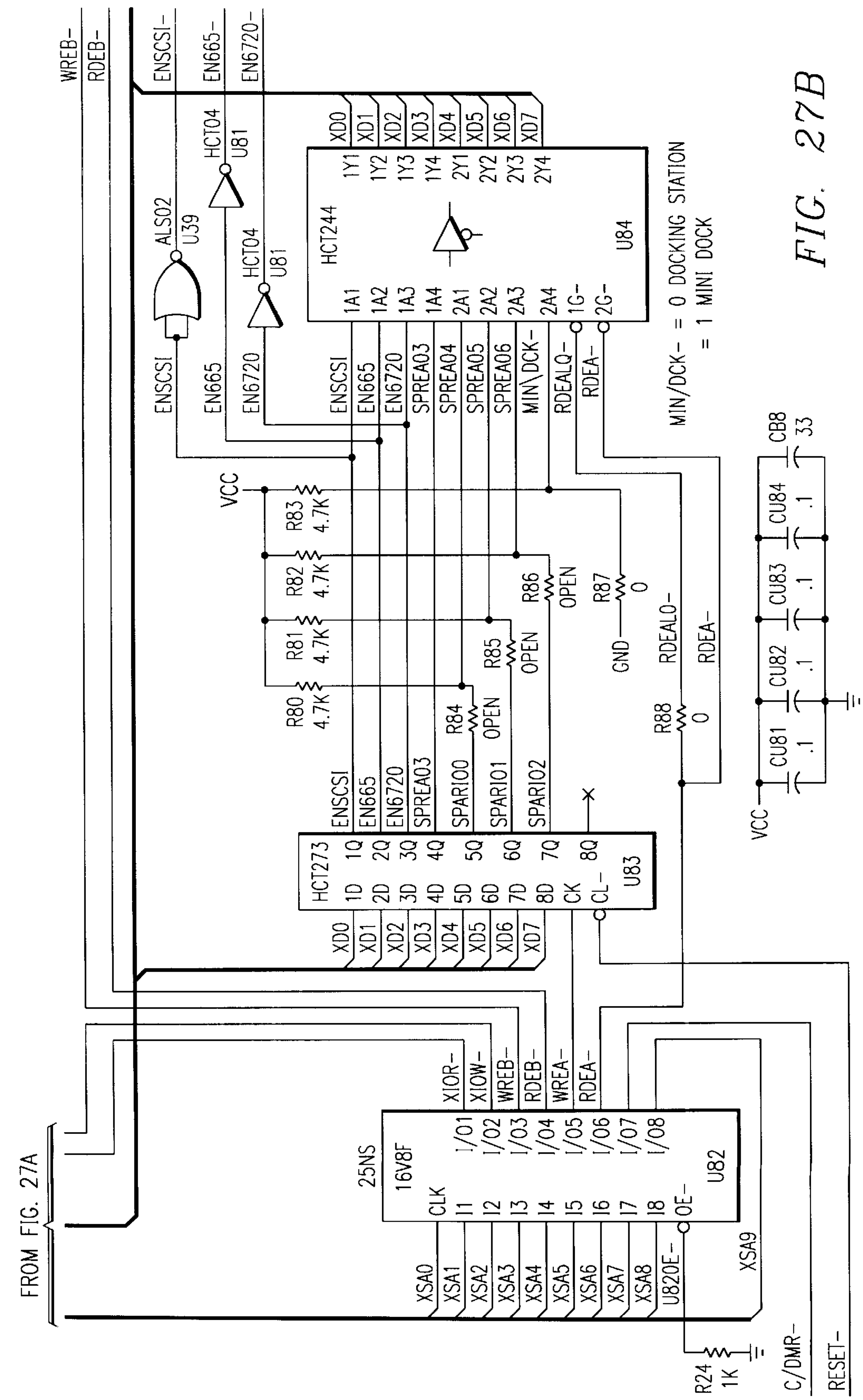
Figure 28A:
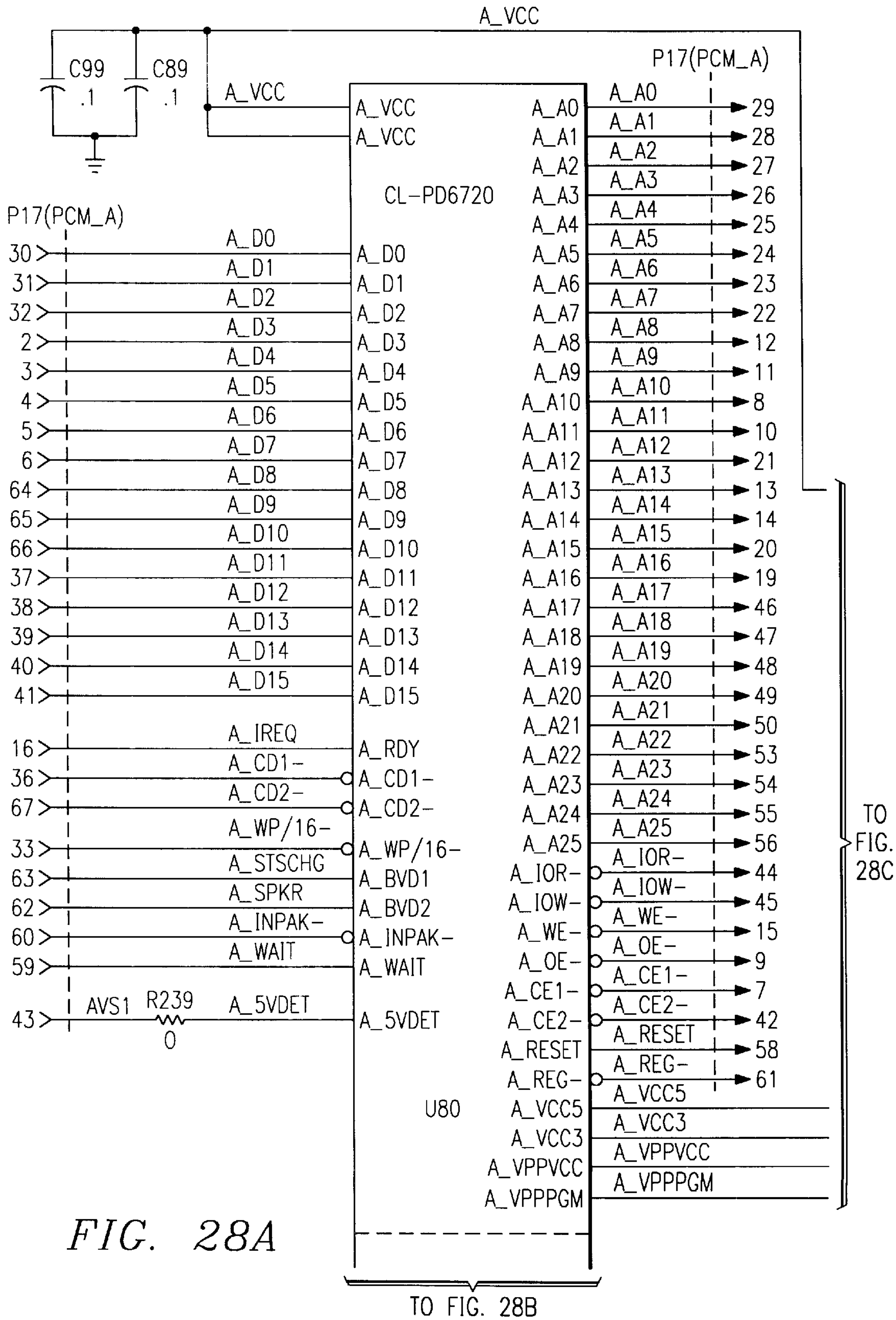
Figure 28B:
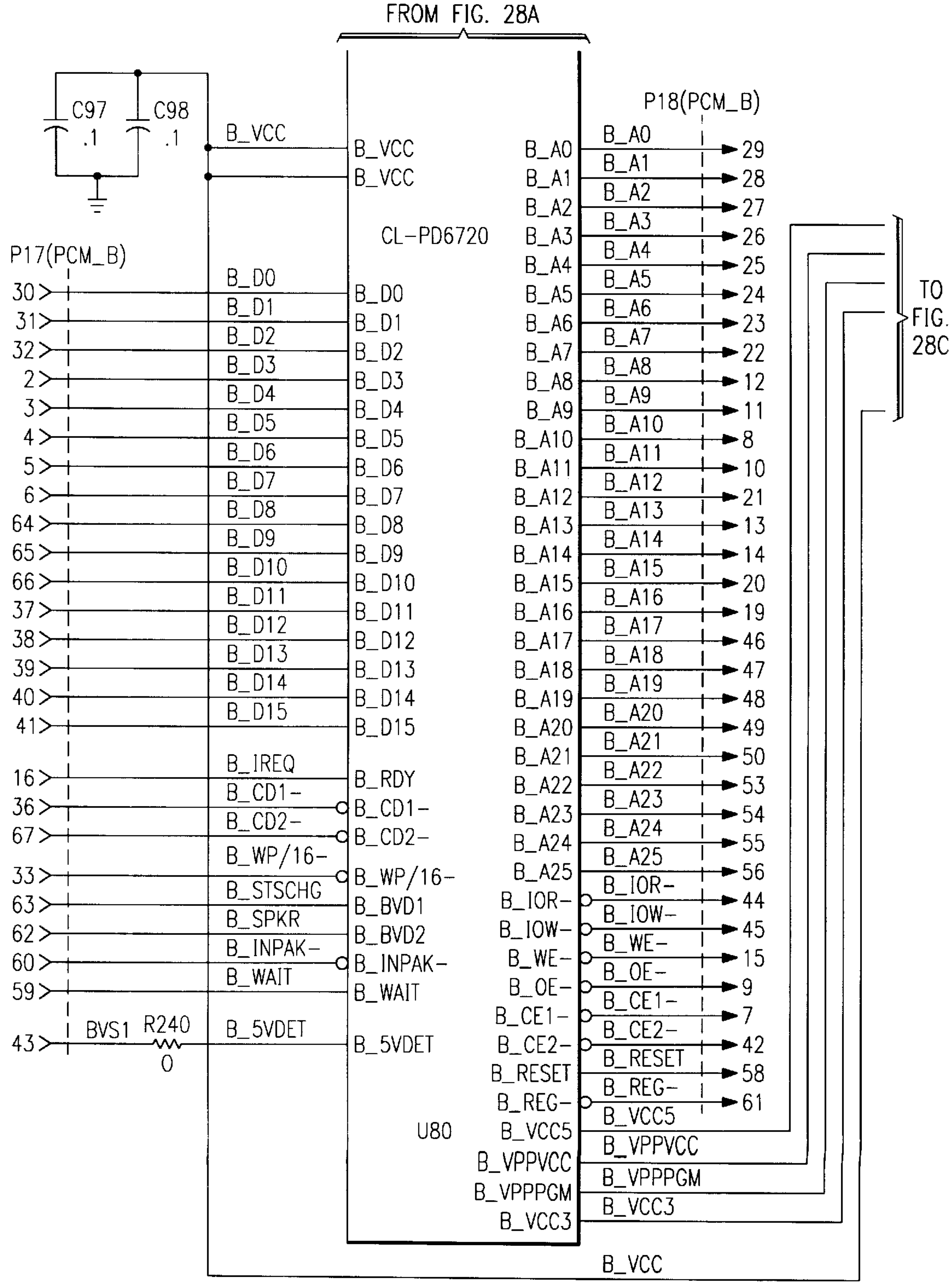
Figure 28C:
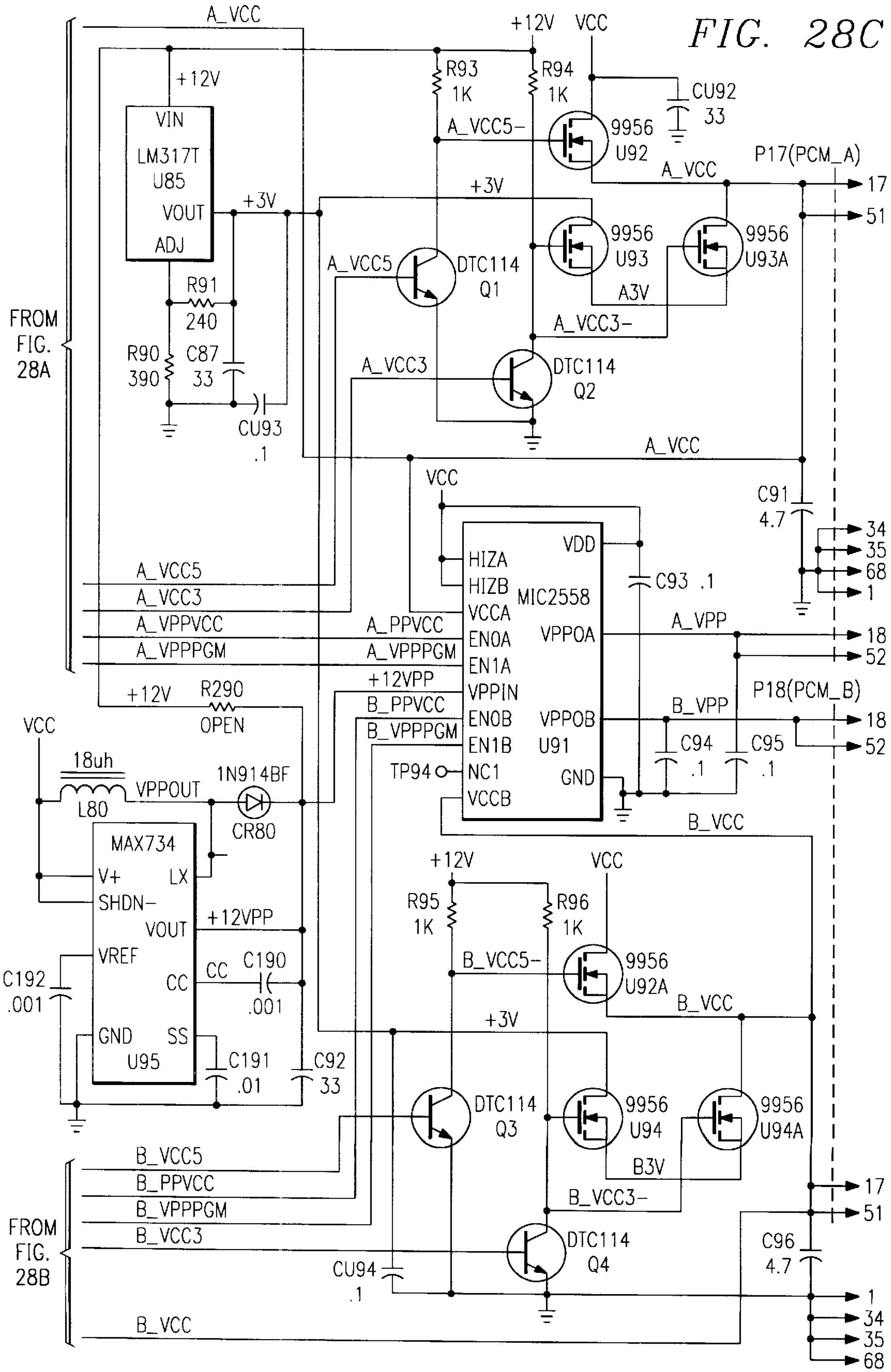
Figure 29A:
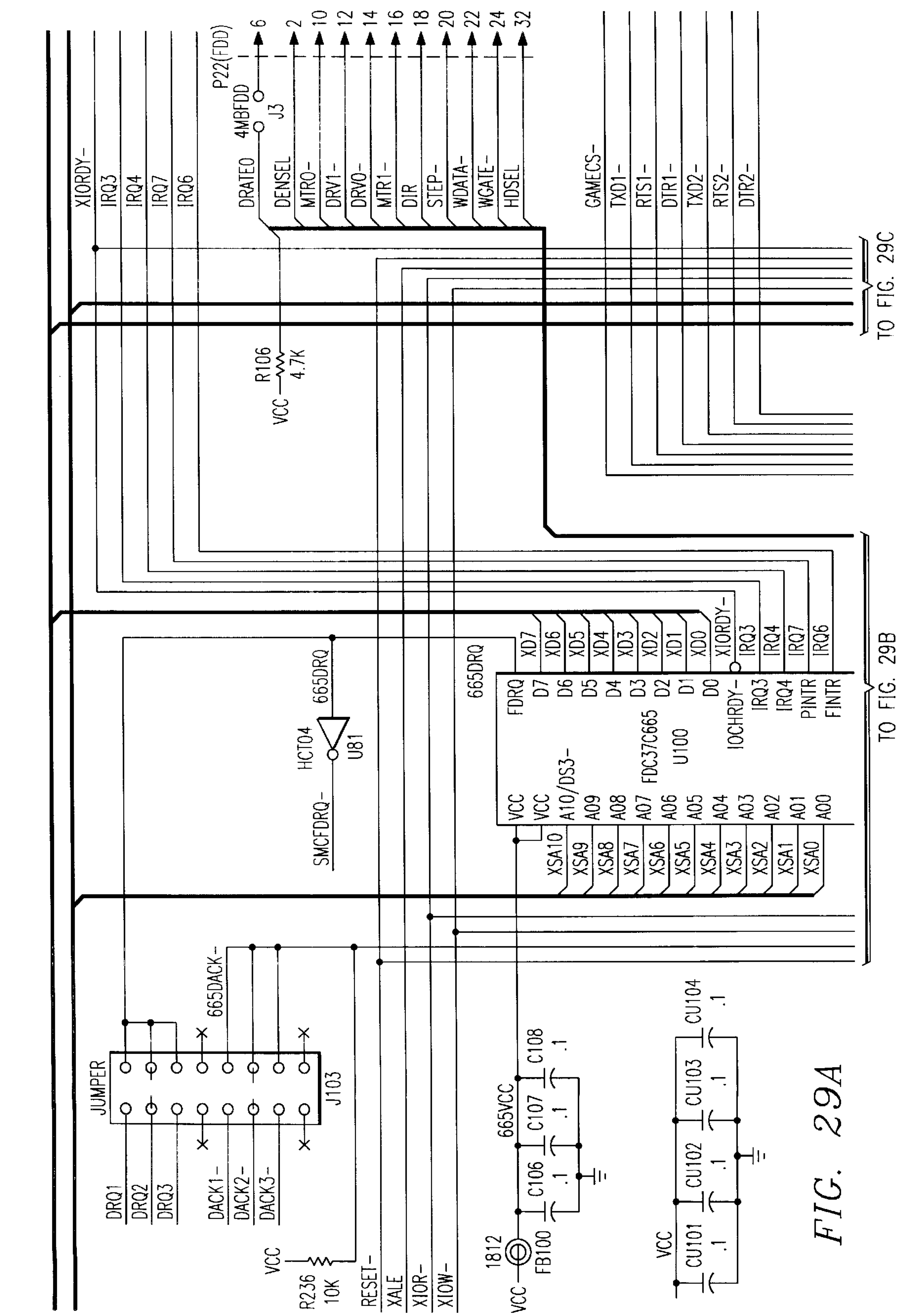
Figure 29B:
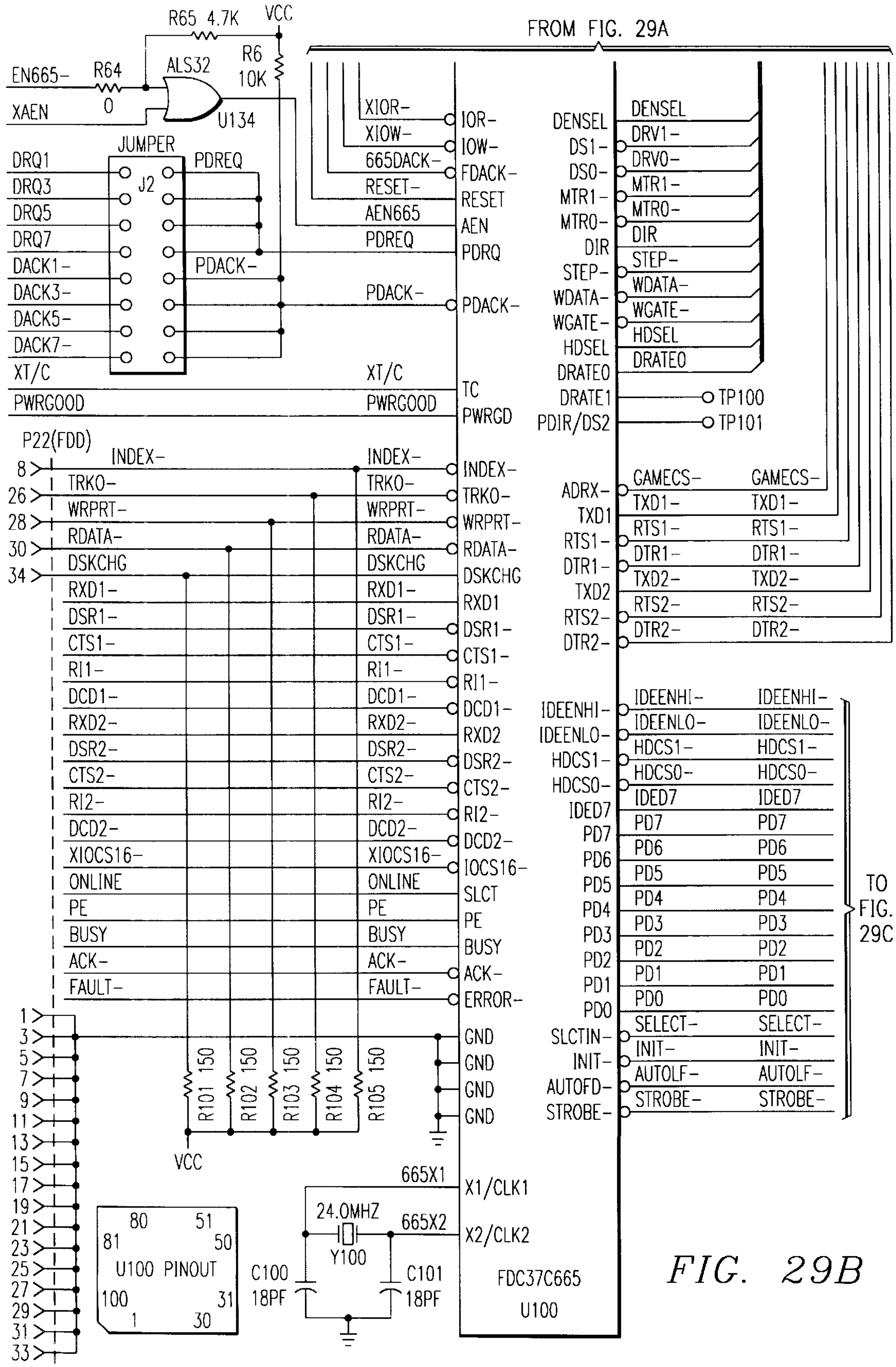
Figure 29C:
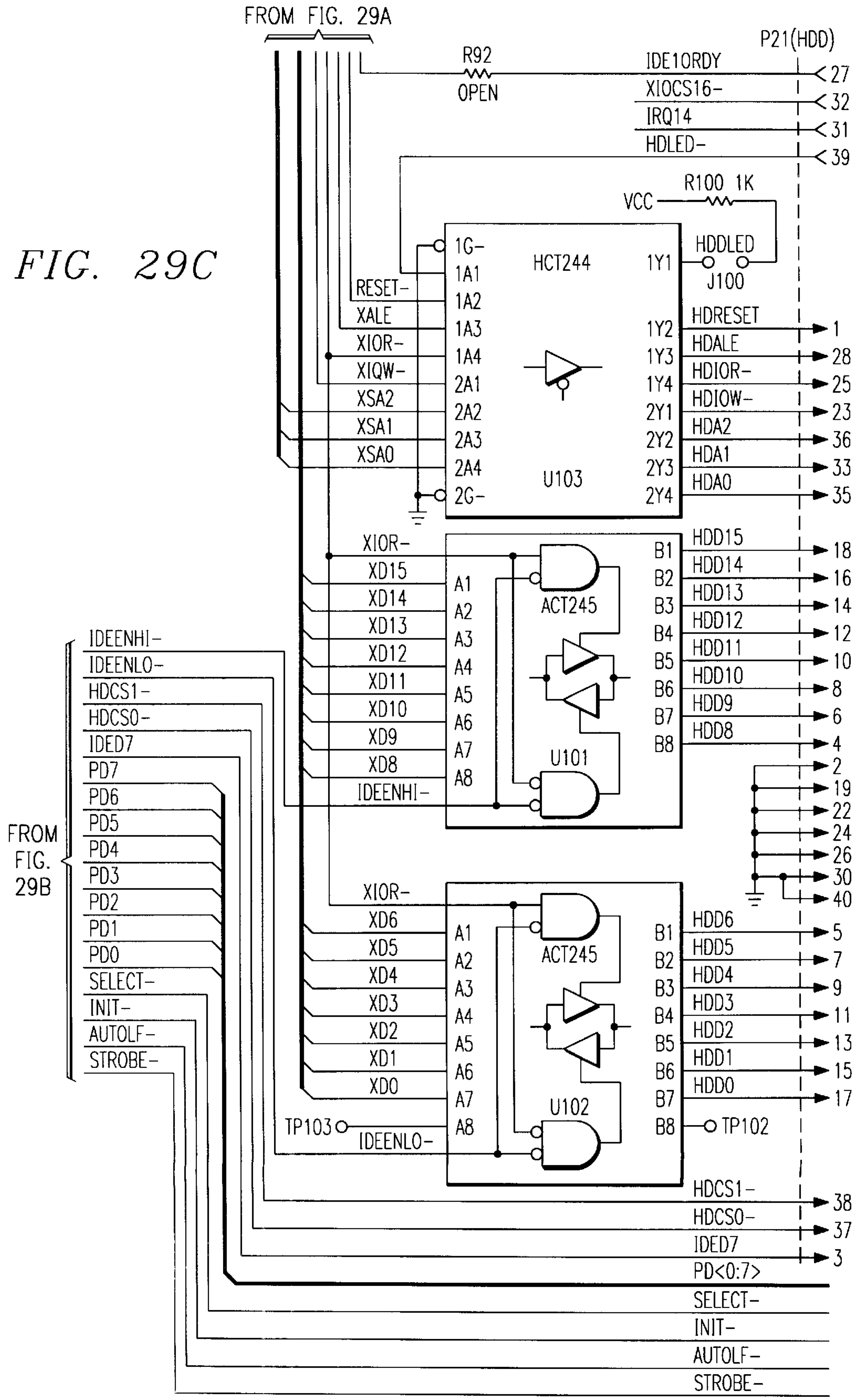
Figure 30A:
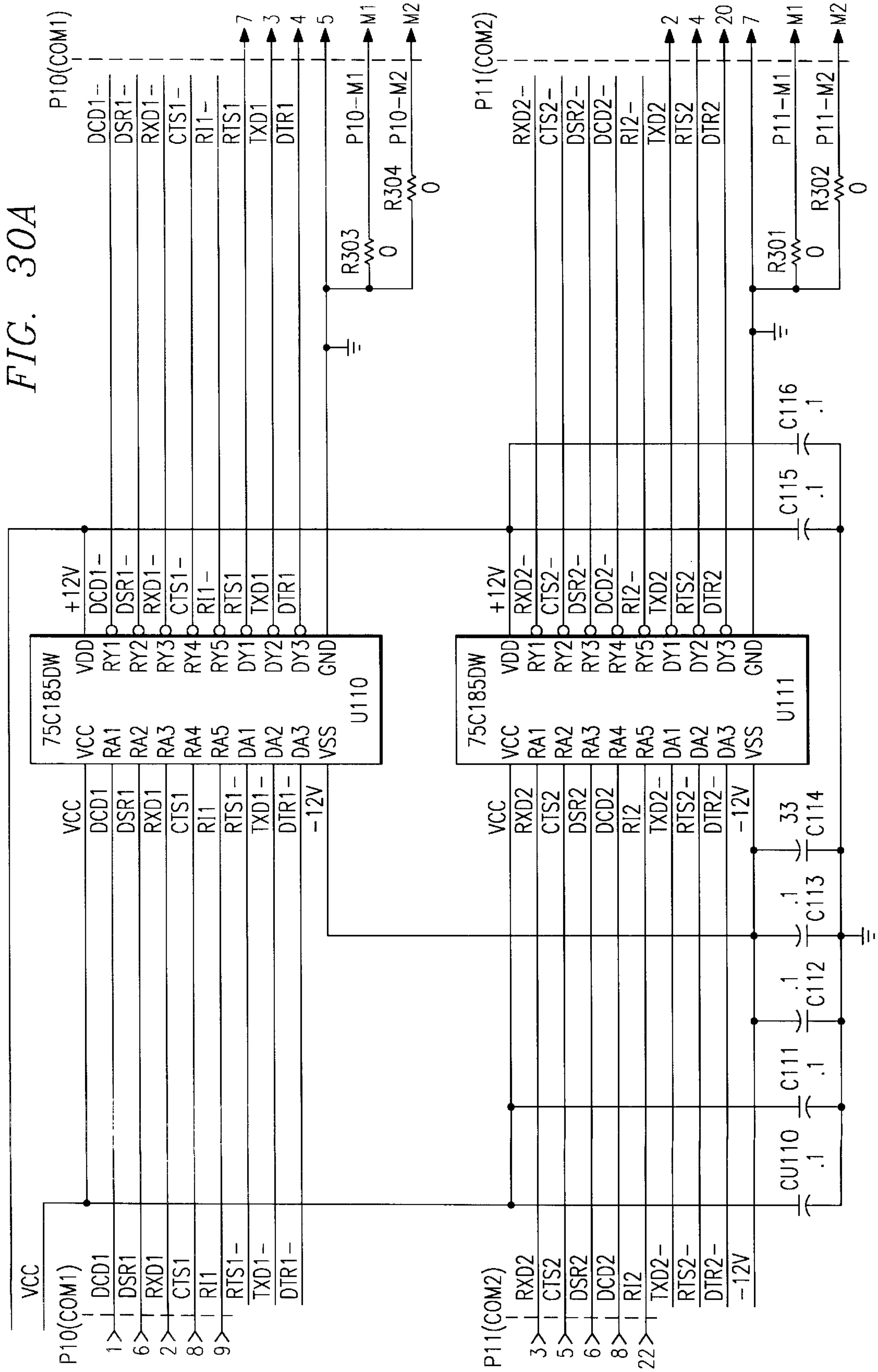
Figure 30B:
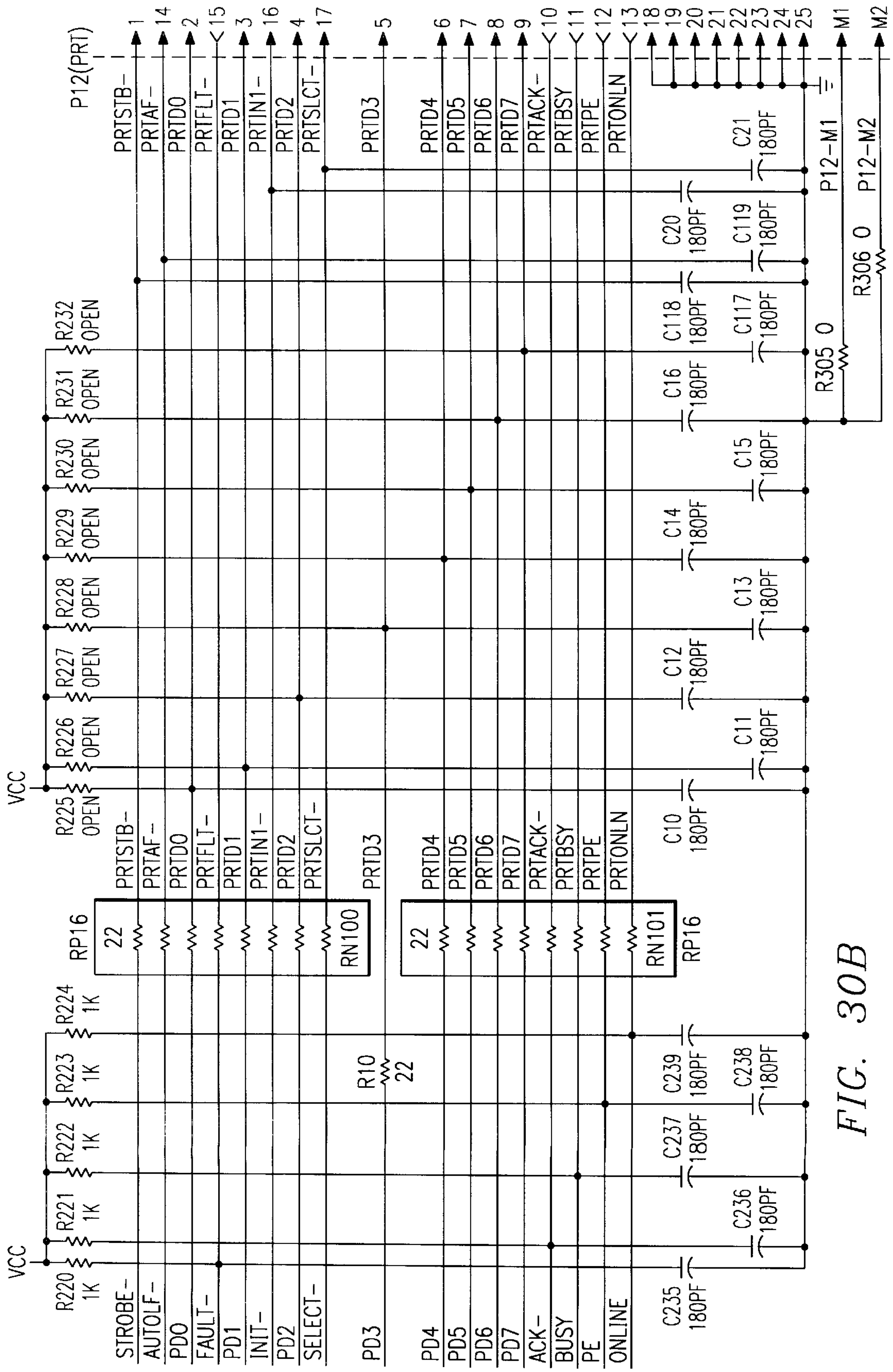
Figure 31A:
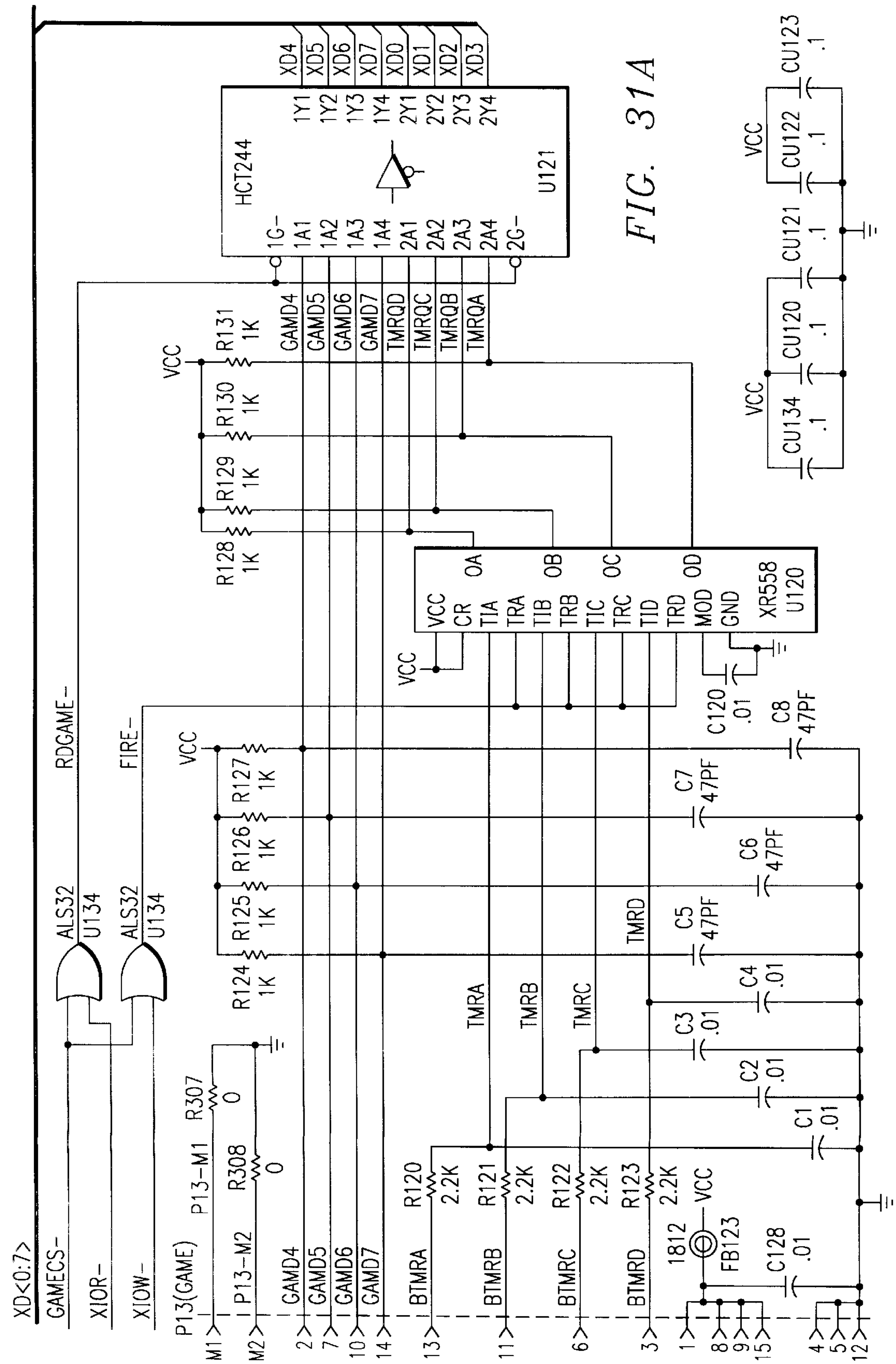
Figure 31B:
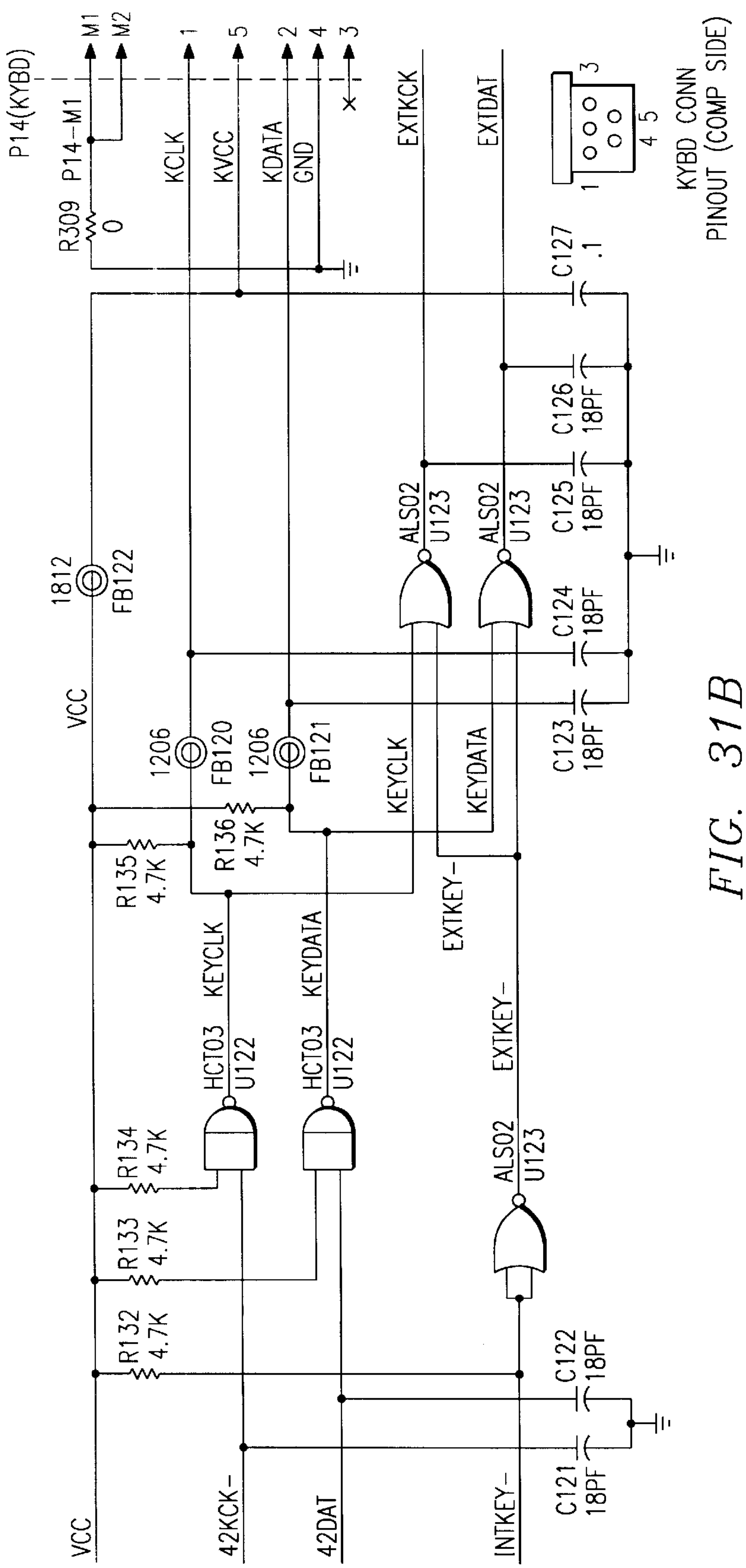
Figure 32A:
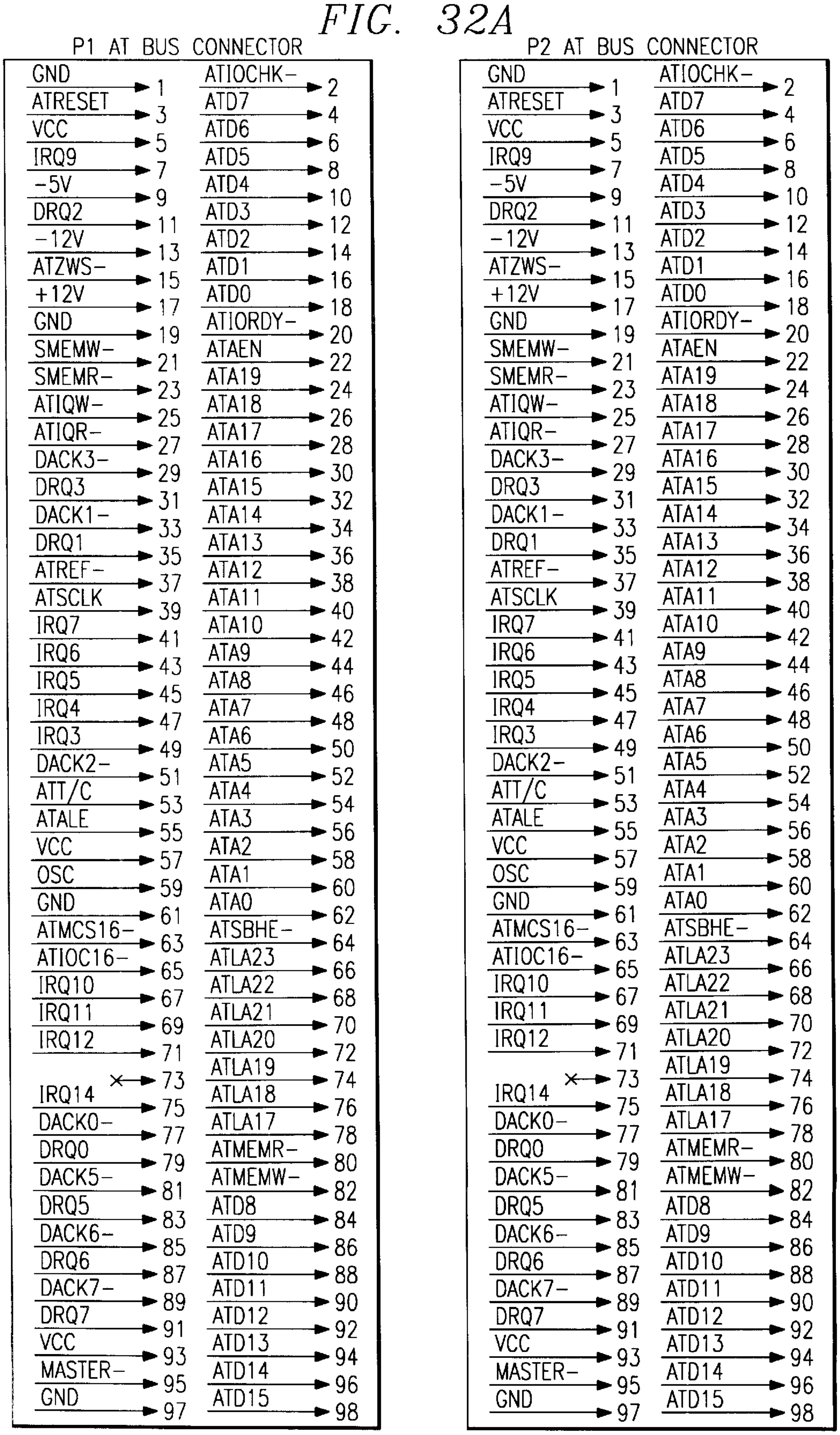
Figure 32B:
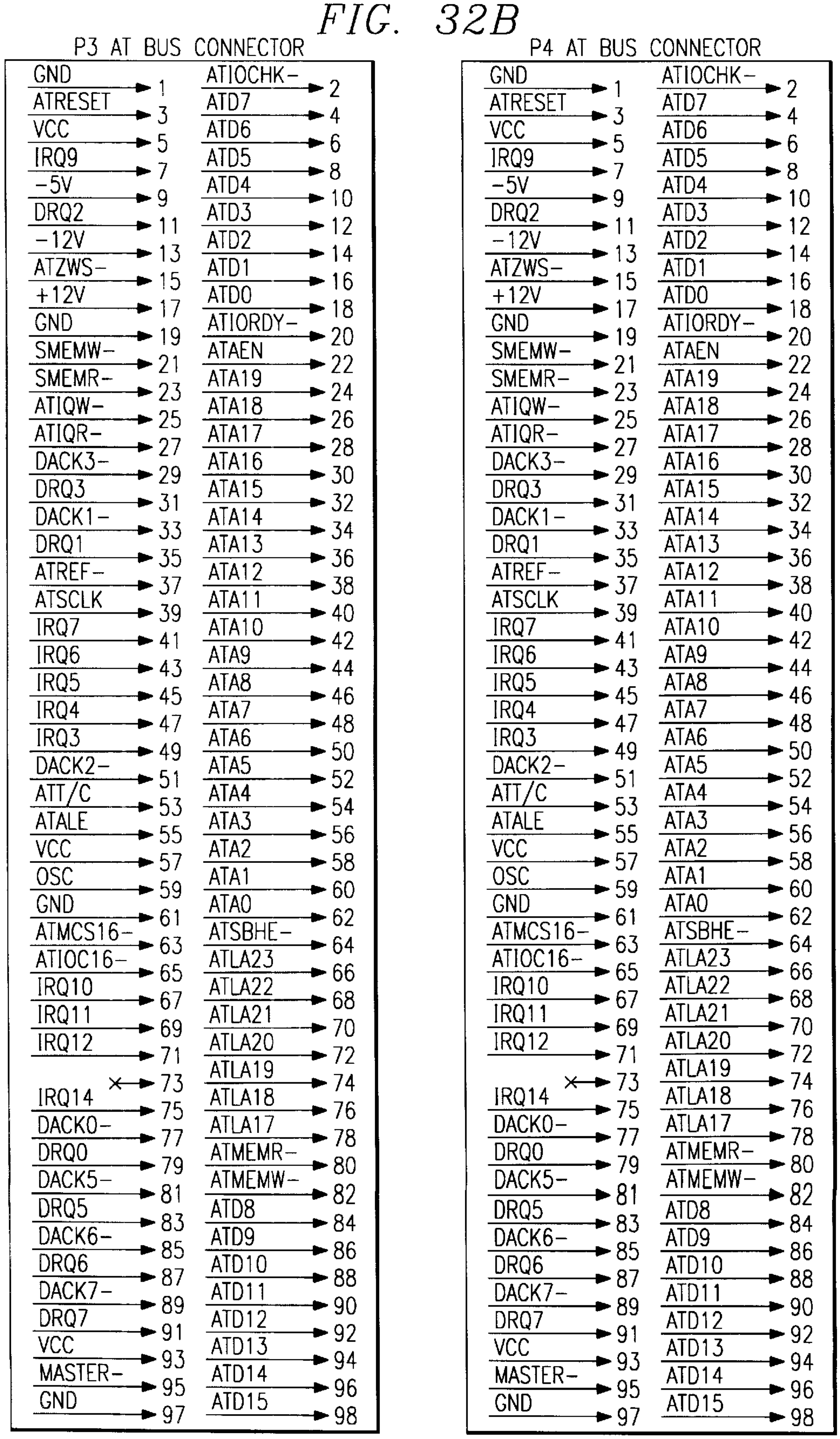
Figure 32C:
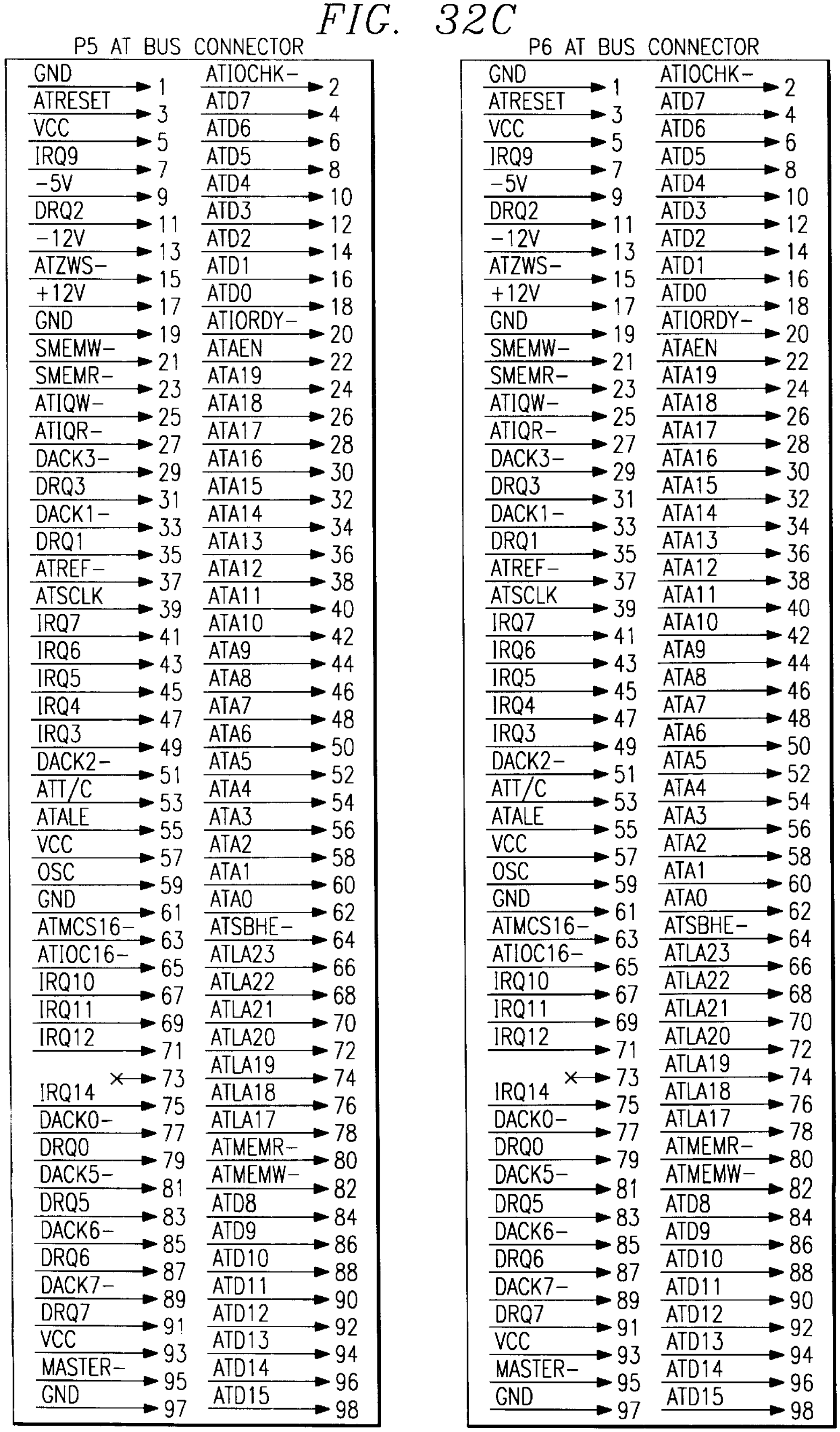
Figure 32D:
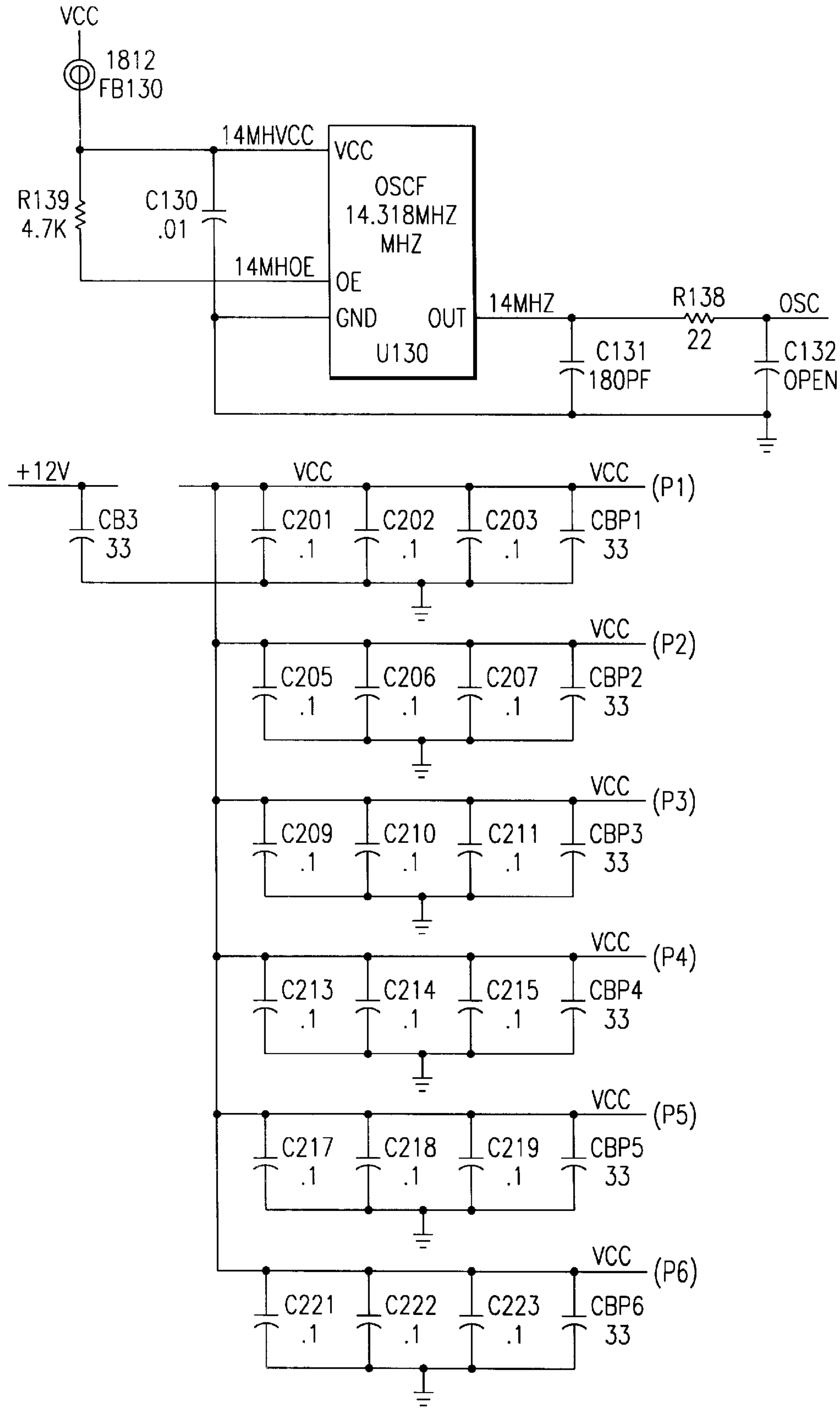

FIG. 18 illustrates a top plan view of main board 94. FIG. 19 illustrates a bottom plan view of main board 94. FIGS. 20–35 are electrical schematic diagrams for main board 94. FIG. 36 is a block diagram of the main processing system of docking station 10. The microprocessor (U140 in FIG. 33) in the docking station is a Z86 (or Z40 depending on desired application) microprocessor having 4K of ROM. The computer program "MOTORCODE", listed in the Computer Program Listing section at the end of the description but before the claims, must be loaded onto the memory (4k of ROM) of microprocessor (U140) of docking station 10. The "MOTORCODE" computer program enables the microprocessor (U140) to: run the motors 47 & 90 that control the loading and docking of the portable computer 13 to the docking station 10; control the communications channel from the docking station to the portable computer; turn power on/off to the docked portable computer; control the time and rate of battery recharge of the portable computer's batteries; control the function of switches 12 and 16 on the docking station and control the docking station's front panel LEDs.

While docking station 10 has been thus far illustrated in a horizontal position it can also be operated in a vertical or "tower" position, as illustrated in FIG. 37. In the tower position, the docking station can be neatly stored under a desk to free additional desktop space. In the tower position, a stand or side support 100 should be added to the docking station 10 to prevent accidental tipping over.

INTERFACE PROTOCOL

The interface between the microprocessor (MC) in docking station 10 (U140 in FIG. 33) and the main processor (PC) in the portable computer is an eight bit I/O port ar PC I/O address 99E9h. The MC reads the values that the PC writes and the MC writes the values that the PC reads. Normally the MC will store standard values in this port. If the PC wants other information or wishes the MC to perform other actions, there is a defined protocol for sending commands from the PC to the MC. When the MC has other information available, it can set one of the status bits and the PC will send commands to discover what other information is available.

The upper two bits of the I/O port define what the lower five bits mean. These bits (bit 7 and 6) can be one of four values. At powerup or when the PC writes 00xx-xxxx to the status register, the lower 5 bits will contain the standard status values. When the PC wants to send a command to the MC, the PC will write 01yy-yyyy to the status register with the lower 6 bits containing the command number. When the MC notices the command, it will write 01yy-yyyy to the port to acknowledge the command. If the MC wants to tell the PC that the command is invalid, the MC will write 10yy-yyyy to the port. For valid command, the MC will write 11zz-zzzz to the port when it is finished executing the command. In this paragraph, the xx-xxxx denotes the standard status port definition. The yy-yyyy denotes a command number. The zz-zzzz denotes the response to the command.

Multi-byte commands follow the same format. The 2nd byte from the PC will be 10yy-yyyy, the 3rd byte will be 01yy-yyyy and the 4th byte will be 10yy-yyyy. The command description will state how many bytes are expected in a multibyte command. The MC will ensure that the response to each new byte is different from the response to the previous byte. In most cases, the MC will just increment the previous response. The following tables show the values in the upper two bits for single and multi-byte commands.

Single Byte Command flow.

| PC Write | MC Write | Comments |
|---|---|---|
| 00xx-xxxx | | PC is ready to send a command to the MC |
| | 00xx-xxxx | MC is ready to receive commands |
| 01yy-yyyy | | PC sent command yy-yyyy to the MC |
| | 01yy-yyyy | MC received the command and is processing the command (ACK) |
| | 11zz-zzzz | MC finished the command and zz-zzzz is the response |

Multi-Byte Command flow.

| PC Write | MC Write | Comments |
|---|---|---|
| 00xx-xxxx | | PC is ready to send a command to the MC |
| | 00xx-xxxx | MC is ready to receive commands |
| 01yy-yyyy | | PC sent command yy-yyyy to the MC |
| | 01yy-yyyy | MC received the command and is processing the command (ACK) |
| 10yy-yyyy | | PC send 2nd 6 bits of the command to the MC |
| | 01yy-yyyy+1 | MC received the 2nd 6 bits (ACK) |
| 01yy-yyyy | | If there is more, the PC sends the 3rd 6 bits to the MC |
| | 01yy-yyyy+2 | MC received the 3rd 6 bits (ACK) |
| 10yy-yyyy | | If there is more, the PC sends the 4th 6 bits to the MC |
| | 01yy-yyyy+3 | MC received the 4th 6 bits (ACK) |
| | | The PC will continue swapping the upper 2 bits until the entire command sequence is sent |
| | 11zz-zzzz | Sent after all 6 bit groups are sent |

Note several features of this protocol:

1. The PC might miss an ACK. When the MC finishes a command, it will put 11xx-xxxx in the port. If the PC has been interrupted or just busy, it might have missed the 01xx-xxxx state.
2. The PC will not miss a NAK. When the MC decides a command is invalid, it will place 10xx-xxxx in the port. This might happen instead of the ACK or after the MC decodes the command. Once the PC writes 00xx-xxxx or 01xx-xxxx the MC can change the port.
3. The PC might not always see exactly what it last wrote.
4. The PC must ensure that the port contains either a 00xx-xxxx state or a 11xx-xxxx state before starting a command.
5. If there is a possibility that two sections of code could write to the I/O port on the PC at the same time, special steps must be taken to ensure that two different code sections don't start a command at the same time. There is a short time between when the PC starts the command and when the MC will notice the command. The MC will ACK the command that it reads and not previous or later commands. But, there is no guarantee that an ACK will be seen.
6. Commands with no return values defined in the lower 5 bits will not necessarily return zeros in those bits.
7. Bit 5 is valid as a "more information available" bit only during 00xx-xxxx state and the 11xx-xxxx state.

Status values

The General Status values are available whenever the PC clears the upper two bits of the I/O port. The MC will then clear the upper bits and keep the other bits updated on a timely fashion. The other status values are only available after requesting them with a command. They are not updated, but are a snapshot of the status of the time the command was requested.

General Status Values

This I/O port contains the General Status values whenever bits 7 and 6 are read as zero.

These definitions are of the General Status Bits. This is the values are the ones the PC sees when reading 00E9h.

```
7 6 5 4 3 2 1 0
    | | | | | |
    | | | | | '--- Power LED State
    | | | | |          00 = Power LED Off
    | | | | |          01 = Power LED Green
    | | | | |          10 = Power LED Red
    | | | | |          11 = Power LED Yellow
    | | | | '---- Battery Charger State
    | | | |            0 = Trickle or No Charge
    | | | |            1 = Fast Charge
    | | | '------ Standby Button
    | | |              0 = Standby Key was not Hit
    | | |              1 = Standby Key was Hit
    | '---------- Eject/Dock Button*
    |                  0 = Eject/Dock Button was not Hit
    |                  1 = Eject/Dock Button was Hit
    '------------ More MC Data Available
                       0 = No more status info available
                       1 = More status info available
```

*To clear the set conditions on these two bit, the PC should send the Clear Kithit Command to the MC.

Switch Status Byte Values

This port contains the status of the hardware switches that sense the position of the portable computer and the load tray.

These definitions are of the Switch Status Bits.

```
7 6 5 4 3 2 1 0
    | | | | | |
    | | | | | '--- Notebook in tray
    | | | | |          0 = Tray is empty
    | | | | |          1 = Notebook is in tray
    | | | | '---- Tray is not Completely Out
    | | | |            0 = Tray is all the way out
    | | | |            1 = Tray is not all out
    | | | '------ Keylock On State
    | | |              0 = Keylock is off
    | | |              1 = Keylock is on
    | | '-------- Station Cover Removed
    | |                0 = Cover is on
    | |                1 = Cover is off
    | '---------- Left Side Connector Is Not Out
    |                  0 = Left Side is all the way out
    |                  1 = Left Side not all out
    '------------ More MC Data Available
                       0 = No more status info available
                       1 = More status info available
```

Modes Status Byte Values

This port contains the status of the Smart PC mode 1, LED modes, RESET signal just prior to eject mode and the RESET on reload of the notebook mode.

These definitions are of the Modes Status Bits.

7 6 5 4 3 2 1 0

- Bit 0 — Eject with RESET Active State
  - 0 = Eject with RESET Inactive
  - 1 = Eject with RESET Active
- Bit 1 — Dock with REST Active State
  - 0 = Dock with RESET Inactive
  - 1 = Dock with RESET Active
- Bit 2 — Smart PC State
  - 0 = Smart PC state Inactive
  - 1 = Smart PC state Active
- Bit 3 — Charge LED State
  - 0 = Charge LED under MC Control
  - 1 = Charge LED under PC Control
- Bit 4 — Power LED State
  - 0 = Power LED under MC Control
  - 1 = Power LED under PC Control
- Bit 5 — More MC Data Available
  - 0 = No more status info available
  - 1 = More status info available Command Values The following are the command values that are currently defined. There are 64 possible commands. Not all are defined currently. The MC will return 10xx-xxxx when the PC tries to execute an invalid command.

Command 00h (00-0000)—Clear Keyhit Bits

This command clears the keyhit bits in the General Status Byte.

Command 01h (00-0001)—Init Smart PC Mode 1

This command turns on the "Smart PC" mode number 1. This mode means that the PC wants to have control over the portable computer eject process. The MC will not eject the portable computer except when the user presses the Standby & eject buttons at the same time or when the PC sends an eject command.

Command 02h (00-0010)—Terminate Smart PC Mode 1

This command turns off the "SmartPC" mode number 1.

Command 03h (00-0011)—Eject Notebook

This command causes the MC to eject the notebook now. If the keylock is engaged, the MC will return with 1100-0001. There are several modes that the PC can set to modify the eject process. The default modes are "perform RESET before eject" and "power down before eject".

Command 04h (00-0100)—Read Switch Status Byte

This command returns the switch status byte to the PC. These bits are a snapshot of the various electromechanical switches of the docking station.

Command 05h (00-0101)—Blink Power LED

This command causes the MC to start blinking the Power LED at a standard blink rate. Either a "Standard Power LED" or one of the solid Power LED commands will cancel the blinking.

Command 06 (00-0110)—Standard Power LED

This command causes the MC to go back to the standard meaning for the Power LED.

Command 07 (00-0111)—Power LED Red

This command causes the MC to turn the Power LED red solid.

Command 08 (00-1000)—Power LED Green

This command causes the MC to turn the Power LED green sold.

Command 09 (00-1001)—Power LED Yellow

This command causes the MC to turn the Power LED yellow solid.

Command 0A (00-1010)—Power LED Off

This Command causes the MC to turn the Power LED off solid.

Command 0B (00-1011)—Connect Left Side

This command causes the left side connectors to try to be connected to the portable computer. If the connectors are already connected, no action is required. This command might just start the action.

Command 0C (00-1100)—Disconnect Left Side

This command causes the left side connectors to try to be disconnected from the portable computer. If the connectors are already disconnected, no action is required. This command might just start the action.

Command 0D (00-1101)—Toggle Left Side

This command causes the left side connectors to be moved in if they are out or disconnected if they are in. This command might just start the action.

Command 0E (00-1110)—Read Station Type

This command causes the MC to return 5 bits of ID. The current ID is 0.

Command 0F (00-1111)—Read Firmware Revision

This command caused the MC to return 5 bits of Firmware revision.

Command 10 (01-0000)—Read Firmware Version

This command causes the MC to return 5 bits of Firmware version.

Command 11 (01-0001)—Read Fast Charge Time

This command causes the MC to return the number of 16 minutes that the portable computer has been on Fast charge. If more that 32, then the value will be 1101-1111 which is 32*16 minutes or a little over 8.5 hours.

Command 12 (01-0010)—Blink Charge LED

This command causes the MC to blink the Charge LED at a standard rate. Either the "Standard Charge LED" or one of the solid Charge LED commands will cancel this blinking state.

Command 13 (01-0011)—Standard Charge LED

This command causes the MC to go back to the standard meaning for the Charge LED.

Command 14 (01-0100)—Charge LED On

This command caused the MC to turn the Charge LED on solid.

Command 15 (01-0101)—Charge LED Off

This command causes the MC to run the Charge LED off solid.

Command 16 (01-0110)—No RESET on Eject Mode

This command sets the mode so that on the next eject, no RESET is performed. This mode will then revert to the RESET on Eject state.

Command 17 (01-0111)—RESET on Eject Mode

This command set the mode so that on the next eject, a RESET is performed.

Command 18 (01-1000)—Load with no RESET Mode

This command sets the mode so that on the next load, no RESET is performed. After the load, this mode will then revert to the RESET on Load state.

Command 19 (01-1001)—Load with RESET Mode

This command set the mode so that on the next load, a RESET is performed.

Command 1A (01-1010)—Read Modes Status Byte

This command reads the status byte containing various information about the state of the MC software modes.

Command 1B (01-1011)—Power On

This command turns the power on to the expansion part of the docking station. On the 1st docking station, this includes the portable computer.

Command 1C (01-1100)—Power Off

This command turns the power off to the expansion part of the docking station. On the 1st docking station, this includes the portable computer.

Command 1D (01-1101)—Turn Power Back On Later

This 3 byte command tells the MC to turn the power back on at a later time. The 2nd byte contains the number of hours to delay and the third byte contains the number of minutes. The 1st implementation limits the hours to X. Also, the minutes only have a X resolution.

Command 1E (01-1110)—Clear Power Back On Timer

This command clears the hours and minutes time from the Turn Power Back on Later command.

Command 1F—3F (01-1111 through 11-1111)—Reserved

These commands are reserved at this time.

FIGS. 64 and 65 illustrate a flowchart of the portable computer's communication code for talking to the docking station's microprocessor.

DOCKING SYSTEM SOFTWARE OVERVIEW

The docking system is designed to accommodate at least the following software (should be installed in the order listed):

- Windows for Workgroups Add-On, Version 3.11 (for user with Windows 3.1); this operating system environment addon includes many new features particularly useful for the docking environment. This new operating system environment also provides Windows networking for both desktop and portable operation.
  - BatteryPro and Productivity Software—a collection of TI Utilities including:
  - BatteryPro Power Saving Utility
  - SETDOCK—A menu-driven program that allows you to configure a desktop environment. Run this utility for setting up a basic system or prior to running one of the other configuration programs like EZ_SCSI or PCM Plus.
  - Super Shutdown—a utility that automatically saves all open files, closes all open applications and undocks the notebook.
  - Collection of other utilities (ALARM, CURSON, GETSTAT, etc.) as described in TI's TravelMate 4000 User's Manual.
- TI VGA Utilities—Video installation program with various video device drivers supported by enhanced VGA display modes.
- Intel Plug-N-Play Configuration Manager—software that provides for easy configuration of ISA Option Cards.
- PCMCIA PhoenixCARD Manager Plus—the supporting software required to install PCMCIA option cards on the docking system.
- Adaptec EZ-SCSI for DOS/Windows—the supporting software required to install SCSI devices onto the docking system.

Loading and operating information for the previously listed software (except the TI Utilities) is provided in the following reference manuals:

- Windows for Workgroups User's Manual, P/N 9791790-0001
- PCMCIA PhoenixCARD Manager Plus User's Manual, P/N 9791792-0001
- Adaptec EZ-SCSI for DOS/Windows User's Manual P/N 978866-0001
- TravelMate—Series Notebook Computer User's Reference Manual, Part No. 2581179-0001—contains information regarding the VGA utilities.
- Intel Plug-N-Play User's Manual, TI Part No. 9791791-0001

SOFTWARE REQUIRED FOR MINIMUM SYSTEM

For a minimum system comprising a docking station, a portable computer, an external mouse, a keyboard, an external monitor, but not yet installing any options, the following software is needed:

- Windows for Workgroups Version 3.11 (see associated Windows for Workgroups User's Manual for loading and operating instructions).
- BatteryPro and Productivity Software (contains the configuration program, SETDOCK, Video Utilities (LCD, CRT, and SIM) and Super Shutdown, a utility which provides for automated undocking.
- TI VGA Utilities—a video installation program with various device drivers supported by enhanced VGA display modes

LOADING WINDOWS FOR WORKGROUPS ADD-ON SOFTWARE

1. Insert the Windows for Workgroups v3.11 diskette into Floppy Drive a.
2. At the DOS prompt, type: A:\SETUP and press ENTER.
3. Follow the displayed instructions to install the software on the hard drive.
4. For further instructions, refer to the Windows for Workgroup v3.11 User's Manual.

LOADING BATTERY PRO AND PRODUCTIVITY SOFTWARE

To load the BatteryPro and Productivity Software from diskette, use the following procedure:

1. Insert the BatteryPro diskette into the notebook diskette drive. Select the MS-DOS Prompt icon to return to DOS.
2. From the C:\WINDOWS> prompt, type A:\INSTALL.EXE and press ENTER to run the install program.
3. At the main menu of the Install program, use the arrow keys to select your choice and press ENTER. For a new installation, select the INSTALL ALL FILES option. The files are then loaded in the designated director. Select the default values as you are prompted for choices by pressing the ENTER key. The software should eventually return you to the Windows environment.

LOADING THE VIDEO UTILITIES

The following three utilities are provided on the TI VGA Utilities diskette:

LCD—Sends output to the LCD display on the notebook.

CRT—Sends output to an external VGA monitor

SIMUL—Sends output to both panel and CRT

After they are properly installed, these utilities appear as icons in the notebook group in the Windows desktop. Double-click on the icon to run the desired utility. To configure VGA Windows utilities, ensure you have the Video Utilities diskette in drive A and complete the following steps:

1. From the Program Manager, select File+Run . . . and enter a:\Setup.EXE
2. Select OK. The VGA Windows Utility Installation screen appears.
3. Enter the path where the screen utilities will be copied (default is C:\Windows).
4. Select OK. The files are copied to the designated directory and a dialog box appears stating that the files were successfully copied.
5. Select OK.

The VGA utilities will not change the default output in DOS (driven by System Setup). Changing the display type using WSETUP instead of these utilities will require a cold boot before the changes take place.

RUNNING SETDOCK

Using SETDOCK to Configure the System

SETDOCK is a configuration utility developed for the Docking System environment that customizes the desktop hardware configuration for maximum performance. SETDOCK must be run anytime docking system hardware is added or removed or port settings are to be changed. SETDOCK is automatically loaded when the BatteryPro and Productivity software is loaded. SETDOCK may be run from either MS-DOS or Windows (located in the UTILS directory of the hard drive).

Running SETDOCK from Windows

To run SETDOCK from Windows, select Run rom the File menu and type: C:\UTILS\SETDOCK.EXE in the Command line. Select OK to Run.

Running SETDOCK from DOS

To run SETDOCK from MS-DOS, type: C:\UTILS\SETDOCK.EXE at the MS-DOS c:\prompt. The SETDOCK main screen then appears on your monitor. The first time you run SETDOCK, simultaneously press ESC and F5 to ensure default values are installed.

Exiting from SETDOCK

To leave the SETDOCK utility, press ESC to call up the exit menu options and select the appropriate option.

SETDOCK Main Screen

The SETDOCK main screen, illustrated in FIG. 38, allows a user to configure the notebook for use with the docking system.

When using some combination (combo) floppy drives, a user may need to swap the floppy 0 and floppy 1 types in addition to setting Swap floppy Drives to YES (i.e. if 3½" was type 0 and 5¼" was type 1, if setting Swap. Floppy Drives to YES, then you will need to change 3½" to type 1 and 5¼" to type 0 as well.

SETDOCK Key Functions

To move around within the main screen of the SETDOCK utility, use the following keys:

TABLE 3-10

| Key | Function |
|---|---|
| ↔ | Displays options available for the selected item |
| ⇅ | Moves up or down through the list of options |
| Tab | Moves down through the list of options |
| ESC | Displays a screen with Exit options |
| F1 | Provides help |
| +/− | Increases or decreases the values in the selected field |
| Spacebar | Increased the values in the selected field |
| PgUp<br>PgDn | on 4000 Series, will move you from page to page. On other notebooks, press FN+PgUp of FN+PgDn |

From the main screen, the following options are available:

| Item | Options | Description |
|---|---|---|
| Desktop floppy 0 (1) type | 5.25, 360 KB<br>5.25, 1.2 MB<br>3.5, 720 KB<br>3.5, 144 MB<br>3.5, 2.88 MB<br>Disable | Sets your floppy drive to the correct settings |
| Swap floppy drives | Yes<br>No | Changes the order other floppy drives (for instance, A can be configured to be seen as B) |
| Game Port | On<br>Off | Normally set to ON unless you want to use a game port on another board (such as a sound board) or you need the I/O space. |
| QuickPort mouse | On<br>Off | Normally set to ON unless you want to use a serial mouse and need the I/O ports |
| SCSI hardware | On<br>Off | Normally set to ON unless you have a board that conflicts with the I/O ports, DMA, or Interrupts assigned to the SCSI hardware by the onboard jumpers |
| SCSI BIOS | On<br>Off | Normally set to ON unless it is not required and you want to use the small amount of BIOS area for Upper Memory Blocks |
| PCMIA hardware | On<br>Off | Normally set to ON unless you have a board that conflicts with the I/O ports, DMA, or Interrupts assigned to the PCMCIA hardware by the onboard jumpers |
| PCMCIA BIOS | On<br>Off | Normally set to ON unless you're not using PCMCIA options and you want to use this BIOS areas for Upper Memory Blocks |

SETDOCK Second Screen

FIG. 39 illustrates the SETDOCK second screen:

From the second screen, the following options are available:

| Item | Notebook Only (Avail. Options) | MicroDock & Notebook (Avail. Options) | MicroDock & Notebook (Avail. Options) |
|---|---|---|---|
| Configuration | 1 thru 3<br>Custom | 1 thru 5<br>Custom | 1 thru 6<br>Custom |

-continued

| Item | Notebook Only (Avail. Options) | MicroDock & Notebook (Avail. Options) | MicroDock & Notebook (Avail. Options) |
|---|---|---|---|
| Notebook 9 Pin Serial* | COM 1 thru COM2 OFF | COM 1 thru COM 4 OFF | COM 1 thru COM 3 |
| Notebook Internal* | COM 1 thru COM 2 | COM1 thru COM2 Off | COM 1 through COM 2 Off |
| Station 9 Pin Serial* | N/A | COM 1 thru COM 4 Off | COM 1 thru COM 4 Off |
| Station 25 Pin Serial* | N/A | N/A | COM 1 thru COM 4 Off |

*Automatically set based on configuration unless Custom is selected.

| Item | Options | Description |
|---|---|---|
| COM3/COM4 Addresses | 2e8/2e0 220/228 338/238 3e8/2e8 | Selects address for COM3 and COM4 |

SETDOCK Third Screen

FIG. 40 illustrates the SETDOCK third screen:

From the third screen, the following options are available:

| Item | Notebook Only (Avail. Options) | MicroDock & Notebook (Avail. Options) | Desktop & Notebook (Avail. Options) | Description |
|---|---|---|---|---|
| Config. | 1 thru 4 | 1 thru 2 | 1 thru 2 | Selects LPT port printer configuration |
| LPT1* | Disabled 3BCh-IRQ7 378h-IRQ7 278h-IRQ5 | Disabled 3BCh-IRQ7 378h-IRQ7 278h-IRQ7 | Disabled 378h-IRQ7 | |
| LPT2* | N/A | Disabled 3BCh-IRQ7 378h-IRQ7 278h-IRQ5 | N/A | |

*Automatically set based on configuration.

Exiting SETDOCK

To leave the SETDOCK utility, complete the following steps:

1. Press ESC from the main screen. The Exiting Setup Menu appears.
2. Select one of the following options:
   Based upon your input, you may return to the main screen, accept changes to Setup, or exit Setup (see the following chart).

| Key | Function |
|---|---|
| ESC | Returns you to the main screen |
| F4 | Saves all changes, exits Setup, and reboots |

-continued

| Key | Function |
|---|---|
| F5 | Loads default values for all pages |
| F6 | Aborts Setup without saving values |

CONFIGURING PCMCIA OPTION CARDS

To install PCMCIA option cards into the docking system, load the PCMCIA PhoenixCARD Manager Plus (PCM Plus) software. PCM Plus consists of the following components:

EZ-INSTALL—menu-driven installation program that loads required PCM Plus components onto your system. Two installation versions are available depending on your level of expertise: Quick Install (for beginners) or Advanced Install for advanced users.

Windows Information Utility (PCMCIA ICON)—displays PCMCIA card status for any cards installed in the PCMCIA slots (or indicate if a slot is empty). The status information includes configuration state of the card, card manufacturer's name, type of card (for instance FLASH, FAX/MODEM, or SRAM), and whether the card has a battery installed. If a card is installed that cannot be configured by PCM Plus, the status message will indicate this. The remainder of the PCM Plus software components are automatically loaded into your system when you run the EZ-INSTALL installation program.

Running PCM Plus Setup

A Setup program must be run after doing any of the following:

Installing one or more PCMCIA option card(s).

Removing one or more PCMCIA option card(s).

Running PCMCIA EZ-INSTALL

Use the following procedure to load PCM Plus onto hard disk:

1. Dock the notebook into the docking station.
2. Insert the PhoenixPCMCIA Utility diskette into the floppy drive in your notebook.
3. From the C: prompt, type the drive name A: (or B:) and press Enter.
4. From the A: (or B:) prompt, type: INSTALL and press Enter. The program displays the copyright screen.
5. Press any key and you will be prompted to enter the number of PCMCIA sockets in the machine. Type 2 and press Enter.
6. Press Q for the "Quick" or A for the "Advanced" Install. The Quick Install option allows you to accept defaults as presented or make minor changes and then press Enter. This is the desirable approach for an inexperienced user. More experienced users can select the Advanced Install option that allows the inputting of specific command line parameters to suit specific requirements.
7. Next, a series of questions pertaining to the installation of PCM Plus will be presented. Refer to the Phoenix PCMCIA Card Manager's User's Guide included with your system for further installation and operating instructions.

After installing (or removing) one or more ISA Expansion Cards, load and run Intel's ISA Plug-N-Play Configuration Utility.

Running the ISA Configuration Utility

The procedure for loading and using the ISA configuration utility is as follows:

1. Insert the installation diskette into the notebook floppy.
2. From Windows, select FILE, then RUN, Type: A:\SETUP and follow the instructions on installing the Plug-N-Play software to the hard drive.
3. To execute the ISA configuration Utility, double click on the Intel ISA Configuration Utility Icon in the Plug-N-Play window for further operating instructions. Also refer to the Intel Plug-N-Play User's Manual.

INSTALLATION OF SCSI DEVICES

After installing one or more SCSI devices onto the docking station, load and run the Adaptec EZ-SCSI for DOS/Windows program. EZ-SCSI is a menu-driven program that provides a convenient means of installing SCSI devices without having a technical background (defaults are provided that will get you up and running without a comprehensive understanding of SCSI bus parameters). A more advanced install option is also provided to permit tailoring the SCSI bus parameters for more advanced users.

Included with the EZSCSI program are device drivers to support all common SCSI devices, low-level and high-level SCSI disk formatting utilities, and a menu-driven install program that takes one through the configuration process and automatically installs the necessary device drivers on the docking system.

Running the EZ-SCSI Install program

The procedure for running the EZ-SCSI install program is as follows:

1. Connect the notebook computer to the docking station.
2. Insert the Adaptec EZ-SCSI diskette into the floppy drive in the notebook computer.
3. From the C: prompt, type the drive name A: (or B:) and press Enter.
4. Type INSTALL to start the install program.
5. Follow the instructions that appear on the screen. In most cases, respond to the prompts by pressing ENTER. This selects the factory default settings.
6. When installing a SCSI HDD, add the following command in the CONFIG.SYS file: LASTDRIVE=X where X is next drive available in your system (e.f. H,2).

USING THE SUPER SHUTDOWN UTILITY

Super Shutdown is an automatic shutdown configuration utility available on the BatteryPro and Productivity Software diskette. With this utility, the docking system exits Windows faster than with the standard Windows exit procedure. One can also select from a variety of user-specified shutdown features that will customize the way the user's computer shuts down and reboots. Examples include automatically closing all Windows and DOS applications as well as saving files.

To use Super Shutdown, single-click on the Super Shut down icon so that the Shutdown Configuration Menu appears, as illustrated in FIG. 41. If the Super Shutdown icon did not automatically load when entering Windows, the Battery Pro Utilities Diskette may need to be reinstalled.

This menu allows a user to set the following as defaults for system shutdown:

- Options that allow customized software configuration upon system shutdown.
- The position the user wants the Shutdown icon to appear on the screen of the notebook or external CRT.
- Options that customize the notebook.
- Use of the Dynamic Data Exchange (DDE) to communicate with Windows applications that support it.
- Schedule time for automatic system shutdown
- Maximum power savings for your computer during battery operations Shutdown Options Shutdown options allow a user to:

- Terminate Windows applications unconditionally
- Terminate DOS applications unconditionally
- Allow any applications that support DDE (such as Microsoft EXCEL) to save and close any open files.
- Send keystrokes to DOS and Windows applications to close and save any open files.

ICON

The icon options allow a user to select whether or not the user wants the Shutdown icon to stay on top of any overlapping windows or to automatically appear in the position in which it was located at the time of system shutdown.

Desk-Top Options

The DeskTop Options allow a user to perform functions that affect the system connection and notebook ejection. These options include:

| Option | Description |
|---|---|
| Enable Smart Docking | Allows Super Shutdown to control the eject process. Shutting down causes the notebook to be ejected. pressing the eject button causes Super Shutdown to run first. |
| Password protected | allows you to set password privileges to access your default shutdown settings. See Set Password. |
| Disable eject switch | Disables the eject switch so that you cannot eject the notebook from the Docking Station manually |
| Disable CRT on standby | Disconnects the CRT and modem on the notebook during Auto-Standby mode |
| Energy Star Options | Saves power usage by suspending operations at specified times. |
| Set Password | Only enabled if Password Protected is selected. Allows you to set and change passwords. |
| Default Exit Mode | Allows you to select conditions (such as exiting to DOS) that occur upon shutdown. |

DeskTop Energy Saving Features

This feature is available when the Energy Star Options button is selected from the Shutdown Configuration menu. This feature causes the system to enter a suspended state automatically at specified times. The system will also automatically resume at specified times. If the system is in use, a message appears before the system is suspended to ensure automatic shutdown is desired. FIG. 42 displays the DeskTop Energy Saving Features dialog box.

The following options are available to customize energy saving features:

| Feature | Description |
|---|---|
| Enable Energy Saving Feature | Turns on the Energy Saving Feature |
| Time for DeskTop Shutdown | Allows you to specify the time you want the system to shut down |
| Time for DeskTop Resume | Allows you to specify the time you want the system to resume operation |
| Manual resumption of the DeskTop | Allows you to restart your system manually. System will not restart until user presses suspend button. |
| Include weekends | Allows you to select the Energy Saving Feature to operate every day of the week. |
| Enable Desktop Instant On | Lets the desktop to come up automatically when a key is pressed or the mouse is moved. |
| Auto-Shutdown Confirmation Delay (in minutes) | If the system is currently in operation, this feature allows you to enter the number of minutes after which the system will assume you want to shutdown. |

Set Password

A user may set or reset a password for Super Shutdown. To set or reset a password, complete the following steps:

1. Select Password protected on the Shutdown Configuration menu.
2. Select the Set Password button.

The Change Password dialog box appears as illustrated in FIG. 43.

Entering a Password

To enter a new password.

1. Type the new password at the New Password line.
2. Retype the new password in the Retype New Password line.
3. Press ENTER.

Changing a Password

To change a password.

1. Type the old password in the Old Password line.
2. Type the new password at the New Password line.
3. Retype the new password in the Retype New Password line.
4. Press ENTER.

EXIT MODES

To select an exit mode for Shutdown:

Single click on the Shutdown icon and select the exit mode from the menu, or

Select the Default Exit Mode from the Shutdown Configuration menu.

The following table explains exit mode available from the Super Shutdown Utility:

| Shutdown Method | Description |
|---|---|
| Exit to MS-DOS (default) | Takes you to the MS-DOS prompt after shutdown. |
| Suspend | Enters the power saving mode |
| Exit to MS-DOS and Suspend | Takes you to the MS-DOS prompt and enters the power saving mode |
| Exit to MS-DOS and Eject | Takes you to the MS-DOS prompt and then ejects the notebook from the Docking Station |
| Restart Windows | Exits and then restarts Windows (useful when configuration changes have been made or application errors must be cleared. |
| Reboot System | Exits Windows and reboots the system. |

Application Setup

The Application Setup button allows a user to use the Dynamic Data Exchange (DDE) to communicate with Windows applications that support it. Such applications are called DDE Servers. When selected, the Application DDE Information dialog box appears as shown illustrated in FIG. 44.

From this dialog box, the following information is required:

| Selection | Description |
|---|---|
| Window Name | The window title that appear in the title bar. Clicking on the button next to the text box in the Application Close Information dialog box drops down a list of applications that are currently set up. |
| Keystrokes String | The DDE command or the string of keystrokes used to close any open files. For instance, to close an open Winword file, the keystrokes are ALT+F4. |
| DDE Server Name | The name that the application responds to for DDE communication (such as Winword). |
| DDE Command | The command sent to the DDE from the application. The Application Close Information dialog box checks this line if Keystrokes String does not function. To obtain DDE Command Information, refer to the User's Manual for your specific application or call the manufacturer. |
| Repeat DDE command until fail | If selected, the DDE command specified in the Keystrokes String will be sent repeatedly until an error message is received. For example, if an application has multiple files open, the command is sent until each file is closed. When no more open files exist, the error message is sent. |

The DDE Server and command string must be specified by the application software.

Scheduling

The Scheduling feature of Shutdown is used during battery operation of your computer. If a power savings driver is active on your computer, Shutdown works with it to reduce power consumption while running Windows. The lower the value, the greater the savings. FIG. 45 illustrates an example of the Scheduling dialog box.

Suggested Values:

Microsoft Word for Windows v 1.1 or lower or Microsoft Power Point—value=100

Games—value=130 to 200

The following DOCK command allows you to set arguments for various Docking System configurations. The Arguments typed at the MS-DOs prompt as follows: DOCK [ARGUMENT]

The following arguments are available with the DOCK command:

| Argument | Definition | Message |
|---|---|---|
| (No argument), U, ?, HELP | Displays help for the DOCK command | N/A |
| CRT=ON | Maintains a connection to the CRT and Modem on the notebook during Auto-Standby mode | CRT and Modem connector will remain connected during Auto-Standby |
| CRT=OFF (Default) | Disconnects the CRT and Modem on the notebook during Auto-Standby mode | CRT and Modem connector will be withdrawn during Auto-Standby |
| EJECT | Allows you to remove the notebook from the Docking Station | Ejecting unit |
| SMART = ON | Enables the Smart Mode for the Docking System required for other dock options to function correctly. At DOS, if Power/Standby Key is pressed, the unit will not power off (goes into Standby). Pressing Standby/Power Key again will resume operation from Standby. | Smart Eject = ON |
| SMART = OFF (Default) | Disables the Smart Mode for the Docking System. At DOS, if Power/Standby Key is pressed, the unit will power off. Caution: Unsaved DOS Files will be lost. | Smart Eject = OFF |
| STATUS | Displays the current status for the Smart Mode Options. | N/A |
| SUS-PEND (not available for non-E series note-books) | Puts the system in Auto-Standby mode immediately. | N/A |
| VERSION | Displays the version and copyright information. | N/A |

INTELLIGENT DOCKING SYSTEM

An intelligent docking system is the result of a combination of docking station system 9 and the previously discussed software.

The microprocessor (U140 in FIG. 33) in docking station 10 drives motors 47 and 90 in a manner similar to the way motors are driven in a printer (i.e. open loop stepper with sequential switches). The microprocessor also provides intelligent processing to portable computer 13 and applications across the bus {like in TI's PCMCIA bus patent but without the controller on the main board}. The microprocessor addresses are decoded to the CPU in portable computer 13 and the CPU application software writes back to the microprocessor communications channel, which it then turns on. The result is back and forth communications between the microprocessor and the CPU, e.g., what is the status of may battery? or which key was hit? or it reads the auxiliary keyboard. If the CPU likes the communications it receives from the microprocessor, it gives commands to the microprocessor to do something with the information, e.g., turn the power off but wake-up in a set number of minutes or hours. The intelligent part is the back and forth communications.

Load/eject switch 16 and standby/on power switch 12 are free form switches. Docking station 10 controls the power to portable computer 13. When load/eject switch 16 is pressed and no portable computer is in docking station 10, the docking station anticipates that a user may want to load a portable computer (not yet within software control). When a portable computer 13 is deposited on tray 39 of the docking station, docking station 13 performs the algorithms needed to activate the motors and mechanical mechanisms that are needed to move the portable computer into a docking position. The docking station also performs a reset to the CPU, provides power to the docking system, e.g., to bring it up so that the CPU (486, 586 or pentium) and application logic star talking to the microprocessor.

The intelligent docking system also provides a dumb mode/smart mode option. In dumb mode, the microprocessor in docking station 10 has the opportunity to do things on its own. As an example, in dumb mode, standby/on power key 12 is an on/off switch. But, if in smart mode, the microprocessor is not allowed to interpret the key as anything other than a key switch. The 486 application reads the key 12 and decides what to do with it. It may do nothing with it, or it may send back a command, such as put into suspend mode, or withdraw the VGA port. As a result, more functions are performed based on what the key hit was based on user programmable functions. As an example, set a suspend event for Windows. Windows reads the suspend event and does whatever it wants to, such as close filed down after which it suspends. The system also has the ability to suspend without telling Windows and the ability to eject the system from a software application—Super Shutdown feature.

The Super Shutdown feature allows the microprocessor to talk to the underlying software in the CPU (486 as an example) and through the microprocessor's actions and the user's set up actions, the microprocessor translates that as the code in the CPU to commands to the microprocessor, if present, or if not, terminates to other commands. The feature sets up and closes Windows applications, closes DOS applications and saves changes to files. The feature will not allow the system to shut down and eject the portable computer until all the pre processing is done. When smart docking is enabled, the CPU can talk to the microprocessor. The feature allows the disabling of the eject switch to prevent accidental ejection, provides pass word protection, set time for automatic shut down of the system, wakes up the system and facilitate manual or automatic resume. The feature also allows the system to be locked through the communications port which the CPU uses to send instruction to the docking station. The microprocessor examines the key lock status and will not allow ejection until the key lock is clear.

The processor in docking station 10 talks to the application processor CPU in the portable computer and allows an interface to the user. The user makes an interface directly to the application that can talk to the microprocessor in the docking station or go through a third party such as the BATTERYPRO feature (which is insensitive to the operating system). The system can go through a normal Windows eject system—e.g., file close/eject and depending on what the user set up and turn it into shut the system down and eject the portable computer or turn the power off and wake up later. The system also has the ability to remember everything when it wakes up or do a cold boot or have the ability to warm eject or hot eject and hot dock.

The SETDOC feature goes in and programs common hardware in any docking station and configures communication ports on the portable computer. SETDOC tells the portable computer what kind of docking station it has connected to. During plugin, the microprocessor controls the speed and force of motors 47 and 90. During slew in (period of connector movement during connector connection of portable computer connectors), the motors are slowed down right before the connector of the docking station connect with the connectors on the portable computer. When the connectors on the portable computer begin to mate with the connectors on the portable computer, the drive current to the motors is increased to plug the connectors hard. This feature prevents user smashed fingers and reduces connector damage due to incorrect connector coupling.

PCMCIA slots in a docking station is another innovative feature of the present invention. Unlike current portable computers having PCMCIA slots and a PCMCIA controller in the portable computer, the PCMCIA controller in the present invention is in the docking station. Other advantages of the docking station system include the previously mentioned visual indicator in standby/on power key and power indicator 12 in docking 10 for standby status and a visual indicator between standby/on power key and power indicator 12 and load/eject switch 16 for indicating portable computer battery status. The microprocessor in the portable computer can communicate what's happening to the battery to the system across the interface.

SYSTEM EXPANSION CAPABILITIES

Docking station 10 contains build-in controllers, option sockets and bays and configuration/driver software to add the following expansion options: up to six Industry Standard Architecture (ISA, AT-type) Expansion Boards (three must be half-size cards); up to four internal mass storage devices (e.g. two non-SCSI devices and two SCSI-II compatible SCSI devices such as hard disks, tape drives, CD ROMs, etc.); and up to two PCMCIA option devices may be installed in the external slots. These can be used to add type I, II, or II compatible PCMCIA cards. These two PCMCIA slots support either 3-volt or 5-volt card technologies.

ADDING INDUSTRY STANDARD EXPANSION CARDS

Docking station 10 has internal connectors and supporting software to permit the installation of up to six industry standard (ISA or AT-type) Expansion Boards (network cards, video cards, internal Data/FAX Modem cards, etc.), as illustrated in FIG. 46 to allow system growth. An ISA Plug-N-Play Configuration manager provides software support for ISA card installation.

ADDING INTERNAL/EXTERNAL SCSI DRIVES

Docking station 10 also contains built-in controllers, on-board signal/power connectors and configuration software (EX-SCSI) that allows the installation of up to two internal SCSI Devices or a combination of up to seven internal/external SCSI devices, as illustrated in FIG. 47, using an optional SCSI connect kit. An "Install" program (Adaptec EZ-SCSI) downloads the appropriate SCSI drivers and sets up the necessary Configuration files.

EXTERNAL SCSI EXPANSION CAPABILITIES

An optional External SCSI Kit (TI Part No. 978867-0001) is available if more than two internal SCSI devices or one or more external SCSI devices are to be installed. The kit includes a special 6-connector harness with four internal SCSI ports and a 50-pin SCSI connector that is installed on the rear panel of docking station 10. The special harness and external 50-pin connector allow daisy chaining of up to seven internal/external SCSI devices.

ADDING PCMCIA OPTIONS

Docking station 10 comes equipped with two side-access, external slots that accommodate the credit-card size, Type I, II, or II PCMCIA options (EG. Data/FAX Modem, Networking Card, Hard Drive, etc.). These can be either 3-volt or 5-volt PCMCIA options. A controller (adapter) in the docking station 10 provides the necessary hardware interface between the PCMCIA card slots and the portable computer 13. The PhoenixCARD Manager Plus software provides the necessary configuration driver support.

REAR PANEL CONNECTORS

Docking station 10 brings all ports (connectors) to the rear of the unit for easy connection to external devices (printer, CRT, keyboard, Mouse, External SCSI peripherals (with the optional SCSI kit), RJ-11 (or RJ-45) telephone jack for the portable computer's optional internal Data/FAX Modem, etc). As illustrated in FIG. 4, the docking station's standard set of connectors include:

- VGA Monitor, 15-Pin, D-Sub Connector—This is a pass through port from the portable computer. The port is programmable for up to 256 colors in either 640×480 or 800×600 modes. Can also be programmed for 1024×768 monitors with up to 16 colors.
- Mouse, 6-Pin, Mini-DIN Connector—This is a pass-through port from the portable computer. This port supports an external PS/2 Mouse.
- 101 Keyboard, 5-Pin, DIN Connector—supports a 101—compatible external keyboard.
- Game Device, 15-Pin, D-Sub Connector—used for attaching joy stick or other game port compatible device.
- Parallel Device, 25-Pin, D-Sub Connector—BI—Directional EPP/ECP Parallel Connector—used for attaching a parallel printer or other parallel interface device (e.g. Document Scanner).
- RS-232 Serial, 9-pin, D-Sub Connector; (with 16550 UART)—used for attaching a serial printer, external modem or other serial device.
- RS-232/422 Serial Device, 25-Pin, D-Sub Connector (with 16550 UART)—used for attaching a 25-pin serial device.
- RJ-11 Telephone Jack or RJ-45 Telephone Jack (depending on dash number of docking station)—This is a pass-through port from the portable computer's optional internal modem that is used for connecting to the telephone system or Data Access Arrangement (DAA).

PCMCIA/EXPANSION CARD OPTION CONNECTORS

All connectors on ISA Expansion cards and PCMCIA Option devices are available on the exterior of the unit.

INSTALLING INTERNAL OPTIONS

REMOVING TOP COVER

Top housing cover **10*a* must be removed to add most internal options. Cover 10*a*** can be removed as follows:

1. Ensure that portable computer 13 is out of docking station 10, that the power cord is removed from the back of the docking station, and that the tray is extended (out) position.
2. Remove the removable portion **10*b* of top housing cover 10*a*** by sliding the latches inward.
3. Hand loosen (or use a straight slot screw driver if screws are tight) the four large screws along the top of the rear panel on the docking station.
4. Lift the top housing cover **10*a* upwards from the rear until top housing cover 10*a*** is almost vertical.
5. Flip top housing cover **10*a* over next to the right side of docking station 10, as illustrated in FIG. 48**.

6. When re-installing top housing cover 10*a,* carefully work the cover into place. Ensure that the cover clears the QuickPort on the right side and that the excess control panel cable is carefully tucked in. Also unsure that the control panel cable connector is securely attached to the System Interface PWB. When the cover is correctly positioned, hand tighten the four screws across the top of the rear panel.

INSTALLING INTERNAL MASS STORAGE DEVICES (OPTIONAL)

Docking station 10 contains an onboard SCSI Controller capable in interfacing up to seven Small System Computer interface (SCSI) devices with the desktop system and a Floppy Controller that can drive a Floppy-type device.

The System Interface PWB also contains a SCSI signal connector (P20), a Floppy Signal Connector (P22) and two disk power connectors, P28 and P29 (provides power for either SCSI devices or standard Floppy Drive devices).

Docking station 10 contains two types of bays or facilities for installing mass storage devices including:

Two front-mounted storage bays (visible from the front)—typically used to hold SCSI CD ROM drives(s) or optionally a dual floppy drive (combo unit) containing both a 5¼ inch and 3½ inch floppy drive.

Two internal bays in the HDD Bracket Assembly—typically used for installing SCSI Hard Disk Drives (if installing an internal Floppy Drive in the docking station, the floppy drive in the portable computer is disabled).

SCSI Signal Adapter Cable (contains three signal connectors that permit connecting one or two SCSI devices to the onboard SCSI connector, P20). One end of the cable must be connected to SCSI Connector. The middle connector is used for attaching the first SCSI device and the other end connector is used for attaching the second SCSI device (either now or later).

Two Power Adapter cables that provide power connections for up to four mass storage devices (can be attached to either SCSI or Floppy Drive devices).

The standard set of mass storage cables are illustrated in FIG. 49. A floppy Interface Cable, typically supplied with the drive, is required to install a front-mount, non-SCSI Floppy Drive. If more that two internal SCSI device or one or more external SCSI devices are to be installed, an SCSI Connector Kit, TI Part No. 978867-0001 is required.

INSTALLING ONE OR TWO FRONT-MOUNTED DEVICE(S)

To install front-mounted devices (e.g. SCSI CD-ROM Drive and/or Dual Floppy Drive), use the following procedure:

Follow steps 1–5 of REMOVING TOP COVER section;

6. Remove the four screws from the top of the bezel accessible through the holes along the front edge of the transport assembly, as illustrated in FIG. 50.
7. Remove the four screws securing the front bezel to the frame and remove the bezel.
8. Remove the two screws securing the left side pair of brackets and remove the brackets.
9. Install the brackets (noting right and left designations) onto the mass storage device using screws supplied with the Drive. Ensure that the front edge of the drive protrudes approximately ½ inch beyond the edge of the brackets so that the drive will fit flush with the bezel when installed.
10. If installing a floppy device, substitute a Floppy Signal Interface Cable for the SCSI Cable Adapter and attache one end of the cable to the HDD Connector, P22, illustrated in FIG. 51. Locate the SCSI Signal Interface Cable (ribbon cable with three connectors), as illustrated in FIG. 52. Lay either end of this cable next to the SCSI Connector P20). Remove the copper-colored Expansion Bus connector from the PWB and fold out of the way. Route the center connector of the SCSI Interface Cable through the opening at the base of the system and out to the from of the docking station. Lay the other end of the cable in the adjacent bay (note that the “front-mount” power adapter has a connector in the center of the cable whereas the power able for the internal drives has two connectors near one end for attaching to drives in the HDD Bracket Assembly).
11. Locate and route one end of the “front-mount” power cable through he same opening. At this point, one end of the power adapter and the center connector of the SCSI cable should just clear the front of the docking station.
12. Locate pin 1 on the Signal Interface Cable (adjacent to the red wire) and pin 1 on the signal connector on the drive; attach the Signal Interface Cable to the drive connector (note that SCSI devices also make use of a tab key. In this case, align the elevated tab on the interface connector with the key cutout on the drive).
13. Connect the power connector (protruding from the front bay opening) into the power connector on the Floppy Drive, as illustrated in FIG. 53. If installing two or more SCSI devices, the terminating resistors must be removed from all except the last SCSI device in the chain.
14. While holding the signal and power cable at the rear of the unit, slowly insert the drive into the front bay while taking up the cable slack at the rear.
15. Using the previously removed screws, attach the drive brackets to the disk drive and then installing the assembly in the docking station front bay. If a second front mount device is not being installed at this time, replace the bezel at this time.
16. Plug the end connector of the SCSI Interface Cable into P20 (note the location of pin 1 on the connector and match up the red wire with pin 1).
17. Install the middle power connector from the Power Adapter Cable into connector P29 (bottom power connector). Tuck the remaining power connector under the right side drive bay for later use.
18. Reinstall the Expansion Bus connector by pressing firmly on the ends of the connector avoiding the pins on the back of the connector. If installing a second front mount device, and both are SCSI devices, use the remaining signal and power connectors from the adapter cables installed with the first device install the termination device on the second SCSI device. If the second device is a Floppy Drive, procure a Floppy Interface Cable and attach between the Floppy signal connector and P22 on the Signal Interface Board. Use the extra power connector tucked under the right side bay.

INSTALLING SCSI DRIVES IN THE HDD BRACKET

If installing one or two internal SCSI Drives:

1. Place the docking station 10 on a table top where you can easily get to the front and back section of the docking station. Ensure that the docking platform of portable computer 13 is fully extended (out) position (if not, press load/eject key 16.

2. Remove the external CRT display 15 from the top of the docking station (if present); disconnect the power cord from the rear of the docking station and remove the lid and top cover (if not already done).
3. Using a Phillips screw driver with a five-inch long shank, loosen (but don't remove) the four screws at the base of the HDD Bracket, as illustrated in FIG. 54. Slide the bracket forward to clear the back two screws; then slide the bracket backward to clear the front screws and remove the bracket.
4. Install the hard drives as shown in the previous figure with connectors facing to the right and toward the front of the unit. Ensure that clearance exists between the side walls of the bracket and each installed device; tighten the top and bottom screws (supplied with the drives).
5. Reinsert the HDD bracket with drive(s) installed (carefully insert the front of the bracket underneath the two screws on the standoffs; then slide the back of the bracket underneath the rear two screws; tighten all four screws).
6. If you have previously installed one SCSI device (either as a front mounted device or in the HDD Bracket), you have an extra power connector and signal connector ready to be connected on the second SCSI device. If this is the first installed SCSI device, plug one end of the SCSI signal cable into SCSI connector, P20. Then route the second connector over to the SCSI device you've just installed and connect it to the signal connector (align the connector keys and ensure that the red strip of the interface cable goes to pin 1 on the device connector). It may be necessary to disconnect the Expansion Bus connector from the board and route the SCSI signal cable underneath the Expansion Bus Connector; then reconnect the Expansion Bus Connector.
7. If an available power connector is on hand, route it to the power connector on the device just installed. If not, install the end connector of a power cable onto connector P29 or P28 and connect the next available connector on the harness to the power connector on the device just installed. When install internal SCSI drives only, the correct terminators are provided on the System Interface Board. If installing both internal and external SCSI devices, the onboard terminators must be disabled.

INSTALLING MORE THAN TWO SCSI DEVICES

If installing more than two SCSI devices in the docking station or one or more SCSI devices external to the docking station, an SCSI Connector Kit option, TI part No. 0978867-0001, is required. The kit includes a six-connector signal interface cable and a four-connector power cable. The end connector on the signal cable is an external connector that attaches to the docking station's rear panel (used for connection to external SCSI devices).

Use the following procedure to install more than two internal SCSI devices:

1. Place docking station 10 on a table top to provide easy access to the front and back section of the docking station. Ensure that the portable computer docking platform is in the fully extended (out) position (if not, press load/eject key 16).
2. Remove the external CRT 15 from the top of the docking station (if present); disconnect the power cord from the rear of the docking station and remove the lid and top cover.
3. Remove the four screws from the top of the bezel accessible through the holes along the front edge of the transport assembly.
4. Remove the four screws securing the front bezel to the frame and remove the bezel. If there is already a front-mounted SCSI device and installation of additional SCSI devices is anticipated; remove the installed SCSI device(s) and disconnect the three-connector interface cable. All SCSI drives should be interconnected using a six-connector interface cable.
5. Remove the screws securing the brackets and remove the brackets (note that the left and right brackets are different), as illustrated in FIG. 55.
6. Install the two brackets (the left side bracket is marked by the letter L on the front edge of the bracket; the right bracket contains the letter R.) on the SCSI Drives using screws supplied with the Drive. Ensure that the front edge of the drive protrudes approximately ½ inch beyond the edge of the brackets so that the drive will fit flush with the bezel when its installed.
7. Using a Phillips screw driver with a five-inch long shank, loosen (but do not remove) the four screws at the base of the HDD Bracket, as illustrated in FIG. 56. Slide the bracket forward to clear the back two screws; then slide the bracket backward to clear the front screws and remove the bracket. If a hard drive was previously installed in the HDD Bracket, remove the three-connector interface cable from the Drive(s) and from the SCSI Connector (P20) on the System Interface Board—a 6-connector interface cable will be installed.
8. Lay out the 6-connector interface cable across the rear of the docking station with the external connector near the cutout in the rear panel and the opposite end connector adjacent to the onboard SCSI Connector, P20. Note the following connector assignments, as illustrated in FIG. 57: Connector No. 1 (end opposite the external connector) attaches to P20 on the board; Connector No. 2 attaches to left-front mounted SCSI device (if used; otherwise tucked into the vacant area in the back of the bay); Connector No. 3 attaches to the SCSI device in the right-front of the docking station (if not used, tuck into the space in the right-front bay); Connectors 4 and 5 attach to two SCSI devices in the HDD bracket; and Connector No. 6 is installed in the cutout on the docking station rear panel.
9. Route Connector No. 2 through the opening at the base and out to the front of the docking station.
10. Fold Connector No. 3 back under the right-front bay area. Route connectors 4 and 5 to the area near where the front of the HDD bracket will later be installed and route connector No. 6 to the rear of the docking station near the cutout.
11. Route one of the two power cable supplied with the system from the left-front bay area to either of the two power connectors on the board. Tuck the remaining power connector underneath the right front bay area.
12. Route the lon 94-connector) power adapter cable supplied with the SCSI connector kit option as follows: one end tucks under the right-front bay. The second connector is installed on either P28 or P29 on the System Interface Board. The third and fourth connectors attach to hard drives in the HDD assembly.
13. Install up to two hard drives in the HDD bracket with connectors facing to the right and toward the front of the unit. Ensure that clearance exists between the side walls of the bracket and each installed device; tighten the top and bottom screws. Install the signal and power connectors on each drive.
14. Reinsert the HDD bracket with drive(s) installed (carefully insert the front of the bracket underneath the two screws on the standoffs; then slide the back of the bracket underneath the rear two screws; tighten all four screws).

15. Reinstall the Expansion Bus connector by pressing firmly on the ends of the connector without touching the pins.

INSTALLING ISA EXPANSION BOARDS

The docking station main board contains six slots for accommodating ISA Expansion Cards (Networking Cards, Video Cards, Modem cards, etc). If an Expansion Option is to be added, check the dimensions of the card (cards larger than half-size must be installed in the out three slots; half-size cards may be installed in any of the slots).

1. If any jumper or switch hardware configuration is required on the card, perform this configuration task at this time.
2. Select an available slot for installing the option but do not install the option yet. If the device is small enough, select an installation slot nearest the power supply; otherwise select a slot from the outer group of three slots (farthest from the power supply).
3. Most Expansion devices will require a single I/O connector panel. In this case, use a Phillips screw driver to remove the metal blank filler panel on the rear of the docking station, as illustrated in FIG. 46. If installing a multi-function option with several ports (connectors), select one of the inner slots and remove two or more blank filler panels to accommodate the I/O panel on the multi-function board.
4. Install the expansion device in the selected slot and secure the I/O panel(s) with the supplied screw. Ensure that the card is securely seated in the card slot.

INSTALLING PCMCIA CARD OPTIONS

The docking station can accept up to two credit-card size, 14.5 mm, Type I, II, or III PCMCIA options which may be a Data/FAX Modem, Networking Card, Hard Drive, etc. To install a PCMCIA option card, use the following procedure:

1. Carefully read the installation instructions supplied with the PCMCIA device.
2. Hold the card at the end opposite the pins with the label side up. Insert the card into any unused slot (two slots available on the right side of the docking station as illustrated in FIG. 58.

INSTALLING MONITOR, KEYBOARD, MOUSE

The docking station is capable of supporting the weight of a 17 inch diagonal VGA monitor on top of the docking station as illustrated in FIG. 59. Position the monitor as far back as possible.

1. Connect the monitor cable connector the 15-pin VGA monitor port as illustrated in FIG. 59.
2. Connect the monitor's power cable to an AC outlet. There are no special configuration setups that need to be performed. The intelligence of the docking station will detect if a monitor is present and automatically display on the CRT. If no CRT is attached, the system defaults to the default setting configured in the portable computer setup program (LCD only, SIMUL or CRT).

To install an external keyboard, connect the found 101 keyboard cable connector to the 5-pin circular connector on the rear of the docking station as illustrated in the previous figure. When an external keyboard is attached, the system automatically disables the notebook's internal keyboard. If no keyboard is attached, the system automatically enables the portable computer's internal keyboard.

To install a mouse, connect the mouse connector to the 6-pin mouse port on the rear of the system as illustrated in the previous figure.

To install the power cord, connect the power cable to the AC outlet on the rear of the docking station. Then plug the power cord into the AC outlet.

INSTALLING TELEPHONE CONNECTION

If using the portable computer's internal Data/FAX Modem option, connect the docking station to a telephone line via the RJ-11 telephone jack on the rear of the docking station, as illustrated in FIG. 60.

ATTACHING SERIAL DEVICES

The docking station is equipped with two serial ports, as illustrated in FIG. 61 including: 9-pin serial port and 25-pin serial port. Although these two ports have a different number of pins, they are electrically identical. The serial ports are used to interconnect such devices as: external modem, serial printer, or any device that uses an RS-232 interface.

ATTACHING PARALLEL DEVICE

The docking station is equipped with one DB25 (25-pin), bidirectional Parallel Port (device name LPTI) as illustrated in FIG. 62. This port occupies address 0378h, and is designated LPTI (default value). Typically, the portable computer always sends print data to LPTI unless menu configured otherwise. Two or more parallel ports (maximum of three ports in the system) can be added via expansion card options. If a parallel port is added at address 03BCh, then this port is designated LPTI and the docking station's built-in parallel port is re-designated LPT2 (the system automatically assigns the device name LPTI to the first port it finds in order of polling.

ATTACHING GAME DEVICES

The docking station contains a 15-pin, female connector, illustrated in FIG. 63, that can be used to connect joysticks or various other game port-compatible devices to the docking station.

COMPUTER PROGRAMS LISTING

1. MOTOR CODE—pages 65–114. MOTOR CODE is loaded onto the ROM memory of microprocessor U140 and it facilitates: microprocessor control of the loading and docking of a portable computer to the docking station, including motor speed and force; control of on/off power to the docking station; intensity and duration of portable computer battery recharging while docked; control of function of docking station front panel switches and control of front panel LEDs.
2. DOCK—pages 115–138. DOCK is the DOS version of the docking station control functions.
3. SUPER SHUTDOWN—pages 139–194. SUPER SHUTDOWN is an automatic shutdown configuration (also available on TI's BatteryPro and Productivity Software diskette). This utility allows the docking system to exit Windows faster than the standard Windows exit procedure. The utility provides a selection of user-specified shutdown features that customizes the way a computer shuts down and reboots.
4. SETDOCK—pages 195–268. SETDOCK sets up the I/O ports on the docking station which customizes the docking system hardware configuration for maximum performance.
5. TISYSTEM—pages 269–316. TISYSTEM provides a library of functions.
6. BATTERY PRO—pages 317–379. BATTERY PRO power saving utility provides control of energy usage within the portable computer and better handshaking between the portable computer and the docking station.

```
        .list on
        .page 55
;****************************************************************
; TEXAS INSTRUMENTS DOCKING STATION CONTROLLER                  ;
;                                               ;
; BY: GARY VERDUN                                    ;
; LAST UPDATE: 03/09/94                              ;
;****************************************************************
FWREV       .equ   %4         ;Revision 1.04
FWVER       .equ   %1
STATYPE     .equ   %1

; 500 nsec/clock
;
; Z8 PORT PIN DEFINITIONS:
;
;
;
; PORT 0
; P0 MOTOR1 PHB I0
; P1 MOTOR1 PHB I1
; P2 MOT1   PHA I0
; P3 MOT1   PHA I1
; P4 MOT1   PHB PHASE
; P5 MOT1   PHA PHASE
; P6 LOW TO ENABLE HW TO CONT PANEL AND MECH (WRITTEN ON PORT 2
; CLKED BY WRITING A 4 OR C TO PORT 3
; P7 CURRENT LOWER BY xx% WHEN THIS PIN HIGH
;
; PORT 1
; P0 MOTOR2 PHB I0
; P1 MOTOR2 PHB I1
; P2 MOT2   PHA I0
; P3 MOT2   PHA I1
; P4 MOT2   PHB PHASE
; P5 MOT2   PHA PHASE
; P6 RLYSON-
; P7 CURRENT LOWER BY xx% WHEN THIS PIN HIGH
;
; PORT 2
; P0-P7 THIS PORT IS USED AS A BIDIRECTIONAL MULTIPLEXED 8 BIT I/O
; PORT. MAIN CPU R/WRITE, MECH READ, MECH WRITE, ARE
; ACCOMPPLISHED BY READING OR WRITING TO THIS PORT WITH THE
; APPROPRIATE ACTIONS ON PORT 3 OUTPUT PINS P34-P36.
; PORT 3
; P0 RESET SWITCH ACTIVATED WHEN THIS PIN LOW
; P1 STANDBY SWITCH ACTIVATED WHEN THIS PIN LOW
; P2 LOAD SWITCH ACTIVATED WHEN THIS PIN LOW
; P3 MAKE FIRST BREAK LAST CONTACT MATED WHEN THIS PIN LOW AND
; A 1 HAD BEEN WRITTEN TO BIT XX OF HDWARE PORT
;
;
; WRITING
;
;
; P4 P5 P6
; 0 0 0 ENABLES CPU PORT READ
; 0 0 1 CPU PORT WRITE
; 0 1 0 READ MECAHNISM INPUT PORT
; 0 1 1 LATCH MECAHNISM SWITCH STATUS
; 1 0 0 WRITE TO CPU/FRONTPANEL/MECH LATCH
```

```
; 1 0 1 SPARE
; 1 1 0 SPARE
; 1 1 1 SPARE
;
; P7 HIGH TURNS ON THE POWER SUPPLY OUTPUTS;
;
; Z8 I/O line modes

ALL_OFF      .equ   01001101B     ; both motors off(all out float HIGH)
MTRSON       .equ   00000100B     ; both motor ports as outputs
mech_oc      .equ   10100000B     ; enable mech latch onto port 2
mechinclk    .equ   10110000B     ; pulss clock of mech 374 low
                                  ; writing any other value to this port
                                  ; will cause it to go high and clock
                                  ; mech signal status into lathes
wr_mech      .equ   11000000B     ; l-h transition lathes port 2 data to
                                  ; mechaism output latch
rd_cpu       .equ   10000000B     ; puts cpu rd port on port 2
wr_cpu       .equ   10010000B     ; l-h transition latches port 2 data
                                  ; into cpu output latch
stbhigh      .equ   11110000B     ; drives all enables/strobes on p34-6
                                  ; high (or)
swdebnce     .equ   %04           ; 16 consecutive reads for sw active
mtroff       .equ   00111010B     ; oring this with MCPx will set 0 cur.
psonsfe      .equ   10000000B     ; ps. on 0's to U144 til pwgood
psoffsfe     .equ   00000000B     ;
pgoodm       .equ   00001000B     ; power good bit check mask (tm)
psondly      .equ   %ff
trnondly     .equ   %02
psofdly      .equ   %0a

; Z8 timer modes

IPR_INIT     .equ   00001111B     ; timer1 > timer0 > all others
IMR_INIT     .equ   00111101B     ; enable timer1 and timer0 interrupts
PRE0_INIT    .equ   00000001B     ; timer0 continuous mode
PRE0_MINIT   .equ   00101001B     ; timer0 vga mot init value
PRE1_INIT    .equ   00000011B     ; timer1 continuous/internal mode
PRE1_MINIT   .equ   11000111B     ; timer1 car mot init value
START_T0     .equ   00000011B     ; reload and enable timer0
ENABLE_T0    .equ   00000010B     ; enable timer0 but don't load scalers
DISABLE_T0   .equ   11111101B     ; disable timer0
START_T1     .equ   00001100B     ; reload and enable timer1
loadt1       .equ   00000100B     ; load timer1 but don't set enable bit
ENABLE_T1    .equ   00001000B     ; enable timer1 but don't load scalers
DISABLE_T1   .equ   11110111B     ; disable timer1
IRQLVL4      .equ   00010000B     ; SW generated timer0 interrupt
IRQLVL5      .equ   00100000B     ; SW generated timer1 interrupt
IMR_CARO     .equ   10100000B     ; cariage motor only interupt mask
IMR_VGAO     .equ   10010000B     ; vga motor only interupt mask
IMR_TIMER0   .equ   00010000B     ; or w IMR to add timer0 to int mask
IMR_RUN      .EQU   10111101B     ; enables allport3 and timer interupts
IMR_ALT      .equ   10011101B     ; timer 0 and all switches enabled
tmrcrsh      .equ   00000000B
rsetonly     .equ   00000100B     ; only reset sw int enabled
;---------------------------------------------------------------------------
;            initialize and power down port modes
;
; TMR,IRQ and IMR safe values obtained by clearing the registor
;
STACK  .EQU   10000000B
```

```
CONTREG .EQU   00000000B
P2MSAFE .EQU   11111111B     ;
P3MSAFE .EQU   00000000B     ;P30-P33(in) P34-P37(out), p2 OPEN DRAIN
P01MSFE .EQU   01001101B     ;INTERNAL STACK,PORTS 0,1 AS INPUT
P01MOFF .equ   01000101B     ;internal stack,ports 0,1 as output
IPRSAFE .EQU   00001111B     ;T0,P33,T1,P30,P32,P31 INTERRUPT PRIORITY
SMRSAFE .EQU   00100001B     ;CLK/16,PWR ON RESET-RECOVERY SRCE,STOP
                  ;DELAY-ON,RECOVERY LEVEL LOW,
SMRFAST .EQU   00100000B     ;AS ABOVE EXCEPT FAST CLOCK (XTAL/2)
IMRSAFE .EQU   10001101B     ;MASKS OFF ALL BUT P30-P32 INTERUPT
SOURCES
tmr1imr .equ   00010000B     ; only timer 0 interupts durng tmr1 isr
TMR0IMR .EQU   00100000B     ;ONLY TIMER 1 INTERUPTS ALLOWED DURING
TMR0 ISR
WDTSAFE .EQU   00000011B     ;WDTIMER 100MS OFF-HALT/STOP
STBYIRQ .equ   11111011B     ; and with IRQ to clear pending stbysw int.
LOADIRQ .equ   11111110B     ; and with IRQ to clear pending loadsw int.
swclrirq .equ  11111010B     ; irq switch hit clear mask ( and with irq)
stbyirqm .equ  00000100B     ; and with IRQ to clear pending stbysw int.
ldirqm  .equ   00000001B     ; and with IRQ to clear pending loadsw int.
swmskirq .equ  00001101B     ; irq test mask for switch hits
;
;
; BASE POWER SUPPLY ON PORT MODES
;
P2M_RD  .EQU   11111111B     ;PORT 2 BITS AS INPUT
P2M_WR  .EQU   00000000B     ;PORT 2 BITS CONFIGURED AS OUTPUTS(NEVER
WHILE
                  ;POWER SUPPLY IS OFF
P3MDRUN .EQU   00000001B     ;P30-P33 INPUTS P34-P37 OUTPUTS,P2 PULLUPS
ACTIVE
P01MRUN .EQU   00000100B     ;INTERNAL STACK,PORTS 0,1 AS OUTPUTS
SMR_RUN .EQU   00101001B     ;CLK/16 OFF,SMRECOVERY SOURCE(STBYSW-)
                  ;DELAY-ON,RECOVERY LEVEL LOW,
P01INIT .equ   01000101B     ;port 1 as out port 0 as in
;
;---------------------------------------------------------------------------
;MOTOR PORT BIT ASSIGNMENTS
;
;    CARRIAGE MOTOR(PORT 0)
;    7 6 5 4 3 2 1 0
;    | | | | | | | |
;    | | | | | | | |
;    | | | | | | | +---- PHASE B current direction
;    | | | | | | +------- PHASE B I1
;    | | | | | +---------- PHASE A current direction
;    | | | | +------------- PHASE A I1
;    | | | +---------------- PHASE B I0
;    | | +------------------- PHASE A I0
;    | +---------------------- 0-ENABLE OUTPUT LATCH TO MECHANISM
;    +------------------------- 1-SET OUT PUT CURRENT TO XXX% OF NORMAL
;
NOTMOT  .EQU   11000000B     ; NON MOTOR BIT MASK
curclr  .equ   00111010B     ; set motor current to 0 when or this with MCPx
mtr_off .equ   00111010B     ;
cchigh  .equ   11000101B
vchigh  .equ   11000101B
holdcur .equ   11001111B     ; 20% CURRENT
mechoc_ .equ   10111111B     ; and with mcp0 to enable mech latch outputs
curshft .equ   01111111B     ; and with MCP0 to go to full motor currents
                  ; vref not shifted down XX%
```

```
cur60pct     .equ   11110101B
curmax       .equ   11000101B
ramcur       .equ   11110101B
;
;MOTOR PORT BIT ASSIGNMENTS
;
;     VGA MOTOR(PORT 1)
;     7 6 5 4 3 2 1 0
;     | | | | | | | |
;     | | | | | | | |
;     | | | | | | | +---- PHASE B current direction
;     | | | | | | +------- PHASE B I1
;     | | | | | +---------- PHASE A current direction
;     | | | | +------------- PHASE A I1
;     | | | +---------------- PHASE B I0
;     | | +------------------- PHASE A I0
;     | + ---------------------0- RELAYS ON-APPLYING POWER TO CPU/ISA
;     +------------------------ 0- TURNS ON UNSWITCHED +5 TO THE Z8
;
;
livevcc .equ   01111111B     ; and with MCP1 to switch z8 vcc to US+5
phsclr  .equ   11111010B
; Register file definitions

SPL          .set   255       ; stack pointer (low byte)
SPH          .set   254       ; stack pointer (high byte) UNUSED
                             ; byte to be sent to cpu by send_byte
RP           .set   253       ; register pointer
FLAGS        .set   252       ; C Z S V D H F2 F1
IMR          .set   251       ; Interrupt Mask Register
IRQ          .set   250       ; Interrupt Request Register
IPR          .set   249       ; Interrupt Priority Register
P01M         .set   248       ; Port 0, 1 Mode register
P3M          .set   247       ; Port 3 Mode register
P2M          .set   246       ; Port 2 Mode register
PRE0         .set   245       ; timer 0 prescaler
T0           .set   244       ; timer 0 scaler
PRE1         .set   243       ; timer 1 prescaler
T1           .set   242       ; timer 1 scaler
TMR          .set   241       ; timer mode register
SIO          .set   240       ; serial I/O register UNUSED
SMR          .set   011       ; STOP MODE RECOVERY REGISTOR
WDTMR        .set   015       ; WATCH DOG TIMER MODE REGISTOR
;
;
usr1   .equ   00000001B    ; user flag 1 bit mask
usr2   .equ   00000010B    ; user flag 2 bit mask
usr2_  .equ   11111101B    ; user flag 2 clr bit mask
usr1_  .equ   11111110B    ; user flag 1 clr bit mask
;
; locations 128 - 239 not implemented
; 1 banks (16 bytes) are reserved for each motor control block (MCB) for fast
; addressing. The following is the MCB definition:
;
; CBANK1 (CARRIAGE motor control/mechanism state machine register bank)
;
;                          working resgister(s)
; switch overtravel counter        R15
; ramp step cnter (toff tick cnt)  R14
; stby timer off minutes           R13
; stby timer off hours             R12
```

```
; SLEW STEP COUNTER            R11 _ lsb, R10 _ msb
; ramp table pointer         R9  _ lsb, R8  _ msb
; stepper table index        R7
; RESERVED                   R6
MODES  .EQU   101   ;          R5  MODES SET BYTE
; control flag              R4
; working register pair      R3  - lsb, R2  - msb
; working register           R1
; working register           R0
;
; control flag definition: 7 6 5 4 3 2 1 0
;                          | | | | | | | +- ramp to slew
;                          | | | | | | +--- high speed slew
;                          | | | | | +----- speed change state
;                          | | | | +------- low speed slew
;                          | | | +--------- low speed ramp
;                          | | +----------- hold state
;                          | +------------- 0-forward    1-reverse
;                          +--------------- 1=aternate motor motion

; VBANK1 (VGA/SIDE motor control/mechanism state machine register bank )
;
;                          working resgister(s)
; reserved                  R15
; ramp step counter           R14
; RTC TIMER COUNT WORD           R13 - lsb, R12 - msb
; # OF 16 MIN. FAST CHGING         R11
; slew step counter          R10
; ramp table pointer         R9  _ lsb, R8  _ msb
; stepper table index        R7
;                           R6
;                           R5
; control flag              R4
; working register pair      R3  - lsb, R2  - msb
; working register           R1
; working register           R0
;
; control flag definition: 7 6 5 4 3 2 1 0
;                          | | | | | | | +- ramp to slew
;                          | | | | | | +--- high speed slew
;                          | | | | | +----- speed change state
;                          | | | | +------- low speed slew
;                          | | | +--------- low speed ramp
;                          | | +----------- hold state
;                          | +------------- 0-forward    1-reverse
;                          +--------------- 1=alternate motor motion
;
revstrt     .equu  01010000B    ; rev low  ramp for motion start
fwdstrt     .equ   00000001B    ; fwd hiwgh slew ramp for start
notmclr     .equ   00111111B    ; clears non motor state bits (and)
altmtr      .equ   10000000B    ; bit mask for alternate motion
holdrev     .equ   01100000B    ; reverse and hold state for vgacrash
;
;
;
;      |
;      |       _______________
;      |      /               \
;      |     /:               :\
;      |    / :               : \
;      |   /  :               :  \
```

```
;     |  /  :            :  \_____________________
;     |  /  :            :                  \
;     | /   :            :  :               : \
;     |/    :            :  :               :  \
; 0____|/______________________________________________\_______
;     |     :            :  :               :  :
; bit state 0  :    1    : 2 :     3        : 4 :
;     |     :            :  :               :  :
;     |     :            :  :               :  :
;
;                           | vga not use this part  :
;
;
;
;
;
;
;
;     CARRIAGE
;     MECHANISM RELATED FIXED PARAMETERS:
; THESE PARAMETERS RELATE TO DISTANCES BETWEEN TRAVEL ENDPOINTS
AND DETECT
; SWITCHES AS WELL AS SOME FIXED RAMP PARAMETERS

RMPHSPD .EQU    20D    ;TWENTY STEPS RAMP TO HIGH SPEED SLEW
SPDCHGE .EQU    12D    ;TEN STEPS IN RAMP HSPEED TO RAM SPEED
RMPLOWS .EQU    15D    ;NUMBER OF STEPS IN LOW RAMP
TRYIERM .EQU    01D    ;#STEPS START TO ERROR IF NO TRYOUT CHNGE MSB
TRYIERL .EQU    132D   ;#STEPS START TO ERROR IF NO TRYOUT CHNGE LSB
TRYOERM .EQU    02D    ;STEPS START TO TRAY OUT ERROR MSB
TRYOERL .EQU    231D   ;STEPS START TO TRAY OUT ERROR LSB
TRYOOVR .EQU    65D    ;TRAVEL BEYOND TRAYOUT SW WHEN REVERSE
BEFORE DECEL
MFBLOVR .EQU    30D    ;# STEPS MFBL DETECT TO START RAM DECEL RAMP
MFBLOOVR .EQU   80D    ;# STEPS MFBL DETECT TO START accell to slew RAMP
MFBLERL .EQU    165D   ;ERROR IF TRAVEL THIS FAR AND NO MFBL
DETECTED(LOAD)
MFBLERM .EQU    00D    ;MSB OF ABOVE
MBLOERL .EQU    110D   ;ERROR IF TRAVEL THIS FAR AND NO MFBL
DETECTED(UNLOAD)
SLWCNTM .EQU    01D    ;COUNT AT WHICH DECEL TO RAM SPEED MSB
SLWCNTL .EQU    240D   ;COUNT AT WHICH DECEL TO RAM SPEED LSB
ccreep   .equ   46D    ;number of creep steps in reverse before start ramp


;VGA MOTOR MECHANISM RELATED PARAMETERS

VRMPHSPD .EQU   08D    ;10 STEPS RAMP TO HIGH SPEED SLEW
VSPDCHG  .EQU   13D    ;1 step more than RAMP HSPEED TO RAM SPEED
VRMPLOWS .EQU   22D    ;2 STEPS GREATER THAN LOW RAMP LENGTH
VHSLCNTF .EQU   90D    ;HIGH SPEED SLEW STEPS TILL SPEED CHANGE
VLWSLWF  .EQU   32D    ;SLEW STEPS AT LOW SPEED BEFORE DECEL TO STOP
VLWSLWR  .EQU   40D    ;SLEW STEPS LOW SPD REV. BEFORE RAMP TO
HIGHSLEW
VGAIER   .EQU   30D    ;STEPS START TO ERROR IF NO VGAOUT CHNGE
VGAOER   .EQU   150D   ;STEPS HIGH SLEW TO ERROR IF NO SWITCH DET.
VGAOOVR  .EQU   001D   ;# steps beyond vgasw det before start decel(unload)
vcreep   .equ   50D    ;steps to creep backward if vga in sw error

;control flag bit masks
```

```
HIGHRAMP     .EQU    00000001B    ;HIGH SPEED RAMP STATE
HIGHSLEW     .EQU    00000010B    ;HIGH SPEED SLEW STATE
SPEEDCHG     .EQU    00000100B    ;SPEED CHANGE STATE
LOWSLEW      .EQU    00001000B    ;LOW SPEED SLEW
LOWRAMP      .EQU    00010000B    ;low speed ramp
HOLDSTP      .EQU    00100000B    ;HOLD STATE (NO STEPS TO TAKE)
FORWARD      .EQU    01000000B    ;FORWARD/0-REVERSE DIRECTION
MFBLDET      .EQU    10000000B    ;make first break last detected
STESAVE      .EQU    11000000B    ;SAVE ALL BUT MOTION STATE MASK

; SCRTCH (SCRATCH PAD REGISTER GROUP) <50>
;
;                          working resgister(s)
; delay 3 timer tick msb              R15
; delay 3 timer tick counter          R14
; delay/delayslo counter registers R13 - lsb, R12 - msb
; tray locked blink counter           R11
; swdetec blink counter               R10
;                          R9 _ lsb, R8 _ msb
;
; alt timer jump table offset      R7
; blink routine                    R6
syscrash     .equ    85     ; R5
;                          R4
;                          R3
; CHECKBAT> TEST LOOPS COUNTER      R2
; CHECKBAT> TESTS TRUE COUNTER      R1
; CHECKBAT> SWITCH TEST COUNTER     R0
;
;
;
;
VBANK1       .equ    01110000B    ; RP-> 127 - 112
CBANK1       .equ    01100000B    ; RP-> 111 -  96
SCRTCH       .equ    01010000B    ; RP->  95 -  80
WORK         .equ    01000000B    ; RP->  79 -  64
expand       .equ    00001111B    ; expanded registor group for SMR,WDTMR

CBANK1_R9    .equ    01101001B    ; REGISTOR 9 OF CBANK1
CBANK1_R2    .equ    01100010B    ; registor 2 of cbank1
VBANK1_R2    .equ    01110010B    ; registor 2 of vbank1
; System variables

; system working registers (WORK===)   ; R79 - R64

CCURENT      .equ    79      ; R15: CARRIAGE MOTOR CURRENT MASK
VCURENT      .equ    78      ; R14: VGA MOTOR CURRENT MASK
MCP0         .equ    77      ; R13: Motor control byte carriage
MCP1         .equ    76      ; R12: Motor control byte vga
CPUSTAT      .equ    75      ; R11: RETURNED STATUS BYTE TO HOST
DATACPU      .equ    74      ; R10: raw data from host
MECHDATA     .equ    73      ; R09: Mechanism status port data
MECHOUT      .equ    72      ; R08: mech/front panel current state
SYSCONT      .equ    71      ; R07: SYSTEM CONTROL FLAG REGISTOR
STATUS       .equ    70      ; R06:
SYSCONT2     .equ    69      ; R05:
CMDLST       .equ    68      ; R04:
BLNKMSK      .equ    67      ; R03: blink led mask
GEN1         .equ    66      ; R02: working register only
GEN2         .equ    65      ; R01: working register only
GEN3         .equ    64      ; R00: working register only
```

```
STP1          .equ   63          ; stepper table index for motor 1
STP2          .equ   62          ;                          motor 2
MCP0OLD         .equ   61          ; last MCP0 state
MECHOLD         .equ   60           ; standard mechout value(used when cpu
                            ;  overides mc)
mcp0init      .equ   01110100B       ; phase a 60% current
mcp1init      .equ   11110100B       ; phs a 60% current rlsoff
mcp0idle      .equ   00111010B       ; phase a 20% current
mcp1idle      .equ   01111010B       ; phs a 20% current rlsoff

p0init       .equ   01110000B      ; wrtlatch off 60% current ph-A
p1init       .equ   01110000B      ; RlYSOFF,ph-a,60% current
p1psoff      .equ   11000000B      ; rlyoff,pha,max cur,q144 on
                            ; mc running off of z8vcc
p0psoff      .equ   00000000B      ;
; MECHDATA====== %49
; mechanism input port    7 6 5 4 3 2 1 0
; bit definitions           | | | | | | | +- 1= cpu installed in tray
;                        | | | | | | +--- 0= cpu tray all the way out
;                        | | | | | +----- 1= lilly 0= tm4000 cpu
;                        | | | | +------- 1- base hood removed
;                        | | | +--------- 0= vga con. all the way out
;                        | | +----------- output from bq2003
;                        | +------------- 0= make first break last engaged*
;                        +--------------- 0= keylock disengaged
; * true anly after writing a 0 to bit 3 of mechout
;MECHANISM STATUS BIT MASKS
cpuinst .equ   00000001B      ; cpu in tray switch mask
tryout  .EQU   00000010B      ; trayout switch mask
hoodoff .equ   00001000B
vgasw   .EQU   00010000B       ; vga switch mech port bit mask
bqchg   .equ   00100000B     ; bq2003 ouput bit mask
chkcnt  .equ   11111110B     ;
mfblswm .EQU    01000000B       ; mask off MFBL bit in mechdata
trylock .EQU   10000000B      ; 0-TRAY IS LOCKED IN THE LOADED POSITION
                      ; switch mask
keylock  .EQU  10000000B      ; keylock switch mask
hoodlock .equ   10001000B      ; hood off and tray lock switch check mask
CPUINOK .EQU    01000001B       ; CPUSW,HOODOFF and coverlock compare value
                      ; must clear non cpu bits first
cpuinrdy      .equ   01000001B      ; cpu in mech at full out position
mechonly      .equ   11011011B      ; and w mech data to clear bq and tm
                            ; lilly bits
mechnmfbl      .equ   10011011B
mechmsk        .equ   01011011B       ; all mech except keylock
mechmsk1       .equ   01010011B       ; all mech except keylock and hoodoff
fullout      .equ   01000001B      ; proper full out switch status
outncpu       .equ   01000000B
tryclsed      .equ   01000010B       ; tray closed/no cpu installed sw stat
;
; PORT 3 SWITCH masks
; mechanism switch                3 2 1 0
; bit definitions                 | | | +- 0= reset switch activated
;                              | | +--- 0= standby switch activated
;                              | +----- 0= load/unload switch activated
;                              +------- 1= power supply power good
;
stbyswm       .equ   00000010B      ; STANDBY SWITCH test mask
loadswm       .equ   00000100B      ;  load switch test mask
ldrst       .equ   00000101B     ;  load and reset switch test masks
rstint      .equ   00001000B     ;  reset sw IRQ mask
```

```
swtest      .equ   00000111B    ; port 0 any switch bit mask
stbyld      .equ   00000101B    ; stby and load sw irq mask
stbyint     .equ   00000100B    ; stby switch interupt test mask

; MECHOUT===== %48
;
; mechanism / FRONT PANEL  7 6 5 4 3 2 1 0
; OUTPUT PORT BIT          | | | | | | | +- POWER LED GREEN HALF 0= ON
; ASSIGNMENT               | | | | | | +--- POWER LED AMBER HALF 0= ON
;                          | | | | | +----- SPARE
;                          | | | | +------- EXUNIT CNTRL 0=USE FOR MFBL
;                          | | | +--------- 1=PWRGOOD BSE 1= RESET TO CPU
;                          | | +----------- 0= FAST CHARGE LED ON
;                          | +------------- SPARE
;                          +--------------- SPARE
;
LEDSON       .EQU   11011100B     ; all led's on mask
LEDSOFF      .EQU   00100011B     ; all led's off mask
led1off     .equ   00000011B    ; stby led both colors off
redon       .equ   11111101B    ; red led on mask
grnon       .equ   11111110B    ; grn led on load/unload sw
yellow      .equ   11111100B    ; grn and red on in bicolor led
RLYSON       .EQU   10111111B     ; and with MCP1 to turn relays on
RLYSOFF      .EQU   01000000B     ; OR WITH MCP1 TO TURN RELAY BIT OFF
mechinit    .equ   00000100B    ; init state for mech out latch
fcon        .equ   11011111B
fcoff       .equ   00100000B
rlybiton    .equ   00000100B    ; or with syscont to set rlys on bit
exunit      .equ   00001000B    ; set exunit bit high (tell cpu here)
exunit_     .equ   11110111B    ; clr exunit bit for mfbl detection
;
; BLNKMSK====== %43
; blink led cntrl/mask     7 6 5 4 3 2 1 0
;                          | | | | | | | +- POWER LED GREEN HALF 1= BLINK
; ASSIGNMENT               | | | | | | +--- POWER LED AMBER HALF 1= BLINK
;                          | | | | | +----- SPARE
;                          | | | | +------- SPARE
;                          | | | +--------- SPARE
;                          | | +----------- FAST CHARGE LED 1=BLINK
;                          | +------------- 1= FC LED IN CPU CONTROL
;                          +--------------- 1= PWR LED IN CPU CONTROL

; SYSCONT=== %47
; control flag definition: 7 6 5 4 3 2 1 0
;                          | | | | | | | +- 0= CPULOADED 1= CPU NOT LOADED
;                          | | | | | | +--- 1-pwrsupply pwr on
;                          | | | | | +----- 1-system power on (relays)
;                          | | | | +------- 0-CPU RUNNING 1-CPU STANDBY
;                          | | | +--------- 1-loadsw overide active
;                          | | +----------- 1-SWITCH ACTION PENDING
;                          | +------------- 0-SLOW CLOCK  1-HIGH CLOCK SPEED
;                          +--------------- 1- MECHANISM IN MOTION
;
move        .equ   10000000B    ; mask to set move cmd bit
move_       .equ   01011111B    ; mask to clear move & swpend bit
swpend      .equ   00100000B    ; switch action pending mask
swpend_     .equ   11011111B    ; slr sw action pending mask
ldswovr     .equ   00010000B    ; load switch overide bit mask
sysinit     .equ   00001010B    ; syscont flag registor init value
clkhigh     .equ   01000000B    ; or with syscont to show clk high
psupm       .equ   00000010B    ;
```

```
rlymsk      .equ   00000100B     ;
;
; SYSCONT2== %45
; control flag definition: 7 6 5 4 3 2 1 0
;                          | | | | | | | +- 1= valid switch count
;                          | | | | | | +--- 1= cpu command pending
;                          | | | | | +----- 1= 3 sec delay complete
;                          | | | | +------- 1= smart mode initiated
;                          | | | +--------- 1= carriage only move
;                          | | +----------- 1= vga only move
;                          | +------------- 1= close tray w/o cpu
;                          +--------------- 0= stay off no turn on
;                                           1= tmr done turn on psup
;
;
mfbldet     .equ   00000010B
mfbldet_    .equ   11111101B
smrtmde     .equ   00000100B
holdoff     .equ   00000100B
holdoff_    .equ   11111011B
sys2init    .equ   00000000B
vgaonly     .equ   00100000B
caronly     .equ   00010000B
single_     .equ   10001111B
tryclse     .equ   01000000B
tryclse1    .equ   01010000B     ; tray close and car only bits set(or)
offtmre     .equ   10000000B
offtmre_    .equ   01111111B
;
;crashid
;crash source identifier definitions:
; pending i=interupt/p=push RP/c=call
;
; syscrash== %55
; crash flag definition:  7 6 5 4 3 2 1 0
;                         | | | | | | | +- ------+
;                         | | | | | | +--- |      \_crash source id
;                         | | | | | +----- |      /
;                         | | | | +------- ------+
;                         | | | +--------- reserved
;                         | | +----------- reserved
;                         | +------------- 1= non interupt routine source
;                         +--------------- 1= mechanism crash
;

;    |source   |pending|
;id  |routine  |i/p/c  |description
;----|---------|-------|-------------------------------------------------
;81   timer1     i/p    loading without cpu in tray
;82   highslew   i/p    carriage moved too far forward w/o trayout switch chg
;83   hslrev     i/p    carriage moved too far reverse w/o trayout switch chg
;84   nomfbl     i/p    carriage moved too far forward w/o mfbl going low
;85   lsl_cont   i/p    carriage too far reverse w/o mfbl going high
;86   vnocpuin   i/p    VGA ATTEMPT FORWARD W/O CPU INSTALLED IN TRAY
;87   vhighslew  i/p    vga moved too far forward w/o vga switch change
;88   vhslrev    i/p    VGA too far reverse w/o vga switch change
;89   chkpgood   p/c    waited too long for power good from power supply
;8A   timer1     i/p    moving carriage without vga at ful out position
;8B   timer1     i/p    moving car with traylock or hoodoff sw in wrong state
;8C   setsyscont c/p    cpu plugged and vga connector out
;8D   loadsw     i/p    cpu not in and tray not at full out position
```

```
;8E    musbeout   c/p    power up w/o cpu in fully loaded or unloaded position
;8F
;

; MODES STATUS BYTE DEFINITION
; MODES=== %65
; MODES flag definition:  7 6 5 4 3 2 1 0
;                         | | | | | | | +- 0=EJECT WITH RESET INACTIVE
;                         | | | | | | |    1=EJECT WITH RESET ACTIVE
;                         | | | | | | +--- 0=DOCK WITH RESET INACTIVE
;                         | | | | | |      1=DOCK WITH RESET ACTIVE
;                         | | | | | +----- 0=SMART MODE OFF
;                         | | | | |        1=SMART MODE ON
;                         | | | | +------- 0=POWER LED UNDER MC CONTROL
;                         | | | |          1=POWER LED UNDER PC CONTROL
;                         | | | +--------- 0= CHARGE LED UNDER MC CONTROL
;                         | | |            1= CHARGE LED UNDER PC CONTROL
;                         | | +----------- 0= NO MORE STATUS INFO AVAILABLE
;                         | |              1= MORE STATUS INFO AVAILABLE
;                         | +------------- 0= power off and stay off
;                         |                1= power off timer enabled
;                         +--------------- UNDEFINED BIT
modinit     .equ   00000011B
offtime     .equ   01000000B
offtime_    .equ   10111111B
;
; status byte definition
; STATUS===%46
; status flag definition:  7 6 5 4 3 2 1 0
;                          | | | | | | | +- 1= lock_led flag bit
;                          | | | | | | +--- 1= vga creep reverse
;                          | | | | | +----- 1= alternate motor motion flag bit
;                          | | | | +------- 1= lok_hood called from move_it
;                          | | | +--------- 1= self test failed
;                          | | +----------- 1= self test ok
;                          | +------------- 1= boot up load of vga
;                          +--------------- 1= status is firmware revision

STFAIL      .equ   00010000B     ; selftest failed
STOK        .equ   00100000B     ; selftest ok
STREV       .EQU   10000000B     ; STATUS IS SW REV
fcloops     .equ   00000010B     ; two check passes for charging
cmdmask     .equ   11000000B
cmdtodo     .equ   01000000B
lkled       .equ   00000001B
lkled_      .equ   11111110B
vgacrp      .equ   00000010B
vgacrp_     .equ   11111101B
altmtr1     .equ   00000100B     ;  alternat motor motion flag bit
altmtr1_    .equ   11111011B     ;  alt mtr motion clear flag
lkmov       .equ   00001000B
lkmov_      .equ   11110111B
bootld      .equ   01000000B
bootld_     .equ   10111111B

; CPUSTAT=== %4b
;
;                         7 6 5 4 3 2 1 0
;                         | | | | | | +-+- if D6=0
;                         | | | | | |      00=power LED Off
;                         | | | | | |      01=Power LED Red
```

```
;                    | | | | | | |      10=Power LED Yellow
;                    | | | | | | |      11=Power LED Orange
;                    | | | | | | |
;                    | | | | | | +----- if D6=0
;                    | | | | | |        0= Battery Charger Off
;                    | | | | | |        1= Battery Charger On
;                    | | | | | +------- if D6=0
;                    | | | | |          0= Standby Button Not Hit
;                    | | | | |          1= Standby Button Hit
;                    | | | | +--------- if D6=0
;                    | | | |            0= load/unload switch not hit
;                    | | | |            1= load/unload switch was hit
;                    | | | +----------- if D6=0
;                    | | |              0= Controller has NO data for CPU
;                    | | |              1= Controller has DATA for CPU
;                    | | +------------- 0= bits 5-0 are status bits
;                    | |                1= Controller in COMMAND STATE
;                    | +--------------- if D6=1
;                    |                  0= Controller processing the most
;                    |                     recent command
;                    |                  1= Controller thru with last command
;
;
STBYSWST    .EQU    00001000B
BCHGONST    .EQU    00000100B
LOADSWST    .EQU    00010000B
STBYHIT     .equ    00001000B
LDEJHIT     .equ    00010000B
datmsk      .equ    00111111B
clrswich    .equ    11100111B
fchge       .equ    00000100B    ; fast charge test mask
fchge_      .equ    11111011B    ; fast charge test mask complement

crashold    .equ    59           ; last crash value

; system stack area
; nesting requirements: (3 * interrupts + 2 * calls + pushes)
stack_bot_1     .equ    59       ; incremented cause push pre-decrem
STACK_BOT       .equ    58       ; bottom of stack
STACK_TOP       .equ    4        ; top of stack

P3      .set    3       ; Port 3
P2      .set    2       ; Port 2
P1      .set    1       ; Port 1
P0      .set    0       ; Port 0

; *** End of register file ***

;
;________________________________________________________________________
;
; POWER ON INITIALIZATION ; CONTROLLER RESET FROM POWER UP
;-------------------------------------------------------------------------
;

;
; Interrupt vectors
```

```
      .org   %0000          ; location of interrrupt vector table

      .word  loadsw         ; irq0: (Port 3 pin 2 - edge) loadsw-
      .word  pwrgood        ; irq1: (Port 3 pin 3 - edge) pwrgood frm ps
      .word  stbysw         ; irq2: (Port 3 pin 1 - edge) stbysw-
      .word  rsetsw         ; irq3: (Port 3 pin 0 - edge) rstsw-
      .word  timer0         ; irq4: timer 0
      .word  timer1         ; irq5: timer 1


; powerup reset

      .org   %000c          ; location of first executable instruction

reset:
      di                    ; DISABLE INTERRUPTS
      ld     P3,#%80        ; power supply on
      ld     RP,#expand
      ld     SMR,#SMRSAFE   ; SET SLOW CLOCK SPEED
      ld     WDTMR,#WDTSAFE ; init wath dog timer mode registor
;;
;; selftest ok, proceed with initialization
do_init:
      ld     RP,#WORK
      clr    STATUS         ; no status/selftest until requested
      ld     P2M,#P2MSAFE   ; initialize Port 2 mode
      ld     P3M,#P3MSAFE   ; initialize Port 3 mode
      ld     P01M,#P01MSFE
      ld     SPH,#00
      ld     SPL,#stack_bot_1 ; initialize stack pointer
      di                    ; init interrupts
      clr    TMR            ; turn off timers
      ld     IPR,#IPRSAFE   ; initialize interrupt priority register
      ld     IMR,#IMRSAFE   ; initialize interrupt mask register
      clr    IRQ            ; clear out any pending interrupts
      clr    BLNKMSK
      clr    syscrash
      clr    crashold
      ld     MODES,#modinit
      ei                    ; init int flip flops
      di                    ; must be executed prior to ipr,smr,irq modified
      ld     PRE0,#PRE0_INIT ; init timer0 for single pass
      ld     PRE1,#PRE1_INIT ; init timer1 for single pass
      ld     RP,#WORK       ; clear system control flag registor
      clr    R7             ; initialize system control flag reg.
      ld     MCP0,#mcp0init ; init both motor control reg ph a 60% current
      ld     MCP1,#mcp1init ; both motors 0 current
      ld     MECHOUT,#mechinit ;
      ld     SYSCONT,#sysinit  ; initialize SYSCONT flag reg.
      ld     SYSCONT2,#sys2init ; init SYSCONT2 register
      ld     MCP0,#mcp0idle ;  : 20%,ph-a,mechout latch enabled,138 disab
      ld     MCP1,#mcp1idle ;  : 20%,PH-A,rlys-off,livecc low>> usw+5
                            ;  : switched on to livevcc
      call   trnpsup_on     ; turn on power supply so we can
                            ; get current system status
;     ld     R10,#cpuinit   ; init cpu data reg
      clr    STP1           ; init to phase A
      clr    STP2           ;
      call   rdmech         ; go read mech status
      or     MECHOUT,#LEDSOFF
      clr    CPUSTAT        ; init cpu status reg
```

```
        call    setsyscont
        cp      syscrash,#%0
        jr      nz,idle
;       tm      R7,#%01
;       jr      nz,notrnon
;  notrnon:
        clr     IRQ
        clr     %57
        tm      MECHDATA,#mfblswm
        jr      nz,idle
        call    bootup
;       call    delay3
;       tm      MECHDATA,#vgasw
;       jp      nz,idle
;       call    vgaload
;---------------------------------------------------------------------------
; fall into IDLE ROUTINE
; (this routine run anytime mc not have more critical things to do
;---------------------------------------------------------------------------
idle:
        ei
        ld      RP,#WORK
        tm      SYSCONT,#%01    ;  check if cpu loaded or unloaded state
        jr      nz,icpunotin    ;  if not loadeded jump to icpunotin
        tm      SYSCONT,#psupm  ;  is the power supply on
        jr      nz,ipsison      ;  if so go to in\psup is on routine
        jp      itoff           ;  in,ps-off so go check for toff mode

 ipsison:
        call    wrt_mech        ;  refresh mech output byte
        tm      SYSCONT,#move   ;  is the mechanism in motion
        jr      nz,idle         ;  if so go to end (do nothing else)
        call    checkbat
        tm      SYSCONT,#rlymsk ;  is cpu pwr on
        jr      nz,idle_cont    ;  if so go to idle_cont
 ; cpu in,psup-on,rlys-off
        or      MECHOUT,#led1off
        tm      CPUSTAT,#%04    ;  was battery charging
        jr      nz,cont_a       ;  battery still charging so go loop
        or      MECHOUT,#fcoff  ;  battery charge through so turn off led
        tm      SYSCONT,#swpend ;  if switch action pending then don't turn
        jr      nz,idle         ;  off power supply
        tm      SYSCONT2,#%04   ;  are we waitng a while
        jr      z,idle          ;  if so go loop
 psofidl:
        call    ps_off          ;  turn it off
        jr      idle
 cont_a:                        ;  fast charge so turn on fc led
        and     MECHOUT,#fcon   ;
        jp      itoff           ;  go check for timed off mode
;cpu not plugged into bus connector but psup is on
 icpunotin:
        tm      SYSCONT,#psupm
        jr      z,idle
        or      MECHOUT,#LEDSOFF ;  cpu not loaded - turn led's off
        call    wrt_mech
        tm      SYSCONT2,#holdoff ;  has hold-off time expired?
        jr      z,idle          ;  no so go on
        call    psofidl         ;  yes so turn ps off

 idle_cont:     ; cpu plugged into bus connector,rlys-on
```

```
      ; relays are on so maintain critical reg. values and loop
      call    rd_cpuprt      ;   see if there is a command from the cpu
; this section checks for a cmd from cpu
      ld      RP,#WORK
      di                     ;   disable interupts until check command
      ld      R2,DATACPU     ;   get copy of data byte from cpu
      and     R2,#cmdmask    ;   strip to cmd bits(6,7) only
      cp      R2,#%00        ;   does he want status?
      jr      nz,whatelse    ;   if not go check other stuff
      and     CPUSTAT,#%3f   ;   clr cmd bits in syscont2
      call    set_stat       ;   update status
      ld      CMDLST,CPUSTAT ;   show that status was last command
      ld      SPH,CPUSTAT    ;   put it in write byte
      call    send_byte      ;   send to pc
      jr      cpu_end        ;   move on
 whatelse:
      cp      R2,#cmdtodo    ;   check if cpu has cmd for me
      jr      nz,cpu_end     ;   if not go end routine
      tm      CPUSTAT,#cmdmask ;   check if status state
      jr      z,statnak      ;   if not go check for nak state
 CHKNAK:
      ld      R1,CPUSTAT     ;   get copy of CPUSTAT
      and     R1,#cmdmask    ;   strip to cmd bits only
      cp      R1,#%c0        ;   are we in a nak(cmd complete) state
      jr      nz,cpu_end     ;   if not stat or nak then don't do cmd
 statnak:   ; mc in status or cmd complete state
      ld      RP,#CBANK1     ;
      ld      R2,DATACPU     ;   get fresh copy of data
      cp      R2,CMDLST      ;   compare to last command we did
      jr      z,cpu_end      ;   if same command as last then do nothing
      ld      CMDLST,R2      ;   differenr cmd so set new last cmd
      call    rd_cpuprt      ;   get new copy of cpu port data
      cp      R2,CMDLST      ;   did we get 2 consec. new ones
      jr      nz,cpu_end
      and     R2,#%3f        ;   strip to just command bits
      cp      R2,#%20        ;   check if too large an address
      jr      gt,cpu_end     ;   if too large go on and ignore
      ld      SPH,DATACPU    ;   ack the cmd
      call    send_byte      ;   write the ack to cpu port
      and     CPUSTAT,#%07   ;   clear sw hit and cmd bits in cpustat
      rl      R2             ;   multiply by 2 cause 2 byte addresses
      ld      R0,#%0f        ;   set up base address of jump table
      ld      R1,#%06
      add     R1,R2          ;   add offset to lsb
      ld      R4,#CBANK1_R2  ;   load base register address for R2
      ldci    @R4,@RR0       ;10: get next timer values msb R2
      ldci    @R4,@RR0       ;10: get next timer value lsb into R3
      jp      @RR2           ;   jump to cmd routine

;--------------------------------------------------------------------------
 cpu_end:
      ei
      call    motlow
      tm      BLNKMSK,#%80
      jr      nz,skippwr
      or      MECHOUT,#led1off
      and     MECHOUT,#grnon
 skippwr:
      tm      BLNKMSK,#%40   ;   check for cpu control of fc led
      jr      nz,idlejmp     ;   if cpu control go to end
      tm      CPUSTAT,#%04   ;   was battery charging
```

```
    jp      nz,cont_a      ;   battery is fast charging so go to cont_a
    or      MECHOUT,#fcoff  ;   no fc so turn led off
    jr      idlejmp        ;   loop for idle routine
  itoff:
    tm      MODES,#offtime  ;   or we in a timed off mode
    jr      z,idlejmp      ;   not in timed off mode so go on
    tm      SYSCONT2,#offtmre ; has the time off timer expired?
    jp      z,idlejmp      ;   not time to turn on yet so loop to idle
  ; turn on psup and bootup cause timer expired
    tm      SYSCONT,#psupm
    jr      nz,jbootup
    call    trnpsup_on     ;   go turn on power supply
  jbootup:
    call    bootup         ;   boot up system
    and     SYSCONT2,#offtmre_ ; clear turn off time expired bit
  idlejmp:
    jp      idle

  motlow:
    or      MCP0,#curclr   ;   set low current
    and     MCP0,#holdcur
    or      MCP1,#curclr   ;   set low current
    and     MCP1,#holdcur
    ld      P0,MCP0        ;   write low current motor hold phase
    ld      P1,MCP1        ;   write low current motor hold phase
    RET
;---------------------------------------------------------------------------
;     set system control registor status
;
;---------------------------------------------------------------------------
setsyscont:
; now to set syscont reg status
    push    IMR
    DI
    push    RP
;   ld      RP,#WORK
    and     MECHOUT,#exunit_  ;   clear exunit bit so we can read MFBL
    call    wrt_mech       ;   write it out
    call    delayslo       ;   wait awhile for comparator to settle
    call    rdmech         ;   check mech port status
    or      MECHOUT,#exunit
    call    wrt_mech       ;   restore P0 to previous state
;   ld      RP,#WORK       ;   set to working register group
    tm      R7,#rlymsk     ;   are the relays on
    jr      z,norly        ;   if not go check for cpu
  setcpuin:
    and     R7,#%fe        ;   set cpu loaded cause can't check mfbl
                           ;   with relays on
    jr      inmre          ;   go to end routine
  norly:
    tm      R9,#mfblswm    ; is 120 pin connector mated?
    jr      nz,musbeout
    and     R7,#%fe        ; clr cpu loaded bit to (is loaded)
  inmre:
    pop     RP
    pop     IMR
    ret

  musbeout:   ; bus connector not plugged in so check for normal unmated
              ; bus connector states
    ld      R0,R9          ; get copy of mech status byte
```

```
    and    R0,#mechmsk1   ; strip away cpuid and charger bits
    cp     R0,#fullout    ; check for cpu in and tray all the way out
    jr     z,setout       ; if tru go set out stat
    cp     R0,#outncpu    ; tray out and no cpu installed?
    jr     z,setout       ; if so go set out state
           ; not normal out state check abnormals
    cp     R0,#tryclsed   ; is the tray closed w/o cpu installed
    jr     z,setout       ; if is tray closed/no cpu set cpu out state
                          ; so loadsw will move mech
    ld     syscrash,#%cc  ; SET CRASH ID
    jr     gocrash        ; if non of he above go to mech crash
                          ; and try to re-init mechanism to one of these
  setout:                 ; states
    or     R7,#%01        ; set cpu status bit to cpu out
    jr     inmre

  gocrash:
    pop    RP
    pop    IMR
    cp     IRQ,#%00
    jr     ne,gcrsmre
    pop    R0
    pop    R0
    pop    R0
 gcrsmre:
    push   RP
    jp     crash
;--------------------------------------------------------------------------
; NO CHANGE IN RP , NEW MECH STATUS IN MECHDATA; XXLAST MECH
STATUS IN MECHOLD
;
;    read mechanism latch routine
;--------------------------------------------------------------------------
rdmech:              ; (??? including return but not including call)
    push   IMR         ;  save current interupt state
    di
    ld     P2M,#P2M_RD    ;10: set port 2 up for byte read
    push   GEN1
    and    MCP0,#%7f    ;   make sure 138 disabled in mcp0
    ld     GEN1,MCP0    ;   get copy of mcp0
    or     GEN1,#%80    ;   set 138 enable bit high in gen1
    ld     P0,MCP0      ;   write out disable 138
    ld     P3,#mechinclk  ;05: strobe high on mech latch next write latches
    ld     P0,GEN1      ;   138 enable low/clk on u145 low
    ld     P0,MCP0      ;   138 enable high/clk on u145 high
    ld     P3,#mech_oc  ;   set up output enable/ low in 138
    ld     P0,GEN1      ;   138 enable low /oe low on u145
    ld     MECHDATA,P2    ;05: read port 2 data into mechdata parameter
    ld     P0,MCP0      ;   138 enable low /oe high on u145
    ld     P3,#stbhigh  ;   set up y7 select in 138
    pop    GEN1         ;   reset gen1 to previous value
    pop    IMR
    ret                 ;14: return from subroutine
;--------------------------------------------------------------------------
;                  write mechanism port sub routine
;--------------------------------------------------------------------------
;    new data for mech should be in working reg 8(MECHOUT)
;    this routine exits with RP same as when entered and new data
;    at mech out latch
wrt_mech:
    push   IMR
```

```
      di
      ld    P2M,#P2M_WR      ;10: set port 2 up for byte write
      push  GEN1             ;  save copy of gen1
      and   MCP0,#%7f        ;  make sure 138 disabled in mcp0
      ld    GEN1,MCP0        ;  get copy of mcp0
      or    GEN1,#%80        ;  set 138 enable bit high in gen1
      ld    P0,MCP0          ;  write out disable 138
      ld    P2,MECHOUT       ;  put mechout value on port 2
      ld    P3,#wr_mech      ;  set 138 for clk low on u141
      ld    P0,GEN1          ;  enable high drives clk low
      ld    P0,MCP0          ;  enable low drives clk bit high
      ld    P2M,#P2M_RD      ;  reset port 2 to read configuration
      ld    P3,#stbhigh      ;  reset 138 to y7 enable
      pop   GEN1             ;  restore gen1
      pop   IMR
      ret                    ;14: return from subroutine

;
;MOTOR CONTROL SECTION
;________________________________________________________
;START MOTOR
;THIS ROUTINE REQUIRES THAT THE SYCONT REGISTER CONTAIN DIRECTION
INFORMATION
; BIT 1->> 0=LOAD      1=UNLOAD
; DIRECTION BIT IN MOTOR CONTROL REGISTOR BANKS MUST ALSO BE SET
PRIOR TO
; STARTING MOTOR TIMERS
;
STRTMTR:
      di
      push  RP
      tm    TMR,#%02         ; is the vga timer doing something else?
      jr    z,notrun         ; if not go on
      or    FLAGS,#usr1      ; set timer0 was running flag
      and   TMR,#DISABLE_T0  ; if runnnig then stop it
      or    SYSCONT2,#%04    ; show 3 sec delay complete
  notrun:
      ld    RP,#VBANK1       ;10: point to vga motor registor bank
      call  mbnk_init        ;20:
      ld    RP,#CBANK1       ;10:point to carriagge motor reg bank
      call  mbnk_init        ;20:
      clr   R15
      clr   R11              ;01:
      jr    str2_cont
 mbnk_init:
      clr   R14              ;06:
      clr   R10              ;01:
      clr   R1               ;01: clear counters and working registors
      clr   R0               ;01:
      ret
 str2_cont:
      pop   RP
      and   MCP0,#cchigh     ;05: set high current in port byte
      ld    CCURENT,#cchigh ;05: set carriage current mask to high current
      and   MCP1,#vchigh     ;05: set high current in port byte
      ld    VCURENT,#vchigh ;05: set vga current mask to high current
      ld    IMR,#IMR_INIT    ;05: enable all but pwrgood interupts
      ld    PRE0,#PRE0_MINIT ;05: load timer 0 prescaler
      ld    T0,#%fa          ;05: load timer 0 scaler
      ld    PRE1,#PRE1_MINIT ;05: load timer1 prescaler
      ld    T1,#%55          ;05: load timer1 scaler
```

```
;timers both set with high current hold value (pre first step)
      push    RP
      tm      SYSCONT,#%01    ;05: which direction we going
      jr      z,unload
 load:
      ld      RP,#VBANK1      ;10: point to VGA motor reg bank
      ld      R8,#%0f         ;05:
      ld      R9,#%a6         ;05: initialize ramp table pointer
      ld      RP,#CBANK1      ;05: point to carriage motor reg bank
      ld      R14,#%01
      ld      R8,#%0f         ;05:
      ld      R9,#%48         ;05: initialize ramp table pointer
      ld      P0,MCP0         ;05: turn high current on in carriage motor
      or      TMR,#START_T1   ;05: start carriage motor timer
      jr      strt_cont       ; : 2nd motor starts when TIMER2_strt is
 unload:
      ld      RP,#VBANK1      ;10: point to VGA motor reg bank
      ld      R8,#%0f         ;05:
      ld      R9,#%f4         ;05: initialize ramp table pointer
      ld      RP,#CBANK1      ;05: point to carriage motor reg bank
      ld      R8,#%0f         ;05:
      ld      R9,#%a4         ;05: initialize ramp table pointer
      ld      P1,MCP1         ;05: turn on high current in vga motor
      or      TMR,#START_T0   ;05: start vga motor timer
;     or      IRQ,#IRQLVL4
 strt_cont:
      pop     RP
      ret                     ; : 2nd motor starts when TIMER2_strt is
                              ;   called
;________________________________________________________________
; second timer start routine
;
TIMER2_strt:

      tm      SYSCONT,#%01    ;10: check cpuloaded/unloaded (direct) bit
      jr      z,strt_car      ;10/12: if cpu loaded then 2nd motor is car
      or      TMR,#START_T0   ;05: start timer 0 for vga (must be loading)
      jr      TMR2_cont       ;12:
 strt_car:
      or      TMR,#START_T1   ; : unloading so start car as 2nd motor
 TMR2_cont:
      ret
ldtmrval:
      ldci    @R0,@RR8        ;10: get next prescaler value into R2
      ldci    @R0,@RR8        ;10: get next scaler value into R3
      decw    RR8             ;10: reset timer pointer to original value
      decw    RR8             ;10:
      call    rdmech          ;20+rdmech(114) :get current mechswitch status
      ret

;________________________________________________________________
; timer 1 interupt service routine
;     this timer interupt not used for anything other than carriage motor

timer1:
      push    RP
      ld      P0,MCP0         ;10: write out new motor phase
      ld      RP,#CBANK1      ;10: point to carriage MCB timer set
      ld      R0,#CBANK1_R2   ;10: reg 0 have base address of this reg bank
      tm      SYSCONT2,#vgaonly ; is this a vga only move?
      jp      nz,cmtr_off     ;   if so turn off timer and put cmtr idle
```

```
    call   ldtmrval
    ld     PRE1,R2        ;10: load next step prescaler value
    ld     T1,R3          ;10: (80/90)[depend on write irq mask]
                          ;  load next step timer value
                          ;  timer and next phase now ready
                          ;  this routine can now be interupted
                          ;  without affecting next step
    or     TMR,#START_T1
    ld     IMR,#IMR_VGAO   ;10: allow interupt from vga motor only
    tm     MECHDATA,#vgasw  ; never move carriage w/o vga all the way out
    jp     z,vgaswok
    tm     R4,#HOLDSTP    ; if hold state we not moving so go on
    jr     nz,vgaswok     ; if hold dont crash
    ld     syscrash,#%8a
    jp     crash
  vgaswok:
    call   lok_hood
    tm     R4,#altmtr     ; is this a crashed/alternate mech move?
    jr     nz,tm_step     ; if so don't check for cpu in
    tm     MECHDATA,#cpuinst    ;   is cpu in tray?
    jr     nz,tm_step
  nocpuin:
    tm     R4,#FORWARD    ;10/12 : if no cpu in then we unloading?
    jp     nz,tm_step     ;     if fwd and no cpu goto crash routine
    tm     SYSCONT2,#tryclse
    jr     nz,tm_step
    ld     syscrash,#%81
    jp     crash

; increment step table pointer
;
tm_step:
    call   stepfrnt
    jr     stepbck

 stepfrnt:
    ld     R2,R7          ; 06: get step table index pointer
    tm     R4,#HOLDSTP    ; 10: check to hold phase
    jr     nz,tm_dir      ; 10/12: if hold don't change phase
    inc    R2             ; 06: point to next step
    cp     RP,#CBANK1
    jr     z,cardir
    tm     R4,#FORWARD
    jr     nz,tm_dir
    jr     subdir
 cardir:
    tm     R4,#FORWARD    ;    check for counter-clockwise rotation
    jr     z,tm_dir       ; 10:
 subdir:
    sub    R2,#%02        ; 06: if reverse then decrement by 2 because
                          ; of pre-increment
 tm_dir:
    and    R2,#%03        ; 10: auto-wrap (4 phase motor)
    ld     R7,R2          ; 06: new stepper table index
    ld     R2,#%0f        ; 10: point to step table begining
    ld     R3,#%f7        ; 10: load lsb of step table address
    add    R3,R7          ; 10: add offset to base address
    ret
 stepbck:
    ld     MCP0OLD,MCP0       ; 10: SAVE COPY OF OLD MOTOR PORT STATE
    and    MCP0,#NOTMOT       ; 10: mask off to just non motor bits
```

```
    ldc   R1,@RR2       ; 10: load new phase value into R1
    or    R1,#curclr   ; 10: set to 0 current (1 all bits)
    and   R1,CCURENT   ; 10: set new current bits
    or    R1,MCP0       ; 10: add back in the non motor bits
    ld    MCP0,R1       ; 10: copy R1 into MCP0
    ei
; now to set the next timer value up

highramp:

    tm    R4,#HIGHRAMP    ; 10: check if high speed ramp sate
    jr    z,highslew     ;10/12 if no bit set then try highslew
                       ;  : high speed ramp
    inc   R14           ; 06: increment ramp step counter
    tm    R4,#FORWARD    ; 10: Which direction?
    jr    nz,rev         ;10/12  reverse?
    incw  RR8            ; 10: forward so increment ramp table pointer
    incw  RR8            ; 10: again becase values are words
    jr    rmp_cont       ;10/12
 rev:
    cp    R14,#%01       ;    IS THIS THE FIRST HIGHramp REVERSE STEP
    jr    nz,rvmre       ;    if not go on
    inc   R14            ;    1st hrmprev so add 1 to step count
 rvmre:
    decw  RR8            ; 10: reverse so decrement ramp table pointer
    decw  RR8            ; 10: by two because values are words
 rmp_cont:
    cp    R14,#RMPHSPD   ; 10: have we taken all the ramp steps yet
    jp    z,nexstate     ;10/12:
    jr    notrer        ; 12: go to interupt routine finished code

highslew:
    tm    R4,#HIGHSLEW   ; 10: then is it high speed slew
    jr    z,speedchg     ;10/12
    incw  RR10           ; 10: highslew so increment slew step counter
    tm    R4,#FORWARD    ; 10: going forward
    jr    nz,hslrev      ;10/12
    tm    MECHDATA,#tryout     ; 10: tray out switch gone yet ?
    jr    nz,cmoved      ;10/12  jump if switch changed
    cp    R11,#TRYIERL   ;10/12 if lsb equal then check msb
    jr    gt,notrer      ;10/12 if lsb not equal then not yet
;   cp    R10,#TRYIERM   ; 10: have we gone too far w/o traysw change?
;   jr    nz,notrer      ;10/12 if lsb equal then crash
    ld    syscrash,#%82
    jp    crash
  notrer:
    jp    int_done      ; 12: not too far yet so end interupt
 cmoved:
    cp    R10,#SLWCNTM   ; 10: CHECKING MSB FOR END OF TRAVEL
    jr    nz,notcmov
    cp    R11,#SLWCNTL   ; 10: if msb = then how bout lsb
    jp    z,nexstate     ;10/12 if it is then change state
  notcmov:
    jr    notrer        ; 10: not finished so end INT routine

 hslrev:
    tm    MECHDATA,#tryout     ; 10: CAR ALL THE WAY OUT YET?
    jr    z,try_out      ;10/12 :
    cp    R10,#TRYOERM   ; 10: checking msb for too far w/o try switch
    jr    nz,hsl_cont
    cp    R11,#TRYOERL
```

```
        jr      pl,hsl_cont     ;10/12 : JUMP IF NOT
        ld      syscrash,#%83
        jp      crash           ; 12: goto crash routine if too far

hsl_cont:
        jr      notrer

try_out:                        ;    trayout sw detected
        inc     R15             ; 06: increment step count since tryout
        cp      R15,#TRYOOVR    ; 10: READY TO DECEL YET
        jp      z,nexstate      ;10/20: yes-jump to state change code if so
        jr      notrer          ; 12: if not then end int

speedchg:
        tm      R4,#SPEEDCHG    ; 10: really speedchg
        jr      z,lowslew       ;10/12: no so try lowslew
        inc     R14             ; 06: yes-increment ramp counter
        tm      R4,#FORWARD     ; 10: going forward?
        jr      nz,spdrev       ;10/12:
        incw    RR8             ;forward so increment ramp table pointer
        incw    RR8
        jr      spd_cont
spdrev:
        decw    RR8             ; 10: reverse so decrement ramp table pointer
        decw    RR8
spd_cont:
        cp      R14,#SPDCHGE    ; 10: ramp finished yet
        jp      eq,nexstate     ;10/12: GO FIND NEXT STATE
        jr      notrer

lowslew:
        tm      R4,#LOWSLEW     ; 10: really lowslew?
        jr      z,lowramp       ;10/12: no so go try lowramp
        incw    RR10            ; 06: increment slew counter
        tm      R4,#FORWARD     ; 10: forward?
        jr      nz,lslrev       ;10/12:
        tm      MECHDATA,#mfblswm       ; 10: test MFBL bit
        jr      nz,nomfbl
        cp      R15,#%0         ; have we had one before?
        jr      nz,notfrst
        ld      CCURENT,#cchigh ;    set current byte to high current
        and     MCP0OLD,CCURENT ;    set high current in MCP0
        ld      P0,MCP0OLD      ;    write out high current this step
notfrst:
        inc     R15             ; 06: increment steps since MFBL count
        cp      R15,#MFBLOVR    ; 10: past MFBL enough to start decel?
        jr      nz,notrer
        jp      nexstate
nomfbl:
        ld      CCURENT,#ramcur
        cp      R11,#MFBLERL    ; 10: is lsb =
        jp      ne,nombl_cont   ;10/12:
        cp      R10,#MFBLERM    ; 10: have we gone too far w/o MFBL yet?
        jr      lt,nombl_cont
        tm      SYSCONT2,#tryclse
        jp      nz,cmtr_off
        ld      syscrash,#%84
        jp      crash
nombl_cont:
        jp      int_done
```

```
lslrev:
    ld      CCURENT,#cchigh
    tm      MECHDATA,#mfblswm       ; 10: test MFBL bit
    jr      nz,mfblnlow
  lsl_cont:
    or      MECHOUT,#LEDSOFF
    cp      R11,#MBLOERL    ; 10: if msb= then check lsb
    jr      lt,nombl_cont       ;10/12:
    ld      syscrash,#%85
    jp      crash
    jr      nombl_cont          ; 12: not too far so int finished
 mfblnlow:
    inc     R15
    cp      R15,#MFBLOOVR   ;   : traveled past MFBL far enough yet?
    jr      mi,nombl_cont
    jp      nexstate        ; 12: if mfbl low then ramp to high speed
lowramp:
    tm      R4,#LOWRAMP       ; 10: is it low ramp state
    jr      z,hold          ;10/12: no so must be hold state
    tm      R4,#FORWARD
    jr      nz,lrmprev
    inc     R14             ; 06: INCREMENT RAMP STEP COUNT
    incw    RR8              ; 06: increment ramp table pointer
    incw    RR8
    jr      lrmp_cont
 lrmprev:
    tm      MECHDATA,#tryout ;     are we going reverse with th tray out
    jr      nz,lrmprmre    ;      if not then go on
    ld      R4,#holdrev    ;      try out/rev so set hold state
    jp      cmtr_off       ;      turn carriage motor off
 lrmprmre:
    cp      R10,#ccreep
    jr      z,bgrmp
    inc     R10
    jr      int_done
  bgrmp:
    inc     R14             ; 06: INCREMENT RAMP STEP COUNT
    decw    RR8              ; 06: decrement ramp table pointer
    decw    RR8
  lrmp_cont:
    cp      R14,#RMPLOWS     ; 10: FINISHED RAMP YET
    jp      z,nexstate
    jr      int_done
hold:
    cp      R14,#%0         ;  have we had one before?
    jr      nz,GOON
    tm      SYSCONT2,#tryclse
    jr      nz,GOON
    call    TIMER2_strt
 GOON:
    tm      R4,#HOLDSTP     ; 10: is hold state set
    jp      z,nexstate      ;10/12: if not already holdstate-state code
    inc     R14
    cp      R14,#%03
    jr      nz,cmtroff_cont

cmtr_off:       ; must stop timer and reset motor state
    di                  ; must be executed prior to ipr,smr,irq modified
    and     TMR,#DISABLE_T1  ; CLEAR T1 ENABLE BIT
    ei
    or      MCP0,#curclr     ; set to zero current
```

```
      and    MCP0,#holdcur    ; set to idle current
      tm     SYSCONT2,#vgaonly  ; if vga motor move only don't clr move bits
      jr     nz,vonly          ; go write motor off to port and end int
      tm     R4,#FORWARD
      jr     nz,cclrbits    ;  if reverse go clear motion bits and end
  vgaonstrt:
      call   TIMER2_strt    ;  forw so start timer0
;     tm     SYSCONT2,#tryclse  ; FWD-  are we closing the tray?
;     jr     nz,cclrbits       ;  if so clear move bits before end
      jr     cmtroff_cont   ;  if forward just go end
  cclrbits:
      and    SYSCONT,#move_  ;  clear motion and sw action pending bits
      or     SYSCONT,#1       ; set cpu not loaded bit
      or     MCP1,#RLYSOFF   ; carriage unloaded so turn off relays if on
      ld     P1,MCP1          ; write out relays off to port
      or     MECHOUT,#LEDSOFF ; make sure led's are off since cpu is out
      call   delay3           ; start 3 sec hold off timer
      and    SYSCONT2,#single_
  cmtroff_cont:
      ld     P0,MCP0
int_done:
      di
      pop    RP
      ld     IMR,#IMR_RUN
      iret
  vonly:
      tm     R4,#FORWARD      ; vga only in which direct
      jr     z,vgaonstrt
      jr     cmtroff_cont
;
; timer 0 interupt service routine
;     this timer ISR runs the vga motor other uses need a jump
;     to their own ISR routine here (with a check of course

timer0:
      push   RP
      ld     RP,#WORK        ;    SWITCH TO WORKING REGISTER BANK
      tm     R7,#%80         ;   TEST MOTOR IN MOTION BIT
      jp     z,tmr_alt      ;   IF NO MOTION GO TO ALTERNAT ISR
  tmr_cont:
      ld     P1,MCP1         ;10: write out new motor phase
      ld     RP,#VBANK1       ;10: point to vga motor register set
      ld     R0,#VBANK1_R2     ;10: R2 of vbank1
      tm     SYSCONT2,#caronly ;  is this a carriage only move
      jp     nz,vmtr_off    ;   if so go turn this timer off
      call   ldtmrval       ;   get next timer value in r2,r3
      ld     PRE0,R2         ;10: load next step prescaler value
      ld     T0,R3          ;10: (80/90)[depend on write irq mask]
                            ;   load next step timer value
                            ;   timer and next phase now ready
                            ;   this routine can now be interupted
                            ;   without affecting next step
      or     TMR,#START_T0
      di
      ld     IMR,#IMR_CAR0    ;10: allow interupt due to car mot only
      call   lok_hood
      tm     MECHDATA,#mfblswm ;  IS A CPU PLUGGED IN
      jr     z,tmr0_mre       ;  IF YES GO ON
      tm     R4,#FORWARD        ; which direct we going w/o cpu plugged
      jr     nz,tmr0_mre       ;  if reverse then go on
      cp     SPH,#%4b          ; is this a cpu move vga command
```

```
    jr      z,tmr0_mre       ; if yes go on not error for mfbl high
    tm       R4,#FORWARD       ;  which direct we going w/o cpu plugged
    jr      nz,tmr0_mre      ;  if reverse then go on
    jr      vnocpuin
  tmr0_mre:
    tm       R4,#FORWARD
    jr      nz,ztm_step
  yforw:
    tm       MECHDATA,#cpuinst      ;10: cpuin*no lock*hoodon ?
    jr      z,vnocpuin
    jr      ztm_step
  vnocpuin:
    ld      syscrash,#%86
    jp      crash
; increment step table pointer
;
ztm_step:
    call    stepfrnt
 vstepbck:
    ld      R0,MCP1          ; 10: SAVE COPY OF OLD MOTOR PORT STATE
    and      R0,#NOTMOT      ; 10: mask off to just non motor bits
    ldc     R1,@RR2          ; 10: get new phase value
    ld      MCP1,R1          ; 10: load new phase value into MCP1
    or      MCP1,#curclr    ; 10: set bits for 0 current
    and      MCP1,VCURENT    ; 10: set new current bits
    or      MCP1,R0          ; 10: add back in the non motor bits

; now to set the next timer value up

vhighramp:

    tm       R4,#HIGHRAMP     ; 10: check if high speed ramp sate
    jr      z,vhighslew     ;10/12 if no bit set then try highslew
                      ;   : high speed ramp
    inc     R14             ; 06: increment ramp step counter
    cp      R14,#VRMPHSPD   ; 10: have we taken all the ramp steps yet
    jp      z,nexstate      ;10/12:
    tm       R4,#FORWARD      ; 10: Which direction?
    jr      nz,vrev         ;10/12  reverse?
    incw    RR8             ; 10: forward so increment ramp table pointer
    incw    RR8             ; 10: twice because of word values
    jr      vrmp_cont
 vrev:
    decw    RR8             ; 10: reverse so decrement ramp table pointer
    decw    RR8             ; 10: twice because of words
 vrmp_cont:
    jp      int_done        ; 12: go to interupt routine finished code

vhighslew:
    tm       R4,#HIGHSLEW     ; 10: then is it high speed slew
    jr      z,vspeedchg     ;10/12
    inc     R14             ; 10: highslew so increment slew step counter
    tm       R4,#FORWARD      ; 10: going forward
    jr      nz,vhslrev      ;10/12
    tm       MECHDATA,#vgasw      ; 10: tray out switch gone yet ?
    jr      nz,vmoved       ;10/12  jump if switch changed
    cp      R14,#VGAIER      ; 10: traveled too far w/o vga switch?
    jp      mi,vhsl_cont
    ld      syscrash,#%87
    jp      crash
 vhsl_cont:
```

```
     jp      int_done
  vmoved:
     cp      R14,#VHSLCNTF   ;
     jp      z,nexstate      ;10/12: if so goto nexstate code
     jr      vhsl_cont       ; 10: not finished so end INT routine

 vhslrev:
     tm      MECHDATA,#vgasw     ; 10: VGA ALL THE WAY OUT YET?
     jr      z,vgaout     ;10/12 :
     cp      R14,#VGAOER    ; 10: GONE TOO FAR YET?
     jp      nz,vhslr_cont  ;10/12 : jump to crash routine if so
     ld      syscrash,#%88
     jp      crash
  vhslr_cont:
     jr      vhsl_cont       ; 10: ELSE INTERUPT IS DONE

 vgaout:                 ;       vgaout sw detected
     tm      SYSCONT2,#vgaonly ;  is this a vga only move
     jp      nz,nexstate     ;   if so goto nexstat don't start carriage
     call    TIMER2_strt     ;    2 motor move so start 2nd motor
     jp      nexstate        ;   change to next state
vspeedchg:
     tm      R4,#SPEEDCHG    ; 10: really speedchg
     jr      z,vlowslew      ;10/12: no so try lowslew
     inc     R14             ; 06: yes-increment ramp counter
     cp      R14,#VSPDCHG    ; 10: ramp finished yet
     jp      z,nexstate      ;10/12: GO FIND NEXT STATE
     tm      R4,#FORWARD     ; 10: going forward?
     jr      nz,vspdrev      ;10/12:
     incw    RR8             ;forward so increment ramp table pointer
     incw    RR8             ;forward so increment ramp table pointer
     jr      vhsl_cont
  vspdrev:
     decw    RR8             ; 10: reverse so decrement ramp table pointer
     decw    RR8             ; 10: reverse so decrement ramp table pointer
     jr      vhsl_cont       ; 12: finshed processing

vlowslew:
     tm      R4,#LOWSLEW     ; 10: really lowslew?
     jr      z,vlowramp      ;10/12:  no so go try lowramp
     inc     R14             ; 10: increment slew counter
     tm      R4,#FORWARD     ; 10: forward?
     jr      nz,vlslrev      ;10/12:
     cp      R14,#VLWSLWF    ; 10: END OF LOW SLEW YET?
     jp      z,nexstate      ;10/12 COUNT = END COUNT SO CHANGE STATE
  vlsl_cont:
     jp      int_done

  vlslrev:
     cp      R14,#VLWSLWR    ; 10: END OF LOW SLEW YET?
     jp      z,nexstate      ;10/12 COUNT = END COUNT SO CHANGE STATE
     jr      vlsl_cont       ; 12: no so interupt is finished

vlowramp:
     tm      R4,#LOWRAMP     ; 10: is it really low ramp state
     jr      z,vhold         ;10/12: no so must be hold
     inc     R14             ; 06: INCREMENT RAMP STEP COUNT
     cp      R14,#%01        ;    IS THIS THE FIRST HIGHramp REVERSE STEP
     jr      nz,vrvmre       ;    if not go on
     inc     R14             ;    1st hrmprev so add 1 to step count
 vrvmre:
```

```
    cp    R14,#VRMPLOWS    ; 10: FINISHED RAMP YET
    jp    z,nexstate
    tm    R4,#FORWARD
    jr    nz,vlrmprev
    incw  RR8              ; 06: increment ramp table pointer
    incw  RR8              ; 06: increment ramp table pointer
    jr    vlsl_cont

vlrmprev:
    tm    STATUS,#vgacrp
    jr    z,vlrprcon
    inc   R10
    dec   R14
    cp    R10,#vcreep
    jr    nz,vlsl_cont
vlrprcon:
    tm    MECHDATA,#vgasw ;  CHECK FOR VGA ALL THE WAY OUT
    jr    nz,vrevmore   ;
    ld    R4,#holdrev
    tm    SYSCONT2,#vgaonly ;  if single is set then don't start 2
    jp    nz,vmtr_off   ;
    call  TIMER2_strt   ;  start carriage motor
    jp    vmtr_off      ;  turn off vga motor
vrevmore:
    decw  RR8              ; 06: decrement ramp table pointer
    decw  RR8              ; 06: decrement ramp table pointer
    jr    vlsl_cont

vhold:
    tm    R4,#HOLDSTP    ; 10: is hold state set
    jp    z,nexstate     ;10/12: if not already holdstate-state code
    inc   R14
    cp    R14,#%03       ;  enough hold states with high current?
    jr    nz,vmtroff_cont ;  if not go on

vmtr_off:
    ; must stop timer and reset motor state
    di                  ; must be executed prior to ipr,smr,irq modified
    and   TMR,#DISABLE_T0  ; CLR TIMER 0 ENABLE BIT
    clr   %57
    and   STATUS,#vgacrp_
    or    MCP1,#curclr     ; 06: set to zero current
    and   MCP1,#holdcur    ; 06: set to minimum current
    ld    P1,MCP1          ; 10: write motor current to motor
    tm    SYSCONT2,#vgaonly ; is it a vga only move
    jr    nz,clrmve     ; if vga only clear move bits
    tm    R4,#FORWARD    ;  not vga only so test for direction
    jr    z,clrmve      ; if going reverse jump to continue
    tm    SYSCONT2,#caronly ; is this a carriage motor only move
    jr    z,vmtroff_cont  ; if not then go end int
strt2:
    call  TIMER2_strt   ;  start carriage motor
    jr    vmtroff_cont  ;  go end int
clrmve:
    and   SYSCONT,#%5e    ; clear sw action pending and set cpu loaded
                   ; clear mech in motion bit
                   ; note-all vga only moves have cpu loaded
    call  delay3        ; start 3 second hold off timer
    and   SYSCONT2,#single_
vmtroff_cont:
    jp    int_done      ; end of timer interupt routine to goto end
```

```
;________________________________________________________________
;           state machine code for both motors
;________________________________________________________________
; this subroutine assumes an orderly completion of the state currently set
; in R4. The code will clear appropriate step counters and set the new state
; into R4.

nexstate:
      ld     R0,RP
      cp     R0,#CBANK1      ;    clr r10,r15 only if carriage bank
      jr     nz,vgabnk
      clr    R11            ; 06: clear msb of slew counter
      clr    R15            ; 06: clear overtravel counter
 vgabnk:
      ld     R0,R4          ; 10: save a copy of current/old state
      clr    R14            ; 06: clear ramp step counter
      and    R0,#STESAVE     ; 10: R0 now have old non motor state bits
      clr    R10            ;    clr lsb of slew counter
      rcf                   ; 06: CLEAR CARRY FLAG
      tm     R4,#FORWARD     ; 10: WHICH DIRECTION WE GOING?
      jr     nz,smrev       ;10/12
      rlc    R4             ; 06: SHIFT STATE TO NEXT FORWARD STATE
      and    R4,#%3f         ; 10: AUTO WRAP STATE BYTE
      jr     nz,nex_cont
      inc    R4
  nex_cont:
      or     R4,R0          ; 06: add non motor state bits back in
      jp     int_done
 smrev:
      and    R4,#notmclr     ; 10: clear 2 high bits
      rrc    R4             ; 06: ROTATE TO NEXT STATE
      jr     nc,nex_cont     ;10/12  was state at bit 0
      clr    R4             ; 06: yes so clr R4
      or     R4,#HOLDSTP     ; 10: set new state in bit 6
      jr     nex_cont
;________________________________________________________________
;
;           load switch interupt service routine
;
;________________________________________________________________

loadsw:
      push   RP
      call   swdebounce
      push   IRQ
      di
      clr    IRQ
      tm     SYSCONT,#psupm  ;05  is power supply on?
      jr     nz,psison
      call   trnpsup_on
      jr     ld_cont
   psison:
      call   swdetec
; could avoid double blink when turn psup on by jumping here when turn it on
   ld_cont:
      and    STATUS,#altmtr1_
      and    SYSCONT2,#%8e   ;  clear alternate/special move bits
      clr    IRQ
      pop    R1             ;  get copy of prior IRQ reg (int's)
      call   setsyscont
      tm     R1,#rstint      ;05  load and reset switches?
```

```
      jp     nz,l_r          ;10/12 if reset too then go move
      tm     R1,#stbyint   ;   was stby hit while loadsw low
      jp     z,ldgoon        ;   if not then go move
      or     SYSCONT2,#tryclsel  ; tray close and car only bits set
      jr     mve_it
  ldgoon:
      tm     SYSCONT,#%01      ;05: get copy of system control flag reg.
      jr     z,cpu_in          ;   if cpu loaded go check more stuff
   mve_it:
      call   move_it          ;   cpu out so move mech
      jr     endsw
   cpu_in:
      tm     R7,#%04          ;   are relays on?
      jr     nz,cpu_on
      jr     mve_it          ;   cpu is off so move carriage
    cpu_on:
      tm     MODES,#smrtmde ;  is load switch overide active?
      jr     z,nosmrt        ;   IF SMRTMODE JUMP AND DOIT
;      and    CPUSTAT,#%03
      or     CPUSTAT,#LDEJHIT ;  set ldsw bit high in cpustat
      ld     SPH,CPUSTAT     ;   set up as byte to send to cpu
      call   send_byte       ;   send sw pending to cpu
      jr     endsw           ;   end sw interupt (cpu cmd req for action)
  nosmrt:
      tm     MODES,#%01      ;   SHOULD WE POWER DOWN THE CPU FIRST
      jr     z,mve_it      ;   IF NOT JUMP OVER PWR DWN CALL
      call   pwr_dwn        ;   GO TURN IT OFF
      call   move_it
  endsw:
      tm     SYSCONT,#%80   ;   are we moving the mech
      jr     nz,end_cont    ;   if so- don't clear action pending
      and    R7,#%df        ;   clear switch action pending bit
      call   delay3
   end_cont:
      pop    RP
      iret
   l_r:
      and    IRQ,#%37       ;   l&r so clr pending reset sw interupt
      call   move_it
      jp     endsw
;---------------------------------------------------------------------------
;      input switches debounce/valid switch routine
;
;---------------------------------------------------------------------------

swdebounce:
      and    SYSCONT2,#%fe  ;   clr valid sw bit
      ld     RP,#expand
      ld     SMR,#SMRFAST   ;   set clock speed to high
      or     SYSCONT,#clkhigh
      ld     RP,#WORK       ;   point to working register group
      clr    syscrash      ;   clr crash reg for temp use as sw depress
                     ;   while unit in motion counter
      tm     SYSCONT,#move  ;   is unit in motion
      jr     nz,badsw      ;   if not go on
      tm     R7,#swpend     ;   is there a previous switch action pending
      jr     nz,badsw
    ; below here is no mech in motion and no sw action pending
   swok:
      or     R7,#swpend     ;05  indicate switch action pending
      clr    R1
```

```
    clr     R0
dbncsw:
    cp      R1,#swdebnce    ;
    jr      nz,notall
    or      SYSCONT2,#%01   ;   set valid switch hit bit
notall:
    inc     R1              ;   increment valid switch loops counter
    ld      R0,P3           ;06  get copy of current switch status
    com     R0              ;   invert so active high switch bits
    tm      R0,#swtest      ;05  mask off to just switch bits
    jr      nz,dbncsw       ;   loop until all switches go high
    tm      SYSCONT2,#%01   ;   was a sw low for swdebnce loops ?
    jr      nz,goodsw
badsw:
    pop     GEN1            ;   remove msb return address
    pop     GEN1            ;   remove lsb return address
    jr      endsw
goodsw:
    ret
;---------------------------------------------------------------------------
;       hood and keylock test code

lok_hood:
    tm      MECHDATA,#hoodoff
    jr      z,hoodok
    pop     syscrash
    pop     syscrash
    ld      syscrash,#%8b
    jp      crash
hoodok:
    tm      MECHDATA,#trylock   ;   is mechanism locked
    jr      z,lok_end       ;   convenient ret if not
    call    lock_led        ;   indicate locked mech to user
    tm      STATUS,#lkmov   ;   was this routine called by move_it
    jr      z,lok_end       ;   if not go
    tm      STATUS,#lkled   ;   did lock_led end due to stby sw?
    jr      nz,lok_end      ;   this jump will execute a ret to end move
    and     STATUS,#lkled_  ;   now unlocked so clr flag and move
    pop     GEN1
    pop     GEN1
lok_end:
    and     STATUS,#lkmov_
    ret
;___________________________________________________________________________
;
;           move the mechanism sub routine
;           assumes power supply on
; must be in working registor set when get here
move_it:
    and     TMR,#tmrcrsh    ;   stop any timers that are already running
    push    IMR             ;   save current interupt mask
    di                      ;   disable interupts
    clr     IRQ             ;   clear pending interupts
    pop     IMR             ;   restore interupt mask
    ld      R0,MECHDATA     ;   get copy of mechdata
    and     R0,#mechonly    ;   strip to justr mech bits
    cp      R0,#outncpu     ;   check for tray out no cpu installed
    jr      nz,move_mre     ;   if not tray out no cpu then go on
    tm      SYSCONT2,#%40   ;   try out no cpu but move anyway
    jr      nz,move_mre
    ret                     ;   tray out no cpu so don't move
```

```
 move_mre:
     and     MECHOUT,#exunit_  ;   clr exunit control bit in mechout
                        ;   so MFBL status can be read in mechdata
     call    wrt_mech      ;   write it twice to give time for hdwre
     call    wrt_mech      ;   to settle before read MFBL
     call    rdmech        ;   get current mechanism status
     or      STATUS,#lkmov
     call    lok_hood
  move_cont:
     tm      R7,#%04       ;   are relays on
     jr      z,rlys_off
;
     tm      MODES,#%01
     jr      z,rlys_off
     call    pwr_dwn       ;   turn off power to cpu
 rlys_off:
     ld      R0,R9         ;   get copy of current mech read status
     and     R0,#mechonly  ;   strip to only mech bits
     tm      R0,#mfblswm   ;   test MFBL bit
     jr      nz,chckout    ;   not low go to check for full out routine
     ; mfbl low so unload cpu
     di                    ;   hold off other int until flagsreg's set
     or      R7,#move      ;   unit in so set cpu in motion bit
     and     R7,#%fe       ;   set cpu in status
 go_out:
     ld      R1,#revstrt   ;   load gen2 with new control flag for
                        ;   motor registor banks
     and     SYSCONT,#%fe  ;   set syscont to cpu loaded status
  mvdo_it:
     or      SYSCONT,#move ;   set mech in motion bit
     ld      RP,#CBANK1    ;   point to carriage register bank
     clr     R14
     call    setcntrl
     ld      RP,#VBANK1    ;   point to vga register bank
     call    setcntrl
     jr      mvdo_cont
  setcntrl:
     ld      GEN3,GEN2
     tm      STATUS,#altmtr1
     jr      z,dontadd
     or      GEN3,#altmtr
  dontadd:
     ld      R4,GEN3       ;   load start control flag
     ret
  mvdo_cont:
     ld      RP,#WORK      ;   reset RP to working reg group
     call    STRTMTR       ;   START MOTOR TIMER
     ei                    ;   allow other int now
     ret
 chckout:
     tm      MECHDATA,#vgasw
     jr      nz,go_out     ; vga sw not out then go out
     tm      MECHDATA,#tryout ; vga out how bout carriage?
     jr      nz,go_outry   ;   if car not out send it out
     ; car and vga at out endpoints
     tm      R0,#cpuinst   ;   is cpu in
     jr      nz,go_in      ;   if cpu in and tray out go load
 ; tray out/vga out / cpu not in
     tm      SYSCONT2,#tryclse ; is this a tray close move
     jr      nz,go_in      ;   yes go to cpu not in code
     call    swdetec
```

```
     ld     syscrash,#80
     jp     crash
 go_outry:
     or     SYSCONT2,#caronly
     jr     go_out
 go_in:
     ld     R1,#fwdstrt
     or     SYSCONT,#%01   ; set not loaded state is syscont
     jr     mvdo_it

;________________________________________________________________
;
;          RESET SWITCH INTERUPT SERVICE ROUTINE
;
;________________________________________________________________

rsetsw:
     push   RP
     call   swdebounce
     tm     SYSCONT,#rlymsk     ;  are relays on
     jp     z,endsw          ;  cpu power off so don't reset
     cp     IMR,#rsetonly      ;  are we in a all but rset int
     jp     z,do_init        ;  if so go reset mc also
     call   resetcpu
     jp     endsw
;________________________________________________________________
;
;          STDBY SWITCH INTERUPT SERVICE ROUTINE
;
;________________________________________________________________

stbysw:
     push   RP
     call   swdebounce
     call   setsyscont     ;#### added this to fix tray closed turn on
     ld     R0,IRQ         ;  get copy of interupt reg
     CLR    IRQ
     and    R0,#stbyld      ;  strip to just stby and load switch bits
     cp     R0,#stbyld      ;  check for both high
     jp     z,reset       ;  if so go reset mc
     tm     R7,#%01        ;  is cpu installed
     jp     nz,endsw       ;  cpu not loaded so no action
     tm     R7,#%02        ;  is the power supply on
     jr     nz,psupison    ;  if on don't need to turn it on
     call   trnpsup_on

  psupison:
     tm     R7,#%04        ;  PS on but how bout relays
     jr     nz,rlyison    ;  if not then go power up
     and    STATUS,#lkled_ ;  clear lock_led flag if set
     call   bootup
     jp     endsw
  rlyison:                ;  rlyson and stbysw so shutdown
     tm     MODES,#smrtmde
     jr     z,notsmrt
     or     CPUSTAT,#STBYHIT ; indicate stby switch hit in cpu status
     ld     SPH,CPUSTAT
     call   send_byte
     call   swdetec
     jp     endsw
 notsmrt:
```

```
    call   pwr_dwn
    jp     endsw
;-----------------------------------------------------------------------
;          TURN ON POWER SUPPLY SUB ROUTINE
;-----------------------------------------------------------------------
trnpsup_on:
    ld     P3,#psoffsfe
    push   IMR
    di
    push   RP
    ld     RP,#expand
    ld     SMR,#SMRSAFE    ;  set clock to low speed
    ld     RP,#WORK        ;  set working registor pointer
psupondly:
    ld     P2M,#P2MSAFE
    ld     P3M,#P3MSAFE
    ld     P01M,#P01MSFE
    or     MCP1,#p1psoff
    and    MECHOUT,#yellow
    and    MCP0,#cchigh
    and    MCP1,#vchigh
    ld     P1,MCP1         ;    init port 1 outputs
    ld     P3,#psonsfe     ;  turn ps. on 0's to U144 til pgood
    or     R7,#%02         ;  set supply on bit in SYSCONT flag reg
    ld     P01M,#P01MOFF   ;  turn on live+5 hold off fet
chkhigh:
    ld     R0,P0
    tm     R0,#%40
    jr     z,chkhigh       ;
    ld     P0,MCP0         ;  init port 0 outputs
    ld     P01M,#P01MRUN   ;  turn on port 0 and 1 outputs
    clr    R1
wait_pgd:
    call   delayslo        ;  wait a while
    ld     R0,P3           ;  get current port 3 input state
    tm     R0,#pgoodm      ;  is power good yet?
    jr     nz,pwrgdok      ;  if true go to pwrgdok
    inc    R1              ;  increment try counter
    cp     R1,#%22         ;  did we check it enough times yet?
    jr     nz,wait_pgd     ;  if not go check again
    ld     P3,#%00         ;  not good in XX tries so turn it off
    call   delayslo        ;  wait 800 ms before retry
    jr     psupondly       ;  go try again

pwrgdok:
    push   RP
    ld     RP,#expand
    ld     SMR,#SMRFAST    ;  ps on so set high clock speed
    pop    RP
    or     SYSCONT,#%2     ;  set high clk speed bit in syscont
    ld     P3M,#P3MDRUN    ;  TURN ON PORT 2 PULL-UPS
    and    MCP0,#%7c       ;  clr 138 enable bit& mech output control
    and    MCP1,#%7f       ;  clr live +5 fet base bit
    call   motlow
    ld     P01M,#P01MRUN   ;  make sure ports 0 and 1 as outputs
    ld     R0,CPUSTAT      ;  save a copy of cpustat
    or     SYSCONT,#psupm  ;  set power supply on bit in syscont
    ld     CPUSTAT,#%0     ;  set CPUSTAT to 0
    ld     SPH,CPUSTAT
    call   send_byte       ;  write 0's incase cpu latch oe/ is low
    ld     CPUSTAT,R0      ;  restore CPUSTAT
```

```
      call   wrt_mech       ;  : write out yelow led
      call   delay
      or     MECHOUT,#LEDSOFF
      call   wrt_mech
      pop     RP
      pop     IMR
      call   delay3
      ret
;______________________________________________________________
;
;       POWER GOOD SIGNAL INTERUPT SERVICE ROUTINE
;
;
;______________________________________________________________

pwrgood:
      iret

;______________________________________________________________
;
;            RESET CPU SUBROUTINE
; input req. working registors 0-2 (48-50) will be modified in this routine
; assumes clock is at high speed
;______________________________________________________________
;
resetcpu:
      push    IMR
      di
      or     MECHOUT,#%10        ;   set pwrgd- bit
      call   wrt_mech
      call   delay          ;   400ms delay routine
      and     MECHOUT,#%ef   ;   clr pwrgd- bit
      call   wrt_mech
      pop     IMR
      ret
;______________________________________________________________
;
;            BOOT UP CPU SUBROUTINE
; input req. working registors 0-2 (48-50) will be modified in this routine
; ASSUMES POWER SUPPLY ON AND ALL OUTPUT PORTS AT SAFE VALUES
CLOCK AT HIGH
; SPEED
;______________________________________________________________
;
bootup:
      push    IMR
      DI
      push    RP
      ld     RP,#WORK
      or     STATUS,#bootld
      call   loadvga        ;   make sure external monitor plugged in
      and     STATUS,#bootld_
      and     R7,#%f7        ;   set cpu running bit
      and     MCP1,#RLYSON    ;   clr relays on bit
      or     R8,#%10        ;   set pwrgd- bit to reset condition
      ld     SPH,#%4b
      or     SYSCONT,#rlybiton   ;set rlys on bit in syscont flag
      ld     P1,MCP1        ;   turn on relays
      and     MECHOUT,#grnon  ;   turn power led to green on
      or     MECHOUT,#exunit
      call   wrt_mech       ;
      call   delay          ;   400ms delay routine
```

```
    ld     R0,#%04        ;   allow 4 loops w/o pgood before crash
  chkpgood:
    call   delay
    ld     R1,P3          ;   get current port 3 input bit status
    tm     R1,#%08        ;
    jr     nz,pwr_ok
    djnz   R0,chkpgood
    ld     syscrash,#%89
    jp     crash
  pwr_ok:
    and    MECHOUT,#%ef         ;   clr pwrgd- bit
    call   wrt_mech       ;   output to system
    and    SYSCONT,#swpend_     ; clear sw pending bit in syscont
    call   set_stat       ;   check system status
    ld     SPH,CPUSTAT
    clr    CMDLST
    call   send_byte      ;   tell cpu what it is
    jp     inmre
;    pop    RP
;    pop    IMR
;    ret
;-----------------------------------------------------------------
;
;    POWER DOWN CPU SUBROUTINE
; input req. working registors 0-2 (48-50) will be modified in this routine
;-----------------------------------------------------------------
;
pwr_dwn:
    di
    push   RP
    ld     RP,#WORK
;    clr    crashold       ;   clear old crash byte
    or     R8,#%13        ;   set pwrgd- bit (RESET TO CPU) IN MECHOUT
                          ;   ALSO TURNS LED1 OFF
    call   wrt_mech       ;   put it out on port
    ld     SPH,#%00       ;   load cpuport with all 0's
    call   send_byte      ;   write it out to cpu port
    di
    and    SYSCONT,#%5b   ;   clr rlys/motion/sw action bits in SYSCONT
    or     MCP1,#RLYSOFF  ;   set relays off bit in MCP1
                          ;   updating control flag reg
    ld     P1,MCP1        ;   write relays off to port 1
    call   delay
    call   delay
    call   delay
    ei
  ;  this sets up timed off timer if req.
    tm     STATUS,#%01    ;   is this a software pwr down
    jr     z,end_pdwn     ;   if not don't start timer
    tm     MODES,#offtime ;   are we in a timed off state
    jr     z,end_pdwn     ;   if not go end pdwn routine
    ld     RP,#CBANK1     ;   check if cpu sent 0hrs,0 mins
    cp     R10,#%00
    jr     nz,strtimer
    cp     R9,#%00
    jr     z,end_pdwn     ;   if true then don't set up timer
  strtimer:
    ld     RP,#expand
    ld     SMR,#SMRSAFE   ;   set clock to low speed
    ld     RP,#CBANK1
    and    STATUS,#%fe    ;   clear software pwr dwn flag
```

```
      and     SYSCONT2,#offtmre_     ; CLR holdoff delay bit in syscont2
      ld      %57,#%04         ;   ALT TIMER jump offset
      ld      R14,#%96        ;   set up tick counter initial value
      clr     R13             ;   reset minute timer
      clr     R12             ;   reset hour timer
      ld      IMR,#IMR_ALT     ;   enable timer0 and fpanl switche int's
      ld      PRE0,#%cB        ;   load timer prescaler
      ld      T0,#%fa         ;05: load timer 0 scaler
      or      TMR,#START_T0
      ld      T0,#%fa         ; reload T0 for next end of count
                              ;   timer clock = 32 usec
                              ;   timer tick=.2sec
      tm      CPUSTAT,#fchge     ;   check bqcharge status bit
      jr      nz,end_pdwn       ;   if fast charging go end ISR
      call    ps_off          ;   not fc so turn off P.S.
   end_pdwn:                  ;   still FC so end routine here
                              ;   idle routine should check fc status to
                              ;   turn ps off when finished
      pop     RP
      call    delayslo
      ret
ps_off:                       ; not FC so turn off power supply
      di
      and     MECHOUT,#redon
      call    wrt_mech
      call    delay
      push    RP
      ld      RP,#expand
      ld      SMR,#SMRSAFE     ;   set clock to low speed
      pop     RP
      ld      P01M,#P01MOFF    ;   port 0 as input,port 1 as out
      ld      P2M,#P2MSAFE     ;   port 2 as input
      ld      P3M,#P3MSAFE     ;   port 2 pullups open drain
      ld      P1,#p1psoff      ;   0 on all pins but livevcc fet
      and     SYSCONT,#%09     ;   SYSCONT to relays and PS off,clk slow
                              ;   clr sw act pend and motion bits also
      ld      P3,#%0          ;   turn off power suply and hold all outputs
                              ;   to U144 low (it will have power off to it)
      call    delayslo        ;   wait for outputs to fall
                              ;   prior to releasing live +5 FET
      ld      P01M,#P01MSFE    ;   configure port 1 as inputs
      ld      IMR,#IMR_ALT     ;   set up interupt mask registor
      ret
;______________________________________________________________________
;
;         SWITCH DETECTED INDICATOR SUBROUTINE
;
;______________________________________________________________________
;
swdetec:
      push    RP
      ld      RP,#SCRTCH       ;   SET TO SCRATCH PAD REG GROUP
      push    MECHOUT         ;   save copy of mech output port
      or      MECHOUT,#LEDSOFF
      call    wrt_mech
      call    delayslo
      and     MECHOUT,#LEDSON
      call    wrt_mech
      call    delayslo
      pop     MECHOUT
      call    wrt_mech
```

```
        clr    crashold
        pop    RP
        ret
;-----------------------------------------------------------------
;
;       TRAY LOCKED LED INDICATOR SUBROUTINE
;
;-----------------------------------------------------------------
;
lock_led:
        ei
        or     STATUS,#lkled
        push   MECHOUT
   blink1:
        and    MECHOUT,#redon
        call   wrt_mech
        call   delay
        or     MECHOUT,#LEDSOFF
        call   wrt_mech
        call   delay
        call   rdmech
        tm     STATUS,#lkled
        jr     z,stbyend
        tm     MECHDATA,#trylock
        jr     nz,blink1
        pop    MECHOUT
 endlock:
        call   wrt_mech
        ret
 stbyend:
        pop    GEN1
        and    MECHOUT,#grnon
        jr     endlock
;-----------------------------------------------------------------
;
;            ALTERNATE TIMER ISR'S FOR TIMER 1
;            jump table
;       PUSH RP IS PENDING FROM TIMER0 CODE
;-----------------------------------------------------------------

tmr_alt:
        ld     RP,#SCRTCH
        tm     R7,#%01
        jp     nz,dlyint
        tm     R7,#%02
        jp     nz,blnkint
        tm     R7,#%04
        jp     nz,toffint
        jp     int_done
;-----------------------------------------------------------------
;
;            SET STATUS (CPUSTAT) REGISTER TO CURRENT STATE
;
;-----------------------------------------------------------------
set_stat:
        DI
        PUSH   RP
        ld     RP,#CBANK1     ; set to carriage reg bank to use gen reg.
        ld     R0,MECHOUT     ; get copy of mechout
        or     R0,#%fc        ; set to 1 all bits except led1 bits
        com    R0             ; invert all bits in r0 1 only in led1 on bits
```

```
        and    CPUSTAT,#%fc   ; clear bits 0,1 in cpustat
        or     CPUSTAT,R0     ; copy led1 bits into cpustat led1 bits
        pop    RP
        ret
;________________________________________________________________
;
;          SEND STATUS TO CPU SUBROUTINE
;
;________________________________________________________________
send_byte:
        DI
        push   GEN1           ; save gen1 current value
        ld     GEN1,MCP0      ; get copy of mcp0
        and    MCP0,#%7f      ; make sure bit 7 is low
        or     GEN1,#%80      ; set bit 7 high in gen1
        ld     P0,MCP0        ; disable 138
        ld     P2M,#P2M_WR    ; set up port 2 for write operation
        ld     P2,SPH         ; put output byte out on port 2
        ld     P3,#wr_cpu     ; set up 138 for u143 clk
        ld     P0,GEN1        ; enable high on 138 - clk low on u143
        ld     P0,MCP0        ; enable low on 138 - clk high on u143
        ld     P2M,#P2M_RD    ; set up port 2 for read
        ld     P3,#stbhigh    ; reset 138 enable to y7
        pop    GEN1
        ret
;________________________________________________________________
;
;          READ CPU PORT SUBROUTINE
;
;________________________________________________________________
rd_cpuprt:
        push   IMR
        DI
        push   GEN1           ; save gen1 current value
        ld     GEN1,MCP0      ; get copy of mcp0
        and    MCP0,#%7f      ; make sure bit 7 is low
        or     GEN1,#%80      ; set bit 7 high in gen1
        ld     P2M,#P2M_RD    ; set up port 2 for read
        ld     P0,MCP0        ; disable 138
        ld     P3,#rd_cpu     ; set up 138 for cpu port /oe
        ld     P0,GEN1        ; 138 enable high /oe on u142 low
        ld     DATACPU,P2
        ld     P0,MCP0
        ld     P3,#stbhigh
        pop    GEN1
        pop    IMR
        ret
;________________________________________________________________
;
;          CRASH SUBROUTINE (FATAL ERROR IN MECHANISM)
;
;________________________________________________________________
nomvecrash:
        and    SYSCONT,#move_
        pop    RP
        jp     int_done
;precrash:
;       ei
;       call   delay          ; WAIT FOR AWHILE WITH INT ENABLED
;       POP    RP             ; POP FOR PUSH AT TOP OF CRASH
crash:
```

```
      di
      and    SYSCONT2,#single_
      push   RP
      ld     TMR,#tmrcrsh          ;  turn off timers
      CLR    IRQ                   ;  clear all pending interupts
      ld     RP,#WORK
      or     MCP0,#mtroff   ;   set motor control ports to zero zurrent
      or     MCP1,#mtroff   ;   dito
      and    MECHOUT,#exunit_ ;  set exunit_ for reading MFBL (rem)
      call   wrt_mech        ;  write this out
      ld     P01M,#P01MRUN   ;  set port 0 &1 as outputs
      ld     P0,MCP0         ;  write out zero current to carriage
      ld     P1,MCP1         ;  write out zero current to VGA
      ld     RP,#SCRTCH      ;  set scratch pad registor group
      ld     R11,syscrash    ;  get copy of crash id byte
      and    R11,#%0f        ;  clear all but crash source id bits
      ld     R10,MECHOUT     ;  save a copy of MECHOUT
      or     MECHOUT,#LEDSOFF
      and    MECHOUT,#redon          ; turn on red side of stby led
      call   wrt_mech                ;
;     call   delay
      cp     R11,#%0
      jr     z,crsloop
  blagn:
      or     MECHOUT,#fcoff
      call   wrt_mech
      call   delay
      and    MECHOUT,#fcon
      call   wrt_mech
      call   delay
      djnz   R11,blagn
  crsloop:
      or     MECHOUT,#LEDSOFF
      and    MECHOUT,#yellow
      call   wrt_mech
      call   delay
;     pending > push RP + source routine pending status
;     tm     syscrash,#%80  ;  is crash bit set
;     jr     z,precrash      ;  if not keep looping
  crshon:
      ld     MECHOUT,R10
      call   wrt_mech
      cp     syscrash,crashold
      jp     eq,nomvecrash
      ld     crashold,syscrash
      cp     syscrash,#%cc  ;  is this a setsyscont error
      jr     ne,crs_cont    ;  if not go on
      tm     SYSCONT,#swpend ;  if so then was a switch hit to get here
      jr     nz,crs_cont    ;  if so go on

  needint:                  ;  no sw so was it a power up error
      pop    RP
      pop    RP
      push   FLAGS
      push   RP
      push   RP
  crs_cont:
      tm     MECHDATA,#hoodlock     ; hood off or key locked?
      jp     nz,nomvecrash
      tm     MECHDATA,#vgasw
      jr     z,carcrsh
```

```
 crsmove:
      and    SYSCONT,#%fe           ;  set cpu loaded state
      ld     RP,#WORK
      ld     IMR,#IMR_RUN
      or     R7,#move        ;  unit in so set cpu in motion bit
      and    R7,#%fe         ;  set cpu in status
      call   rdmech
      call   setreg1
      call   go_out
 crsend:
      pop    RP
      jp     int_done
;
  carcrsh:
      cp     syscrash,#%87
      jr     eq,vgacreep
      or     SYSCONT2,#caronly
      jr     crsmove
vgacreep:
      or     STATUS,#vgacrp
      jr     crsmove

;
delay:  ;400ms delay
      push   RP
      ld     RP,#SCRTCH      ;   SET TO SCRATCH PAD REG GROUP
      ld     R12,#%ff        ;
      ld     R13,#%ff        ;
   dloop:
      djnz   R12,dloop       ;12/10.5
      ld     R12,#%ff
      djnz   R13,dloop       ;12/10.5
      pop    RP
      ret
;
delayslo:  ;800ms delay (at slow clock speed)
      push   RP
      ld     RP,#SCRTCH      ;   SET TO SCRATCH PAD REG GROUP
      ld     R12,#%ff        ;
      ld     R13,#%20        ;
   dloop1:
      djnz   R12,dloop1      ;12/10.5
      ld     R12,#%ff
      djnz   R13,dloop1      ;12/10.5
      pop    RP
      ret
;---------------------------------------------------------------------------
;     THREE SECOND SOFTWARE DELAY
; sets user flag 2 when finished
; starts timer 0 continuous mode and .025 seconds/tick
delay3:
      di
      and    SYSCONT2,#holdoff_     ; CLR holdoff delay bit in syscont2
      push   RP
      ld     RP,#expand
      ld     SMR,#SMRFAST    ;   ps on so set high clock speed
      ld     RP,#SCRTCH      ;   SET TO SCRATCH PAD REG GROUP
      cp     R7,#%00         ;   is the timer being used
      jr     nz,tmrused
      ld     R7,#%01         ;   ALT TIMER jump offset
      ld     R15,#%14        ;   set up msb tick count value
```

```
      ld     R14,#%f0       ;   set up tick counter initial value
      or     IMR,#IMR_TIMER0 ;   enable timer0 and fpanl switche int's
      ld     PRE0,#%C9       ;   load timer prescaler
      ld     T0,#%fa        ;05: load timer 0 scaler
      or     TMR,#START_T0
      ld     T0,#%fa        ; reload T0 for next end of count
  tmrused:
      pop    RP
      ei
      ret
;------------------------------------------------------------------------
;     interupt isr for delay timing
;
;
dlyint:
      ld     T0,#%fa              ; RELOAD T0 (PRE0 NOT NEED IT)
      djnz   R14,dlymre            ; HAVE WE HAD ENOUGH TIMER TICKS YET?
      ld     R14,#%f0
      djnz   R15,dlymre
      or     SYSCONT2,#holdoff     ; IF YES THEN SET HOLD-OFF COMPLETE
      and    TMR,#DISABLE_T0        ; STOP TIMER
      clr    R7                   ; clr alt timer jump mask
  dlymre:
      jp     int_done             ; NOT FINISHED SO END ISR
;------------------------------------------------------------------------
;     interupt isr for time off timer
;
;
toffint:
      push   RP
      ld     RP,#CBANK1
      ld     T0,#%fa              ; RELOAD T0 (PRE0 NOT NEED IT)
      djnz   R14,toffmre           ; HAVE WE HAD ENOUGH TIMER TICKS YET?
      ld     R14,#%96              ; reload tick counter
      inc    R13                  ; increment minute timer
  minchk:
      cp     R13,R10               ; do minutes match?
      jr     z,minmtch
      cp     R13,#60d              ; whole hour yet?
      jp     nz,toffmre           ; if not go end interupt
      inc    R12                  ; 60 min so inrement 1 hour
      clr    R13                  ; clear minute counter
      jr     minchk               ; inc hours so check again
  minmtch:
      cp     R12,R9               ; minutes match HOW BOUT HOURS
      jp     nz,toffmre           ; if not go end int
      or     SYSCONT2,#offtmre     ; IF YES THEN SET HOLD-OFF COMPLETE
      clr    %57                  ; CLR ALT TIMER JUMP MASK (SCRTCH R7)
      and    TMR,#DISABLE_T0        ; STOP TIMER
  toffmre:
      pop    RP
      jp     int_done             ; NOT FINISHED SO END ISR
;------------------------------------------------------------------------
;
;------------------------------------------------------------------------
;     interupt isr for blinking led's
;
;
blnkint:
      ld     T0,#%fa
      djnz   R14,blkmre
```

```
      ld      R14,BLNKMSK
      and     R14,#LEDSOFF
      xor     MECHOUT,R14
      call    wrt_mech
      ld      R14,#%14
 blkmre:
      tm      BLNKMSK,#%23
      jp      nz,int_done
      and     TMR,DISABLE_T0
      clr     %57
      jp      int_done
;_________________________________________________________________
;
;         CHECK BATTRY CHARGE STATUS SUBROUTINE
;
;_________________________________________________________________
;
; check battery charge status
checkbat:
      push    RP
      tm      SYSCONT,#move   ;   is the mechanism moving?
      jr      nz,endbat       ;   if so then end
      tm      SYSCONT,#psupm  ;   is the power supply on?
      jr      z,endbat        ;   if not then end
      ld      RP,#SCRTCH      ;   set to scratch pad registor group
      ld      R0,#chkcnt      ;   set number of reads counter to chkcnt
      clr     R1              ;   clear low count counter
 lowloop:
      call    rdmech          ; 20+49=69clks
      ei
      tm      MECHDATA,#bqchg     ; 05:check bqcharge status bit
      jr      nz,notfc        ; 10:if not fast charging dn't inc r1
      inc     R1              ; 01:fast charging so inc R1
  notfc:
      djnz    R0,lowloop      ; 12 checked it 255 times yet?
      rl      R2      ;   rotate R2 byte to new low bit
      cp      R1,#chkcnt      ;   was fast charge true all 255 times?
      jr      nz,clrbit       ;   if not all low then not FC so turn off
  setbit:
      or      R2,#%01   ;   set lowest order bit to one
      jr      chckbyte
  clrbit:
      and     R2,#%FE   ;   clr lsbit of checkbat
  chckbyte:
      cp      R2,#%ff
      jr      nz,fchgoff
  fchgon:
      or      CPUSTAT,#fchge    ;
      tm      BLNKMSK,#%40
      jr      nz,endbat
      and     MECHOUT,#fcon
      jr      endbat
  fchgoff:
      and     CPUSTAT,#fchge_   ;   clear fast charge bit
      tm      BLNKMSK,#%40
      jr      nz,endbat
      or      MECHOUT,#fcoff
  endbat:
      pop     RP
      ret
```

```
;-----------------------------------------------------------------------------
clr_swich:     ;40
      di
      and    CPUSTAT,#clrswich ; clear switch pending bits in cpustat
      jp     end_cmd          ; go nak command and end

initsmrt:      ;41
      or     MODES,#%04       ;  set smart mode bit in sycont2
      jp     end_cmd
endsmrt:       ;42
      and    MODES,#%fb  ;  CLR SMART MODE BIT IN SYSCONT2
      jp     end_cmd
ejectcpu:      ;43
      push   RP
      ld     RP,#WORK
      tm     MODES,#%01
      jr     z,eject_mre
      call   pwr_dwn
  eject_mre:
      and    MECHOUT,#exunit_
      call   wrt_mech
      call   go_out
      pop    RP
      jp     wtfordne
rdswstat:      ;44
      push   IMR            ;  save copy of interupt mask reg
      di                 ;  disable interupts
      push   RP             ;  save copy of RP
      call   rdmech
      ld     RP,#CBANK1     ;  set to carriage registor bank
      ld     R0,MECHDATA     ;  get copy of mechanism input byte
      and    R0,#%9b        ;  strip to just switches
      tm     R0,#keylock     ;  check keylock bit
      jr     z,swnokey       ;  already low so go on
      or     R0,#%04         ;  set keylock bit high in out byte
  swnokey:
      ld     SPH,R0          ;  copy to send byte location
      pop    RP
      pop    IMR
      jp     end_cmd         ;  go to command end

blnkpwr:       ;45
      cp     MECHOLD,#%00
      jr     nz,blnk_mre
      ld     MECHOLD,MECHOUT
  blnk_mre:
      ld     R6,MECHOUT      ;   get copy of mechout
      or     R6,#yellow      ;  set to one all non pwr led bits
      com    R6              ;  1 only in pwr led on bits of mechout
      and    R6,#%3          ;  keep just pwr led bits
      or     R6,#%80         ;  set pwr led in cpu control bit
      or     BLNKMSK,R6      ;   load blink mask with 1 in led 's to blink
  tmrstrt:
      ld     RP,#SCRTCH
      ld     R7,#%02         ;  set alternate timer jump offset
      ld     R14,#%14        ;   .5 seconds half cycles
      ld     IMR,#IMR_ALT    ;   enable timer0 and fpanl switche int's
      ld     PRE0,#%c9       ;  load timer prescaler
      ld     T0,#%fa        ;05: load timer 0 scaler
      or     TMR,#START_T0  ;   load and enable T0
      ld     T0,#%fa         ;  reload T0 for next end of count
```

```
        jp      end_cmd

pwrmechchk:
        or      BLNKMSK,#%80    ;  set led in cpu control in blnkmsk
        and     BLNKMSK,#%fc    ;  clr pwr led blnk bits in blnkmask
        cp      MECHOLD,#%0
        jr      nz,sved
        ld      MECHOLD,MECHOUT
  sved:
        ret
pwrstdrd:       ;46  restores mechout pwr led bits to those of mechold
        ld      RP,#VBANK1      ;  switch to vga motor bank to use gen reg
        ld      R0,MECHOLD      ;  get copy of original mechport
        or      R0,#%fc         ;  only bits low are led bits that were on
        or      MECHOUT,#%03    ;  led bits off in mechout
        and     MECHOUT,#%R0    ;  mechout now have mechold pwr led bits
        call    wrt_mech
        and     BLNKMSK,#%7c    ;  clr cpu overide and pwr blink led bits
        tm      BLNKMSK,#%40    ;  is fc led in cpu control?
        jp      nz,end_cmd      ;  IF SO GO END routine
        clr     MECHOLD         ;  fc not cpu control so clr saved mech byte
        jp      end_cmd         ;  go end routine

pwrred:         ;47
        call    pwrmechchk
        or      MECHOUT,#led1off
        and     MECHOUT,#redon
        call    wrt_mech
        jp      end_cmd
pwrgrn:         ;48
        call    pwrmechchk
        or      MECHOUT,#led1off
        and     MECHOUT,#grnon
        call    wrt_mech
        jp      end_cmd
pwryel:         ;49
        call    pwrmechchk
        or      MECHOUT,#led1off
        and     MECHOUT,#yellow
        call    wrt_mech
        jp      end_cmd
pwroff:         ;4a
        call    pwrmechchk
        or      MECHOUT,#led1off
        call    wrt_mech
        jr      end_cmd
loadvga:
        call    rdmech
        tm      MECHDATA,#vgasw
        jr      nz,end_cmd
        call    setreg
        call    go_in
        jr      wtfordne
;  end_vga:
;       ret

  setreg:
        and     SYSCONT2,#single_
        or      SYSCONT2,#vgaonly
  setreg1:
        or      STATUS,#altmtr1
```

```
        ld      RP,#WORK
        ret
unldvga:
        call    rdmech
        tm      MECHDATA,#vgasw
        jr      z,end_cmd
        call    setreg
        call    go_out
  wtfordne:
        tm      SYSCONT,#move
        jr      nz,wtfordne
        and     SYSCONT2,#%cf   ; clear single motor move bits
        cp      SPH,#%43        ; IF EJECT COMMAND THEN TURN OFF RELAYS NOW
        jr      nz,end_cmd
        or      MCP1,#RLYSOFF
        ld      P1,MCP1
        jr      end_cmd
toglvga:
        jp      badcmd
rdtype:
        ld      SPH,#STATYPE
        call    send_byte
        jp      end_cmd
getfwrev:
        ld      SPH,#FWREV
        call    send_byte
        jp      end_cmd
getfwvs:
        ld      SPH,#FWVER
        call    send_byte
        jp      end_cmd
rdfctime:
        jp      badcmd

end_cmd:
        or      SPH,#%c0        ; set cmd complete bits in SPH
        call    send_byte       ; send it to cpu
        tm      STATUS,#bootld
        jp      z,idle
        ret
blnkchg:
        cp      MECHOLD,#%00
        jr      nz,fcblnk_mre
        ld      MECHOLD,MECHOUT
  fcblnk_mre:
        or      BLNKMSK,#%60    ; set blnk mask w 1 in fcled to blink
        jp      tmrstrt         ; go start blink timer

stdchg:
        and     BLNKMSK,#%9f    ; clr cpu overide and fc blink led bits
        tm      BLNKMSK,#%80    ; is pwr led in cpu control?
        jp      nz,end_cmd      ; IF SO GO END routine
        clr     MECHOLD         ; pwr not cpu control so clr saved mech byte
        jp      end_cmd         ; go end routine

fcmechchk:
        or      BLNKMSK,#%40    ; set led in cpu control in blnkmsk
        and     BLNKMSK,#%df    ; clr pwr led blnk bits in blnkmask
        cp      MECHOLD,#%0     ; have we saved std mechout before
        jr      nz,fsved        ; if so skip saving
        ld      MECHOLD,MECHOUT ; not saved so do it
```

```
 fsved:
      ret                ; finished
fcledon:
      call   fcmechchk
      and    MECHOUT,#fcon
      call   wrt_mech
      jp     end_cmd
fcledoff:
      call   fcmechchk
      or     MECHOUT,#fcoff
      call   wrt_mech
      jp     end_cmd
nrstejec:
      and    MODES,#%fe     ; clr eject with reset active bit
      jp     end_cmd
resejec:
      or     MODES,#%01     ; set eject with reset active bit
      jp     end_cmd
ldnores:
      jp     badcmd
ldwres:
      jp     badcmd

rdmodes:
      push   IMR
      di
      push   RP
      ld     RP,#VBANK1
      ld     R0,BLNKMSK     ; get copy of blink mask registor
      and    R0,#%c0        ; strip to led control bits
      rr     R0             ; rotate right 3 times
      rr     R0
      rr     R0
      and    MODES,#%e7     ; clear led control bits in mode reg
      or     MODES,R0       ; set led bits per r0
      ld     SPH,MODES
      pop    RP
      pop    IMR
      jp     end_cmd
pwrupsys:
      jp     badcmd
pwrdnsys:
      or     STATUS,#%01    ; set software power down flag
      call   pwr_dwn        ; go turn it off
      jp     idle           ;
timeon:
      push   IMR            ;  save current interrupt mask register
      ld     IMR,#rsetonly  ;  TURN off interupts
      push   RP             ;  save current RP
      ld     RP,#CBANK1     ;  change to CBANK1
      ld     R1,#CBANK1_R9
      clr    R2
      ld     R0,DATACPU     ;  save a copy of last data cpu byte
  prtcheck:
      call   rd_cpuprt      ; go re-read cpu port for next byte
      cp     DATACPU,R0     ;  same as last or new byte
      jr     z,prtcheck     ; same so loop
      ld     R0,DATACPU     ; get copy of new data
      and    R0,#%3f        ; strip away cmd bits
      ld     @R1,R0         ; new so save @ R1
      inc    SPH            ; increment SPH to show received byte
```

```
      call   send_byte      ;  send to cpu
      ld     R0,DATACPU     ;  save copy of current data to compare to
      inc    R1             ;  increment ram pointer
      inc    R2             ;  increment byte counter
      cp     R2,#%2         ;  see if we got 2 yet
      jr     nz,prtcheck    ;  if not go back
      or     MODES,#offtime ;  got two so set off time bit in modes
  wtfor0:
      call   rd_cpuprt
      tm     DATACPU,#cmdmask
      jr     nz,wtfor0
      pop    RP
      pop    IMR
      sub    SPH,#%02       ;
      jp     end_cmd
timeoff:
      and    MODES,#offtime_
      jp     end_cmd
  badcmd:
      ld     SPH,DATACPU    ; move command recieved from cpu to write byte
      and    SPH,#datmsk    ; clear 2 msbits
      or     SPH,#%80       ; set 2 msb's to bad command state
      call   send_byte      ;  send it to cpu
      jp     idle

; Command table (commands from CPU to docking station

      .org   %0f06
cmd:
      .word  clr_swich   ;00
      .word  initsmrt    ;01
      .word  endsmrt     ;02
      .word  ejectcpu    ;03
      .word  rdswstat    ;04
      .word  blnkpwr     ;05
      .word  pwrstdrd    ;06
      .word  pwrred      ;07
      .word  pwrgrn      ;08
      .word  pwryel      ;09
      .word  pwroff      ;0a
      .word  loadvga     ;0b
      .word  unldvga     ;0c
      .word  toglvga     ;0d
      .word  rdtype      ;0e
      .word  getfwrev    ;0f
      .word  getfwvs     ;10
      .word  rdfctime    ;11
      .word  blnkchg     ;12
      .word  stdchg      ;13
      .word  fcledon     ;14
      .word  fcledoff    ;15
      .word  nrstejec    ;16
      .word  resejec     ;17
      .word  ldnores     ;18
      .word  ldwres      ;19
      .word  rdmodes     ;1a
      .word  pwrupsys    ;1b
      .word  pwrdnsys    ;1c
      .word  timeon      ;1d
      .word  timeoff     ;1e
      .word  badcmd      ;1f
```

```
       .word   badcmd          ;20
;
; stepper motors ramp tables
;carriage motor TABLE
       .org    %0f48
;
; ORCH0C        210,280,.08,20,F,P
       .WORD        %8E44
       .WORD        %EE27
       .WORD        %2ECB
       .WORD        %36A7
       .WORD        %26EB
       .WORD        %EE23
       .WORD        %BE2B
       .WORD        %22F8
       .WORD        %EE21
       .WORD        %4E65
       .WORD        %2EAC
       .WORD        %5659
       .WORD        %22E7
       .WORD        %F61E
       .WORD        %5E4F
       .WORD        %3A81
       .WORD        %BA27
       .WORD        %26C7
       .WORD        %BE26
       .WORD        %4E5E
;
;  ORCHSPD  175,280,.05,R
       .WORD  %4E5E
       .WORD  %BA27
       .WORD  %6649
       .WORD  %D224
       .WORD  %7643
       .WORD  %5661
       .WORD  %467F
       .WORD  %2AE7
       .WORD  %8E47
       .WORD  %5A79
       .WORD  %E232
       .WORD  %E233
;  ORCHOCLR    100,175,.1,15,R,P
       .WORD  %E233
       .WORD  %DA35
       .WORD  %5A83
       .WORD  %7E5E
       .WORD  %568D
       .WORD  %E635
       .WORD  %FA32
       .WORD  %42C8
       .WORD  %5A97
       .WORD  %3AF8
       .WORD  %5E9F
       .WORD  %56B9
       .WORD  %7A8B
       .WORD  %5ACE
       .WORD  %52FA

       .org  %0fa6
;VGA motor table        vhrmp00f
```

```
        .word %38BC
        .word %Ec24
        .word %28B7
        .word %A428
        .word %24A9
        .word %4455
        .word %E019
        .word %Fc16
;       vchg00f
        .WORD %346B
        .WORD %18EA
        .WORD %288F
        .WORD %18F5
        .WORD %643D
        .WORD %445E
        .WORD %28A9
        .WORD %F01E
        .WORD %3494
        .WORD %2CBA
        .WORD %5C5D
        .WORD %D429

;       vlrmp00f
        .word %D429
        .word %24F2
        .word %2CC7
        .word %FC23
        .word %F824
        .word %28E3
        .word %34B2
        .word %28ED
        .word %E82A
        .word %9444
        .word %9C43
        .word %A841
        .word %7463
        .word %40BE
        .word %44BF
        .word %7C71
        .word %3CFF
        .word %50D4
        .word %FC4C
        .word %DC65

; Motor step table for motorS

        .org    %0ff7
stptbl:
        .ascii  00000000B       ; x x AI0 BI0 AI1 PA BI1 PB  A B'  100% current
        .ascii  00000001B       ; x x AI0 BI0 AI1 PA BI1 PB  A B   100% current
        .ascii  00000101B       ; x x AI0 BI0 AI1 PA BI1 PB  A'B  100% current
        .ascii  00000100B       ; x x AI0 BI0 AI1 PA BI1 PB  A'B' 100% current


; The last bytes of ROM are reserved for a ROM checksum value to be
; entered at program download time and a firmware revision number,version
; number and station type.

        .org    %0ffb
        .ascii  FWREV           ; Firmware revision
        .ascii  FWVER           ; Firmware version
```

```
.ascii  STATYPE      ; Station Type
.ascii  00h          ; dummy checksum MSB
.ascii  00h          ; dummy checksum lsb
```

```
/*
;============================================================================
; Copyright Notice:   Copyright (C) 1989 Texas Instruments Incorporated.
;
; License Agreement:   The ideas, implementation, source listing, object
;                 code, and execute module is referrenced as PROGRAM.
;
;                 PROGRAM is protected under United States of America
;                 Copyright laws.  Use of this PROGRAM without
;                 expressed written approval by Texas Instruments is
;                 in violation of these laws.  Texas Instruments
;                 considers the ideas and expressions presented within
;                 this PROGRAM to be the sole property of Texas
;                 Instruments.
;
;                 Use of PROGRAM is granted to licensee under
;                 Texas Instruments Software License Agreement for
;                 use on Texas Instruments products ONLY.  Licensee
;                 is granted the right to use  PROGRAM and
;                 Texas Instruments reserves all rights to PROGRAM.
;
;                        ALL RIGHTS RESERVED
;
;============================================================================
; Revison Control:
;
;   $Header$
;   $Log$
;
;----------------------------------------------------------------------------
; Version 1.0  1. Original Version.
; 03/13/90
; Tom Leavitt
;============================================================================
;
;   variable defintions
;
;============================================================================
*/
#include "set_dock.h"

int DoEject = FALSE;
int Eject = 0;
int Smart = 0;
int Crt = 0;
int ShowStatus = FALSE;
int ShowVersion = FALSE;
int HotEject = 0;
int DoHotEject = 0;
int DoSuspend = 0;
```

```
# Microsoft Visual C++ generated build script - Do not modify

PROJ = DOCK
DEBUG = 0
PROGTYPE = 6
CALLER =
ARGS =
DLLS =
D_RCDEFINES = -d_DEBUG
R_RCDEFINES = -dNDEBUG
ORIGIN = MSVC
ORIGIN_VER = 1.00
PROJPATH = L:\DOCK\
USEMFC = 1
CC = cl
CPP = cl
CXX = cl
CCREATEPCHFLAG =
CPPCREATEPCHFLAG =
CUSEPCHFLAG =
CPPUSEPCHFLAG =
FIRSTC =
FIRSTCPP = DATA.CPP
RC = rc
CFLAGS_D_DEXE = /nologo /W3 /FR /G2 /Zi /D_DEBUG /Od /AM /D_DOS /Fd"DOCK.PDB"
CFLAGS_R_DEXE = /nologo /W3 /FR /G2 /DNDEBUG /Gs /Ox /AM /D_DOS
LFLAGS_D_DEXE = /NOLOGO /ONERROR:NOEXE /NOI /CO /STACK:5120
LFLAGS_R_DEXE = /NOLOGO /ONERROR:NOEXE /NOI /STACK:5120
LIBS_D_DEXE = mafxcrd oldnames mlibce
LIBS_R_DEXE = mafxcr oldnames mlibce
RCFLAGS = /nologo
RESFLAGS = /nologo
RUNFLAGS =
OBJS_EXT =
LIBS_EXT =
!if "$(DEBUG)" == "1"
CFLAGS = $(CFLAGS_D_DEXE)
LFLAGS = $(LFLAGS_D_DEXE)
LIBS = $(LIBS_D_DEXE)
MAPFILE = nul
RCDEFINES = $(D_RCDEFINES)
!else
CFLAGS = $(CFLAGS_R_DEXE)
LFLAGS = $(LFLAGS_R_DEXE)
LIBS = $(LIBS_R_DEXE)
MAPFILE = nul
RCDEFINES = $(R_RCDEFINES)
!endif
!if [if exist MSVC.BND del MSVC.BND]
!endif
SBRS = DATA.SBR \
        PARSEARG.SBR \
        SET_DOCK.SBR \
        STRINGS.SBR


DATA_DEP = l:\dock\set_dock.h


PARSEARG_DEP = l:\dock\set_dock.h \
```

```
    l:\dock\strings.h \
    l:\dock\extern.h


SET_DOCK_DEP = l:\dock\set_dock.h \
    l:\dock\strings.h \
    l:\dock\extern.h


STRINGS_DEP = l:\dock\set_dock.h


all: $(PROJ).EXE $(PROJ).BSC

DATA.OBJ: DATA.CPP $(DATA_DEP)
    $(CPP) $(CFLAGS) $(CPPCREATEPCHFLAG) /c DATA.CPP

PARSEARG.OBJ:  PARSEARG.CPP $(PARSEARG_DEP)
    $(CPP) $(CFLAGS) $(CPPUSEPCHFLAG) /c PARSEARG.CPP

SET_DOCK.OBJ:  SET_DOCK.CPP $(SET_DOCK_DEP)
    $(CPP) $(CFLAGS) $(CPPUSEPCHFLAG) /c SET_DOCK.CPP

STRINGS.OBJ:   STRINGS.CPP $(STRINGS_DEP)
    $(CPP) $(CFLAGS) $(CPPUSEPCHFLAG) /c STRINGS.CPP

$(PROJ).EXE::  DATA.OBJ PARSEARG.OBJ SET_DOCK.OBJ STRINGS.OBJ $(OBJS_EXT) $(DEFFILE)
    echo >NUL @<<$(PROJ).CRF
DATA.OBJ +
PARSEARG.OBJ +
SET_DOCK.OBJ +
STRINGS.OBJ +
$(OBJS_EXT)
$(PROJ).EXE
$(MAPFILE)
c:\msvc\lib\+
c:\msvc\mfc\lib\+
d:\rfx\+
$(LIBS)
$(DEFFILE);
<<
    link $(LFLAGS) @$(PROJ).CRF

run: $(PROJ).EXE
    $(PROJ) $(RUNFLAGS)


$(PROJ).BSC: $(SBRS)
    bscmake @<<
/o$@ $(SBRS)
<<
```

```
extern int DoEject;
extern int Eject;
extern int Smart;
extern int Crt;
extern int ShowStatus;
extern int ShowVersion;
extern int HotEject;
extern int DoSuspend;
extern int DoHotEject;
```

```
//============================================================================
// Copyright Notice:    Copyright (C) 1991,92 Texas Instruments Incorporated.
//============================================================================
// BYTE  OEMType
//  7 6 5 4 3 2 1 0 - OEMType definition
//  | |_|_|_|_|_|_|__ OEM Model ID
//  |            00 = Texas Instruments
//  |            01 = Gateway2000
//  |            02 = Data General
//  |            03 = CompuAdd
//  |            04 = SHARP
//  |            05 = Bloomberg
//  |_______________ Generic OEM
//============================================================================

    #define     OEM_TI          0x00 // Texas Instruments
    #define     OEM_GATEWAY     0x01 // Gateway2000
    #define     OEM_DG          0x02 // Data General
    #define     OEM_COMPUADD    0x03 // CompuAdd
    #define     OEM_SHARP 0x04 // SHARP Corporation
    #define     OEM_BLOOM 0x05 // Bloomberg
    #define     OEM_GENERIC     0x80 // Generic OEM
    #define     OEM_UNKNOWN     0xFF // Unknown Machine

//============================================================================
```

```
//============================================================================
// WORD   MachineType
//   F E D C B A 9 8  7 6 5 4 3 2 1 0 - MachineType definition
//   | | | | | | | |  | | | | | |_|_|__ System Type
//   | | | | | | | |  | | | | |        001 = Laptop
//   | | | | | | | |  | | | | |        010 = Notebook
//   | | | | | | | |  | | | | |_______ Internal Floppy
//   | | | | | | | |  | | | |     0 = No
//   | | | | | | | |  | | | |     1 = Yes
//   | | | | | | | |  |_|_|_|_________ VGA Subsystem
//   | | | | | | | |              0000 = Standard/Western Digital
//   | | | | | | | |              0001 = Reserved
//   | | | | | | | |              0010 = Cirrus Logic
//   | | | | |_|_|_|_________________ CPU Type
//   | | | |             0000 = SX (or 80286)
//   | | | |             0001 = DX
//   | | | |             0010 = SL/SXL
//   | | | |             0011 = Reserved
//   | | | |             0100 = Reserved
//   | | | |             0101 = DX2
//   | | | |             0110 = SLC
//   | | | |             0011-1111 = Reserved
//   |_|_|_|_________________________ Processor
//                  0000 = Reserved
//                  0001 = 8086/8088
//                  0010 = 80286
//                  0011 = 80386
//                  0100 = 80486
//============================================================================

    #define     UNKNOWN_MACHINE    0x0000   // unknown machine type
    #define     TM2000      0x2002   // TravelMate 2000
    #define     LT386       0x3009   // Sharp LT386 (PC5700)

    #define     TM3000      0x300A   // TravelMate 3000 (& 0xf00f)
    #define     TM3WSX      0x300A   // TravelMate 3000 SX (WD)
    #define     TM3CSX      0x302A   // TravelMate 3000 SX (Cirrus)
    #define     TM3WSXL     0x320A   // TravelMate 3000 SXL (WD)
    #define     TM3CSXL     0x322A   // TravelMate 3000 SXL (Cirrus)

    #define     TM4000      0x400A   // TravelMate 4000 (& 0xf00f)
    #define     TM4WSX      0x400A   // TravelMate 4000 SX (WD)
    #define     TM4CSX      0x402A   // TravelMate 4000 SX (Cirrus)
    #define     TM4WDX      0x410A   // TravelMate 4000 DX (WD)
    #define     TM4CDX      0x412A   // TravelMate 4000 DX (Cirrus)
    #define     TM4WDX2     0x450A   // TravelMate 4000 DX2 (WD)
    #define     TM4CDX2     0x452A   // TravelMate 4000 DX2 (Cirrus)
    #define     TM4WSLC     0x460A   // TravelMate 4000 SLC (WD)
    #define     TM4CSLC     0x462A   // TravelMate 4000 SLC (Cirrus)

    #define     CIRRUS_BIT  0x0020   // the Cirrus VGA system

//============================================================================
```

```
//============================================================================
// BYTE   ModelType
//   7 6 5 4 3 2 1 0 - ModelType definition
//   | | | | |_|_|_|__ Software Bundle
//   | | | |           0000 = MS-DOS
//   | | | |           0001 = MS-DOS & Windows 3.x
//   | | | |           0010-1111 = Unused
//   |_|_|_|_________ LCD Type
//              0000 = Standard Monochrome
//              0001 = Passive Color
//              0010 = Active Color
//              0011 = EL
//              0100-1111 = Unused
//============================================================================

    #define     STANDARD_MODEL 0x00 // the standard TM3000

    #define     DOS_ONLY  0x00 // MS-DOS Only
    #define     DOS_WIN3X 0x01 // MS-DOS and Windows 3.X

    #define     LCD_MONO  0x00 // Standard Monochrome LCD
    #define     LCD_PCOLOR    0x10 // Passive Color LCD
    #define     LCD_ACOLOR    0x20 // Active Color LCD
    #define     LCD_EL        0x30 // EL Display Panel

//============================================================================
```

```
/*
;=============================================================================
; Copyright Notice:    Copyright (C) 1989 Texas Instruments Incorporated.
;
; License Agreement:   The ideas, implementation, source listing, object
;                 code, and execute module is referrenced as PROGRAM.
;
;                 PROGRAM is protected under United States of America
;                 Copyright laws. Use of this PROGRAM without
;                 expressed written approval by Texas Instruments is
;                 in violation of these laws. Texas Instruments
;                 considers the ideas and expressions presented within
;                 this PROGRAM to be the sole property of Texas
;                 Instruments.
;
;                 Use of PROGRAM is granted to licensee under
;                 Texas Instruments Software License Agreement for
;                 use on Texas Instruments products ONLY. Licensee
;                 is granted the right to use PROGRAM and
;                 Texas Instruments reserves all rights to PROGRAM.
;
;                         ALL RIGHTS RESERVED
;
;=============================================================================
; Revison Control:
;
;   $Header$
;   $Log$
;
;-----------------------------------------------------------------------------
; Version 1.0  1. Original Version.
; 03/13/90
; Tom Leavitt
;=============================================================================
;
;   ParseArgs( cnt, strs ) - parse the command line arguments
;
;=============================================================================
*/
#include <iostream.h>
#include <string.h>
#include "set_dock.h"
#include "strings.h"
#include "extern.h"

/*
```

```
*/
/*****************************************************************************
 * ParseArgs() - get the arguments passed along by the user
 *****************************************************************************/
int ParseArgs(
    int ArgCnt,
    char *ArgStr[]
    )

{
   int i = 1;              /* zero-base index into arg_str   */
    int retval;

   if ( ArgCnt == 1 ) {    /* no args, show status      */
        ShowUsage();
        return( 1 );
   }

   while ( i < ArgCnt ) {

        //
        // if an invalid switch is processed, report it to the caller
        //
        if ( (retval = GetSwitch( ArgStr[i] )) ) {

            if ( ShowVersion )
                cout << Version << TIString0 << TIString1;

            if ( retval == 1 )
                cout << "\nInvalid Option: " << ArgStr[i] << '\n';

           ShowUsage();

           return(1);

        } else
            i++;

    }
   return( 0 );
}

/*
```

```
*/
/******************************************************************************
 * GetSwitch( ptr ) - get the switch defined in the ptr string
 ******************************************************************************/
int GetSwitch(
    char *ptr
    )

{
    char *str1, *str2;

    str1 = _strlwr( ptr );

    if ( _stricmp( str1, "suspend" ) == 0 ) {
        DoSuspend = TRUE;
        return 0;
    }

        //
        // if this command is entered without the "=ON/OFF", then the
        // user wants to eject the unit
        //
    if ( _stricmp( str1, "eject" ) == 0 ) {
        DoEject = TRUE;
        return 0;
    }
    if ( (str2 = strstr( str1, "smart=" )) != NULL )
        return( (Smart = GetOnOff( str2+6 )) ? 0 : 1 );

        //
        // if the user has entered "eject=on/off" then I will get this far
        // and I can see if the user is setting the value
        //
    if ( (str2 = strstr( str1, "eject=" )) != NULL ) {
        return( (Eject = GetOnOff( str2+6 )) ? 0 : 1 );
    }

    if ( (str2 = strstr( str1, "crt=" )) != NULL )
        return( (Crt = GetOnOff( str2+4 )) ? 0 : 1 );

    if ( (str2 = strstr( str1, "power=" )) != NULL )
        return( (DoHotEject = GetOnOff( str2+6 )) ? 0 : 1 );

    if ( _stricmp( str1, "status" ) == 0 ) {
        ShowStatus = TRUE;
        return 0;
    }

    if ( _stricmp( str1, "version" ) == 0 ) {
        ShowVersion = TRUE;
        return 0;
    }

    if ( _stricmp( str1, "help" ) == 0 ) {
        return 2;
    }

    if ( _stricmp( str1, "?" ) == 0 ) {
        return 2;
    }
```

```
    if ( _stricmp( str1, "u" ) == 0 ) {
        return 2;
    }
    return 1;
}

/*
```

```
*/
/******************************************************************************
 * GetOnOff( char *str ) - check the str for the word "on" or "off"
 *   return:   0 - invalid string
 *             1 - OFF
 *             2 - ON
 ******************************************************************************/
int GetOnOff(
    char *str
    )

{
    if ( _stricmp( (str), "on" ) == 0 )
        return ON;

    if ( _stricmp( (str), "off" ) == 0 )
        return OFF;

    return 0;
}

/*
```

```
*/
/*****************************************************************************
 * ShowUsage() - tell the user how to use the program
 *****************************************************************************/
void ShowUsage()

{
   cout << UsageStr;
   cout << HelpOpt;
   cout << CRTOnOpt;
   cout << CRTOffOpt;
   cout << EjectOpt;
//   cout << EjectOnOpt;
//   cout << EjectOffOpt;
    if ( HotEject ) {
        cout << PowerOnOpt;
        cout << PowerOffOpt;
    }
   cout << SmartOnOpt;
   cout << SmartOffOpt;
   cout << StatusOpt;
    cout << SuspendOpt;
   cout << VersionOpt;

    return;
}
```

```
/*
;==============================================================================
; Copyright Notice:    Copyright (C) 1990-93 Texas Instruments Incorporated.
;
; License Agreement:   The ideas, implementation, source listing, object
;                 code, and execute module is referrenced as PROGRAM.
;
;                 PROGRAM is protected under United States of America
;                 Copyright laws.  Use of this PROGRAM without
;                 expressed written approval by Texas Instruments is
;                 in violation of these laws.  Texas Instruments
;                 considers the ideas and expressions presented within
;                 this PROGRAM to be the sole property of Texas
;                 Instruments.
;
;                 Use of PROGRAM is granted to licensee under
;                 Texas Instruments Software License Agreement for
;                 use on Texas Instruments products ONLY.  Licensee
;                 is granted the right to use  PROGRAM and
;                 Texas Instruments reserves all rights to PROGRAM.
;
;                          ALL RIGHTS RESERVED
;
;==============================================================================
; Author:  Tom Leavitt
;==============================================================================
*/
#include <iostream.h>
#include "set_dock.h"
#include "strings.h"
#include "extern.h"

BYTE DockingStationType = 0;

main(
    int argc,
    char *argv[]
    )

{
   int set_exit = FALSE;

   switch ( GetSystemStatus() ) {
        case 0:              // no BATTERY.PRO loaded
        default:
            cout << InvStr;
            return -1;
            break;

        case 1:
            break;
  }

   if ( ParseArgs( argc, argv ) )
        return -1;

    if ( ShowVersion )
        cout << Version << TIString0 << TIString1;

    if ( Smart ) {
        SetSmart();
```

```
    }

    if ( Crt ) {
        SetCrt();
    }

    if ( HotEject && DoHotEject ) {
      SetHotEject();
    }

    if ( ShowStatus ) {
        ShowCurrentStatus();
    }

    if ( Eject ) {
        SetEject();
    }

    if ( DoEject ) {
        EjectUnit();
    }

    if ( DoSuspend ) {
//      cout << "Put unit into Auto-Standby mode...\n";
        SetSuspend();
    }

    return 0;
}

void SetSmart()

{
    cout << "SmartMode has been ";
    if ( Smart == ON ) {
        cout << "enabled";
        _asm {
            mov  ax,4604h
            mov  bh,0
            int 15h
        }
    } else {
        cout << "disabled";
        _asm {
            mov  ax,4604h
            mov  bh,01
            int 15h
        }
    }
    cout <<  " for the docking station.\n";
}

void SetCrt()

{

    cout << "The CRT/Modem connector will ";

    if ( Crt == OFF ) {
        cout << "be withdrawn";
        _asm {
```

```
            mov  ax,4604h       // call BATTERY.PRO and set VGA Motor control
ON
            mov  bx,0500h
            int  15h
        }
    } else {
        cout << "remain connected";
        _asm {
            mov  ax,4604h       // call BATTERY.PRO and set VGA Motor control
OFF
            mov  bx,0501h
            int  15h
        }
    }
    cout << " during Auto-Standby.\n";
}

void SetEject()

{

    cout << "The Eject switch has been ";

    if ( Eject == OFF ) {
        cout << "disabled.\n";
        _asm {
            mov  ax,4604h       // call BATTERY.PRO and set Eject OFF
            mov  bx,0304h
            int  15h
        }
    } else {
        cout << "enabled.\n";
        _asm {
            mov  ax,4604h       // call BATTERY.PRO and set Eject ON
            mov  bx,0305h
            int  15h
        }
    }
}

void EjectUnit()

{
    cout << "Ejecting unit...\n";

    _asm {
        mov  ax,4604h       // call BATTERY.PRO and eject the unit
        mov  bh,4
        int  15h
    }
}

void SetSuspend()

{
    _asm {
        mov  ax,4604h       // call BATTERY.PRO and eject the unit
        mov  bx,0601h
        mov  cx,0        // CH = Hours, CL = Minutes
                       // to stay in Suspend.
                       // 00 means forever
```

```
        int  15h
    }
}

void SetHotEject()

{
    if ( DoHotEject == ON ) {
        cout <<  "Leave the system power on ";
        _asm {
            mov  ax,4604h
            mov  bx,0302h
            int  15h
        }
    } else {
        cout <<  "Turn the system power off ";
        _asm {
            mov  ax,4604h
            mov  bx,0301h
            int  15h
        }
    }

    cout << "when the Eject switch is pressed.\n";
}

void ShowCurrentStatus()

{
   int currPower = OFF, currCRT = OFF, currSmart  = OFF, currEject = OFF;
    char CurrStatus = 0;

    _asm {
        mov  ax,4604h
        mov  bx,0381h
        int  15h
        mov  CurrStatus,-1
        cmp  ah,86h
        je   scs_done
        mov  CurrStatus,bl
    scs_done:
    }

    cout << "\nCurrent status of the TravelMate DeskTop:\n";

    if ( CurrStatus != -1 ) {

        currSmart = (CurrStatus & 0x80) ? ON : OFF;
        cout << "\tSmartMode   = " << ((currSmart == ON ) ? "On" : "Off") << '\n';

//      currEject = ((CurrStatus & 0x07) == 5) ? ON : OFF;
//      cout << "\tEject Switch= " << ((currEject == ON ) ? "On" : "Off") << '\n';

        if ( HotEject ) {
            currPower = ((CurrStatus & 0x30) == 0x20) ? ON : OFF;
            cout << "\tPower Eject = " << ((currPower == ON ) ? "On" : "Off") << '\n';
        }
        currCRT = ((CurrStatus & 0x08) == 0x08) ? ON : OFF;
        cout << "\tCRT Connect = " << ((currCRT == ON ) ? "On" : "Off") << '\n';
    } else {
        cout << "\tUnsupported option.\n";
```

```
    }
}

int GetSystemStatus()
/*
    return: 0 = invalid machine
            1 = valid machine
*/
{
    int RetVal = 0;                 // start with invalid machine

    _asm {
        mov  ax,4604h           // call BATTERY.PRO
        mov  bh,08h                 // test for docking station active
        int  15h
        cmp  ah,86h                 // is the docking station available?
        je   all_done           // nope, leave the entire program
        inc  RetVal                 // yep, can do all kinds of stuff

        mov  ax,4604h           // call BP again
        mov  bx,0380h           // see if hot-eject is enabled
        int  15h
        cmp  ah,86h                 // can I hot-eject?
        je   all_done           // nope, don't tell user about hot-eject

        mov  HotEject,1             // set the flag to allow it
    all_done:
    }

    return RetVal;
}
```

```
/*
 *
 * main.h - main include file for TPL C programs
 *
 */

#ifndef  FALSE
#define  FALSE   0
#define  TRUE    1
#endif

#define OFF          1
#define  ON          2

/*TYPE DEFINITIONS  */

typedef  unsigned int      WORD;
typedef  unsigned char      BYTE;

//
// Prototype Definitions
//
int ParseArgs(
    int ArgCnt,
    char *ArgStr[]
    );

int GetSwitch(
    char *ptr
    );

int GetOnOff(
    char *str
    );

void ShowUsage();

int GetSystemStatus();

void EjectUnit();
void SetSmart();
void SetCrt();
void SetHotEject();
void SetSuspend();
void SetEject();
void ShowCurrentStatus();
```

```
/*
;==============================================================================
; Copyright Notice:   Copyright (C) 1990-93 Texas Instruments Incorporated.
;
; License Agreement:   The ideas, implementation, source listing, object
;                code, and execute module is referrenced as PROGRAM.
;
;                PROGRAM is protected under United States of America
;                Copyright laws.  Use of this PROGRAM without
;                expressed written approval by Texas Instruments is
;                in violation of these laws.  Texas Instruments
;                considers the ideas and expressions presented within
;                this PROGRAM to be the sole property of Texas
;                Instruments.
;
;                Use of PROGRAM is granted to licensee under
;                Texas Instruments Software License Agreement for
;                use on Texas Instruments products ONLY.  Licensee
;                is granted the right to use  PROGRAM and
;                Texas Instruments reserves all rights to PROGRAM.
;
;                         ALL RIGHTS RESERVED
;
;==============================================================================
; Tom Leavitt
;==============================================================================
*/
#include "set_dock.h"

char Version[] = { "DOCK Version 1.01\n" };
// KDD 1/21/94 - Had to change SetSuspend to send the command to BatteryPro
//      to suspend forever instead of for 2 minutes.
char TIString0[] = { "(c) 1994 Texas Instruments Incorporated.  " };
char TIString1[] = { "ALL RIGHTS RESERVED.\n\n" };

#define  ENGLISH
#ifdef ENGLISH
//==============================================================================
char InvStr[]  = { "Invalid hardware/software detected.\n" };
char InvStrDS[]    = { "The Docking Station is not connected.\n" };
char InvStrBP[]    = { "This program requires the BATTERY.PRO device driver v7.0 or higher to be
loaded.\n"
};
char InvSwStr[]    = { "\nInvalid Switch:  /%s\n" };

char UsageStr[] = { "\nUsage:  DOCK [options]\n\nValid options:\n" };
char HelpOpt[]
   = { "\t(no arguments), ?, U, HELP - Display this message\n" };
char EjectOpt[]
   = { "\tEJECT     - Eject the unit from the desktop docking station.\n" };
char EjectOnOpt[]
   = { "\tEJECT=ON  - Enable the Eject switch.\n" };
char EjectOffOpt[]
   = { "\tEJECT=OFF - Disable the Eject switch.\n" };
char CRTOnOpt[]
   = { "\tCRT=ON    - Leave the CRT/Modem connector engaged during Auto-Standby.\n" };
char CRTOffOpt[]
   = { "\tCRT=OFF   - Disengage the CRT/Modem connector during Auto-Standby.\n" };
char PowerOnOpt[]
   = { "\tPOWER=ON  - Enable system eject with power on.\n" };
char PowerOffOpt[]
```

```
    = { "\tPOWER=OFF - Disable system eject with power on.\n" };
char SmartOnOpt[]
    = { "\tSMART=ON  - Enable SmartMode for the docking station.  This option is\n"
        "\t           required to allow the other options to function properly.\n" };
char SmartOffOpt[]
    = { "\tSMART=OFF - Disable SmartMode for the docking station.\n" };
char StatusOpt[]
    = { "\tSTATUS    - Dispaly the current status of the SmartMode options.\n" };
char SuspendOpt[]
    = { "\tSUSPEND   - Put the system in Auto-Standby mode immediately.\n" };
char VersionOpt[]
    = { "\tVERSION   - Display the version/copyright information.\n" };

//============================================================================
#else       // ENGLISH
 #ifdef GERMAN
//============================================================================
//============================================================================
 #else      // GERMAN
  #ifdef FRENCH
//============================================================================
//============================================================================
  #endif // FRENCH
 #endif     // GERMAN
#endif      // ENGLISH
```

```
/*
;==========================================================================
; Copyright Notice:   Copyright (C) 1990-93 Texas Instruments Incorporated.
;
; License Agreement:   The ideas, implementation, source listing, object
;                 code, and execute module is referrenced as PROGRAM.
;
;                 PROGRAM is protected under United States of America
;                 Copyright laws. Use of this PROGRAM without
;                 expressed written approval by Texas Instruments is
;                 in violation of these laws. Texas Instruments
;                 considers the ideas and expressions presented within
;                 this PROGRAM to be the sole property of Texas
;                 Instruments.
;
;                 Use of PROGRAM is granted to licensee under
;                 Texas Instruments Software License Agreement for
;                 use on Texas Instruments products ONLY. Licensee
;                 is granted the right to use PROGRAM and
;                 Texas Instruments reserves all rights to PROGRAM.
;
;                          ALL RIGHTS RESERVED
;
;==========================================================================
; Tom Leavitt
;==========================================================================
*/

extern char TIString0[];
extern char TIString1[];
extern char Version[];

extern char InvStr[];
extern char InvStrDS[];
extern char InvStrBP[];
extern char InvSwStr[];

extern char UsageStr[];
extern char HelpOpt[];
extern char CRTOnOpt[];
extern char CRTOffOpt[];
extern char EjectOpt[];
extern char EjectOnOpt[];
extern char EjectOffOpt[];
extern char SmartOnOpt[];
extern char SmartOffOpt[];
extern char StatusOpt[];
extern char SuspendOpt[];
extern char VersionOpt[];
extern char PowerOnOpt[];
extern char PowerOffOpt[];
```

```
/*
;==============================================================================
; Copyright Notice:   Copyright (C) 1990-93 Texas Instruments Incorporated.
;
; License Agreement:  The ideas, implementation, source listing, object
;                     code, and execute module is referrenced as PROGRAM.
;
;                     PROGRAM is protected under United States of America
;                     Copyright laws. Use of this PROGRAM without
;                     expressed written approval by Texas Instruments is
;                     in violation of these laws. Texas Instruments
;                     considers the ideas and expressions presented within
;                     this PROGRAM to be the sole property of Texas
;                     Instruments.
;
;                     Use of PROGRAM is granted to licensee under
;                     Texas Instruments Software License Agreement for
;                     use on Texas Instruments products ONLY. Licensee
;                     is granted the right to use PROGRAM and
;                     Texas Instruments reserves all rights to PROGRAM.
;
;                               ALL RIGHTS RESERVED
;
;==============================================================================
; Tom Leavitt
;==============================================================================
*/
#include "set_dock.h"

char Version[] = { "DOCK Version 1.01\n" };
// KDD 1/21/94 - Had to change SetSuspend to send the command to BatteryPro
//      to suspend forever instead of for 2 minutes.
char TIString0[] = { "(c) 1994 Texas Instruments Incorporated.  " };
char TIString1[] = { "ALL RIGHTS RESERVED.\n\n" };

#define  ENGLISH
#ifdef ENGLISH
//=============================================================================
char InvStr[]  = { "Invalid hardware/software detected.\n" };
char InvStrDS[]    = { "The Docking Station is not connected.\n" };
char InvStrBP[]    = { "This program requires the BATTERY.PRO device driver v7.0 or higher to be
loaded.\n"
};
char InvSwStr[]    = { "\nInvalid Switch:  /%s\n" };

char UsageStr[] = { "\nUsage:  DOCK [options]\n\nValid options:\n" };
char HelpOpt[]
   = { "\t(no arguments), ?, U, HELP - Display this message\n" };
char EjectOpt[]
   = { "\tEJECT     - Eject the unit from the desktop docking station.\n" };
char EjectOnOpt[]
   = { "\tEJECT=ON  - Enable the Eject switch.\n" };
char EjectOffOpt[]
   = { "\tEJECT=OFF - Disable the Eject switch.\n" };
char CRTOnOpt[]
   = { "\tCRT=ON    - Leave the CRT/Modem connector engaged during Auto-Standby.\n" };
char CRTOffOpt[]
   = { "\tCRT=OFF   - Disengage the CRT/Modem connector during Auto-Standby.\n" };
char PowerOnOpt[]
   = { "\tPOWER=ON  - Enable system eject with power on.\n" };
char PowerOffOpt[]
```

```
   = { "\tPOWER=OFF - Disable system eject with power on.\n" };
char SmartOnOpt[]
   = { "\tSMART=ON  - Enable SmartMode for the docking station.  This option is\n"
       "\t           required to allow the other options to function properly.\n" };
char SmartOffOpt[]
   = { "\tSMART=OFF - Disable SmartMode for the docking station.\n" };
char StatusOpt[]
   = { "\tSTATUS    - Dispaly the current status of the SmartMode options.\n" };
char SuspendOpt[]
   = { "\tSUSPEND   - Put the system in Auto-Standby mode immediately.\n" };
char VersionOpt[]
   = { "\tVERSION   - Display the version/copyright information.\n" };

//==========================================================================
#else        // ENGLISH
 #ifdef GERMAN
//==========================================================================
//==========================================================================
 #else       // GERMAN
  #ifdef FRENCH
//==========================================================================
//==========================================================================
  #endif // FRENCH
 #endif      // GERMAN
#endif       // ENGLISH
```

```
//________________________________________________________________
//                                                  |
// (c) Copyright, Texas Instruments Incorporated, 1993.  All Rights   |
// Reserved.  Property of Texas Instruments Incorporated.  Restricted  |
// Rights -- Use, duplication or disclosure subject to restrictions set  |
// forth in TI's Program License Agreement and associated documentation. |
//________________________________________________________________|
//
// $Workfile:   SHTDWN2.H  $
// $Revision:   1.11  $
//     $Date:   21 Sep 1993 16:43:04  $
//    Author:   Robert Tonsing
//      Site:   Temple
//  Language:   C++
//
//=====================================================================

#include "helpids.h"
#include "version.h"

#define DDEAPPMAX       200     // Max number of DDE apps

const char cszProgramName[]     = "Super Shutdown";
const char cszStayOnTop[]       = "StayOnTop";
const char cszSmartDock[]       = "SmartDock";
const char cszDosAutoClose[]    = "DosAutoClose";
const char cszWinAutoClose[]    = "WinAutoClose";
const char cszWinFileClose[]    = "WinFileClose";
const char cszUseDsIcon[]       = "UseDsIcon";
const char cszTimerSection[]    = "Change Cursor";
const char cszTimerKey[]        = "Scheduling";
const char cszPosition[]        = "Position";
const char cszSavePosition[]    = "SavePosition";
const char cszAppName[]         = "AppName";
const char cszAppType[]         = "AppType";
const char cszDDEString[]       = "DDEString";
const char cszKeyString[]       = "KeyString";
const char cszLoopOnCmd[]       = "LoopOnCmd";
const char cszComma[]           = ",";
const char cszDefault[]         = "Default (checked)";
const char cszExitToDOS[]       = "Exit Windows";
const char cszExitAndEject[]    = "Exit Windows and Eject";
const char cszEjectHot[]        = "Exit Windows and Eject Hot";
const char cszEject[]           = "Eject";
const char cszExitAndSuspend[]  = "Exit and Shutdown DeskTop";
const char cszSuspend[]         = "Suspend DeskTop, Manual Resume";
const char cszSuspendInstantOn[] = "Suspend DeskTop";
const char cszRestartWindows[]  = "Restart Windows";
const char cszRebootSystem[]    = "Reboot System";
const char cszUsePassword[]     = "UsePassword";
const char cszPassword[]        = "Password";
const char cszDisableSwitch[]   = "DisableSwitch";
const char cszDisableCRT[]      = "DisableCRT";
const char cszAppInfoFmt[]      = "AppInfo%d";
const char cszDSExitType[]      = "DSExitType";
const char cszEpaEnergyStar[]   = "EPA Energy Star";
const char cszEpaEnable[]       = "EpaEnable";
const char cszManualResume[]    = "ManualResume";
const char cszWeekends[]        = "Weekends";
const char cszInstantOn[]       = "InstantOn";
const char cszConfirmDelay[]    = "ConfirmDelay";
```

```
const char cszShutdownStart[]  = "ShutdownStart";
const char cszShutdownEnd[]    = "ShutdownEnd";
const char cszModuleName[]     = "Module Name:";
const char cszWindowTitle[]    = "Window Title:";
const char cszIntl[]           = "intl";
const char cszTestData[]       = "Test Data";
const char cszVersion[]        = "Version";

const char DosBoxMsg[] =
   "Terminating a DOS BOX program may cause system resources to be left "
   "unfreed.\r\nDo you wish to terminate the program anyway?";
const char DosAutoCloseMsg[] =
   "Terminating DOS programs may cause system resources to be left "
   "unfreed.\r\nDo you wish to enable this anyway?";

/////////////////////////////////////////////////////////////////////////////
// CTheApp

class CTheApp : public CRfxApp
{
private:
   void InitIniFile();
   void KillTasks();

public:
   BOOL fTestVersion;

   CTheApp( PCSTR pcszAppTitle )
      : CRfxApp( pcszAppTitle ), fTestVersion( FALSE ) {}
   BOOL InitInstance();
   void DoExit( DWORD dwExitCode = 0L );
};

extern CTheApp theApp; // application object
```

```
//______________________________________________________________
//                                              |
// (c) Copyright, Texas Instruments Incorporated, 1993.  All Rights    |
// Reserved.   Property of Texas Instruments Incorporated.  Restricted  |
// Rights -- Use, duplication or disclosure subject to restrictions set  |
// forth in TI's Program License Agreement and associated documentation. |
//______________________________________________________________|
//
// $Workfile:  SHTDWN2.CPP  $
//    Author:  Robert Tonsing
//      Site:  Temple
//  Language:  C++
//
//===================================================================

#include "rfx.h"
#include "shtdwn2.h"
#include "mainwnd.h"
#include "resource.h"
#include "cfgdlg.h"
#include "notebook.h"
#include "cddeclnt.h"
#include "sendkeys.h"
#include "appinfo.h"

#ifdef TESTING
  #define TerminateApp(a,b)
  #define ExitWindows(a,b)
#endif

extern "C" BOOL FAR PASCAL IsWinOldApTask( HTASK );
BOOL WINAPI KeyCloseFiles( HWND hWnd, LPARAM lparam );
BOOL WINAPI KillDosTasks( HWND hWnd, LPARAM fDosAutoClose );
BOOL WINAPI KillWinTasks( HWND hWnd, LPARAM lparam );
void DdeCloseFiles( const char* szModule );

CTheApp theApp( cszProgramName ); // application object

//=========================================================================
BOOL CTheApp::InitInstance()
{
   if ( !CRfxApp::InitInstance() )
      return FALSE;

   _fstrlwr( m_lpCmdLine );
   if ( _fstrstr( m_lpCmdLine, "/q" ) )
      fTestVersion = TRUE;

   InitIniFile();

   m_pMainWnd = new CMainWindow;

   return TRUE;
}

//-------------------------------------------------------------------------
void CTheApp::DoExit( DWORD dwExitCode )
{
   if ( fTestVersion )
   {
      WriteProfileString( cszTestData, NULL, (LPCSTR) NULL );
```

```
//   WriteProfileString( cszTestData, cszVersion, szVerName );
     WriteProfileInt( cszTestData, "Exit", 0 );
   }

   // Save files firstnext
   if ( GetProfileBool( AfxGetAppName(), cszWinFileClose ) )
      EnumWindows( (WNDENUMPROC) KeyCloseFiles, 0L );

   // Kill DOS apps next
   if ( !EnumWindows( (WNDENUMPROC) KillDosTasks,
         GetProfileBool( AfxGetAppName(), cszDosAutoClose ) ) )
      return;

   // Auto close Win apps?
   if ( GetProfileBool( AfxGetAppName(), cszWinAutoClose ) )
   {
      EnumWindows( (WNDENUMPROC) KillWinTasks, 0L );
      KillTasks();
   }

   if ( fTestVersion )
      WriteProfileInt( cszTestData, "Exit", 1 );

   ExitWindows( dwExitCode, 0 );      // Now kill Progman
}

//---------------------------------------------------------------------------
// For new installation, set up defaults
//
void CTheApp::InitIniFile()
{
   CString csVersion( GetProfileString( AfxGetAppName(), cszVersion ) );
   // Update version in any case
   WriteProfileString( AfxGetAppName(), cszVersion, szVerName );
   if ( csVersion.IsEmpty() )
   {
      char szAppEntry[16];

      // Add application save info
      for ( int i = 0; i < APPARRAYMAX; i++ )
      {
         sprintf( szAppEntry, cszAppInfoFmt, i );
         WriteProfileString( AfxGetAppName(), szAppEntry,
               AppArray[i].cszWinTitle );
         WriteProfileString( AppArray[i].cszWinTitle, cszKeyString,
               AppArray[i].cszKeyString );
         WriteProfileString( AppArray[i].cszWinTitle, cszAppName,
               AppArray[i].cszDdeName );
         WriteProfileString( AppArray[i].cszWinTitle, cszDDEString,
               AppArray[i].cszDdeCmd );
         WriteProfileBool( AppArray[i].cszWinTitle, cszLoopOnCmd,
               AppArray[i].fLoop );
      }
      WriteProfileBool( AfxGetAppName(), cszSmartDock, TRUE );
      WriteProfileBool( AfxGetAppName(), cszDisableSwitch, TRUE );
   }
}

//---------------------------------------------------------------------------
void CTheApp::KillTasks()
{
```

```
    static int nCount = 0;
    char szBuffer[16];
    CPtrList TaskList;
    CTaskInfo taskinfo;

    for ( BOOL fResult = TaskFirst( &taskinfo ); fResult;
          fResult = TaskNext( &taskinfo ) )
    {
        CTaskInfo* pTaskInfo = new CTaskInfo;
        *pTaskInfo = taskinfo;
        TaskList.AddTail( pTaskInfo );
    }

    // Now process list
    while ( !TaskList.IsEmpty() )
    {
        CTaskInfo* pTaskInfo = (CTaskInfo*) TaskList.RemoveHead();
        if ( fTestVersion )
        {
            sprintf( szBuffer, "Task%d", nCount++ );
            WriteProfileString( cszTestData, szBuffer, pTaskInfo->szModule );
        }
        // If task is in kill list, terminate it
        for ( int nIndex = 0; nIndex < NUMKILLTASKS; nIndex++ )
            if ( _stricmp( pTaskInfo->szModule, KillTaskList[nIndex] ) == 0 )
            {
                if ( fTestVersion )
                {
                    sprintf( szBuffer, "KillTask%d", nCount );
                    WriteProfileString( cszTestData, szBuffer, pTaskInfo->szModule );
                }
                TerminateApp( pTaskInfo->hTask, NO_UAE_BOX ); // Kill it!!
            }
        delete pTaskInfo;
        //delete (HTASK*) phTask;
    }
}

//==========================================================================
BOOL WINAPI KillDosTasks( HWND hWnd, LPARAM fDosAutoClose )
{
    CWnd* pWnd = CWnd::FromHandle( hWnd );
    // Window must not be owned, and must be visible
    if ( pWnd->GetWindow( GW_OWNER ) == 0 && pWnd->IsWindowVisible() )
    {
        HTASK hTask = GetWindowTask( hWnd );
        if ( IsWinOldApTask( hTask ) ) // Is it a DOS app?
        {
            CString csWndTitle;
            pWnd->GetWindowText( csWndTitle );
            TRACE( "Killing DOS app %s\n", csWndTitle );
            if ( theApp.fTestVersion )
            {
                static int nCount = 0;
                char szBuffer[16];
                sprintf( szBuffer, "DOSApp%d", nCount++ );
                theApp.WriteProfileString( cszTestData, szBuffer, csWndTitle );
            }
            if ( !fDosAutoClose )      // Auto close flag set?
            {
                pWnd->BringWindowToTop();
```

```
            // Prompt user
            if ( MessageBox( 0, DosBoxMsg, csWndTitle,
                  MB_YESNO | MB_ICONQUESTION ) == IDNO )
                return FALSE;       // Abort process
        }
        //pWnd->SendMessage( WM_ENDSESSION, TRUE );
        //pWnd->DestroyWindow();
        TerminateApp( hTask, NO_UAE_BOX ); // Kill it!!
    }
  }
  return TRUE;
}

//==========================================================================
BOOL WINAPI KillWinTasks( HWND hWnd, LPARAM lParam )
{
  CTaskInfo taskinfo;
  HTASK hTask;
  static HTASK hLastTask = NULL;
  CWnd* pWnd = CWnd::FromHandle( hWnd );

  // Window must not be owned, and must be visible
  if ( pWnd->GetWindow( GW_OWNER ) == 0 && pWnd->IsWindowVisible() )
  {
    hTask = GetWindowTask( hWnd );
    BOOL fTest = TaskFindHandle( &taskinfo, hTask );

    if ( _stricmp( taskinfo.szModule, "PROGMAN" ) != 0   // Is it Prog Mgr?
         // Is it me?
         && _stricmp( taskinfo.szModule, "SHUTDOWN" ) != 0
         // Don't kill DropNGo - special case
         && _stricmp( taskinfo.szModule, "DROPNGO" ) != 0
         // Don't kill Norton Antivirus - special case
         && _stricmp( taskinfo.szModule, "NAVTSRW" ) != 0
#ifdef _DEBUG
         && _stricmp( taskinfo.szModule, "MSVC" ) != 0   // Is it me?
#endif
         && hTask != hLastTask )              // Already killed?
    {
      TRACE( "Killing Win app %s\n", taskinfo.szModule );
      if ( theApp.fTestVersion )
      {
        static int nCount = 0;
        char szBuffer[16];
        sprintf( szBuffer, "WinApp%d", nCount++ );
        theApp.WriteProfileString( cszTestData, szBuffer, taskinfo.szModule );
      }
//        char szMsg[128];
//        sprintf( szMsg, "Kill %s? result: %d, handle: %lx", taskinfo.szModule, fTest, hTask );
//        if ( AfxMessageBox( szMsg, MB_YESNO ) == IDYES )
//        {
//        AfxMessageBox( taskinfo.szModule );
      pWnd->SendMessage( WM_ENDSESSION, TRUE );
      hLastTask = hTask;
      TerminateApp( hTask, NO_UAE_BOX ); // Kill it!!
//        }
    }
  }
  return TRUE;
}
```

```
//=============================================================================
BOOL WINAPI KeyCloseFiles( HWND hWnd, LPARAM lparam )
{
   CWnd* pWnd = CWnd::FromHandle( hWnd );

   // Window must not be owned, and must be visible
   if ( pWnd->GetWindow( GW_OWNER ) == 0 && pWnd->IsWindowVisible() )
   {
      // Kluge - don't do Drop N' Go
      CTaskInfo taskinfo;
      HTASK hTask = GetWindowTask( hWnd );
      BOOL fTest = TaskFindHandle( &taskinfo, hTask );
      if ( _stricmp( taskinfo.szModule, "DROPNGO" ) == 0 )
         return TRUE;

      CString csWndTitle;
      pWnd->GetWindowText( csWndTitle );
      // Try for exact match 1st
      int nAppType = theApp.GetProfileInt( csWndTitle, cszLoopOnCmd, -1 );
      if ( nAppType == -1 )
      {
         // Try truncating " - filename"
         int nNewLength = csWndTitle.Find( " -" );
         if ( nNewLength != -1 )
         {
            csWndTitle = csWndTitle.Left( nNewLength );
            nAppType = theApp.GetProfileInt( csWndTitle, cszLoopOnCmd, -1 );
         }
      }
      if ( nAppType != -1 )
      {
         CString csSaveString( theApp.GetProfileString( csWndTitle,
               cszKeyString ) );
         if ( !csSaveString.IsEmpty() )
         {
            pWnd->SetActiveWindow();
#ifdef _DEBUG
            SENDKEYSERR result =
#endif
               SendKeys( csSaveString );
         }
         csSaveString = theApp.GetProfileString( csWndTitle, cszDDEString );
         if ( !csSaveString.IsEmpty() )
            DdeCloseFiles( csWndTitle );
      }
   }
   return TRUE;
}

//=============================================================================
void DdeCloseFiles( const char* szModule )
{
#ifdef _DEBUG
   char szBuffer[256];
#endif

   // Get app dde name
   CString csAppText( theApp.GetProfileString( szModule, cszAppName ) );
   if ( csAppText.IsEmpty() )
      return;
```

```
   TRACE( "Attempting DDE connect to %s\n", szModule );

   // Make connection
   CDDEClient ddeClient;
   if ( !ddeClient.Connect( csAppText, "system" ) )
   {
#ifdef _DEBUG
      sprintf( szBuffer, "Connect failed: %s", szModule );
      AfxMessageBox( szBuffer );
#endif
      return;
   }

#ifdef _DEBUG
   sprintf( szBuffer, "Connect succeeded: %s", szModule );
   AfxMessageBox( szBuffer );
   // Try getting list of files
   DWORD nData = ddeClient.DdeClientRequest( "topics", szBuffer, sizeof( szBuffer ) );
   if ( !nData )
      AfxMessageBox( "Topics request failed" );
   else
   {
      AfxMessageBox( szBuffer );
   }
   // Try getting count
#endif

   HDDEDATA nResult;
   char szAction[128];
   strcpy( szAction, theApp.GetProfileString( szModule, cszDDEString ) );
   int nLoopOnCmd = theApp.GetProfileBool( szModule, cszLoopOnCmd );
   do
   {
   } while ( ( nResult = ddeClient.DdeClientExecute( szAction ) ) && nLoopOnCmd );
#ifdef _DEBUG
   sprintf( szBuffer, "Last result: %s", nResult ? "PASS" : "FAIL" );
   AfxMessageBox( szBuffer );
#endif

   ddeClient.Disconnect();
}
```

```
//____________________________________________________________
//                                         |
// (c) Copyright, Texas Instruments Incorporated, 1993. All Rights     |
// Reserved. Property of Texas Instruments Incorporated. Restricted    |
// Rights -- Use, duplication or disclosure subject to restrictions set  |
// forth in TI's Program License Agreement and associated documentation. |
//____________________________________________________________|
//
// $Workfile: MainWnd.h $
//    Author: Robert Tonsing
//      Site: Temple
//  Language: C++
//
//=====================================================================

/////////////////////////////////////////////////////////////////////
// CMainWindow

class CMainWindow : public CRfxFrameWnd
{
private:
    BOOL m_fSmartDock;
    HICON m_hIcon;              // Icon handle
    BOOL m_fEpaEnabled;
    UINT m_uStartTime;
    UINT m_uEndTime;
    UINT m_uTimerID;
    class CShutdownMsg* ShutdownDlg;

    void SetSmartMode( BOOL fOn );
    void SetEpaMode( BOOL fOn );
    void DoSuspend( BOOL fInstantOn );

public:
    CMainWindow();
    ~CMainWindow();

    // Message handlers:
    afx_msg void OnOptions();
    afx_msg void OnSchedule();
    afx_msg void OnSysCommand( UINT, LONG );
    afx_msg BOOL OnQueryOpen()
        { return ( FALSE ); }
    afx_msg HCURSOR OnQueryDragIcon()
        { return m_hIcon; }
    afx_msg BOOL OnEraseBkgnd( CDC* pDC )
        { return IsIconic() ? TRUE : CFrameWnd::OnEraseBkgnd( pDC ); }
    afx_msg void OnPaint();
    afx_msg LONG OnShutdownDlg( UINT nID, LONG lParam );
    //{{AFX_MSG(CMainWindow)
    afx_msg void OnSysColorChange() { Ctl3dColorChange(); }
    afx_msg void OnTimer( UINT nIDEvent );
    //}}AFX_MSG

    DECLARE_MESSAGE_MAP()
};
```

```
//_______________________________________________________________
//                                                              |
// (c) Copyright, Texas Instruments Incorporated, 1993.  All Rights     |
// Reserved.   Property of Texas Instruments Incorporated.  Restricted   |
// Rights -- Use, duplication or disclosure subject to restrictions set  |
// forth in TI's Program License Agreement and associated documentation. |
//_______________________________________________________________|
```

```
//
// $Workfile:  MainWnd.CPP  $
//    Author:  Robert Tonsing
//      Site:  Temple
//  Language:  C++
//
//=====================================================================

#include "rfx.h"
#include "shtdwn2.h"
#include "mainwnd.h"
#include "resource.h"
#include "cfgdlg.h"
#include "notebook.h"

#define SHUTDOWNTIMER   500

BEGIN_MESSAGE_MAP(CMainWindow, CFrameWnd)
   ON_MESSAGE( WM_USER, OnShutdownDlg )
   ON_WM_SYSCOMMAND()
   ON_WM_QUERYOPEN()
   ON_WM_QUERYDRAGICON()
   ON_WM_ERASEBKGND()
   ON_WM_PAINT()
   //{{AFX_MSG_MAP(CMainWindow)
   ON_WM_SYSCOLORCHANGE()
   ON_WM_TIMER()
   //}}AFX_MSG_MAP
END_MESSAGE_MAP()

/////////////////////////////////////////////////////////////////////////////

CMainWindow::CMainWindow()
   : m_uTimerID( 0 ), ShutdownDlg( NULL ), m_uEndTime( 0 ), m_uStartTime( 0 ),
   m_fEpaEnabled( FALSE )
{
   WNDCLASS wc;

   memset( &wc, 0, sizeof( WNDCLASS ) );  // start with NULL defaults
   wc.style = CS_DBLCLKS | CS_HREDRAW | CS_VREDRAW;
   wc.lpfnWndProc = AfxWndProc;
   wc.hInstance = AfxGetInstanceHandle();
   wc.hCursor = LoadCursor( NULL, IDC_ARROW );
   wc.lpszClassName = "ShutdownWClass";

   RegisterClass( &wc );

   // Create window
   VERIFY( Create( "ShutdownWClass", theApp.GetAppTitle(),
         WS_OVERLAPPEDWINDOW | WS_MINIMIZE ) );

   CMenu* SysMenu = GetSystemMenu( FALSE );
   SysMenu->DeleteMenu( SC_RESTORE, MF_BYCOMMAND );
   SysMenu->DeleteMenu( SC_SIZE, MF_BYCOMMAND );
```

```
    SysMenu->DeleteMenu( SC_MINIMIZE, MF_BYCOMMAND );
    SysMenu->DeleteMenu( SC_MAXIMIZE, MF_BYCOMMAND );

    // the following are inserted in reverse order at top:
    SysMenu->InsertMenu( 0, MF_BYPOSITION | MF_SEPARATOR );
    SysMenu->InsertMenu( 0, MF_BYPOSITION | MF_ENABLED, IDM_REBOOT,
         cszRebootSystem );
    SysMenu->InsertMenu( 0, MF_BYPOSITION | MF_ENABLED, IDM_RESTART,
         cszRestartWindows );
    if ( TiNb.In_DuckTop() )
       SysMenu->InsertMenu( 0, MF_BYPOSITION | MF_ENABLED, IDM_HARDEJECT,
            cszExitAndEject );
    SysMenu->InsertMenu( 0, MF_BYPOSITION | MF_ENABLED, SC_RESTORE,
         cszExitToDOS );
    //-------------------

    // Now add to the bottom
    SysMenu->AppendMenu( MF_SEPARATOR );
    SysMenu->AppendMenu( MF_STRING | MF_ENABLED, IDM_OPTIONS,
       "Options..." );
    SysMenu->AppendMenu( MF_STRING | MF_ENABLED, IDM_ABOUT,
       "About Shutdown..." );
    SysMenu->AppendMenu( MF_STRING | MF_ENABLED, IDM_HELP,
       "Help..." );

    // Get icon
    {
       int nIcon = AFX_IDI_STD_FRAME;
       if ( TiNb.In_MicroDuck() )
          nIcon = IDI_MICRODUCK;
       else if ( TiNb.Is_Paintbrush() )
          nIcon = IDI_PAINTBRUSH;
       m_hIcon = theApp.LoadIcon( nIcon );
    }

    if ( TiNb.In_DuckTop() )
    {
       // Use smart docking?
       BOOL fSmartMode = theApp.GetProfileBool( AfxGetAppName(), cszSmartDock );
       SetSmartMode( fSmartMode );
#if 0
       if ( fSmartMode )
          if ( TiNb.SetSmartMode() )
          {
             TiNb.EnableEjectKey( !theApp.GetProfileBool( AfxGetAppName(),
                   cszDisableSwitch ) );
             TiNb.EnableCrt( theApp.GetProfileBool( AfxGetAppName(),
                   cszDisableCRT ) );
             // Set timer stuff
             m_fEpaEnabled = theApp.GetProfileBool( cszEpaEnergyStar,
                   cszEpaEnable );
             m_uStartTime = theApp.GetProfileInt( cszEpaEnergyStar,
                   cszShutdownStart, 1080 );
             m_uEndTime = theApp.GetProfileInt( cszEpaEnergyStar,
                   cszShutdownEnd, 420 );
             m_uTimerID = SetTimer( 0x7469, SHUTDOWNTIMER, NULL );
          }
#endif
    }

    // Set Topmost state
```

```
    SetTopmost( theApp.GetProfileBool( AfxGetAppName(), cszStayOnTop ) );

    // get saved placement info and set placement
    SetWindowPlacement( theApp.GetProfilePoint( AfxGetAppName(),
          cszPosition ) );

    ShowWindow( SW_SHOWMINNOACTIVE );
    UpdateWindow();
}

//---------------------------------------------------------------------------
void CMainWindow::SetSmartMode( BOOL fOn )
{
    CMenu* SysMenu = GetSystemMenu( FALSE );
    if ( fOn )
    {
        if ( !TiNb.SetSmartMode() )
            return;
        // Reset icon
        DestroyIcon( m_hIcon );
        m_hIcon = theApp.LoadIcon( IDI_DESKTOP );
        // Check & rearrange menu
        SysMenu->DeleteMenu( SC_RESTORE, MF_BYCOMMAND );
        SysMenu->InsertMenu( 0, MF_BYPOSITION | MF_ENABLED,
              IDM_EXIT, cszExitToDOS );
        SysMenu->InsertMenu( 0, MF_BYPOSITION | MF_ENABLED,
              SC_RESTORE, cszDefault );
        if ( TiNb.GetSuspendSupport() )
            SysMenu->InsertMenu( 3, MF_BYPOSITION | MF_ENABLED,
                  IDM_INSTANTON, cszSuspendInstantOn );
        SysMenu->InsertMenu( 3, MF_BYPOSITION | MF_ENABLED,
              IDM_EXITSUSPEND, cszExitAndSuspend );
        SysMenu->CheckMenuItem( theApp.GetProfileInt( AfxGetAppName(),
              cszDSExitType, 0 ) + 1,MF_BYPOSITION | MF_CHECKED );

        TiNb.EnableEjectKey( !theApp.GetProfileBool( AfxGetAppName(),
              cszDisableSwitch ) );
        TiNb.EnableCrt( theApp.GetProfileBool( AfxGetAppName(),
              cszDisableCRT ) );
    }
    else
    {
        TiNb.CancelSmartMode();
        // Reset icon
        DestroyIcon( m_hIcon );
        m_hIcon = theApp.LoadIcon( AFX_IDI_STD_FRAME );
        // Uncheck & rearrange menu
        SysMenu->CheckMenuItem( theApp.GetProfileInt( AfxGetAppName(),
              cszDSExitType, 0 ) + 1,MF_BYPOSITION | MF_UNCHECKED );
        SysMenu->DeleteMenu( SC_RESTORE, MF_BYCOMMAND );
        SysMenu->DeleteMenu( IDM_EXIT, MF_BYCOMMAND );
        SysMenu->DeleteMenu( IDM_EXITSUSPEND, MF_BYCOMMAND );
        SysMenu->DeleteMenu( IDM_SUSPEND, MF_BYCOMMAND );
        SysMenu->DeleteMenu( IDM_INSTANTON, MF_BYCOMMAND );
        SysMenu->InsertMenu( 0, MF_BYPOSITION | MF_ENABLED,
              SC_RESTORE, cszExitToDOS );
    }

    Invalidate();       // Force icon repaint

    SetEpaMode( fOn );
```

```
}

//---------------------------------------------------------------------------
void CMainWindow::SetEpaMode( BOOL fOn )
{
    m_fEpaEnabled = FALSE;      // Default to off

    if ( fOn )                  // Smart docking on?
    {
        if ( theApp.GetProfileBool( cszEpaEnergyStar, cszEpaEnable ) )
        {
            m_fEpaEnabled = TRUE;
            // Reset timer stuff
            m_uStartTime = theApp.GetProfileInt( cszEpaEnergyStar,
                    cszShutdownStart, 1080 );
            m_uEndTime = theApp.GetProfileInt( cszEpaEnergyStar,
                    cszShutdownEnd, 420 );
        }

        // Currently, timer always runs when Smart mode is on.
        if ( !m_uTimerID )
            m_uTimerID = SetTimer( 0x7469, SHUTDOWNTIMER, NULL );
    }
    else
    {
        // Kill timer
        if ( m_uTimerID )
        {
            KillTimer( m_uTimerID );
            m_uTimerID = 0;
        }
    }
}

//---------------------------------------------------------------------------
CMainWindow::~CMainWindow()
{
    if ( m_uTimerID )
        KillTimer( m_uTimerID );
}

//---------------------------------------------------------------------------
// OnSysCommand:
// Handle system menu commands. Called by message map.
//
void CMainWindow::OnSysCommand( UINT nID, LONG lParam )
{
    switch ( nID )
    {
        case SC_RESTORE:
            if ( TiNb.In_DuckTop() )
            {
                switch ( theApp.GetProfileInt( AfxGetAppName(), cszDSExitType,
                        0 ) )
                {
                    default:
                    case 0:
                        nID = IDM_EXIT;
                        break;
                    case 1:
                        nID = IDM_HARDEJECT;
```

```
            break;
        case 2:
            nID = IDM_EXITSUSPEND;
            break;
        case 3:
            nID = IDM_INSTANTON;
            break;
        case 4:
            nID = IDM_SOFTEJECT;
            break;
        case 5:
            nID = IDM_EJECT;
             break;
        }
        OnSysCommand( nID, lParam );
        break;
    }
    // if not in Ducktop, fall thru to normal exit

case IDM_EXIT:
    TiNb.SetNoEject();
    // Turn off smart docking
    TiNb.CancelSmartMode();
    theApp.DoExit();
    break;

case IDM_SUSPEND:
    DoSuspend( theApp.GetProfileBool( cszEpaEnergyStar,
            cszInstantOn ) );
    break;

case IDM_EXITSUSPEND:
    if ( theApp.GetProfileBool( cszEpaEnergyStar, cszEpaEnable ) )
    {
        if ( theApp.GetProfileBool( cszEpaEnergyStar,
                cszInstantOn ) )
            if ( AfxMessageBox( "Resume will be without Instant On",
                    MB_OKCANCEL ) == IDCANCEL )
                break;
        DoSuspend( FALSE );
    }
    else
    {
        TiNb.SetSmartMode();          // Turn on SmartMode
        TiNb.CancelAutoShutdown();    // Clear interval timer
        TiNb.SetPowerDown();          // Set powerdown mode
    }
    theApp.DoExit();
    break;

case IDM_HARDEJECT:
    TiNb.SetHardEject();
    theApp.DoExit();
    break;

case IDM_SOFTEJECT:
    TiNb.SetSoftEject();
    theApp.DoExit();
    break;

case IDM_EJECT:
```

```
        TiNb.SetSoftEject();
//          TiNb.DoEject();
//          m_fInDuckTop = FALSE;
        theApp.DoExit( EW_RESTARTWINDOWS );
        break;

    case IDM_INSTANTON:
        DoSuspend( TRUE );
        break;

    case IDM_RESTART:
        TiNb.SetNoEject();
        TiNb.CancelSmartMode();        // Turn off smart docking
        theApp.DoExit( EW_RESTARTWINDOWS );
        break;

    case IDM_REBOOT:
        TiNb.SetNoEject();
        TiNb.CancelSmartMode();        // Turn off smart docking
        theApp.DoExit( EW_REBOOTSYSTEM );
        break;

    case SC_CLOSE:
        TiNb.CancelSmartMode();        // Turn off smart docking
        CWnd::OnSysCommand( nID, lParam );
        break;

    case IDM_OPTIONS:
        OnOptions();
        break;

    case IDM_ABOUT:
        {
            CAboutDlg about( this );
            about.DoModal();
        }
        break;

    case IDM_HELP:
        theApp.WinHelp( 0, HELP_INDEX );
        break;

    default:
        CWnd::OnSysCommand( nID, lParam );
        break;
    }
}

//-----------------------------------------------------------------------------
void CMainWindow::OnPaint()
{
    // If icon, draw button, then draw icon
    if ( IsIconic() )
    {
        CPaintDC dc( this );   // device context for painting
        SendMessage( WM_ICONERASEBKGND, (WORD) dc.m_ps.hdc );
        dc.DrawIcon( 2, 2, m_hIcon );
    }
    else    // Should never happen, but just in case...
        Default();
```

```
    // Do not call CFrameWnd::OnPaint() for painting messages
}

//---------------------------------------------------------------------------
void CMainWindow::OnOptions()
{
    CConfigDlg config;

    // Get profile values
    BOOL fStayOnTop = config.m_fStayOnTop
          = theApp.GetProfileBool( AfxGetAppName(), cszStayOnTop );
    BOOL fSmartDock = config.m_fSmartDock
          = theApp.GetProfileBool( AfxGetAppName(), cszSmartDock );
    BOOL fDosAutoClose = config.m_fDosAutoClose
          = theApp.GetProfileBool( AfxGetAppName(), cszDosAutoClose );
    config.m_fWinAutoClose
          = theApp.GetProfileBool( AfxGetAppName(), cszWinAutoClose );
    config.m_fWinFileClose
          = theApp.GetProfileBool( AfxGetAppName(), cszWinFileClose );
    BOOL fUsePassword = config.m_fUsePassword
          = theApp.GetProfileBool( AfxGetAppName(), cszUsePassword );
    BOOL fDisableEject = config.m_fDisableEject
          = theApp.GetProfileBool( AfxGetAppName(), cszDisableSwitch );
    BOOL fDisableCrt = config.m_fDisableCrt
          = theApp.GetProfileBool( AfxGetAppName(), cszDisableCRT );
    int nDSExitType = config.m_nDSExitType
          = theApp.GetProfileInt( AfxGetAppName(), cszDSExitType, 0 );
    config.m_fTiMachine = TiNb.Is_TI_Bios();
    config.m_wTimerVal = TiNb.TimerSetting();

    // Kill Topmost state
    if ( fStayOnTop )
        SetTopmost( FALSE );

    if ( config.DoModal() == IDOK )
    {
        // Stay on top
        if ( fStayOnTop != config.m_fStayOnTop )    // Changed?
        {
            theApp.WriteProfileBool( AfxGetAppName(), cszStayOnTop,
                    config.m_fStayOnTop );
            // Set current StayOnTop state
            fStayOnTop = config.m_fStayOnTop;
        }

        // Disable eject switch
        if ( config.m_fDisableEject != fDisableEject )    // Changed?
        {
            theApp.WriteProfileBool( AfxGetAppName(), cszDisableSwitch,
                    config.m_fDisableEject );
            TiNb.EnableEjectKey( !config.m_fDisableEject );
        }

        // Disable CRT
        if ( config.m_fDisableCrt != fDisableCrt )    // Changed?
        {
            theApp.WriteProfileBool( AfxGetAppName(), cszDisableCRT,
                    config.m_fDisableCrt );
            TiNb.EnableCrt( config.m_fDisableCrt );
        }
```

```
    // Smart dock
    if ( fSmartDock != config.m_fSmartDock )    // Changed?
    {
        theApp.WriteProfileBool( AfxGetAppName(), cszSmartDock,
                config.m_fSmartDock );
        if ( config.m_fSmartDock != TiNb.In_SmartMode() )    // Changed?
            if ( TiNb.In_DuckTop() )
                SetSmartMode( config.m_fSmartDock );
    }

    // Auto close DOS apps
    if ( fDosAutoClose != config.m_fDosAutoClose )    // Changed?
    {
        // If setting auto close, warn & prompt user
        if ( !config.m_fDosAutoClose
                || MessageBox( DosAutoCloseMsg, "Continue?",
                MB_YESNO | MB_ICONQUESTION ) == IDYES )
        {
            theApp.WriteProfileBool( AfxGetAppName(),
                    cszDosAutoClose, config.m_fDosAutoClose );
        }
    }

    // Auto close Windows apps
    theApp.WriteProfileBool( AfxGetAppName(), cszWinAutoClose,
            config.m_fWinAutoClose );

    // Try to save change files
    theApp.WriteProfileBool( AfxGetAppName(), cszWinFileClose,
            config.m_fWinFileClose );

    // Use password
    if ( config.m_fUsePassword != fUsePassword )    // Changed?
    {
        theApp.WriteProfileBool( AfxGetAppName(), cszUsePassword,
                config.m_fUsePassword );
    }

    // DS Exit Type
    if ( config.m_nDSExitType != nDSExitType )    // Changed?
    {
        theApp.WriteProfileInt( AfxGetAppName(), cszDSExitType,
                config.m_nDSExitType );
        if ( TiNb.In_SmartMode() )
        {
            CMenu* SysMenu = GetSystemMenu( FALSE );
            SysMenu->CheckMenuItem( nDSExitType + 1,MF_BYPOSITION
                    | MF_UNCHECKED );
            SysMenu->CheckMenuItem( config.m_nDSExitType + 1, MF_BYPOSITION
                    | MF_CHECKED );
        }
    }
}

// Reset timer if value changed
if ( config.m_wTimerVal != TiNb.TimerSetting() )
    TiNb.ResetTimer( config.m_wTimerVal );

// Reset shutdown timer
m_uStartTime = config.m_uStartTime;
m_uEndTime = config.m_uEndTime;
```

```
    // EPA enabled change?
    SetEpaMode( TiNb.In_SmartMode() );

    SetTopmost( fStayOnTop );
}

//--------------------------------------------------------------------------
void CMainWindow::OnTimer( UINT nIDEvent )
{
    static UINT uDelayTime;

    if ( TiNb.In_SmartMode() )      // In DeskTop?
    {
        // First check for eject button
        if ( TiNb.GetEjectStatus() )
        {
            TiNb.SetHardEject();
            theApp.DoExit();
        }

        if ( m_fEpaEnabled )        // EPA enabled?
        {
            // Get the current time
            CTime TheTime = CTime::GetCurrentTime();
            UINT uTimeNow = TheTime.GetHour() * 60 + TheTime.GetMinute();

#if 0       // Test
            static BOOL fDone1 = FALSE;
            if ( !fDone1 )
            {
                fDone1 = TRUE;
                char buffer[256];
                sprintf( buffer, "Start = %d, Now = %d", m_uStartTime, uTimeNow );
                AfxMessageBox( buffer );
            }
#endif

            // Save flag in case user hits Cancel
            static BOOL fDone = FALSE;

            if ( ShutdownDlg == NULL )  // If ShutdownDlg is not present
            {
                if ( uTimeNow == m_uStartTime )
                {
                    if ( !fDone )           // If we haven't already done this
                    {
                        fDone = TRUE;
                        // Should really send a message to call another function
                        // to do this
                        ShutdownDlg = new CShutdownMsg( this );
                        uDelayTime = m_uStartTime + theApp.GetProfileInt( cszEpaEnergyStar,
                                cszConfirmDelay, 15 );
                    }
                }
                else
                    fDone = FALSE;      // Reset so we can run again next time
            }
            else if ( uTimeNow == uDelayTime )  // Must be waiting on confirmation
                OnShutdownDlg( IDOK, 0L );
        }
    }
```

```
    CFrameWnd::OnTimer( nIDEvent );
}

//---------------------------------------------------------------------------
// Callback function called by ShutdownDlg on exit
//
LONG CMainWindow::OnShutdownDlg( UINT nID, LONG lParam )
{
    if ( ShutdownDlg != NULL )
    {
        ShutdownDlg->DestroyWindow();
        ShutdownDlg = NULL;
    }

    if ( nID == IDOK )
    {
        // Time to die!
        BOOL fInstantOn = theApp.GetProfileBool( cszEpaEnergyStar,
                cszInstantOn );
        DoSuspend( fInstantOn );
        // Instant On?
        if ( !fInstantOn )
            theApp.DoExit();
    }
    return 0L;
}

//---------------------------------------------------------------------------
void CMainWindow::DoSuspend( BOOL fInstantOn )
{
    UINT uInterval;

    if ( !theApp.GetProfileBool( cszEpaEnergyStar, cszEpaEnable )
            || theApp.GetProfileBool( cszEpaEnergyStar, cszManualResume ) )
        uInterval = 0;
    else
    {
        CTime TheTime = CTime::GetCurrentTime();
        UINT uTimeNow = TheTime.GetHour() * 60 + TheTime.GetMinute();
        uInterval = m_uEndTime;
        if ( m_uEndTime < uTimeNow )
            uInterval += 24 * 60;
        uInterval -= uTimeNow;
    }
    TiNb.EnableCrt( theApp.GetProfileBool( AfxGetAppName(),
            cszDisableCRT ) );
    TiNb.SetAutoShutdown( fInstantOn, uInterval );
}
```

```
//________________________________________________________________
//                                                      |
// (c) Copyright, Texas Instruments Incorporated, 1993. All Rights    |
// Reserved. Property of Texas Instruments Incorporated. Restricted   |
// Rights -- Use, duplication or disclosure subject to restrictions set  |
// forth in TI's Program License Agreement and associated documentation. |
//________________________________________________________________|
//
// Workfile: notebook.h
//   Author: Robert Tonsing
//     Site: Temple
// Language: C++
//
//====================================================================

#define TIMER_DEFAULT  120   /* timer setting in milliseconds */
#define TIMEDIFF       5L    /* allowable difference between CMOS & DOS times */
#define TIMECHECK      6     /* period in seconds between time checks */
#define SETSMARTMODE   0x0000
#define CANCELSMARTMODE 0x0100
#define GETEJECTSTATUS 0x0200
#define SETNOEJECT     0x0300
#define SETHARDEJECT   0x0301
#define SETSOFTEJECT   0x0302
#define SETPOWERDOWN   0x0303
#define DISABLEEJECTKEY 0x0304
#define ENABLEEJECTKEY 0x0305
#define GETHOTOPTIONS  0x0380
#define GETSTATUS      0x0381
#define DOEJECT        0x0400
#define DISABLECRT     0x0501
#define ENABLECRT      0x0500
#define SETAUTONORESUME 0x0600
#define SETAUTORESUME  0x0601
#define CANCELAUTO     0x0700
#define INT15FAIL      0x86

BOOL CheckCapTable( WORD wCapTableWord, WORD wCapTableMask );

class CTINotebook
{
private:
   enum {
      eNonTiBios = 0,
      eNonDockable = 1,
      eStandalone,
      eInMicroDuck,
      eInDuckTop,
      eInSmartMode
   } m_TiState;
   WORD m_wClockVal;
   UINT m_wTimerEvent;

   BOOL Query_TI_Bios();
   int Query_DuckTop();
   int DuckStation( WORD wCmd );

public:
   CTINotebook();
   ~CTINotebook();
   BOOL Is_TI_Bios()
```

```
    { return m_TiState; }
  BOOL In_DuckTop()
    { return ( m_TiState >= eInDuckTop ); }
  BOOL In_MicroDuck()
    { return ( m_TiState == eInMicroDuck ); }
  BOOL In_SmartMode()
    { return ( m_TiState == eInSmartMode ); }
  BOOL SetSmartMode();
  BOOL CancelSmartMode();
  BOOL SetNoEject()
    { return DuckStation( SETNOEJECT ); }
  BOOL SetSoftEject()
    { return DuckStation( SETSOFTEJECT ); }
  BOOL SetPowerDown()
    { return DuckStation( SETPOWERDOWN ); }
  BOOL SetHardEject()
    { return DuckStation( SETHARDEJECT ); }
  BOOL DoEject()
    { return DuckStation( DOEJECT ); }
  BOOL GetEjectSwStatus()
    { return ( DuckStation( GETSTATUS ) & 0x01 ); }
  BOOL GetSuspendSupport()
    { return ( DuckStation( GETSTATUS ) & 0x04 ); }
  BOOL GetHotOptions()
    { return DuckStation( GETHOTOPTIONS ) == INT15FAIL ? FALSE : TRUE; }
  BOOL EnableEjectKey( BOOL fEnable = TRUE )
    { return DuckStation( fEnable ? ENABLEEJECTKEY : DISABLEEJECTKEY ); }
  BOOL DisableEjectKey()
    { return DuckStation( DISABLEEJECTKEY ); }
  BOOL GetEjectStatus()
    { return DuckStation( GETEJECTSTATUS ); }
  BOOL EnableCrt( BOOL fEnable = TRUE )
    { return DuckStation( fEnable ? ENABLECRT : DISABLECRT ); }
  BOOL SetAutoShutdown( BOOL fInstantOn, UINT uInterval );
  BOOL CancelAutoShutdown()
    { return DuckStation( CANCELAUTO ); }
  void StartTimer();
  void ResetTimer( WORD wTimerVal );
  WORD ClockVal()
    { return m_wClockVal; }
  WORD TimerSetting()
    { return ::GetProfileInt( cszTimerSection, cszTimerKey,
        TIMER_DEFAULT ); }
  BOOL Is_Paintbrush()
    { return CheckCapTable( 5, 0x0400 ); }
};

extern CTINotebook TiNb;

void CALLBACK TimerProc( HWND hWnd, UINT uMsg, UINT idTimer, DWORD dwTime );
```

```
//________________________________________________________________
//                                              |
// (c) Copyright, Texas Instruments Incorporated, 1993.  All Rights    |
// Reserved.  Property of Texas Instruments Incorporated.  Restricted   |
// Rights -- Use, duplication or disclosure subject to restrictions set  |
// forth in TI's Program License Agreement and associated documentation. |
//________________________________________________________________|
```

```
//
//  Workfile:  notebook.cpp
//    Author:  Robert Tonsing
//      Site:  Temple
//  Language:  C++
//
//=====================================================================

#include "rfx.h"
#include <dos.h>
#include "shtdwn2.h"
#include "notebook.h"

CTINotebook TiNb;

/*=======================================================================*/
CTINotebook::CTINotebook()
    : m_TiState( eNonTiBios ), m_wClockVal( 1 ), m_wTimerEvent( 0 )
{
    if ( Query_TI_Bios() )
    {
        switch ( Query_DuckTop() )
        {
            case 0:
            default:
                if ( CheckCapTable( 5, 0x0280 ) || CheckCapTable( 12, 0x0008 ) )
                    m_TiState = eStandalone;
                else
                    m_TiState = eNonDockable;
                break;
            case 1:
                m_TiState = eInMicroDuck;
                break;
            case 2:
                m_TiState = eInDuckTop;
                break;
        }
    }

    // Start idle timer
    StartTimer();
}

//-------------------------------------------------------------------------
CTINotebook::~CTINotebook()
{
    if ( m_wTimerEvent )            // If timer running, kill it
        ::KillTimer( NULL, m_wTimerEvent );
}

//-------------------------------------------------------------------------
BOOL CTINotebook::SetSmartMode()
{
    if ( m_TiState == eInDuckTop )
```

```
        if ( DuckStation( SETSMARTMODE ) == 0 )
            m_TiState = eInSmartMode;

    return ( m_TiState == eInSmartMode );
}

//--------------------------------------------------------------------------
BOOL CTINotebook::CancelSmartMode()
{
    if ( m_TiState == eInSmartMode )
        if ( DuckStation( CANCELSMARTMODE ) == 0 )
            m_TiState = eInDuckTop;

    return ( m_TiState == eInDuckTop );
}

//--------------------------------------------------------------------------
BOOL CTINotebook::SetAutoShutdown( BOOL fInstantOn, UINT uInterval )
{
    union REGS r;

    r.x.ax = 0x4604;
    r.x.bx = fInstantOn ? SETAUTORESUME : SETAUTONORESUME;
    r.h.ch = uInterval / 60;        // Hours
    r.h.cl = uInterval % 60;        // Minutes
    int86( 0x15, &r, &r );
    return r.x.ax;
}

//--------------------------------------------------------------------------
// Start idle timer
void CTINotebook::StartTimer()
{
    if ( Is_TI_Bios() && !FindWindow( "ChcursorWClass", NULL )
            && !FindWindow( "ShutdownWClass", NULL ) )
    {
        WORD wTimerVal = TimerSetting();
        if ( wTimerVal > 10000 )
            wTimerVal = TIMER_DEFAULT;
        if ( wTimerVal > 0 )
        {
            // Set to call OnTimer()
            m_wTimerEvent = ::SetTimer( NULL, 0x5449, wTimerVal, TimerProc );
            m_wClockVal = ( TIMECHECK * 1000 ) / wTimerVal;
        }
    }
}

//--------------------------------------------------------------------------
void CTINotebook::ResetTimer( WORD wTimerVal )
{
    // Save to profile
    char szBuffer[8];
    _itoa( wTimerVal, szBuffer, 10 );
    ::WriteProfileString( cszTimerSection, cszTimerKey, szBuffer );

    if ( m_wTimerEvent )            // If timer running, kill it
    {
        ::KillTimer( NULL, m_wTimerEvent );
        m_wTimerEvent = 0;
    }
```

```
    StartTimer();
}

//---------------------------------------------------------------------------
BOOL CTINotebook::Query_TI_Bios()
{
    // Fail if not enhanced mode
    if ( !( GetWinFlags() & WF_ENHANCED ) )
        return ( FALSE );

    union REGS r;

    r.x.ax = 0xf963;
    r.x.bx = 0x6974;
    int86( 0x15, &r, &r );
    return r.x.bx == 0x5449 ? TRUE : FALSE;
}

#pragma optimize ("egl", off)
//---------------------------------------------------------------------------
// returns:
//  0 = none
//  1 = microDuck
//  2 = Duckstation
//
int CTINotebook::Query_DuckTop()
{
    BYTE bAHResult, bALResult;

    _asm
    {
        mov ax,0fb00h
        int 15h
        mov bAHResult,ah
        mov bALResult,al
    }

    if ( bAHResult == 0x86 )    // Function fail?
        return 0;
    else
        return ( bALResult & 0x03 ); // Is it a Ducktop?
}

//---------------------------------------------------------------------------
int CTINotebook::DuckStation( WORD wCmd )
{
    if ( !In_DuckTop() )
        return INT15FAIL;

    BYTE bAHResult, bBHResult, bBLResult;

    _asm
    {
        mov ax,04604h
        mov bx,wCmd
        int 15h
        mov bAHResult,ah
        mov bBHResult,bh
        mov bBLResult,bl
    }
```

```
   if ( bAHResult != INT15FAIL )  // Function fail?
   {
      switch ( wCmd )
      {
         case SETSMARTMODE:      // Init smart mode
         case CANCELSMARTMODE:  // Cancel smart mode
            return bBLResult;  // 0 = command accepted
                               // 1 = timeout

         case GETEJECTSTATUS:   // Eject status request
         case GETSTATUS:        // Status request
            return bBLResult;  // 0 = no eject request active
      }
   }

   return bAHResult;
}

//---------------------------------------------------------------------------
void CALLBACK TimerProc( HWND hWnd, UINT uMsg, UINT idTimer, DWORD dwTime )
{
   union REGS r, r2;
   BYTE hour1;
   static WORD count = 0;
   long diff;

   /* Do some idle calls to help power mgmt */
   _asm
   {
      int    28h
      int    28h
      mov    ax,1680h
      int    2fh
      int    28h
      int    28h
      mov    ax,1680h
      int    2fh
   }

   if ( ++count > TiNb.ClockVal() )
   {
      /* get DOS time */
      r2.h.ah = 0x2c;
      int86( 0x21, &r2, &r2 );

      /* get CMOS time */
      r.h.ah = 0x02;
      int86( 0x1a, &r, &r );

      /* convert CMOS time from BCD */
      r.h.ch = hour1 = (BYTE) ((((r.h.ch & 0xf0) >> 4) * 10) + (r.h.ch & 0x0f));
      r.h.cl = (BYTE) ((((r.h.cl & 0xf0) >> 4) * 10) + (r.h.cl & 0x0f));
      r.h.dh = (BYTE) ((((r.h.dh & 0xf0) >> 4) * 10) + (r.h.dh & 0x0f));
      r.h.dl = (BYTE) ((((r.h.dl & 0xf0) >> 4) * 10) + (r.h.dl & 0x0f));

      /* handle cases where times span midnight */
      if ( hour1 == 0 && r2.h.ch == 23 )
         hour1 = 24;
      if ( r2.h.ch == 0 && hour1 == 23 )
         r2.h.ch = 24;
```

```
      /* calculate seconds difference between times */
      diff = ( 3600 * (long) ( hour1 - r2.h.ch ) )
            + (long) ( 60 * ( r.h.cl - r2.h.cl ) + ( r.h.dh - r2.h.dh ) );

      if ( diff > 5L || diff < -5L )      /* big difference? */
      {
         /* set DOS time to CMOS time - use regs saved from CMOS call */
         r.h.ah = 0x2d;
         int86( 0x21, &r, &r );
      }

      count = 0;

#ifdef _DEBUG
      AfxMessageBox( "Shutdown Timer" );
#endif
   }
}

extern "C" WORD _F000h;

//===========================================================================
const void FAR* TiGetCapTable()
{
   static const void FAR* CapTable = NULL;

   if ( !CapTable )
   {
      WORD wResult;
      WORD wSegment;
      WORD wOffset;

      _asm
      {
         mov ax,0f95fh
         int 015h
         mov wResult,ax
         mov wSegment,es
         mov wOffset,bx
      }
      if ( wResult != 0x005f )
         return NULL;
 #ifdef _WINDOWS
      CapTable = (void FAR*) MAKELONG( wOffset, &_F000h );
 #else
      CapTable = _MK_FP( wSegment, wOffset );
 #endif
   }
   return CapTable;
}


#pragma optimize ("egl", on)

//===========================================================================
WORD TiReadCapTableWord( UINT uWordRequest, WORD* pwValue )
{
   // Get ptr to Cap Table
   const LPWORD pCapTable = (const LPWORD) TiGetCapTable();
   // Valid ptr & valid word #?
   if ( !pCapTable || uWordRequest >= pCapTable[ 0 ] )
```

```
        return 1;

    *pwValue = pCapTable[ uWordRequest ];  // Do it

    return 0;
}

//===========================================================================
BOOL CheckCapTable( WORD wCapTableWord, WORD wCapTableMask )
{
    // Check Cap Table for availability
    WORD wCTValue;
    if ( TiReadCapTableWord( wCapTableWord, &wCTValue ) == 0 )
        if ( ( wCTValue & wCapTableMask ) != 0 )
            return TRUE;

    return FALSE;
}
```

```
// cfgdlg.h : header file
//

/////////////////////////////////////////////////////////////////////////////
// CConfigDlg dialog

class CConfigDlg : public CDialog
{
// Construction
public:
    CConfigDlg( CWnd* pParent = NULL);

// Dialog Data
    WORD    m_wTimerVal;
    BOOL    m_fTiMachine;
    UINT    m_uStartTime;
    UINT    m_uEndTime;
    //{{AFX_DATA(CConfigDlg)
    enum { IDD = IDD_CONFIG };
    CComboBox   m_cboxDSExitType;
    BOOL    m_fStayOnTop;
    BOOL    m_fDosAutoClose;
    BOOL    m_fWinAutoClose;
    BOOL    m_fSmartDock;
    BOOL    m_fWinFileClose;
    BOOL    m_fDisableEject;
    BOOL    m_fDisableCrt;
    BOOL    m_fUsePassword;
    int     m_nDSExitType;
    //}}AFX_DATA

// Implementation
protected:
    virtual void DoDataExchange(CDataExchange* pDX);    // DDX/DDV support

    // Generated message map functions
    //{{AFX_MSG(CConfigDlg)
    virtual BOOL OnInitDialog();
    afx_msg void OnClickedBscheduling();
    afx_msg void OnClickedDdeinfo();
    afx_msg void OnClickedCfghelp();
    afx_msg void OnClickedSetpassword();
    afx_msg void OnClickedSaveposition();
    afx_msg void OnClickedEpamode();
    afx_msg void OnClickedPassword();
    afx_msg void OnClickedSmartdocking();
    //}}AFX_MSG
    DECLARE_MESSAGE_MAP()
};
/////////////////////////////////////////////////////////////////////////////
// CAboutDlg dialog

class CAboutDlg : public CDialog
{
// Construction
public:
    CAboutDlg(CWnd* pParent = NULL);    // standard constructor

// Dialog Data
    //{{AFX_DATA(CAboutDlg)
    enum { IDD = IDD_ABOUTBOX };
```

```
    //}}AFX_DATA

// Implementation
protected:
//    virtual void DoDataExchange(CDataExchange* pDX);    // DDX/DDV support

    // Generated message map functions
    //{{AFX_MSG(CAboutDlg)
    virtual BOOL OnInitDialog();
    //}}AFX_MSG
    DECLARE_MESSAGE_MAP()
};
/////////////////////////////////////////////////////////////////////////////
// CScheduleDlg dialog

class CScheduleDlg : public CDialog
{
// Construction
public:
    CScheduleDlg(CWnd* pParent = NULL); // standard constructor

// Dialog Data
    //{{AFX_DATA(CScheduleDlg)
    enum { IDD = IDD_SCHEDULING };
    CString m_csTimeSlice;
    //}}AFX_DATA

// Implementation
protected:
    virtual void DoDataExchange(CDataExchange* pDX);    // DDX/DDV support

    // Generated message map functions
    //{{AFX_MSG(CScheduleDlg)
    virtual BOOL OnInitDialog();
    afx_msg void OnClickedSchhelp();
    //}}AFX_MSG
    DECLARE_MESSAGE_MAP()
};
/////////////////////////////////////////////////////////////////////////////
// CDdeDlg dialog

class CDdeDlg : public CDialog
{
// Construction
public:
    CDdeDlg(CWnd* pParent = NULL);  // standard constructor

// Dialog Data
    //{{AFX_DATA(CDdeDlg)
    enum { IDD = IDD_DDEINFO };
    CComboBox   m_cboxAppList;
    //}}AFX_DATA

// Implementation
protected:
    virtual void DoDataExchange(CDataExchange* pDX);    // DDX/DDV support

    // Generated message map functions
    //{{AFX_MSG(CDdeDlg)
    afx_msg void OnSelchangeApplist();
    virtual BOOL OnInitDialog();
```

```
    virtual void OnOK();
    afx_msg void OnClickedDdehelp();
    afx_msg void OnClickedDdedelete();
     afx_msg void OnKeytest();
     //}}AFX_MSG
    DECLARE_MESSAGE_MAP()
};

//AppInfo* FindAppEntry( const char* pcszModule );

/////////////////////////////////////////////////////////////////////////////
// CNumEdit window

class CNumEdit : public CEdit
{
// Construction
public:
    CNumEdit();

// Attributes
public:

// Operations
public:

// Implementation
public:
    virtual ~CNumEdit();
    void CheckLimit( UINT uMin, UINT uMax, UINT& uSavedVal );
    void LeadZero();

    // Generated message map functions
protected:
    //{{AFX_MSG(CNumEdit)
    afx_msg void OnChar(UINT nChar, UINT nRepCnt, UINT nFlags);
    //}}AFX_MSG
    DECLARE_MESSAGE_MAP()
};

/////////////////////////////////////////////////////////////////////////////
// CEpaDlg dialog

class CEpaDlg : public CDialog
{
private:

// Construction
public:
    CEpaDlg(CWnd* pParent = NULL);  // standard constructor

// Dialog Data
    //{{AFX_DATA(CEpaDlg)
    enum { IDD = IDD_EPADIALOG };
    CListBox    m_lbPostFix2;
    CListBox    m_lbPostFix1;
    CNumEdit m_ebConfirmDelay;
    CNumEdit m_ebEndMin;
    CNumEdit m_ebEndHour;
    CNumEdit m_ebStartMin;
    CNumEdit m_ebStartHour;
    UINT    m_uStartMin;
```

```
    UINT    m_uStartHour;
    UINT    m_uEndHour;
    UINT    m_uEndMin;
    BOOL    m_fEpaEnabled;
    BOOL    m_fManualResume;
    BOOL    m_fWeekends;
    BOOL    m_fInstantOn;
    BOOL    m_f24hrTime;
    UINT    m_uConfirmDelay;
    //}}AFX_DATA
    int     m_nPostFix1;
    int     m_nPostFix2;

// Implementation
protected:
    virtual void DoDataExchange(CDataExchange* pDX);    // DDX/DDV support

    // Generated message map functions
    //{{AFX_MSG(CEpaDlg)
    afx_msg void OnClickedEpahelp();
    virtual BOOL OnInitDialog();
    afx_msg void OnKillfocusStarthour();
    afx_msg void OnKillfocusStartmin();
    afx_msg void OnKillfocusEndhour();
    afx_msg void OnKillfocusEndmin();
    afx_msg void OnKillfocusConfirmdelay();
    afx_msg void OnClickedEpaenable();
    virtual void OnOK();
     afx_msg void OnClickedManualresume();
     //}}AFX_MSG
    DECLARE_MESSAGE_MAP()
};
/////////////////////////////////////////////////////////////////////////////
// CChgPswdDlg dialog

class CChgPswdDlg : public CDialog
{
// Construction
public:
    CChgPswdDlg(CWnd* pParent = NULL); // standard constructor

// Dialog Data
    //{{AFX_DATA(CChgPswdDlg)
    enum { IDD = DLG_CHANGEPASSWORD };
        // NOTE: the ClassWizard will add data members here
    //}}AFX_DATA

// Implementation
protected:
    virtual void DoDataExchange(CDataExchange* pDX);    // DDX/DDV support

    // Generated message map functions
    //{{AFX_MSG(CChgPswdDlg)
    virtual void OnOK();
    virtual BOOL OnInitDialog();
    afx_msg void OnChangeOldPswd();
    afx_msg void OnChangeNewPswd();
    //}}AFX_MSG
    DECLARE_MESSAGE_MAP()
};
/////////////////////////////////////////////////////////////////////////////
```

```
// CGetPswdDlg dialog

class CGetPswdDlg : public CDialog
{
// Construction
public:
   CGetPswdDlg(CWnd* pParent = NULL);  // standard constructor

// Dialog Data
   //{{AFX_DATA(CGetPswdDlg)
   enum { IDD = DLG_ENTERPASSWORD };
      // NOTE: the ClassWizard will add data members here
   //}}AFX_DATA

// Implementation
protected:
   virtual void DoDataExchange(CDataExchange* pDX);    // DDX/DDV support

   // Generated message map functions
   //{{AFX_MSG(CGetPswdDlg)
   virtual BOOL OnInitDialog();
   virtual void OnOK();
   //}}AFX_MSG
   DECLARE_MESSAGE_MAP()
};
/////////////////////////////////////////////////////////////////////////////
// CShutdownMsg dialog

class CShutdownMsg : public CDialog
{
// Construction
public:
   CShutdownMsg(CWnd* pParent = NULL); // standard constructor

// Dialog Data
   //{{AFX_DATA(CShutdownMsg)
   enum { IDD = IDD_SHUTDOWN };
   CStatic m_iQuestion;
   //}}AFX_DATA

// Implementation
protected:
   virtual void DoDataExchange(CDataExchange* pDX);    // DDX/DDV support

   // Generated message map functions
   //{{AFX_MSG(CShutdownMsg)
   virtual void OnCancel();
   virtual void OnOK();
   virtual BOOL OnInitDialog();
   //}}AFX_MSG
   DECLARE_MESSAGE_MAP()
};

/////////////////////////////////////////////////////////////////////////////
```

```
//___________________________________________________________________
//                                        |
// (c) Copyright, Texas Instruments Incorporated, 1993. All Rights   |
// Reserved.  Property of Texas Instruments Incorporated. Restricted  |
// Rights -- Use, duplication or disclosure subject to restrictions set  |
// forth in TI's Program License Agreement and associated documentation. |
//___________________________________________________________________|
```

```
//
// $Workfile:  cfgdlg.cpp  $
//    Author:  Robert Tonsing
//      Site:  Temple
//  Language:  C++
//
//==================================================================

#include "rfx.h"
#include "shtdwn2.h"
#include "resource.h"
#include "cfgdlg.h"
#include "notebook.h"
#include "version.h"
#include "sendkeys.h"
#include <ctype.h>

#ifdef _DEBUG
#undef THIS_FILE
static char BASED_CODE THIS_FILE[] = __FILE__;
#endif

#define CFGDLGDECREASE 140
const char* TimerValues[] = {"100", "110", "120", "130", "140", "150",
                    "160", "170", "180", "190", "200", "250",
                    "500", "750", "1000"};
#define NUMTIMERVALUES sizeof( TimerValues ) / sizeof( char* )

static WORD CheckPassword( const char* pszEntry );

//////////////////////////////////////////////////////////////////////////////
// CConfigDlg dialog

CConfigDlg::CConfigDlg( CWnd* pParent /*=NULL*/ )
    : CDialog( CConfigDlg::IDD, pParent )
{
    //{{AFX_DATA_INIT(CConfigDlg)
    m_fStayOnTop = FALSE;
    m_fDosAutoClose = FALSE;
    m_fWinAutoClose = FALSE;
    m_fSmartDock = FALSE;
    m_fWinFileClose = FALSE;
    m_fDisableEject = FALSE;
    m_fDisableCrt = FALSE;
    m_fUsePassword = FALSE;
    m_nDSExitType = -1;
    //}}AFX_DATA_INIT
}

//---------------------------------------------------------------------------
void CConfigDlg::DoDataExchange(CDataExchange* pDX)
{
    CDialog::DoDataExchange(pDX);
    //{{AFX_DATA_MAP(CConfigDlg)
```

```
    DDX_Control(pDX, IDC_DEFDSEXITTYPE, m_cboxDSExitType);
    DDX_Check(pDX, IDC_STAYONTOP, m_fStayOnTop);
    DDX_Check(pDX, IDC_CLOSEDOS, m_fDosAutoClose);
    DDX_Check(pDX, IDC_WINCHANGED, m_fWinAutoClose);
    DDX_Check(pDX, IDC_SMARTDOCKING, m_fSmartDock);
    DDX_Check(pDX, IDC_WINCLOSE, m_fWinFileClose);
    DDX_Check(pDX, IDC_DISABLEEJECT, m_fDisableEject);
    DDX_Check(pDX, IDC_DISABLECRT, m_fDisableCrt);
    DDX_Check(pDX, IDC_PASSWORD, m_fUsePassword);
    DDX_CBIndex(pDX, IDC_DEFDSEXITTYPE, m_nDSExitType);
    //}}AFX_DATA_MAP
}

//---------------------------------------------------------------------------
BEGIN_MESSAGE_MAP(CConfigDlg, CDialog)
    //{{AFX_MSG_MAP(CConfigDlg)
    ON_BN_CLICKED(IDC_BSCHEDULING, OnClickedBscheduling)
    ON_BN_CLICKED(IDC_DDEINFO, OnClickedDdeinfo)
    ON_BN_CLICKED(IDC_CFGHELP, OnClickedCfghelp)
    ON_BN_CLICKED(IDC_SETPASSWORD, OnClickedSetpassword)
    ON_BN_CLICKED(IDC_SAVEPOSITION, OnClickedSaveposition)
    ON_BN_CLICKED(IDC_EPAMODE, OnClickedEpamode)
    ON_BN_CLICKED(IDC_PASSWORD, OnClickedPassword)
    ON_BN_CLICKED(IDC_SMARTDOCKING, OnClickedSmartdocking)
    //}}AFX_MSG_MAP
END_MESSAGE_MAP()

/////////////////////////////////////////////////////////////////////////////
// CConfigDlg message handlers

//---------------------------------------------------------------------------
BOOL CConfigDlg::OnInitDialog()
{
    if ( m_fUsePassword )
    {
        CGetPswdDlg GetPswd( this );
        if ( GetPswd.DoModal() != IDOK )
            EndDialog( IDCANCEL );
    }

    CDialog::OnInitDialog();

    CenterWindow( GetDesktopWindow() );

    // If not TI machine, shrink window to hide TI options
    if ( m_fTiMachine <= 1 )
    {
        RECT rect;
        GetWindowRect( &rect );
        SetWindowPos( NULL, 0, 0, rect.right - rect.left,
                rect.bottom - rect.top - CFGDLGDECREASE, SWP_NOACTIVATE
                | SWP_NOMOVE | SWP_NOZORDER );
    }
    else
    {
        // Enable Password button
        if ( m_fUsePassword )
            GetDlgItem( IDC_SETPASSWORD )->EnableWindow( TRUE );

        // Enable EPA Energy Star button
        if ( m_fSmartDock )
```

```
        GetDlgItem( IDC_EPAMODE )->EnableWindow( TRUE );

      // Load Default Exit types
      m_cboxDSExitType.AddString( cszExitToDOS );
      m_cboxDSExitType.AddString( cszExitAndEject );
      m_cboxDSExitType.AddString( cszExitAndSuspend );
      if ( TiNb.GetSuspendSupport() )
        m_cboxDSExitType.AddString( cszSuspendInstantOn );
      if ( TiNb.GetHotOptions() )
      {
        m_cboxDSExitType.AddString( cszEjectHot );
        m_cboxDSExitType.AddString( cszEject );
      }
      //m_cboxDSExitType.AddString( cszRestartWindows );
      //m_cboxDSExitType.AddString( cszRebootSystem );
      m_cboxDSExitType.SetCurSel( m_nDSExitType );
    }

    if ( m_fTiMachine > 0 )
      // Enable Scheduling button
      GetDlgItem( IDC_BSCHEDULING )->ShowWindow( SW_SHOWNA );


    return TRUE; // return TRUE  unless you set the focus to a control
}

//---------------------------------------------------------------------------
void CConfigDlg::OnClickedBscheduling()
{
    CScheduleDlg scheduling( this );

    // Get current time slice value
    char* pszBuffer = scheduling.m_csTimeSlice.GetBuffer( 8 );
    sprintf( pszBuffer, "%d", m_wTimerVal );
    scheduling.m_csTimeSlice.ReleaseBuffer();

    // Set new time slice value
    if ( scheduling.DoModal() == IDOK )
      m_wTimerVal = atoi( scheduling.m_csTimeSlice );
}

//---------------------------------------------------------------------------
void CConfigDlg::OnClickedDdeinfo()
{
    CDdeDlg ddeinfo( this );
    ddeinfo.DoModal();
}

//---------------------------------------------------------------------------
void CConfigDlg::OnClickedCfghelp()
{
    theApp.WinHelp( IDM_HELPOPTIONS );
}

//---------------------------------------------------------------------------
void CConfigDlg::OnClickedSaveposition()
{
    POINT ptPosition;
    if ( ((CRfxFrameWnd*) GetParent())->GetWindowPlacement( &ptPosition ) )
      theApp.WriteProfilePoint( AfxGetAppName(), cszPosition, ptPosition );
}
```

```
//--------------------------------------------------------------------------
void CConfigDlg::OnClickedSetpassword()
{
   CChgPswdDlg pswdinfo( this );
   pswdinfo.DoModal();
}

//--------------------------------------------------------------------------
void CConfigDlg::OnClickedEpamode()
{
   CEpaDlg epainfo( this );

   epainfo.m_fEpaEnabled = theApp.GetProfileBool( cszEpaEnergyStar,
         cszEpaEnable );
   epainfo.m_fManualResume = theApp.GetProfileBool( cszEpaEnergyStar,
         cszManualResume );
   epainfo.m_fWeekends = theApp.GetProfileBool( cszEpaEnergyStar,
         cszWeekends );
   epainfo.m_fInstantOn = theApp.GetProfileBool( cszEpaEnergyStar,
         cszInstantOn );
   epainfo.m_uConfirmDelay = theApp.GetProfileInt( cszEpaEnergyStar,
         cszConfirmDelay, 15 );

   // Set time fields
   epainfo.m_f24hrTime = ::GetProfileInt( cszIntl, "iTime", 0 );
   m_uStartTime = theApp.GetProfileInt( cszEpaEnergyStar,
         cszShutdownStart, 1080 );
   epainfo.m_uStartMin = m_uStartTime;
   epainfo.m_uStartHour = epainfo.m_uStartMin / 60;
   epainfo.m_uStartMin %= 60;
   m_uEndTime = theApp.GetProfileInt( cszEpaEnergyStar,
         cszShutdownEnd, 420 );
   epainfo.m_uEndMin = m_uEndTime;
   epainfo.m_uEndHour = epainfo.m_uEndMin / 60;
   epainfo.m_uEndMin %= 60;
   if ( !epainfo.m_f24hrTime )
   {
      epainfo.m_nPostFix1 = epainfo.m_nPostFix2 = 0;
      if ( epainfo.m_uStartHour > 12 )
      {
         epainfo.m_nPostFix1 = 1;
         epainfo.m_uStartHour -= 12;
      }
      if ( epainfo.m_uEndHour > 12 )
      {
         epainfo.m_nPostFix2 = 1;
         epainfo.m_uEndHour -= 12;
      }
   }

   if ( epainfo.DoModal() == IDOK )
   {
      theApp.WriteProfileBool( cszEpaEnergyStar, cszEpaEnable,
            epainfo.m_fEpaEnabled );
      theApp.WriteProfileBool( cszEpaEnergyStar, cszManualResume,
            epainfo.m_fManualResume );
      theApp.WriteProfileBool( cszEpaEnergyStar, cszWeekends,
            epainfo.m_fWeekends );
      theApp.WriteProfileBool( cszEpaEnergyStar, cszInstantOn,
            epainfo.m_fInstantOn );
      theApp.WriteProfileInt( cszEpaEnergyStar, cszConfirmDelay,
```

```
            epainfo.m_uConfirmDelay );

        if ( !epainfo.m_f24hrTime )
        {
            if ( epainfo.m_nPostFix1 == 1 )
                epainfo.m_uStartHour += 12;
            if ( epainfo.m_nPostFix2 == 1 )
                epainfo.m_uEndHour += 12;
        }
        m_uStartTime = epainfo.m_uStartHour * 60 + epainfo.m_uStartMin;
        theApp.WriteProfileInt( cszEpaEnergyStar, cszShutdownStart,
                m_uStartTime );
        m_uEndTime = epainfo.m_uEndHour * 60 + epainfo.m_uEndMin;
        theApp.WriteProfileInt( cszEpaEnergyStar, cszShutdownEnd,
                m_uEndTime );
    }
}

//--------------------------------------------------------------------------
void CConfigDlg::OnClickedPassword()
{
    GetDlgItem( IDC_SETPASSWORD )->EnableWindow(
            ((CButton*) GetDlgItem( IDC_PASSWORD ))->GetCheck() );
}

//--------------------------------------------------------------------------
void CConfigDlg::OnClickedSmartdocking()
{
    BOOL fState = ((CButton*) GetDlgItem( IDC_SMARTDOCKING ))->GetCheck();
    GetDlgItem( IDC_EPAMODE )->EnableWindow( fState );
    GetDlgItem( IDC_DISABLEEJECT )->EnableWindow( fState );
    GetDlgItem( IDC_DISABLECRT )->EnableWindow( fState );
}

/////////////////////////////////////////////////////////////////////////////
// CAboutDlg dialog

CAboutDlg::CAboutDlg(CWnd* pParent /*=NULL*/)
    : CDialog(CAboutDlg::IDD, pParent)
{
    //{{AFX_DATA_INIT(CAboutDlg)
    //}}AFX_DATA_INIT
}

#if 0
//--------------------------------------------------------------------------
void CAboutDlg::DoDataExchange(CDataExchange* pDX)
{
    CDialog::DoDataExchange(pDX);
    //{{AFX_DATA_MAP(CAboutDlg)
    //}}AFX_DATA_MAP
}
#endif

BEGIN_MESSAGE_MAP(CAboutDlg, CDialog)
    //{{AFX_MSG_MAP(CAboutDlg)
    //}}AFX_MSG_MAP
END_MESSAGE_MAP()

/////////////////////////////////////////////////////////////////////////////
// CAboutDlg message handlers
```

```
BOOL CAboutDlg::OnInitDialog()
{
    CDialog::OnInitDialog();
    GetDlgItem( IDC_VERSION )->SetWindowText( "Version "szVerName );
//    HICON hIcon = theApp.LoadIcon( IDI_DESKTOP );
//    hIcon = m_AboutIcon.SetIcon( hIcon );

    CenterWindow( GetDesktopWindow() );

    return TRUE; // return TRUE  unless you set the focus to a control
}
/////////////////////////////////////////////////////////////////////////////
// CScheduleDlg dialog

CScheduleDlg::CScheduleDlg(CWnd* pParent /*=NULL*/)
    : CDialog(CScheduleDlg::IDD, pParent)
{
    //{{AFX_DATA_INIT(CScheduleDlg)
    m_csTimeSlice = "";
    //}}AFX_DATA_INIT
}

//---------------------------------------------------------------------------
void CScheduleDlg::DoDataExchange(CDataExchange* pDX)
{
    CDialog::DoDataExchange(pDX);
    //{{AFX_DATA_MAP(CScheduleDlg)
    DDX_CBString(pDX, IDC_SCHEDULING, m_csTimeSlice);
    DDV_MaxChars(pDX, m_csTimeSlice, 4);
    //}}AFX_DATA_MAP
}

//---------------------------------------------------------------------------
BEGIN_MESSAGE_MAP(CScheduleDlg, CDialog)
    //{{AFX_MSG_MAP(CScheduleDlg)
    ON_BN_CLICKED(IDC_SCHHELP, OnClickedSchhelp)
    //}}AFX_MSG_MAP
END_MESSAGE_MAP()

/////////////////////////////////////////////////////////////////////////////
// CScheduleDlg message handlers

BOOL CScheduleDlg::OnInitDialog()
{
    CDialog::OnInitDialog();

    //CenterWindow( GetDesktopWindow() );

    // fill list of values
    CWnd* ComboBox = GetDlgItem( IDC_SCHEDULING );
    for ( int nIndex = 0; nIndex < NUMTIMERVALUES; nIndex++ )
        ComboBox->SendMessage( CB_ADDSTRING, NULL, (LONG)(LPSTR) TimerValues[nIndex] );
    ComboBox->SetFocus();

    return FALSE; // return TRUE  unless you set the focus to a control
}

//---------------------------------------------------------------------------
void CScheduleDlg::OnClickedSchhelp()
{
    theApp.WinHelp( IDM_HELPSCHEDULING );
```

```
}

/////////////////////////////////////////////////////////////////////////////
// CDdeDlg dialog

CDdeDlg::CDdeDlg(CWnd* pParent /*=NULL*/)
   : CDialog(CDdeDlg::IDD, pParent)
{
   //{{AFX_DATA_INIT(CDdeDlg)
   //}}AFX_DATA_INIT
}

//---------------------------------------------------------------------------
void CDdeDlg::DoDataExchange(CDataExchange* pDX)
{
   CDialog::DoDataExchange(pDX);
   //{{AFX_DATA_MAP(CDdeDlg)
   DDX_Control(pDX, IDC_APPLIST, m_cboxAppList);
   //}}AFX_DATA_MAP
}

//---------------------------------------------------------------------------
BEGIN_MESSAGE_MAP(CDdeDlg, CDialog)
   //{{AFX_MSG_MAP(CDdeDlg)
   ON_CBN_SELCHANGE(IDC_APPLIST, OnSelchangeApplist)
   ON_BN_CLICKED(IDC_DDEHELP, OnClickedDdehelp)
   ON_BN_CLICKED(IDC_DDEDELETE, OnClickedDdedelete)
   ON_BN_CLICKED(IDC_KEYTEST, OnKeytest)
   //}}AFX_MSG_MAP
END_MESSAGE_MAP()

/////////////////////////////////////////////////////////////////////////////
// CDdeDlg message handlers

BOOL CDdeDlg::OnInitDialog()
{
   CDialog::OnInitDialog();

   CString csAppName;
   char buffer[12];

   // Load apps from profile 1st
   for ( int nAppIndex = 0; nAppIndex <= DDEAPPMAX; nAppIndex++ )
   {
      sprintf( buffer, cszAppInfoFmt, nAppIndex );
      csAppName = theApp.GetProfileString( AfxGetAppName(), buffer );
      if ( !csAppName.IsEmpty() )
         m_cboxAppList.AddString( csAppName );
   }

   GetDlgItem( IDC_KEYSTRING )->SetWindowText( "% r%fs%{f4}" );

   m_cboxAppList.SetFocus();

   return FALSE; // return TRUE  unless you set the focus to a control
}

//---------------------------------------------------------------------------
void CDdeDlg::OnSelchangeApplist()
{
   CString csModule;
```

```
    // Get module name
    m_cboxAppList.GetLBText( m_cboxAppList.GetCurSel(), csModule );

    // Get key string
    CString csData( theApp.GetProfileString( csModule, cszKeyString ) );
    GetDlgItem( IDC_KEYSTRING )->SetWindowText( csData );

    // Get title
    csData = theApp.GetProfileString( csModule, cszAppName );
    GetDlgItem( IDC_APPTEXT )->SetWindowText( csData );

    // Get DDE command
    csData = theApp.GetProfileString( csModule, cszDDEString );
    GetDlgItem( IDC_APPSAVE )->SetWindowText( csData );

    // Get loop flag
    int nResult = theApp.GetProfileInt( csModule, cszLoopOnCmd, 0 /*-1*/ );
    ((CButton*) GetDlgItem( IDC_LOOPCMD ))->SetCheck( nResult );
}

//---------------------------------------------------------------------------
void CDdeDlg::OnOK()
{
    CDialog::OnOK();

    CString csAppList;
    m_cboxAppList.GetWindowText( csAppList );
    if ( !csAppList.IsEmpty() /*&& m_cboxAppList.GetModify()*/ )
    {
        CString csAppName;
        char szAppEntry[10];
        int nAppIndex = -1;

        // Search for unused number entry - on exit, szAppEntry contains string
        // to use to store new app entry
        do
        {
            // Make numbered string
            sprintf( szAppEntry, cszAppInfoFmt, ++nAppIndex );
            csAppName = theApp.GetProfileString( AfxGetAppName(),
                    szAppEntry );
        } while ( !csAppName.IsEmpty()
                && csAppList.CompareNoCase( csAppName ) != 0 );

        // Save info
        // Module name
        theApp.WriteProfileString( AfxGetAppName(), szAppEntry, csAppList );
        // Keystroke string
        GetDlgItem( IDC_KEYSTRING )->GetWindowText( csAppName );
        theApp.WriteProfileString( csAppList, cszKeyString, csAppName );
        // Module DDE name
        GetDlgItem( IDC_APPTEXT )->GetWindowText( csAppName );
        theApp.WriteProfileString( csAppList, cszAppName, csAppName );
        // DDE Close command
        GetDlgItem( IDC_APPSAVE )->GetWindowText( csAppName );
        theApp.WriteProfileString( csAppList, cszDDEString, csAppName );
        // Loop on cmd
        int nBstate = ((CButton*) GetDlgItem( IDC_LOOPCMD ))->GetCheck();
        theApp.WriteProfileBool( csAppList, cszLoopOnCmd, nBstate );
    }
```

```
}

//---------------------------------------------------------------------------
void CDdeDlg::OnClickedDdehelp()
{
   theApp.WinHelp( IDM_HELPDDESETUP );
}

//---------------------------------------------------------------------------
void CDdeDlg::OnClickedDdedelete()
{
   // Get app name
   CString csAppName;
   m_cboxAppList.GetWindowText( csAppName );

   // Delete section
   theApp.WriteProfileString( csAppName, NULL, NULL );

   // Search for number entry
   char szAppEntry[10];
   for ( int nAppIndex = 1; nAppIndex <= DDEAPPMAX; nAppIndex++ )
   {
      sprintf( szAppEntry, cszAppInfoFmt, nAppIndex );
      // If name matches, delete entry
      if ( csAppName.CompareNoCase( theApp.GetProfileString(
            AfxGetAppName(), szAppEntry ) ) == 0 )
      {
         theApp.WriteProfileString( AfxGetAppName(), szAppEntry, NULL );
         // Clear boxes
         int nIndex;
         if( ( nIndex = m_cboxAppList.GetCurSel() ) != CB_ERR )
         {
            GetDlgItem( IDC_KEYSTRING )->SetWindowText( "" );
            GetDlgItem( IDC_APPTEXT )->SetWindowText( "" );
            GetDlgItem( IDC_APPSAVE )->SetWindowText( "" );
            ((CButton*) GetDlgItem( IDC_LOOPCMD ))->SetCheck( 0 );
//             if ( FindAppEntry( csAppName ) == NULL )
               m_cboxAppList.DeleteString( nIndex );
            m_cboxAppList.SetWindowText( "" );
            break;
         }
      }
   }
}

//---------------------------------------------------------------------------
void CDdeDlg::OnKeytest()
{
   CString csSaveString;

   //OnOK();        // Save info first

   m_cboxAppList.GetWindowText( csSaveString );
   CWnd* pWnd = FindWindow( NULL, csSaveString );
   if ( pWnd )
   {
      //KeyCloseFiles( hWnd, 0L );
      CString csSaveString;
      GetDlgItem( IDC_KEYSTRING )->GetWindowText( csSaveString );
      if ( !csSaveString.IsEmpty() )
      {
```

```
            pWnd->SetActiveWindow();
            SendKeys( csSaveString );
        }
#if 0
        csSaveString = theApp.GetProfileString( csWndTitle, cszDDEString );
        GetDlgItem( IDC_APPSAVE )->GetWindowText( csSaveString );
        if ( !csSaveString.IsEmpty() )
            DdeCloseFiles( csWndTitle );
        }
#endif
    }
    else
        AfxMessageBox( "Application not found." );
}

#if 0
//---------------------------------------------------------------------------
AppInfo* FindAppEntry( const char* pcszModule )
{
    // Look in canned array
    for ( int nIndex = 0; nIndex < APPARRAYMAX; nIndex++ )
        if ( _stricmp( pcszModule, AppArray[nIndex].cszModule ) == 0 )
            break;

    return nIndex < APPARRAYMAX ? &(AppArray[nIndex]) : NULL;
}
#endif

/////////////////////////////////////////////////////////////////////////////
// CEpaDlg dialog

CEpaDlg::CEpaDlg(CWnd* pParent /*=NULL*/)
    : CDialog(CEpaDlg::IDD, pParent)
{
    //{{AFX_DATA_INIT(CEpaDlg)
    m_uStartMin = 0;
    m_uStartHour = 0;
    m_uEndHour = 0;
    m_uEndMin = 0;
    m_fEpaEnabled = FALSE;
    m_fManualResume = FALSE;
    m_fWeekends = FALSE;
    m_fInstantOn = FALSE;
    m_uConfirmDelay = 0;
    //}}AFX_DATA_INIT
    m_nPostFix1 = -1;
    m_nPostFix2 = -1;
}

void CEpaDlg::DoDataExchange(CDataExchange* pDX)
{
    CDialog::DoDataExchange(pDX);
    //{{AFX_DATA_MAP(CEpaDlg)
    DDX_Control(pDX, IDC_POSTFIX2, m_lbPostFix2);
    DDX_Control(pDX, IDC_POSTFIX1, m_lbPostFix1);
    DDX_Text(pDX, IDC_STARTMIN, m_uStartMin);
    DDX_Text(pDX, IDC_STARTHOUR, m_uStartHour);
    DDV_MinMaxUInt(pDX, m_uStartHour, 0, 23);
    DDX_Text(pDX, IDC_ENDHOUR, m_uEndHour);
    DDX_Text(pDX, IDC_ENDMIN, m_uEndMin);
    DDX_Check(pDX, IDC_EPAENABLE, m_fEpaEnabled);
```

```
    DDX_Check(pDX, IDC_MANUALRESUME, m_fManualResume);
    DDX_Check(pDX, IDC_WEEKENDS, m_fWeekends);
    DDX_Check(pDX, IDC_INSTANTON, m_fInstantOn);
    DDX_Text(pDX, IDC_CONFIRMDELAY, m_uConfirmDelay);
    //}}AFX_DATA_MAP
//  DDX_LBIndex(pDX, IDC_POSTFIX1, m_nPostFix1);
//  DDX_LBIndex(pDX, IDC_POSTFIX2, m_nPostFix2);
}

BEGIN_MESSAGE_MAP(CEpaDlg, CDialog)
    //{{AFX_MSG_MAP(CEpaDlg)
    ON_BN_CLICKED(IDC_EPAHELP, OnClickedEpahelp)
    ON_EN_KILLFOCUS(IDC_STARTHOUR, OnKillfocusStarthour)
    ON_EN_KILLFOCUS(IDC_STARTMIN, OnKillfocusStartmin)
    ON_EN_KILLFOCUS(IDC_ENDHOUR, OnKillfocusEndhour)
    ON_EN_KILLFOCUS(IDC_ENDMIN, OnKillfocusEndmin)
    ON_EN_KILLFOCUS(IDC_CONFIRMDELAY, OnKillfocusConfirmdelay)
    ON_BN_CLICKED(IDC_EPAENABLE, OnClickedEpaenable)
    ON_BN_CLICKED(IDC_MANUALRESUME, OnClickedManualresume)
    //}}AFX_MSG_MAP
END_MESSAGE_MAP()

/////////////////////////////////////////////////////////////////////////////
// CEpaDlg message handlers

//--------------------------------------------------------------------------
BOOL CEpaDlg::OnInitDialog()
{
    CDialog::OnInitDialog();

    // Subclass time ctls to restrict entry to numbers
    m_ebStartHour.SubclassDlgItem( IDC_STARTHOUR, this );
    m_ebStartMin.SubclassDlgItem( IDC_STARTMIN, this );
    m_ebEndHour.SubclassDlgItem( IDC_ENDHOUR, this );
    m_ebEndMin.SubclassDlgItem( IDC_ENDMIN, this );
    m_ebConfirmDelay.SubclassDlgItem( IDC_CONFIRMDELAY, this );

    // Add leading zeros as needed
    m_ebStartMin.LeadZero();
    m_ebEndMin.LeadZero();
//  if ( ::GetProfileInt( cszIntl, "iTLZero", 0 ) )
//  {
        m_ebStartHour.LeadZero();
        m_ebEndHour.LeadZero();
//  }

    char szBuffer[16];

    if ( !m_f24hrTime )
    {
        m_lbPostFix1.ShowWindow( SW_SHOWNA );
        m_lbPostFix2.ShowWindow( SW_SHOWNA );
        ::GetProfileString( cszIntl, "s1159", "", szBuffer, sizeof( szBuffer ) );
        m_lbPostFix1.AddString( szBuffer );
        m_lbPostFix2.AddString( szBuffer );
        ::GetProfileString( cszIntl, "s2359", "", szBuffer, sizeof( szBuffer ) );
        m_lbPostFix1.AddString( szBuffer );
        m_lbPostFix2.AddString( szBuffer );
        m_lbPostFix1.SetTopIndex( m_nPostFix1 );
        m_lbPostFix2.SetTopIndex( m_nPostFix2 );
    }
```

```
    // Set separators
    ::GetProfileString( cszIntl, "sTime", "", szBuffer, sizeof( szBuffer ) );
    GetDlgItem( IDC_COLON1 )->SetWindowText( szBuffer );
    GetDlgItem( IDC_COLON2 )->SetWindowText( szBuffer );

    OnClickedEpaenable();

    return TRUE; // return TRUE  unless you set the focus to a control
}

//--------------------------------------------------------------------------
void CEpaDlg::OnOK()
{
    m_nPostFix1 = m_lbPostFix1.GetTopIndex();
    m_nPostFix2 = m_lbPostFix2.GetTopIndex();

    CDialog::OnOK();
}

//--------------------------------------------------------------------------
void CEpaDlg::OnClickedEpaenable()
{
    BOOL fState = ((CButton*) GetDlgItem( IDC_EPAENABLE ))->GetCheck();
    GetDlgItem( IDC_MANUALRESUME )->EnableWindow( fState );
    GetDlgItem( IDC_WEEKENDS )->EnableWindow( fState );
    GetDlgItem( IDC_INSTANTON )->EnableWindow( fState && TiNb.GetSuspendSupport() );
    m_ebStartHour.EnableWindow( fState );
    m_ebStartMin.EnableWindow( fState );
    m_ebEndHour.EnableWindow( fState );
    m_ebEndMin.EnableWindow( fState );
    m_ebConfirmDelay.EnableWindow( fState );
    m_lbPostFix1.EnableWindow( fState );
    m_lbPostFix2.EnableWindow( fState );
    GetDlgItem( IDC_COLON1 )->EnableWindow( fState );
    GetDlgItem( IDC_COLON2 )->EnableWindow( fState );
    GetDlgItem( IDC_EPASTATIC1 )->EnableWindow( fState );
    GetDlgItem( IDC_EPASTATIC2 )->EnableWindow( fState );
    GetDlgItem( IDC_EPASTATIC3 )->EnableWindow( fState );
    GetDlgItem( IDC_EPASTATIC4 )->EnableWindow( fState );

    if ( fState )
        OnClickedManualresume();
}

//--------------------------------------------------------------------------
void CEpaDlg::OnClickedEpahelp()
{
    theApp.WinHelp( IDM_HELPEPASETUP );
}

//--------------------------------------------------------------------------
void CEpaDlg::OnKillfocusStarthour()
{
     m_ebStartHour.CheckLimit( 0, 23, m_uStartHour );
}

//--------------------------------------------------------------------------
void CEpaDlg::OnKillfocusStartmin()
{
     m_ebStartMin.CheckLimit( 0, 59, m_uStartMin );
}
```

```
//---------------------------------------------------------------------------
void CEpaDlg::OnKillfocusEndhour()
{
    m_ebEndHour.CheckLimit( 0, 23, m_uEndHour );
}

//---------------------------------------------------------------------------
void CEpaDlg::OnKillfocusEndmin()
{
    m_ebEndMin.CheckLimit( 0, 59, m_uEndMin );
}

//---------------------------------------------------------------------------
void CEpaDlg::OnKillfocusConfirmdelay()
{
    m_ebConfirmDelay.CheckLimit( 1, 30, m_uConfirmDelay );
}

//---------------------------------------------------------------------------
void CEpaDlg::OnClickedManualresume()
{
   BOOL fState = !((CButton*) GetDlgItem( IDC_MANUALRESUME ))->GetCheck();
   m_ebEndHour.EnableWindow( fState );
   m_ebEndMin.EnableWindow( fState );
   m_lbPostFix2.EnableWindow( fState );
   GetDlgItem( IDC_EPASTATIC2 )->EnableWindow( fState );
   GetDlgItem( IDC_COLON2 )->EnableWindow( fState );
}

/////////////////////////////////////////////////////////////////////////////
// CChgPswdDlg dialog

CChgPswdDlg::CChgPswdDlg(CWnd* pParent /*=NULL*/)
   : CDialog(CChgPswdDlg::IDD, pParent)
{
   //{{AFX_DATA_INIT(CChgPswdDlg)
      // NOTE: the ClassWizard will add member initialization here
   //}}AFX_DATA_INIT
}

void CChgPswdDlg::DoDataExchange(CDataExchange* pDX)
{
   CDialog::DoDataExchange(pDX);
   //{{AFX_DATA_MAP(CChgPswdDlg)
      // NOTE: the ClassWizard will add DDX and DDV calls here
   //}}AFX_DATA_MAP
}

BEGIN_MESSAGE_MAP(CChgPswdDlg, CDialog)
   //{{AFX_MSG_MAP(CChgPswdDlg)
   ON_EN_CHANGE(ID_ETOLD, OnChangeOldPswd)
   ON_EN_CHANGE(ID_ETNEW, OnChangeNewPswd)
   //}}AFX_MSG_MAP
END_MESSAGE_MAP()

/////////////////////////////////////////////////////////////////////////////
// CChgPswdDlg message handlers

//---------------------------------------------------------------------------
BOOL CChgPswdDlg::OnInitDialog()
{
```

```
    CDialog::OnInitDialog();

    BOOL fOldExists = !(theApp.GetProfileString( AfxGetAppName(),
          cszPassword )).IsEmpty();
    GetDlgItem( ID_OLDTEXT )->EnableWindow( fOldExists );
    GetDlgItem( ID_ETOLD )->EnableWindow( fOldExists );
    GetDlgItem( ID_NEWTEXT )->EnableWindow( !fOldExists );
    GetDlgItem( ID_ETNEW )->EnableWindow( !fOldExists );
    GetDlgItem( ID_AGAIN )->EnableWindow( !fOldExists );
    GetDlgItem( ID_ETAGAIN )->EnableWindow( !fOldExists );
    GetDlgItem( IDOK )->EnableWindow( fOldExists );

    return TRUE; // return TRUE  unless you set the focus to a control
}

//---------------------------------------------------------------------------
void CChgPswdDlg::OnOK()
{
    // Get strings
    CString csOldPswd, csNewPswd, csRetypePswd;
    GetDlgItem( ID_ETOLD )->GetWindowText( csOldPswd );
    GetDlgItem( ID_ETNEW )->GetWindowText( csNewPswd );
    GetDlgItem( ID_ETAGAIN )->GetWindowText( csRetypePswd );

    // Verify old password
    if ( CheckPassword( csOldPswd ) != theApp.GetProfileInt( AfxGetAppName(),
          cszPassword, 12 ) )
    {
       AfxMessageBox( "Old password invalid" );
       return;
    }

    // Verify match with retype
    if ( csNewPswd.CompareNoCase( csRetypePswd ) != 0 )
    {
       AfxMessageBox( "Passwords don't match" );
       return;
    }

    // Save it
    theApp.WriteProfileInt( AfxGetAppName(), cszPassword, CheckPassword( csNewPswd ) );

    CDialog::OnOK();
}

//---------------------------------------------------------------------------
void CChgPswdDlg::OnChangeOldPswd()
{
    CString csOldPswd;
    GetDlgItem( ID_ETOLD )->GetWindowText( csOldPswd );
    BOOL fOldExists = !csOldPswd.IsEmpty();
    GetDlgItem( ID_NEWTEXT )->EnableWindow( fOldExists );
    GetDlgItem( ID_ETNEW )->EnableWindow( fOldExists );
    GetDlgItem( ID_AGAIN )->EnableWindow( fOldExists );
    GetDlgItem( ID_ETAGAIN )->EnableWindow( fOldExists );
}

//---------------------------------------------------------------------------
void CChgPswdDlg::OnChangeNewPswd()
{
    CString csNewPswd;
```

```
    GetDlgItem( ID_ETNEW )->GetWindowText( csNewPswd );
    GetDlgItem( IDOK )->EnableWindow( !csNewPswd.IsEmpty() );
}
/////////////////////////////////////////////////////////////////////////////
// CGetPswdDlg dialog

CGetPswdDlg::CGetPswdDlg(CWnd* pParent /*=NULL*/)
    : CDialog(CGetPswdDlg::IDD, pParent)
{
    //{{AFX_DATA_INIT(CGetPswdDlg)
        // NOTE: the ClassWizard will add member initialization here
    //}}AFX_DATA_INIT
}

void CGetPswdDlg::DoDataExchange(CDataExchange* pDX)
{
    CDialog::DoDataExchange(pDX);
    //{{AFX_DATA_MAP(CGetPswdDlg)
        // NOTE: the ClassWizard will add DDX and DDV calls here
    //}}AFX_DATA_MAP
}

BEGIN_MESSAGE_MAP(CGetPswdDlg, CDialog)
    //{{AFX_MSG_MAP(CGetPswdDlg)
    //}}AFX_MSG_MAP
END_MESSAGE_MAP()

/////////////////////////////////////////////////////////////////////////////
// CGetPswdDlg message handlers

//---------------------------------------------------------------------------
BOOL CGetPswdDlg::OnInitDialog()
{
    CDialog::OnInitDialog();

    CenterWindow( GetDesktopWindow() );

    return TRUE;  // return TRUE  unless you set the focus to a control
}

//---------------------------------------------------------------------------
void CGetPswdDlg::OnOK()
{
    CString csPswd;
    GetDlgItem( ID_ETPASSWORD )->GetWindowText( csPswd );

    // Verify password
    if ( CheckPassword( csPswd ) != theApp.GetProfileInt( AfxGetAppName(),
            cszPassword, 12 ) )
    {
        AfxMessageBox( "Invalid password", MB_OK | MB_ICONSTOP );
        return;
    }

    CDialog::OnOK();
}
/////////////////////////////////////////////////////////////////////////////
// CShutdownMsg dialog

CShutdownMsg::CShutdownMsg(CWnd* pParent /*=NULL*/)
    : CDialog(CShutdownMsg::IDD, pParent)
```

```
{
   Create( CShutdownMsg::IDD, pParent );
   //{{AFX_DATA_INIT(CShutdownMsg)
      // NOTE: the ClassWizard will add member initialization here
   //}}AFX_DATA_INIT
}

void CShutdownMsg::DoDataExchange(CDataExchange* pDX)
{
   CDialog::DoDataExchange(pDX);
   //{{AFX_DATA_MAP(CShutdownMsg)
   DDX_Control(pDX, IDC_QUESTION, m_iQuestion);
   //}}AFX_DATA_MAP
}

BEGIN_MESSAGE_MAP(CShutdownMsg, CDialog)
   //{{AFX_MSG_MAP(CShutdownMsg)
   //}}AFX_MSG_MAP
END_MESSAGE_MAP()

/////////////////////////////////////////////////////////////////////////////
// CShutdownMsg message handlers

BOOL CShutdownMsg::OnInitDialog()
{
   CDialog::OnInitDialog();

   CenterWindow( GetDesktopWindow() );
   HICON hIcon = theApp.LoadIcon( IDI_QUESTION );
   hIcon = m_iQuestion.SetIcon( hIcon );

   return TRUE; // return TRUE  unless you set the focus to a control
}

//---------------------------------------------------------------------------
void CShutdownMsg::OnCancel()
{
   GetParent()->PostMessage( WM_USER, IDCANCEL );
}

//---------------------------------------------------------------------------
void CShutdownMsg::OnOK()
{
   GetParent()->PostMessage( WM_USER, IDOK );
}

/////////////////////////////////////////////////////////////////////////////
// CNumEdit

CNumEdit::CNumEdit()
{
}

CNumEdit::~CNumEdit()
{
}

BEGIN_MESSAGE_MAP(CNumEdit, CEdit)
   //{{AFX_MSG_MAP(CNumEdit)
   ON_WM_CHAR()
   //}}AFX_MSG_MAP
```

```
END_MESSAGE_MAP()

/////////////////////////////////////////////////////////////////////////////
// CNumEdit message handlers

void CNumEdit::OnChar( UINT nChar, UINT nRepCnt, UINT nFlags )
{
   if ( isdigit( nChar ) || iscntrl( nChar ) )
      CWnd::OnChar( nChar, nRepCnt, nFlags );
}

//---------------------------------------------------------------------------
void CNumEdit::CheckLimit( UINT uMin, UINT uMax, UINT& uSavedVal )
{
   UINT uNewVal = 0;
   CRfxString csTime;
   GetWindowText( csTime );              // Get ctrl text
   sscanf( csTime, "%d", &uNewVal );     // Convert to int
   if ( uNewVal < uMin || uNewVal > uMax )
   {
      csTime.printf( "%d", uSavedVal );  // Restore old value
      SetWindowText( csTime );
   }
   else
      uSavedVal = uNewVal;
}

//---------------------------------------------------------------------------
void CNumEdit::LeadZero()
{
   char szBuffer[16];
   GetWindowText( szBuffer, sizeof( szBuffer ) );
   if ( strlen( szBuffer ) < 2 )
   {
      szBuffer[2] = '\0';
      szBuffer[1] = szBuffer[0];
      szBuffer[0] = '0';
      SetWindowText( szBuffer );
   }
}

//---------------------------------------------------------------------------
WORD CheckPassword( const char* pszEntry )
{
   BYTE bValue = 12;
   char szString[] = "Shutdown";

   for ( const char* pChar = pszEntry; *pChar != '\0'; pChar++ )
   {
      bValue += *pChar ^ ( szString[ *pChar % sizeof( szString ) ] );
   }

   return bValue;
}
```

```
/*___________________________________________________________
 |                                      |
 | (c) Copyright, Texas Instruments Incorporated, 1992.  All Rights    |
 | Reserved.  Property of Texas Instruments Incorporated. Restricted   |
 | Rights -- Use, duplication or disclosure subject to restrictions set  |
 | forth in TI's Program License Agreement and associated documentation. |
 |___________________________________________________________|

 $Workfile:  CDDECLNT.H  $

 $Revision:  1.4  $
    $Date:  16 Sep 1993 15:38:12  $
    Author:  Robert Tonsing
    (Adapted from Microsoft CDDEML example)
===============================================================================
*/
#include <ddeml.h>

/////////////////////////////////////////////////////////////////////////////
// CDDEClient window

class CDDEClient
{
private:
   PFNCALLBACK m_lpCallback;

   // Callback function
   static HDDEDATA _export CALLBACK DDEClientCallback( UINT type, UINT fmt,
         HCONV hConv, HSZ hsz1, HSZ hsz2, HDDEDATA hData, DWORD dwData1,
         DWORD dwData2 );

   static CDDEClient* m_pClient;
   DWORD m_idInst;
   HCONV m_hConv;
//   HSZ m_hszService;
//   HSZ m_hszTopic;

public:
   CDDEClient();
   ~CDDEClient();

// Operations
   BOOL Connect( LPCSTR pszService, LPCSTR pszTopic );
   BOOL Disconnect()
      { return ::DdeDisconnect( m_hConv ); }
   HSZ DdeCreateStringHandle( LPCSTR lpszString, int codepage = CP_WINANSI )
      { return ::DdeCreateStringHandle( m_idInst, lpszString, codepage ); }
   BOOL DdeFreeStringHandle( HSZ hSz )
      { return ::DdeFreeStringHandle( m_idInst, hSz ); }

   DWORD DdeClientRequest( LPCSTR pszItem, LPSTR pszBuffer, int cbData );
   HDDEDATA DdeClientExecute( char* pszAction )
      { return DdeClientTransaction( pszAction, strlen( pszAction ) + 1,
            NULL, XTYP_EXECUTE ); }


   HDDEDATA DdeClientTransaction( void FAR* lpvData, DWORD cbData,
         HSZ hszItem, UINT uType, DWORD uTimeout = 1000,
         DWORD FAR* lpuResult = NULL )
      { return ::DdeClientTransaction( lpvData, cbData, m_hConv, hszItem,
            CF_TEXT, uType, uTimeout, lpuResult ); }
```

```
   DWORD DdeGetData( HDDEDATA hData, void FAR* lpvData, DWORD cbMax,
         DWORD offSrc )
      { return ::DdeGetData( hData, lpvData, cbMax, offSrc ); }


#if 0
   HDDEDATA DdeCreateDataHandle( LPBYTE lpvSrcBuf, DWORD cbInitData,
         DWORD OffSrcBuf, HSZ hszItem, UINT uFmt, UINT afCmd )
      { return ::DdeCreateDataHandle( m_idInst, lpvSrcBuf, cbInitData,
            OffSrcBuf, hszItem, uFmt, afCmd ); }
   BOOL DdeFreeDataHandle( HDDEDATA hData )
      { return ::DdeFreeDataHandle( hData ); }
   BOOL DdeFreeStringHandle( HSZ hsz )
      { return ::DdeFreeStringHandle( m_idInst, hsz ); }
   BOOL DdeKeepStringHandle( HSZ hsz )
      { return ::DdeKeepStringHandle( m_idInst, hsz ); }
   DWORD DdeQueryString( HSZ hsz, LPSTR lpsz, DWORD cchMax,
         int codepage = CP_WINANSI )
      { return ::DdeQueryString( m_idInst, hsz, lpsz, cchMax, codepage ); }
   HDDEDATA DdeNameService( HSZ hszServ, HSZ hszRes, UINT afCmd )
      { return ::DdeNameService( m_idInst, hszServ, hszRes, afCmd ); }

   // Callback functions
   void OnRegister( HSZ hszBaseServName, HSZ hszInstServName );
   void OnUnregister( HSZ hszBaseServName, HSZ hszInstServName );
   virtual BOOL OnConnect( HSZ hszTopic, HSZ hszService, CONVCONTEXT FAR *pcc,
         BOOL fSameInstance )
      { return FALSE; }
   virtual void OnDisconnect( BOOL fSameInst)
      {}
   virtual HDDEDATA OnRequest( UINT wFmt, HSZ hszTopic, HSZ hszItem )
      { return NULL; }
#endif
};

#if 0
class CAppWnd;

class CMyServer : public CDDEServer
{
private:
   HSZ m_hszShell;
   HSZ m_hszAppProperties;
   HSZ m_hszGetDesc;
   HSZ m_hszGetDir;
   HSZ m_hszGetIcon;

public:
   static CAppWnd* m_pLastRunApp;
   static HINSTANCE m_hLastRunInst;

   CMyServer();
   ~CMyServer();
   BOOL OnConnect( HSZ hszTopic, HSZ hszService, CONVCONTEXT FAR *pcc,
         BOOL fSameInstance );
   void OnDisconnect( BOOL fSameInst);
   HDDEDATA OnRequest( UINT wFmt, HSZ hszTopic, HSZ hszItem );
   HDDEDATA TextReply( HSZ hszItem );
   HDDEDATA IconReply();
};
#endif
```

////////////////////////////////////////////////////////////////////////////////////////////////////////

```
/*___________________________________________________________________
 |                                         |
 | (c) Copyright, Texas Instruments Incorporated, 1992.  All Rights    |
 | Reserved.   Property of Texas Instruments Incorporated.  Restricted  |
 | Rights -- Use, duplication or disclosure subject to restrictions set |
 | forth in TI's Program License Agreement and associated documentation. |
 |___________________________________________________________________|

  $Workfile:  CDDECLNT.CPP  $

  $Revision:  1.3  $
     $Date:  16 Sep 1993 15:38:02  $
    Author:  Robert Tonsing
===========================================================================
*/
#include "rfx.h"
#include "cddeclnt.h"

#ifdef _DEBUG
#undef THIS_FILE
static char BASED_CODE THIS_FILE[] = __FILE__;
#endif

// Init ptr to Server object
CDDEClient* CDDEClient::m_pClient = NULL;

/////////////////////////////////////////////////////////////////////////////
// CDDEServer
//
CDDEClient::CDDEClient()
{
   m_pClient = this;
   m_idInst = 0L;
   m_lpCallback = (PFNCALLBACK) MakeProcInstance( (FARPROC) DDEClientCallback,
         AfxGetInstanceHandle() );
   ::DdeInitialize( &m_idInst, m_lpCallback, 0L, 0L /* afCmd, uRes */ );
}

//-------------------------------------------------------------------------
CDDEClient::~CDDEClient()
{
   ::DdeUninitialize( m_idInst );
   FreeProcInstance( (FARPROC) m_lpCallback );
}

//-------------------------------------------------------------------------
BOOL CDDEClient::Connect( LPCSTR pszService, LPCSTR pszTopic )
{
   HSZ m_hszService = DdeCreateStringHandle( pszService );
   HSZ m_hszTopic = DdeCreateStringHandle( pszTopic );
   m_hConv = ::DdeConnect( m_idInst, m_hszService, m_hszTopic, NULL );
   DdeFreeStringHandle( m_hszService );
   DdeFreeStringHandle( m_hszTopic );
   return m_hConv == NULL ? FALSE : TRUE;
}

//-------------------------------------------------------------------------
DWORD CDDEClient::DdeClientRequest( LPCSTR pszItem, LPSTR pszBuffer,
      int cbData )
{
   HSZ hszItem = DdeCreateStringHandle( pszItem ); // Get string handle
```

```
    // Make request
    HDDEDATA hData = DdeClientTransaction( NULL, 0, hszItem, XTYP_REQUEST );
    DdeFreeStringHandle( hszItem );              // Free string handle
    // If it succeeded, get string data
    return hData ? DdeGetData( hData, pszBuffer, cbData, 0 ) : 0;
}

//---------------------------------------------------------------------------
// DDEML Server Callback function
//
HDDEDATA _export CALLBACK CDDEClient::DDEClientCallback( UINT type, UINT fmt,
            HCONV hConv, HSZ hsz1, HSZ hsz2, HDDEDATA hData, DWORD dwData1,
            DWORD dwData2)
{
    // look up the object
//    CDDEServerConv * pThisConv;

//    if(hConv && (type != XTYP_CONNECT_CONFIRM))
//        pThisConv = FromHandle(hConv);

    switch( type )
    {
#if 0
        case XTYP_CONNECT:
            return (HDDEDATA) CDDEClient::m_pClient->OnConnect( hsz1, hsz2,
                    (CONVCONTEXT FAR*) dwData1, (BOOL) dwData2 );
            break;
        case XTYP_DISCONNECT:
            CDDEClient::m_pClient->OnDisconnect( (BOOL) dwData2 );
            break;
        case XTYP_REGISTER:
            CDDEClient::m_pClient->OnRegister( hsz1, hsz2 );
            break;
        case XTYP_UNREGISTER:
            CDDEClient::m_pClient->OnUnregister( hsz1, hsz2 );
            break;
        case XTYP_REQUEST:
            return CDDEClient::m_pClient->OnRequest( fmt, hsz1, hsz2 );
            break;
        case XTYP_WILDCONNECT:
            //return (HDDEDATA) CDDEServer::m_pServer->OnWildConnect(fmt,hsz1,hsz2,(CONVCONTEXT
FAR *)dwData1,(BOOL)dwData2);
            break;
        case XTYP_CONNECT_CONFIRM:
            //CDDEServer::m_pServer->OnConnectConfirm(hConv,hsz1,hsz2,(BOOL)dwData2);
            break;
        case XTYP_ADVREQ:
            //return (HDDEDATA) pThisConv->OnAdvReq(fmt,hsz1,hsz2,LOWORD(dwData1));
            break;
        case XTYP_POKE:
            //return (HDDEDATA) pThisConv->OnPoke(hsz1,hsz2,hData);
            break;
        case XTYP_EXECUTE:
            //return (HDDEDATA) pThisConv->OnExecute(hsz1,hData);
            break;
        case XTYP_ADVSTART:
            //return (HDDEDATA) pThisConv->OnAdvStart(hsz2,hsz2);
            break;
        case XTYP_ADVSTOP:
            //pThisConv->OnAdvStop(hsz1,hsz2);
            break;
```

```
#endif
        default:
            break;
    };
    return NULL;
}

#if 0
//-----------------------------------------------------------------------
void CDDEClient::OnRegister( HSZ hszBaseServName, HSZ hszInstServName )
{
//  DdeKeepStringHandle( hszBaseServName );
//  DdeKeepStringHandle( hszInstServName );

};

//-----------------------------------------------------------------------
void CDDEClient::OnUnregister( HSZ hszBaseServName, HSZ hszInstServName )
{
//  DdeFreeStringHandle( hszBaseServName );
//  DdeFreeStringHandle( hszInstServName );
};
#endif

#if 0
/////////////////////////////////////////////////////////////////////////////
// CDDEServer
//
CMyServer::CMyServer()
{
    m_hszShell = DdeCreateStringHandle( "Shell" );    // NULL=fail
    m_hszAppProperties = DdeCreateStringHandle( "AppProperties" );
    DdeNameService( m_hszShell, (HSZ) NULL, DNS_REGISTER ); // 0=fail
    TRACE( "CMyServer constructed\n" );
}

//-----------------------------------------------------------------------
CMyServer::~CMyServer()
{
    DdeNameService( m_hszShell, (HSZ) NULL, DNS_UNREGISTER ); // 0=fail
    DdeFreeStringHandle( m_hszAppProperties );
    DdeFreeStringHandle( m_hszShell );
    TRACE( "CMyServer destroyed\n" );
}

//-----------------------------------------------------------------------
BOOL CMyServer::OnConnect( HSZ hszTopic, HSZ hszService, CONVCONTEXT FAR *pcc,
    BOOL fSameInstance )
{
    if ( !DdeCmpStringHandles( hszTopic, m_hszAppProperties ) )
    {
        m_hszGetDesc = DdeCreateStringHandle( "GetDescription" );
        m_hszGetDir = DdeCreateStringHandle( "GetWorkingDIR" );
        m_hszGetIcon = DdeCreateStringHandle( "GetIcon" );
        return TRUE;
    }
    return FALSE;
}

//-----------------------------------------------------------------------
void CMyServer::OnDisconnect( BOOL fSameInst)
```

```
{
   DdeFreeStringHandle( m_hszGetIcon );
   DdeFreeStringHandle( m_hszGetDir );
   DdeFreeStringHandle( m_hszGetDesc );
   m_pLastRunApp = NULL;
   m_hLastRunInst = NULL;
}

//-------------------------------------------------------------------------
HDDEDATA CMyServer::OnRequest( UINT wFmt, HSZ hszTopic, HSZ hszItem )
{
//   char buffer[256];
//   sprintf( buffer, "Request: inst=%x, wFmt=%x, Topic=%lx, Item=%lx",
//          m_hLastRunInst, wFmt, hszTopic, hszItem );
//   MessageBox( NULL, buffer, "Test", MB_OK );

   // Does this app belong to us?
   if ( (HINSTANCE) wFmt != m_hLastRunInst )
      return NULL;

   if ( !DdeCmpStringHandles( hszItem, m_hszGetDesc )
         || !DdeCmpStringHandles( hszItem, m_hszGetDir ) )
      return TextReply( hszItem );
   else if( !DdeCmpStringHandles( hszItem, m_hszGetIcon ) )
      return IconReply();
   else
      return NULL;
}

//-------------------------------------------------------------------------
// Reply to WinOldApp request for description or working directory
//
HDDEDATA CMyServer::TextReply( HSZ hszItem )
{
   const char* pszText = !DdeCmpStringHandles( hszItem, m_hszGetDesc )
         ? m_pLastRunApp->GetTitle()
         : m_pLastRunApp->GetStartDir();

   return DdeCreateDataHandle(
         (LPBYTE) pszText,   // address of source buffer
         strlen( pszText ) + 1,  // length of global memory object
         0L,                 // offset from beginning of source buffer
         hszItem,            // handle of item-name string
         CF_TEXT,            // clipboard data format
         0 );                // creation flags
}

#endif
```

```
//_______________________________________________________________
//                                                |
// (c) Copyright, Texas Instruments Incorporated, 1993. All Rights   |
// Reserved. Property of Texas Instruments Incorporated. Restricted  |
// Rights -- Use, duplication or disclosure subject to restrictions set |
// forth in TI's Program License Agreement and associated documentation. |
//_______________________________________________________________|
//
// $Workfile: EXTSETUP.CPP $
// $Revision: 1.13 $
//    $Date: 22 Sep 1993 22:38:04 $
//   Author: Robert Tonsing
//     Site: Temple
// Language: C++
//
//=====================================================================
#define SETUP_CPP 1
#include <stdio.h>
#include "setdock.h"
#include "pg0data.h"
#include "pg1data.h"
#include "pg2data.h"
//#include "msmouse.h"
#include "screen.h"
#include "sdata.h"
#include "keyboard.h"
#include "version.h"

#define PAGECOUNT  3

void reboot();
BOOL InWindows();

const char cszVersion[]    = "Version "szVerName" "__DATE__;
const char cszEmpty[]      = "";
const char cszColon[]      = ":";
const char cszOff[]        = "Off";
const char cszOn[]         = "On";
//const char cszAuto[]     = "Auto";
const char cszDisabled[]   = "Disabled";

const char* NullArray[] =
{
   NULL
};

const char* paOffOnStrings[] =
{
   cszOff,
   cszOn,
   NULL
};

const char* paNoYesStrings[] =
{
   "No",
   "Yes",
   NULL
};

const char* paDisabledEnabledStrings[] =
```

```
{
   cszDisabled,
   "Enabled",
   NULL
};

struct ButtonStruct {          // Button text and corresponding keystroke
   const char* cszText;
   WORD wKey;
};

static ButtonStruct Buttons[] = // Main window buttons
{
   { "Esc=Exit", ESC },
   { "F1=Help", F1 },
//   { "F2=Info", F2 },
   { cszEmpty, 0 },
   { cszEmpty, 0 },
   { "\x18\x19 Field", DOWNARROW },
   { "+/- Value", SPACEBAR },
   { "PgUp/PgDn", PGDN }
};
#define BUTTONCOUNT ( sizeof( Buttons ) / sizeof( ButtonStruct ) )

#if 0
static ButtonStruct ExitButtons[] = // Exit window buttons
{
   { "Esc=Continue", ESC },
   { cszEmpty, 0 },
   { cszEmpty, 0 },
   { cszEmpty, 0 },
   { "\x18\x19 Field", DOWNARROW },
   { "+/- Value", SPACEBAR },
   { "PgUp/PgDn", PGDN }
};
#endif

static ButtonStruct ExitKeys[] =    // Exit window buttons
{
   { "ESC", ESC },
   { "F4",  F4  },
   { "F5",  F5  },
   { "F6",  F6  }
};
#define EXITKEYCOUNT ( sizeof( ExitKeys ) / sizeof( ButtonStruct ) )

static const char* ExitText[] =     // Exit window text
{
   "Continue with SETUP.",
   "",
   "Save values, exit",
   "SETUP and reboot.",
   "",
   "Load default values",
   "for all pages.",
   "",
   "Abort SETUP without",
   "saving values.",
   NULL
};
```

```
class MainApp
{
private:
    DataWnd* PageWnd[ PAGECOUNT ];
    int CurrentPage;
    BOOL fReboot;

    WORD WaitForInput();
    BOOL ExitFunc();
    void SysInfo();
    void DrawFuncKeys();
    void HelpFunc();
    void WindowsMsg();

public:
    MainApp();
    ~MainApp();
    BOOL Idle();
};

//=====================================================================
void main()
{
    WORD wValue;
    if ( TiReadConfig( OEMMODELID, &wValue ) != SUCCESS
          || TiReadConfig( DOCKABLE, &wValue ) != SUCCESS || wValue == 0 )
    {
        puts( "This is not a dockable system." );
        exit( 1 );
    }

    MainApp SetupApp;

    while ( SetupApp.Idle() )
        ;
}

//=====================================================================
MainApp::MainApp()
    : CurrentPage( 0 ), fReboot( FALSE )
{

    if ( CheckDockCMOS() )
    {
        puts( "\nInvalid Docking Station CMOS checksum - CMOS set to defaults.\n\nPress any key to
continue..." );
        WaitForInput();
    }

    CursorOff();

    // Paint Main window
    DrawBox( MAIN_ROW, MAIN_COLUMN, MAIN_ROW + MAIN_HEIGHT - 1,
          MAIN_COLUMN + MAIN_WIDTH - 1,  MAIN_ATTRIBUTE, BORDER_DOUBLE,
          SHADOW_OFF, 0 );
    // Draw horizontal lines
    ShowChar( TOPLINE_ROW, LINE_COLUMN, LINE_CHAR, LINE_ATTRIBUTE,
          LINE_LENGTH );
    ShowChar( BOTTOMLINE_ROW, LINE_COLUMN, LINE_CHAR, LINE_ATTRIBUTE,
          LINE_LENGTH );
```

```
    // Paint Title window
    DrawBox( TITLE_ROW, TITLE_COLUMN, TITLE_ROW + TITLE_HEIGHT - 1,
          TITLE_COLUMN + TITLE_WIDTH - 1, TITLE_ATTRIBUTE, BORDER_NONE,
          SHADOW_OFF, 0 );
    ShowString( TITLE_ROW, TITLE_COLUMN + ( TITLE_WIDTH / 2 ),
          "TravelMate DeskTop/MicroDock Setup Program", TITLE_ATTRIBUTE, TITLE_CENTERED );
    ShowString( TITLE_ROW + 1, TITLE_COLUMN + ( TITLE_WIDTH / 2 ),
          cszVersion, TITLE_ATTRIBUTE, TITLE_CENTERED );

    DrawFuncKeys();    // Paint Button windows

    // Create Data windows
    PageWnd[ 0 ] = new Page0Wnd();
    PageWnd[ 1 ] = new Page1Wnd();
    PageWnd[ 2 ] = new Page2Wnd();
//  PageWnd[ 3 ] = new Page3Wnd();

    PageWnd[ 0 ]->Paint();
}

//==================================================================
MainApp::~MainApp()
{
    // Clean up allocated window objects
    for ( int i = 0; i < PAGECOUNT; i++ )
       delete PageWnd[ i ];

    ClearBox( 0, 0, 24, 79, WHITE_FORE | BLACK_BACK );
    SetCurPos( 0, 0 );
    CursorOn();

    if ( fReboot )
    {
       if ( InWindows() )      // is windows running?
          WindowsMsg();
       else
          reboot();
    }
}

//#include <stdio.h>
//==================================================================
WORD MainApp::WaitForInput()
{
    WORD wResult = 0;

    while ( !wResult )
    {
//     if ( mouse.lbutton() )
//        wResult = MBUTTONHIT;
//     else
       if ( key_avail() )
       {
          wResult = key_read();
//        SetCurPos( 45, 0 );
//        printf( "key = %x", wResult );
       }
    }
    return wResult;
}
```

```
//=====================================================================
BOOL MainApp::Idle()
{
//   mouse.show();

   WORD wKey = WaitForInput();

   // Pass through in case page or control handles key
   BOOL fResult = PageWnd[ CurrentPage ]->DoKey( wKey );

   if ( !fResult )
   {
#if 0
      // Check for mouse click on button row, translate
      if ( wKey == MBUTTONHIT && mouse.GetYPos() == BUTTON_ROW )
      {
         int index = ( mouse.GetXPos() - BUTTON_COLUMN )
               / ( BUTTON_WIDTH + 1 );
         if ( index < BUTTONCOUNT )
            wKey = Buttons[index].wKey;
      }
#endif
      switch ( wKey )
      {
         case ESC:
            if ( ExitFunc() )
               return FALSE;
            break;

         case F1:
            HelpFunc();
            break;

//       case F2:
//          SysInfo();
//          break;

         case PGDN:
            PageWnd[ CurrentPage ]->Deactivate();
            if ( ++CurrentPage >= PAGECOUNT )
               CurrentPage = 0;
            break;

         case PGUP:
            PageWnd[ CurrentPage ]->Deactivate();
            if ( --CurrentPage < 0 )
               CurrentPage = PAGECOUNT - 1;
            break;

         default:
            // Could beep if not handled
            return TRUE;
      }
      // Must have done something, need to repaint
      PageWnd[ CurrentPage ]->Paint();
   }

//   PageWnd[ CurrentPage ]->Update();
   return TRUE;
}
```

```
//=====================================================================
void MainApp::DrawFuncKeys()
{
   // Paint Button windows
   for ( int i = 0; i < BUTTONCOUNT; i++ )
   {
      BYTE bCol = BUTTON_COLUMN + ( i * ( BUTTON_WIDTH + 1 ) );
      DrawBox( BUTTON_ROW, bCol, BUTTON_ROW + BUTTON_HEIGHT - 1,
            bCol + BUTTON_WIDTH - 1, BUTTON_ATTRIBUTE, BORDER_NONE,
            SHADOW_OFF, 0 );
      ShowString( BUTTON_ROW, bCol + ( BUTTON_WIDTH / 2 ),
            Buttons[i].cszText, BUTTON_ATTRIBUTE, TITLE_CENTERED );
   }
}

#define HELP_ROW          (DATA_ROW + 1)
#define HELP_COL          (10)
#define HELP_WIDTH        (60)
#define HELP_HEIGHT       (DATA_HEIGHT - 4)
#define HELP_ATTR         YELLOW_FORE | CYAN_BACK
#define HELP_SHADOW_ATTR  DATA_ATTRIBUTE

//=====================================================================
// Show help for current item
//
void MainApp::HelpFunc()
{
   DrawBox( HELP_ROW, HELP_COL, HELP_ROW + HELP_HEIGHT - 1,
         HELP_COL + HELP_WIDTH - 1, HELP_ATTR, BORDER_NONE,
         SHADOW_ON, HELP_SHADOW_ATTR );
   ShowString( HELP_ROW, HELP_COL + ( HELP_WIDTH / 2 ),
         PageWnd[ CurrentPage ]->GetCurrentCtrl()->GetPrompt(),
         HELP_ATTR, TITLE_CENTERED );
   ShowString( HELP_ROW + HELP_HEIGHT - 1, HELP_COL + ( HELP_WIDTH / 2 ),
         "Hit any key to exit help.", HELP_ATTR, TITLE_CENTERED );

   ShowStrings( HELP_ROW + 2, HELP_COL + 2,
         PageWnd[ CurrentPage ]->GetCurrentCtrl()->GetFullHelp(),
         HELP_ATTR, TITLE_LEFT );

   WaitForInput();    // Wait for key hit
}

#define SYSINFO_ROW         (DATA_ROW + 1)
#define SYSINFO_COL         (DATA_COLUMN + 1)
#define SYSINFO_WIDTH       (DATA_WIDTH - 3)
#define SYSINFO_HEIGHT      (DATA_HEIGHT - 4)
#define SYSINFO_ATTR        YELLOW_FORE | CYAN_BACK
#define SYSINFO_SHADOW_ATTR DATA_ATTRIBUTE

//=====================================================================
// Show system information screen
//
void MainApp::SysInfo()
{
   DrawBox( SYSINFO_ROW, SYSINFO_COL, SYSINFO_ROW + SYSINFO_HEIGHT - 1,
         SYSINFO_COL + SYSINFO_WIDTH - 1, SYSINFO_ATTR, BORDER_NONE,
         SHADOW_ON, SYSINFO_SHADOW_ATTR );
   ShowString( SYSINFO_ROW, SYSINFO_COL + ( SYSINFO_WIDTH / 2 ),
         "**  System Information  **", SYSINFO_ATTR, TITLE_CENTERED );
   ShowString( SYSINFO_ROW + SYSINFO_HEIGHT - 1, SYSINFO_COL
```

```
        + ( SYSINFO_WIDTH / 2 ),
        "<Hit any key>", SYSINFO_ATTR, TITLE_CENTERED );

    WaitForInput();     // Wait for key hit
}

//=====================================================================
// Show system information screen
//
void MainApp::WindowsMsg()
{
    DrawBox( SYSINFO_ROW, SYSINFO_COL, SYSINFO_ROW + SYSINFO_HEIGHT - 1,
        SYSINFO_COL + SYSINFO_WIDTH - 1, SYSINFO_ATTR, BORDER_NONE,
        SHADOW_OFF, SYSINFO_SHADOW_ATTR );
    ShowString( SYSINFO_ROW, SYSINFO_COL + ( SYSINFO_WIDTH / 2 ),
        "**  SetDock  **", SYSINFO_ATTR, TITLE_CENTERED );

    ShowString( SYSINFO_ROW + 4, SYSINFO_COL + ( SYSINFO_WIDTH / 2 ),
        "SetDock was run in a Windows session.", SYSINFO_ATTR, TITLE_CENTERED );
    ShowString( SYSINFO_ROW + 6, SYSINFO_COL + ( SYSINFO_WIDTH / 2 ),
        "For changes to take effect,", SYSINFO_ATTR, TITLE_CENTERED );
    ShowString( SYSINFO_ROW + 7, SYSINFO_COL + ( SYSINFO_WIDTH / 2 ),
        "exit Windows and reboot.", SYSINFO_ATTR, TITLE_CENTERED );



    ShowString( SYSINFO_ROW + SYSINFO_HEIGHT - 1, SYSINFO_COL
        + ( SYSINFO_WIDTH / 2 ),
        "<Hit any key>", SYSINFO_ATTR, TITLE_CENTERED );

    WaitForInput();     // Wait for key hit
}

#define EXIT_ROW            (DATA_ROW + 1)
#define EXIT_COL            (DATA_COLUMN + 39)
#define EXIT_WIDTH          (DATA_WIDTH - 41)
#define EXIT_HEIGHT         (DATA_HEIGHT - 3)
#define EXIT_ATTR           BRIGHT_WHITE_FORE | BLUE_BACK
#define EXIT_SHADOW_ATTR    HELP_SHADOW_ATTR

//=====================================================================
BOOL MainApp::ExitFunc()
{
    // Show box & title
    DrawBox( EXIT_ROW, EXIT_COL, EXIT_ROW + EXIT_HEIGHT - 1,
        EXIT_COL + EXIT_WIDTH - 1, EXIT_ATTR, BORDER_NONE,
        SHADOW_ON, EXIT_SHADOW_ATTR );
    ShowString( EXIT_ROW, EXIT_COL + ( EXIT_WIDTH / 2 ),
        "** Exiting SETUP **", EXIT_ATTR, TITLE_CENTERED );

    // Show key boxes
    for ( int i = 0; i < EXITKEYCOUNT; i++ )
    {
        DrawBox( EXIT_ROW + 2 + ( i * 3 ), EXIT_COL + 1,
            EXIT_ROW + 4 + ( i * 3 ), EXIT_COL + 9, EXIT_ATTR,
            BORDER_SINGLE, SHADOW_OFF, 0 );
        ShowString( EXIT_ROW + 3 + ( i * 3 ), EXIT_COL + 4,
            ExitKeys[ i ].cszText, EXIT_ATTR, TITLE_LEFT );
    }

    // Show key explanations
```

```
   ShowStrings( EXIT_ROW + 3, EXIT_COL + 13,
         ExitText, EXIT_ATTR, TITLE_LEFT );

   // Wait for keyboard input
   while ( 1 )
   {
      WORD wInput = WaitForInput();
#if 0
      if ( wInput == MBUTTONHIT )
      {
         int nYPos = mouse.GetYPos();
         int nXPos = mouse.GetXPos();
         if ( nXPos >= ( EXIT_COL + 1 ) && nXPos <= ( EXIT_COL + 9 )
               && nYPos >= ( EXIT_ROW + 2 ) && nYPos <= ( EXIT_ROW + 13 ) )
         {
            int index = ( nYPos - ( EXIT_ROW + 2 ) ) / 3;
            wInput = ExitKeys[index].wKey;
         }
      }
#endif
      switch ( wInput )
      {
         case ESC:
            return FALSE;  // Continue

         case F4:
            ControlWnd::SaveValues();  // Save values
            fReboot = TRUE;
            return TRUE;        // Exit Setup

         case F5:
            {
               // Load default values
               for ( int i = 0; i < PAGECOUNT; i++ )
                  PageWnd[ i ]->LoadDefaults();
               PageWnd[ CurrentPage ]->Deactivate();
               CurrentPage = 0;              // Go to 1st page
            }
            return FALSE;  // Continue

         case F6:
            return TRUE;        // Exit Setup

         default:
            break;
      }
   }
   return TRUE;        // Exit Setup
}

#pragma optimize( "egl", off ) // Turn off optimization for _asm code
void reboot()
{
   _asm {
      mov    ax,0
      push   ax
      popf
      mov    ax,0ffffh
      push   ax
      mov    ax,0
      push   ax
```

```
        retf
    }
}

BOOL InWindows()
{
    WORD result;
    _asm
    {
        mov ax,0x1600       // Enhanced Windows installation check
        int 0x2f
        and ax,0x007f
        mov result,ax
    }
//    r1.x.ax = 0x1600;
//    int86( 0x2f, &r1, &r1 );
    return result;
}

#pragma optimize( "egl", on )  // Turn off optimization for _asm code
```

```
//____________________________________________________________
//                                        |
// (c) Copyright, Texas Instruments Incorporated, 1992.  All Rights    |
// Reserved.   Property of Texas Instruments Incorporated.  Restricted   |
// Rights -- Use, duplication or disclosure subject to restrictions set  |
// forth in TI's Program License Agreement and associated documentation. |
//____________________________________________________________|
//
// $Revision:  1.5  $
//     $Date:  30 Aug 1993 03:16:32  $
//____________________________________________________________
//
// Title  - setup.h
//
// Author - Ross Steiner
//
// Date   - May 20, 1991
//
// Site   - Temple
//
// Revision - *
//
// Language - C++
//
// Abstract -
//
//____________________________________________________________

#include <stdlib.h>
#include "stdtypes.h"

// Main Screen
#define MAIN_ROW    0
#define MAIN_COLUMN 0
#define MAIN_WIDTH  80
#define MAIN_HEIGHT 25
#define MAIN_ATTRIBUTE  (WHITE_FORE | BLUE_BACK)

// Title Box
#define TITLE_ROW   (MAIN_ROW + 1)
#define TITLE_COLUMN    (MAIN_COLUMN + 2)
#define TITLE_WIDTH (MAIN_WIDTH - 4)
#define TITLE_HEIGHT    2
#define TITLE_ATTRIBUTE (BLACK_FORE | WHITE_BACK)

// Data Area
#define DATA_ROW    (TITLE_ROW + TITLE_HEIGHT + 1)
#define DATA_COLUMN (MAIN_COLUMN + 2)
#define DATA_WIDTH  (MAIN_WIDTH - 5)
#define DATA_HEIGHT (25 - 5 - TITLE_HEIGHT - BUTTON_HEIGHT)
#define DATA_ATTRIBUTE  (BLACK_FORE | WHITE_BACK)
#define DATA_SHADOW_ATTRIBUTE   (BLACK_FORE | BLUE_BACK)

// "Buttons" at the bottom of the screen
#define BUTTON_ROW  (MAIN_ROW + MAIN_HEIGHT - 2 )
#define BUTTON_COLUMN   (MAIN_COLUMN + 2)
#define BUTTON_WIDTH    10
#define BUTTON_HEIGHT   1
#define BUTTON_ATTRIBUTE (BLACK_FORE | WHITE_BACK)

// Horizontal lines that separate data area from other areas
```

```
#define TOPLINE_ROW (DATA_ROW - 1)
#define BOTTOMLINE_ROW  (BUTTON_ROW - 1)
#define LINE_COLUMN (MAIN_COLUMN + 1)
#define LINE_LENGTH (MAIN_WIDTH - 2)
#define LINE_CHAR   (196)
#define LINE_ATTRIBUTE  (MAIN_ATTRIBUTE)

// Standard prompt information
//#define PROMPT_ATTRIBUTE    (DATA_ATTRIBUTE)

// Standard data entry information
//#define ENTRY_HEIGHT    1
#define ENTRY_DISPLAY_ATTRIBUTE  (DATA_ATTRIBUTE)
#define ENTRY_SELECTED_ATTRIBUTE (BRIGHT_WHITE_FORE | BLUE_BACK)

// Context Sensitive Help information
#define SHELP_ROW   (DATA_ROW+DATA_HEIGHT-1)
//#define SHELP_COLUMN    (DATA_COLUMN+1)
//#define SHELP_ATTRIBUTE (DATA_ATTRIBUTE)
//#define SHELP_MAXWIDTH  (DATA_WIDTH-2)

#define PROMPT_1ST_COLUMN   (DATA_COLUMN + 2)
#define VALUE_1ST_COLUMN    (DATA_COLUMN + 24)
#define PROMPT_2ND_COLUMN   (DATA_COLUMN + 43)
#define VALUE_2ND_COLUMN    (DATA_COLUMN + 59)

//----------------------------------------------------------
// Define common strings & arrays

extern const char cszEmpty[];
extern const char cszColon[];
extern const char cszOff[];
extern const char cszOn[];
extern const char cszDisabled[];
extern const char* NullArray[];
extern const char* paOffOnStrings[];
extern const char* paNoYesStrings[];
extern const char* paDisabledEnabledStrings[];
```

```
//_________________________________________________________________
//                                                   |
// (c) Copyright, Texas Instruments Incorporated, 1992.  All Rights    |
// Reserved.   Property of Texas Instruments Incorporated.  Restricted  |
// Rights -- Use, duplication or disclosure subject to restrictions set  |
// forth in TI's Program License Agreement and associated documentation. |
//_________________________________________________________________|
//
// $Revision:   1.4  $
//     $Date:   21 Sep 1993 20:39:04  $
//_________________________________________________________________
//
// Title  - textwnd.h
//
// Author - Robert Tonsing, Ross Steiner
//
// Date   - January 20, 1993
//
// Site   - Temple
//
// Revision - *
//
// Language - C++
//
// Abstract -
//
//_________________________________________________________________

#define SHADOW_OFF  0
#define SHADOW_ON   1

#if 0
//
// Used by getType() and setType()
//
#define TYPE_NONCONTROL     0
#define TYPE_STATICCONTROL  1
#define TYPE_EDITCONTROL    2
#define TYPE_SPINCONTROL    3
#define TYPE_LISTCONTROL    4
#endif

#ifndef _TEXTWND_H_
#define _TEXTWND_H_

#include "screen.h"
#include "sdata.h"
#include "\tisystem\tisystem.h"

extern const char* DataText[];

class DataWnd;

//=====================================================================
class ItemWnd
{
protected:
    BYTE nRow;
    BYTE nPromptCol;            // Start column for prompt

public:
```

```
    virtual ~ItemWnd() {}
    virtual void Paint() = 0;  // Display the control
    virtual BOOL Available() = 0;
};

//=====================================================================
struct TextInfo
{
    BYTE nCol;              // Which page column to display
    BYTE nRow;              // Row to display relative to page
    const char* pszText;    // Ptr to prompt string
};

class TextWnd : public ItemWnd
{
protected:
    const TextInfo* pInfo;

public:
    TextWnd( const TextInfo* pInfoParm, DataWnd* pParent );
    virtual ~TextWnd() {}
    virtual void Paint()      // Display the control
        { ShowString( nRow, nPromptCol, pInfo->pszText, DATA_ATTRIBUTE ); }
    BOOL Available()
        { return FALSE; }
};

//=====================================================================
// Defines class for individual "controls". Each consists of a prompt and a
// NULL terminated array of possible values, and a 1-line help string.
// In use each control should be derived from this class, with the constructor
// reading and setting the current value, and a SaveValue() function to store
// the final value.
//

struct ControlInfo
{
    BYTE bRow;                  // Row to display relative to page
    BYTE bPromptCol;            // Which page column to display
    BYTE bValueCol;             // Which page column to display
    const char* pszPrompt;      // Ptr to prompt string
    const char* pszHelp;        // Ptr to help string
    const char** pszFullHelp;   // Ptr to help screen
    const char** pszValues;     // Ptr to array of values
    BYTE bRequest;
};

class ControlWnd : public ItemWnd
{
protected:
    const ControlInfo* pInfo;
    static BOOL fSaveFlag;          // Flag to save values on destruct
    static ControlWnd* ActiveCtrl;  // Ptr to current active control
    WORD wCurrentValue;             // Index of current value
    int  nMaxSize;                  // Max value string length - field size
    BYTE nValueCol;                 // Start column for value

public:
    WORD wMaxValue;                 // Max value index
    BOOL fAvailFlag;
    static ControlWnd* AddControl( const ControlInfo* pInfoParm, DataWnd* pParent );
```

```
//   static class Clock* pClock;  // Ptr to clock object
     ControlWnd( const ControlInfo* pInfoParm, DataWnd* pParent ); // Constructor
     virtual ~ControlWnd();
     virtual BOOL Init();          // Load system value
     virtual void Paint();         // Display the control
     virtual void Update();        // Redisplay the value
     void SetValue( WORD nValue );  // Set current value
     virtual void IncValue();      // Inc to next value in array
     virtual void DecValue();      // Dec to previous value in array
     WORD GetValue();              // Get current value index
     const char* GetPrompt()       // Get ptr to prompt
        { return pInfo->pszPrompt; }
     const char* GetHelp();        // Get ptr to help string
     const char** GetFullHelp()    // Get ptr to help string
        { return pInfo->pszFullHelp; }
     void Activate();              // Make this the active control
     static void Deactivate()      // No active control
        { ActiveCtrl = NULL; }
     static void SaveValues()      // Save current value
        { fSaveFlag = TRUE; }
     BOOL Available()
        { return fAvailFlag; }
     virtual BOOL DoKey( WORD wKey );  // Process keystroke
     virtual void LoadDefaults();  // Load all default values
};

//-----------------------------------------------------------------------
// Set current value of control
//
inline void ControlWnd::SetValue( WORD nValue )
{
   wCurrentValue = nValue;
//   Update();
}

//-----------------------------------------------------------------------
// Get current value of control
//
inline WORD ControlWnd::GetValue()
{
   return wCurrentValue;
}

//-----------------------------------------------------------------------
// Get ptr to help string
//
inline const char* ControlWnd::GetHelp()
{
   return pInfo->pszHelp;
}


#endif //_TEXTWND_H_
```

```
//____________________________________________________________________
//                                                  |
// (c) Copyright, Texas Instruments Incorporated, 1993. All Rights     |
// Reserved.  Property of Texas Instruments Incorporated. Restricted   |
// Rights -- Use, duplication or disclosure subject to restrictions set |
// forth in TI's Program License Agreement and associated documentation. |
//____________________________________________________________________|
//
// $Workfile:  CTRLWND.CPP  $
// $Revision:  1.7  $
//     $Date:  22 Sep 1993 22:37:46  $
//    Author:  Robert Tonsing
//      Site:  Temple
//  Language:  C++
//
//======================================================================
#include <string.h>
#include "setdock.h"
#include "ctrlwnd.h"
#include "datawnd.h"
#include "keyboard.h"
#include "msmouse.h"

const char* DataText[] =        // Array of page # text
{
   "Page 1 of 3",
   "Page 2 of 3",
   "Page 3 of 3"
//   "Page 4 of 4"
};

ControlWnd* ControlWnd::ActiveCtrl = NULL; // Init ptr to active control
BOOL ControlWnd::fSaveFlag = FALSE;     // Flag to save values on destruct
//class Clock* ControlWnd::pClock = NULL;     // Ptr to clock object

//======================================================================
TextWnd::TextWnd( const TextInfo* pInfoParm, DataWnd* pParent )
   : pInfo( pInfoParm )
{
   nRow = pInfo->nRow + pParent->nStartRow;
   nPromptCol = pInfo->nCol;
//   nPromptCol = pParent->DataCols[ pInfo->nCol ].bPromptCol;
}

//======================================================================
// ControlWnd constructor. Set values, get count & field size from value
// array.
//
ControlWnd::ControlWnd( const ControlInfo* pInfoParm, DataWnd* pParent )
   : pInfo( pInfoParm ), wCurrentValue( 0 ), wMaxValue( 0 ),
   nMaxSize( 0 ), fAvailFlag( TRUE )
{
   nRow = pInfo->bRow + pParent->nStartRow;
   nPromptCol = pInfo->bPromptCol;
   nValueCol = pInfo->bValueCol;

   // Determine count of values & max length
   // Last entry in array must be NULL
   int nSize;

   while ( pInfo->pszValues[ wMaxValue ] )
```

```
        if ( ( nSize = strlen( pInfo->pszValues[ wMaxValue++ ] ) ) > nMaxSize )
            nMaxSize = nSize;

    if ( wMaxValue )        // Back up to last valid value
        wMaxValue--;

#if 0
    int nValue;
    // Get value from CMOS
    if ( pInfo->bGetFunction != 0xff
            && GetSystemInfo( pInfo->bGetFunction, pInfo->bGetRequest, &nValue )
            == 0 )
        wCurrentValue = nValue;
#endif
}

//------------------------------------------------------------------------
ControlWnd* ControlWnd::AddControl( const ControlInfo* pInfoParm, DataWnd* Parent )
{
    ControlWnd* pNewControl = new ControlWnd( pInfoParm, Parent );
    if ( pNewControl->Init() )
        return pNewControl;
    else
    {
        delete pNewControl;
        return NULL;
    }
}

//------------------------------------------------------------------------
BOOL ControlWnd::Init()
{
    // Get value from system
    if ( TiReadConfig( pInfo->bRequest, &wCurrentValue ) == SUCCESS )
        return TRUE;
    else
        return TRUE;    //FALSE;
}

//------------------------------------------------------------------------
// ControlWnd destructor.
//
ControlWnd::~ControlWnd()
{
    // Save value to system
    if ( fSaveFlag && pInfo->bRequest < 0xff )
        TiWriteConfig( pInfo->bRequest, wCurrentValue );
}

//------------------------------------------------------------------------
// Display control.
//
void ControlWnd::Paint()
{
    // Draw prompt
    if ( pInfo->pszPrompt )
        ShowString( nRow, nPromptCol, pInfo->pszPrompt,
                BLACK_FORE | WHITE_BACK );
    // Draw current setting
    Update();
}
```

```
//----------------------------------------------------------------------
// Update display of control value
//
void ControlWnd::Update()
{
    // Different attribute if active control
    BYTE bAttrib = this == ActiveCtrl ? ENTRY_SELECTED_ATTRIBUTE
            : ENTRY_DISPLAY_ATTRIBUTE;

    // Blank out field
    ShowChar( nRow, nValueCol - ( ( nMaxSize - 0 ) / 2 ), ' ', bAttrib,
            nMaxSize );
    // Draw current setting
    ShowString( nRow, nValueCol, pInfo->pszValues[ wCurrentValue ], bAttrib,
            TITLE_CENTERED );
}

//----------------------------------------------------------------------
// Set to previous value in array
//
void ControlWnd::DecValue()
{
    if ( wCurrentValue == 0 )
        wCurrentValue = wMaxValue;
    else
        wCurrentValue--;
    Update();
}

//----------------------------------------------------------------------
// Set to next value in array
//
void ControlWnd::IncValue()
{
    if ( ++wCurrentValue > wMaxValue )
        wCurrentValue = 0;
    Update();
}

//----------------------------------------------------------------------
// Make this the active control
//
void ControlWnd::Activate()
{
    if ( this == ActiveCtrl )       // Nothing to do?
        return;

    ControlWnd* OldCtrl = ActiveCtrl;   // Save ptr to old active control

    ActiveCtrl = this;          // Set active ptr to this
    if ( OldCtrl != NULL )      // Display old control as inactive
        OldCtrl->Update();
    Update();               // Display as active
}

//----------------------------------------------------------------------
// Process keystroke passed through from page
// return TRUE if proccessed
//
BOOL ControlWnd::DoKey( WORD wKey )
{
```

```
    switch ( wKey )
    {
        case PLUS:
        case SPACEBAR:
        case RIGHTARROW:
            IncValue();
            break;

        case MINUS:
        case LEFTARROW:
            DecValue();
            break;

        default:
            return FALSE;
    }

    return TRUE;
}

void ControlWnd::LoadDefaults()
{
    // Get default from system
    TiDefaultConfig( pInfo->bRequest, &wCurrentValue );
}
```

```
//______________________________________________________________________
//                                              |
// (c) Copyright, Texas Instruments Incorporated, 1992.  All Rights   |
// Reserved.  Property of Texas Instruments Incorporated.  Restricted  |
// Rights -- Use, duplication or disclosure subject to restrictions set  |
// forth in TI's Program License Agreement and associated documentation. |
//______________________________________________________________________|
//
// $Workfile:  DATAWND.CPP  $
// $Revision:  1.3  $
//    $Date:  30 Aug 1993 16:58:40  $
//    Author:  Robert Tonsing
//      Site:  Temple
//  Language:  C++
//
//======================================================================
#include "setdock.h"
#include "datawnd.h"
//#include "msmouse.h"
#include "keyboard.h"
#include "screen.h"
#include "sdata.h"

BYTE DataWnd::nStartRow = DATA_ROW;

//======================================================================
// DataWnd destructor.
//
DataWnd::~DataWnd()
{
   // Cleanup controls allocated by derived class
   ItemWnd* pTemp;
   while ( ( pTemp = (ItemWnd*) ControlList.RemoveTail() ) != NULL )
      delete pTemp;
}

//----------------------------------------------------------------------
// Display elements common to all pages.
//
void DataWnd::Paint()
{
//   mouse.hide();

   // Draw frame
   DrawBox( DATA_ROW, DATA_COLUMN, DATA_ROW + DATA_HEIGHT - 1,
         DATA_COLUMN + DATA_WIDTH - 1,
         DATA_ATTRIBUTE, BORDER_NONE, SHADOW_ON, DATA_SHADOW_ATTRIBUTE );

   // Draw line above help string
   ShowChar( SHELP_ROW - 1, DATA_COLUMN, LINE_CHAR, DATA_ATTRIBUTE,
         DATA_WIDTH );

   // Draw controls
   if ( !CurrentCtrl )
   {
      GoToHeadCtrl();
      ControlWnd::Deactivate();
   }

   ControlWnd *pCtrl = CurrentCtrl;
   do
```

```
    {
        pCtrl->Paint();
    } while ( ( pCtrl = (ControlWnd*) ControlList.GetNext() )
            != CurrentCtrl );

    HelpLine();             // Display help line

//  mouse.show();
}

//-----------------------------------------------------------------------
void DataWnd::GoToHeadCtrl()
{
    ItemWnd *pCtrl = (ItemWnd*) ControlList.GetHead();
    while ( !pCtrl->Available() )
        pCtrl = (ItemWnd*) ControlList.GetNext();

    CurrentCtrl = (ControlWnd*) pCtrl;
}

//-----------------------------------------------------------------------
// Make next control in array active.
//
void DataWnd::NextCtrl()
{
    ItemWnd* pCtrl;
    // Update ptr to active control
    do
    {
        pCtrl = (ItemWnd*) ControlList.GetNext();
    } while ( !pCtrl->Available() );
    CurrentCtrl = (ControlWnd*) pCtrl;
    HelpLine();             // Display help line
}

//-----------------------------------------------------------------------
// Make previous control in array active.
//
void DataWnd::PrevCtrl()
{
    ItemWnd* pCtrl;
    // Update ptr to active control
    do
    {
        pCtrl = (ItemWnd*) ControlList.GetPrev();
    } while ( !pCtrl->Available() );
    CurrentCtrl = (ControlWnd*) pCtrl;
    HelpLine();             // Display help line
}

#if 0
//-----------------------------------------------------------------------
// Make previous control in array active.
//
BOOL DataWnd::GetCtrlAt()
{
    // Is it in Page area?
    int nXPos = mouse.GetXPos();
    int nYPos = mouse.GetYPos();
    if ( nYPos < DATA_ROW || nYPos > ( DATA_ROW + DATA_HEIGHT - 1 )
            || nXPos < DATA_COLUMN || nXPos > ( DATA_COLUMN + DATA_WIDTH - 1 ) )
```

```
        return FALSE;

    // Update ptr to active control
    nYPos -= nStartRow;
    nXPos = ( nXPos - DATA_COLUMN ) / ( ( DATA_WIDTH / 2 ) + 1 );
    ItemWnd* pCtrl = (ItemWnd*) ControlList.GetItemAt( nXPos, nYPos );
    if ( pCtrl != NULL && pCtrl->Available() )
    {
        if ( pCtrl == CurrentCtrl )
            CurrentCtrl->DoKey( SPACEBAR );
        else
        {
            CurrentCtrl = (ControlWnd*) pCtrl;
            HelpLine();             // Display help line
        }
    }

    return TRUE;
}
#endif

//------------------------------------------------------------------------
// Display help line of current control.
//
void DataWnd::HelpLine()
{
    if ( CurrentCtrl )
    {
        CurrentCtrl->Activate();    // Make sure control is active

        // Clear help line
        ShowChar( SHELP_ROW, DATA_COLUMN + 1, ' ', DATA_ATTRIBUTE,
                DATA_WIDTH - 1 );
        // Paint help line
        ShowString( SHELP_ROW, DATA_COLUMN + 1, CurrentCtrl->GetHelp(),
                DATA_ATTRIBUTE );
    }
}

//------------------------------------------------------------------------
void DataWnd::AddControl( const ControlInfo* pInfoParm )
{
    ControlWnd* pControl = ControlWnd::AddControl( pInfoParm, this );
    if ( pControl )
        ControlList.AddTail( pControl );
        // Need to check for failure
}

//------------------------------------------------------------------------
// Process keystroke passed through from main
// return TRUE if proccessed
//
BOOL DataWnd::DoKey( WORD wKey )
{
    // Pass through in case control handles key
    BOOL fResult = CurrentCtrl->DoKey( wKey );

    if ( !fResult )
    {
        switch ( wKey )
        {
```

```
//          case MBUTTONHIT:
//              fResult = GetCtrlAt();
//              break;

            case TAB:
            case DOWNARROW:
                NextCtrl();
                fResult = TRUE;
                break;

//          case BACKTAB:
            case UPARROW:
                PrevCtrl();
                fResult = TRUE;
                break;

            default:
                break;
        }
    }

    return fResult;
}

void DataWnd::LoadDefaults()
{
    if ( !CurrentCtrl )
    {
        GoToHeadCtrl();
        ControlWnd::Deactivate();
    }

    ControlWnd *pCtrl = CurrentCtrl;
    do
    {
        pCtrl->LoadDefaults();
    } while ( ( pCtrl = (ControlWnd*) ControlList.GetNext() )
            != CurrentCtrl );
}
```

```
//________________________________________________________________
//                                                              |
// (c) Copyright, Texas Instruments Incorporated, 1993. All Rights  |
// Reserved.  Property of Texas Instruments Incorporated. Restricted  |
// Rights -- Use, duplication or disclosure subject to restrictions set  |
// forth in TI's Program License Agreement and associated documentation. |
//________________________________________________________________|
//
// $Revision:  1.3  $
//     $Date:  08 Feb 1993 10:25:12  $
//________________________________________________________________
//
// Title  - list.h
//
// Author - Robert Tonsing, Ross Steiner
//
// Date   - January 20, 1993
//
// Site   - Temple
//
// Revision - *
//
// Language - C++
//
// Abstract -
//
//________________________________________________________________
//=============================================================================
// A very limited implementation of a circular, doubly linked list. Contains
// a ptr to the head node and a ptr to the "current" node, which is updated
// by GetNext() & GetPrev(). GetHead() resets the current ptr to the start
// of the list. GetNext() & GetPrev() wrap around, to iterate through the list
// without wrapping save & compare to the data ptr returned by GetHead().
// Nodes are only added or deleted at the tail.
//
class CDLList
{
protected:
    struct Node
    {
     void* pData;          // Ptr to data item
     Node* pNext;          // Ptr to next node
     Node* pPrev;          // Ptr to prev node
    };

private:
    Node* pHeadNode;           // Ptr to start of list
    Node* pCurrentNode;    // Ptr to current node

public:
    CDLList()              // Constructor
     : pHeadNode( NULL ), pCurrentNode( NULL ) {}
//   ~CDLList() {}          // Destructor
    void* GetHead();            // Get 1st item
    void AddTail( void* pData );   // Add new item
    void* RemoveTail();      // Delete item
    void* GetNext();            // Get next item
    void* GetPrev();            // Get prev item
};
//________________________________________________________________
//                                                              |
```

```
// (c) Copyright, Texas Instruments Incorporated, 1993. All Rights |
// Reserved. Property of Texas Instruments Incorporated. Restricted |
// Rights -- Use, duplication or disclosure subject to restrictions set |
// forth in TI's Program License Agreement and associated documentation. |
//______________________________________________________________________|
//
// $Revision: 1.3 $
//     $Date: 08 Feb 1993 10:25:04 $
//______________________________________________________________________
//
// Title  - list.cpp
//
// Author - Robert Tonsing, Ross Steiner
//
// Date   - January 20, 1993
//
// Site   - Temple
//
// Revision - *
//
// Language - C++
//
// Abstract -
//
//______________________________________________________________________

#include <stdlib.h>
#include <string.h>
#include "setdock.h"
#include "list.h"

#define TESTING 0
#if TESTING
#include <stdio.h>
#endif

//=====================================================================
// Add a new item to the tail of the list.
//
void CDLList::AddTail( void* pData )
{
   Node* pNewNode = new Node;      // Allocate new list node
   pNewNode->pData = pData;        // Attach caller data

   if ( pHeadNode != NULL )        // List not empty?
   {
   // Insert new node between tail & head
   pNewNode->pNext = pHeadNode;
   pNewNode->pPrev = pHeadNode->pPrev;
   // Set old tail to point to this
   pHeadNode->pPrev->pNext = pNewNode;
   // Set tail ptr to this
   pHeadNode->pPrev = pNewNode;
   }
   else   // Empty list - make this node the whole list
   {
   pCurrentNode =
   pHeadNode =
   pNewNode->pNext =
   pNewNode->pPrev = pNewNode;
   }
```

```
}

//------------------------------------------------------------------------
// Remove a data item from the tail of the list & return a ptr to it.
// Returns NULL if empty list.
//
void* CDLList::RemoveTail()
{
   if ( pHeadNode == NULL )        // Empty list?
   return NULL;

   Node* pTmpNode = pHeadNode->pPrev; // Save ptr to tail
   void* pData = pTmpNode->pData; // Save ptr to data

   if ( pTmpNode == pHeadNode )       // Only node left?
   pHeadNode = pCurrentNode = NULL;    // Set to empty list
   else
   {
   if ( pCurrentNode == pTmpNode ) // Keep pCurrentNode valid
      pCurrentNode = pCurrentNode->pPrev;
   pTmpNode->pPrev->pNext = pHeadNode; // Point previous node to head
   pHeadNode->pPrev = pTmpNode->pPrev; // Point head to previous node
   }

   delete pTmpNode;          // Delete list node
   return pData;          // Return data for caller to dispose of
}

//------------------------------------------------------------------------
// Return ptr to 1st data item in list. Resets current ptr to head.
// Returns NULL if empty list.
//
void* CDLList::GetHead()
{
   return ( pCurrentNode = pHeadNode ) != NULL ? pHeadNode->pData : NULL;
}

//------------------------------------------------------------------------
// Return ptr to next data item in list. Updates current ptr.
// Returns NULL if empty list.
//
void* CDLList::GetNext()
{
   return pCurrentNode == NULL ? NULL
      : ( pCurrentNode = pCurrentNode->pNext )->pData;
}

//------------------------------------------------------------------------
// Return ptr to previous data item in list. Updates current ptr.
// Returns NULL if empty list.
//
void* CDLList::GetPrev()
{
   return pCurrentNode == NULL ? NULL
      : ( pCurrentNode = pCurrentNode->pPrev )->pData;
}

#if TESTING
//------------------------------------------------------------------------
void main()
{
```

```
    CDLList MyList;

    MyList.AddTail( "hi" );
    MyList.AddTail( "there" );
    MyList.AddTail( "testing" );

    char* Temp;
    char* Head;

    Temp = Head = (char*) MyList.GetHead();
    printf( "traverse:\n" );
    do
    {
    printf( "%s\n", Temp );
    Temp = (char*) MyList.GetNext();
    } while ( Temp != Head );

    printf( "Remove:\n" );
    while ( ( Temp = (char*) MyList.RemoveTail() ) != NULL )
    printf( "%s\n", Temp );
}
#endif
```

```
//_____________________________________________________________
//                                                |
// (c) Copyright, Texas Instruments Incorporated, 1992.  All Rights      |
// Reserved.   Property of Texas Instruments Incorporated.  Restricted   |
// Rights -- Use, duplication or disclosure subject to restrictions set  |
// forth in TI's Program License Agreement and associated documentation. |
//_____________________________________________________________|
//
// $Revision:   1.2  $
//     $Date:   09 Aug 1993 10:47:18  $
//_____________________________________________________________
//
// Title  - keyboard.h
//
// Author - Robert Tonsing, Ross Steiner
//
// Date   - January 20, 1993
//
// Site   - Temple
//
// Revision - *
//
// Language - C++
//
// Abstract -
//
//_____________________________________________________________
#include <conio.h>

/*********************************************************************

 Macro: ExtChar
   Encodes ASCII and extended code characters in an integer.
   Note that the ASCII character is stored in the low-order byte;
   this allows encoded ints to be compared with chars.

*********************************************************************/

#define ExtChar( a, b ) ((unsigned int)b << 8) | (unsigned char)a
#define ScanCode( a )   ( (unsigned int)a >> 8 )
#define ASCIICode( a )  ( (unsigned int)a & 0x00ff )

const unsigned int SPACEBAR   = ExtChar( 0x20, 0x00 );
const unsigned int BACKSPACE  = ExtChar( 0x08, 0x00 );
const unsigned int TAB        = ExtChar( 0x09, 0x00 );
const unsigned int ESC        = ExtChar( 0x1B, 0x00 );
const unsigned int PLUS       = ExtChar( '+', 0x00 );
const unsigned int MINUS      = ExtChar( '-', 0x00 );
const unsigned int F1         = ExtChar( 0x00, 0x3B );
const unsigned int F2         = ExtChar( 0x00, 0x3C );
const unsigned int F3         = ExtChar( 0x00, 0x3D );
const unsigned int F4         = ExtChar( 0x00, 0x3E );
const unsigned int F5         = ExtChar( 0x00, 0x3F );
const unsigned int F6         = ExtChar( 0x00, 0x40 );
const unsigned int UPARROW    = ExtChar( 0x00, 0x48 );
const unsigned int DOWNARROW  = ExtChar( 0x00, 0x50 );
const unsigned int LEFTARROW  = ExtChar( 0x00, 0x4B );
const unsigned int RIGHTARROW = ExtChar( 0x00, 0x4D );
const unsigned int PGUP       = ExtChar( 0x00, 0x49 );
const unsigned int PGDN       = ExtChar( 0x00, 0x51 );
const unsigned int HOME       = ExtChar( 0x00, 0x47 );
```

```
const unsigned int END      = ExtChar( 0x00, 0x4F );
const unsigned int INS      = ExtChar( 0x00, 0x52 );
const unsigned int DEL      = ExtChar( 0x00, 0x53 );

const unsigned int MBUTTONHIT = 0xFFFF;

WORD getInput();
inline BOOL key_avail()
   { return _kbhit(); }
WORD key_read();
```

```
//_____________________________________________________________
//                                              |
// (c) Copyright, Texas Instruments Incorporated, 1992.  All Rights     |
// Reserved.   Property of Texas Instruments Incorporated.  Restricted   |
// Rights -- Use, duplication or disclosure subject to restrictions set  |
// forth in TI's Program License Agreement and associated documentation. |
//_____________________________________________________________|
//
// $Revision:   1.2  $
//     $Date:   10 Aug 1993 16:15:04  $
//_____________________________________________________________
//
// Title  - keyboard.cpp
//
// Author - Robert Tonsing, Ross Steiner
//
// Date   - January 20, 1993
//
// Site   - Temple
//
// Revision - *
//
// Language - C++
//
// Abstract -
//
//_____________________________________________________________
#include "setdock.h"
#include "keyboard.h"

#pragma optimize( "egl", off )  // Turn off optimization for _asm code

#if 0
WORD getInput()
{
   WORD key;

   _asm
   {
       mov ah,7
       int 21h
       cmp al,0
       jz  getInput_ext
       xor ah,ah
       jmp getInput_end
getInput_ext:
       mov ah,7
       int 21h
       mov ah,al
       xor al,al
getInput_end:
       mov key,ax
   }

   return( key );
}
#endif

#if 0
/***************************
 * Return !=0 if key is available.
```

```
 */
BOOL key_avail( void )
{
   BOOL fResult;
   _asm
   {
       mov     ah,11h
       int     16h
       jnz     key_not_avail
       mov     fResult,1
       jmp     key_avail_exit
key_not_avail:
       mov     fResult,0
key_avail_exit:
   }
   return fResult;
}
#endif

/***************************
 * Wait for next key, then return it.
 */
WORD key_read( void )
{
   WORD wResult;
   _asm
   {
       mov     ah,10h
       int     16h
       cmp     al,0                ; extended key?
       jz      key_read_exit        ; no, exit
       cmp     al,0e0h             ; extended key?
       jz      key_read_extended    ; yes, jump
       mov     ah,0                ; normal key - clear high byte
       jmp     key_read_exit
key_read_extended:
       mov     al,0                ; extended key - clear low byte
key_read_exit:
       mov     wResult,ax
   }
   return wResult;
}
```

```
//______________________________________________________________________
//                                          |
// (c) Copyright, Texas Instruments Incorporated, 1993. All Rights     |
// Reserved. Property of Texas Instruments Incorporated. Restricted   |
// Rights -- Use, duplication or disclosure subject to restrictions set |
// forth in TI's Program License Agreement and associated documentation. |
//______________________________________________________________________|
//
// $Workfile: PG0DATA.H $
// $Revision: 1.13 $
//    $Date: 23 Sep 1993 09:26:30 $
//   Author: Robert Tonsing
//     Site: Temple
// Language: C++
//
//#include "extsetup.h"
#include "datawnd.h"

#define PG0_COLUMN (DATA_COLUMN + 3)

/*--------------------------------------------------------------------------
   0...*:....1....:....2*...:....3....:.C..4.*..:....5....:...*6....:....7....
  _______________________________________________________________________
 0|                                        Page 1 of 2     |
 1|                                                        |
 2|                                                        |
 3| Hard disk 0 type:  Drive type 48  SCSI hardware:     Off      |
 4| Hard disk 1 type:       None     SCSI BIOS:         Off      |
 5|                                                        |
 6| Floppy disk 0 type:     None     PCMCIA hardware:   Off      |
 7| Floppy disk 1 type:     None     PCMCIA BIOS:       Off      |
 8| First FDD location:  In Notebook                       |
 9|                      Game Port:          Off          |
10| Desktop LPT port:       LPT3     QuickPort mouse:    On       |
11| microDuck LPT port:     LPT3                           |
12| Notebook LPT port:      LPT3                           |
13|                                                        |
14|________________________________________________________|
   0....:....1....:....2....:....3....:....4....:....5....:....6....:....7....
--------------------------------------------------------------------------*/
//=========================================================================
// Handle stuff specific to page 1 of setup data.
//
class Page0Wnd : public DataWnd
{
private:

public:
   Page0Wnd();
   //~Page0Wnd();   // Note: cleanup performed by base class destructor
   void Paint();
};

#ifdef DEFVALUES    // Only used by pg0data.cpp
//=========================================================================
//
// All measurements are relative to DATA_ROW and PG0_COLUMN which defines the
// upper left corner of the above drawing.
//

#if 0
```

```
static const char* DSHdd0Strings[] =
{
    "None",
    "Auto Detect",
    "Drive type 48",
    "Drive type 49",
    NULL
};

static const ControlInfo DSHdd0Info = {
    3,
    PG0_COLUMN + 4,
    PG0_COLUMN + 30,
    "Hard disk 0 type:",
    "Select a hard disk type",
    NullArray,
    DSHdd0Strings,
    DSHDD0TYPE
};

static const ControlInfo DSHdd1Info = {
    4,
    PG0_COLUMN + 4,
    PG0_COLUMN + 30,
    "Hard disk 1 type:",
    "Select a hard disk type",
    NullArray,
    DSHdd0Strings,
    DSHDD1TYPE
};
#endif

static const char* DSFdd0Strings[] =
{
    cszDisabled,
    "5.25"", 360 KB",
    "5.25"", 1.2 MB",
    "3.5"", 720 KB",
    "3.5"", 1.44 MB",
    "3.5"", 2.88 MB",
    NULL
};

static const char* DSFddHelp[] =
{
    "This sets the type of floppy drive installed in this",
    "position in a TravelMate DeskTop.",
    NULL
};

static const char FddHelpLine[] = "Select the type of floppy drive installed (DeskTop only)";

static const ControlInfo DSFdd0Info = {
    3,
    PG0_COLUMN + 2,
    PG0_COLUMN + 32,
    "DeskTop floppy 0 type:",
    FddHelpLine,
    DSFddHelp,
    DSFdd0Strings,
    DSFDD0TYPE
```

```
};

static const ControlInfo DSFdd1Info = {
    4,
    PG0_COLUMN + 2,
    PG0_COLUMN + 32,
    "DeskTop floppy 1 type:",
    FddHelpLine,
    DSFddHelp,
    DSFdd0Strings,
    DSFDD1TYPE
};

static const char* DSFddSwapHelp[] =
{
    "Changes the order of floppy drives; A: becomes B:.  This",
    "is useful when you need to boot from drive 1 or need to",
    "use a program that only refers to drive A: and drive 0",
    "is the wrong type.",
    NULL
};

static const ControlInfo DSFddSwapInfo = {
    5,
    PG0_COLUMN + 5,
    PG0_COLUMN + 32,
    "Swap floppy drives:",
    "Changes the order of the floppy drives (DeskTop only)",
    DSFddSwapHelp,
    paNoYesStrings,
    DSFDDSWAP
};

static const char* DSScsiHwHelp[] =
{
    "Normally set to On unless this option causes a conflict",
    "with the I/O port, DMA, or interrupt of an installed",
    "board or device.",
    NULL
};

static const ControlInfo DSScsiHwInfo = {
    3,
    PG0_COLUMN + 46,
    PG0_COLUMN + 65,
    "SCSI hardware:",
    "Select one",
    DSScsiHwHelp,
    paOffOnStrings,
    DSSCSIHW
};

static const char* DSScsiBiosHelp[] =
{
    "Normally set to On unless you are not using this option",
    "and you want to use the BIOS area for Upper Memory",
    "Blocks.",
    NULL
};

static const ControlInfo DSScsiBiosInfo = {
```

```
    4,
    PG0_COLUMN + 50,
    PG0_COLUMN + 65,
    "SCSI BIOS:",
    "Select one",
    DSScsiBiosHelp,
    paOffOnStrings,
    DSSCSIBIOS
};

#if 0
static const char* DSPcmciaHwHelp[] =
{
    "Normally set to On unless you have a device that",
    "conflicts with the I/O ports, DMA, or interrupts",
    "assigned to the PCMCIA hardware.",
    NULL
};
#endif

static const ControlInfo DSPcmciaHwInfo = {
    6,
    PG0_COLUMN + 44,
    PG0_COLUMN + 65,
    "PCMCIA hardware:",
    "Select one",
    DSScsiHwHelp,   //DSPcmciaHwHelp,
    paOffOnStrings,
    DSPCMCIAHW
};

#if 0
static const char* DSPcmciaBiosHelp[] =
{
    "Normally set to On unless you are not using this",
    "options and you want to use the BIOS area for Upper",
    "Memory Blocks.",
    NULL
};
#endif

static const ControlInfo DSPcmciaBiosInfo = {
    7,
    PG0_COLUMN + 48,
    PG0_COLUMN + 65,
    "PCMCIA BIOS:",
    "Select one",
    DSScsiBiosHelp, //DSPcmciaBiosHelp,
    paOffOnStrings,
    DSPCMCIABIOS
};

static const char* DSGamePortHelp[] =
{
    "Normally set to On unless you want to use a game port on",
    "an installed board (such as a sound board) or you need",
    "the I/O space.",
    NULL
};

static const ControlInfo DSGamePortInfo = {
```

```
    7,
    PG0_COLUMN + 14,
    PG0_COLUMN + 32,
    "Game Port:",
    "Select one",
    DSGamePortHelp,
    paOffOnStrings,
    DSGAMEPORT
};

#if 0
static const char* DSQuickPortHelp[] =
{
    "QuickPort mouse Help",
    NULL
};
#endif

static const ControlInfo DSQuickPortInfo = {
    8,
    PG0_COLUMN + 8,
    PG0_COLUMN + 32,
    "QuickPort mouse:",
    "Select one",
    DSScsiHwHelp,   //DSQuickPortHelp,
    paOffOnStrings,
    DSQUICKPORT
};

#endif
```

```
//________________________________________________________________
//                                              |
// (c) Copyright, Texas Instruments Incorporated, 1993.  All Rights     |
// Reserved.   Property of Texas Instruments Incorporated.  Restricted   |
// Rights -- Use, duplication or disclosure subject to restrictions set  |
// forth in TI's Program License Agreement and associated documentation. |
//________________________________________________________________|
//
// $Workfile:  PG0DATA.CPP  $
// $Revision:  1.11  $
//     $Date:  23 Sep 1993 09:26:04  $
//    Author:  Robert Tonsing
//      Site:  Temple
//  Language:  C++
//
//======================================================================
#include <stdlib.h>
#include <dos.h>
#include <string.h>
#include "setdock.h"
#include "keyboard.h"
#define DEFVALUES
#include "pg0data.h"
#include "screen.h"
#include "sdata.h"

//======================================================================
// Create stuff specific to page 0 of setup data.
//
Page0Wnd::Page0Wnd()
{
//   ControlList.AddItem( pMD9Pin, MD9PinCommInfo.nCol, MD9PinCommInfo.nRow );

#if 0
   AddControl( &DSHdd0Info );
   AddControl( &DSHdd1Info );
#endif
   AddControl( &DSFdd0Info );
   AddControl( &DSFdd1Info );
   AddControl( &DSFddSwapInfo );
   AddControl( &DSGamePortInfo );
   AddControl( &DSQuickPortInfo );

   AddControl( &DSScsiHwInfo );
   AddControl( &DSScsiBiosInfo );
   AddControl( &DSPcmciaHwInfo );
   AddControl( &DSPcmciaBiosInfo );
//   CurrentCtrl = (ControlWnd*) ControlList.GetHead();

   // Note: cleanup performed by base class destructor
}

//----------------------------------------------------------------------
// Display page 1 specific stuff
//
void Page0Wnd::Paint()
{
   DataWnd::Paint();

  // Prompts
//   ShowString( DATA_ROW + 2, DATA_COLUMN + 31, "Notebook", DATA_ATTRIBUTE );
```

```
  // Show page #
    ShowString( DATA_ROW, DATA_COLUMN + DATA_WIDTH - 5, DataText[ 0 ],
        DATA_ATTRIBUTE, TITLE_RIGHT );
}
```

```
//___________________________________________________________________
//                                                    |
// (c) Copyright, Texas Instruments Incorporated, 1993. All Rights      |
// Reserved. Property of Texas Instruments Incorporated. Restricted   |
// Rights -- Use, duplication or disclosure subject to restrictions set  |
// forth in TI's Program License Agreement and associated documentation. |
//___________________________________________________________________|
//
// $Workfile: PG0DATA.H $
// $Revision: 1.13 $
//    $Date: 23 Sep 1993 09:26:30 $
//   Author: Robert Tonsing
//     Site: Temple
// Language: C++
//
#include "datawnd.h"

/*---------------------------------------------------------------------------
  0...*:....1....:....2*...:....3....:.C..4.*..:....5....:...*6....:....7....
 ____________________________________________________________________________
 0|                                          Page 2 of 2    |
 1|                                                         |
 2|                     Notebook    DeskTop   MicroDock          |
 3|                                                         |
 4|       Configuration:     1          1        10            |
 5|                                                         |
 6|   Notebook 9 Pin Serial:    COM1       N/A       Off              |
 7|      Notebook Internal:   COM2       Off       COM1              |
 8|    Station 9 Pin Serial:   N/A        COM1      COM3              |
 9|   Station 25 Pin Serial:   N/A        COM2      N/A              |
10|                                                         |
11|              COM3/COM4 Addresses: 3e8/2e8                          |
12|                                                         |
13|                                                         |
14|____________________________________________________________________________|
  0....:....1....:....2....:....3....:....4....:....5....:....6....:....7....
---------------------------------------------------------------------------*/
//=======================================================================
// Handle stuff specific to page 1 of setup data.
//
class Page1Wnd : public DataWnd
{
private:

public:
   Page1Wnd();
   //~Page1Wnd();   // Note: cleanup performed by base class destructor
   void Paint();
};

#ifdef DEFVALUES    // Only used by pg0data.cpp
//=======================================================================
//
// All measurements are relative to DATA_ROW and DATA_COLUMN which defines the
// upper left corner of the above drawing.
//
//=======================================================================
class NBCommInfo : public ControlWnd
{
private:
   ControlWnd* pNBStdComm;
```

```
    ControlWnd* pNBOptComm;
    void SetFields();

public:
    NBCommInfo( const ControlInfo* pInfoParm, DataWnd* pParent )
        : ControlWnd( pInfoParm, pParent )
    {}
    void Init( ControlWnd* pNBStdCommParm, ControlWnd* pNBOptCommParm );
    void SetValue( int nValue );    // Set current value
    void IncValue();           // Inc to next value in array
    void DecValue();           // Dec to previous value in array
    void LoadDefaults();        // Load all default values
};

//====================================================================
class DSCommInfo : public ControlWnd
{
private:
    ControlWnd* pDSOptComm;
    ControlWnd* pDS9Pin;
    ControlWnd* pDS25Pin;
    void SetFields();

public:
    DSCommInfo( const ControlInfo* pInfoParm, DataWnd* pParent )
        : ControlWnd( pInfoParm, pParent )
    {}
    void Init( ControlWnd* pDSOptCommParm, ControlWnd* pDS9PinParm,
            ControlWnd* pDS25PinParm );
    void SetValue( int nValue );    // Set current value
    void IncValue();           // Inc to next value in array
    void DecValue();           // Dec to previous value in array
    void LoadDefaults();        // Load all default values
};

//====================================================================
class MDCommInfo : public ControlWnd
{
private:
    ControlWnd* pMDStdComm;
    ControlWnd* pMDOptComm;
    ControlWnd* pMD9Pin;
    void SetFields();

public:
    MDCommInfo( const ControlInfo* pInfoParm, DataWnd* pParent )
        : ControlWnd( pInfoParm, pParent )
    {}
    void Init( ControlWnd* pMDStdCommParm, ControlWnd* pMDOptCommParm,
            ControlWnd* pMD9PinParm );
    void SetValue( int nValue );    // Set current value
    void IncValue();           // Inc to next value in array
    void DecValue();           // Dec to previous value in array
    void LoadDefaults();        // Load all default values
};

static const char* szCommPorts[] =
{
    cszOff,
    "COM1",
    "COM2",
```

```
    "COM3",
    "COM4",
    NULL
};

static const char* NBCommCfgStrings[] =
{
    "Custom",
    "1",
    "2",
    "3",
    NULL
};

static const char* DSCommCfgStrings[] =
{
    "Custom",
    "1",
    "2",
    "3",
    "4",
    "5",
    "6",
    NULL
};

static const char* MDCommCfgStrings[] =
{
    "Custom",
    "1",
    "2",
    "3",
    "4",
    "5",
    NULL
};

const char CommCfgHelp[] = "Select comm port configuration";

static const char* NBCommCfgHelp[] =
{
    "Sets the Comm port values active when the Notebook is",
    "being used without a DeskTop or MicroDock.",
    "",
    "It toggles through a series of standard Comm port",
    "arrangements.  You can also select Custom to allow",
    "setting of each port.  In this case, it is up to the",
    "user to avoid hardware conflicts.",
    NULL
};

static const ControlInfo NBCommCfgInfo = {
    5,
    DATA_COLUMN + 35,
    DATA_COLUMN + 35,
    NULL, //" Standard Comm:",
    CommCfgHelp,
    NBCommCfgHelp,
    NBCommCfgStrings,
    0xff
};
```

```
static const char* DSCommCfgHelp[] =
{
    "Sets the Comm port values active when the Notebook is",
    "being used in a TravelMate DeskTop.",
    "",
    "It toggles through a series of standard Comm port",
    "arrangements.  You can also select Custom to allow",
    "setting of each port.  In this case, it is up to the",
    "user to avoid hardware conflicts.",
    NULL
};

static const ControlInfo DSCommCfgInfo = {
    5,
    DATA_COLUMN + 59,
    DATA_COLUMN + 59,
    NULL, //" Standard Comm:",
    CommCfgHelp,
    DSCommCfgHelp,
    DSCommCfgStrings,
    0xff
};

static const char* MDCommCfgHelp[] =
{
    "Sets the Comm port values active when the Notebook is",
    "being used in a TravelMate MicroDock.",
    "",
    "It toggles through a series of standard Comm port",
    "arrangements.  You can also select Custom to allow",
    "setting of each port.  In this case, it is up to the",
    "user to avoid hardware conflicts.",
    NULL
};

static const ControlInfo MDCommCfgInfo = {
    5,
    DATA_COLUMN + 47,
    DATA_COLUMN + 47,
    NULL, //" Standard Comm:",
    CommCfgHelp,
    MDCommCfgHelp,
    MDCommCfgStrings,
    0xff
};

static const ControlInfo NBStdCommInfo = {
    7,
    DATA_COLUMN + 4,
    DATA_COLUMN + 35,
    "Notebook 9 Pin Serial:",
    NULL,
    NullArray,
    szCommPorts,
    STDCOMMPORT
};

static const ControlInfo NBOptCommInfo = {
    8,
    DATA_COLUMN + 8,
    DATA_COLUMN + 35,
```

```
    "Notebook Internal:",
    NULL,
    NullArray,
    szCommPorts,
    OPTCOMMPORT
};

static const ControlInfo DSOptCommInfo = {
    8,
    DATA_COLUMN + 59,
    DATA_COLUMN + 59,
    NULL,
    NULL,
    NullArray,
    szCommPorts,
    DSNBOPTCOMM
};

static const ControlInfo DS9PinCommInfo = {
    9,
    DATA_COLUMN + 5,
    DATA_COLUMN + 59,
    "Station 9 Pin Serial:",
    NULL,
    NullArray,
    szCommPorts,
    DS9PINCOMM
};

static const ControlInfo DS25PinCommInfo = {
    10,
    DATA_COLUMN + 4,
    DATA_COLUMN + 59,
    "Station 25 Pin Serial:",
    NULL,
    NullArray,
    szCommPorts,
    DS25PINCOMM
};

static const ControlInfo MDStdCommInfo = {
    7,
    DATA_COLUMN + 47,
    DATA_COLUMN + 47,
    NULL, //" 9 Pin Serial",
    NULL,
    NullArray,
    szCommPorts,
    MDNBSTDCOMM
};

static const ControlInfo MDOptCommInfo = {
    8,
    DATA_COLUMN + 47,
    DATA_COLUMN + 47,
    NULL, //" 9 Pin Serial",
    NULL,
    NullArray,
    szCommPorts,
    MDNBOPTCOMM
};
```

```
static const ControlInfo MD9PinCommInfo = {
    9,
    DATA_COLUMN + 47,
    DATA_COLUMN + 47,
    NULL, //" 9 Pin Serial",
    NULL,
    NullArray,
    szCommPorts,
    MD9PINCOMM
};

static const char* Comm34AddrStrings[] =
{
    "338/238",
    "3e8/2e8",
    "2e8/2e0",
    "220/228",
    NULL
};

static const ControlInfo Comm34AddrInfo = {
    12,
    DATA_COLUMN + 18,
    DATA_COLUMN + 43,
    "COM3/COM4 Addresses:",
    "Select addresses for COM3 and COM4",
    NullArray,
    Comm34AddrStrings,
    DSCOMMADDR
};

#endif
```

//_______________________________________________________________
//                                                             |
// (c) Copyright, Texas Instruments Incorporated, 1993.  All Rights   |
// Reserved.  Property of Texas Instruments Incorporated.  Restricted   |
// Rights -- Use, duplication or disclosure subject to restrictions set  |
// forth in TI's Program License Agreement and associated documentation. |
//_______________________________________________________________|

```
//
// $Workfile:  PG0DATA.CPP  $
// $Revision:  1.11  $
//    $Date:  23 Sep 1993 09:26:04  $
//    Author:  Robert Tonsing
//      Site:  Temple
//  Language:  C++
//
//=====================================================================
#include <stdlib.h>
#include <dos.h>
#include <string.h>
#include "setdock.h"
#include "keyboard.h"
#define DEFVALUES
#include "pg1data.h"
#include "screen.h"
#include "sdata.h"

//=====================================================================
// Create stuff specific to page 0 of setup data.
//
Page1Wnd::Page1Wnd()
{
   NBCommInfo* pNBCommCfg = new NBCommInfo( &NBCommCfgInfo, this );
   ControlWnd* pNBStdComm = new ControlWnd( &NBStdCommInfo, this );
   ControlWnd* pNBOptComm = new ControlWnd( &NBOptCommInfo, this );
   pNBCommCfg->Init( pNBStdComm, pNBOptComm );
   ControlList.AddTail( pNBCommCfg );
   ControlList.AddTail( pNBStdComm );
   ControlList.AddTail( pNBOptComm );

   MDCommInfo* pMDCommCfg = new MDCommInfo( &MDCommCfgInfo, this );
   ControlWnd* pMDStdComm = new ControlWnd( &MDStdCommInfo, this );
   ControlWnd* pMDOptComm = new ControlWnd( &MDOptCommInfo, this );
   ControlWnd* pMD9Pin = new ControlWnd( &MD9PinCommInfo, this );
   pMDCommCfg->Init( pMDStdComm, pMDOptComm, pMD9Pin );
   ControlList.AddTail( pMDCommCfg );
   ControlList.AddTail( pMDStdComm );
   ControlList.AddTail( pMDOptComm );
   ControlList.AddTail( pMD9Pin );

   DSCommInfo* pDSCommCfg = new DSCommInfo( &DSCommCfgInfo, this );
   ControlWnd* pDSOptComm = new ControlWnd( &DSOptCommInfo, this );
   ControlWnd* pDS9Pin = new ControlWnd( &DS9PinCommInfo, this );
   ControlWnd* pDS25Pin = new ControlWnd( &DS25PinCommInfo, this );
   pDSCommCfg->Init( pDSOptComm, pDS9Pin, pDS25Pin );
   ControlList.AddTail( pDSCommCfg );
   ControlList.AddTail( pDSOptComm );
   ControlList.AddTail( pDS9Pin );
   ControlList.AddTail( pDS25Pin );

   AddControl( &Comm34AddrInfo );
//   CurrentCtrl = (ControlWnd*) ControlList.GetHead();
```

```
    // Note: cleanup performed by base class destructor
}

//-----------------------------------------------------------------------
// Display page 1 specific stuff
//
void Page1Wnd::Paint()
{
    DataWnd::Paint();

  // Prompts
    ShowString( DATA_ROW + 1, DATA_COLUMN + 3, " Port settings ", ENTRY_SELECTED_ATTRIBUTE );
    ShowString( DATA_ROW + 2, DATA_COLUMN + 31, "Notebook", DATA_ATTRIBUTE );
    ShowString( DATA_ROW + 3, DATA_COLUMN + 31, "  Only", DATA_ATTRIBUTE );
    ShowString( DATA_ROW + 2, DATA_COLUMN + 55, " DeskTop", DATA_ATTRIBUTE );
    ShowString( DATA_ROW + 3, DATA_COLUMN + 55, "& Notebook", DATA_ATTRIBUTE );
    ShowString( DATA_ROW + 2, DATA_COLUMN + 42, "MicroDock", DATA_ATTRIBUTE );
    ShowString( DATA_ROW + 3, DATA_COLUMN + 42, "& Notebook", DATA_ATTRIBUTE );
    ShowString( DATA_ROW + 5, DATA_COLUMN + 12, "Configuration:", DATA_ATTRIBUTE );

    ShowString( DATA_ROW + 9, DATA_COLUMN + 34, "N/A", DATA_ATTRIBUTE );
    ShowString( DATA_ROW + 10, DATA_COLUMN + 34, "N/A", DATA_ATTRIBUTE );
    ShowString( DATA_ROW + 7, DATA_COLUMN + 58, "N/A", DATA_ATTRIBUTE );
    ShowString( DATA_ROW + 10, DATA_COLUMN + 46, "N/A", DATA_ATTRIBUTE );

  // Show page #
    ShowString( DATA_ROW, DATA_COLUMN + DATA_WIDTH - 5, DataText[ 1 ],
        DATA_ATTRIBUTE, TITLE_RIGHT );
}

//-----------------------------------------------------------------------
void NBCommInfo::Init( ControlWnd* pNBStdCommParm, ControlWnd* pNBOptCommParm )
{
    pNBStdComm = pNBStdCommParm;
    pNBOptComm = pNBOptCommParm;
    pNBStdComm->Init();
    pNBOptComm->Init();
    wMaxValue = TiGetCommPorts( 0, NOTEBOOK, NULL, NULL, NULL, NULL );
    pNBStdComm->wMaxValue = pNBOptComm->wMaxValue = 2;

    wCurrentValue = TiGetCommConfig( NOTEBOOK, pNBStdComm->GetValue(),
          pNBOptComm->GetValue(), 0, 0 );

    pNBStdComm->fAvailFlag = pNBOptComm->fAvailFlag
          = ( wCurrentValue == 0 );
}

//-----------------------------------------------------------------------
void NBCommInfo::SetFields()
{
    BOOL fAvail = FALSE;

    if ( wCurrentValue == 0 )   // Custom
       fAvail = TRUE;
    else
    {
       int nNB9Pin, nNBModem;

       TiGetCommPorts( wCurrentValue, NOTEBOOK, &nNB9Pin,
             &nNBModem, NULL, NULL );
```

```
        pNBStdComm->SetValue( nNB9Pin );
        pNBOptComm->SetValue( nNBModem );
    }

    pNBStdComm->fAvailFlag = pNBOptComm->fAvailFlag = fAvail;
    pNBStdComm->Update();
    pNBOptComm->Update();
}

//------------------------------------------------------------------------
void NBCommInfo::SetValue( int nValue )
{
    ControlWnd::SetValue( nValue );
    SetFields();
}

//------------------------------------------------------------------------
void NBCommInfo::IncValue()          // Inc to next value in array
{
    ControlWnd::IncValue();
    SetFields();
}

//------------------------------------------------------------------------
void NBCommInfo::DecValue()          // Dec to previous value in array
{
    ControlWnd::DecValue();
    SetFields();
}

//------------------------------------------------------------------------
void NBCommInfo::LoadDefaults()
{
    // Get default from system
    pNBStdComm->LoadDefaults();
    pNBOptComm->LoadDefaults();

    wCurrentValue = TiGetCommConfig( NOTEBOOK, pNBStdComm->GetValue(),
            pNBOptComm->GetValue(), 0, 0 );

    SetFields();
}

//------------------------------------------------------------------------
void DSCommInfo::Init( ControlWnd* pDSOptCommParm, ControlWnd* pDS9PinParm,
            ControlWnd* pDS25PinParm )
{
    pDSOptComm = pDSOptCommParm;
    pDS9Pin = pDS9PinParm;
    pDS25Pin = pDS25PinParm;
    pDSOptComm->Init();
    pDS9Pin->Init();
    pDS25Pin->Init();
    wMaxValue = TiGetCommPorts( 0, DESKTOP, NULL, NULL, NULL, NULL );
    pDSOptComm->wMaxValue = 2;

    wCurrentValue = TiGetCommConfig( DESKTOP, 0, pDSOptComm->GetValue(),
        pDS9Pin->GetValue(), pDS25Pin->GetValue() );

    pDSOptComm->fAvailFlag = pDS9Pin->fAvailFlag = pDS25Pin->fAvailFlag
            = ( wCurrentValue == 0 );
```

```
}

//------------------------------------------------------------------------
void DSCommInfo::SetFields()
{
   BOOL fAvail = FALSE;

   if ( wCurrentValue == 0 )   // Custom
      fAvail = TRUE;
   else
   {
      int nDS25Pin, nNBModem, nDS9Pin;

      TiGetCommPorts( wCurrentValue, DESKTOP, NULL,
            &nNBModem, &nDS9Pin, &nDS25Pin );

      pDSOptComm->SetValue( nNBModem );
      pDS9Pin->SetValue( nDS9Pin );
      pDS25Pin->SetValue( nDS25Pin );
   }
   pDSOptComm->fAvailFlag = pDS9Pin->fAvailFlag = pDS25Pin->fAvailFlag = fAvail;
   pDSOptComm->Update();
   pDS9Pin->Update();
   pDS25Pin->Update();
}

//------------------------------------------------------------------------
void DSCommInfo::SetValue( int nValue )
{
   ControlWnd::SetValue( nValue );
   SetFields();
}

//------------------------------------------------------------------------
void DSCommInfo::IncValue()           // Inc to next value in array
{
   ControlWnd::IncValue();
   SetFields();
}

//------------------------------------------------------------------------
void DSCommInfo::DecValue()           // Dec to previous value in array
{
   ControlWnd::DecValue();
   SetFields();
}

//------------------------------------------------------------------------
void DSCommInfo::LoadDefaults()
{
   // Get default from system
   pDSOptComm->LoadDefaults();
   pDS9Pin->LoadDefaults();
   pDS25Pin->LoadDefaults();

   wCurrentValue = TiGetCommConfig( DESKTOP, 0, pDSOptComm->GetValue(),
      pDS9Pin->GetValue(), pDS25Pin->GetValue() );
}

//------------------------------------------------------------------------
void MDCommInfo::Init( ControlWnd* pMDStdCommParm, ControlWnd* pMDOptCommParm,
```

```
        ControlWnd* pMD9PinParm )
{
   pMDStdComm = pMDStdCommParm;
   pMDOptComm = pMDOptCommParm;
   pMD9Pin = pMD9PinParm;
   pMDStdComm->Init();
   pMDOptComm->Init();
   pMD9Pin->Init();
   wMaxValue = TiGetCommPorts( 0, MICRODOCK, NULL, NULL, NULL, NULL );
   pMDOptComm->wMaxValue = 2;

   wCurrentValue = TiGetCommConfig( MICRODOCK, pMDStdComm->GetValue(),
        pMDOptComm->GetValue(), pMD9Pin->GetValue(), 0 );

   pMDStdComm->fAvailFlag = pMDOptComm->fAvailFlag = pMD9Pin->fAvailFlag
        = ( wCurrentValue == 0 );
}

//---------------------------------------------------------------------
void MDCommInfo::SetFields()
{
   BOOL fAvail = FALSE;

   if ( wCurrentValue == 0 )   // Custom
      fAvail = TRUE;
   else
   {
      int nNB9Pin, nNBModem, nDS9Pin;

      TiGetCommPorts( wCurrentValue, MICRODOCK, &nNB9Pin,
           &nNBModem, &nDS9Pin, NULL );

      pMDOptComm->SetValue( nNBModem );
      pMDStdComm->SetValue( nNB9Pin );
      pMD9Pin->SetValue( nDS9Pin );
   }
   pMDStdComm->fAvailFlag = pMDOptComm->fAvailFlag = pMD9Pin->fAvailFlag = fAvail;
   pMDOptComm->Update();
   pMDStdComm->Update();
   pMD9Pin->Update();
}

//---------------------------------------------------------------------
void MDCommInfo::SetValue( int nValue )
{
   ControlWnd::SetValue( nValue );
   SetFields();
}

//---------------------------------------------------------------------
void MDCommInfo::IncValue()          // Inc to next value in array
{
   ControlWnd::IncValue();
   SetFields();
}

//---------------------------------------------------------------------
void MDCommInfo::DecValue()          // Dec to previous value in array
{
   ControlWnd::DecValue();
   SetFields();
```

```
}

//------------------------------------------------------------------------
void MDCommInfo::LoadDefaults()
{
    // Get default from system
    pMDStdComm->LoadDefaults();
    pMDOptComm->LoadDefaults();
    pMD9Pin->LoadDefaults();

    wCurrentValue = TiGetCommConfig( MICRODOCK, pMDStdComm->GetValue(),
            pMDOptComm->GetValue(), pMD9Pin->GetValue(), 0 );
}
```

```
//______________________________________________________________________
//                                                          |
// (c) Copyright, Texas Instruments Incorporated, 1993. All Rights      |
// Reserved. Property of Texas Instruments Incorporated. Restricted    |
// Rights -- Use, duplication or disclosure subject to restrictions set |
// forth in TI's Program License Agreement and associated documentation. |
//______________________________________________________________________|
//
// $Workfile: PG0DATA.H $
// $Revision: 1.13 $
//    $Date: 23 Sep 1993 09:26:30 $
//   Author: Robert Tonsing
//     Site: Temple
// Language: C++
//
#include "datawnd.h"

#define PG2_COLUMN (DATA_COLUMN + 2)

/*--------------------------------------------------------------------------
   0...*:....1....:....2*...:....3....:.C..4.*..:....5....:...*6....:....7....
   ______________________________________________________________________
 0|                                          Page 2 of 2    |
 1|                                                         |
 2|                    Notebook   DeskTop   MicroDock       |
 3|                                                         |
 4|        Configuration:     1         1         10        |
 5|                                                         |
 6|  Notebook 9 Pin Serial:   COM1      N/A       Off       |
 7|     Notebook Internal:    COM2      Off       COM1      |
 8|   Station 9 Pin Serial:   N/A       COM1      COM3      |
 9|  Station 25 Pin Serial:   N/A       COM2      N/A       |
10|                                                         |
11|          COM3/COM4 Addresses: 3e8/2e8                   |
12|                                                         |
13|                                                         |
14|_________________________________________________________|
   0....:....1....:....2....:....3....:....4....:....5....:....6....:....7....
--------------------------------------------------------------------------*/
//======================================================================
// Handle stuff specific to page 1 of setup data.
//
class Page2Wnd : public DataWnd
{
private:

public:
   Page2Wnd();
   //~Page2Wnd();   // Note: cleanup performed by base class destructor
   void Paint();
};

#ifdef DEFVALUES    // Only used by pg0data.cpp
//======================================================================
//
// All measurements are relative to DATA_ROW and DATA_COLUMN which defines the
// upper left corner of the above drawing.
//

const char cszNBPort[] = "Notebook Port";
const char cszMDPort[] = "MicroDock Port";
```

```
static const char cszLPTa[] = "3BCh - IRQ7";
static const char cszLPTb[] = "378h - IRQ7";
static const char cszLPTc[] = "278h - IRQ5";

static const char* NBLptDataStrings[] =
{
   cszDisabled,
   cszLPTa,
   cszLPTb,
   cszLPTc,
   NULL
};

static const char* MDLptNameStrings[] =
{
   cszNBPort,
   cszMDPort,
   NULL
};

static const char* DSLptCfgStrings[] =
{
   "1",
   "2",
   "3",
   "4",
   "5",
   "6",
   "7",
   NULL
};

const char LptCfgHelp[] = "Select LPT port configuration";

//=====================================================================
class LptInfo : public ControlWnd
{
protected:
   ControlWnd* pLpt1;
   void SetFields();

public:
   LptInfo( const ControlInfo* pInfoParm, DataWnd* pParent )
      : ControlWnd( pInfoParm, pParent )
   {}
   virtual ~LptInfo();
   BOOL Init( ControlWnd* pLpt1Parm );
   void SetValue( int nValue );   // Set current value
   void IncValue();              // Inc to next value in array
   void DecValue();              // Dec to previous value in array
   void LoadDefaults();              // Load all default values
};

//=====================================================================
class DSLptInfo : public ControlWnd
{
protected:
   ControlWnd* pLpt1;
   void SetFields();

public:
```

```
    DSLptInfo( const ControlInfo* pInfoParm, DataWnd* pParent )
        : ControlWnd( pInfoParm, pParent )
    {}
    virtual ~DSLptInfo();
    BOOL Init( ControlWnd* pLpt1Parm );
    void SetValue( int nValue );   // Set current value
    void IncValue();               // Inc to next value in array
    void DecValue();               // Dec to previous value in array
    void LoadDefaults();           // Load all default values
};

//==========================================================================
class MDLptInfo : public ControlWnd
{
private:
    ControlWnd* pLpt1;
    ControlWnd* pLpt2;
    ControlWnd* pName1;
    ControlWnd* pName2;
    void SetFields();

public:
    MDLptInfo( const ControlInfo* pInfoParm, DataWnd* pParent )
        : ControlWnd( pInfoParm, pParent )
    {}
    ~MDLptInfo();
    BOOL Init( ControlWnd* pLpt1Parm, ControlWnd* pLpt2Parm,
            ControlWnd* pName1Parm, ControlWnd* pName2Parm );
    void SetValue( int nValue );   // Set current value
    void IncValue();               // Inc to next value in array
    void DecValue();               // Dec to previous value in array
    void LoadDefaults();           // Load all default values
};

static const char* NBLptCfgHelp[] =
{
    "Sets the LPT port values active when the Notebook is",
    "being used without a DeskTop or MicroDock.",
    "",
    "It toggles through a series of available LPT port",
    "settings.",
    NULL
};

static const ControlInfo NBLptCfgInfo = {
    5,
    DATA_COLUMN + 28,
    DATA_COLUMN + 28,
    NULL,
    LptCfgHelp,
    NBLptCfgHelp,
    DSLptCfgStrings,
    0xff
};

static const char* DSLptCfgHelp[] =
{
    "Sets the LPT port values active when the Notebook is",
    "being used in a Travelmate DeskTop.",
    "",
    "It toggles through a series of available LPT port",
```

```
    "settings.",
    NULL
};

static const ControlInfo DSLptCfgInfo = {
    5,
    DATA_COLUMN + 61,
    DATA_COLUMN + 61,
    NULL,
    LptCfgHelp,
    DSLptCfgHelp,
    DSLptCfgStrings,
    0xff
};

static const char* MDCommCfgHelp[] =
{
    "Sets the LPT port values active when the Notebook is",
    "being used in a TravelMate MicroDock.",
    "",
    "It toggles through a series of available LPT port",
    "arrangements.",
    NULL
};

static const ControlInfo MDLptCfgInfo = {
    5,
    DATA_COLUMN + 44,
    DATA_COLUMN + 44,
    NULL,
    LptCfgHelp,
    MDCommCfgHelp,
    DSLptCfgStrings,
    0xff
};

#if 0
static const char* NBLptPortStrings[] =
{
    cszDisabled,
    "LPT1",
    "LPT2",
    "LPT3",
    NULL
};
#endif

static const ControlInfo NBLptPortInfo = {
    8,
    PG2_COLUMN + 26,
    PG2_COLUMN + 26,
    "",
    "Select one",
    NullArray,
    NBLptDataStrings,
    0xff
};

static const ControlInfo DSLptPortInfo = {
    8,
    PG2_COLUMN + 59,
```

```
    PG2_COLUMN + 59,
    "",
    "Select one",
    NullArray,
    NBLptDataStrings,
    0xff
};

static const ControlInfo MDLpt1PortInfo = {
    8,
    PG2_COLUMN + 43,
    PG2_COLUMN + 43,
    "",
    "Select one",
    NullArray,
    NBLptDataStrings, //MDLpt1DataStrings,
    0xff
};

static const ControlInfo MDLpt2PortInfo = {
    11,
    PG2_COLUMN + 19,
    PG2_COLUMN + 43,
    "",
    "Select one",
    NullArray,
    NBLptDataStrings, //MDLpt2DataStrings,
    0xff
};

static const ControlInfo MDLpt1NameInfo = {
    7,
    PG2_COLUMN + 19,
    PG2_COLUMN + 43,
    "",
    "Select one",
    NullArray,
    MDLptNameStrings,
    0xff
};

static const ControlInfo MDLpt2NameInfo = {
    10,
    PG2_COLUMN + 19,
    PG2_COLUMN + 43,
    "",
    "Select one",
    NullArray,
    MDLptNameStrings,
    0xff
};

static const char* DSLptModeStrings[] =
{
    "Standard",
    "EPP",
    "ECP",
    NULL
};

static const char* DSLptModeHelp[] =
```

```
{
    "Sets the printer port type on the TravelMate DeskTop",
    "or MicroDock.",
    "Normally set to Normal unless there is an extended",
    "port on your printer.",
    NULL
};

static const ControlInfo DSLptModeInfo = {
    13,
    PG2_COLUMN + 2,
    PG2_COLUMN + 40,
    "DeskTop/MicroDock LPT port type:",
    "Sets extended printer port type",
    DSLptModeHelp,
    DSLptModeStrings,
    DSLPTPORTMODE
};

#endif
```

```
//___________________________________________________________________
//                                              |
// (c) Copyright, Texas Instruments Incorporated, 1993. All Rights   |
// Reserved. Property of Texas Instruments Incorporated. Restricted  |
// Rights -- Use, duplication or disclosure subject to restrictions set  |
// forth in TI's Program License Agreement and associated documentation. |
//___________________________________________________________________|
```

```
//
// $Workfile: PG0DATA.CPP $
// $Revision: 1.11 $
//    $Date: 23 Sep 1993 09:26:04 $
//    Author: Robert Tonsing
//      Site: Temple
//  Language: C++
//
//======================================================================
#include <stdlib.h>
#include <dos.h>
#include <string.h>
#include "setdock.h"
#include "keyboard.h"
#define DEFVALUES
#include "pg2data.h"
#include "screen.h"
#include "sdata.h"

//======================================================================
// Create stuff specific to page 0 of setup data.
//
Page2Wnd::Page2Wnd()
{
   LptInfo* pLptCfg = new LptInfo( &NBLptCfgInfo, this );
   ControlWnd* pLpt1 = new ControlWnd( &NBLptPortInfo, this );
   pLptCfg->Init( pLpt1 );
   ControlList.AddTail( pLptCfg );
   ControlList.AddTail( pLpt1 );

   MDLptInfo* pMDLptCfg = new MDLptInfo( &MDLptCfgInfo, this );
   pLpt1 = new ControlWnd( &MDLpt1PortInfo, this );
   ControlWnd* pLpt2 = new ControlWnd( &MDLpt2PortInfo, this );
   ControlWnd* pName1 = new ControlWnd( &MDLpt1NameInfo, this );
   ControlWnd* pName2 = new ControlWnd( &MDLpt2NameInfo, this );
   pMDLptCfg->Init( pLpt1, pLpt2, pName1, pName2 );
   ControlList.AddTail( pMDLptCfg );
   ControlList.AddTail( pName1 );
   ControlList.AddTail( pLpt1 );
   ControlList.AddTail( pName2 );
   ControlList.AddTail( pLpt2 );

   DSLptInfo* pDSLptCfg = new DSLptInfo( &DSLptCfgInfo, this );
   pLpt1 = new ControlWnd( &DSLptPortInfo, this );
   pDSLptCfg->Init( pLpt1 );
   ControlList.AddTail( pDSLptCfg );
   ControlList.AddTail( pLpt1 );

   AddControl( &DSLptModeInfo );

   // Note: cleanup performed by base class destructor
}

//----------------------------------------------------------------------
```

```
// Display page 1 specific stuff
//
void Page2Wnd::Paint()
{
    DataWnd::Paint();

  // Prompts
    ShowString( DATA_ROW + 1, DATA_COLUMN + 3, " LPT settings ", ENTRY_SELECTED_ATTRIBUTE );
    ShowString( DATA_ROW + 2, DATA_COLUMN + 24, "Notebook", DATA_ATTRIBUTE );
    ShowString( DATA_ROW + 3, DATA_COLUMN + 24, "  Only", DATA_ATTRIBUTE );
    ShowString( DATA_ROW + 2, DATA_COLUMN + 57, " DeskTop", DATA_ATTRIBUTE );
    ShowString( DATA_ROW + 3, DATA_COLUMN + 57, "& Notebook", DATA_ATTRIBUTE );
    ShowString( DATA_ROW + 2, DATA_COLUMN + 40, "MicroDock", DATA_ATTRIBUTE );
    ShowString( DATA_ROW + 3, DATA_COLUMN + 40, "& Notebook", DATA_ATTRIBUTE );
    ShowString( DATA_ROW + 5, DATA_COLUMN + 5, "Configuration:", DATA_ATTRIBUTE );
    ShowString( DATA_ROW + 7, DATA_COLUMN + 14, "LPT1:", DATA_ATTRIBUTE );
    ShowString( DATA_ROW + 10, DATA_COLUMN + 14, "LPT2:", DATA_ATTRIBUTE );

    ShowString( DATA_ROW + 7, DATA_COLUMN + 22, cszNBPort, DATA_ATTRIBUTE );
    ShowString( DATA_ROW + 7, DATA_COLUMN + 56, "DeskTop Port", DATA_ATTRIBUTE );
    ShowString( DATA_ROW + 10, DATA_COLUMN + 27, "N/A", DATA_ATTRIBUTE );
    ShowString( DATA_ROW + 10, DATA_COLUMN + 60, "N/A", DATA_ATTRIBUTE );

  // Show page #
    ShowString( DATA_ROW, DATA_COLUMN + DATA_WIDTH - 5, DataText[ 2 ],
        DATA_ATTRIBUTE, TITLE_RIGHT );
}

//--------------------------------------------------------------------
BOOL LptInfo::Init( ControlWnd* pLpt1Parm )
{
    TiReadConfig( PARALLELPORT, &wCurrentValue );
    pLpt1 = pLpt1Parm;
    pLpt1->Init();
    wMaxValue = TiGetLptPorts( 0, NOTEBOOK, NULL, NULL ) - 1;
    pLpt1->fAvailFlag = FALSE;

    wCurrentValue = TiGetLptConfig( NOTEBOOK, wCurrentValue, 0 );
    // Check for Custom or error
    if ( wCurrentValue == 0 || wCurrentValue > ( wMaxValue + 1 ) )
        LoadDefaults();
    else
        wCurrentValue--;    // Make 0-based
    SetFields();
    return TRUE;
}

//--------------------------------------------------------------------
void LptInfo::SetFields()
{
    int nNBPort;

    TiGetLptPorts( wCurrentValue + 1, NOTEBOOK, &nNBPort, NULL );
    pLpt1->SetValue( nNBPort );
    pLpt1->Update();
}

//--------------------------------------------------------------------
void LptInfo::SetValue( int nValue )
{
    ControlWnd::SetValue( nValue );
```

```
    SetFields();
}

//----------------------------------------------------------------------
void LptInfo::IncValue()          // Inc to next value in array
{
    ControlWnd::IncValue();
    SetFields();
}

//----------------------------------------------------------------------
void LptInfo::DecValue()          // Dec to previous value in array
{
    ControlWnd::DecValue();
    SetFields();
}

//----------------------------------------------------------------------
void LptInfo::LoadDefaults()
{
    // Get default from system
    TiDefaultConfig( PARALLELPORT, &wCurrentValue );
    wCurrentValue = TiGetLptConfig( NOTEBOOK, wCurrentValue, 0 ) - 1;
    SetFields();
}

//----------------------------------------------------------------------
LptInfo::~LptInfo()
{
    if ( fSaveFlag )
    {
        int nNBPort;

        TiGetLptPorts( wCurrentValue + 1, NOTEBOOK, &nNBPort, NULL  );
        TiWriteConfig( PARALLELPORT, nNBPort );
    }
}

//----------------------------------------------------------------------
BOOL DSLptInfo::Init( ControlWnd* pLpt1Parm )
{
    pLpt1 = pLpt1Parm;
    TiReadConfig( DSLPTPORT, &wCurrentValue );
    pLpt1->Init();
    wMaxValue = TiGetLptPorts( 0, DESKTOP, NULL, NULL ) - 1;
    pLpt1->fAvailFlag = FALSE;

    wCurrentValue = TiGetLptConfig( DESKTOP, 0, wCurrentValue );
    if ( wCurrentValue == 0 || wCurrentValue > ( wMaxValue + 1 ) )
        LoadDefaults();
    else
        wCurrentValue--;    // Make 0-based
    SetFields();
    return TRUE;
}

//----------------------------------------------------------------------
void DSLptInfo::SetFields()
{
    int nDSPort;
```

```
    TiGetLptPorts( wCurrentValue + 1, DESKTOP, NULL, &nDSPort  );
    pLpt1->SetValue( nDSPort );
    pLpt1->Update();
}

//-----------------------------------------------------------------------
void DSLptInfo::SetValue( int nValue )
{
    ControlWnd::SetValue( nValue );
    SetFields();
}

//-----------------------------------------------------------------------
void DSLptInfo::IncValue()          // Inc to next value in array
{
    ControlWnd::IncValue();
    SetFields();
}

//-----------------------------------------------------------------------
void DSLptInfo::DecValue()          // Dec to previous value in array
{
    ControlWnd::DecValue();
    SetFields();
}

//-----------------------------------------------------------------------
void DSLptInfo::LoadDefaults()
{
    // Get default from system
    TiDefaultConfig( DSLPTPORT, &wCurrentValue );
    wCurrentValue = TiGetLptConfig( DESKTOP, 0, wCurrentValue ) - 1;
    SetFields();
}

//-----------------------------------------------------------------------
DSLptInfo::~DSLptInfo()
{
    if ( fSaveFlag )
    {
        int nDSPort;

        TiGetLptPorts( wCurrentValue + 1, DESKTOP, NULL, &nDSPort );
        TiWriteConfig( DSLPTPORT, nDSPort );
    }
}

//-----------------------------------------------------------------------
BOOL MDLptInfo::Init( ControlWnd* pLpt1Parm, ControlWnd* pLpt2Parm,
        ControlWnd* pName1Parm, ControlWnd* pName2Parm )
{
    WORD wNBval = 0;
    WORD wMDval = 0;
    TiReadConfig( NBLPTPORT, &wNBval );
    TiReadConfig( MDLPTPORT, &wMDval );
    wMaxValue = TiGetLptPorts( 0, MICRODOCK, NULL, NULL ) - 1;
    wCurrentValue = TiGetLptConfig( MICRODOCK, wNBval, wMDval );
    if ( wCurrentValue == 0 || wCurrentValue > ( wMaxValue + 1 ) )
        LoadDefaults();
    else
        wCurrentValue--;    // Make 0-based
```

```
    pLpt1 = pLpt1Parm;
    pLpt2 = pLpt2Parm;
    pName1 = pName1Parm;
    pName2 = pName2Parm;
    pLpt1->fAvailFlag = pLpt2->fAvailFlag = pName1->fAvailFlag
          = pName2->fAvailFlag = FALSE;

    SetFields();
    return TRUE;
}

//-----------------------------------------------------------------------
void MDLptInfo::SetFields()
{
#if 1
    int nNBPort, nMDPort;

    TiGetLptPorts( wCurrentValue + 1, MICRODOCK, &nNBPort, &nMDPort );
    if ( ( nNBPort > nMDPort && nMDPort > 0 ) || nNBPort == 0 )
    {
        pLpt1->SetValue( nMDPort );
        pLpt2->SetValue( nNBPort );
        pName1->SetValue( 1 );
        pName2->SetValue( 0 );
    }
    else
    {
        pLpt1->SetValue( nNBPort );
        pLpt2->SetValue( nMDPort );
        pName1->SetValue( 0 );
        pName2->SetValue( 1 );
    }
    pLpt1->Update();
    pLpt2->Update();
    pName1->Update();
    pName2->Update();
#else
    pLpt1->SetValue( wCurrentValue );
    pLpt1->Update();
    pLpt2->SetValue( wCurrentValue );
    pLpt2->Update();
    pName1->SetValue( wCurrentValue );
    pName1->Update();
    pName2->SetValue( wCurrentValue );
    pName2->Update();
#endif
}

//-----------------------------------------------------------------------
void MDLptInfo::SetValue( int nValue )
{
    ControlWnd::SetValue( nValue );
    SetFields();
}

//-----------------------------------------------------------------------
void MDLptInfo::IncValue()          // Inc to next value in array
{
    ControlWnd::IncValue();
    SetFields();
}
```

```
//----------------------------------------------------------------------
void MDLptInfo::DecValue()          // Dec to previous value in array
{
    ControlWnd::DecValue();
    SetFields();
}

//----------------------------------------------------------------------
MDLptInfo::~MDLptInfo()
{
    if ( fSaveFlag )
    {
        int nNBPort, nMDPort;

        TiGetLptPorts( wCurrentValue + 1, MICRODOCK, &nNBPort, &nMDPort  );
        TiWriteConfig( NBLPTPORT, nNBPort );
        TiWriteConfig( MDLPTPORT, nMDPort );
    }
}

//----------------------------------------------------------------------
void MDLptInfo::LoadDefaults()
{
    // Get default from system
    WORD wNBval = 0;
    WORD wMDval = 0;
    TiDefaultConfig( NBLPTPORT, &wNBval );
    TiDefaultConfig( MDLPTPORT, &wMDval );
    wCurrentValue = TiGetLptConfig( MICRODOCK, wNBval, wMDval ) - 1;

    SetFields();
}

#if 0
//----------------------------------------------------------------------
BOOL DSLpt::Init()
{
    ControlWnd::Init();

    if ( wCurrentValue == 2 )
        wCurrentValue = 1;
    else
    {
        wCurrentValue = 0;
        TiWriteConfig( pInfo->bRequest, wCurrentValue );
    }
    return TRUE;
}

//----------------------------------------------------------------------
DSLpt::~DSLpt()
{
    if ( wCurrentValue == 1 )
        wCurrentValue = 2;
    else
        wCurrentValue = 0;
    TiWriteConfig( pInfo->bRequest, wCurrentValue );
}
#endif
```

```
//_____________________________________________________________
//                                              |
// (c) Copyright, Texas Instruments Incorporated, 1993. All Rights  |
// Reserved. Property of Texas Instruments Incorporated. Restricted  |
// Rights -- Use, duplication or disclosure subject to restrictions set  |
// forth in TI's Program License Agreement and associated documentation. |
//_____________________________________________________________|
//
//                                    XXX
//                                     XX
// XXXXXXX  XXXXX  XX XXX   XXXXX   XXXXX   XX XXX     XX
// XX       XX  XX   XXX XX  XX    X  XX    X  XXX XX     XX XXX
// XXXXXXX  XX       XX     XXXXXXX XXXXXXX  XX  XX     XXX XX
//    XX XX   XX  XX     XX      XX       XX  XX  XX   XX  XX
// XXXXXXX  XXXXX  XXXX     XXXXX   XXXXX   XX  XX  XX  XXX  XXX
//_____________________________________________________________
//
// $Revision:  1.0  $
//    $Date:  02 Aug 1993 15:10:14  $
//_____________________________________________________________
//
// Title  - screen.h
//
// Author - Robert Tonsing, Ross Steiner
//
// Date   - January 20, 1993
//
// Site   - Temple
//
// Revision - *
//
// Language - C++
//
// Abstract -
//
//_____________________________________________________________

#ifndef _SCREEN_H_
#define _SCREEN_H_

/*********************************************************************

 Screen

 Provides minimal set of operations for using the screen in text
 mode.

 Public Interface:

 showChar - displays character at the specified position.
 SetCurPos - moves the screen cursor to the specfied location.
 CursorOn - displays screen cursor.
 CursorOff - hides screen cursor.

*********************************************************************/

// Use MSC "_asm" code
#define USE_ASM 1

#define BORDER_NONE 0
#define BORDER_SINGLE   1
```

```
#define BORDER_DOUBLE    2

#define TITLE_LEFT  0
#define   TITLE_CENTERED 1
#define   TITLE_RIGHT    2
#define TITLE_FILL  0x10

//=======================================================================
// class Screen
void CursorSave();
void SetCurPos( BYTE row, BYTE col );
void ShowChar( BYTE row, BYTE col, BYTE chr, BYTE attr );
void ShowChar( BYTE row, BYTE col, BYTE chr, BYTE attr, int count );
void ShowString( BYTE row, BYTE col, const char* string, BYTE attr,
     int nAlign = TITLE_LEFT );
void ShowStrings( BYTE row, BYTE col, const char* pszText[], BYTE attr,
     int nAlign = TITLE_LEFT );
// int    GetCurRow();
// int    GetCurColumn();
void CursorOn();
void CursorOff();
void ClearBox( BYTE row, BYTE col, BYTE erow, BYTE ecol, BYTE attr );
void DrawBox( BYTE row, BYTE col, BYTE erow, BYTE ecol, BYTE attr,
    int BorderType, int Shadow, BYTE ShadAttr );

extern int nCursorSave;

#if USE_ASM
    #pragma optimize( "egl", off )  // Turn off optimization for _asm code
#endif
//=======================================================================
// Screen::SetCurPos
//
// This function moves the screen cursor to the specified position.
//=======================================================================
inline void SetCurPos( BYTE row, BYTE col )
{
#if USE_ASM
    _asm
    {
     mov ah,2        // Move to position
     mov bh,0        // Page
     mov dh,row;
     mov dl,col;
     int 10h
    }
#else
    union REGS regs;

    regs.h.ah = 2;
    regs.h.bh = 0;
    regs.h.dh = (BYTE)row;
    regs.h.dl = (BYTE)col;
    int86( 0x10, &regs, &regs );
#endif
}

//=======================================================================
// Screen::CursorOn
//
// This function displays the screen cursor.
```

```
//=========================================================================
inline void CursorOn()
{
#if USE_ASM
   _asm
   {
    mov ah,1           // Set cursor type
    mov cx,nCursorSave
    int 10h
   }
#else
   union REGS regs;

   regs.h.ah = 0x01;
   regs.x.cx = nCursorSave;
   int86( 0x10, &regs, &regs );
#endif
}


#if USE_ASM
   #pragma optimize( "", on )
#endif

#endif // _SCREEN_H_
```

```
//_______________________________________________________________
//                                              |
// (c) Copyright, Texas Instruments Incorporated, 1993. All Rights |
// Reserved. Property of Texas Instruments Incorporated. Restricted |
// Rights -- Use, duplication or disclosure subject to restrictions set |
// forth in TI's Program License Agreement and associated documentation. |
//_______________________________________________________________|
//
//
// XXXX  XXXX XXXXX  XXX   XXX  XXXX     XXXX XXXX  XXXX
// XX    XX    XX X X  X X  X XX X    XX    XX X XX X
// XXX  XX    XX    XXXXX XXXXX XX X    XX    XX X XX X
//   XX XX    XX    X     X    XX X    XX    XXXX  XXXX
// XXXX   XXXX XX     XXX   XXX  XX X X  XXXX XX    XX
//                                   XX    XX
//_______________________________________________________________
//
// $Revision:  1.0  $
//     $Date:  02 Aug 1993 15:09:52  $
//_______________________________________________________________
//
// Title  - screen.cpp
//
// Author - Robert Tonsing, Ross Steiner
//
// Date   - January 20, 1993
//
// Site   - Temple
//
// Revision - *
//
// Language - C++
//
// Abstract -
//
//_______________________________________________________________

#include <string.h>
#include "setdock.h"
#include "screen.h"

#if USE_ASM
#pragma optimize( "egl", off )  // Turn off optimization for _asm code
#else
#include <dos.h>
#endif

struct BoxBorder {
    BYTE UpLeft;
    BYTE BotLeft;
    BYTE UpRight;
    BYTE BotRight;
    BYTE Vert;
    BYTE Horiz;
};

static const BoxBorder DoubleTest = { 201, 200, 187, 188, 186, 205 };
static const BoxBorder SingleTest = { 218, 192, 191, 217, 179, 196 };
int nCursorSave;

//=====================================================================
```

```
// Screen constructor
//======================================================================
void CursorSave()
{
   // save the caller's cursor type
#if USE_ASM
   _asm
   {
   mov ah,03h     // Get cursor position
   mov bh,00h     // Page
   int 10h
   mov nCursorSave,cx
   }
#else
   union REGS regs;

   regs.h.ah = 0x03;
   regs.h.bh = 0x00;
   int86( 0x10, &regs, &regs );
   nCursorSave = regs.x.cx;
#endif
}

//======================================================================
// Screen::ShowChar
//
// This function displays the specified character at the specified
// position.
//======================================================================
void ShowChar( BYTE row, BYTE col, BYTE chr, BYTE attr )
{
   SetCurPos( row, col );

#if USE_ASM
   _asm
   {
   mov ah,9       // Display char
   mov al,chr     // Char
   mov bh,0       // Page 0
   mov bl,attr    // Attribute
   mov cx,1       // Count
   int 10h
   }
#else
   union REGS regs;

   // Display char
   regs.h.ah = 9;
   regs.h.al = (BYTE)chr;
   regs.h.bh = 0;
   regs.h.bl = (BYTE)attr;
   regs.x.cx = 1;
   int86( 0x10, &regs, &regs );
#endif
}

//======================================================================
// Screen::showChar
//
// This function displays the specified character at the specified
// position.
```

```
//======================================================================
void ShowChar( BYTE row, BYTE col, BYTE chr, BYTE attr, int count )
{
    SetCurPos( row, col );

#if USE_ASM
    _asm
    {
    mov ah,9        // Display char
    mov al,chr      // Char
    mov bh,0        // Page 0
    mov bl,attr     // Attribute
    mov cx,count        // Count
    int 10h
    }
#else
    union REGS regs;

    // Display char
    regs.h.ah = 9;
    regs.h.al = (BYTE)chr;
    regs.h.bh = 0;
    regs.h.bl = (BYTE)attr;
    regs.x.cx = count;
    int86( 0x10, &regs, &regs );
#endif
}

#if 0
//======================================================================
int GetCurRow( void )
{
#if USE_ASM
    BYTE result;
    _asm
    {
    mov ah,3            // Get cursor position
    mov bh,0            // Page
    int 10h
    mov result,dh           // Return row
    }
    return result;
#else
    union REGS regs;

    regs.h.ah = 0x03;
    regs.h.bh = 0x00;
    int86( 0x10, &regs, &regs );
    return( regs.h.dh );
#endif
}

//======================================================================
int GetCurColumn( void )
{
#if USE_ASM
    BYTE result;
    _asm
    {
    mov ah,3            // Get cursor position
    mov bh,0            // Page
```

```
    int 10h
    mov result,dl           // Return col
    }
    return result;
#else
    union REGS regs;

    regs.h.ah = 0x03;
    regs.h.bh = 0x00;
    int86( 0x10, &regs, &regs );
    return( regs.h.dl );
#endif
}
#endif
//==========================================================================
// Screen::CursorOff
//
// This function hides the screen cursor.
//==========================================================================
void CursorOff()
{
#if USE_ASM
    CursorSave();

    _asm
    {
    // turn off cursor
    mov ah,1            // Set cursor type
    mov cx,0x2000           // Illegal start/end
    int 10h
    }
#else
    union REGS regs;

    // save the caller's cursor for CursorRestore()
    regs.h.ah = 0x03;
    regs.h.bh = 0x00;
    int86( 0x10, &regs, &regs );
    nCursorSave = regs.x.cx;

    // turn off cursor
    regs.h.ah = 0x01;
    regs.x.cx = 0x2000;
    int86( 0x10, &regs, &regs );
#endif
}

//==========================================================================
void ClearBox( BYTE brow, BYTE bcol, BYTE erow, BYTE ecol, BYTE attr )
{
#if USE_ASM
    _asm
    {
    mov ax,0600h            // Initialize window
    mov bh,attr
    mov ch,brow
    mov cl,bcol
    mov dh,erow
    mov dl,ecol
    int 10h
    }
```

```
#else
    union REGS regs;

    regs.x.ax = 0x0600;
    regs.h.bh = attr;
    regs.h.ch = brow;
    regs.h.cl = bcol;
    regs.h.dh = erow;
    regs.h.dl = ecol;
    int86( 0x10, &regs, &regs );
#endif
}

#if USE_ASM
#pragma optimize( "", on )
#endif

//=====================================================================
// Show a text string, aligned on the given column
//
void ShowString( BYTE bRow, BYTE bCol, const char* pszText, BYTE bAttr,
    int nAlign )
{

    switch( nAlign )
    {
    case TITLE_CENTERED:
        bCol -= ( strlen( pszText ) + 0 ) / 2;
        break;

    case TITLE_RIGHT:
        bCol -= strlen( pszText );
        break;

    default:
    case TITLE_LEFT:
        break;
    }

    while( *pszText )
    ShowChar( bRow, bCol++, *pszText++, bAttr );
}

//=====================================================================
// Show an array of strings, with each string 1 row below the previous.
// Last entry in array must be NULL.
//
void ShowStrings( BYTE bRow, BYTE bCol, const char* pszText[], BYTE bAttr,
    int nAlign )
{
    for( int i = 0; pszText[ i ]; i++ )
    ShowString( bRow + i, bCol, pszText[ i ], bAttr, nAlign );
}

//=====================================================================
void DrawBox( BYTE brow, BYTE bcol, BYTE erow, BYTE ecol, BYTE attr,
    int BorderType, int Shadow, BYTE ShadAttr )
{
    const BoxBorder* Border = NULL;

    ClearBox( brow, bcol, erow, ecol, attr );
```

```
    if ( BorderType == BORDER_DOUBLE )
    Border = &DoubleTest;
    else if ( BorderType == BORDER_SINGLE )
    Border = &SingleTest;

    if ( Border )
    {
    // Draw corners
    ShowChar( brow, bcol, Border->UpLeft, attr );
    ShowChar( erow, bcol, Border->BotLeft, attr );
    ShowChar( brow, ecol, Border->UpRight, attr );
    ShowChar( erow, ecol, Border->BotRight, attr );
    // Draw horizontals
    ShowChar( brow, bcol + 1, Border->Horiz, attr, ecol - bcol - 1 );
    ShowChar( erow, bcol + 1, Border->Horiz, attr, ecol - bcol - 1 );
    // Draw verticals
    for ( BYTE i = brow + 1; i < erow; i++ )
    {
        ShowChar( i, bcol, Border->Vert, attr );
        ShowChar( i, ecol, Border->Vert, attr );
    }
    }

    if ( Shadow )
    {
    for ( BYTE i = brow + 1; i <= erow; i++ )
        ShowChar( i, ecol + 1, 219, ShadAttr );
    ShowChar( erow + 1, bcol + 1, 223, ShadAttr, ecol - bcol + 1 );
    }
}
```

```
// from Windows.h

/****** Simple types & common helper macros *********************************/

typedef int             BOOL;
#define FALSE             0
#define TRUE              1

typedef unsigned char     BYTE;
typedef unsigned short    WORD;
typedef unsigned long     DWORD;
typedef unsigned int      UINT;
typedef signed long       LONG;

#define LOBYTE(w)         ((BYTE)(w))
#define HIBYTE(w)         ((BYTE)(((UINT)(w) >> 8) & 0xFF))

#define LOWORD(l)         ((WORD)(DWORD)(l))
#define HIWORD(l)         ((WORD)((((DWORD)(l)) >> 16) & 0xFFFF))

#define MAKELONG(low, high) ((LONG)(((WORD)(low)) | (((DWORD)((WORD)(high))) << 16)))

#ifndef NOMINMAX
#ifndef max
#define max(a,b)          (((a) > (b)) ? (a) : (b))
#endif
#ifndef min
#define min(a,b)          (((a) < (b)) ? (a) : (b))
#endif
#endif  /* NOMINMAX */

/****** Common pointer types ************************************************/

#ifndef NULL
#define NULL              0
#endif
```

```
//_____________________________________________________________
//                                                  |
// (c) Copyright, Texas Instruments Incorporated, 1992.  All Rights    |
// Reserved.   Property of Texas Instruments Incorporated.  Restricted  |
// Rights -- Use, duplication or disclosure subject to restrictions set  |
// forth in TI's Program License Agreement and associated documentation. |
//_____________________________________________________________|
//
//          XXX           X              XXX
//           XX           XX              XX
// XXXXXXX    XX   XXXXX   XXXXX   XXXXX      XX
// XX      XXXXX      X    XX        X       XX XXX
// XXXXXXX  XX  XX   XXXXXX    XX    XXXXXX       XXX XX
//     XX  XX  XX   X   XX    XX XX  X   XX   XX   XX  XX
// XXXXXXX   XXXX X  XXXXX X     XXX   XXXXX X  XX  XXX  XXX
//_____________________________________________________________
//
// $Revision:   1.1  $
//     $Date:   11 Aug 1993 14:04:18  $
//_____________________________________________________________
//
// Title  - sdata.h
//
// Author - Ross Steiner
//
// Date   - May 20, 1991
//
// Site   - Temple
//
// Revision - *
//
// Language - C++
//
// Abstract -
//
#ifndef _SDATA_H_
#define _SDATA_H_
//_____________________________________________________________
// constants for foreground and background colors

const unsigned char BLACK_FORE = 0;
const unsigned char BLUE_FORE  = 0x01;
const unsigned char GREEN_FORE = 0x02;
const unsigned char RED_FORE   = 0x04;
const unsigned char INTENSE    = 0x08;
const unsigned char BLACK_BACK = 0;
const unsigned char BLUE_BACK  = 0x10;
const unsigned char GREEN_BACK = 0x20;
const unsigned char RED_BACK   = 0x40;
const unsigned char BLINKING   = 0x80;


const unsigned char CYAN_FORE    = GREEN_FORE | BLUE_FORE;
const unsigned char MAGENTA_FORE = RED_FORE | BLUE_FORE;
const unsigned char BROWN_FORE   = RED_FORE | GREEN_FORE;
const unsigned char WHITE_FORE   = RED_FORE | GREEN_FORE | BLUE_FORE;
const unsigned char GRAY_FORE          = INTENSE | BLACK_FORE;
const unsigned char LIGHT_BLUE_FORE    = INTENSE | BLUE_FORE;
const unsigned char LIGHT_GREEN_FORE   = INTENSE | GREEN_FORE;
const unsigned char LIGHT_RED_FORE     = INTENSE | RED_FORE;
const unsigned char LIGHT_CYAN_FORE    = INTENSE | CYAN_FORE;
```

```
const unsigned char LIGHT_MAGENTA_FORE = INTENSE | MAGENTA_FORE;
const unsigned char YELLOW_FORE        = INTENSE | BROWN_FORE;
const unsigned char BRIGHT_WHITE_FORE  = INTENSE | WHITE_FORE;

const unsigned char CYAN_BACK    = GREEN_BACK | BLUE_BACK;
const unsigned char MAGENTA_BACK = RED_BACK | BLUE_BACK;
const unsigned char BROWN_BACK   = RED_BACK | GREEN_BACK;
const unsigned char WHITE_BACK   = RED_BACK | GREEN_BACK | BLUE_BACK;
const unsigned char GRAY_BACK          = INTENSE | BLACK_BACK;
const unsigned char LIGHT_BLUE_BACK    = INTENSE | BLUE_BACK;
const unsigned char LIGHT_GREEN_BACK   = INTENSE | GREEN_BACK;
const unsigned char LIGHT_RED_BACK     = INTENSE | RED_BACK;
const unsigned char LIGHT_CYAN_BACK    = INTENSE | CYAN_BACK;
const unsigned char LIGHT_MAGENTA_BACK = INTENSE | MAGENTA_BACK;
const unsigned char YELLOW_BACK        = INTENSE | BROWN_BACK;
const unsigned char BRIGHT_WHITE_BACK  = INTENSE | WHITE_BACK;

#endif
```

```
#define rmj         1
#define rmm         3
#define rup         1
#define szVerName   "1.03"
#define szVerUser   "ROBERT"
```

```
//_____________________________________________________________
//                                                |
// (c) Copyright, Texas Instruments Incorporated, 1993. All Rights    |
// Reserved.  Property of Texas Instruments Incorporated. Restricted   |
// Rights -- Use, duplication or disclosure subject to restrictions set  |
// forth in TI's Program License Agreement and associated documentation. |
//_____________________________________________________________|
//
// $Workfile:  TISYSTEM.H  $
// $Revision:  1.19  $
//    $Date:  21 Sep 1993 16:47:38  $
//    Author:  Robert Tonsing
//      Site:  Temple
//  Language:  C++
//

#define TISYSTEMVERSION  "1.99.01\0"

#define SUCCESS             0
#define SUCCESS_REBOOT      1
#define SUCCESS_NOREBOOT    2
#define SUCCESS_RESTARTWIN  3
#define SUCCESS_OPTREBOOT   4
#define SUCCESS_MAX         SUCCESS_OPTREBOOT

#define INVALID             0x0086
#define FAIL                0xffff

#ifdef WINNT
  #define DllImport __declspec(dllimport)
#else
  #ifdef _WINDOWS
    #define DllImport WINAPI _export
  #else // DOS
    #define DllImport
  #endif
#endif

enum Setup
{
    NOTEBOOK,
    MICRODOCK,
    DESKTOP
};

//=====================================================================
// Public C interface
//
#ifdef __cplusplus
  #ifndef WINNT
    extern "C" {
  #endif
#endif

#ifdef _WINDOWS
  LPCSTR WINAPI _export TiSysVersion();
  LPCSTR WINAPI _export TiBiosVersion();
  LPCSTR WINAPI _export TiBProVersion();
  LPCSTR WINAPI _export TiVideoVersion();
  WORD WINAPI _export TiReadConfig( UINT uRequest, LPWORD pwValue );
  WORD WINAPI _export TiWriteConfig( UINT uRequest, WORD wValue );
```

```
  WORD WINAPI _export TiDefaultConfig( UINT uRequest, LPWORD pwValue );
  WORD WINAPI _export TiReadCapTableWord( UINT uWordRequest, LPWORD pwValue );
  WORD WINAPI _export TiReadCapTableByte( UINT uByteRequest, LPBYTE pbValue );
  WORD WINAPI _export TiGetCommConfig( int nSetup, int nNB9Pin, int nNBModem,
        int nDS9Pin, int nDS25Pin );
  WORD WINAPI _export TiGetCommPorts( int nCfg, int nSetup, int* pnNB9Pin,
        int* pnNBModem, int* pnDS9Pin, int* pnDS25Pin );
  WORD WINAPI _export TiGetLptConfig( int nSetup, int nNBPort, int nDSPort );
  WORD WINAPI _export TiGetLptPorts( int nCfg, int nSetup, int* pnNBPort,
        int* pnDSPort );
  BOOL WINAPI _export CheckDockCMOS();
#else
  const char* DllImport TiSysVersion();
  const char* DllImport TiBiosVersion();
  const char* DllImport TiBProVersion();
  const char* DllImport TiVideoVersion();
  WORD DllImport TiReadConfig( UINT uRequest, WORD* pwValue );
  WORD DllImport TiWriteConfig( UINT uRequest, WORD wValue );
  WORD DllImport TiDefaultConfig( UINT uRequest, WORD* pwValue );
  WORD DllImport TiReadCapTableWord( UINT uWordRequest, WORD* pwValue );
  WORD DllImport TiReadCapTableByte( UINT uByteRequest, BYTE* pbValue );
  WORD DllImport TiGetCommConfig( int nSetup, int nNB9Pin, int nNBModem,
        int nDS9Pin, int nDS25Pin );
  WORD DllImport TiGetCommPorts( int nCfg, int nSetup, int* pnNB9Pin,
        int* pnNBModem, int* pnDS9Pin, int* pnDS25Pin );
  WORD DllImport TiGetLptConfig( int nSetup, int nNBPort, int nDSPort );
  WORD DllImport TiGetLptPorts( int nCfg, int nSetup, int* pnNBPort,
        int* pnDSPort );
  BOOL DllImport CheckDockCMOS();
#endif

#ifdef __cplusplus
  #ifndef WINNT
    }
  #endif
#endif

//=============================================================================
// Config access definitions
//

enum Request
{
// System Information
    OEMMODELID,
    VGABRAND,
    CPUTYPE,
    CPUMODEL,
    LCDTYPE,
    SERIES,
// System Config
    SHADOWBIOS,
    BATTERYALARM,
    COVERALARM,
    SPEAKER,
    QUICKBOOT,
    CPUCACHE,
    FDDATYPE,
    FDDBTYPE,
    MOUSELOCATION,
    KBDLOCATION,
```

```
    SYSTEMRAM,
// Power Savings
    SYSTIMEOUTINT,
    SYSTIMEOUTACT,
    AUTOWAKEUPINT,
    AUTOWAKEUPACT,
    COVERACTION,
    HDDTIMEOUT,
    DFLTCPUSPEED,
    EXPANSIONBUS,
    LCDPOWER,
    POWERSAVINGS,
    ADVOSPOWER,
    MONITORPS2,
    MONITORHDD,
    MONITORCOMM,
    POWERLEVEL,
// Display
    LCDREVERSE,
    LCDEXPMODE,
    BLOCKCURSOR,
    DISPLAYSELECT,
    MONITORTYPE,
    BACKLIGHT,
    TEXTRESOLUTION,
    LCDCONTRAST,
    LCDPALETTE,
    EXTERNALVGA,
    VIDEORAM,
    CIRRUSDRIVER,
// I/O Ports
    STDCOMMPORT,
    OPTCOMMPORT,
    STDCOMMENABLE,
    OPTCOMMENABLE,
    SWAPCOMMPORTS,
    PARALLELPORT,
    PS2PORT,
    STDCOMMWORD,
    STDCOMMSTOP,
    STDCOMMPARITY,
    STDCOMMBAUD,
    STDCOMMDCD,
    STDCOMMDSR,
    STDCOMMCTS,
    OPTCOMMWORD,
    OPTCOMMSTOP,
    OPTCOMMPARITY,
    OPTCOMMBAUD,
// Keyboard
    KBDCAPSLOCK,
    KBDNUMLOCK,
    KBDSCROLLLOCK,
    KBDREPEATRATE,
    KBDSWAPCAPS,
    KBDSWAPRTALT,
    KBD3STNUMLOCK,
// Docking Station
    DSHDD0TYPE,
    DSHDD1TYPE,
    DSFDD0TYPE,
```

```
    DSFDD1TYPE,
    DSFDDLOCATION,
    DSFDDSWAP,
    DSSCSIHW,
    DSSCSIBIOS,
    DSPCMCIAHW,
    DSPCMCIABIOS,
    DSGAMEPORT,
    DSQUICKPORT,
    DSCOMMADDR,
    DSLPTPORTMODE,
    DS9PINCOMM,
    DS25PINCOMM,
    DSLPTPORT,
    DSNBOPTCOMM,
    MD9PINCOMM,
    MDLPTPORT,
    MDNBSTDCOMM,
    MDNBOPTCOMM,
    NBLPTPORT,
    DOCKTYPE,
    DSSMARTMODE,
    DSEJECTKEY,
    DSCRTCONNECT,
// Misc. New Stuff
    QUICKPORT,
    TM3PS2PORT,
    PBSOUNDHW,
    PBLPTEXTMODE,
    DOCKABLE,
    PBLPTPORT,
    APMSUPPORT,
    POWERSOURCE,
// Battery Info
    BATTERY0STATUS,
    BATTERY1STATUS,
    BATTERY0LEVEL,
    BATTERY1LEVEL,
// Lily
    SAVETODISK,
    SAVETODISKINT,

    LASTENTRY        // Count of entries
};
```

```
//_______________________________________________________________
//                                                    |
// (c) Copyright, Texas Instruments Incorporated, 1993. All Rights   |
// Reserved.  Property of Texas Instruments Incorporated. Restricted  |
// Rights -- Use, duplication or disclosure subject to restrictions set |
// forth in TI's Program License Agreement and associated documentation. |
//_______________________________________________________________|
//
// $Workfile:  TISYSDEF.H $
// $Revision:  1.24 $
//    $Date:  21 Sep 1993 16:47:28 $
//    Author:  Robert Tonsing
//      Site:  Temple
//  Language:  C++
//
//===================================================================
// System access definitions
//
struct SysDataStruct {
   WORD (*BiosFunc)( UINT, WORD*, int );
   BYTE bCapTableByte; // Location in Capabilities Table
   BYTE bCapTableMask; // Capabilities Table bit mask

   BYTE bCmosAddress;  // CMOS address
   BYTE bCmosBitMask;  // CMOS bit mask
   BYTE bCmosBitShift; // CMOS bit shift

   BYTE bLilyAddress;  // CMOS address
   BYTE bLilyBitMask;  // CMOS bit mask
   BYTE bLilyBitShift; // CMOS bit shift

   BYTE bMaxValue;     // Max value
   BYTE bDefault;      // Default value
   BYTE bRebootFlag;   // Reboot Flag
};

#ifdef WINNT          // Windows NT
  #define DoFA_5_6_8    NULL
  #define DoFA_3_4_9    NULL
  #define DoF9_60_61    NULL
  #define GetOemModelId NULL
  #define GetVidRam     NULL
  #define DoFB00        NULL
  #define CirrusWin     NULL
  #define Do4604        NULL
  #define DispSelect    NULL
  #define DoDisplay     NULL
  #define DoTextRes     NULL
  #define DoBattery     NULL
#else
  WORD DoFA_5_6_8( UINT uRequest, WORD* pwValue, int nType );
  WORD DoFA_3_4_9( UINT uRequest, WORD* pwValue, int nType );
  WORD DoF9_60_61( UINT uRequest, WORD* pwValue, int nType );
  WORD GetOemModelId( UINT uRequest, WORD* pwValue, int nType );
  WORD GetVidRam( UINT uRequest, WORD* pwValue, int nType );
  WORD DoFB00( UINT uRequest, WORD* pwValue, int nType );
  WORD CirrusWin( UINT uRequest, WORD* pwValue, int nType );
  WORD Do4604( UINT uRequest, WORD* pwValue, int nType );
  WORD DispSelect( UINT uRequest, WORD* pwValue, int nType );
  WORD DoDisplay( UINT uRequest, WORD* pwValue, int nType );
  WORD DoTextRes( UINT uRequest, WORD* pwValue, int nType );
```

```
#endif
 WORD GetSysInfo( UINT uRequest, WORD* pwValue, int nType );
 WORD GetCpuType( UINT uRequest, WORD* pwValue, int nType );
 WORD DoSpeaker( UINT uRequest, WORD* pwValue, int nType );
 WORD DoAlarms( UINT uRequest, WORD* pwValue, int nType );
 WORD DoBattery( UINT uRequest, WORD* pwValue, int nType );

static SysDataStruct SystemData[] =
{
 // System Information                Lily
 //   Function   Cap Bit   Cmos  Bit  Bit Cmos  Bit  Bit Max Def- Reboot
 //              Tbl Mask  Addr. Mask Shf Addr. Mask Shf      ault
 { GetOemModelId, 0, 0x00, 0x00, 0x00, 0, 0x00, 0x00, 0, 5, 0, SUCCESS_NOREBOOT }, //
OEMMODELID
   { GetSysInfo, 0, 0x00, 0x00, 0x00, 0, 0x00, 0x00, 0, 1, 0, SUCCESS_NOREBOOT }, // VGABRAND
   { GetCpuType, 0, 0x00, 0x82, 0xf0, 4, 0x00, 0x00, 0, 8, 0, SUCCESS_NOREBOOT }, // CPUTYPE
   { GetSysInfo, 0, 0x00, 0x81, 0x0f, 0, 0x00, 0x00, 0, 5, 0, SUCCESS_NOREBOOT }, // CPUMODEL
   { GetSysInfo, 0, 0x00, 0x00, 0x00, 0, 0x00, 0x00, 0, 4, 0, SUCCESS_NOREBOOT }, // LCDTYPE
   { GetSysInfo, 0, 0x00, 0x00, 0x00, 0, 0x00, 0x00, 0, 3, 0, SUCCESS_NOREBOOT }, // SERIES
 // System Config                    Lily
 //   Function   Cap Bit   Cmos  Bit  Bit Cmos  Bit  Bit Max Def- Reboot
 //              Tbl Mask  Addr. Mask Shf Addr. Mask Shf      ault
   { NULL,        0, 0x00, 0x41, 0x07, 0, 0x00, 0x00, 0, 4, 3, SUCCESS_OPTREBOOT }, // SHADOWBIOS
   { DoAlarms,    0, 0x00, 0x5f, 0x04, 2, 0x64, 0x04, 2, 1, 1, SUCCESS_NOREBOOT }, // BATTERYALARM
   { DoAlarms,    0, 0x00, 0x5f, 0x08, 3, 0x64, 0x08, 3, 1, 1, SUCCESS_NOREBOOT }, // COVERALARM
   { DoSpeaker,   0, 0x00, 0x64, 0x04, 2, 0x69, 0x04, 2, 1, 1, SUCCESS_NOREBOOT }, // SPEAKER
   { NULL,        0, 0x00, 0x5f, 0x40, 6, 0x64, 0x40, 6, 1, 1, SUCCESS_NOREBOOT }, // QUICKBOOT
   { NULL,        0, 0x00, 0x34, 0x20, 5, 0x00, 0x00, 0, 1, 1, SUCCESS_OPTREBOOT }, // CPUCACHE
   { NULL,        0, 0x00, 0x10, 0xf0, 4, 0x00, 0x00, 0, 4, 4, SUCCESS_OPTREBOOT }, // FDDATYPE
   { NULL,        0, 0x00, 0x10, 0x0f, 0, 0x00, 0x00, 0, 4, 0, SUCCESS_OPTREBOOT }, // FDDBTYPE
   { NULL,       16, 0x20, 0x8e, 0x30, 4, 0x00, 0x00, 0, 2, 0, SUCCESS_OPTREBOOT }, //
MOUSELOCATION
   { NULL,       16, 0x20, 0x8e, 0x0c, 2, 0x00, 0x00, 0, 3, 0, SUCCESS_OPTREBOOT }, // KBDLOCATION
   { NULL,        0, 0x00, 0x3f, 0xff, 0, 0x31, 0xff, 0, 0, 0, SUCCESS_NOREBOOT }, // SYSTEMRAM
 // Power Savings                      Lily
 //   Function   Cap Bit   Cmos  Bit  Bit Cmos  Bit  Bit Max Def- Reboot
 //              Tbl Mask  Addr. Mask Shf Addr. Mask Shf      ault
   { DoFA_5_6_8, 0, 0x00, 0x5e, 0xf0, 4, 0x63, 0xe0, 5, 5, 2, SUCCESS           }, // SYSTIMEOUTINT
   { DoFA_5_6_8, 0, 0x00, 0x5f, 0x80, 7, 0x00, 0x00, 0, 1, 1, SUCCESS           }, // SYSTIMEOUTACT
   { NULL,       0, 0x00, 0x62, 0x30, 4, 0x00, 0x00, 0, 3, 1, SUCCESS_NOREBOOT }, //
AUTOWAKEUPINT
   { NULL,       0, 0x00, 0x63, 0x80, 7, 0x00, 0x00, 0, 1, 1, SUCCESS_NOREBOOT }, //
AUTOWAKEUPACT
   { DoFA_5_6_8, 0, 0x00, 0x5f, 0x30, 4, 0x5c, 0x30, 4, 3, 0, SUCCESS           }, // COVERACTION
   { NULL,       0, 0x00, 0x63, 0x70, 4, 0x68, 0x70, 4, 4, 3, SUCCESS_OPTREBOOT }, // HDDTIMEOUT
   { NULL,       0, 0x00, 0x34, 0x07, 0, 0x34, 0x07, 0, 3, 3, SUCCESS_OPTREBOOT }, // DFLTCPUSPEED
   { NULL,      11, 0x04, 0x60, 0xc0, 6, 0x00, 0x00, 0, 2, 2, SUCCESS_OPTREBOOT }, // EXPANSIONBUS
(FA06 causes problems)
   { DoFA_3_4_9, 24, 0x60, 0x62, 0xc0, 6, 0x00, 0x00, 0, 3, 3, SUCCESS          }, // LCDPOWER
   { NULL,       0, 0x00, 0x61, 0xc0, 6, 0x66, 0xc0, 6, 2, 2, SUCCESS_OPTREBOOT }, // POWERSAVINGS
   { NULL,       0, 0x00, 0x8e, 0x03, 0, 0x00, 0x00, 0, 2, 1, SUCCESS_OPTREBOOT }, // ADVOSPOWER
   { NULL,       0, 0x00, 0x60, 0x02, 1, 0x00, 0x00, 0, 1, 1, SUCCESS_OPTREBOOT }, // MONITORPS2
   { NULL,       0, 0x00, 0x60, 0x04, 2, 0x65, 0x04, 2, 1, 0, SUCCESS_OPTREBOOT }, // MONITORHDD
   { NULL,       0, 0x00, 0x60, 0x08, 3, 0x65, 0x08, 3, 1, 1, SUCCESS_OPTREBOOT }, // MONITORCOMM
   { DoF9_60_61, 0, 0x00, 0x00, 0x00, 0, 0x00, 0x00, 0, 4, 2, SUCCESS_NOREBOOT }, // POWERLEVEL
 // Display                          Lily
 //   Function   Cap Bit   Cmos  Bit  Bit Cmos  Bit  Bit Max Def- Reboot
 //              Tbl Mask  Addr. Mask Shf Addr. Mask Shf      ault
   { DoFA_3_4_9, 0, 0x00, 0x41, 0x30, 4, 0x00, 0x00, 0, 3, 3, SUCCESS           }, // LCDREVERSE
   { DoDisplay,  0, 0x00, 0x62, 0x04, 2, 0x67, 0x04, 2, 1, 1, SUCCESS_RESTARTWIN }, // LCDEXPMODE
   { DoDisplay,  0, 0x00, 0x64, 0x10, 4, 0x69, 0x10, 4, 1, 1, SUCCESS_RESTARTWIN }, // BLOCKCURSOR
```

```
 { DispSelect,  0, 0x00, 0x41, 0xc0, 6, 0x00, 0x00, 0,  2,  1,  SUCCESS_OPTREBOOT }, // DISPLAYSELECT
 { DoDisplay,   0, 0x00, 0x63, 0x0e, 1, 0x68, 0x07, 1,  7,  3,  SUCCESS_RESTARTWIN }, // MONITORTYPE
 { DoDisplay,   0, 0x00, 0x00, 0x00, 0, 0x00, 0x00, 0,  1,  0,  SUCCESS_NOREBOOT  }, // BACKLIGHT
 { DoTextRes,   0, 0x00, 0x00, 0x00, 0, 0x00, 0x00, 0,  3,  0,  SUCCESS_NOREBOOT  }, //
TEXTRESOLUTION
 { DoDisplay,   0, 0x00, 0x00, 0x00, 0, 0x00, 0x00, 0,  4,  0,  SUCCESS_NOREBOOT  }, // LCDCONTRAST
 { NULL,        0, 0x00, 0x61, 0x07, 0, 0x00, 0x00, 0,  5,  0,  SUCCESS_OPTREBOOT }, // LCDPALETTE
 { DoFA_3_4_9,  0, 0x00, 0x00, 0x00, 0, 0x00, 0x00, 0,  1,  0,  SUCCESS           }, // EXTERNALVGA
 { GetVidRam,   0, 0x00, 0x00, 0x00, 0, 0x00, 0x00, 0,  0,  0,  SUCCESS           }, // VIDEORAM
 { CirrusWin,   0, 0x00, 0x00, 0x00, 0, 0x00, 0x00, 0,  0,  0,  SUCCESS           }, // CIRRUSDRIVER
// I/O Ports                    Lily
//  Function  Cap Bit  Cmos Bit Bit Cmos Bit Bit Max Def- Reboot
//            Tbl Mask Addr. Mask Shf Addr. Mask Shf    ault
 { NULL,        0, 0x00, 0x5d, 0x01, 0, 0x5f, 0x07, 0,  4,  1,  SUCCESS_OPTREBOOT }, // STDCOMMPORT
 { NULL,       11, 0x04, 0x5d, 0x80, 7, 0x5f, 0x70, 4,  4,  2,  SUCCESS_OPTREBOOT }, // OPTCOMMPORT
 { NULL,        0, 0x00, 0x5d, 0x01, 0, 0x00, 0x00, 0,  1,  1,  SUCCESS_OPTREBOOT }, //
STDCOMMENABLE
 { NULL,       11, 0x04, 0x5d, 0x80, 7, 0x00, 0x00, 0,  1,  0,  SUCCESS_OPTREBOOT }, //
OPTCOMMENABLE
 { NULL,        0, 0x00, 0x5d, 0x04, 2, 0x00, 0x00, 0,  1,  0,  SUCCESS_OPTREBOOT }, //
SWAPCOMMPORTS
 { NULL,       11, 0x04, 0x5e, 0x03, 0, 0x64, 0x03, 0,  3,  2,  SUCCESS_OPTREBOOT }, // PARALLELPORT
 { NULL,       16, 0x20, 0x5e, 0x0c, 2, 0x63, 0x0c, 2,  3,  3,  SUCCESS_OPTREBOOT }, // PS2PORT
 { NULL,        0, 0x00, 0x5b, 0x03, 0, 0x00, 0x00, 0,  1,  1,  SUCCESS_OPTREBOOT }, // STDCOMMWORD
 { NULL,        0, 0x00, 0x5b, 0x04, 2, 0x00, 0x00, 0,  1,  0,  SUCCESS_OPTREBOOT }, // STDCOMMSTOP
 { NULL,        0, 0x00, 0x5b, 0x18, 3, 0x00, 0x00, 0,  2,  0,  SUCCESS_OPTREBOOT }, //
STDCOMMPARITY
 { NULL,        0, 0x00, 0x5b, 0xe0, 5, 0x00, 0x00, 0,  7,  7,  SUCCESS_OPTREBOOT }, // STDCOMMBAUD
 { NULL,       11, 0x04, 0x5d, 0x08, 3, 0x00, 0x00, 0,  1,  0,  SUCCESS_OPTREBOOT }, // STDCOMMDCD
 { NULL,       11, 0x04, 0x5d, 0x10, 4, 0x00, 0x00, 0,  1,  0,  SUCCESS_OPTREBOOT }, // STDCOMMDSR
 { NULL,       11, 0x04, 0x5d, 0x20, 5, 0x00, 0x00, 0,  1,  0,  SUCCESS_OPTREBOOT }, // STDCOMMCTS
 { NULL,       11, 0x04, 0x5c, 0x03, 0, 0x00, 0x00, 0,  1,  1,  SUCCESS_OPTREBOOT }, //
OPTCOMMWORD
 { NULL,       11, 0x04, 0x5c, 0x04, 2, 0x00, 0x00, 0,  1,  0,  SUCCESS_OPTREBOOT }, // OPTCOMMSTOP
 { NULL,       11, 0x04, 0x5c, 0x18, 3, 0x00, 0x00, 0,  2,  0,  SUCCESS_OPTREBOOT }, //
OPTCOMMPARITY
 { NULL,       11, 0x04, 0x5c, 0xe0, 5, 0x00, 0x00, 0,  7,  5,  SUCCESS_OPTREBOOT }, // OPTCOMMBAUD
// Keyboard                     Lily
//  Function  Cap Bit  Cmos Bit Bit Cmos Bit Bit Max Def- Reboot
//            Tbl Mask Addr. Mask Shf Addr. Mask Shf    ault
 { NULL,        0, 0x00, 0x64, 0x02, 1, 0x69, 0x02, 1,  1,  0,  SUCCESS_NOREBOOT  }, // KBDCAPSLOCK
 { NULL,        0, 0x00, 0x1f, 0x20, 5, 0x1f, 0x20, 5,  1,  1,  SUCCESS_NOREBOOT  }, // KBDNUMLOCK
 { NULL,        0, 0x00, 0x64, 0x01, 0, 0x69, 0x01, 0,  1,  0,  SUCCESS_NOREBOOT  }, //
KBDSCROLLLOCK
 { NULL,        0, 0x00, 0x5f, 0x03, 0, 0x00, 0x00, 0,  2,  1,  SUCCESS_OPTREBOOT }, //
KBDREPEATRATE
 { NULL,       10, 0x80, 0x61, 0x08, 3, 0x00, 0x00, 0,  1,  0,  SUCCESS_OPTREBOOT }, // KBDSWAPCAPS
 { NULL,       10, 0x80, 0x61, 0x10, 4, 0x00, 0x00, 0,  1,  0,  SUCCESS_OPTREBOOT }, //
KBDSWAPRTALT
 { NULL,       10, 0x80, 0x61, 0x20, 5, 0x00, 0x00, 0,  1,  1,  SUCCESS_OPTREBOOT }, //
KBD3STNUMLOCK
// Docking Station              Lily
//  Function  Cap Bit  Cmos Bit Bit Cmos Bit Bit Max Def- Reboot
//            Tbl Mask Addr. Mask Shf Addr. Mask Shf    ault
 { NULL,        0, 0x00, 0x83, 0x03, 0, 0x00, 0x00, 0,  3,  0,  SUCCESS_OPTREBOOT }, // DSHDD0TYPE
 { NULL,        0, 0x00, 0x83, 0x0c, 2, 0x00, 0x00, 0,  3,  0,  SUCCESS_OPTREBOOT }, // DSHDD1TYPE
 { NULL,        0, 0x00, 0x84, 0xf0, 4, 0x00, 0x00, 0,  5,  0,  SUCCESS_OPTREBOOT }, // DSFDD0TYPE
 { NULL,        0, 0x00, 0x84, 0x0f, 0, 0x00, 0x00, 0,  5,  0,  SUCCESS_OPTREBOOT }, // DSFDD1TYPE
 { NULL,        0, 0x00, 0x85, 0x04, 2, 0x00, 0x00, 0,  1,  0,  SUCCESS_OPTREBOOT }, //
DSFDDLOCATION
 { NULL,        0, 0x00, 0x89, 0x04, 2, 0x00, 0x00, 0,  1,  0,  SUCCESS_OPTREBOOT }, // DSFDDSWAP
```

```
{ NULL,       0, 0x00, 0x83, 0x10, 4, 0x00, 0x00, 0,  1,  1,  SUCCESS_OPTREBOOT }, // DSSCSIHW
{ NULL,       0, 0x00, 0x83, 0x20, 5, 0x00, 0x00, 0,  1,  1,  SUCCESS_OPTREBOOT }, // DSSCSIBIOS
{ NULL,       0, 0x00, 0x83, 0x40, 6, 0x00, 0x00, 0,  1,  1,  SUCCESS_OPTREBOOT }, // DSPCMCIAHW
{ NULL,       0, 0x00, 0x83, 0x80, 7, 0x00, 0x00, 0,  1,  1,  SUCCESS_OPTREBOOT }, // DSPCMCIABIOS
{ NULL,       0, 0x00, 0x85, 0x01, 0, 0x00, 0x00, 0,  1,  1,  SUCCESS_OPTREBOOT }, // DSGAMEPORT
{ NULL,       0, 0x00, 0x85, 0x02, 1, 0x00, 0x00, 0,  1,  1,  SUCCESS_OPTREBOOT }, // DSQUICKPORT
{ NULL,       0, 0x00, 0x85, 0xc0, 6, 0x00, 0x00, 0,  3,  1,  SUCCESS_OPTREBOOT }, // DSCOMMADDR
{ NULL,       0, 0x00, 0x89, 0x03, 0, 0x00, 0x00, 0,  2,  0,  SUCCESS_OPTREBOOT }, //
DSLPTPORTMODE
//                                    Lily
//   Function   Cap Bit   Cmos  Bit  Bit Cmos  Bit  Bit Max Def- Reboot
//              Tbl Mask  Addr. Mask Shf Addr. Mask Shf      ault
{ NULL,       0, 0x00, 0x86, 0x07, 0, 0x00, 0x00, 0,  4,  1,  SUCCESS_OPTREBOOT }, // DS9PINCOMM
{ NULL,       0, 0x00, 0x86, 0x38, 3, 0x00, 0x00, 0,  4,  3,  SUCCESS_OPTREBOOT }, // DS25PINCOMM
{ NULL,       0, 0x00, 0x86, 0xc0, 6, 0x00, 0x00, 0,  3,  2,  SUCCESS_OPTREBOOT }, // DSLPTPORT
{ NULL,       0, 0x00, 0x85, 0x18, 3, 0x00, 0x00, 0,  2,  2,  SUCCESS_OPTREBOOT }, // DSNBOPTCOMM

{ NULL,       0, 0x00, 0x87, 0x07, 0, 0x00, 0x00, 0,  4,  1,  SUCCESS_OPTREBOOT }, // MD9PINCOMM
{ NULL,       0, 0x00, 0x87, 0x18, 3, 0x00, 0x00, 0,  3,  2,  SUCCESS_OPTREBOOT }, // MDLPTPORT
{ NULL,       0, 0x00, 0x88, 0x07, 0, 0x00, 0x00, 0,  4,  3,  SUCCESS_OPTREBOOT }, // MDNBSTDCOMM
{ NULL,       0, 0x00, 0x88, 0x18, 3, 0x00, 0x00, 0,  2,  2,  SUCCESS_OPTREBOOT }, // MDNBOPTCOMM

{ NULL,       0, 0x00, 0x88, 0x60, 5, 0x00, 0x00, 0,  3,  3,  SUCCESS_OPTREBOOT }, // NBLPTPORT
{ DoFB00,     0, 0x00, 0x00, 0x00, 0, 0x00, 0x00, 0,  0,  0,  SUCCESS_NOREBOOT  }, // DOCKTYPE
{ Do4604,     0, 0x00, 0x00, 0x00, 0, 0x00, 0x00, 0,  0,  0,  SUCCESS_NOREBOOT  }, // DSSMARTMODE
{ Do4604,     0, 0x00, 0x00, 0x00, 0, 0x00, 0x00, 0,  0,  0,  SUCCESS_NOREBOOT  }, // DSEJECTKEY
{ Do4604,     0, 0x00, 0x00, 0x00, 0, 0x00, 0x00, 0,  0,  0,  SUCCESS_NOREBOOT  }, // DSCRTCONNECT
{ NULL,      24, 0x08, 0x5e, 0x10, 4, 0x00, 0x00, 0,  1,  0,  SUCCESS_OPTREBOOT }, // QUICKPORT
{ NULL,      16, 0x03, 0x5e, 0x04, 2, 0x00, 0x00, 0,  1,  1,  SUCCESS_OPTREBOOT }, // TM3PS2PORT
{ NULL,      11, 0x04, 0x8e, 0x40, 6, 0x00, 0x00, 0,  1,  1,  SUCCESS_OPTREBOOT }, // PBSOUNDHW
{ NULL,      11, 0x04, 0x5d, 0x38, 3, 0x00, 0x00, 0,  4,  0,  SUCCESS_OPTREBOOT }, //
PBLPTEXTMODE
{ GetSysInfo, 0, 0x00, 0x00, 0x00, 0, 0x00, 0x00, 0,  1,  0,  SUCCESS_NOREBOOT  }, // DOCKABLE
{ NULL,      11, 0x04, 0x5e, 0x03, 0, 0x00, 0x00, 0,  2,  1,  SUCCESS_OPTREBOOT }, // PBLPTPORT
{ DoBattery,  0, 0x00, 0x00, 0x00, 0, 0x00, 0x00, 0,  0,  0,  SUCCESS_OPTREBOOT }, // APMSUPPORT
{ DoBattery,  0, 0x00, 0x00, 0x00, 0, 0x00, 0x00, 0,  0,  0,  SUCCESS_OPTREBOOT }, // POWERSOURCE
{ DoBattery,  0, 0x00, 0x00, 0x00, 0, 0x00, 0x00, 0,  0,  0,  SUCCESS_OPTREBOOT }, //
BATTERY0STATUS
{ DoBattery,  0, 0x00, 0x00, 0x00, 0, 0x00, 0x00, 0,  0,  0,  SUCCESS_OPTREBOOT }, //
BATTERY1STATUS
{ DoBattery,  0, 0x00, 0x00, 0x00, 0, 0x00, 0x00, 0,  0,  0,  SUCCESS_OPTREBOOT }, //
BATTERY0LEVEL
{ DoBattery,  0, 0x00, 0x00, 0x00, 0, 0x00, 0x00, 0,  0,  0,  SUCCESS_OPTREBOOT }, //
BATTERY1LEVEL
{ NULL,       0, 0x00, 0x00, 0x00, 0, 0x5c, 0x03, 0,  3,  0,  SUCCESS_OPTREBOOT }, // SAVETODISK
{ NULL,       0, 0x00, 0x00, 0x00, 0, 0x5d, 0xe0, 5,  5,  0,  SUCCESS_OPTREBOOT }, // SAVETODISKINT
};

#define SYSDATAMAX ( sizeof( SystemData ) / sizeof( SysDataStruct ) )
```

```
// Stolen from Windows.h

/****** Simple types & common helper macros **********************************/

typedef int             BOOL;
#define FALSE           0
#define TRUE            1

typedef unsigned char   BYTE;
typedef unsigned short  WORD;
typedef unsigned long   DWORD;
typedef unsigned int    UINT;
typedef signed long     LONG;

#define LOBYTE(w)       ((BYTE)(w))
#define HIBYTE(w)       ((BYTE)(((UINT)(w) >> 8) & 0xFF))

#define LOWORD(l)       ((WORD)(DWORD)(l))
#define HIWORD(l)       ((WORD)((((DWORD)(l)) >> 16) & 0xFFFF))

#define MAKELONG(low, high) ((LONG)(((WORD)(low)) | (((DWORD)((WORD)(high))) << 16)))

#ifndef NOMINMAX
#ifndef max
#define max(a,b)        (((a) > (b)) ? (a) : (b))
#endif
#ifndef min
#define min(a,b)        (((a) < (b)) ? (a) : (b))
#endif
#endif  /* NOMINMAX */

/****** Common pointer types ************************************************/

#ifndef NULL
#define NULL            0
#endif

#define FAR __far
#define LPWORD WORD __far*
#define LPBYTE BYTE __far*
```

```
//_____________________________________________________________________
//                                              |
// (c) Copyright, Texas Instruments Incorporated, 1993. All Rights     |
// Reserved. Property of Texas Instruments Incorporated. Restricted    |
// Rights -- Use, duplication or disclosure subject to restrictions set |
// forth in TI's Program License Agreement and associated documentation. |
//_____________________________________________________________________|
//
// $Workfile: DOS_IO.H $
// $Revision: 1.2 $
//    $Date: 20 Sep 1993 11:25:06 $
//    Author: Robert Tonsing
//      Site: Temple
// Language: C++
//
//=====================================================================

#include <conio.h> // For _outp() & _inp()

WORD CmosRead( UINT uRequest, WORD* pwValue );
WORD CmosWrite( const SysDataStruct& SysEntry, WORD wValue );
const void FAR* TiGetCapTable();
BOOL SeriesEUnit();
WORD CmosWrite( UINT uRequest, WORD wValue );
const char* GetBiosVersion();
const char* GetBProVersion();
const char* GetVideoVersion();

inline int PutTIPort( unsigned uPortAddr, int nValue )
{
    _outp( uPortAddr, nValue );
    return 0;
}

inline int GetTIPort( unsigned uPortAddr, int* pnValue )
{
    *pnValue = _inp( uPortAddr );
    return 0;
}
```

```
//____________________________________________________________________
//                                                       |
// (c) Copyright, Texas Instruments Incorporated, 1993.  All Rights     |
// Reserved.   Property of Texas Instruments Incorporated.  Restricted  |
// Rights -- Use, duplication or disclosure subject to restrictions set  |
// forth in TI's Program License Agreement and associated documentation. |
//____________________________________________________________________|
//
// $Workfile:  DOS_IO.CPP  $
// $Revision:  1.1  $
//     $Date:  20 Sep 1993 11:24:46  $
//    Author:  Robert Tonsing
//      Site:  Temple
//  Language:  C++
//
//==========================================================================
#ifdef _WINDOWS
  #pragma message("\n>>> Compiling for 16-bit Windows <<<")
  #include <windows.h>
  #define DllExport WINAPI _export
  extern "C" WORD _F000h;
#else // DOS
  #pragma message("\n>>> Compiling for DOS <<<")
  #include "stdtypes.h"
  #include "stdio.h"
  #define DllExport
  #define wsprintf  sprintf
  const WORD _F000h = 0xf000;
#endif
#include <dos.h>
#include <string.h>
#include <ctype.h>

#include "tisystem.h"
#include "tisysdef.h"
#include "dos_io.h"

#ifdef _DEBUG
  #pragma message(">>> Debug version <<<\n")
#else
  #pragma message(">>> Retail version <<<\n")
#endif

#define DOREAD    0
#define DOWRITE   1

BOOL fLilyMachine = FALSE;

extern BOOL CheckCapTable( BYTE bCapTableByte, BYTE bCapTableMask );
WORD GetCmos( BYTE bCmosAddress, BYTE* pbValue );
WORD PutCmos( BYTE bCmosAddress, BYTE bValue );
static WORD DoFAXXRead( BYTE bFunction, UINT uRequest,
        WORD* pwValue );
static WORD DoFAXXWrite( BYTE bReadFunc, BYTE bWriteFunc,
        UINT uRequest, WORD wValue );
static WORD FARead( BYTE bFunction, BYTE bRequest, WORD* pwValue );
static WORD FAWrite( BYTE bFunction, BYTE bRequest, WORD wValue );
static void DoVideoInt( BYTE bFunction, BYTE bValue );
static BOOL tell_ansi( WORD cols, WORD rows );

//==========================================================================
```

```
const char* GetBiosVersion()
{
   static char szTiBiosVersion[80] = "";

   WORD FAR* pTable = (WORD FAR*) MAKELONG( 0xff74, &_F000h );
   if ( *pTable == 0xffff | | *pTable == 0 )
    return NULL;

   pTable = (WORD FAR*) MAKELONG( *pTable, &_F000h );
   if ( *pTable > 14 )
   {
      char FAR* pBootString = (char FAR*) MAKELONG( pTable[5], &_F000h );
      // Skip to version - 1st numeric field
      while ( !isdigit( *pBootString ) )
         pBootString++;
      // Copy version field up to next whitespace
      for ( int i = 0; pBootString[i] != '\0' && !isspace( pBootString[i] ); i++ )
         szTiBiosVersion[i] = pBootString[i];
      szTiBiosVersion[i] = '\0';
   }

   return szTiBiosVersion;
}

#pragma optimize( "egl", off )  // Turn off optimization for _asm code

//==========================================================================
// Get System Series information
//
WORD GetSysInfo( UINT uRequest, WORD* pwValue, int nType )
{
   // Write & Default don't apply here
   // Shouldn't even get here, but just in case...
   if ( nType != DOREAD )
      return FAIL;

   WORD wValue;
   BYTE bValue;
   WORD wResult = INVALID;

   switch ( uRequest )
   {
      case CPUMODEL:
            // Check for Lily Pentium
            _asm
            {
               mov  ax,0f95eh
               int  15h
               mov  wResult,ax
               mov bValue,bl
            }
            wResult >>= 8;      // Get high byte
            if ( wResult == SUCCESS )
               *pwValue = bValue >> 4;
#if 0
            else
            {
              wResult = TiReadCapTableByte( 16, &bValue );
              if ( wResult == SUCCESS )
              {
                 if ( bValue & 0x10 )           // TM4 CMOS layout?
```

```
                wResult = CmosRead( CPUMODEL, pwValue ); // Get CMOS value
            else if ( bValue & 0x08 )      // TM WinSLC CMOS layout?
                *pwValue = 4;
            else                           // Assume TM3
                *pwValue = 3;
        }
    }
#endif
        break;

    case VGABRAND:
        *pwValue = CheckCapTable( 24, 0x01 ) ? 1 : 0;  // Cirrus?
        wResult = SUCCESS;
        break;

    case LCDTYPE:
        *pwValue = 0;                      // Default: Mono
        if ( TiReadCapTableWord( 12, &wValue ) == SUCCESS )
        {
            if ( wValue & 0x0400 )         // 9.5" Active Color?
                *pwValue = 5;
            else if ( wValue & 0x0200 )    // Dual Scan?
                *pwValue = 4;
            else if ( wValue & 0x0040 )    // Active Color?
                *pwValue = 2;
            else if ( wValue & 0x0020 )    // Passive Color?
                *pwValue = 1;
        }
        wResult = SUCCESS;
        break;

    case SERIES:
        // Check for Lily CMOS
        if ( CheckCapTable( 17, 0x02 ) )
        {
            *pwValue = 3;
          wResult = SUCCESS;
        }
        else
        {
          wResult = TiReadCapTableWord( 5, &wValue );
          if ( wResult == SUCCESS )
          {
              if ( wValue & 0x0400 )       // Series M?
                  *pwValue = 2;
              else if ( wValue & 0x0080 )  // Series E?
                  *pwValue = 1;
              else
                  *pwValue = 0;
          }
        }
        break;

    case DOCKABLE:
        *pwValue = ( CheckCapTable( 11, 0x02 )    // Dockable?
                || CheckCapTable( 10, 0x80 )      // Series E?
                || CheckCapTable( 24, 0x08 ) )    // QuickPort?
          ? 1 : 0;
        wResult = SUCCESS;
        break;
```

```
      default:
         break;
   }

   return wResult;
}

//==========================================================================
// GetCpuType
//
// Description: Get type of CPU
//
// Parameters: SysEntry - not used,
//             pwValue - ptr to value to get/set,
//             nType - DOREAD, DOWRITE
//
// Returns: INVALID - force CMOS action to get/set setting
//
//==========================================================================
WORD GetCpuType( UINT uRequest, WORD* pwValue, int nType )
{
   // Write & Default don't apply here
   // Shouldn't even get here, but just in case...
   if ( nType != DOREAD )
      return FAIL;

   BYTE bValue;
   BYTE bResult = INVALID;

    _asm
    {
        mov  ax,0f95eh
        int  15h
        mov  bResult,ah
        mov bValue,bl
    }
    if ( bResult == SUCCESS )
    {
        *pwValue = bValue & 0x0f;
        if ( *pwValue > 2 )          // Skip reserved fields
            *pwValue -= 2;
    }

#if 0
   wResult = TiReadCapTableByte( 16, &bValue );
   if ( wResult == SUCCESS )
   {
      if ( bValue & 0x10 )           // TM4 CMOS layout?
      {
         // Get value from CMOS
         wResult = CmosRead( CPUTYPE, pwValue );
         if ( wResult == SUCCESS )
         {
            switch ( *pwValue )
            {
               case 1:        // DX
               case 3:        // DX2
                  break;
               case 5:        // SX2
                  *pwValue = 6;
                  break;
```

```
            case 8:       // DX4
                *pwValue = 5;
                break;
            case 2:       // SX
            //case 9:       // Pentium w/ Numeric
            //case 10:      // Pentium w/o Numeric
                *pwValue -= 2;
                break;
            default:
                wResult = INVALID;
                break;
            }
        }
    }
    else if ( bValue & 0x02 )       // TM3 WinSX CMOS layout?
        *pwValue = 0;
    else if ( bValue & 0x08 )       // TM WinSLC CMOS layout?
        *pwValue = 4;
    else
        wResult = INVALID;
}
#endif

    return bResult;
}

//===========================================================================
const char* GetBProVersion()
{
    BYTE bResult, bTestVersion, bMajor, bMinor;
    static char szBuffer[80];

    _asm
    {
        mov ax,04603h
        mov bh,08ah
        int 15h
        mov bResult,ah
        mov bTestVersion,al
        mov bMajor,bh
        mov bMinor,bl
    }

    // Check for function fail
    if ( bMajor == 0x8a )
        return NULL;

    // Check for test version
    if ( ( bMajor & 0xf0 ) != 0xf0 )
    {
        if ( bTestVersion > 0 )
            wsprintf( szBuffer, "%d.%02d%x.%d", bMajor & 0x0f,  bMinor, ( bMajor & 0xf0 ) >> 4, bTestVersion );
        else
            wsprintf( szBuffer, "%d.%02d%x", bMajor & 0x0f, bMinor, ( bMajor & 0xf0 ) >> 4 );
    }
    else
        wsprintf( szBuffer, "%d.%02d test version %d", bMajor & 0x0f, bMinor, bTestVersion );

    return szBuffer;

}
```

```
//==========================================================================
const char* GetVideoVersion()
{
    BYTE bMajor, bMinor;
    static char szBuffer[16];

    _asm
    {
        mov ax,01200h
        mov bx,00081h
        int 10h
        mov bMajor,ah
        mov bMinor,al
    }

    // Check for function fail
    if ( bMajor == 0x12 && bMinor == 0 )
        return NULL;

    wsprintf( szBuffer, "%x.%02x", bMajor, bMinor );

    return szBuffer;
}

#pragma optimize( "", on )

//==========================================================================
WORD DoFA_5_6_8( UINT uRequest, WORD* pwValue, int nType )
{
    WORD nResult = INVALID;
    BYTE bFuncParm;          // Int 15 Write parm

    switch ( uRequest )
    {
        case SYSTIMEOUTINT:
            bFuncParm = 0x01;
            break;
        case SYSTIMEOUTACT:
            bFuncParm = 0x02;
            break;
        case COVERACTION:
            bFuncParm = 0x05;
            break;
    }

    switch ( nType )
    {
        case DOREAD:
            nResult = FARead( 0x05, bFuncParm, pwValue );
            break;
        case DOWRITE:
            nResult = FAWrite( 0x06, bFuncParm, *pwValue );
            break;
        default:             // Bad call
            nResult = FAIL;
            break;
    }
    return nResult;
}

//==========================================================================
```

```
WORD DoFA_3_4_9( UINT uRequest, WORD* pwValue, int nType )
{
   WORD nResult = INVALID;
   BYTE bFuncParm;           // Int 15 Write parm

   switch ( uRequest )
   {
      case LCDPOWER:
         bFuncParm = 0x05;
         break;
      case LCDREVERSE:
         bFuncParm = 0x00;
         break;
      case EXTERNALVGA:
         bFuncParm = 0x0a;
         break;
   }

   switch ( nType )
   {
      case DOREAD:
         nResult = FARead( 0x03, bFuncParm, pwValue );
         break;
      case DOWRITE:
         nResult = FAWrite( 0x04, bFuncParm, *pwValue );
         break;
      default:               // Bad call
         nResult = FAIL;
         break;
   }
   return nResult;
}

//=============================================================================
WORD CmosRead( UINT uRequest, WORD* pwValue )
{
   BYTE bCmosAddress;
   BYTE bCmosBitMask;
   BYTE bCmosBitShift;

   if ( fLilyMachine )
   {
      bCmosAddress = SystemData[uRequest].bLilyAddress;
      bCmosBitMask = SystemData[uRequest].bLilyBitMask;
      bCmosBitShift = SystemData[uRequest].bLilyBitShift;
   }
   else
   {
      bCmosAddress = SystemData[uRequest].bCmosAddress;
      bCmosBitMask = SystemData[uRequest].bCmosBitMask;
      bCmosBitShift = SystemData[uRequest].bCmosBitShift;
   }

   if ( bCmosAddress == 0 )
      return INVALID;

   BYTE bValue;
   WORD wResult = GetCmos( bCmosAddress, &bValue );

   if ( wResult == 0 )       // No error?
   {
```

```
        bValue &= bCmosBitMask;
        bValue >>= bCmosBitShift;
        if ( uRequest == CPUCACHE )     // This is backwards from everything else
            bValue = !bValue & 0x01;
        *pwValue = (WORD) bValue;
    }

    return wResult;
}

//===========================================================================
WORD CmosWrite( UINT uRequest, WORD wValue )
{
    if ( uRequest == CPUCACHE )     // This is backwards from everything else
        wValue = !wValue & 0x0001;

    BYTE bCmosAddress;
    BYTE bCmosBitMask;
    BYTE bCmosBitShift;

    if ( fLilyMachine )
    {
        bCmosAddress = SystemData[uRequest].bLilyAddress;
        bCmosBitMask = SystemData[uRequest].bLilyBitMask;
        bCmosBitShift = SystemData[uRequest].bLilyBitShift;
    }
    else
    {
        bCmosAddress = SystemData[uRequest].bCmosAddress;
        bCmosBitMask = SystemData[uRequest].bCmosBitMask;
        bCmosBitShift = SystemData[uRequest].bCmosBitShift;
    }

    if ( bCmosAddress == 0 )
        return INVALID;

    // Get current setting
    BYTE bOldValue;
    WORD wResult = GetCmos( bCmosAddress, &bOldValue );

    if ( wResult == 0 )
    {
        BYTE bNewValue = (BYTE) wValue;
        // Shift to bit location
        bNewValue <<= bCmosBitShift;
        // Clear extraneous bits
        bNewValue &= bCmosBitMask;
        // Clear field in old value
        bOldValue &= ~bCmosBitMask;
        // Set new field value
        bNewValue |= bOldValue;

        // Write new byte
        wResult = PutCmos( bCmosAddress, bNewValue );
        // For new Ducking station area, update checksum manually
        if ( bCmosAddress >= 0x83 && bCmosAddress <= 0x8b )
        {
            BYTE bCmosValue;
            BYTE bChkSum = 0xff;
            for ( BYTE i = 0x83; i <= 0x8b; i++ )
            {
```

```
            GetCmos( i, &bCmosValue );
            bChkSum += bCmosValue;
         }
         PutCmos( 0x8c, bChkSum );
      }
   }

   return wResult == 0 ? SystemData[uRequest].bRebootFlag : wResult;
}

#pragma optimize( "egl", off )  // Turn off optimization for _asm code

//===========================================================================
// DoBattery
//
//  Description:
//
//  Parameters:
//
//  Returns:
//
//===========================================================================
WORD DoBattery( UINT uRequest, WORD* pwValue, int nType )
{
   BYTE bResult, bSource, bStatus, bLevel;

   // Write & Default don't apply here
   if ( nType != DOREAD )
//    if ( uRequest != BATTERY0ID && uRequest != BATTERY1ID )
         return FAIL;

   _asm
   {
      mov ax,0530ah        // APM power status
      mov bx,0001h
      int 15h
      mov bResult,ah
      mov bSource,bh
      mov bStatus,bl
      mov bLevel,cl
   }

   if ( bResult != 0x86 )
   {
      switch ( uRequest )
      {
         case APMSUPPORT:
            *pwValue = 1;
            break;

         case POWERSOURCE:
            *pwValue = bSource;
            break;

         case BATTERY0STATUS:
         case BATTERY1STATUS:
            *pwValue = bStatus;
            break;

         case BATTERY0LEVEL:
            if ( bLevel >= 5 )
```

```
            bLevel -= 5;
          // Fall thru
        case BATTERY1LEVEL:
          *pwValue = bLevel;
          break;

#if 0
        case BATTERY0ID:
        case BATTERY1ID:
#endif
        default:
          bResult == 0x86;
          break;
      }
  }
  else if ( uRequest == APMSUPPORT )
  {
      *pwValue = 0;
      bResult = 0;
  }

  return bResult == 0x86 ? FAIL : SUCCESS;
}

//==============================================================================
// Handle function 0xF95E call - Get model information
//
WORD GetOemModelId( UINT uRequest, WORD* pwValue, int nType )
{
  static BOOL fCalled = FALSE;
  static BYTE bOemModelId, bVgaBrand, bCpuType, bCpuModel, bLcdType /*, bSeries*/;

  // Write & Default don't apply here
  if ( nType != DOREAD )
      return FAIL;

  // If never called before, make call and save info for next time
  if ( !fCalled )
  {
      BYTE bResult;

      _asm      // Get info
      {
          mov ax,0f95eh
          int 015h
          mov bResult,ah
          mov bOemModelId,al
          //mov bVgaBrand,bh
          mov bCpuType,bl
          mov bCpuModel,bl
          //mov bLcdType,dh
          //mov bSeries,dl
      }

      if ( bResult != 0 )    // Fail?
      {
          _asm      // Try TM3000 WinSX call
          {
              mov ax,0f963h
              mov bx,06974h
              push es
```

```
            push ds
            int 015h
            pop ds
            pop es
            mov bResult,ah
            mov bOemModelId,al
        }
        if ( bResult == 0x86 )     // Fail?
            return bResult;

        // Save info in static vars
        //bVgaBrand = 0;          // Western Digital
        //bCpuType = 0;           // SX
        //bCpuModel = bResult;    // Should be 3
        //bLcdType = 0;           // Mono
        //bSeries = INVALID;
        bOemModelId >>= 7;       // Get hi bit
    }
    else
    {
        // Save info in static vars
        //bVgaBrand &= 0xf0;
        //bVgaBrand >>= 4;
        //if ( bVgaBrand > 1 )
        //    bVgaBrand--;
        //bCpuType &= 0x0f;
        //if ( bCpuType > 4 )
        //    bCpuType -= 2;
        //bCpuModel &= 0xf0;
        //bCpuModel >>= 4;
        //bCpuModel -= 3;
        //bLcdType &= 0xf0;
        //bLcdType >>= 4;
        //bSeries &= 0x07;
    }
    fCalled = TRUE;
}

// Now get value from static var
switch ( uRequest )
{
    case OEMMODELID:
        *pwValue = bOemModelId;
        break;
    //case 0x02:
    //    *pwValue = bVgaBrand;
    //    break;
    //case 0x03:
    //    *pwValue = bCpuType;
    //    break;
    //case 0x04:
    //    *pwValue = bCpuModel;
    //    break;
    //case 0x05:
    //    *pwValue = bLcdType;
    //    break;
    //case 0x06:
    //    if ( bSeries == INVALID )        // Don't allow on TM3000
    //        return INVALID;
    //    *pwValue = bSeries;
    //    break;
```

```
        default:
            return INVALID;
            break;
    }

    return SUCCESS;
}

//===========================================================================
// Handle function 0xF960/0xF961 calls - Get/set standby level
//
WORD DoF9_60_61( UINT uRequest, WORD* pwValue, int nType )
{
    BYTE bResult;
    BYTE bValue;
    BYTE bMax;

    switch ( nType )
    {
        case DOREAD:
            _asm
            {
                mov ax,0f960h           // Get standby level
                int 015h
                mov bResult,ah
                mov bValue,bl
                mov bMax,bh
            }
            if ( bResult == 0 )         // No error?
            {
                if ( bMax == 0 )        // BPro not loaded - return error
                    bResult = INVALID;
                else
                    *pwValue = (WORD) bValue;
            }
            break;

        case DOWRITE:
            bValue = (BYTE) *pwValue;
            _asm
            {
                mov ax,0f961h           // Set standby level
                mov bl,bValue
                int 015h
                mov bResult,ah
            }
            if ( bResult == 0 )         // No error?
                bResult = SystemData[uRequest].bRebootFlag;
            break;

        default:
            return FAIL;
    }

    return (WORD) bResult;
}

//===========================================================================
// Handle function 0xFA00 call - Get RAM information
//
WORD GetVidRam( UINT uRequest, WORD* pwValue, int nType )
```

```
{
    // Write & Default don't apply here
    if ( nType != DOREAD )
        return FAIL;

    BYTE bResult;

    // Check for Cirrus chip
    if ( TiReadCapTableByte( 24, &bResult ) == SUCCESS && ( bResult & 0x01 ) )
    {
        _asm
        {
            mov ax,01200h
            mov bx,00080h       // Inquire VGA type
            int 10h
            mov bResult,al
        }
        // If Cirrus 6440, return 1 MB - check is flaky
        if ( bResult >= 0x40 )
            *pwValue = 16;
        else
        {
            _asm
            {
                mov ax,01200h
                mov bx,00085h       // Return VGA memory
                int 10h
                mov bResult,al
            }
            *pwValue = bResult;
        }
        bResult = SUCCESS;
    }
    else        // Non-Cirrus, just use 0xFA00 call
    {
        BYTE bVideo;

        _asm
        {
            mov ah,0fah
            mov al,00h
            int 015h
            mov bResult,ah
            mov bVideo,bl
        }

        if ( bResult == 0 )         // No error?
            *pwValue = (WORD) bVideo;
    }

    return (WORD) bResult;
}

//===========================================================================
// Handle function 0xFB00 call - Get Docking Station information
//
WORD DoFB00( UINT uRequest, WORD* pwValue, int nType )
{
    BYTE bAHResult, bALResult;
    BYTE bFuncBitMask;
    BYTE bFuncBitShift;
```

```
    _asm
    {
        mov ax,0fb00h
        int 15h
        mov bAHResult,ah
        mov bALResult,al
    }

    switch ( uRequest )
    {
        case DOCKTYPE:
            bFuncBitMask = 0x03;
            bFuncBitShift = 0;
            break;
    }

    *pwValue = bAHResult == INVALID ? 0 : bALResult;
    *pwValue &= bFuncBitMask;
    *pwValue >>= bFuncBitShift;

    return SUCCESS;
}

//==========================================================================
// Handle Display change function call
//
WORD DispSelect( UINT uRequest, WORD* pwValue, int nType )
{
    BYTE bResult;

    // Check for Cirrus, fail if not
    if ( TiReadCapTableByte( 24, &bResult ) != SUCCESS || ( bResult & 0x01 ) == 0 )
        return INVALID;

    if ( nType == DOWRITE )
    {
        BYTE bValue = (BYTE) *pwValue;

#ifdef _WINDOWS
        // Check for 6440
        _asm
        {
            mov ax,01200h
            mov bx,00080h       // Inquire VGA type
            int 10h
            mov bResult,al
        }
        // If 6440, no need to restart Windows
        if ( bResult >= 0x40 )
        {
#endif
            // Make direct video call
            _asm
            {
                cmp bValue,0        // Switch to LCD?
                je do_switch
                mov ax,01200h       // Check for CRT attached
                mov bx,000a1h
                int 10h
                cmp bl,2            // 2 == no CRT attached
                je no_switch
```

```
do_switch:
            mov ah,012h
            mov al,bValue
            mov bl,092h
            int 10h
no_switch:
        }
        // Set CMOS directly
        CmosWrite( uRequest, *pwValue );
        return SUCCESS_NOREBOOT;
#ifdef _WINDOWS
      }
      else   // Not 6440, force to use CMOS directly
        return INVALID;
#endif
  }

  // Not handled above, do BIOS call
  return DoFA_3_4_9( uRequest, pwValue, nType );
}

//==============================================================================
WORD DoDisplay( UINT uRequest, WORD* pwValue, int nType )
{
  int nTmp;

  if ( nType == DOWRITE )
  {
    switch ( uRequest )
    {
      case LCDREVERSE:
        break;

      case LCDEXPMODE:
        DoVideoInt( 0x90, *pwValue ? 0 : 1 );  // Set expand mode
        DoVideoInt( 0x8f, (BYTE) *pwValue );   // Set vertical position
        break;

      case BLOCKCURSOR:
        DoVideoInt( 0x97, *pwValue ? 0 : 1 );  // 0 == enable in video call
        break;

      case DISPLAYSELECT:
        // NOTE: still makes DoFA_3_4_9 call
        // Calls DispSelect()
        break;

      case MONITORTYPE:
        DoVideoInt( 0xa2, (BYTE) *pwValue );
        break;

      case LCDPOWER:
        break;

      case BACKLIGHT:
        GetTIPort( 0xe0, &nTmp );        // MERIO_E0
        if ( *pwValue )        // Turn Backlight on?
          nTmp |= ( 0x20 | 0x10 );  // BACKLITE or KEY_HIT_MASK
        else                 // Turn Backlight off
        {
          nTmp &= ~0x20;             // BACKLITE
```

```
            nTmp |= 0x10;               // KEY_HIT_MASK
          }
          PutTIPort( 0xe0, nTmp );
          break;

        case TEXTRESOLUTION:
          // Calls DoTextRes()
          break;

        case LCDCONTRAST:
          DoVideoInt( 0x8c, (BYTE) *pwValue );
          break;

        case LCDPALETTE:
          // Not called - just set CMOS
          break;

        case EXTERNALVGA:
          break;

        default:
          break;
      }
  }
  else if ( nType == DOREAD )
  {
      switch ( uRequest )
      {
        case BACKLIGHT:
          GetTIPort( 0xe0, &nTmp );          // MERIO_E0
          *pwValue = ( nTmp & 0x20 ) ? 1 : 0;
          return SUCCESS;

        default:
          break;
      }
  }

  return INVALID;     // Force CMOS action
}

//===========================================================================
void DoVideoInt( BYTE bFunction, BYTE bValue )
{
  _asm
  {
      mov al,bValue
      mov ah,12
      mov bl,bFunction
      int 10h
  }
}

//===========================================================================
WORD DoTextRes( UINT uRequest, WORD* pwValue, int nType )
{
  BYTE bMode;

  if ( nType == DOWRITE )
  {
      switch ( *pwValue )
```

```
    {
        case 0:           // 80x25
        case 1:           // 80x50
            bMode = 0x03;
            break;

        case 2:           // 132x25
            bMode = 0x54;
            break;

        case 3:           // 132x60
            bMode = 0x52;
            break;

        default:   /* error occurred */
            return INVALID;
    }
    // Set the video mode
    _asm
    {
        xor ah,ah
        mov al,bMode
        int 10h
    }
    if ( *pwValue == 1 )   // 80x50?
    {
        _asm              // Change to 50 row font
        {
            mov ax,01112h
            xor bl,bl
            int 10h
        }
        tell_ansi( 80, 50 );
    }
    else
        tell_ansi( 80, 25 );
}
else if ( nType == DOREAD )
{
    _asm
    {
        mov ah,0fh        /* Get video mode */
        int 10h
        mov bMode,al
    }
    switch ( bMode )
    {
        case 3:           // 80x25,80x50
            _asm
            {
                mov ax,01130h      /* Get font info */
                int 10h
                mov bMode,dl
            }
            *pwValue = bMode > 25 ? 1 : 0;
            break;

        case 0x54:        // 132x25
            *pwValue = 2;
            break;
```

```
        case 0x52:        // 132x60
            *pwValue = 3;
            break;

        default:   /* error occurred */
            return FAIL;
        }
        return SUCCESS;
    }
    return INVALID;    // Force CMOS action
}

//=============================================================================
// Notify Ansi.sys of text mode change
//
BOOL tell_ansi( WORD cols, WORD rows )
{
    BOOL error = FALSE;
    static struct {   /* structure for Ansi IO control parm table */
        BYTE level;
        BYTE res0;
        WORD length;
        WORD flags;
        BYTE mode;
        BYTE res1;
        WORD colors;
        WORD pcols;
        WORD prows;
        WORD ccols;
        WORD crows;
    } ioctl;

    ioctl.length = 14;              /* parm table length */

    _asm                            /* get current parm table */
    {
        mov    ax,0440ch            ; IOCTL function, char device
        mov    bx,1                 ; stdout handle
        mov    cx,037fh             ; console device, get config
        mov    dx,seg ioctl         ; ds:dx -> parm table
        mov    ds,dx
        mov    dx,offset ioctl
        int    21h
        jnc    error1               ; check for error
        mov    error,TRUE
error1:
    }

    if ( !error )
    {
        ioctl.ccols = cols;    /* table values that change */
        ioctl.crows = rows;

        _asm                        /* store new parm table */
        {
            mov    ax,0440ch        ; IOCTL function, char device
            mov    bx,1             ; stdout handle
            mov    cx,035fh         ; console device, put config
            mov    dx,seg ioctl     ; ds:dx -> parm table
            mov    ds,dx
            mov    dx,offset ioctl
```

```
        int     21h
        jnc     error2          ; check for error
        mov     error,TRUE
error2:
      }
   }

   return( error );
}

//===========================================================================
WORD FARead( BYTE bFunction, BYTE bFuncParm, WORD* pwValue )
{
   BYTE bResult;
   BYTE bValue;

   _asm
   {
      mov ah,0fah
      mov al,bFunction
      mov bh,bFuncParm
      int 015h
      mov bResult,ah
      mov bValue,bl
   }

   if ( bResult == 0 )        // No error?
      *pwValue = (WORD) bValue;

   return (WORD) bResult;
}

//===========================================================================
// Handle function 0x4604 call - Get Docking Station Smart Mode information
//
WORD Do4604( UINT uRequest, WORD* pwValue, int nType )
{
   BYTE bAHResult, bBLResult;
   BYTE bFuncBitMask;
   BYTE bFuncBitShift;

   _asm
   {
      mov ax,04604h
      mov bx,00381h
      int 15h
      mov bAHResult,ah
      mov bBLResult,bl
   }

   switch ( uRequest )
   {
      case DSSMARTMODE:
         bFuncBitMask = 0x80;
         bFuncBitShift = 7;
         break;
      case DSEJECTKEY:
         bFuncBitMask = 0x01;
         bFuncBitShift = 0;
         break;
      case DSCRTCONNECT:
```

```
        bFuncBitMask = 0x08;
        bFuncBitShift = 3;
        break;
    }

    *pwValue = bAHResult == INVALID ? 0 : bBLResult;
    *pwValue &= bFuncBitMask;
    *pwValue >>=bFuncBitShift;

    return SUCCESS;
}

//===========================================================================
WORD FAWrite( BYTE bFunction, BYTE bFuncParm, WORD wValue )
{
    BYTE bResult;
    BYTE bReboot;

    _asm
    {
        mov ah,0fah
        mov al,bFunction
        mov bh,bFuncParm
        mov bl,BYTE PTR wValue
        int 015h
        mov bResult,ah
        mov bReboot,al
    }
    // For units that support reboot flag, return it
    if ( bFunction == 0x04 || bFunction == 0x06 )
        if ( bResult == SUCCESS && SeriesEUnit() )
            bResult = bReboot ? SUCCESS_REBOOT : SUCCESS_NOREBOOT;

    return (WORD) bResult;
}

//===========================================================================
const void FAR* TiGetCapTable()
{
    static const void FAR* CapTable = NULL;

    if ( !CapTable )
    {
        WORD wResult;
        WORD wSegment;
        WORD wOffset;

        _asm
        {
            mov ax,0f95fh
            int 015h
            mov wResult,ax
            mov wSegment,es
            mov wOffset,bx
        }
        if ( wResult != 0x005f )
            return NULL;
 #ifdef _WINDOWS
        CapTable = (void FAR*) MAKELONG( wOffset, &_F000h );
 #else
        CapTable = _MK_FP( wSegment, wOffset );
```

```
 #endif
   }
   return CapTable;
}

//==========================================================================
WORD GetCmos( BYTE bCmosAddress, BYTE* pbValue )
{
   BYTE bResult;
   BYTE bNewValue;

   _asm
   {
      mov ax,0f966h          // Get CMOS byte
      mov bl,bCmosAddress
      int 015h
      mov bResult,ah
      mov bNewValue,al
   }

   *pbValue = bNewValue;
   return (WORD) bResult;
}

//==========================================================================
WORD PutCmos( BYTE bCmosAddress, BYTE bValue )
{
   BYTE bResult;

   _asm
   {
      mov ax,0f967h          // Put CMOS byte
      mov bh,bValue
      mov bl,bCmosAddress
      int 015h
      mov bResult,ah
   }

   return (WORD) bResult;
}

#pragma optimize( "", on )

//==========================================================================
// CirrusWin
//
// Description: Check for Cirrus driver in Windows
//
// Parameters: SysEntry - reference to item table entry,
//             pwValue - ptr to value to get/set,
//             nType - DOREAD, DOWRITE
//
// Returns: SUCCESS, FAIL
//          *pwValue == 1 if Cirrus driver is in use
//
//==========================================================================
WORD CirrusWin( UINT uRequest, WORD* pwValue, int nType )
{
   // Write & Default don't apply here
   if ( nType != DOREAD )
      return FAIL;
```

```
    *pwValue = 0;
#ifdef _WINDOWS
    // Check system.ini for Cirrus display driver
    char szBuffer[256];
    GetPrivateProfileString( "boot.description", "display.drv",
            "", szBuffer, sizeof( szBuffer ), "system.ini" );
    if ( strstr( _strlwr( szBuffer ), "cirrus" ) != NULL )
        *pwValue = 1;
#endif

    return SUCCESS;
}

//////////////////////////////////////////////////////////////////////////////
// Library init
#ifdef _WINDOWS

extern "C"
int WINAPI __export LibMain( HANDLE hModule, UINT wDataSeg, UINT cbHeapSize,
        LPSTR lpszCmdLine )
{
     // Check for Lily CMOS
     fLilyMachine = CheckCapTable( 17, 0x02 );

    // On Dockable systems, validate Docking Station CMOS
    WORD wValue;
    WORD fResult = GetSysInfo( DOCKABLE, &wValue, DOREAD );
    if ( fResult == SUCCESS && wValue > 0 )
        CheckDockCMOS();

    return( 1 );
}

extern "C"
int WINAPI __export WEP( int bSystemExit )
{
    return( 1 );
}

#endif
//////////////////////////////////////////////////////////////////////////////
```

```
//________________________________________________________________
//                                          |
// (c) Copyright, Texas Instruments Incorporated, 1993. All Rights    |
// Reserved. Property of Texas Instruments Incorporated. Restricted  |
// Rights -- Use, duplication or disclosure subject to restrictions set  |
// forth in TI's Program License Agreement and associated documentation. |
//________________________________________________________________|
//
// $Workfile: TISYSTEM.CPP $
// $Revision: 1.23 $
//    $Date: 22 Sep 1993 15:45:12 $
//    Author: Robert Tonsing
//      Site: Temple
//  Language: C++
//
//======================================================================
#ifdef WINNT          // Windows NT
  #pragma message("\n>>> Compiling for 32-bit Windows <<<")
  #include <windows.h>
  #define DllExport __declspec(dllexport)
#else
  #ifdef _WINDOWS
    #pragma message("\n>>> Compiling for 16-bit Windows <<<")
    #include <windows.h>
    #define DllExport WINAPI _export
  #else // DOS
    #pragma message("\n>>> Compiling for DOS <<<")
    #include "stdtypes.h"
    #define DllExport
  #endif
  #include <dos.h>
#endif

#include "tisystem.h"
#include "tisysdef.h"

#ifdef WINNT          // Select system i/o
  #include "winnt_io.h"
#else
  #include "dos_io.h"
#endif

#ifdef _DEBUG
  #pragma message(">>> Debug version <<<")
#else
  #pragma message(">>> Retail version <<<")
#endif

#define DOREAD    0
#define DOWRITE   1

BOOL CheckCapTable( BYTE bCapTableByte, BYTE bCapTableMask );
BOOL ValidCall( UINT uRequest );
WORD GetCmos( BYTE bCmosAddress, BYTE* pbValue );

#ifdef _WINDOWS
static void SetWinCommPorts( WORD wValue );
#endif

//////////////////////////////////////////////////////////////////////
// Public C interface
```

```
#ifdef __cplusplus
  #ifndef WINNT
    extern "C" {
  #endif
#endif

//==========================================================================
// TiSysVersion
//
//   Description: Get library version
//
//   Parameters: None
//
//   Returns: Pointer to string containing version
//
//==========================================================================
#ifdef _WINDOWS
  LPCSTR DllExport TiSysVersion()
#else
  const char* DllExport TiSysVersion()
#endif
{
    static const char cszTiSysVersion[] = TISYSTEMVERSION;

    return cszTiSysVersion;
}

//==========================================================================
// TiBiosVersion
//
//   Description: Get library version
//
//   Parameters: None
//
//   Returns: Pointer to string containing version
//
//==========================================================================
#ifdef _WINDOWS
  LPCSTR DllExport TiBiosVersion()
#else
  const char* DllExport TiBiosVersion()
#endif
{
    static const char* pszTiBiosVersion = NULL;

    if ( pszTiBiosVersion == NULL )
        pszTiBiosVersion = GetBiosVersion();
    return pszTiBiosVersion;
}

//==========================================================================
// TiBProVersion
//
//   Description: Get library version
//
//   Parameters: None
//
//   Returns: Pointer to string containing version
//
//==========================================================================
#ifdef _WINDOWS
```

```
  LPCSTR DllExport TiBProVersion()
#else
  const char* DllExport TiBProVersion()
#endif
{
    static const char* pszTiBProVersion = NULL;

    if ( pszTiBProVersion == NULL )
        pszTiBProVersion = GetBProVersion();
    return pszTiBProVersion;
}

//=============================================================================
// TiVideoVersion
//
//  Description: Get library version
//
//  Parameters: None
//
//  Returns: Pointer to string containing version
//
//=============================================================================
#ifdef _WINDOWS
  LPCSTR DllExport TiVideoVersion()
#else
  const char* DllExport TiVideoVersion()
#endif
{
    static const char* pszTiVideoVersion = NULL;

    if ( pszTiBProVersion == NULL )
        pszTiVideoVersion = GetVideoVersion();
    return pszTiVideoVersion;
}

//=============================================================================
// TiReadConfig
//
// Description: Reads the current value for the specified setup item
//
// Parameters: uRequest - item requested
//             pwValue - ptr to location for value read
//
// Returns: SUCCESS, FAIL, or INVALID
//
//=============================================================================
WORD DllExport TiReadConfig( UINT uRequest, WORD* pwValue )
{
#ifdef WINNT          // Windows NT
    MessageBox( NULL, "DLL called OK", "TISystem", MB_OK );
    return 0;
#endif

    // Check for out of range request
    if ( uRequest >= SYSDATAMAX )
        return FAIL;

    // Check cap table
    if ( !ValidCall( uRequest ) )
        return INVALID;
```

```
WORD nResult = INVALID;

// Try function call
if ( SystemData[uRequest].BiosFunc != NULL )
   nResult = (*SystemData[uRequest].BiosFunc)( uRequest,
         pwValue, DOREAD );

// No? Get it from CMOS
if ( nResult > SUCCESS_MAX )
   nResult = CmosRead( uRequest, pwValue );

if ( nResult == SUCCESS )
{
   // Handle special cases
   switch ( uRequest )
   {
      case SYSTEMRAM:
         // pwValue = hi byte of ram from CMOS
         // Add 1 to correct, divide by 4 to get megabytes
         ++(*pwValue) >>= 2;
         break;
      case SHADOWBIOS:       // For Shadow All, set all bits
         if ( *pwValue > 3 )
            *pwValue = 4;
         break;
      case PBLPTEXTMODE:     // 2 CMOS fields combined, skip even numbers
         if ( *pwValue > 1 )
            *pwValue = ( *pwValue + 1 ) / 2;
         break;
      case PBSOUNDHW:        // CMOS uses 0 as enabled
      case QUICKPORT:
         *pwValue = *pwValue == 0 ? 1 : 0;
         break;
      case PARALLELPORT:     // 0x3bc is #3, should be #1
         switch ( *pwValue )
         {
            case 1:
            case 2:
               (*pwValue)++;
               break;
            case 3:
               *pwValue = 1;
               break;
            default:
               break;
         }
         break;
      case STDCOMMWORD:      // 0 & 1 are reserved
      case OPTCOMMWORD:
         *pwValue -= 2;
         break;
      case STDCOMMPARITY:    // 2 is reserved
      case OPTCOMMPARITY:
         if ( *pwValue == 3 )
            (*pwValue)--;
         break;
      case STDCOMMPORT:      // Special functions
         if ( *pwValue != 0 )   // Enabled?
         {  // See if ports are swapped
            if ( TiReadConfig( SWAPCOMMPORTS, pwValue ) == SUCCESS )
               *pwValue = *pwValue ? 2 : 1;
```

```
            }
            break;
         case OPTCOMMPORT:
            if ( *pwValue != 0 )    // Enabled?
            {  // See if ports are swapped
               if ( TiReadConfig( SWAPCOMMPORTS, pwValue ) == SUCCESS )
                  *pwValue = *pwValue ? 1 : 2;
            }
            break;
#if 0   // Handled in base fcn for efficiency
         case VGABRAND:
            if ( *pwValue > 1 )     // 1 is reserved
               (*pwValue)--;
            break;
#endif
         default:
            break;
      }
   }

   return nResult;
}

//===========================================================================
// TiWriteConfig
//
// Description: Writes the current value for the specified setup item
//
// Parameters: uRequest - item requested
//             wValue - value to store
//
// Returns: SUCCESS, SUCCESS_REBOOT, SUCCESS_NOREBOOT, SUCCESS_RESTARTWIN,
//          FAIL, or INVALID
//
//===========================================================================
WORD DllExport TiWriteConfig( UINT uRequest, WORD wValue )
{
   if ( uRequest >= SYSDATAMAX )
      return FAIL;

   // Check for out of range value
   if ( wValue > SystemData[uRequest].bMaxValue )
      return INVALID;

   // Check cap table
   if ( !ValidCall( uRequest ) )
      return INVALID;

   WORD nResult = INVALID;

   // Handle special cases
   switch ( uRequest )
   {
      case SHADOWBIOS:         // For Shadow All, set all bits
         if ( wValue > 3 )
            wValue = 7;
         break;
      case PBLPTEXTMODE:       // 2 CMOS fields combined, skip even numbers
         if ( wValue > 1 )
            wValue = ( wValue * 2 ) - 1;
         break;
```

```
        case PBSOUNDHW:          // CMOS uses 0 as enabled
        case QUICKPORT:
            wValue = wValue == 0 ? 1 : 0;
            break;
        case PARALLELPORT:       // 0x3bc is #3, should be #1
            switch ( wValue )
            {
                case 1:
                    wValue = 3;
                    break;
                case 2:
                case 3:
                    wValue--;
                    break;
                default:
                    break;
            }
            break;
        case STDCOMMWORD:        // 0 & 1 are reserved
        case OPTCOMMWORD:
            wValue += 2;
            break;
        case STDCOMMPARITY:      // 2 is reserved
        case OPTCOMMPARITY:
            if ( wValue == 2 )
                wValue++;
            break;
        case STDCOMMPORT:        // Special functions
            if ( wValue != 0 )  // Enabled?
            {   // See if ports are to be swapped
                nResult = TiWriteConfig( SWAPCOMMPORTS,
                        wValue == 2 ? 1 : 0 );
                if ( nResult > SUCCESS_MAX )    // Did it fail?
                    return nResult;
                wValue = 1;                  // Enable port
                nResult = INVALID;               // Reset result
            }
            break;
        case OPTCOMMPORT:
            if ( wValue != 0 )      // Enabled?
            {   // See if ports are to be swapped
                nResult = TiWriteConfig( SWAPCOMMPORTS,
                        wValue == 2 ? 0 : 1 );
                if ( nResult > SUCCESS_MAX )    // Did it fail?
                    return nResult;
                wValue = 1;                  // Enable port
                nResult = INVALID;               // Reset result
            }
            break;
#ifdef _WINDOWS
        case DSCOMMADDR:
            SetWinCommPorts( wValue );
            break;
#endif
        case OEMMODELID:         // Read-only entries
        case VGABRAND:
        case CPUTYPE:
        case CPUMODEL:
        case LCDTYPE:
        case SERIES:
        case EXTERNALVGA:
```

```
        case CIRRUSDRIVER:
        case DOCKABLE:
        case SYSTEMRAM:
        case VIDEORAM:
        case DOCKTYPE:
        case DSSMARTMODE:
        case DSEJECTKEY:
        case DSCRTCONNECT:
            return FAIL;
        default:
            break;
    }

    // Try function call
    if ( SystemData[uRequest].BiosFunc != NULL )
        nResult = (*SystemData[uRequest].BiosFunc)( uRequest,
                &wValue, DOWRITE );

    // No? Put it to CMOS
    if ( nResult > SUCCESS_MAX )
        nResult = CmosWrite( uRequest, wValue );

    // Modifications to result code?
#ifdef _WINDOWS
    switch ( uRequest )
    {
        case LCDEXPMODE:      // Immediate set doesn't work in Windows
        case BLOCKCURSOR:
        case MONITORTYPE:
            nResult = SUCCESS_RESTARTWIN;
            break;

        default:
            break;
    }
#endif

    // If not already set, set Reboot Flag
    if ( nResult == SUCCESS )
        nResult = SystemData[uRequest].bRebootFlag;
    else if ( nResult == SUCCESS_NOREBOOT
            && SystemData[uRequest].bRebootFlag == SUCCESS_RESTARTWIN )
        nResult = SUCCESS_RESTARTWIN;

    return nResult;
}

//==========================================================================
WORD DllExport TiDefaultConfig( UINT uRequest, WORD* pwValue )
{
    if ( uRequest >= SYSDATAMAX )
        return FAIL;

    // Check cap table
    if ( !ValidCall( uRequest ) )
        return INVALID;

    WORD wValue;

    // Get value from table
    *pwValue = SystemData[uRequest].bDefault;
```

```
    switch ( uRequest )
    {
        case LCDPALETTE:        // STN - different default
            if ( TiReadCapTableWord( 12, &wValue ) == SUCCESS
                    && ( wValue & 0x0220 ) )
                *pwValue = 5;
            break;

        case MONITORTYPE:       // STN - different default
            if ( TiReadCapTableWord( 12, &wValue ) == SUCCESS
                    && ( wValue & 0x0220 ) )
                *pwValue = 4;
            break;

        case OEMMODELID:        // Read-only entries
        case VGABRAND:
        case CPUTYPE:
        case CPUMODEL:
        case LCDTYPE:
        case SERIES:
        case EXTERNALVGA:
        case CIRRUSDRIVER:
        case DOCKABLE:
        case SYSTEMRAM:
        case VIDEORAM:
        case DOCKTYPE:
        case DSSMARTMODE:
        case DSEJECTKEY:
        case DSCRTCONNECT:
            return FAIL;

        default:
            break;
    }

    return SUCCESS;
}

//===========================================================================
WORD DllExport TiReadCapTableWord( UINT uWordRequest, WORD* pwValue )
{
    // Get ptr to Cap Table
    const LPWORD pCapTable = (const LPWORD) TiGetCapTable();
    // Valid ptr & valid word #?
    if ( !pCapTable || uWordRequest > pCapTable[ 0 ] )
        return FAIL;

    *pwValue = pCapTable[ uWordRequest ];  // Do it

    return SUCCESS;
}

//===========================================================================
WORD DllExport TiReadCapTableByte( UINT uByteRequest, BYTE* pbValue )
{
    // Get ptr to Cap Table
    const LPBYTE pCapTable = (const LPBYTE) TiGetCapTable();
    // Valid ptr & valid byte #?
    if ( !pCapTable
            || uByteRequest > (UINT) ( ( (const LPWORD)pCapTable)[ 0 ] * 2 ) )
        return FAIL;
```

```
    *pbValue = pCapTable[ uByteRequest ];  // Do it

    return SUCCESS;
}

#ifdef __cplusplus
  #ifndef WINNT
    }
  #endif
#endif

//===========================================================================
BOOL CheckCapTable( BYTE bCapTableByte, BYTE bCapTableMask )
{
    // Check Cap Table for availability
    BYTE CTValue;
    if ( TiReadCapTableByte( bCapTableByte, &CTValue ) == SUCCESS )
        if ( ( CTValue & bCapTableMask ) != 0 )
            return TRUE;

    return FALSE;
}

//===========================================================================
BOOL ValidCall( UINT uRequest )
{
    BOOL fResult = TRUE;

    // Is there anything to check?
    if ( SystemData[uRequest].bCapTableByte != 0 )
        fResult = CheckCapTable( SystemData[uRequest].bCapTableByte, // Get bits
            SystemData[uRequest].bCapTableMask );

    switch ( uRequest )
    {
        case DSHDD0TYPE:        // Only allow on Dockable systems
        case DSHDD1TYPE:
        case DSFDD0TYPE:
        case DSFDD1TYPE:
        case DSFDDLOCATION:
        case DSFDDSWAP:
        case DSSCSIHW:
        case DSSCSIBIOS:
        case DSPCMCIAHW:
        case DSPCMCIABIOS:
        case DSGAMEPORT:
        case DSQUICKPORT:
        case DSCOMMADDR:
        case DSLPTPORTMODE:
        case DS9PINCOMM:
        case DS25PINCOMM:
        case DSLPTPORT:
        case DSNBOPTCOMM:
        case MD9PINCOMM:
        case MDLPTPORT:
        case MDNBSTDCOMM:
        case MDNBOPTCOMM:
        case NBLPTPORT:
        case DOCKTYPE:
        case DSSMARTMODE:
        case DSEJECTKEY:
```

```
        case DSCRTCONNECT:
            {
                WORD wValue;
                fResult = ( GetSysInfo( DOCKABLE, &wValue, DOREAD )
                        == SUCCESS && wValue > 0 )
                    ? TRUE : FALSE;
            }
            break;

        case QUICKPORT:         // Use MOUSELOCATION & KBDLOCATION if available
            if ( CheckCapTable( 16, 0x04 ) ) // Check for new support
                fResult = FALSE;
            break;

        case PS2PORT:           // Use MOUSELOCATION & KBDLOCATION if available
            fResult = !fResult;
            // fall thru
        case MOUSELOCATION:     // Don't allow on series M
        case KBDLOCATION:
            if ( CheckCapTable( 11, 0x04 ) )
                fResult = FALSE;
            break;

        // These are inverted - if set, DON'T allow
        case STDCOMMCTS:        // Don't allow these on Paintbrush
        case STDCOMMDSR:
        case STDCOMMDCD:
        case OPTCOMMPORT:
        case OPTCOMMENABLE:
        case OPTCOMMWORD:
        case OPTCOMMSTOP:
        case OPTCOMMPARITY:
        case OPTCOMMBAUD:
        case PARALLELPORT:
        case EXPANSIONBUS:
        case LCDPOWER:
            fResult = !fResult;
            break;

        case LCDREVERSE:        // Only allowed on Mono units
            {
                WORD wValue;
                fResult = ( GetSysInfo( LCDTYPE, &wValue, DOREAD )
                        == SUCCESS && wValue == 0 )
                    ? TRUE : FALSE;
            }
            break;

#ifdef _WINDOWS
        case TEXTRESOLUTION:    // Don't allow in Windows
            fResult = FALSE;
            break;
#endif

        default:
            break;
    }

    return fResult;
}
```

```
#ifdef _WINDOWS
//===========================================================================
static char* Com3Strings[] = { "0338", "03E8", "02E8", "220" };
static char* Com4Strings[] = { "0238", "02E8", "02E0", "228" };

static void SetWinCommPorts( WORD wValue )
{
   WritePrivateProfileString( "386Enh", "COM3Irq", "4", "system.ini" );
   WritePrivateProfileString( "386Enh", "COM3Base", Com3Strings[wValue],
         "system.ini" );
   WritePrivateProfileString( "386Enh", "COM4Irq", "3", "system.ini" );
   WritePrivateProfileString( "386Enh", "COM4Base", Com4Strings[wValue],
         "system.ini" );
}
#endif

#define NBCOMM_MAX 3
static const WORD NBCommCfgs[][NBCOMM_MAX] =
{  { 1, 2, 1 },
   { 2, 1, 0 },
   { 0, 0, 0 }
};

#define MDCOMM_MAX 5
static const WORD MDCommCfgs[][MDCOMM_MAX] =
{  { 3, 1, 2, 1, 2 },
   { 2, 2, 1, 0, 0 },
   { 1, 3, 3, 2, 1 }
};

#define DSCOMM_MAX 6
static const WORD DSCommCfgs[][DSCOMM_MAX] =
{  { 2, 1, 0, 2, 1, 0 },
   { 1, 2, 1, 3, 3, 2 },
   { 3, 3, 2, 1, 2, 1 }
};

//===========================================================================
WORD DllExport TiGetCommConfig( int nSetup, int nNB9Pin, int nNBModem,
      int nDS9Pin, int nDS25Pin )
{
   WORD nMax, nPort0, nPort1, nPort2;
   const WORD *pArray0, *pArray1, *pArray2;

   // Check for invalid port numbers?
   // Check for invalid combinations?
   switch ( nSetup )
   {
      case NOTEBOOK:
         nMax = NBCOMM_MAX;
         pArray0 = NBCommCfgs[0];
         pArray1 = NBCommCfgs[1];
         pArray2 = NBCommCfgs[2];
         nPort0 = nNB9Pin;
         nPort1 = nNBModem;
         nPort2 = 0;
         break;
      case MICRODOCK:
         nMax = MDCOMM_MAX;
         pArray0 = MDCommCfgs[0];
         pArray1 = MDCommCfgs[1];
```

```
            pArray2 = MDCommCfgs[2];
            nPort0 = nNB9Pin;
            nPort1 = nNBModem;
            nPort2 = nDS9Pin;
            break;
        case DESKTOP:
            nMax = DSCOMM_MAX;
            pArray0 = DSCommCfgs[0];
            pArray1 = DSCommCfgs[1];
            pArray2 = DSCommCfgs[2];
            nPort0 = nNBModem;
            nPort1 = nDS9Pin;
            nPort2 = nDS25Pin;
            break;
        default:
            return FAIL;
    }

    WORD nConfig = 0;
    for ( WORD i = 0; i < nMax && nConfig == 0; i++ )
    {
        if ( pArray0[i] == nPort0
                && pArray1[i] == nPort1
                && pArray2[i] == nPort2 )
        {
            nConfig = i + 1;
        }
    }

    return nConfig;
}

//===========================================================================
WORD DllExport TiGetCommPorts( int nCfg, int nSetup, int* pnNB9Pin,
        int* pnNBModem, int* pnDS9Pin, int* pnDS25Pin )
{
    switch ( nSetup )
    {
        case NOTEBOOK:
            if ( nCfg == 0 )
                return NBCOMM_MAX;
            if ( --nCfg >= NBCOMM_MAX )              // Valid cfg #?
                return FAIL;
            if ( !pnNB9Pin || !pnNBModem )           // Valid pointers?
                return FAIL;
            *pnNB9Pin = NBCommCfgs[0][nCfg];
            *pnNBModem = NBCommCfgs[1][nCfg];
            if ( pnDS25Pin )                    // Clear any other ports
                *pnDS25Pin = 0;
            if ( pnDS9Pin )
                *pnDS9Pin = 0;
            break;
        case MICRODOCK:
            if ( nCfg == 0 )
                return MDCOMM_MAX;
            if ( --nCfg >= MDCOMM_MAX )              // Valid cfg #?
                return FAIL;
            if ( !pnNB9Pin || !pnNBModem || !pnDS9Pin ) // Valid pointers?
                return FAIL;
            *pnNB9Pin = MDCommCfgs[0][nCfg];
            *pnNBModem = MDCommCfgs[1][nCfg];
```

```
        *pnDS9Pin = MDCommCfgs[2][nCfg];
        if ( pnDS25Pin )                    // Clear any other ports
            *pnDS25Pin = 0;
        break;
    case DESKTOP:
        if ( nCfg == 0 )
            return DSCOMM_MAX;
        if ( --nCfg >= DSCOMM_MAX )             // Valid cfg #?
            return FAIL;
        if ( !pnNBModem || !pnDS9Pin || !pnDS25Pin ) // Valid pointers?
            return FAIL;
        *pnNBModem = DSCommCfgs[0][nCfg];
        *pnDS9Pin = DSCommCfgs[1][nCfg];
        *pnDS25Pin = DSCommCfgs[2][nCfg];
        if ( pnNB9Pin )                     // Clear any other ports
            *pnNB9Pin = 0;
        break;
    default:
        return FAIL;
    }

    return SUCCESS;
}

#define NBLPT_MAX 4
static const WORD NBLptCfgs[][NBLPT_MAX] =
{   { 1, 2, 3, 0 },
    { 0, 0, 0, 0 }
};

#define MDLPT_MAX 7
static const WORD MDLptCfgs[][MDLPT_MAX] =
{   { 3, 1, 0, 1, 2, 3, 0 },
    { 2, 2, 2, 0, 0, 0, 0 },
};

#define DSLPT_MAX 2
static const WORD DSLptCfgs[][DSLPT_MAX] =
{   { 0, 0 },
    { 2, 0 },
};

//===========================================================================
WORD DllExport TiGetLptConfig( int nSetup, int nNBPort, int nDSPort )
{
    WORD nMax;
    const WORD *pArray0, *pArray1;

    // Check for invalid port numbers?
    // Check for invalid combinations?
    switch ( nSetup )
    {
        case NOTEBOOK:
            nMax = NBLPT_MAX;
            pArray0 = NBLptCfgs[0];
            pArray1 = NBLptCfgs[1];
            break;
        case MICRODOCK:
            nMax = MDLPT_MAX;
            pArray0 = MDLptCfgs[0];
            pArray1 = MDLptCfgs[1];
```

```
            break;
        case DESKTOP:
            nMax = DSLPT_MAX;
            pArray0 = DSLptCfgs[0];
            pArray1 = DSLptCfgs[1];
            break;
        default:
            return FAIL;
    }

    WORD nConfig = 0;
    for ( WORD i = 0; i < nMax && nConfig == 0; i++ )
    {
        if ( pArray0[i] == (WORD) nNBPort
                && pArray1[i] == (WORD) nDSPort )
        {
            nConfig = i + 1;
        }
    }

    return nConfig;
}

//===========================================================================
WORD DllExport TiGetLptPorts( int nCfg, int nSetup, int* pnNBPort,
        int* pnDSPort )
{
    switch ( nSetup )
    {
        case NOTEBOOK:
            if ( nCfg == 0 )
                return NBLPT_MAX;
            if ( --nCfg >= NBLPT_MAX )      // Valid cfg #?
                return FAIL;
            if ( !pnNBPort )                // Valid pointers?
                return FAIL;
            *pnNBPort = NBLptCfgs[0][nCfg];
            if ( pnDSPort )                 // Clear any other ports
                *pnDSPort = 0;
            break;
        case MICRODOCK:
            if ( nCfg == 0 )
                return MDLPT_MAX;
            if ( --nCfg >= MDLPT_MAX )      // Valid cfg #?
                return FAIL;
            if ( !pnNBPort || !pnDSPort )   // Valid pointers?
                return FAIL;
            *pnNBPort = MDLptCfgs[0][nCfg];
            *pnDSPort = MDLptCfgs[1][nCfg];
            break;
        case DESKTOP:
            if ( nCfg == 0 )
                return DSLPT_MAX;
            if ( --nCfg >= DSLPT_MAX )      // Valid cfg #?
                return FAIL;
            if ( !pnDSPort )                // Valid pointers?
                return FAIL;
            if ( pnNBPort )                 // Clear any other ports
                *pnNBPort = 0;
            *pnDSPort = DSLptCfgs[1][nCfg];
            break;
```

```
      default:
         return FAIL;
   }

   return SUCCESS;
}

//============================================================================
// Check for Series E or later unit (Series M passes too)
BOOL SeriesEUnit()
{
   WORD wValue;

   return ( TiReadCapTableWord( 5, &wValue ) == SUCCESS )
         ? ( wValue & 0x0480 )
         : FALSE;
}

//============================================================================
BOOL DllExport CheckDockCMOS()
{
   // Is system Dockable?
   WORD wValue;
   if ( GetSysInfo( DOCKABLE, &wValue, DOREAD )
         == SUCCESS && wValue > 0 )
   {
      // Calculate new checksum
      BYTE bCmosValue;
      BYTE bNewChkSum = 0xff;
      for ( BYTE i = 0x83; i <= 0x8b; i++ )
      {
         GetCmos( i, &bCmosValue );
         bNewChkSum += bCmosValue;
      }
      // Get old checksum
      BYTE bOldChkSum;
      GetCmos( 0x8c, &bOldChkSum );

      if ( bNewChkSum != bOldChkSum )
      {
         // IMPORTANT! This assumes Docking station entries
         // are consecutive in table
         for ( UINT uRequest = DSHDD0TYPE; uRequest <= NBLPTPORT; uRequest++ )
            TiWriteConfig( uRequest, SystemData[uRequest].bDefault );
         return TRUE;
      }
   }

   return FALSE;
}

//============================================================================
// DoSpeaker
//
// Description: Turn speaker on/off realtime
//
// Parameters: SysEntry - not used,
//             pwValue - ptr to value to get/set,
//             nType - DOREAD, DOWRITE
//
// Returns: INVALID - force CMOS action to get/set setting
```

```
//
//===========================================================================
WORD DoSpeaker( UINT uRequest, WORD* pwValue, int nType )
{
    int nTmp;

    if ( nType == DOWRITE )
    {
        GetTIPort( 0xe1, &nTmp );        // MERIO_E1
        if ( *pwValue )    // Turn speaker on?
            nTmp &= ~0x10;            // TIMER_SPEAKER_OFF
        else
            nTmp |= 0x10;
        PutTIPort( 0xe1, nTmp );
    }

    return INVALID;     // Force CMOS action
}

//===========================================================================
// DoAlarms
//
// Description: Turn alarms on/off realtime
//
// Parameters: SysEntry - reference to item table entry,
//             pwValue - ptr to value to get/set,
//             nType - DOREAD, DOWRITE
//
// Returns: INVALID - force CMOS action to get/set setting
//
//===========================================================================
WORD DoAlarms( UINT uRequest, WORD* pwValue, int nType )
{
    int nTmp;

    if ( nType == DOWRITE )
    {
        // BATTERYALARM or COVERALARM
        int nFunc = uRequest == BATTERYALARM ? 0x01 : 0x02;
        GetTIPort( 0xe0, &nTmp );        // MERIO_E0
        if ( *pwValue )
        {           // Turn Battery Alarm on
            nTmp &= ~nFunc;            // LB_ALARM_OFF or COVER_ALARM_OFF
            nTmp |= 0x10;             // KEY_HIT_MASK
        }
        else         // Turn Battery Alarm off
            nTmp |= ( nFunc | 0x10 );
        PutTIPort( 0xe0, nTmp );
    }

    return INVALID;     // Force CMOS action
}
```

```
;
;FILE=BA.ASM
;Vaughn Watts 3/01/92
;----------------------------------------------------------------------------
;
;   Interrupt 8 Timer interrupt service routine.
;
;----------------------------------------------------------------------------
;
;       Note the following two labels and relationship to each other can
;            not change.  They are in fact a dword for vectoring to
;            the default TIMER  code at intercept interrupt.
;
ipc_timer       dw      0                       ; ipc vector/dos idle loop on interrupt
seg_timer       dw      0                       ; segment vector/dos idle loop on inter
;
INCLUDE ..\equ\BA.EQU
INCLUDE ..\asm\BADATA.ASM

;============================================================================
; TIMERINT intercepts and handles the timer tick interrupt 8h
;
;  Note that this routine is executed once per timer tick, but the
;  updating of time is only done once per minute.  This should make
;  it virtually non-noticable as far as power consumption goes.
;
;  Also, the UPDATE_IN_PROGRESS bits are stored in here
;
;============================================================================
;
;       Read AC Port Operations
;
;       BATTERY_TEST
;       je      ba_on_battery
;       inc     word ptr cs:CurrentSystemChargeTime
;       jmp     short DoLowPowerTimes
;
;ba_on_battery:
;DoLowPowerTimes:
;
; Do the Low Power Times
;
;
;       BATTERY_TEST
;
;       test    al, LOW_BATTERY_BIT     ; Find out if low Battery?
;       jz      Battery_Is_Low_Port     ; yep
;       jmp     Battery_High_Exit
;============================================================================
timer_interrupt proc    far
        pushf
        pusha                                   ; protect the interrupted flags

        push    ds
        push    es                              ; [5.10.C7]
        push    cs
        pop     ds                              ; [5.10.c7]
;
;[7.00] Added Docking station support
;[7.00.51]
```

```
        mov     al,86h
        cmp     cs:DockStatus,al
        je      BAAPMStateOn
;[7.00.51]

        in    al,DOCKPORT                       ; Read the status port
        jmp   $+2
        Jmp   $+2
        jmp   $+2
        Jmp   $+2
;
;        Test for Standby function here
;
        mov   ah,al
        and   ah,FREEDSBITS                     ; Returns AH=0 ; al is valid status bits
        cmp   ah,0
        jne      BAAPMStateOn

;[7.00.51]
        mov   ah,al
        and   ah,DOCKINGALLBITS
        cmp   ah,0
        je    BAAPMStateOn
        cmp     cs:IntelligentMode,SMARTMODE    ; Intelligent Mode, DOS
        jne      BAAPMStateOn
        cmp      cs:UserStandby,1                ; Are we in a standby process?
        je       BAInStandbyProcess

                                                ; No, Up Poll Count to log event
        mov      cs:word ptr PollTicks,POLLTICKSMAX-1
        mov      cs:word ptr Win3PollTicks,POLLTICKSWIN3MAX-1
        mov      cs:word ptr PollTickIdle,POLLTICKSIDLEMAX-1
        jmp      short BAAPMStateOn

BAInStandbyProcess:

;[7.00.51]
        mov   ah,al
        and   ah,STANDBYDSBITS
        cmp   ah,STANDBYDSBITS
        jne      BAAPMStateOn

        mov   al,CLEARMC
        out   DOCKPORT,al                       ; Force clear of port after read

; set stack to me to leave standby
        pop      es
        pop      ds
        popa
        popf

 ; My entry point please
        pushf
        push     cs
        push     offset DockSuspendEnd

 ; Put my stuff back on the stack

        pushf                                   ; protect the interrupted flags
        pusha
```

```
        push    ds
        push    es
        push    cs                                   ; [5.10.C7]
        pop     ds
                                                     ; [5.10.c7]
BAAPMStateOn:
;[7.00]
;
;       Is APM State ON?                             ; [5.10.C]
;
        mov     al,APM_STATE_CMOS                    ; Byte to hold APM Write Flag
        out     CMOS_AD,al                           ; Output it to CMOS
        in      al,CMOS_DT                           ; and store it
;
;       Check Command Register
;
        cmp     al,80h
        jne     CheckAPMCommand1
        mov     byte ptr APMCommandCurrent,al        ; Debug locations
;[6.02b]mov      power_level,0                        ; Take it way - pure zero
        mov     al,8fh                               ; Completed command
WriteAPMCommand:
        out     CMOS_DT,al                           ; New command
        jmp     short APMCommandComplete
EnablePowerManagement:
        mov     byte ptr APMCommandCurrent,al        ; Debug locations
        mov     al,00h                               ; command completed
        jmp     short WriteAPMCommand

CheckAPMCommand1:
        cmp     al,81h
        je      EnablePowerManagement
        cmp     al,88h
        je      APMCommandComplete                   ; Waiting on Clear

        cmp     al,8fh
        je      APMCommandComplete                   ; Skip Power Saving APM
        mov     ah,al
        xor     al,al
        out     CMOS_DT,al                           ; Clear it
        mov     al,ah                                ; bump count
        xor     ah,ah
        add     apm_tick_count,ax                    ; done

APMCommandComplete:

;
;       Compute Interval
;
ComputeInterval: dec WORD PTR [DC_Minute]            ; one more tick passed, one
                                                     ; tick closer to full minute
        cmp     WORD PTR [DC_Minute],0               ; reached minute yet ??
        je      NotTimerExit                         ; yep, then update
        jmp     timer_exit                           ; nope, keep waiting
NotTimerExit:
;[7.00]
;       Setup for Docking Station Support
;
        cmp     cs:UserStandby,1                     ; Are we in a standby process?
        jne     OldNotTimerExit
```

```
        cmp     cs:Int. ligentMode,SMARTMODE    ; intelligent Mode, DOS
                jne     OldNotTimerExit
        cmp     byte ptr cs:resume_type,POWERON ; Type shutdown wanted
        jne     OldNotTimerExit
        cmp     word ptr cs:resume_time,0       ; Manual operation wanted
        je      OldNotTimerExit                 ; Yes
        cmp     word ptr cs:resume_time,1       ; Time to leave?
        je      NewNotTimerExit                 ; Yes
        dec     word ptr cs:resume_time
        jmp     short OldNotTimerExit           ; Try next pass
NewNotTimerExit:
;
;       We have an auto resume function here after n minutes delay (fixed)
;
; set stack to me to leave standby
        pop     es
        pop     ds
        popa
        popf

; My entry point please
        pushf
        push    cs
        push    offset DockSuspendEnd

; Put my stuff back on the stack

        pushf
        pusha                                   ; protect the interrupted flags

        push    ds
        push    es
        push    cs                              ; [5.10.C7]
        pop     ds
OldNotTimerExit:                                ; [5.10.c7]
;
;       Setup for new number of ticks
;
        mov     WORD PTR [DC_Minute],MINUTE_RELOAD
;
;       We must now update any change in Operational Status
;       Set up Base DS to BIOS RAM AREA
;
        mov     ax,DS40H
        mov     es,ax                           ; [5.10.c7]

;
; One minute passed, so update current system parameters: Do the Power On Times
;
        CLI
        inc     SystemRunTime                   ; bump up the number of min run
;
;       Read AC Port Operations
;
        BATTERY_TEST
        jne     RunningOnAc

        inc     SystemTime                      ; Time on Battery   [5.10.c3]

        jmp     RuningCurrentSystemBattery
```

```
RunningOnAc:
;
;       Caculate last usage on AC power
;
;[7.00] Added Docking Station Support
;
        mov     al,86h
        cmp     DockStatus,al
        je      RunningOnAcNoDock
;
;       Are we full?
;
        mov     al,DSFastChargeStatus
        cmp     al,DS_FAST_CHARGEBITS
        je      RunningOnAcNoDock
;
;       We are full, Setup bits for full
;

        mov     al,APMMaxbatRuntime
        mov     APMThisbatteryRuntime,al                ; Reset to FULL!
RunningOnAcNoDock:
        mov     cx,SystemRunTime                      ; Total run time this session
        mov     OldState,ch                           ; [5.10.1]
        test    ch,SUSPEND_STATE                      ; Are we in Suspend State?
        jne     SuspendCharge                         ; Bit On - Jump
        test    ch,APM_STATE                          ;
        jne     APMCharge                             ; Yes, Bit On - Jump
        test    ch,BACKLIGHT_STATE                    ; Backlight ON?
        je      BacklightCharge                       ; NO, Bit OFF - Jump
        test    ch,HDD_STATE                          ; HDD On?
        jne     FastChargeHDDOn                       ; Yes, Bit ON - jump
        mov     cl,FAST_HDDOFF_C4                     ; Fast Discharge rate
        mov     bl,FAST_HDDOFF_C4MUL                  ; Fast Discharge rate [5.10]
        jmp     CurrentACAll
FastChargeHDDOn:
        mov     cl,FAST_HDDON_C4                      ; Yes, Bit ON - jump
        mov     bl,FAST_HDDOFF_C4MUL                  ; Fast Discharge rate
        jmp     short CurrentACAll                    ; Fast Discharge rate
SuspendCharge:
        test    ch,HDD_STATE
        jne     GetSuspendChargeHDDOn                 ; HDD On?
        mov     cl,SUSPEND_HDDOFF_C4                  ; Yes, Bit ON - jump
        mov     bl,SUSPEND_HDDOFF_C4MUL
        jmp     short CurrentACAll
GetSuspendChargeHDDOn:
        mov     cl,SUSPEND_HDDON_C4                   ;
        mov     bl,SUSPEND_HDDON_C4MUL
        jmp     short CurrentACAll                    ;

BacklightCharge:
        test    ch,HDD_STATE
        jne     GetBacklightChargeHDDOn               ; HDD On?
        mov     cl,BACKLIGHT_HDDOFF_C4                ; Yes, Bit ON - jump
        mov     bl,BACKLIGHT_HDDOFF_C4MUL
        jmp     short CurrentACAll
GetBacklightChargeHDDOn:
        mov     cl,BACKLIGHT_HDDON_C4
        mov     bl,BACKLIGHT_HDDON_C4MUL
```

```
        jmp      short C. .entACAll

 APMBacklightCharge:
        test     ch,HDD_STATE                          ; HDD On?
        jne   APMGetBacklightChargeHDDOn               ; Yes, Bit ON - jump
        mov      cl,APMBACKLIGHT_HDDON_C4
        mov      bl,APMBACKLIGHT_HDDOFF_C4MUL
        jmp      short CurrentACAll
 APMGetBacklightChargeHDDOn:
        mov      cl,APMBACKLIGHT_HDDON_C4
        mov      bl,APMBACKLIGHT_HDDON_C4MUL
        jmp      short CurrentACAll

 APMCharge:

        test     ch,BACKLIGHT_STATE                    ; Backlight ON?
        je       APMBacklightCharge                    ; NO, Bit OFF - Jump

        test     ch,HDD_STATE                          ; HDD On?
        jne      APMChargeHddOn                        ; Yes, Bit ON - jump
        mov      cl,APM_HDDOFF_C4                      ; HDD Off
        mov      bl,APM_HDDOFF_C4MUL
        jmp      short CurrentACAll
 APMChargeHddOn:
        mov      cl,APM_HDDON_C4                       ; Yes, Bit ON - jump
        mov      bl,APM_HDDON_C4MUL                    ; HDD Off
 ;
 ;      Fall Thru
 ;
 CurrentAcAll:
 ;
 ;      Input:  cl = Divisor  bl = Multiplier
 ;
        push     cx                                    ; Save it

 ;[6.00cl]

        test     byte ptr cs:exp_parms,EXP_BUS_ACTIVE
        jnz      StartSlowCharge
 ;[7.00.46]
        test     byte ptr cs:MicroDockStatus,86h
        jz       StartSlowCharge                       ; MicroDock Installed
        test     byte ptr cs:DockStatus,86h
        jz       StartSlowCharge                       ; Dockingstation Installed
 ;[7.00.46]

 ;[6.00cl]

 ;
 ;      Test for 90% threshold to move to trickle charge while on line
 ;
        mov      cl,APMThisBatteryRuntime              ; [5.10.12] current charge
        mov      al,APMMaxBatLowerLimit                ; 90% lower limit
        xor      ah,ah
        xor      ch,ch
        cmp      ax,cx                                 ; 16 bit compare needed
        jg       KeepFastChargeActive

 ;[6.00cl]
 StartSlowCharge:
```

```
;[6.00cl]

        pop     cx
        mov     cl,TRICKLE_C4
        mov     bl,TRICKLE_C4MUL
        push    cx
KeepFastChargeActive:
        pop     cx                                  ; [5.10.12]
        mov     CurrentDivisor,cl
        mov     CurrentMul,bl                       ; [5.10.1]
                                                    ; [5.10.1]
        mov     ax,SystemRunTime
        mov     ch,ah                               ; Backlight Off Operation
        xor     ah,ah
        div     cl                                  ; Setup Divide
        mov     cl,ah                               ; AH=Remainder AL=Integer Minute
        mov     SystemRunTime,cx
;                                                   ; Updated; Al=minutes
;       Can we add the values and not get into trouble?
;
        xor     ah,ah
        mul     bl                                  ; force 16 bits operation
        mov     cl,APMThisBatteryRuntime            ; [5.10.1] Multiplier
        xor     ah,ah
        xor     ch,ch
        add     ax,cx
        mov     cl,APMaxbatRuntime                  ; ax -= new totals
        xor     ch,ch                               ; The maximun allowed
        cmp     ax,cx
        jl      SubAc                               ; Can we add correctly?
        mov     ax,cx                               ; Yep
SubAc:                                              ; Nop, Replace with max value.
        mov     APMThisBatteryRuntime,al
;                                                   ; New value updated
;       We are currently on AC; Was the Last Interrupt on AC?
;
        mov     cx,SystemRunTime
        and     ch,SESSION_STATUS                   ; ch = Flags for Current Session
        cmp     ch,SESSION_STATUS
        jne     StillOnAC                           ; if equal last on battery
;                                                   ; Still on AC, we are okay.
;       We must now recalcuate our parameters: Session Change
;
        mov     cx,SystemRunTime
        mov     cl,0                                ; We are on AC, reset
        and     ch,NOT SESSION_STATUS               ; Zero Out the Current Value
        mov     SystemRunTime,cx                    ; Mask for AC oper
StillOnAC:                                          ; Reset Session Status
        mov     BYTE PTR [Battery_Is_Low],   0      ; Need to reset/update Low Bat
        mov     BatteryLowRunTime,0                 ; No batt low
        jmp     UpdateCMOS                          ; Number of minutes Low
;                                                   ; Update CMOS and Exit
;       Battery Operation Subfunction start here
;
FastDischargeHDDOn:
        mov     cl,FAST_HDDON_DC4                   ; Yes, Bit ON - jump
        mov     bl,FAST_HDDON_DC4MUL                ; Fast Discharge rate
        mov     ch,FAST_HDDON_DC4LB
        mov     bh,FAST_HDDON_DC4MULLB              ; Fast Discharge rate
        jmp     CurrentBatteryAll
```

```
SuspendDischarge:
        test    ch,HDD_STATE                    ; HDD On?
        jne     GetSuspendDischargeHDDOn        ; Yes, Bit ON - jump
        mov     cl,SUSPEND_HDDOFF_DC4
        mov     bl,SUSPEND_HDDOFF_DC4MUL
        mov     ch,SUSPEND_HDDOFF_DC4LB
        mov     bh,SUSPEND_HDDOFF_DC4MULLB
        jmp     CurrentBatteryAll

;
;       Battery Operation CODE STARTS HERE
;
RuningCurrentSystemBattery:

;
;       Caculate last usage on Battery power
;

        mov     cx,SystemRunTime                ; Total run time this session
        mov     OldState,ch                     ; [5.10.1]
        test    ch,SUSPEND_STATE                ; Are we in Suspend State?
        jne     SuspendDischarge                ; Bit On - Jump
        test    ch,APM_STATE                    ;
        jne     APMDischarge                    ; Yes, Bit On - Jump
        test    ch,BACKLIGHT_STATE              ; Backlight ON?
        je      BacklightDischarge              ; NO, Bit OFF - Jump
        test    ch,HDD_STATE                    ; HDD On?
        jne     FastDischargeHDDOn              ; Yes, Bit ON - jump
        mov     cl,FAST_HDDOFF_DC4              ; Fast Discharge rate
        mov     bl,FAST_HDDOFF_DC4MUL
        mov     ch,FAST_HDDOFF_DC4LB  ; Fast Discharge rate
        mov     bh,FAST_HDDOFF_DC4MULLB;
        jmp     CurrentBatteryAll

APMDischarge:

        test    ch,BACKLIGHT_STATE              ; Backlight ON?
        je      APMBacklightDischarge           ; [5.10.7]  NO, Bit Off -Jump
        test    ch,HDD_STATE                    ; HDD On?
        jne     APMDischargeHddOn               ; Yes, Bit ON - jump
        mov     cl,APM_HDDOFF_DC4               ; HDD Off
        mov     bl,APM_HDDOFF_DC4MUL
        mov     ch,APM_HDDOFF_DC4LB
        mov     bh,APM_HDDOFF_DC4MULLB
        jmp     CurrentBatteryAll

GetSuspendDischargeHDDOn:
        mov     cl,SUSPEND_HDDON_DC4
        mov     bl,SUSPEND_HDDON_DC4MUL
        mov     ch,SUSPEND_HDDON_DC4LB
        mov     bh,SUSPEND_HDDON_DC4MULLB
        jmp     short CurrentBatteryAll         ;

APMDischargeHddOn:                              ; Yes, Bit ON - jump
        mov     cl,APM_HDDON_DC4                ; HDD Off
        mov     bl,APM_HDDON_DC4MUL
        mov     ch,APM_HDDON_DC4LB
        mov     bh,APM_HDDON_DC4MULLB
        jmp     short CurrentBatteryAll         ;
```

```
BacklightDischarge:
        test    ch,HDD_STATE                        ; HDD On?
        jne     GetBacklightDischargeHDDOn          ; Yes, Bit ON - jump
        mov     cl,BACKLIGHT_HDDOFF_DC4
        mov     bl,BACKLIGHT_HDDOFF_DC4MUL
        mov     ch,BACKLIGHT_HDDOFF_DC4LB
        mov     bh,BACKLIGHT_HDDOFF_DC4MULLB
        jmp     short CurrentBatteryAll
GetBacklightDischargeHDDOn:
        mov     cl,BACKLIGHT_HDDON_DC4
        mov     bl,BACKLIGHT_HDDON_DC4MUL
        mov     ch,BACKLIGHT_HDDON_DC4LB
        mov     bh,BACKLIGHT_HDDON_DC4MULLB
        jmp     short CurrentBatteryAll

APMBacklightDischarge:
        test    ch,HDD_STATE                        ; HDD On?
        jne  APMGetBacklightDischargeHDDOn          ; Yes, Bit ON - jump
        mov     cl,APMBACKLIGHT_HDDOFF_DC4
        mov     bl,APMBACKLIGHT_HDDOFF_DC4MUL
        mov     ch,APMBACKLIGHT_HDDOFF_DC4LB
        mov     bh,APMBACKLIGHT_HDDOFF_DC4MULLB
        jmp     short CurrentBatteryAll
APMGetBacklightDischargeHDDOn:
        mov     cl,APMBACKLIGHT_HDDON_DC4
        mov     bl,APMBACKLIGHT_HDDON_DC4MUL
        mov     ch,APMBACKLIGHT_HDDON_DC4LB
        mov     bh,APMBACKLIGHT_HDDON_DC4MULLB
        jmp     short CurrentBatteryAll

;
CurrentBatteryAll:
;
;       Input:  cl = Divisor  bl = Multiplier
;       Input:  ch = Divisor  bh = Multiplier  for Low Battery
;
;
;       Have we noticed Low Battery yet?
;
        cmp     BYTE PTR [Battery_Is_Low],0         ; have we noticed batt low ??
        je      DoHighDivMul
        mov     bl,bh                               ; Low Battery Multiplier
        mov     cl,ch                               ; Low Battery Divisor
DoHighDivMul:
        mov     CurrentDivisor,cl
        mov     CurrentMul,bl

        call    BatteryUpdateValues
;
;       We are currently on Battery; Was the Last Interrupt on Battery?
;
        mov     cx,SystemRunTime                    ; ch = Flags for Current Session
        and     ch,SESSION_STATUS
        cmp     ch,SESSION_STATUS                   ; if equal last on battery
        je      UpdateBatteryParms                  ; Still on Battery, we are okay.
;
;       We must now recalcuate our parameters: Session Change
;
        mov     cx,SystemRunTime                    ; We are on AC, reset
```

```
        mov     cl,0
        mov     SystemTime,0                       ; Zero Out the Current Value
        or      ch,SESSION_STATUS                  ; Time on Battery   [5.10.c3]
        and     ch,NOT AUTOFULLDOWNCOUNT           ; Turn on Battery Operation
        mov     SystemRunTime,cx                   ; [5.10.23a]
;                                                  ; Reset Session Status
;                       Time to Do the Low Power Times
;
UpdateBatteryParms:

        BATTERY_TEST_LOW

        jz      xBattery_Is_Low_Port
        cmp     BYTE PTR [Battery_Is_Low],0         ; yep
        je      Battery_Was_High                    ; have we noticed batt low ??
        mov     ax,SystemRunTime                    ; No
        test    ah,SUSPEND_STATE                    ; Look for Suspend/Backlight
        jne     xBattery_Is_Low_Port                ; Do not allow Low Bat Exit
        test    ah,BACKLIGHT_STATE                  ; if Suspend On - Jump
        je      xBattery_Is_Low_Port                ; Dos not allow Low Bat Exit
        jmp     short Battery_Was_Low               ; if Backlight OFF - Jump
xBattery_Is_Low_Port:     JMP Battery_Is_Low_Port  ; yep, clean back up
Battery_Was_High:                                   ; yep
;                                                   ; New Label
;       This is where we need to turn off battery alarms;IFF critlowbat enabled
;
        test    userCritLowBattery,CRIT_LOW_BATTERY_ENABLE_MASK
        je      NoBatteryAlarmTurnOff1             ; Bit Off, Don't touch alarms
;
;       Turn the alarm off - NOW
;
        ALARMOFF

NoBatteryAlarmTurnOff1:
        mov     ax,SystemRunTime
        test    ah,AUTOFULLDOWNCOUNT                ; Look for AutoFull DownCount
        je      xxUpC
                                                    ; Bit Off - Jump
        cmp     al,0
        je      NowTo100                            ; 1 interval passed?
        cmp     al,4
        je      NowTo100
        cmp     al,8
        jl      xxUpC

NowTo100:
        and     ah,NOT AUTOFULLDOWNCOUNT            ;[5.10.23]
        and     ah,NOT LOWBATTERY_STATE
        mov     SystemRuntime,ax                    ; Turn off Low Battery Flag
        mov     al,APMMaxbatRuntime
        mov     APMThisbatteryRuntime,al
        mov     BatteryLowRunTime,0                 ; Reset to FULL!
        mov     cx,SystemTime                       ; Get number of minutes (real)
        xor     ah,ah
        sub     cx,ax
        mov     SystemTime,0
;                                                   ; Zero Last Time
;       UpDate Cmos
;                                                   ; [5.10.c3]
```

```
        mov     ah,Last_ /stem_Time_L
        mov     al,cl                              ; Word to hold Time
        call    BlastCMOS

        mov     ah,Last_System_Time_H
        mov     al,ch                              ; Word to hold Date/Time
        call    BlastCMOS

xxUpC:  jmp     UpDateCMOS
                                                   ; We are finished
Battery_Was_Low:
;
;       This is where we need to turn off battery alarms;IFF critlowbat enabled
;
        test    userCritLowBattery,CRIT_LOW_BATTERY_ENABLE_MASK
        je      NoBatteryAlarmTurnOff           ; Bit Off, Don't touch alarms
;
;       Turn the alarm off - NOW
;

        ALARMOFF

NoBatteryAlarmTurnOff:
        mov     BatteryLowRunTime,0
        mov     BYTE PTR [Battery_Is_Low],0     ; Number of minutes Low
        mov     cx,SystemRunTime                ; we have not noticed low
        and     ch,NOT LOWBATTERY_STATE
        and     ch,NOT AUTOFULLDOWNCOUNT        ; Turn off Low Battery Flag
        mov     SystemRunTime,cx                ; Turn off Auto Full DownCount
xUpCM:  jmp     UpDateCMOS
                                                ; We are finished
Battery_Is_Low_Port:

        mov     cx,SystemRunTime
        or      ch,LOWBATTERY_STATE
        and     ch,NOT AUTOFULLDOWNCOUNT        ; Turn On Low Battery Flag
        mov     SystemRunTime,cx                ; Turn off Auto Full DownCount
;
;       Use first time switch for setting up the new low battery % values
;       [5.10.c2]
;

        cmp     BYTE PTR [Battery_Is_Low],1
        je      BumpRunTime                     ; have noticed batt low
        mov     BYTE PTR [Battery_Is_Low],1     ; Yes we have
        cmp     cl,0                            ; have noticed batt low
        je      SetLimitAdjustment              ;
        jmp     short SetLimit2Adjustment
BumpRunTime:
        cmp     cl,0                            ; [5.10.c4]
        jne     xUpCM                           ;
;                                               ; no update needed
; [5.10.c9] Need to compute, not bump values
;
        mov     cl,CurrentMul
        add     BatteryLowRunTime,cl            ; [5.10.c9]
                                                ; Number of minutes Low
        mov     al,APMLowBatRuntime
        mov     cl,BatteryLowRunTime            ; [5.10.c5]
        xor     ah,ah                           ;
                                                ;
```

```
        xor     ch,ch                               ;
        cmp     ax,cx                               ;
        jg      NoLowerLimitAdjustment              ; APMLowBatRuntime >current
        mov     APMLowBatRuntime,cl                 ; Now the same  [5.10.c5]
        jmp     short NoLowerLimitAdjustment        ; UpDateCMOS  - Not time yet

SetLimitAdjustment:
        inc     BatteryLowRunTime                   ; Number of minutes Low
SetLimit2Adjustment:

        mov     al,APMLowBatRuntime
        xor     ah,ah
        mov     cl,APMThisBatteryRunTime            ; Old Capacity
        mov     APMThisBatteryRunTime,al            ; New Capacity
        xor     ch,ch                               ; Ready to adjust for lower limit
        cmp     cx,ax                               ; Old less than new
        jl      NoLowerLimitAdjustment              ; Yep, jump
        sub     cx,ax                               ; delta of old vs.new
        mov     al,APMMaxbatRuntime                 ; Max can hold
        xor     ah,ah
        sub     ax,cx                               ; New low limit
        mov     cl,APMMaxBatLowerLimit              ; Lowest available
        xor     ch,ch
        cmp     cx,ax                               ; Is lower limit under new one
        jl      LowerLimitAdjustment                ; Yes, valid override of newone
        mov     ax,cx                               ; User lower Limit
LowerLimitAdjustment:
        mov     APMMaxbatRuntime,al                 ; New Max Limit
NoLowerLimitAdjustment:
;
;       This is where we need to turn on the battery alarms
;

        mov     al,APMCritLowMinutes
        cmp     al,BatteryLowRunTime
        jg      NoBatteryAlarmYet

;
;       Does User Want Critical Low Battery Warning?
;
        test    userCritLowBattery,CRIT_LOW_BATTERY_ENABLE_MASK
        je      NoBatteryAlarmYet                   ; Bit Off, Don't touch alarms
;
;       Does User Have Low Battery Alarms Enabled
;
;
;       [6.00.t5] Deleted requirement to look at CMOS user selection for this opt
;       [6.00d]   Added it back, but used location current_battery_state rather
;                 than ES: [TI_ALARM]
;
        TEST    BYTE PTR CS:current_battery_state,1
        je      NoBatteryAlarmYet                   ; Bit Off, does not want alarm

        TEST    BYTE PTR UserTerminated,1           ; User stopped it?
        jne     NoBatteryAlarmYet                   ; Yes he did-BIT ON

        ALARMON

NoBatteryAlarmYet:
```

```
        mov     cl,Batte-,LowRunTime               ; Get number of minutes (real)
;
;       Do We need to bump up LowbatRuntime based on current value?
;
        mov     al,APMLowbatRuntime                ; Real index
        cmp     al,cl                              ; Is the Low too Low?
        jg      UpDateCMOS                         ; Okay
        mov     APMLowbatRuntime,cl                ; New Values
UpDateCMOS:
;
;       Load up Values
;
        mov     cx,SystemRunTime
;
;       Is APM State ON?
;
        and     ch, NOT APM_STATE
        mov     ax,sleep_tick_count                ; Number of Sleep ticks
        add     ax,apm_tick_count
        mov     sleep_tick_count,0
        mov     apm_tick_count,0
        cmp     ax,APMMAGICSTATECOUNT
        jl      APMStateLogged
LogAPMState:

        or      ch, APM_STATE

APMStateLogged:
;
;
;       Are we currently within a sleep period?  If so, the STBY LED will
;       be set within the BIOS RAM area.
;
        IN_STANDBY
        jz      NotInStandby                       ; Not in standby/Suspend

        TEST    byte    ptr view,BUSY_FLAG
        jne     NotInStandby                       ; VIEW Mode Active/Can'tSusp

        TEST    byte    ptr debug,BUSY_FLAG
        jne     NotInStandby                       ; DEBUG Mode Active/Can'tSusp
;
;       We are in AutoSuspend Mode now
;
        or      ch,SUSPEND_STATE                   ; Turn on Bit
        jmp     short BacklightStateCheck          ; Check for Backlight state
NotInStandby:

        and     ch,NOT SUSPEND_STATE               ;

        jmp     short BacklightStateCheck          ; Check for Backlight state

BacklightStateCheck:                               ; Check for Backlight state
        or      ch,BACKLIGHT_STATE

;
;       Is the Backlight Off                       ?
```

```
;
        in      al,0e0h                             ; Backlight Port
        TEST    al,20h
        jnz     HDDStateCheck                       ; Check for HDD ON
;
        and     ch,NOT BACKLIGHT_STATE              ; Yes - In power Savings
        jmp     HDDStateCheck
HDDStateCheck:

        mov     DiskWritesCount,1                   ; Bump Count
        or      ch,HDD_STATE                        ; Turn it on
;[6.00cl]
        cmp     Disk32BitAccess,0                   ; Fast Disk on?
        jne     ExitBatteryInterrupt                ; Assumes disk is on
;[6.00cl]
        mov     dx,3f6h                             ; Alternate Status Register
        in      al,dx                               ; Read it
        and     al,88h                              ; busy flag
        cmp     al,0                                ; are we busy?
        jne     ExitBatteryInterrupt                ; Yes, disk up
        mov     DiskWritesCount,0                   ; Bump Count
;
;       Is the disk spining?
;
ExitDiskStatusLoop:
        MACHINE_TEST
        je      DiskOn386
;
;       Turn off Activity Monitor: Disk
;
        in      al,0E3h                             ; Get and save current setting
        push    ax
        and     al,0BFh
        out     0E3h,al

DiskOn386:

        mov     dx,1f2h                             ; Read Key regs
        in      al,dx
        push    ax
        inc     dx                                  ; 1f3
        in      al,dx
        push    ax
        inc     dx                                  ; 1f4
        in      al,dx
        push    ax
        inc     dx                                  ; 1f5
        in      al,dx
        push    ax
        inc     dx                                  ; 1f6
        in      al,dx
        push    ax

        mov     dx,DISK_COMMAND                     ; Get command register
        mov     al,DISK_STATUS                      ; Want current status
        out     dx,al                               ;

        mov     dx,3f6h                             ; Alternate Status Register
DiskStatusWait:
        in      al,dx                               ; Read it
```

```
        and     al,80h                  ; busy flag
        cmp     al,80h                  ; are we busy?
        je      DiskStatusWait

        mov     dx,SECTOR_REG           ; sector count register
        in      al,dx                   ; Request power status
        cmp     al,DISK_DOWN            ; Still spinning?
        je      ExitDiskDown
        jmp     short ExitDiskUp        ; Yep, keep going
ExitDiskDown:
;
;       Set Disk down flag
;

        and     ch,NOT HDD_STATE        ; Turn it on
ExitDiskUp:
        mov     dx,1f6h                 ; Read Key regs
        pop     ax
        out     dx,al                   ; 1f6
        pop     ax
        dec     dx
        out     dx,al                   ; 1f5
        pop     ax
        dec     dx
        out     dx,al                   ; 1f4
        pop     ax
        dec     dx
        out     dx,al                   ; 1f3
        pop     ax
        dec     dx
        out     dx,al                   ;1f2

        MACHINE_TEST
        je      ExitBatteryInterrupt            ; DiskOn386
;
;       Restore old Activity Monitor: Disk setting
;
        pop     ax
        out     0E3h,al

;
;       Fall Thru
;
ExitBatteryInterrupt:
;
;       Save States
;
        mov     SystemRunTime,cx
;
;       Any STATE Change Since Last Capture?
;
        mov     ah,OldState
        and     ah,11111110b            ; Kill Roll Over Bit
        and     ch,11111110b            ; Kill Roll Over Bit
        cmp     ah,ch
        je      WriteCMOSData
        cmp     cl,0
        je      WriteCMOSData           ; not this time
```

```
;
;       Get Last Divisor and Mulipler               ; for remainders only
;
;       Updated Equation on State Change 5.10.23 [5-22-92]
;
;       Equation:  x = SystemRunTime * CurrentMul
;                  NewCurrentMul = x / CurrentDiv
;                  CurrentDiv=SystemRunTime
;

;       Equation:  x = SystemRunTime * CurrentMul
        mov     al,cl
        mov     bl,CurrentMul                   ;[5.10.23]  SystemRunTime
        xor     ah,ah                           ;[5.10.23]  CurrentMul
        mul     bl
;                                               ;[5.10.23]  ax = x
;
;                  NewCurrentMul = x / CurrentDiv

        mov     bl,CurrentDivisor
        div     bl
        cmp     ah,50                           ; SystemTime/CurrentMul
        jl      HaveStateChangeValue
        inc     al
HaveStateChangeValue:                           ; bump it up - new MUL

        mov     bl,al
;                                               ; new CurrentMul
;                                               ; c;= CurrentDiv
;       New Divisor will be the contents SystemRunTime
;       New Muliplier will be the dividen of SystemTime / Current Mul
;
;
;       Test for either AC or Battery Update Status
;

        BATTERY_TEST
        jne     WriteCMOSData
        mov     DebugFiller2,bl
        mov     DebugFiller3,cl
        call    BatteryUpdateValues

WriteCMOSData:
;
;       Output Data to CMOS
;       -> Set WRite in Progress Flags
;

        mov     cx,SystemRunTime
        mov     ah,APM_FLAGS_CURRENT            ; Total run time this session
        mov     al,ch                           ; Byte to hold Flags/RunTime
        call    BlastCMOS

        mov     ah,SYSTEM_RUN_TIME
        mov     al,cl                           ; Byte to hold Flags/RunTime
        call    BlastCMOS                       ; get it


        mov     ch,APMLowbatRuntime
        mov     cl,APMThisBatteryRuntime        ; Total run time this session

        mov     ah,APM_FLAGS_LAST               ; Byte to hold Flags
```

```
        mov     al,ch
        call    BlastCMOS                          ; get it

        mov     ah,APM_THISBAT_RUNTIME
        mov     al,cl                              ; Byte to hold RunTime
        call    BlastCMOS                          ; get it

        mov     ah,APM_MAXBAT_RUNTIME
        mov     al,APMMaxbatRuntime                ; How long a new battery has to
        call    BlastCMOS                          ; get it

        mov     ah,BATTERY_LOW_RUN_TIME
        mov     al,BatteryLowRunTime               ; CMOS Location to save it.
        call    BlastCMOS                          ; Get number of minutes (real)

;
;       15 14 13 12 11 10 9 8 7 6 5 4 3 2 1 0
;       |  |  |  |  |  | | | | | + + + + + +   ; Minutes 0 - 59
;       |  |  |  |  |  + + + + + ---------------; Hours 0 -23
;       +  +  +  +  +  -------------------------; Day 1 - 31
;
        inc     DateTimeStamp                      ; Bump Minute, let rollover bits
;
;       Write New DateTimeStamp From CMOS
;

        mov     ah,DATE_TIME_STAMP_LSB
        mov     cx,DateTimeStamp                   ; Word to hold Date/Time
        mov     al,cl
        call    BlastCMOS

        mov     ah,DATE_TIME_STAMP_MSB
        mov     al,ch                              ; Word to hold Date/Time
        call    BlastCMOS

        BATTERY_TEST
        jne     UpDateCMOSCompleted                ;[5.10.c3]

        mov     ah,System_Time_L
        mov     cx,SystemTime                      ; Word to hold Time
        mov     al,cl
        call    BlastCMOS

        mov     ah,System_Time_H
        mov     al,ch                              ; Word to hold Date/Time
        call    BlastCMOS

UpDateCMOSCompleted:

timer_exit:
        pop     es
        pop     ds
        popa
        popf
        jmp     cs:dword ptr ipc_timer             ; do other chained timer routines
timer_interrupt         endp

BatteryUpdateValues     proc    near

;
```

```
;       Enter:  cl = Di..sor
;               bl = multipler
;
        mov     ax,SystemRunTime
        mov     ch,ah                           ; Backlight Off Operation
        xor     ah,ah
        div     cl                              ; Setup Divide
        mov     cl,ah                           ; AH=Remainder AL=Integer Minute
        mov     SystemRunTime,cx
;                                               ; Updated; Al=minutes
;       Can we add the values and not get into trouble?
;
        xor     ah,ah
        mul     bl                              ; force 16 bits operation
        mov     cl,APMThisBatteryRuntime        ; [5.10.1] Multiplier
        xor     ch,ch
        sub     cx,ax
        mov     DebugFiller1,al                 ; cx -= new totals
        cmp     cx,0
        jg      AddBat
        mov     cx,0                            ; Can do it
                                                ; Nothing Left

AddBat:
        mov     APMThisBatteryRuntime,cl
        cmp     cx,0                            ; New values left
        jg      SubCalLowBatteryParms           ; Any left?
                                                ; Nop

        mov     cl,APMMaxbatRuntime
        xor     ch,ch                           ; The maximun allowed
        add     cx,ax
        mov     al,APMMaxBatteryLimit           ; New value
        xor     ah,ah
        cmp     cx,ax
        jl      AddBat2                         ; New vs. Limit
        mov     cx,ax
AddBat2:                                        ; Upper Limit
        mov     APMMaxbatRuntime,cl
;
;       Fall Thru
;
SubCalLowBatteryParms:
        ret
;
;       Enter with:  Ah=CMOS Location to write
;                    Al=CMOS Value to Write
;
BlastCMOS       proc    near
        push    ax
;                                               ; Save both CMOS Loc and Value
;       Write Garbage Character
;
        mov     al,APM_SIGNATURE
        out     CMOS_AD,al                      ; Byte to hold Write Flag
        mov     al,GFLAG                        ; Output it to CMOS
        out     CMOS_DT,al
                                                ; No Valid Data
        mov     al,APM_SIGNATURE2
        out     CMOS_AD,al                      ; Data Holder
                                                ; Output it to CMOS
```

```
        pop     ax
        out     CMOS_DT,al                          ; Valid Data - Recovery data

        push    ax
        mov     al,ah
        out     CMOS_AD,al                          ; Location to write data
        pop     ax                                  ; Output it to CMOS
        out     CMOS_DT,al
;                                                   ; Valid Data - Orginal data
;       Restore ChechSums
;

        mov     al,APM_SIGNATURE
        out     CMOS_AD,al                          ; Byte to hold Write Flag
        mov     al,GFLAG                            ; Output it to CMOS
        out     CMOS_DT,al
;                                                   ; No Valid Data
;
;
        ret

BlastCMOS       endp
;[7.00]
DockSuspendEnd  proc near
        pushf
        push ax
        cmp  cs:DockSuspendBusy,BUSY_FLAG
        je   DockSuspendSkip
        mov  cs:DockSuspendBusy,BUSY_FLAG
        pushf
        call    cs:dword ptr ipc_i77
        mov  byte ptr cs:resume_type,0               ; clr POWERON
        mov  cs:DockSuspendBusy,NOT_BUSY_FLAG
DockSuspendSkip:
        pop  ax
        popf
        iret
DockSuspendBusy  db  NOT_BUSY_FLAG
DockSuspendEnd  endp
;[7.00]
BatteryUpdateValues     endp
```

```
;===========================================================================
;FILE=BW_4013.ASM
;Vaughn Watts 3/10/92
;---------------------------------------------------------------------------
; CODED    4.1.3  Get/Set Battery Status
;      Entry:  AH = 46
;              AL = 03
;              BH = 00h, Set Battery Count
;              BH = 01h, Set Battery Level
;              BH = 02h, Set Low Battery Warning Time
;              BH = 03h, Set Critical Low Battery Warning Enable
;              BH = 04h, Set Battery Auto Full Enable
;              BH = 05h, Set View Mode
;              BH = 06h, Set Normalized Full Battery Indication Number
;              BH = 07h, Set Auto Zoom Enable
;              BH = 08h, Set RAM Power Level Only
;              BH = 09h, Set System Time
;
;              BH = 0Fh, Set/Reset Defaults
;
;
;              BH = 80h, Get Battery Count
;              BH = 81h, Get Battery Level
;              BH = 82h, Get Low Battery Warning Time
;              BH = 83h, Get Critical Low Battery Warning Time
;              BH = 84h, Get Battery Auto Full Enable
;              BH = 85h, Get View Mode
;              BH = 86h, Get Normalized Full Battery Indication Number
;              BH = 87h, Get Auto Zoom Enable
;              BH = 88h, Get RAM Power Level Only
;              BH = 89h, Get System Time
;
;---------------------CALLING Parameters--------------------------
; CALL with BH = BATTERY PARAMETER            RETURN with BL=Return Parameter
;
;    BH = 00h, Set Battery Count              # Of Batteries (0, 1, 2, ...)
;    BH = 01h, Set Battery Level %            0 - 100, 1-Inc  [255] = Unknown
;    BH = 02h, Set Low Battery Warning        0 -  10, 1-Inc       [5.04]
;              Time                           0=0%, 1=10%, 2=20%..10=100%
;    BH = 03h, Set Critical Low Battery       0 = Disabled    1 = Enabled
;              Warning Enable
;    BH = 04h, Set Battery Auto Full Enable   0 = Disabled    1 = Enabled
;    BH = 05h, Set View Mode                  0 = Disabled    1 = Enabled
;    BH = 06h, Set Normalized Full Battery    0 - 255, 1-Inc
;              Indication Number
;    BH = 07h, Set Auto Zoom Enable           0 = Disabled    1 = Enabled
;    BH = 08h, Set RAM Power Level Only       Power Level in BL <=Max
;    BH = 09h, Set System Time                BL= 0 Valid CX for Time
;
;    BH = 0Fh, Set/Reset Defaults             0
;
;    BH = 80h, Get Battery Count              # Of Batteries (0, 1, 2, ...)
;    BH = 81h, Get Battery Level %            0 - 100, 1-Inc  [255] = Unknown
;    BH = 82h, Get Low Battery Warning        0 -  10, 1-Inc       [5.04]
;              Time                           0=0%, 1=10%, 2=20%..10=100%
;    BH = 83h, Get Critical Low Battery       0 = Disabled    1 = Enabled
;              Warning Enable
;    BH = 84h, Get Battery Auto Full Enable   0 = Disabled    1 = Enabled
;    BH = 85h, Get View Mode                  0 = Disabled    1 = Enabled
;    BH = 86h, Get Normalized Full Battery    0 - 255, 1-Inc
```

```
;                  Indica..ion Number
;     BH = 87h, Get Auto Zoom Enable              0 = Disabled   1 = Enabled
;     BH = 88h, Get RAM Power Level Only          BL=PowerLevel <= Max
;     BH = 89h, Get System Time                   BL= 0 Valid CX for Time =1 Bad
;
;       Exit:
;                  BL - RETURN Parmeter if CY Not Set
;                  CY - Set on error
;;;;;;;;;;;;;;;;;;;;;;;;;;;;;;;;;;;;;;;
;
;                                          New Code Here
GetRAMPowerLevel:
        mov     bh,MAXIMUM_LEVEL                ; max standby level
        mov     bl,cs:power_level         ; currently set level
        xor     ah,ah                     ; clear carry
        clc
        ret
SetRAMPowerLevel:
        mov     cs:power_level,bl         ; currently set level
        xor     ah,ah                     ; clear carry
        clc
        ret
;;;;;;;;;;;;;;;;;;;;;;;;;;;;;;;;;;;;;;;
x_SetBatteryCount:                jmp     SetBatteryCount
x_GetBatteryCount:                jmp     GetBatteryCount
x_SetBatteryLevelPercent:         jmp     SetBatteryLevelPercent
;;;;;;;;;;;;;;;;;;;;;;;;;;;;;;;;;;;;;;;
GetBatteryStatus   proc    near
;
        cmp     bh,08
        je      SetRAMPowerLevel
        cmp     bh,88h
        je      GetRAMPowerLevel
        cmp     bh,0
        je      x_SetBatteryCount
        cmp     bh,80h
        je      x_GetBatteryCount
        cmp     bh,1
        je      x_SetBatteryLevelPercent
        cmp     bh,81h
        je      x_GetBatteryLevelPercent
        cmp     bh,02
        je      x_SetLowBatteryWarningTime
        cmp     bh,82h
        je      x_GetLowBatteryWarningTime
        cmp     bh,03
        je      x_SetCriticalLowBatteryWarningEnable
        cmp     bh,83h
        je      x_GetCriticalLowBatteryWarningEnable
        cmp     bh,04
        je      x_SetBatteryAutoFullEnable
        cmp     bh,84h
        je      x_GetBatteryAutoFullEnable
        cmp     bh,05
        je      x_SetViewMode
        cmp     bh,85h
        je      x_GetViewMode
        cmp     bh,06
        je      x_SetNormalizedFullBatteryNumber
        cmp     bh,86h
```

```
        je      x_GetNormalizedFullBatteryNumber
        cmp     bh,07h
        je      x_SetAutoZoomEnable
        cmp     bh,87h
        je      x_GetAutoZoomEnable
        cmp     bh,0fh
        je      x_SetResetDefaultsAPM
        cmp     bh,89h
        je      x_GetSystemTime
        cmp     bh,09h
        je      x_SetSystemTime
        mov     ah,86h
        stc                                     ; Bad RETURN
        ret
;------------------------------------------------------------------------
x_SetAutoZoomEnable:                    jmp     SetAutoZoomEnable
x_GetAutoZoomEnable:                    jmp     GetAutoZoomEnable
x_GetBatteryLevelPercent:               jmp     GetBatteryLevelPercent
x_SetLowBatteryWarningTime:             jmp     SetLowBatteryWarningTime
x_GetLowBatteryWarningTime:             jmp     GetLowBatteryWarningTime
x_SetCriticalLowBatteryWarningEnable: jmp SetCriticalLowBatteryWarningEnable
x_GetCriticalLowBatteryWarningEnable: jmp GetCriticalLowBatteryWarningEnable
x_SetBatteryAutoFullEnable:             jmp     SetBatteryAutoFullEnable
x_GetBatteryAutoFullEnable:             jmp     GetBatteryAutoFullEnable
x_SetViewMode:                          jmp     SetViewMode
x_GetViewMode:                          jmp     GetViewMode
x_SetNormalizedFullBatteryNumber:   jmp     SetNormalizedFullBatteryNumber
x_GetNormalizedFullBatteryNumber:   jmp     GetNormalizedFullBatteryNumber
x_SetResetDefaultsAPM:                  jmp     SetResetDefaultsAPM
x_GetSystemTime:                        jmp     GetSystemTime
x_SetSystemTime:                        jmp     SetSystemTime
;------------------------------------------------------------------------
SetBatteryCount:
;
;       BH = 00h, Set Battery Count             # Of Batteries (0, 1, 2, ...)
;
        mov     bl,1
bw4013GoodReturn:
        clc
        ret
GetBatteryCount:
;
;       BH = 80h, Get Battery Count             # Of Batteries (0, 1, 2, ...)
;
        jmp     short SetBatteryCount

SetBatteryLevelPercent:
;
;       BH = 01h, Set Battery Level %           0 - 100, 1-Inc  [255] = Unknown
;
        cmp     bl,100
        jl      NoOverFlowOnSet
        mov     bl,100
NoOverFlowOnSet:
        push    ax                              ; Save registers
        push    cx
        mov     al,cs:APMMaxbatRuntime          ; Max Available Normalized
        xor     ah,ah
        mul     bl                              ; Get Percent Normalized (AL)
```

```
        div     cs:ONEHUNDRED
        cmp     ah,50
        jl      SetNoRoundLevel
        inc     al
SetNoRoundLevel:
        mov     cs:APMThisBatteryRuntime,al       ; Now normalized
        mov     bl,al
        pushf
        CLI
        mov     al,APM_THISBAT_RUNTIME            ; Byte to hold RunTime
        out     CMOS_AD,al                        ; Output it to CMOS
        mov     al,bl                             ; get it
        out     CMOS_DT,al                        ; and store it
        popf
        pop     cx
        pop     ax
        jmp     short bw4013GoodReturn

GetBatteryLevelPercent:
;
;       BH = 81h, Get Battery Level %             0 - 100, 1-Inc  [255] = Unknown
;
        push    ax                                ; Save registers
        mov     al,cs:APMThisBatteryRuntime
        mov     bl,cs:APMMaxbatRuntime
        cmp     bl,0                                      ; ? BatteryLife
        jne     BW4013DividZero1
        mov     bl,1
BW4013DividZero1:
        xor     ah,ah
        push    bx
        mov     bl,100
        mul     bl
        pop     bx
        div     bl
        mov     bl,al                                     ; AH= Remainder
        cmp     ah,50
        jl      GetNoRoundLevel
        inc     bl
GetNoRoundLevel:
        pop     ax
        jmp     short bw4013GoodReturn

;=====================================================================

;=====================================================================
SetLowBatteryWarningTime:
;
;       BH = 02h, Set Low Battery Warning         0 -  15, 1-Inc
;                 Time
;
        push    ax
        cmp     bl,10
        jl      SetLowBWTOkay
        mov     bl,10
SetLowBWTOkay:                                    ; 100% Max.
        mov     al,cs:userCritLowBattery
        and     al,NOT USER_CRIT_LOW_BATTERY_MASK
        and     bl,USER_CRIT_LOW_BATTERY_MASK
        or      bl,al
```

```
        mov     cs:userCritLowBattery,bl

        CRITICAL_WARNING
;
;       Update CMOS
;
        pushf
        cli
        mov     al,USER_CRIT_LOW_BATTERY
        out     CMOS_AD,al                      ; Output it to CMOS
        mov     al,bl                           ; get it
        out     CMOS_DT,al                      ; and store it
        popf
        pop     ax
        jmp     bw4013GoodReturn

GetLowBatteryWarningTime:
;
;     BH = 82h, Get Low Battery Warning         0 -  15, 1-Inc
;               Time
;
        mov     bl,cs:userCritLowBattery
        and     bl,USER_CRIT_LOW_BATTERY_MASK
        jmp     bw4013GoodReturn
SetCriticalLowBatteryWarningEnable:
;
;     BH = 03h, Set Critical Low Battery        0 = Disabled   1 = Enabled
;               Warning Enable
;
        push    ax
        mov     al,cs:userCritLowBattery
        and     al,NOT CRIT_LOW_BATTERY_ENABLE_MASK      ; Maske Turned off
        cmp     bl,0
        je      SetCriticalLowBatteryWarn0
        or      al, CRIT_LOW_BATTERY_ENABLE_MASK
SetCriticalLowBatteryWarn0:
        mov     cs:userCritLowBattery,al
        mov     bl,al
        pop     ax
        jmp     SetLowBatteryWarningTime

GetCriticalLowBatteryWarningEnable:
;
;     BH = 83h, Get Critical Low Battery        0 = Disabled   1 = Enabled
;               Warning Enable
;
        mov     bl,cs:userCritLowBattery
        and     bl,CRIT_LOW_BATTERY_ENABLE_MASK     ; Mask Turned off
        cmp     bl,0
        je      GetCriticalLowBatteryWarn0
        mov     bl,1
GetCriticalLowBatteryWarn0:
        jmp     bw4013GoodReturn

SetBatteryAutoFullEnable:
;
;     BH = 04h, Set Battery Auto Full Enable   0 = Disabled   1 = Enabled
;
        push    ax
        mov     al,cs:userCritLowBattery
```

```
        and     al,NOT BATTERY_AUTO_FULL_MASK       ; Mask Turned off
        cmp     bl,0
        je      SetBatteryAutoFull0
        or      al, BATTERY_AUTO_FULL_MASK
SetBatteryAutoFull0:
        mov     cs:userCritLowBattery,al
        mov     bl,al
        pop     ax
        jmp     SetLowBatteryWarningTime

GetBatteryAutoFullEnable:
;
;       BH = 84h, Get Battery Auto Full Enable    0 = Disabled    1 = Enabled
;

        mov     bl,cs:userCritLowBattery
        and     bl,BATTERY_AUTO_FULL_MASK           ; Mask Turned off
        cmp     bl,0
        je      GetBatteryAutoFull0
        mov     bl,1
GetBatteryAutoFull0:
        jmp     bw4013GoodReturn

SetViewMode:
;
;       BH = 05h, Set View Mode                    0 = Disabled    1 = Enabled
;
        cmp     bl,0
        je      SetViewMode0
        mov     bl,BUSY_FLAG
SetViewMode0:
        mov     cs:view,bl
        jmp     bw4013GoodReturn

GetViewMode:
;
;       BH = 85h, Get View Mode                    0 = Disabled    1 = Enabled
;

        mov     bl,cs:view
        cmp     bl,0
        je      GetViewMode0
        mov     bl,1
GetViewMode0:
        jmp     bw4013GoodReturn

SetNormalizedFullBatteryNumber:
;
;       BH = 06h, Set Normalized Full Battery      0 - 255, 1-Inc
;                 Indication Number
;
        push    ax
        pushf
        cli
        mov     cs:APMMaxbatRuntime,bl

        mov     al,APM_MAXBAT_RUNTIME              ; How long a new battery has to
        out     CMOS_AD,al                         ; Output it to CMOS
        mov     al,bl                              ; get it
        out     CMOS_DT,al                         ; and store it
```

```
        popf
        pop     ax
        jmp     bw4013GoodReturn

GetNormalizedFullBatteryNumber:
;
;       BH = 86h, Get Normalized Full Battery       0 - 255, 1-Inc
;                 Indication Number
;
        mov     bl,cs:APMMaxbatRuntime
        jmp     bw4013GoodReturn
SetResetDefaultsAPM:
;
;       BH = 0Fh, Set/Reset Defaults                 0
;
        call    APMDefaults
        jmp     bw4013GoodReturn

SetAutoZoomEnable:
;
;       BH = 07h, Set Auto Zoom Enable               0 = Disabled   1 = Enabled
;

        push    ax
        mov     al,cs:userCritLowBattery
        and     al,NOT AUTO_ZOOM_ENABLE_MASK         ; Mask Turned off
        cmp     bl,0
        je      SetAutoZoomEnable0
        or      al, AUTO_ZOOM_ENABLE_MASK
SetAutoZoomEnable0:
        mov     cs:userCritLowBattery,al
        mov     bl,al
        pop     ax
        jmp     SetLowBatteryWarningTime

GetAutoZoomEnable:
;
;       BH = 87h, Get Auto Zoom Enable               0 = Disabled   1 = Enabled
;

        mov     bl,cs:userCritLowBattery
        and     bl,AUTO_ZOOM_ENABLE_MASK             ; Mask Turned off
        cmp     bl,0
        je      GetAutoZoomEnable0
        mov     bl,1
GetAutoZoomEnable0:
        jmp     bw4013GoodReturn


APMDefaults     proc    near
        pushf
        cli
        pusha

        test    cs:userCritLowBattery,BATTERY_AUTO_FULL_MASK
        je      APMDefaults0
        mov     cs:APMThisBatteryRunTime,MAXRUNTIME   ; Unknown
        jmp     short APMDefaults1
APMDefaults0:
        mov     cs:APMThisBatteryRunTime,0            ; Unknown
```

```
APMDefaults1:
        mov     cs:APMMaxbatRuntime,MAXRUNTIME  ; 3.5 hours
        mov     cs:APMLowbatRuntime,LOWRUNTIME  ;   7 minutes
        mov     ch,SESSION_STATUS
        or      ch,HDD_STATE
        or      ch,BACKLIGHT_STATE
        mov     cl,0
;
;       Read AC Port Operations
;
        BATTERY_TEST
        je      APMDefaults2
        and     ch,NOT SESSION_STATUS               ; Battery Session
        jmp  short   APMDefaults3
APMDefaults2:                                       ; AC      Session
        mov     cs:SystemTime,0
APMDefaults3:
        mov     cs:SystemRunTime,cx
        mov     cs:BatteryLowRunTime,0
        mov     cs:UserCritLowBattery,USER_CRIT_LOW_BAT_WARN_DEFAULT
        or      cs:UserCritLowBattery,BATTERY_AUTO_FULL_MASK
        or      cs:UserCritLowBattery,CRIT_LOW_BATTERY_ENABLE_MASK
        and      cs:UserCritLowBattery,NOT AUTO_ZOOM_ENABLE_MASK

;
;       Write Header To CMOS
;
        push    ds
        push    si
        push    cs
        pop     ds
        mov     si,offset APMSignature1
        mov   cx,CMOS_TABLE_LEN
        Call  WriteCMOSTable

        UPPER_LIMIT

        CRITICAL_WARNING

        pop     si
        pop     ds
                                                    ; Registers Fixed Up
        popa
        popf
        ret
APMDefaults    endp
getBatteryStatus        endp

SetSystemTime:
;
;     BH = 08h, Set System Time
;

        mov     ah,System_Time_L
        mov     al,cl                               ; Word to hold Time
        call    BlastCMOS

        mov     ah,System_Time_H
        mov     al,ch                               ; Word to hold Date/Time
        call    BlastCMOS
```

```
        mov     bl,0
        jmp     bw4013GoodReturn

GetSystemTime:
;
;       BH = 88h, Get System Time
;

        mov     cx,cs:SystemTime
        mov     bl,0
        jmp     bw4013GoodReturn
```

```
;
;FILE=CMOS.ASM
;-----------------------------------------------------------------------------
;       SET_CMOS_BYTE  (Updated 3/17/90)
;
;       Input:  bl = CMOS LOCATION to WRITE
;               bh = CMOS VALUE to SET
;
;       SET_CMOS_WORD  (Updated 3/17/90)
;
;       Input:  bl = CMOS LOCATION to WRITE
;               cx = CMOS VALUE to SET
;-----------------------------------------------------------------------------
;       GET_CMOS_BYTE (Updated 3/17/90)
;
;       Input:  bl = CMOS LOCATION to READ
;      Output:  bh = CMOS VALUE READ
;
;       GET_CMOS_WORD (Updated 3/17/90)
;
;       Input:  bl = CMOS LOCATION to READ
;      Output:  bx = CMOS VALUE READ
;
;-----------------------------------------------------------------------------
;       INC_SLEEP_TICK_COUNT   (Updated 3/17/90)
;
;       Input:  None
;       Output: SLEEP_TICK_COUNT bummped by one
;
;-----------------------------------------------------------------------------
TI_FUNCT        equ     0f9h
GET_CMOS8       equ     066h
PUT_CMOS8       equ     067h
GET_CMOS16      equ     068h
PUT_CMOS16      equ     069h
set_cmos_byte:
        push    ax
        mov     ah,TI_FUNCT
        mov     al,PUT_CMOS8
        int     INT_IO
        pop     ax
        ret
get_cmos_byte:
        push    ax
        mov     ah,TI_FUNCT
        mov     al,GET_CMOS8
        int     INT_IO
        mov     bh,al                   ; CMOS location to read data from
        pop     ax
        ret
;
set_cmos_word:
        push    ax
        mov     ah,TI_FUNCT
        mov     al,PUT_CMOS16
        int     INT_IO
        pop     ax
        ret
get_cmos_word:
        push    ax
```

```
mov     ah,TI_FUNCT
mov     al,GET_CMOS16
int     INT_IO
pop     ax
ret
```

```
;--------Interrupt 53 01, 02, 03 Equate Values
;
POWER_MANAGEMENT_FLAG             EQU     'PM'
POWER_MANAGEMENT_VERSION          EQU     01H     ; Version Number  BCD
POWER_MANAGEMENT_REVISION         EQU     00H     ; Revision Number BCD
POWER_MANAGEMENT_DEFAULT          EQU     PMODE16_OFF+PMODE32_ON+CPUSTOP
PMODE16_OFF                       EQU     00000000B       ; Protect mode 16 off
PMODE16_ON                        EQU     00000001B       ; Protect mode 16 on
PMODE32_OFF                       EQU     00000000B       ; Protect mode 32 off
PMODE32_ON                        EQU     00000010B       ; Protect mode 32 on
PM_DISABLED                       EQU     00001000B       ; PM value disabled
PM_ENABLED                        EQU     00000000B       ; PM value enabled
PM_BIT                            EQU     11110111B       ; Bit position
CPUSTOP                           EQU     00000100B       ; CPU Stops Clock IDLE
;
BAD_APM_DEVICE                    EQU     09h             ; Bad Device on APM Call
INTERFACE_OFF                     EQU     0       ; Interface not connected
INTERFACE_ON                      EQU     1       ; Interface connected
ALREADY_CONNECTED_INTERFACE       EQU     2       ; Already connected value
NOT_CONNECTED_INTERFACE           EQU     3       ; Not connected value
;--------------------------------------------------------------------------
ONLINE                    EQU             01h             ; On AC
OFFLINE                   EQU             00h             ; On Battery
CHARGING                  EQU             03h             ; Battery Charging
UNKNOWN_BATTERY_LIFE      EQU             0ffh            ; Unknown BatteryLife
HIGH_BATTERY_LIFE                 EQU     00H             ; Battery STATUS
LOW_BATTERY_LIFE                  EQU     01H             ; Battery STATUS
LOW_CHARGE_LIFE                   EQU     20              ; BatteryLife 10%
CRITICAL_LOW_BATTERY_LIFE         EQU     02h             ; Battery status
CRITICAL_LOW_CHARGE_LIFE          EQU     5               ; ? BatteryLife 1%
CRITICAL_LOW_TIME         EQU     5                       ; TIME TO WARN USER
UNKNOWN_BATTERY_STATUS    Equ     0ffh                    ; Don't know
PROTECT32_ALLREADY        equ     07              ;Already have 32-bit established
;--------------------------------------------------------------------------
DEFAULT_APM_LICENSE       EQU     APM_LICENSED_UNDEFINED  ; Can't/Can do APM?
APM_NOT_LICENSED          EQU     0                       ; Can't do APM
APM_LICENSED              EQU     1                       ; Yes We Can
APM_LICENSED_AUTO         EQU     2                       ; User Wants Auto Det.
APM_LICENSED_UNDEFINED    EQU     4                       ; Don't know
;--------------------------------------------------------------------------
;       How many minutes of operation for each state represents actual runtime
;       for normalized value.
MAXRUNTIME                        EQU (120)       ; [5.10] [120=2.0 hrs]
LOWRUNTIME                        EQU     5
;
;==========================================================================
SUSPEND_HDDON_DC4                 EQU     16      ; [5.10.1] Calc: 456 Min
SUSPEND_HDDON_DC4MUL              EQU     5       ; [5.10.1] Calc: 7.6 Hr
SUSPEND_HDDON_DC4LB               EQU     3       ; Based on 25MHz DX486
SUSPEND_HDDON_DC4MULLB            EQU     1       ; Error Rate is  .05 Sec
                                                  ; Act: xxx Min RT
                                                  ;        x Min LB
                                                  ; Power Measure: 0.75A
                                                  ;       Actual:  x.xxA
;==========================================================================
SUSPEND_HDDOFF_DC4                EQU     4       ; [5.10.1] Calc: 570 Min
SUSPEND_HDDOFF_DC4MUL             EQU     1       ; [5.10.1] Calc: 9.5 Hr
SUSPEND_HDDOFF_DC4LB              EQU     4       ; Based on 25MHz DX486
SUSPEND_HDDOFF_DC4MULLB           EQU     1       ; Error Rate is  .01 Sec
                                                  ; Act: xxx Min RT
```

```
                                                              ;       x Min LB
                                                              ; Power Measure: 0.60A
;=============================================================;       Actual:  x.xxA
APMBACKLIGHT_HDDON_DC4                       EQU    24        ; [5.10.1] Calc: 488 Min
APMBACKLIGHT_HDDON_DC4MUL                    EQU    5         ; [5.10.1] Calc: 8.1 Hr
APMBACKLIGHT_HDDON_DC4LB                     EQU    5         ; Based on 25MHz DX486
APMBACKLIGHT_HDDON_DC4MULLB                  EQU    1         ;
;DX2: Runtime: xxx  LowBattery:yy Remainder: z @BT3(8E); Error Rate is  .08 Sec
;DX25:Runtime: xxx  LowBattery:yy Remainder: z @BT3(8E); Act: xxx Min RT
;SX16:Runtime: 429  LowBattery:14 Remainder:8E @BT3(8E);       xx Min LB
;DX25:Runtime: 360  LowBattery:14 Remainder:01 @BT3(8E); Power Measure: 0.70A
;                   for 15 On, 15 Off                     ;       Actual:  x.xxA
;=============================================================================
APMBACKLIGHT_HDDOFF_DC4                      EQU    26        ; [5.10.2] Calc: 526 Min
APMBACKLIGHT_HDDOFF_DC4MUL                   EQU    7         ; [5.10.1] Calc: 8.8 Hrs
APMBACKLIGHT_HDDOFF_DC4LB                    EQU    4         ; Based on 25MHz DX486
APMBACKLIGHT_HDDOFF_DC4MULLB                 EQU    1         ; Error Rate is -.08 Sec
                                                              ; Act: 540 Min RT
                                                              ;       14 Min LB
                                                              ; Power Measure: 0.65A
;=============================================================;       Actual:  0.63A
BACKLIGHT_HDDON_DC4                          EQU    12        ; [5.10.1] Calc: 244 Min
BACKLIGHT_HDDON_DC4MUL                       EQU    7         ; [5.10.1] Calc: 4.1 Hrs
BACKLIGHT_HDDON_DC4LB                        EQU    2         ; Based on 25MHz DX486
BACKLIGHT_HDDON_DC4MULLB                     EQU    1         ; Error Rate is  .10 Sec
                                                              ; Act: xxx Min RT
                                                              ;       x Min LB
                                                              ; Power Measure: 1.40A
;=============================================================;       Actual:  x.xxA
BACKLIGHT_HDDOFF_DC4                         EQU    13        ; [5.01.4] EST.: 264 Min
BACKLIGHT_HDDOFF_DC4MUL                      EQU    7         ; [5.10.1] EST.: 4.4 Hrs
BACKLIGHT_HDDOFF_DC4LB                       EQU    2         ; Based on 25MHz DX486
BACKLIGHT_HDDOFF_DC4MULLB                    EQU    1         ; Error Rate is  .01 Sec
                                                              ; Act: xxx Min RT
                                                              ;       x Min LB
                                                              ; Power Measure: x.xxA
;=============================================================;       Actual:  x.xxA
APM_HDDON_DC4                                EQU    8         ; [5.10.1] Calc: 228 Min
APM_HDDON_DC4MUL                             EQU    5         ; [5.10.1] Calc: 3.8 Hrs
APM_HDDON_DC4LB                              EQU    3         ; Based on 25MHz DX486
APM_HDDON_DC4MULLB                           EQU    2         ;
;DX2: Runtime: 211  LowBattery: 0 Remainder: 0 @BT3(8E); Error Rate is  .05 Sec
;DX25:Runtime: 207  LowBattery:38 Remainder: 2 @BT3(8E); Act: 224 Min RT
;SX16:Runtime: 218  LowBattery:20 Remainder: 2 @BT3(8E);       14 Min LB
;DX25:Runtime: 360  LowBattery:14 Remainer : 1 @BT3(8E); Power Measure: 1.50A
;                   for 15 On, 15 Off                     ;       Actual:  1.53A
;=============================================================================
APM_HDDOFF_DC4                               EQU    12        ; [5.10.1] Calc: 244 Min
APM_HDDOFF_DC4MUL                            EQU    7         ; [5.10.1] Calc: 4.1 Hrs
APM_HDDOFF_DC4LB                             EQU    2         ; Based on 25MHz DX486
APM_HDDOFF_DC4MULLB                          EQU    1         ; Error Rate is  .04 Sec
                                                              ; Act: 244 Min RT
                                                              ;       14 Min LB
                                                              ; Power Measure: 1.40A
;=============================================================;       Actual:  1.40A
```

```
FAST_HDDON_DC4              EQU    9
FAST_HDDON_DC4MUL           EQU    8    ; [5.10.1] Calc: 159 Min
FAST_HDDON_DC4LB            EQU    1    ; [5.10.1] Calc: 2.7 Hrs
FAST_HDDON_DC4MULLB         EQU    1    ; Based on 25MHz DX486
                                        ; Error Rate is -.04 Sec
                                        ; Act: xxx Min RT
                                        ;        x Min LB
                                        ; Power Measure: 2.15A
                                        ;        Actual:  x.xxA
;==========================================================================
FAST_HDDOFF_DC4             EQU    5
FAST_HDDOFF_DC4MUL          EQU    4    ; [5.10.1] Calc: 167 Min
FAST_HDDOFF_DC4LB           EQU    1    ; [5.10.1] BaseL 2.8 Hrs
FAST_HDDOFF_DC4MULLB        EQU    1    ; Based on 25MHz DX486
                                        ; Error Rate is  .04 Sec
                                        ; Act: xxx Min RT
                                        ;        x Min LB
                                        ; Power Measure: 2.05A
                                        ;        Actual:  x.xxA
;==========================================================================
HDDON_WRITE_DC4             EQU    1
HDDON_WRITE_DC4MUL          EQU    1    ; [5.10.1] Calc: 142 Min
HDDON_WRITE_DC4LB           EQU    1    ; [5.10.1] Calc: 2.4 Hrs
HDDON_WRITE_DC4MULLB        EQU    1    ; Based on 25MHz DX486
                                        ; Error Rate is  .00 Sec
                                        ; Act: xxx Min RT
                                        ;        x Min LB
                                        ; Power Measure: 2.05A
                                        ;        Actual:  x.xxA
;--------------------------------------------------------------------------
;==========================================================================
SUSPEND_HDDON_DC3           EQU    16
SUSPEND_HDDON_DC3MUL        EQU    5    ; [5.10.1] est : 456 Min
                                        ; [5.10.1] est : 7.6 Hr
                                        ; Based on 25MHz DX486
                                        ; Error Rate is  .05 Sec
                                        ; Act: xxx Min RT
                                        ;        x Min LB
                                        ; Power Measure: 0.70Aest
                                        ;        Actual:  x.xxA
;==========================================================================
SUSPEND_HDDOFF_DC3          EQU    4
SUSPEND_HDDOFF_DC3MUL       EQU    1    ; [5.10.1] est : 570 Min
                                        ; [5.10.1] est : 9.5 Hr
                                        ; Based on 25MHz DX486
                                        ; Error Rate is  .01 Sec
                                        ; Act: xxx Min RT
                                        ;        x Min LB
                                        ; Power Measure: 0.60Aest
                                        ;        Actual:  x.xxA
;==========================================================================
APMBACKLIGHT_HDDON_DC3      EQU    24
APMBACKLIGHT_HDDON_DC3MUL   EQU    5    ; [5.10.1] est : 488 Min
                                        ; [5.10.1] est : 8.1 Hr
                                        ; Based on 25MHz DX486
                                        ; Error Rate is  .08 Sec
                                        ; Act: xxx Min RT
                                        ;        x Min LB
                                        ; Power Measure: 0.70Aest
                                        ;        Actual:  x.xxA
;==========================================================================
APMBACKLIGHT_HDDOFF_DC3     EQU    25
APMBACKLIGHT_HDDOFF_DC3MUL  EQU    7    ; [5.10.1] est : 526 Min
                                        ; [5.10.1] est : 8.8 Hrs
                                        ; Based on 25MHz DX486
                                        ; Error Rate is  .10 Sec
                                        ; Act: 540 Min RT
```

```
                                                    ;        14 Min LB
                                                    ; Power Measure: 0.65Aest
                                                    ;        Actual:  x.xxA
;=============================================================================
BACKLIGHT_HDDON_DC3            EQU     12           ; [5.10.1] est : 244 Min
BACKLIGHT_HDDON_DC3MUL         EQU     7            ; [5.10.1] est : 4.1 Hrs
                                                    ; Based on 25MHz DX486
                                                    ; Error Rate is  .10 Sec
                                                    ; Act: xxx Min RT
                                                    ;         x Min LB
                                                    ; Power Measure: 1.40Aest
                                                    ;        Actual:  x.xxA
;=============================================================================
BACKLIGHT_HDDOFF_DC3           EQU     13           ; [5.01.4] EST.: 264 Min
BACKLIGHT_HDDOFF_DC3MUL        EQU     7            ; [5.10.1] EST.: 4.4 Hrs
                                                    ; Based on 25MHz DX486
                                                    ; Error Rate is  .01 Sec
                                                    ; Act: xxx Min RT
                                                    ;         x Min LB
                                                    ; Power Measure: x.xxAest
                                                    ;        Actual:  x.xxA
;=============================================================================
APM_HDDON_DC3                  EQU     8            ; [5.10.1] est : 228 Min
APM_HDDON_DC3MUL               EQU     5            ; [5.10.1] est : 3.8 Hrs
                                                    ; Based on 25MHz DX486
                                                    ; Error Rate is  .05 Sec
                                                    ; Act: 224 Min RT
                                                    ;        14 Min LB
                                                    ; Power Measure: 1.50Aest
                                                    ;        Actual:  x.xxA
;=============================================================================
APM_HDDOFF_DC3                 EQU     12           ; [5.10.1] est : 244 Min
APM_HDDOFF_DC3MUL              EQU     7            ; [5.10.1] est : 4.1 Hrs
                                                    ; Based on 25MHz DX486
                                                    ; Error Rate is  .04 Sec
                                                    ; Act: 244 Min RT
                                                    ;        14 Min LB
                                                    ; Power Measure: 1.40Aest
                                                    ;        Actual:  x.xxA
;=============================================================================
FAST_HDDON_DC3                 EQU     9            ; [5.10.1] est : 159 Min
FAST_HDDON_DC3MUL              EQU     8            ; [5.10.1] est : 2.7 Hrs
                                                    ; Based on 25MHz DX486
                                                    ; Error Rate is -.04 Sec
                                                    ; Act: xxx Min RT
                                                    ;         x Min LB
                                                    ; Power Measure: 2.15Aest
                                                    ;        Actual:  x.xxA
;=============================================================================
FAST_HDDOFF_DC3                EQU     5            ; [5.10.1] est : 167 Min
FAST_HDDOFF_DC3MUL             EQU     4            ; [5.10.1] est   2.8 Hrs
                                                    ; Based on 25MHz DX486
                                                    ; Error Rate is  .04 Sec
                                                    ; Act: xxx Min RT
                                                    ;         x Min LB
                                                    ; Power Measure: 2.05Aest
                                                    ;        Actual:  x.xxA
;=============================================================================
HDDON_WRITE_DC3                EQU     1            ; [5.10.1] est : 142 Min
HDDON_WRITE_DC3MUL             EQU     1            ; [5.10.1] est : 2.4 Hrs
```

```
                                                  ; Based on 25MHz DX486
                                                  ; Error Rate is  .00 Sec
                                                  ; Act: xxx Min RT
                                                  ;         x Min LB
                                                  ; Power Measure: 2.05Aest
                                                  ;        Actual:  x.xxA
;*********************************************************************
;=====================================================================
FAST_CHARGE_DC4               EQU     5           ; [5.10.1] est : 180 Min
FAST_CHARGE_DC4MUL            EQU     4           ; [5.10.1] est : 3.0 hrs
                                                  ; Based on 25MHz DX486
                                                  ; Error Rate is  .07 Sec
                                                  ; Act: xxx Min RT
                                                  ;         x Min LB
                                                  ; Power Measure: 1.90Aest
;=====================================================================
                                                  ;        Actual:  x.xxA
;*********************************************************************
;*********************************************************************

SUSPEND_HDDON_C4              EQU     5           ; [5.10.1] est : 213
SUSPEND_HDDON_C4MUL           EQU     4           ; [5.10.1] est : 3.6 Hrs
                                                  ; Based on 25MHz DX486
                                                  ; Error Rate is  .07 Sec
                                                  ; Act: xxx Min RT
                                                  ;         x Min LB
                                                  ; Power Measure: 0.80A
                                                  ; Charge Rate:    1.96A
;=====================================================================
                                                  ;        Actual:  x.xxA
SUSPEND_HDDOFF_C4             EQU     6           ; [5.01.4] est : 207 Min
SUSPEND_HDDOFF_C4MUL          EQU     5           ; [5.10.1] est : 3.5 Hrs
                                                  ; Based on 25MHz DX486
                                                  ; Error Rate is  .08 Sec
                                                  ; Act: xxx Min RT
                                                  ;         x Min LB
                                                  ; Power Measure: 0.60Aest
                                                  ; Charge Rate:    1.98A
;=====================================================================
                                                  ;        Actual:  x.xxA
APMBACKLIGHT_HDDON_C4         EQU     5           ; [5.01.4]
APMBACKLIGHT_HDDON_C4MUL      EQU     4           ; [5.10.1]
                                                  ; Based on 25MHz DX486
                                                  ; Error Rate is 0.02 Sec
                                                  ; Act: xxx Min RT
                                                  ;         x Min LB
                                                  ; Power Measure: 0.85A
                                                  ; Charge Rate:    1.92A
;=====================================================================
                                                  ;        Actual:  x.xxA
APMBACKLIGHT_HDDOFF_C4        EQU     5           ; [5.01.4]
APMBACKLIGHT_HDDOFF_C4MUL     EQU     4           ; [5.10.1]
                                                  ; Based on 25MHz DX486
                                                  ; Error Rate is -.08 Sec
                                                  ; Act: xxx Min RT
                                                  ;         x Min LB
                                                  ; Power Measure: 0.70A
                                                  ; Charge Rate:    1.96A
                                                  ;        Actual:  x.xxA
```

```
;==========================================================================
BACKLIGHT_HDDON_C4              EQU     5       ; [5.10.4] est : 236 Min
BACKLIGHT_HDDON_C4MUL           EQU     4       ; [5.10.1] est : 3.9 Hrs
                                                ; Based on 25MHz DX486
                                                ; Error Rate is  .03 Sec
                                                ; Act: xxx Min RT
                                                ;          x Min LB
                                                ; Power Measure: 0.90Aest
                                                ; Charge Rate:   1.90A
                                                ;        Actual: x.xxA
;==========================================================================
BACKLIGHT_HDDOFF_C4             EQU     5       ; [5.10.1] est : 244
BACKLIGHT_HDDOFF_C4MUL          EQU     4       ; [5.10.1] est:  4.1 Hrs
                                                ; Based on 25MHz DX486
                                                ; Error Rate is -.04 Sec
                                                ; Act: xxx Min RT
                                                ;          x Min LB
                                                ; Power Measure: 0.80Aest
                                                ; Charge Rate:   1.94A
                                                ;        Actual: x.xxA
;==========================================================================
APM_HDDON_C4                    EQU     8       ; [5.10.1] est : 285 Min
APM_HDDON_C4MUL                 EQU     5       ; [5.10.1] est : 4.8 Hrs
                                                ; Based on 25MHz DX486
                                                ; Error Rate is -.08 Sec
                                                ; Act: xxx Min RT
                                                ;          x Min LB
                                                ; Power Measure: 1.50A
                                                ; Charge Rate:   1.52A
                                                ;        Actual: x.xxA
;==========================================================================
APM_HDDOFF_C4                   EQU     3       ; [5.10.1] est : 297 Min
APM_HDDOFF_C4MUL                EQU     2       ; [5.10.1]       5.0 Hrs
                                                ; Based on 25MHz DX486
                                                ; Error Rate is  .01 Sec
                                                ; Act: xxx Min RT
                                                ;          x Min LB
                                                ; Power Measure: 1.40A
                                                ; Power Measure: 1.60A
                                                ;        Actual: x.xxA
;==========================================================================
FAST_HDDON_C4                   EQU     13      ; [5.10.1] est :1140 Min
FAST_HDDON_C4MUL                EQU     5       ; [5.10.1] est : 19  Hrs
                                                ; Based on 25MHz DX486
                                                ; Error Rate is  .02 Sec
                                                ; Act: xxx Min RT
                                                ;          x Min LB
                                                ; Power Measure: 2.2A
                                                ; Power Measure: 1.02A
                                                ;        Actual: x.xxA
;==========================================================================
FAST_HDDOFF_C4                  EQU     12      ; [5.10.1] est : 342 Min
FAST_HDDOFF_C4MUL               EQU     5       ; [5.10.1] est : 5.7 Hrs
                                                ; Based on 25MHz DX486
                                                ; Error Rate is  .04 Sec
                                                ; Act: xxx Min RT
                                                ;          x Min LB
                                                ; Power Measure: 2.00A
                                                ; Power Measure: 1.16A
```

```
;=========================================================;       Actual:  x.xxA
TRICKLE_C4                    EQU     9      ; [5.10.12] est : 90 Min
TRICKLE_C4MUL                 EQU     1      ; [5.10.12] est : 10
                                             ; Based on 25MHz DX486
                                             ; Error Rate is
                                             ; Act: xxx Min RT
                                             ;         x Min LB
                                             ; Power Measure:
                                             ; Power Measure:
;=========================================================;       Actual:  x.xxA
;

;*************************************************************************
;*************************************************************************
;*************************************************************************

SUSPEND_HDDON_C3              EQU     2      ; [5.10.1] est : 213
SUSPEND_HDDON_C3MUL           EQU     1      ; [5.10.1] est : 3.6 Hrs
                                             ; Based on 25MHz DX486
                                             ; Error Rate is  .00 Sec
                                             ; Act: xxx Min RT
                                             ;         x Min LB
                                             ; Power Measure: 1.60Aest
;=========================================================;       Actual:  x.xxA
SUSPEND_HDDOFF_C3             EQU     2      ; [5.01.4] est : 207 Min
SUSPEND_HDDOFF_C3MUL          EQU     1      ; [5.10.1] est : 3.5 Hrs
                                             ; Based on 25MHz DX486
                                             ; Error Rate is -.09 Sec
                                             ; Act: xxx Min RT
                                             ;         x Min LB
                                             ; Power Measure: 1.65Aest
;=========================================================;       Actual:  x.xxA
APMBACKLIGHT_HDDON_C3         EQU     2      ; [5.01.4]
APMBACKLIGHT_HDDON_C3MUL      EQU     1      ; [5.10.1]
                                             ; Based on 25MHz DX486
                                             ; Error Rate is -.09 Sec
                                             ; Act: xxx Min RT
                                             ;         x Min LB
                                             ; Power Measure: 1.65Aest
;=========================================================;       Actual:  x.xxA
APMBACKLIGHT_HDDOFF_C3        EQU     2      ; [5.01.4]
APMBACKLIGHT_HDDOFF_C3MUL     EQU     1      ; [5.10.1]
                                             ; Based on 25MHz DX486
                                             ; Error Rate is -.09 Sec
                                             ; Act: xxx Min RT
                                             ;         x Min LB
                                             ; Power Measure: 1.65Aest
;=========================================================;       Actual:  x.xxA

BACKLIGHT_HDDON_C3            EQU     5      ; [5.10.4] est : 236 Min
BACKLIGHT_HDDON_C3MUL         EQU     3      ; [5.10.1] est : 3.9 Hrs
                                             ; Based on 25MHz DX486
                                             ; Error Rate is -.02 Sec
                                             ; Act: xxx Min RT
```

```
                                                    ;          x Min LB
                                                    ; Power Measure: 1.45Aest
;================================================== ;        Actual:  x.xxA
BACKLIGHT_HDDOFF_C3             EQU     12          ; [5.10.1] est : 244
BACKLIGHT_HDDOFF_C3MUL          EQU     7           ; [5.10.1] est:  4.1 Hrs
                                                    ; Based on 25MHz DX486
                                                    ; Error Rate is  .06 Sec
                                                    ; Act: xxx Min RT
                                                    ;          x Min LB
                                                    ; Power Measure: 1.40Aest
;================================================== ;        Actual:  x.xxA
APM_HDDON_C3                    EQU     2           ; [5.10.1] est : 285 Min
APM_HDDON_C3MUL                 EQU     1           ; [5.10.1] est : 4.8 Hrs
                                                    ; Based on 25MHz DX486
                                                    ; Error Rate is  .01 Sec
                                                    ; Act: xxx Min RT
                                                    ;          x Min LB
                                                    ; Power Measure: 1.20Aest
;================================================== ;        Actual:  x.xxA
APM_HDDOFF_C3                   EQU     2           ; [5.10.1] est : 297 Min
APM_HDDOFF_C3MUL                EQU     1           ; [5.10.1]       5.0 Hrs
                                                    ; Based on 25MHz DX486
                                                    ; Error Rate is  .01 Sec
                                                    ; Act: xxx Min RT
                                                    ;          x Min LB
                                                    ; Power Measure: 1.15Aest
;================================================== ;        Actual:  x.xxA
FAST_HDDON_C3                   EQU     8           ; [5.10.1] est :1140 Min
FAST_HDDON_C3MUL                EQU     1           ; [5.10.1] est : 19  Hrs
                                                    ; Based on 25MHz DX486
                                                    ; Error Rate is  .03 Sec
                                                    ; Act: xxx Min RT
                                                    ;          x Min LB
                                                    ; Power Measure: 0.3 Aest
;================================================== ;        Actual:  x.xxA
FAST_HDDOFF_C3                  EQU     12          ; [5.10.1] est : 342 Min
FAST_HDDOFF_C3MUL               EQU     5           ; [5.10.1] est : 5.7 Hrs
                                                    ; Based on 25MHz DX486
                                                    ; Error Rate is  .04 Sec
                                                    ; Act: xxx Min RT
                                                    ;          x Min LB
                                                    ; Power Measure: 1.00Aest
;================================================== ;        Actual:  x.xxA
;

FAST_C3                         EQU     2           ; [5.04]
FAST_C3MUL                      EQU     1           ;
```

```
;FILE=BA.EQU
;Vaughn Watts 2/23/92
;==============================================================================
; CMOS Definitions
;==============================================================================
CMOS_AD         equ     70h             ; Address of cmos address port
CMOS_DT         equ     71h             ; address of cmos data port

;;vw2debugMINUTE_RELOAD    equ     100          ; (18.2 ticks per second *
MINUTE_RELOAD   equ     1092            ; (18.2 ticks per second *
                                        ;  60 seconds per minute)
APMMAGICSTATECOUNT      equ  1200
```

```
;==============================================================================
;FILE=CMOS.EQU
;------------------------------------------------------------------------
;                   CMOS Locations
;
;------------------------------------------------------------------------
;            THIS BLOCK IS RESERVED FOR POWER MANAGEMENT
;            AND THRID PARTY SOFTWARE SUPPORT FOR TRAVELING SOFTWARE'S
;            BATTERY WATCH.
;------------------------------------------------------------------------
VFW1_1         equ    49H                ; TM3 Set 1 Power Mgnt Support
VFW1_LEN       equ    09h                ; Lenght of VFW1 set
VFW1_LAST      equ    VFW1_1+VFW1_LEN-1; Last location in SET 1 available
CMOS_TABLE_LEN EQU    VFW1_LEN           ; Make internal CMOS table same lenght
TS_CK_1        equ    VFW1_1             ; bw write checksum
TS_CK_2        equ    TS_CK_1+1          ; bw write checksum
TS_1           equ    TS_CK_2+1          ; Time/Date Stamp
TS_2           equ    TS_1+1             ; Time/Date Stamp
TS_3           EQU    TS_2+1             ; Time/Date Stamp
TS_4           EQU    TS_3+1             ; Time/Date Stamp
TS_5           EQU    TS_4+1             ; Ma consumption
TS_6           EQU    TS_5+1             ; Ma consumption
TS_7           EQU    TS_6+1             ; Ma consumption
;
BFLAG            EQU   'B'               ; Checksum flag for TS_CK_1 and 2
WFLAG            EQU   'W'               ; Checksum flag for TS_CK_2 and 1
;

PFLAG            EQU   'p'               ; Checksum flag for TS_CK_1 and 2
MFLAG            EQU   'm'               ; Checksum flag for TS_CK_2 and 1
GFLAG            EQU   'a'               ; Garbage Flag for checksum

APMBPLEVEL     equu   52h                ; Initialization Valid = "80"
;;;                   7 6 5 4 3 2 1 0
;;;                   | | | | | +-+-+-- Max. Power Level
;;;                   | +-+-+---------- Spares
;;;                   +---------------- Initialization Flag
;
TS_CK_1        equ    VFW1_1             ; bw write checksum
TS_CK_2        equ    TS_CK_1+1          ; bw write checksum
TS_1           equ    TS_CK_2+1          ; Time/Date Stamp
TS_2           equ    TS_1+1             ; Time/Date Stamp
TS_3           EQU    TS_2+1             ; Time/Date Stamp
APM_SIGNATURE         EQU  TS_CK_1        ; APM Write CheckSum
APM_SIGNATURE2        EQU  TS_CK_2        ; APM Write CheckSum
APM_MAXBAT_RUNTIME    EQU  TS_1           ; How long a new battery has to go
APM_FLAGS_LAST        EQU  TS_2           ; Flags for Last Session
APM_THISBAT_RUNTIME   EQU  TS_3           ; How long this battery has to go
;;;    This location is updated by BatteryPro INIT at time of load by
;;;    Copying the Current Session Status to the Last Session Status.
;;;    This copying is only done after BatteryPro has computed all information
;;;    needed from the "Last Session" Status.
;;;
SYSTEM_RUN_TIME       EQU  TS_4           ; Byte to hold SystemRunTime
;;; This location is updated every one minute from IRQ8.
;;; This session run time value is in multiples of 2 minutes;  inaddition,
;;; This session is reset if a change is made from AC to Battery or Battery
;;; to AC during the session.  The session time acturally reflects the last
;;; session operation time on either Battery or AC.
;;; If we can tell if the system is having a Warm/Cold/ or Cold boot,then
```

```
;;; we will not reload values during the warm boot operation.
;;;
APM_FLAGS_CURRENT      EQU  TS_5          ; Flags for Status This Session
;;;                         7 6 5 4 3 2 1 0
;;;                         | | | | | | | +-- Roll Over Bit for System Run Time
;;;                         | | | | | | +---- APM State (0=off 1=On)
;;;                         | | | | | +------ AutoFullBatteryDownCount 0=Off 1=On
;;;                         | | | | +-------- LowBattery_State 0=Off 1=On
;;;                         | | | +---------- Suspend State 0=Off 1=On
;;;                         | | +------------ Backlight State 0=Off  1 = On
;;;                         | +-------------- Session Status 0 = AC 1= Bat
;;;                         +---------------- HardDisk State 0=Off 1=On
;;;    This location is updated once every minute (if low battery) or every
;;;    two minutes by IRQ8 if APM is installed and the battery is not low.
;;;
;;;    This update only applied to the locations for current session.
APM_STATE              EQU   00000010B  ; Bit on = APM state in progress
AUTOFULLDOWNCOUNT      EQU   00000100B  ; Bit on = AutoFull In progres:
LOWBATTERY_STATE       EQU   00001000B  ; Bit on = Low Battery State On.
SUSPEND_STATE          EQU   00010000B  ; Bit on = Suspend On
BACKLIGHT_STATE        EQU   00100000B  ; Bit on = Backlight On (NoPowerSaving)
SESSION_STATUS         EQU   01000000B  ; Bit On = Battery
HDD_STATE              EQU   10000000B  ; Bit On = Hdd On.
BATTERY_LOW_RUN_TIME  EQU  TS_6         ; Byte for Low Battery RunTime
USER_CRIT_LOW_BATTERY EQU  TS_7         ; Byte for User Critical Low Bat Warn
;;;                         7 6 5 4 3 2 1 0
;;;                         | | | | +-------- Warning Time 0-15
;;;                         | | | +---------- LowBatteryCritEvent (1=enabled)
;;;                         | | +------------ Auto Zoom Enable (1=enable)
;;;                         | +-------------- Critical Warning (1=enable)
;;;                         +---------------- Battery Auto Full (1 =enable)
USER_CRIT_LOW_BATTERY_MASK      EQU     00001111b
LOW_BATTERY_CRIT_EVENT_MASK     EQU     00010000b
AUTO_ZOOM_ENABLE_MASK           EQU     00100000b
CRIT_LOW_BATTERY_ENABLE_MASK    EQU     01000000b
BATTERY_AUTO_FULL_MASK          EQU     10000000b
USER_CRIT_LOW_BAT_WARN_DEFAULT   EQU  5  ; Default of 5 Minutes for Critical War
;
;
;      TIMEOUT VALUES
LCD_TIMEOUT     EQU     62h             ; CMOS area for timeout in minutes
HDD_TIMEOUT     EQU     63h             ; CMOS area for timeout, in Table form
;;;    ===================================
;;;    Loc[49] VFW1 - 1..............:  00    BW Write CheckSum
;;;    Loc[4A] VFW1 - 2..............:  00    BW Write CheckSum
;;;    Loc[4B] VFW1 - 3..............:  00    BW Time Date Stamp
;;;    Loc[4C] VFW1 - 4..............:  00    BW Time Date Stamp
;;;    Loc[4D] VFW1 - 5..............:  00    BW Time Date Stamp
;;;    Loc[4E] VFW1 - 6..............:  00    BW Time Date Stamp
;;;    Loc[4F] VFW1 - 7..............:  00    BW Ma Consumption  SYSTEMRUNTIME
;;;    Loc[50] VFW1 - 8..............:  00    BW Ma Consumption  LOWBATRUNTIME
;;;    Loc[51] VFW1 - 9..............:  00    BW Ma Consumption  USERLOWBATCRIT
;;;    Loc[52] VFW2 - 1..............:  00    Spare
;;;    Loc[58] Power Information Table..........:  00
;;;                    7 6 5 4 3 2 1 0
;;;                    | | | | +-+-+-+-- Max. Power Level
;;;                    +-+-+-+---------- Curr. Power Level
POWER_LEVEL_MASK_INITIALIZATION  equu  10000000B  ; Power init Level Bits used
POWER_LEVEL_MASK        equ      00000111B        ; Power Level Bits used
;
```

```
;       Note: On 486 machines, the factory uses locations 55H and 56H
;             This is true on LJ 386 also.  Can use these if on correct
;             machine.
DATE_TIME_STAMP_LSB     equ     55h               ;
DATE_TIME_STAMP_MSB     equ     56h               ;
APM_STATE_CMOS          equ     58h
;
;       Values during APM Runtime:  0 - 7F = number of sleep periods
;                                   8xh    = Command
;                                            80h = Disable Power Management
;                                            81h = Enable power management
;                                            88h = Command complete
;                                            8fh = Skip APM Power Savings
;
;       [5.10.c3] Remember system time
;
LAST_SYSTEM_TIME_L      equ     37H
LAST_SYSTEM_TIME_H      equ     38H
SYSTEM_TIME_L           equ     39H
SYSTEM_TIME_H           equ     3aH
```

```
;
;FILE=DOCK.EQU
;
SMARTMODE            EQU 1     ; Motor control is in SmartMode; Applica
;                                has control of system
DUMBMODE             EQU 0     ; Motor control has control of docking s
RETRYMC              EQU 27    ; Number of retries on bad interface con
;                                for motor control interface.
;
;       ShutDownRequest
;                = DOSMODE;         shutdown application wants to return to MS DOS
;                = EJECTPOWEROFF;   Shutdown application wants eject without power
.                = EJECTPOWERON;    Shutdown application wants eject with power re
;                = POWERON;         Shutdown applicaiton want auto resume after ti
;
DOSMODE              EQU 0     ; User wants to return to MS DOS on Shut
EJECTPOWEROFF        EQU 1     ; User wants to eject System (Hard Eject
;                                on shutdown
EJECTPOWERON         EQU 2     ; User wants to eject System (Soft Eject
;                                on shutdown
POWERON              EQU 3     ; User wants to power down and auto resu
;
;
; Commands to Motor Controll
;
SENDCMDMC            EQU 0fb01h        ; send motor control command
SENDMCMDMC           EQU 0fb05h        ; send multiple motor control co
WAITMC               EQU 01h           ; wait for command to complete
NOWAITMC             EQU 00h           ; proceed with data write if pos
UNCONDITIONALMC      EQU 02h           ; write data independent of inte
;                                        status
STATUSMC             EQU  00000000b    ; Put MC into status report mode
CLEARMC              EQU  01000000b    ; Clear all keys hit
SMARTMODEPC          EQU  00000001b    ; Init Smart PC Mode 1
SMARTMODEPCOFF       EQU  00000010b    ; Kill Smart PC Mode 1
SETSMARTMODEPC       EQU  11000001b    ; MC Complete for Init Smart PC
RETSMARTMODEPC       EQU  11000010b    ; MC Complete for Dumb PC Mode 1
RESETONEJECT         EQU  00010110b    ; Eject and Reset computer
NORESETONEJECT       EQU  00010111b    ; Eject and Do Not Reset Compute
EJECT                EQU  00000011b    ; Eject notebook
CONNECTVGA           EQU  00001011b    ; Load VGA Port
DISCONNECTVGA        EQU  00001100b    ; Eject VGA Port

TURNONAMBER          EQU  01001001b    ; Turn on AMBER
TURNONSTANDARD       EQU  01000110b    ; Power LED to normal
POWERDOWNRESUME      EQU  00011100b    ; Power the system down/Resume
SETTIMER             EQU  01011101b    ; Set timer mode
CLEARTIMER           EQU  01011110b    ; Clear Inverval Timer Mode
FREEDSBITS     EQU 11000000b           ; bits off, valid status command
```

```
;FILE=PORTS.EQU
;
PORT_61                 equ     61h             ; DRAM refresh trigger PORT
                                                ; ALSO speaker/timer PORT
;       Defn for PORT_61
;
LOW_BITS_61             equ     03h     ; Save low order bits on port 61
INTERRUPT_TIMER_OFF     equ     0fch    ; Force timer/keyboard interrupt off
TIMER_SPEAKER           equ     03h             ; Save bit 0 and 1
DRAM_REFRESH            equ     10h             ; DRAM Refresh Edge Trigger
;
SLEEP_PORT              equ     0e0h    ; DUAL CLOCK PORT
;
;    note: got B3 on read with low battery light on      1011 0011
;          got B7 on read with AC power and low battery  1011 0111
;
;       Defn for SLEEP_PORT - READ
;
;       Bit 0 = Cover Status:           (0 = Closed, 1 = Open)
;       Bit 1 = Battery Status:         (0 = Low, 1 = OK)
;       Bit 2 = Battery Power:          (0 = Battery Power, 1 = A/C Power)
;       Bit 3 = Modem PWR               (0 = Off, 1 = ON)
;       Bit 4 = Key Hit Status:         ()
;       Bit 5 = BackLight Status:       (0 = Backlight OFF, 1 = Backlight ON)
;       Bit 6 = Keyboard Status:        (0 = Internal KB enabled, 1 = Ext )
;       Bit 7 = Sleep function:         (0 = sleep, 1 = high speed clock)
;
INTERNAL_KEYBOARD_BIT           EQU     01000000b
;
;       Defn for SLEEP_PORT - WRITE
;
;       Bit 0 = Low Battery Alarm       (0 = Enable Alarm, 1 = Disable Alarm)
;       Bit 1 = Cover Closed Alarm      (0 = Enable Alarm, 1 = Disable Alarm)
;       Bit 2 =
;       Bit 3 = Modem PWR               (0 = Off, 1 = ON)
;       Bit 4 = Key Hit Status:         (0 = No key hit, 1 = Key hit since read)
;       Bit 5 = BackLight Status:       (0 = Backlight OFF, 1 = Backlight ON)
;       Bit 6 = Keyboard Status:        (0 = Internal KB enabled, 1 = Ext )
;       Bit 7 = Sleep function:         (0 = sleep, 1 = high speed clock)
;
SLOW_CLOCK_MASK         equ     01101000b       ; Mask Slow Clock Active
FAST_CLOCK              equ     10000000b       ; Mask Fast Clock Active
MUST_KEEP_CLOCK_MASK    equ     00010000b       ; Bit that must be ON
MODEM_PWR               equ     00001000b       ; Bit ON, Modem ON
;
POWER_PORT_MICRODOCK    equ     0eah    ; Mostly Power Bits (Microdock)
AC_POWER_MICRODOCK      equ     00001000b
POWER_PORT_486          equ     0e1h    ; Mostly Power Bits (TM4000)
;
;    note: got 03 on read with low battery light on      0000 0011
;          got 0B on read with Battery (not low)         0000 1011
;          got 0f on read with AC power and low battery  0000 1111
;
;       Defn for POWER_PORT
;
; Read Bit 0 = Cover Status Switch State
; Read Bit 1 = Battery Low Sense State 1
; Read Bit 2 = Power Source             (0 = Battery Power, 1 = A/C Power)
```

```
; Read Bit 3 = Battery Low Sense State 2
; R/W  Bit 4 = Timer Speaker On/Off
; R/W  Bit 5 = Cause Speaker Tone:
; R/W  Bit 6 = Interrupt Occured Clear
; Read Bit 7 = Interrupt Occured (Enable Backlight)
;
POWER_PORT_386 EQU     SLEEP_PORT
BATTERY_STATUS         equu    00000010b        ; Bit OFF = Low Battery
AC_POWER               equ     00000100b        ; Bit ON = AC Power
;
VIDEO_PORT             equ     0e8h     ; TM3000 Video port
PORT_E8                equ     VIDEO_PORT
;
;       Defn for VIDEO_PORT - WRITE
;
;       Bit 0 = Turbo LED                  (0 = LED ON, 1 = LED OFF)
;       Bit 1 = Standby LED                (0 = LED OFF, 1 = LED ON)
;       Bit 2 = LCDC BUS Access            (0 = LCDC Active, 1 = LCDC disabled)
;       Bit 3 = LCDC Pwr Down              (0 = LCDC Active, 1 = LCDC PWR down)
;       Bit 4 =
;       Bit 5 =
;       Bit 6 =
;       Bit 7 =
DEBUG_E8        equ     11000000b
;
INTERRUPT_MASK         equ     21h      ; Interrupt Port for mask
;------------------------------------------------------------------
;----------------------------------------------------------------------
EOI                    equ     20h      ;
INTB00                 equ     0a0h     ;
INTB01                 equ     0a1h     ;
INTA00                 equ     020h     ;
INTA01                 equ     021h     ;
;----------------------------------------------------------------------
TI_alarm        equ     0bfh             ; RAM BIOS DATA Area
TIA_LB_CURRENT  equ      00000001b
TIA_CC_CURRENT  equ      00000010b
TIA_BL_MASTER   equ      00000100b
KSTATUS_OFFSET  equ     17h             ; RAM BIOS DATA Area
;--------------------------------------------------------------------
LOW_BATTERY_BIT486     EQU     8
LOW_BATTERY_BIT386     EQU     2

INDEXP  EQU     0026h           ; configuration register index port
DATAP   EQU     0024h           ; configuration register data port
```

```
;FILE=BW_4014.ASM                                                            ;
;Vaughn Watts 8/31/93
;[7.000] Added this functionality - Watts
;-----------------------------------------------------------------------------
; CODED    4.1.4  Docking Station Interface
;        Entry:  AH = 46
;                AL = 04
;                BH = 00h, Initiate Intelligent Mode, Sets DOS MODE for shutdown
;                BH = 01h, Cancel  Intelligent Mode
;                BH = 02h, Read "Undock / Eject" Button
;                BH = 03h, Set type of Mode or Request Mode available
;                BH = 04h, Eject Notebook
;                BH = 05h, Set VGA Motor Control on Standby
;                BH = 06h, Set Interval Timer for Auto Power ON feature
;                BH = 07h, Cancel Interval Timer Mode
;                BH = 08h, Test for Docking Station Active
;                BH = 09h,  Chicago Beta Test/Demo Interface; to be defined as we
;
;----------------------CALLING Parameters---------------------------
;  CALL with BH = Interface Parameter        RETURN with BL=Return Parameter
;
;
;
;        Exit:
;                        CY - Set on error
;
;+           AH = 86h and carry flag set
;+         if ok:
; For BH=00, 01
;+           AH = 00h and carry flag cleared
;+           AL = xx xxxxb - 6 bit command sent
;+           BH = Return from the command (if BH == 1 on entry)
;+           BL - Interface Status Bits
;+                    00 = Command was accepted
;+                    01 = Timeout waiting for previous command to complete
; For BH=02
;            BL= 0  = No Eject/Undock Button Pressed
;            BL= 1  = Eject / Undock Button Pressed
;
; For BH=03
;
;            BL = Mode request code
;                                       ShutDownRequest as follows
;
;               = DOSMODE;         shutdown application wants to return to MS DOS
;               = EJECTPOWEROFF;   Shutdown application wants eject without power
;               = EJECTPOWERON;    Shutdown application wants eject with power re
;               = POWERDOWN;       Shutdown application want Desktop Power Off
;                                  and resume
;
;                    bL = 0 ; DOSMODE
;                    bL = 1 ; EJECTPOWEROFF -Eject System (Hard Eject)
;                    bL = 2 ; EJECTPOWERON  -Eject System (Soft Eject)
;                    bl =  3 ; POWERDOWN     -Standby/Resume Mode
;
;                                        Eject/Undock Key Mode
;
;                    bl = 4 ; Disable Eject/Undock key in Smartmode
;                    bl = 5 ; Enable Eject/Undock key in Smartmode
```

```
;
;
;                                   Electronic Keylock mode
;
;               bl = 6 ; Disable Electronic Lock Mode
;               bl = 7 ; Enable Electronic Lock Mode
;
;
;                                   Hot Option Plug Request as follows
;
;                    bl =80h; Test for Hot Options.
;                             Return AH=86 No Hot, otherwise hot okay.
;                    Note that if Intelligent Mode not set, bl=1 or 2 is NA
;
;                    Note: on Initiate Smartmode command (ax=4604, bh=00)
;                          and Cancel Intelligent Mode (ax=4604, bh=01)
;                          ShutDownRequest is SET to DOSMODE.  Caller must
;                          mode again each time after either of these calls
;                          are made.
;
;                 Return Mode Information
;
;               bl=81h; Return mode information (not coded yet)
;               Return AH=86h, Mode not supported (call of this function that i
;                          otherwise, AH=0 and BL=mode settings active
;
;                       bl on Return (Bits)
;
;
;               bl-bit 0:  current setting for SMART EJECT SWITCH
;               bl-bit 1:       current setting for POWER SETTING AT EJECT
;               bl-bit 7:       current setting for CRT ON/OFF during STANDBY
;
; For BH = 05h, Set VGA Motor Control on Standby
;
;               BL = 0; Withdraw VGA and Modem connection on Standby
;               BL = 1; Leave VGA and Modem connection attached on Standby
;
; For BH = 06h, Set Interval Timer for Auto Power ON feature
;               BL=  0; No Instant On Resume. Most power savings.
;                     ; On this call, the mode is set for Standby/Resume
;                     ; but the unit is NOT shutdown.  A shutdown occurs
;                     ; when the system leaves Windows after updating
;                     ; any/all files.  A normal exit windows with this
;                     ; mode set to POWERDOWN mode will power system down and
;                     ; wait system up on specificed time delay.
;               BL=  1; Instant On Resume.
INSTANT_ON_RESUME       Equ     1
;                     ; On this call, the system will not return until
;                     ; the elasped time has expired or the user has
;                     ; pressed a manual restart key.
;               CH=  H; Number of hours to skip for wakeup (resume)
;               CL=  M; Number of minutes to skip for wakeup (resume)
; For BH = 07h, Cancel Interval Timer Mode
;
; For BH = 08h, Open for next function
; For BH = 09h, Chicago Beta/Demo Interface - TBD
;
PollDockResumeRequest   proc    near
        pushf
;[7.00.56]    cli
        mov     ah,86h                          ; Disable interrupts
```

```
        cmp     cs:DockStatus,ah
        jne     DockResumeRequestEntry
PDExitR:jmp      PollDockExitReally                        ; No docking station available
;
;       Major Entry Point

PollDockRequest proc    near
        pushf
;[7.00.56]         cli
        mov     ah,86h                                     ; Disable interrupts
        cmp     cs:DockStatus,ah
        je      PDExitR                                    ; No docking station available
        cmp     cs:PollDockBusy,BUSY_FLAG
        je      PDExitR
;
;       Read Docking Status Status Port
;
        in    al,DOCKPORT                                  ; Read the status port
;
;       Test for Standby function here
;
        mov   ah,al
        and   ah,FREEDSBITS                                ; Returns AH=0 ; al is valid sta
        cmp   ah,0
        jne   PDExitR                                      ; Not A status poll request
;
;       Save the Battery Fast Charge Status

        mov ah,al
        and ah,DS_FAST_CHARGEBITS
        mov cs:DSFastChargeStatus,ah
;
;       Test to see if Standby or Eject key hit; if so, process
;       otherwise, get out of here FAST!
;
        mov   ah,al
        and   ah,STANDEJECTBITS
        cmp   ah,0
        je    PDExitR                                      ; Fast Exit please
;
;       We have either a standby or and eject key here; we will need to
;       clear this key from our buffer in the Docking station prior to
;       exiting this code.
;
        mov   ah,al
        and   ah,STANDBYDSBITS
        cmp   ah,0
        je    PollDockEjectKey                             ; Standby not wanted, Eject want
;
        cmp   cs:UserStandby,0
        jne   PollDockExitX
;[7.00.46] Moved below 2 lines down in code to monitor bits even if not
;          in smartmode.
        cmp     cs:IntelligentMode,SMARTMODE               ; Intelligent Mode, DOS
        jne     PollNotSmartX

;[7.00.46]
DockResumeRequestEntry:
        push    cx                                         ; Save user's CX register
```

```
;[7.00.55]
        cmp     cs:ESeries,86h
        je      PollExecError
;[7.00.55]

        mov      cx,RETRYMC                          ; Number of Retries
PollExec:
        mov     cs:PollDockBusy,BUSY_FLAG
        mov     ax,word ptr SENDCMDMC       ; Send command to Motor Controller
        mov     bh,WAITMC                   ; Wait for complete
        mov     bl,CLEARMC                  ; Clear Key entry; stop debounce
        int      15h                        ; call BIOS
        cmp      ah,86h                     ; Valid call
        je       PollExecError              ; WE have a problem..should never happen
        cmp      bl,0                       ; Successful command
        je       PollExecClear              ; Yes, we have cleared the interface
        loop     PollExec                   ; Try it again for completion
PollExecError:                              ; Problem child here
        pop      cx                         ; Clean up stack
        jmp             PollSkipSmart       ; Leave nicely
PollNotSmartX:  jmp PollNotSmart
PollDockExitX:  jmp PollDockExit
PollExecClear:
;
;       Set Amber LED here
;
        mov      cx,RETRYMC                          ; Number of Retries
PollExecSAmber:
        mov     ax,word ptr SENDCMDMC       ; Send command to Motor Controller
        mov     bh,WAITMC                   ; Wait for complete
        mov     bl,TURNONAMBER              ; Turn on AMBER LED
        int      15h                        ; call BIOS
        cmp      ah,86h                     ; Valid call
        je       PollExecSAmberError        ; WE have a problem..should never happen
        cmp      bl,0                       ; Successful command
        je       PollExecSAmberClear        ; Yes, we have cleared the interface
        loop     PollExecSAmber             ; Try it again for completion
PollExecSAmberError:                        ; Problem child here
        pop      cx                         ; Clean up stack
        jmp      short PollSkipSmart        ; Leave nicely
;
;
;
PollDockEjectKey:                           ; Eject key active?
;
;       Clear outstanding events on keyboard, please.
;
        cmp    al,0
        je              PollDockExitX               ; no keys active to clear
        push    ax
        mov    ax,word ptr SENDCMDMC        ; Send command to Motor Controller
        mov    bh,WAITMC                    ; Wait for complete
        mov    bl,CLEARMC                   ; Clear Key entry; stop debounce
        int      15h                        ; call BIOS
        pop    ax
        cmp      cs:EjectKey,EJECTKEYON     ; Active?
        je      PollDockExitX               ; Yes, return the key pressed
        mov      al,0                       ; No, kill key
        jmp      PollDockExit
;
```

```
PollExecSAmberClear:
;
;       Turn off Display
;

        Call    DisableVideoResume

;
;       Do we need to Unload VGA Port?
;


        mov     al,UNLOADVGAPORT
        cmp     cs:VGAMotorOption,al
        jne     ExecutePollStandby
        mov     ax,word ptr SENDCMDMC       ; Send command to Motor Controller
        mov     bh,WAITMC                   ; Wait for complete
        mov     bl,DISCONNECTVGA            ; EJECT VGA
        int     15h                         ; call BIOS
;[7.00.48]
;       Give us some time to unload to complete
;
ExecutePollStandby:
        call    vgadelay
;[7.00.53]

        STI
        nop
        int  77h                        ; Do it
        CLI
        call    vgadelay                ; delay for recovery
;
;       Do we need to reload VGAPort?
;
        mov     al,UNLOADVGAPORT
        cmp     cs:VGAMotorOption,al
        jne     ExecutePollAmberCleanup
        mov     al,0
        out     DOCKPORT,al                 ; Clear controller

        mov     ax,word ptr SENDCMDMC       ; Send command to Motor Controller
        mov     bh,WAITMC                   ; Wait for complete
        mov     bl,CONNECTVGA               ; EJECT VGA
        int     15h                         ; call BIOS
;[7.00.48]
;       Give us some time for load to complete
;


ExecutePollAmberCleanup:
        call    vgadelay

;
;       Turn on Display
;

        Call    EnableVideoResume
```

```
;[7.00.53]

;
;       Ready to clean up..Turn off Amber LED
;
        mov     cx,RETRYMC                          ; Number of Retries
PollExecRAmber:
        mov   ax,word ptr SENDCMDMC           ; Send command to Motor Controller
        mov   bh,WAITMC                       ; Wait for complete
        mov   bl,TURNONSTANDARD               ; Turn OFF AMBER LED
        int     15h                           ; call BIOS
        cmp     ah,86h                        ; Valid call
        je      PollExecRAmberError           ; WE have a problem..should never happen
        cmp     bl,0                          ; Successful command
        je      PollExecRAmberClear           ; Yes, we have cleared the interface
        loop    PollExecRAmber                ; Try it again for completion
PollExecRAmberError:                          ; Problem child here
        pop     cx                            ; Clean up stack
        jmp     short PollSkipSmart           ; Leave nicely
PollExecRAmberClear:
        pop   cx
;
;       Setup Status for Key inputs
;
PollSkipSmart:
;
;       Clear up Keybounce issues
;
        push    cx                            ; Save user's CX register
        mov     cx,RETRYMC                    ; Number of Retries
PollSkipExec:
        mov   ax,word ptr SENDCMDMC           ; Send command to Motor Controller
        mov   bh,WAITMC                       ; Wait for complete
        mov   bl,CLEARMC                      ; Clear Key entry; stop debounce
        int     15h                           ; call BIOS
        cmp     ah,86h                        ; Valid call
        je      PollSkipExecError             ; WE have a problem..should never happen
        cmp     bl,0                          ; Successful command
        je      PollSkipExecClear             ; Yes, we have cleared the interface
        loop    PollSkipExec                  ; Try it again for completion
        jmp     short PollSkipExecError
PollSkipExecClear:
;
;       Read for new Key input
;
PollSkipExecError:                            ; Problem child here
        pop     cx                            ; Clean up stack
PollSkipExit:                                 ; Leave nicely
        mov cs:PollDockBusy,NOT_BUSY_FLAG
PollNotSmart:
        mov   ax,word ptr SENDCMDMC           ; Send command to Motor Controller
        mov   bh,NOWAITMC                     ; Don't Wait for complete
        mov   bl,STATUSMC                     ; Give me a status
        STI                                   ; [7.00.56]
        int     15h                           ; call BIOS
        mov   ah,0                            ; Did it
PollDockExit:
        cmp   ah,0
        jne     PollDockExitReally
        and     al,EJECTBUTTON
```

```
        cmp    al,0
        je      PollDockExitEject
        cmp    cs:EjectValue,0              ; Eject logged already?
        jne     PolldockExitReally              ; Yes, and we better ignore this
        mov   cs:EjectValue,al              ; Log this in.
 PollDockExitEject:
        mov  al,cs:EjectValue               ; last good known value
PollDockExitReally:
        popf
        ret
PollDockBusy      db NOT_BUSY_FLAG
EjectValue        db    0
PollDockRequest endp
PollDockResumeRequest   endp
        Page
DockingStationInterface   proc    near
;
       cmp      bh,00h
       je       InitiateIntelligentModeX         ; Start Intelligent mode
       cmp      bh,01h
       je       CancelIntelligentModeX           ; Cancell intelligent mode
       cmp      bh,02h
       je       UndockEjectX                     ; Undock system / Eject
       cmp      bh,04h
       je       EjectNotebookX
       cmp      bh,05h
       je       VGAMotorControlX                 ; Set motor control for VGA port
       cmp     bh,06h                           ; Set Interval Timer for Auto Pow
       je       SetInvervalTimerX
       cmp      bh,07h                           ; Cancel Interval Timer Mode
       je       ResetInveralTimerX
       cmp      bh,08h                           ; Read Docking Status (None, mic
       je       ReadDockStatusX
       cmp      bh,09h                           ; Read Status from Docking Stati
       je       ReadStatusFromDSX
;
;        Last Command
;
       cmp      bh,03h
       JE       ShutdownMode
       jmp      DockInError
ShutdownMode:
        mov     ah,86h
        cmp     cs:DockStatus,ah
        je      ShutDownModeErrorX
        cmp     bl,HOT_STATUS_ON                 ; Request for information on HOT
        je      ShutdownHotStatus                ; Maybe, check option setting
        cmp     bl,DOCK_MODE_STATUS
        je       ShutdownDockStatusX
        cmp     bl,EJECTKEYOFF                   ; Mode for Eject key?
        je      DisableEjectKey
        cmp     bl,EJECTKEYON                    ; Mode for Eject key
        jg      ElectronicKeyX
        je      EnableEjectKey
        mov     cs:ShutDownRequest,bl
VGAMotorControlOkay:
        mov     al,0
        xor     ah,ah                            ; Good Return clear carry
        clc
        ret
```

```
ShutDownModeErrorX:         jmp   ShutDownModeError
UndockEjectX:               jmp   UndockEject
InitiateIntelligentModeX:jmp InitiateIntelligentMode  ; Set intelligent Mode
ShutdownDockStatusX:        jmp   ShutdownDockStatus
;
;                           bl = 4 ; Disable Eject/Undock key in Smartmode
;
;                           bl = 5 ; Enable Eject/Undock key in Smartmode
;
EjectKey          db       EJECTKEYON                ; Enable is default
;
DisableEjectKey:
EnableEjectKey:
        mov      cs:EjectKey,bl
        jmp      short VGAMotorControlOkay
;
ShutDownHotStatus:
        cmp     bl,cs:HotStatus_parms           ; Valid option via command line?
        je      VGAMotorControlOkay              ; Yes, exit
        jmp     short DockInError                ; No, exit

VGAMotorControl:
        cmp      bl,1
        jg       VGAMotorControlError
        mov      cs:VGAMotorOption,bl           ; Value too big, exit
        jmp      short VGAMotorControlOkay
;
;       Eject Notebook
;
CancelIntelligentModeX:   jmp CancelIntelligentMode    ; Cancell intelligent mode
EjectNotebookX:           jmp EjectNotebook            ; Spit it out!
VGAMotorControlX:         jmp VGAMotorControl          ; Mode set for VGA port on
SetInvervalTimerX:        jmp SetInvervalTimer         ; Set Time and Hour for In
ResetInveralTimerX:       jmp ResetInveralTimer        ; Cancel Interval Timer Mo
ReadDockStatusX:          jmp ReadDockStatus           ; Read Docking Status
ReadStatusFromDSX:        jmp ReadStatusFromDS         ; Read Status from Docking
;
ElectronicKeyX:               jmp      ElectronicKey
;
Cancell_1X:   jmp  Cancell_1
;
;       Undock Poll Request
;
UndockEject:
        mov     ah,86h
        cmp     cs:DockStatus,ah
        je      Cancell_1X                       ; Not available for poll this time
;[7.00.55]  DEBUG
;        mov    al,52h
;        out    80h,al
;[7.00.55]  DEBUG

        cmp     cs:IntelligentMode,DUMBMODE    ; Intelligent Poll avaiable?
        je      NoUndockButton                 ; Not available at this time
;[7.00.55]  DEBUG
;        mov    al,53h
;        out    80h,al
;[7.00.55]  DEBUG
```

```
        mov   ah,0
        mov   al,cs:EjectValue
        cmp   al,EJECTBUTTON
        je      HaveEjectValue
        call  PollDockRequest                      ; Read current status
        cmp   ah,0
        jne   NoUndockButton                       ; busy use last value
HaveEjectValue:
        and   al,EJECTBUTTON
        cmp   al,0
        je    NoUndockButton
;[7.00.55]  DEBUG
;        mov   al,55h
;        out   80h,al
;[7.00.55]  DEBUG

        mov   al,1
        mov   bl,1
        jmp   short UndockReturn
NoUndockButton:
;[7.00.55]  DEBUG
;        mov   al,54h
;        out   80h,al
;[7.00.55]  DEBUG

        mov   al,0
        mov   bl,0
UndockReturn:
        mov   cs:EjectValue,0
        mov   ah,0                                 ; Good Return clear carry
        sti                                        ;[7.00.b]
        clc
        ret
ShutDownModeError:
VGAMotorControlError:
DockInError:
        mov     ah,86h                             ; Bad RETURN
        sti                                        ;[7.00.b]
        stc
        ret
;
;
ElectronicLockMode     db   0            ; byte to hold electronic lock
;                                        ;(1)  Locked by system Admin - see LAN S
;
IntelligentMode  db     0                          ; byte to hold DOS or EJECT mode
;
;       IntelligentMode
;               = DUMBMODE;  Docking Station has control of docking system
;               = SMARTMODE; User Application has control of docking system
;
ShutdownRequest  db 0
;
;       ShutDownRequest
;               = DOSMODE;          shutdown application wants to return to MS DOS
;               = EJECTPOWEROFF;    Shutdown application wants eject without power
;               = EJECTPOWERON;     Shutdown application wants eject with power re
;               = POWERDOWN;        Shutdown application wants power off with auto
;
DockStatus   db  00
```

```
MicroDockStatus  db 00
;
;       DockStatus;  86h means there is no docking station available
;                    ne. 86h means last command status on read/write
;
VGAMotorOption   db 00
;
;       UNLOADVGAPORT; 00 Means to Unload and reload VGA and Modem port on Stand
;                    ; 01 Means to leave it alone (attached that is)
;
DSFastChargeStatus  db 00
;                   ; 00 Means battery is still charging (slowly)
;                   ; 01 Means battery is fast charging. (not Full)
;
UNLOADVGAPORT           EQU             00h

        Page
InitiateIntelligentMode:
        mov     ax,8686h                        ;[7.0045]
        cmp     cs:DockStatus,al
        je      InitiateIntelRet
        mov     ax,SENDCMDMC                    ; Send Motor Control Command
        mov     bl,SMARTMODEPC
        mov     bh,WAITMC
        Int     15h                             ; Send command for Intelligent
        mov     cs:DockStatus,ah
        cmp     ah,86h
        je      InitiateIntelRet
        cmp     ah,0                            ; Did we get in this time?
        jne     InitiateIntelRet
        cmp     bh,SETSMARTMODEPC
        jne     InitiateIntelRet                ; No, we are not in conrol
        mov     byte ptr cs:IntelligentMode,SMARTMODE     ; Intelligent Mode
        mov     byte ptr cs:ShutDownRequest,DOSMODE       ; Return to DOS on Shutd
InitiateIntelRet:
        ret

        Page

CancelIntelligentMode:
        mov     ax,8686h                        ;[7.0045]
        cmp     cs:DockStatus,al
        je      Cancell_1
        mov     ax,SENDCMDMC                    ; Send Motor Control Command
        mov     bl,SMARTMODEPCOFF
        mov     bh,WAITMC
        Int     15h                             ; Send command for Intelligent
        cmp     ah,86h                          ; Valid interrupt?
        je      Cancell_1
        cmp     ah,0                            ; Valid return?
        jne     CancellRet                      ;
        cmp     bh,RETSMARTMODEPC               ; Did we get out of smartmode?
        jne     CancellRet
        mov     byte ptr cs:IntelligentMode,DUMBMODE      ; Intelligent Mode, DUMB
        mov     byte ptr cs:ShutDownRequest,DOSMODE       ; Return to DOS on Shutd
;       jmp     short CancellRet                ; We are in DOS mode Again, Dumb m
Cancell_1:
CancellRet:
        mov     cs:DockStatus,ah
        ret
```

```
        Page
EjectNotebook:
;
;       Exit Smartmode NOW!
;
        cmp     cs:ElectronicLockMode,1
        je      DockInError
        mov     ax,SENDCMDMC                    ; Talk to MC
        mov     bh,WAITMC                       ; Wait for completion
        mov     bl,SMARTMODEPCOFF

        int     15h
;
;       Do we want a autoresume?
;
        cmp  cs:ShutDownRequest,POWERON
        jne     NoPowerResumeCode

        mov     ax,SENDCMDMC
        mov     bh,WAITMC
        mov     bl,POWERDOWNRESUME
        int             15h
;
;       What should I do if we return
;
        jmp      RestartCode
NoPowerResumeCode:
;
;       Need to Set type of Shutdown wanted
;
        mov     ax,SENDCMDMC                    ; Talk to MC
        mov     bh,WAITMC                       ; Wait for completion
        mov     bl,RESETONEJECT
        cmp     cs:ShutDownRequest,EJECTPOWERON
        je      IssueEjectCommand
        mov     bl,NORESETONEJECT
IssueEjectCommand:
        int     15h
;
;       Now Ready to Eject
;
        mov     ax,SENDCMDMC                    ; Talk to MC
        mov     bh,WAITMC                       ; Wait for completion
        mov     bl,EJECT
        int     15h
;
;       Try it directly to keep from locking in DS BIOS
;
;       mov     al,43h
;       out     DOCKPORT,al                     ; eject command
;UnloadLoop:
;       in      al,DOCKPORT
;       and     al,FREEDSBITS
;       cmp     al,FREEDSBITS
;       jne     UnloadLoop
;
RestartCode:
;
;
```

```
;       mov     al,40h
;       out     DOCKPORT,al
;
;
;       If we got back here, then we got back with a eject and no reset.
;       Test to be sure that is true, if so, then configure for portable
;       operations;
;               else
;                       We must assume a problem with motor controll and clean
;                       up; exit smartmode and go to dos.
;                       PS: we should exit smartmode prior to this command
;                           anyway.
;
        mov     ax,SENDCMDMC                    ; Send Motor Control Command
        mov     bl,SMARTMODEPCOFF
        mov     bh,WAITMC
        Int     15h
                                                ; Send command for Intelligent
        mov     cs:IntelligentMode,DUMBMODE     ; Intelligent Mode, DUMB
        mov     byte ptr cs:ShutDownRequest,DOSMODE     ; Return to DOS on Shutd
;
;       Enable the internal Keyboard
;
MER_IntKeyboard_MASK equu        00101111b       ; Mask use internal keyboard
;
;
        pushf
        CLI
;
        in      al,SLEEP_PORT           ; Fetch currect status
        and     al,MER_IntKeyboard_MASK ; Int Bit State Not Active-reset
        or      al,MUST_KEEP_CLOCK_MASK ;

        out     SLEEP_PORT,al           ; Use internal keyboard
        popf
;
;       Need to figure out display modes.
;
        mov     ah,12h                  ; Video Bios
        mov     al,2                    ; Enable Simul
        mov     bl,92h                  ; Function call
        int     10h
;
;       Need to restore COM and LPTs
;
        push    es
        mov     ax,40h
        push    ax
        pop     es
        mov     byte ptr es:[0],0f8h
        mov     byte ptr es:[1],03h
        mov     byte ptr es:[2],0f8h
        mov     byte ptr es:[3],02h
        mov     byte ptr es:[4],0
        mov     byte ptr es:[5],0
        mov     byte ptr es:[6],0
        mov     byte ptr es:[7],0

        mov     byte ptr es:[8],78h
```

```
        mov     byte ptr es:[9],03h
        mov     byte ptr es:[10],0
        mov     byte ptr es:[11],0
        mov     byte ptr es:[12],0
        mov     byte ptr es:[13],0

        pop     es                          ;Clean up Stack
        jmp      NoUndockButton
;
SetInvervalTimer:                                    ; Set Time and Hour for Interval T
; For BH = 06h, Set Interval Timer for Auto Power ON feature
;               BL=  0; No Instant On Resume. Most power savings.
;                     ; On this call, the mode is set for Standby/Resume
;                     ; but the unit is NOT shutdown.  A shutdown occurs
;                     ; when the system leaves Windows after updating
;                     ; any/all files.  A normal exit windows with this
;                     ; mode set to POWERDOWN mode will power system down and
;                     ; wait system up on specificed time delay.
;               BL=  1; Instant On Resume.
;                     ; On this call, the system will not return until
;                     ; the elasped time has expired or the user has
;                     ; pressed a manual restart key.
;               CH=  H; Number of hours to skip for wakeup (resume)
;               CL=  M; Number of minutes to skip for wakeup (resume)
        mov     word ptr cs:resume_time,cx              ; Hours and minutes
        cmp     bl,INSTANT_ON_RESUME
        jne     SetInvervalMC
;                                                       ; Setup for Motor Contro
;       Smart Mode Active?  If not, exit nicely
;
        cmp     cs:IntelligentMode,SMARTMODE            ; Intelligent Mode, DOS?
;[7.00.55]
        jne     BadSetInvervalExitMC
        cmp     cs:DockStatus,86h
        je      BadSetInvervalExitMC
        cmp     ESeries,86h
        je      BadSetInvervalExitMC
;[7.00.55]
;
;       Compute in total minutes    cx = (ch * minutes per hour) + minutes
;
        mov     al,60
        mov     ah,0                                    ; number of minutes/hour
        mul     ch
        mov     ch,0                                    ; number of hours * minu
        add     ax,cx
        mov     word ptr cs:resume_time,ax              ; number of minutes requ
;                                                       ; Hours and minutes
;       Ready to create an auto standby and then an auto resume
;
        mov     al,POWERON
        mov     byte ptr cs:resume_type,al              ; Type shutdown wanted
        call    PollDockResumeRequest                   ; Type of resume to look
SetInvervalExitMC:                                      ; Do it!
;[7.00.54]
        STI
        mov     al,0                                    ;[7.00.55] do nothing-sa
        mov     byte ptr cs:resume_type,al
        xor     ah,ah
        clc                                             ; Good Return clear carr
```

```
        ret
;[7.00.55]
BadSetInvervalExitMC:
        STI
        mov     al,0                                    ;[7.00.55] do nothing-sa
        mov     byte ptr cs:resume_type,al
        mov     ah,86h
        stc                                             ; Bad Return
        ret
;[7.00.55]
SetInvervalMC:
;
;       Tell Motor control what we want
;
        pushf
        cli

SETMCTIME       EQU     5dh
        mov     bl,SETMCTIME                    ; Set the power up time
;       mov     ch,ch                           ; Set the power up time
        mov     dh,cl                           ; place holder for minutes
        mov     cl,3                            ; hours to sleep
                                                ; three byte command
        mov  ax,word ptr SENDMCMDMC        ; Send multiple command to Motor Control
        mov  bh,WAITMC                     ; Wait for complete
        int     15h                        ; call BIOS
;
;       Ready to create an auto standby and then an auto resume
;
        mov     al,POWERON
        mov     byte ptr cs:ShutDownRequest,al          ; Type shutdown wanted
                                                          ; Type of resume to
        popf
SetInvervalMCGood:
        mov     al,0
        xor     ah,ah
        clc                                ; Good Return clear carry
        ret

ResetInveralTimer:
        mov     word ptr resume_time,0                  ; Cancel Interval Timer
        mov     byte ptr cs:ShutDownRequest,DOSMODE     ; Clear it
;                                                       ; Cancel type of shutdow
;       Tell Motor Controller
;
        mov     ah,86h
        cmp     cs:DockStatus,ah                ; Disable interrupts
        je      SetInvervalExit
                                                        ; No docking station ava
        pushf
        cli

        mov  ax,word ptr SENDCMDMC         ; Send command to Motor Controller
        mov  bh,WAITMC                     ; Wait for complete
        mov  bl,CLEARTIMER                 ; Clear timer
        int     15h                        ; call BIOS
        popf
        jmp     short SetInvervalExitMC ; Done
```

```
ReadDockStatus:          ; Read Docking Status; Test for Docking Station Active
        mov     ah,86h
        cmp     cs:DockStatus,ah
        jne     SetInvervalMCGood
SetInvervalExit:
DockInErrorX:   JMP DockInError
ReadStatusFromDS:        ; Read Status from Docking Station
      JMP        DockInError
;
;       ah=4604, bx=0381
;
ShutdownDockStatus:
;                   Return Mode Information
;
;                bl=81h; Return mode information (not coded yet)
;                Return AH=86h, Mode not supported (call of this function that i
;                          otherwise, AH=0 and BL=mode settings active
;
;                       bl on Return (Bits)
;
;
;               bl-bit
;
;                       0- 2:   current setting for SMART EJECT SWITCH
;                               2  1  0
;                               1  0  0  (4)   Disabled Eject Switch
;                               1  0  1  (5)   Enabled  Eject Switch
;                               |--------------"Suspend" Instant on Supported
;
;                               0  0  0  (4)   Disabled Eject Switch
;                               0  0  1  (5)   Enabled  Eject Switch
;                               |--------------"Suspend" Instant NOT Supported
;
;                       3:      current setting for CRT ON/OFF during STANDBY
;                                       (0)    Withdraw VGA and Modem connectio
;                                              Standby
;                                       (1)    Leave VGA and Modem connection
;                                              attached on Standby
;                       4-5:    current setting for POWER SETTING AT EJECT
;                                  5   4
;                                  0   0       (0)    DOSMODE
;                                  0   1       (1)    EJECTPOWEROFF -Eject Sys
;                                  1   0       (2)       EJECTPOWERON  -Eject
;                                  1   1        (3)       POWERDOWN     -Stand
;                       6:      docking system electronic lock status
;                                  (0)  Not locked
;                                  (1)     Locked
;                       7:       docking system intelligence status
;                                  (0)     Dumb Mode Active
;                                  (1)     Smartmode Active
;
        mov     bl, cs:EjectKey
        test        cs:VGAMotorOption,1                 ; Eject key status
        je    DockStatusReset1
        or      bl,00001000b
DockStatusReset1:                                       ; VGA motor status
        mov     al,cs:ShutDownRequest
        shl         al,4
        or      bl,al
                                                        ; Power down/Shutdown st
```

```
;[7.00.55]
        cmp     cs:ESeries,86h
        jne     DockStatusEseriesOkay
        and     bl,11111011b
DockStatusEseriesOkay:                                  ; Instant on NOT Support
        test        cs:IntelligentMode,SmartMode
        je    DockStatusReset2
        or      bl,10000000b
DockStatusReset2:                                       ; VGA motor status
        test        cs:ElectronicLockMode,1
        je    DockStatusReset3
        or      bl,01000000b
DockStatusReset3:                                       ; VGA motor status
        jmp         short DockStatusGoodReturn
ElectronicKey:
        cmp     bl,6
        jne     ElectronicKeyOff
ElectronicKeyOn:
        cmp         cs:IntelligentMode,SmartMode
         jne            DockInErrorXX
        mov     cs:ElectronicLockMode,1
        mov         cs:EjectKey,EJECTKEYOFF
        jmp        short DockStatusGoodReturn
ElectronicKeyOff:
        mov         cs:ElectronicLockMode,0
;[7.00.55]
DockStatusGoodReturn:
        mov     al,0
        xor     ah,ah
        clc                                         ; Good Return clear carry
        ret
;[7.00.55]
DockInErrorXX:  JMP     DockInError
vgadelay        proc    near
;
;       We need to reload and get a good delay here to help the MC out
;
        mov     ax,VGASETTLEDELAY       ; Outer loop count
SettleDelay0:
        mov     cx,-1
SettleDelay1:                           ; Interloop count
        jmp     $+2
        jmp     $+2
        loop    SettleDelay1
        dec     ax                      ; Interloop complete?
        cmp     ax,0                    ; Outer loop count
        jne     SettleDelay0
        ret                             ; Outer loop again [50Mhz]
vgadelay        endp

EnableVideoResume       Proc    Near
        pushf
        push    dx
        push    ax
        mov     dx,03c4h
        CLI
                                        ;;; Disable
;[7.01] Save the index register for 16 color driver inside windows
        in      al,dx
        push    ax                      ; Got it
                                        ; put on stack, do not return w/o clr
```

```
;[7.01]

        mov     al,01                   ; Turn off video
        out     dx,al
        jmp     $+2
        jmp     $+2
        inc     dx
        in      al,dx
        and     al,0dfh
        out     dx,al                   ; turn on

;[7.01] Restore the index register that was expected
        dec     dx
        pop     ax
        out     dx,al
;[7.01]                                 ; Done!

        pop     ax
        pop     dx
        popf
        ret

EnableVideoResume       ENDP

DisableVideoResume      Proc  Near
        pushf
        push    dx
        push    ax
        mov     dx,03c4h
        CLI
                                        ; Disable
;[7.01] Save the index register for 16 color driver inside windows
        in      al,dx                   ; Got it
        push    ax                      ; put on stack, do not return w/o clr
;[7.01]

        mov     al,01                   ; Turn off video
        out     dx,al
        jmp     $+2
        jmp     $+2
        inc     dx
        in      al,dx
        or      al,20h
        out     dx,al                   ; turn off

;[7.01] Restore the index register that was expected
        dec     dx
        pop     ax
        out     dx,al
;[7.01]                                 ; Done!

        pop     ax
        pop     dx
        popf
        ret
DisableVideoResume      ENDP
DockingStationInterface endp
```

What is claimed is:

1. A computer docking station, comprising:

a docking station having connection means for coupling to an external monitor and an external keyboard;

means for connecting a portable computer to said docking station;

at least one PCMCIA card slot in said docking station;

a housing for holding said portable computer therein, said housing having connection means for coupling said docking station to said portable computer;

a tray adapted to receive said portable computer thereon slidably mounted to said housing; and drive means coupled between said housing and said tray for driving said tray and said portable computer into and out of said housing and automatically mating said connection means of said housing to said connection means on said portable computer, said drive means includes a first drive means for driving said try in a first direction and a second drive means for a first connection means on said housing for driving said first connection means in a second orthogonal direction to a first connection means on said portable computer.

2. The docking station of claim 1, in which said first drive means includes a drive motor and gear means coupled to said drive motor and said tray includes a rack means on the bottom of said tray and side gear means is coupled to said rack means to drive said tray.

3. The docking station of claim 2, in which said second drive means includes a second drive motor and associated second gear means and said first connection means includes a connector holder means slidably mounted in said second orthogonal direction having pins therein extending into a rack/cam plate and said rack/cam plate is coupled to said second gear means.

* * * * *